US007782883B2

(12) United States Patent
Furukawa et al.

(10) Patent No.: US 7,782,883 B2
(45) Date of Patent: *Aug. 24, 2010

(54) TERMINAL-TO-TERMINAL COMMUNICATION CONNECTION CONTROL METHOD USING IP TRANSFER NETWORK

(75) Inventors: Hisao Furukawa, Saitama (JP); Shoji Miyaguchi, Chiba (JP)

(73) Assignees: The Distribution Systems Research Institute, Tokyo (JP); Miyaguchi Research Co., Ltd., Chiba (JP)

( * ) Notice: Subject to any disclaimer, the term of this patent is extended or adjusted under 35 U.S.C. 154(b) by 299 days.

This patent is subject to a terminal disclaimer.

(21) Appl. No.: 11/891,615

(22) Filed: Aug. 10, 2007

(65) Prior Publication Data

US 2007/0297423 A1 Dec. 27, 2007

Related U.S. Application Data

(62) Division of application No. 09/827,267, filed on Apr. 5, 2001, now Pat. No. 7,301,952.

(30) Foreign Application Priority Data

| | | | |
|---|---|---|---|
| Apr. 6, 2000 | (JP) | ............................. | 2000-105023 |
| Jun. 15, 2000 | (JP) | ............................. | 2000-179234 |
| Dec. 1, 2000 | (JP) | ............................. | 2000-367085 |
| Dec. 15, 2000 | (JP) | ............................. | 2000-382682 |
| Feb. 7, 2001 | (JP) | ............................. | 2001-031448 |

(51) Int. Cl.
*H04L 12/56* (2006.01)

(52) U.S. Cl. ...................................................... 370/401

(58) Field of Classification Search ................. 370/401, 370/351–355, 360, 389, 392; 379/230; 709/227, 709/230, 249

See application file for complete search history.

(56) References Cited

U.S. PATENT DOCUMENTS 4,933,937 A 6/1990 Konishi ................... 370/85.13

(Continued)

FOREIGN PATENT DOCUMENTS

EP 0 698 975 A2 2/1996

(Continued)

OTHER PUBLICATIONS

Black, ISDN and SS7, Prentice Hall, 1997, pp. 32-33.

(Continued)

*Primary Examiner*—Dmitry H Levitan
(74) *Attorney, Agent, or Firm*—Ladas & Parry LLP

(57) ABSTRACT

Both a connection server and a relay connection server are installed in an IP transfer network; a function similar to a line connection control of a subscriber exchanger is applied to a connection server; a function similar to a line connection control of a relay exchanger is applied to the relay connection server; and a terminal-to-terminal communication connection control method with using the IP transfer network is realized in such a manner that a telephone set and a terminal such as an IP terminal and a video terminal transmit/receive an initial address message, an address completion message, a call pass message, a response message, a release message and a release completion message, which can be made in a 1-to-1 correspondence relationship with line connection control messages of the common line signal system. Furthermore, while an address administration table is set to a network node apparatus of an IP transfer network, means for registering addresses of the terminals into this address administration table is employed, so that an IP packet communication by a multicast manner can be realized with improving information security performance.

6 Claims, 149 Drawing Sheets

U.S. PATENT DOCUMENTS

| | | | | |
|---|---|---|---|---|
| 5,408,528 | A | 4/1995 | Carlson et al. | 379/211.02 |
| 5,608,726 | A | 3/1997 | Virgile | 370/401 |
| 5,732,078 | A | 3/1998 | Arango | 370/355 |
| 5,751,971 | A | 5/1998 | Dobbins et al. | 709/200.68 |
| 5,787,157 | A | 7/1998 | Garfin et al. | 379/142.06 |
| 5,793,763 | A | 8/1998 | Mayes et al. | 370/389 |
| 5,818,838 | A | 10/1998 | Backes et al. | 370/390 |
| 5,825,772 | A | 10/1998 | Dobbins | 370/396 |
| 5,872,588 | A | 2/1999 | Aras et al. | 725/14 |
| 5,898,830 | A | 4/1999 | Wesinger, Jr. et al. | 395/187.01 |
| 5,940,598 | A * | 8/1999 | Strauss et al. | 709/249 |
| 5,991,301 | A * | 11/1999 | Christie | 370/395.3 |
| 5,999,612 | A | 12/1999 | Dunn et al. | 379/212 |
| 6,006,258 | A | 12/1999 | Kalajan | 709/219 |
| 6,006,272 | A | 12/1999 | Aravamudan et al. | 709/245 |
| 6,069,890 | A | 5/2000 | White et al. | |
| 6,075,783 | A | 6/2000 | Voit | |
| 6,094,431 | A | 7/2000 | Yamato et al. | 370/395 |
| 6,104,711 | A | 8/2000 | Voit | |
| 6,119,171 | A | 9/2000 | Alkhatib | |
| 6,145,011 | A | 11/2000 | Furukawa et al. | 709/245 |
| 6,195,425 | B1 * | 2/2001 | Farris | 379/230 |
| 6,215,783 | B1 * | 4/2001 | Neyman | 370/353 |
| 6,233,234 | B1 | 5/2001 | Curry et al. | |
| 6,249,820 | B1 | 6/2001 | Dobbins et al. | 709/238 |
| 6,252,952 | B1 | 6/2001 | Kung et al. | |
| 6,295,293 | B1 * | 9/2001 | Tonnby et al. | 370/389 |
| 6,308,148 | B1 | 10/2001 | Bruins et al. | 703/27 |
| 6,321,337 | B1 | 11/2001 | Reshef et al. | |
| 6,324,280 | B2 | 11/2001 | Dunn et al. | |
| 6,339,594 | B1 | 1/2002 | Civanlar et al. | |
| 6,359,880 | B1 | 3/2002 | Curry et al. | 370/352 |
| 6,370,163 | B1 | 4/2002 | Shaffer et al. | |
| 6,396,840 | B1 | 5/2002 | Rose et al. | |
| 6,404,766 | B1 | 6/2002 | Kitai et al. | |
| 6,449,269 | B1 | 9/2002 | Edholm | |
| 6,453,327 | B1 | 9/2002 | Nielsen | 715/205 |
| 6,523,069 | B1 | 2/2003 | Luczycki et al. | 709/249 |
| 6,526,022 | B1 | 2/2003 | Chiu et al. | 370/229 |
| 6,532,233 | B1 | 3/2003 | Matsunaga et al. | 370/390 |
| 6,539,077 | B1 | 3/2003 | Ranalli et al. | 379/67.1 |
| 6,542,503 | B1 | 4/2003 | Xu et al. | 370/390 |
| 6,564,380 | B1 | 5/2003 | Murphy | 725/86 |
| 6,570,855 | B1 | 5/2003 | Kung et al. | 370/237 |
| 6,628,644 | B1 | 9/2003 | Nelson et al. | |
| 6,654,456 | B1 | 11/2003 | Mandalla et al. | |
| 6,680,935 | B1 | 1/2004 | Kung et al. | 370/352 |
| 6,687,251 | B1 * | 2/2004 | Mousseau et al. | 370/401 |
| 6,724,747 | B1 | 4/2004 | Arango et al. | |
| 6,731,642 | B1 | 5/2004 | Borella et al. | 370/401 |
| 6,735,209 | B1 * | 5/2004 | Cannon et al. | 370/401 |
| 6,807,166 | B1 | 10/2004 | Ohura | 370/352 |
| 6,873,627 | B1 | 3/2005 | Miller et al. | 370/466 |
| 6,934,278 | B1 | 8/2005 | Champa et al. | |
| 6,987,781 | B1 | 1/2006 | Miller et al. | |
| 7,075,918 | B1 | 7/2006 | Kung et al. | 370/352 |
| 2002/0124084 | A1 | 9/2002 | Furukawa et al. | 370/225 |
| 2002/0196782 | A1 | 12/2002 | Furukawa et al. | |

FOREIGN PATENT DOCUMENTS

| | | | |
|---|---|---|---|
| EP | 0 825 748 | A2 | 2/1998 |
| EP | 0 851 635 | A2 | 7/1998 |
| EP | 0 851 653 | A2 | 7/1998 |
| EP | 0 928 095 | A2 | 7/1999 |
| EP | 0 973 343 | A1 | 1/2000 |
| EP | 1 054 568 | A2 | 11/2000 |
| GB | 2 313 981 | A | 12/1997 |
| GB | 2 320 167 | | 6/1998 |
| GB | 2 332 818 | A | 6/1999 |
| GB | 2 352 111 | | 1/2001 |
| JP | 11-088438 | | 3/1999 |
| JP | 128956/1999 | | 5/1999 |
| JP | 11-239178 | | 8/1999 |
| JP | 3084681 | | 9/2000 |
| WO | 97/23078 | | 6/1997 |
| WO | 97/28628 | | 8/1997 |
| WO | 97/31492 | | 8/1997 |
| WO | 97/48051 | | 12/1997 |
| WO | 98/06201 | | 2/1998 |
| WO | 98/20724 | | 5/1998 |
| WO | 98/20724 | A2 | 5/1998 |
| WO | 98/30008 | | 7/1998 |
| WO | 98/59523 | | 12/1998 |
| WO | 99/14931 | | 3/1999 |
| WO | 99/28827 | | 6/1999 |
| WO | 99/37061 | | 7/1999 |
| WO | 99/37061 | A1 | 7/1999 |
| WO | 00/16206 | | 3/2000 |
| WO | 00/51331 | | 8/2000 |
| WO | 01/24499 | | 4/2001 |
| WO | 01/37529 | A1 | 5/2001 |

OTHER PUBLICATIONS

Black, ISDN and SS7, Prentice Hall, 1997, pp. 9, 10 and 223-248.
Newton's Telecom Dictionary, CNP books, 2004, p. 481.
U.S. Appl. No. 10/620,785, filed May 9, 2000, Furukawa et al.
U.S. Appl. No. 09/165,212, filed Oct. 2, 1998, Furukawa et al.
U.S. Appl. No. 09/568,515, filed May 9, 2000, Furukawa et al.
Nagami, K., et al.,, "VCID Notification for Label Switching," IEICE Transactions on Information and Comm. Eng. Tokyo, JP, vol. E82-D, No. 4, pp. 863-869, (Apr. 1999).
Giacometti, S., et al., "Tunnelling Effectiveness In The Access Environment," 38th European Telecommunications Congress, pp. 101-105 (Aug. 24, 1999).
Anquetil, L.-P., et al., "Media Gateway Control Protocol and Voice Over IP Gateways," IEEE Communications Magazine, pp. 110-116 (Jul. 1999).
Gbaguidi, C., et al., "A Programmable Architecture for the Provision of Hybrid Services," IEEE Communications Magazine, pp. 110-116 (Jul. 1999).
Hui, S.C., et al., "Towards a Standards-Based Internet Telephony System," Computer Standards & Interfaces, vol. 19, pp. 89-103 (1998).
Hunt, R., "Internet/Intranet Firewall Security-Policy, Architecture, and Transaction Services," Computer Communications, vol. 21, pp. 1107-1123 (1998).
Malkin, G.S., "Dial-In Virtual Private Networks Using Layer 3 Tunneling," IEEE, pp. 555-561 (1997).
European Search Report (14 pages), which was mailed on Oct. 20, 2003 for European Patent Application No. 01200880.1.
Australian Written Opinion for Singapore Patent Application No. SG 200102034-6 (Date: Jun. 24, 2002; No. Of pp. 6), which corresponds to the above-identified U.S. Appl. No. 10/165,326.
Hamdi, M., et al., "Voice Service Interworking for PSTN and IP Networks," IEEE Communications Magazine, vol. 37, No. 5, pp. 104-111 (May 1999).
"Packet-based multimedia communications systems," ITU-T Recommendation H.323—Annex D, (Sep. 1998), 10 pages.

* cited by examiner

MSG: message (IAM, ACM, CPG, ANM, REL, RLC, SUS, RES, CON, etc.)
OPC : origin point code DPC : destination point code
CIC: circuit identification code
SLS= Signalling Link Selection
F: flag (01111110) CK: check code ( m: address registration)

FIG.25
44-1
| External IP Address | Communication Line Identification Symbol |
|---|---|
| A481 | Line-10-1 |
| A113 | Line-10-1 |
| A131 | Line-10-1 |
| A161 | Line-10-1 |
| A181 | Line-10-1 |
| . . | . . |
FIG.26
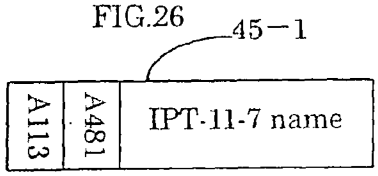
FIG.27
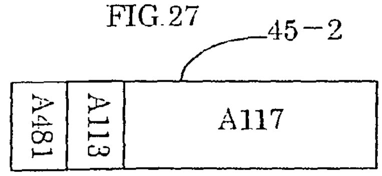
FIG.28
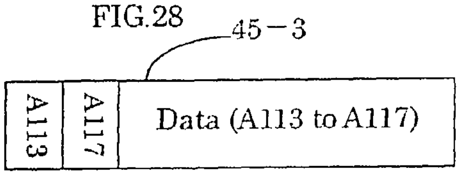
FIG.29
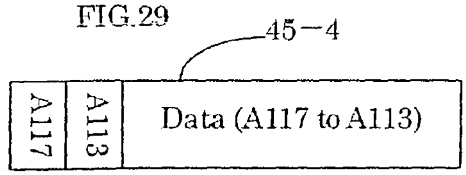
FIG.30
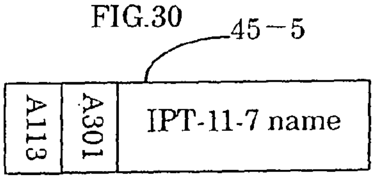
FIG.31
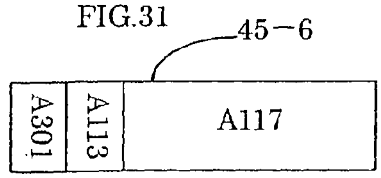

FIG.47
100-1
| Line Identifier | Phone No. (Host Name) | Terminal IP Address | Kind of Terminal | Speed | Kind of Line |
|---|---|---|---|---|---|
| 53-1 | 81-3-1234-5679 | 32.3.53.1 | H323T | 64Kbps | ISDN |
| 54-1 | 81-3-1200-2002 | 32.3.54.1 | H323V | 1.5Mbps | |
| 55-1 | 81-47-325-3887 | 20.0.55.1 | A-tel | 64Kbps | ISDN |
| . . | . . | . . | | | . . |
FIG.48
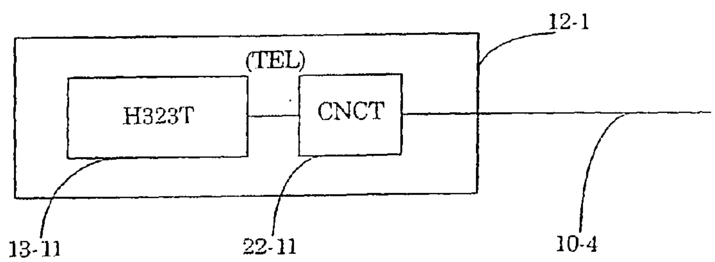
IG.49
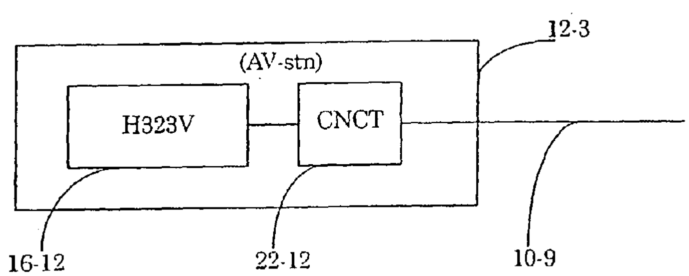

| External IP Address | Com. Line Identification Symbol |
|---|---|
| A781 | Line-17-1 |
| A116 | Line-17-1 |
| A133 | Line-17-1 |
| A185 | Line-17-1 |
| . . | . . |

FIG.87
100-2
| Line Identifier | Telephone No. (Host Name) | Terminal IP Address | Kind of Terminal | Speed | Kind of Com. Line |
|---|---|---|---|---|---|
| 17-1 | 81-3-9876-5432 | 100.101.102.103 | A-tel | 64kbps | ISDN |
| · · | 81-3-9876-5431 | 110.111.112.113 | · · | · · | ISDN |
FIG.88
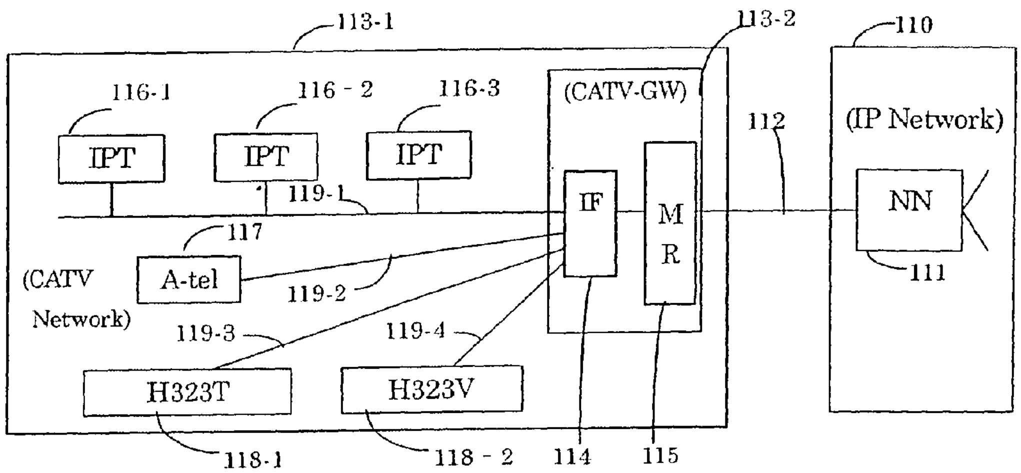
FIG.89
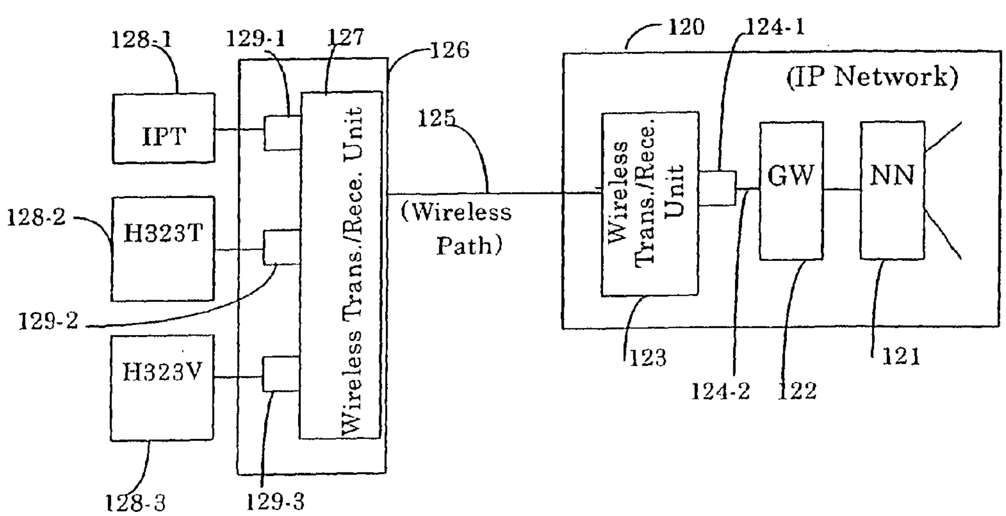

FIG.111

| No. | Telephone No. | Own Com. ? | Iden. Information of Another Company |
|---|---|---|---|
| 1 | 81-3-5414-xxxx | No. | Com-130 |
| 2 | 1-2245-5678 | No. | Com-025 |
| 3 | 81-47-325-3887 | Yes | |
| 4 | 81-2245-56xx | Yes | |
| · · | 81-6-1234- xxxx | Yes | |
| n | 1-2345-2345 | No | Com-840 |

FIG.112

| No. | Telephone No. | Operated by This TES ? (Own Company) | Iden. Inform.of Another TES (Own Company) |
|---|---|---|---|
| 1 | 81-47-325-3887 | Yes | |
| 2 | 81-2245-56xx | No. | 100.10.11.40 |
| 3 | 81-6-1234- xxxx | Yes | |
| · · | | | |
| m | 1-2345-2345 | No | 100.10.11.70 |

FIG.129
1083-1
| Tel-No. | pin | port |
|---|---|---|
| Tel-No-1 | T1 | 5004 |
| Tel-No-1 | T2 | 5006 |
| Tel-No-1 | T3 | 5008 |
| Tel-No-1 | T4 | 5010 |
FIG.130
1083-2
| Tel-No. | pin | port |
|---|---|---|
| Tel-No-1 | T1 | |
| Tel-No-12 | T2 | 5004 |
| Tel-No-13 | T3 | |
| Tel-No-14 | T4 | |
FIG.131
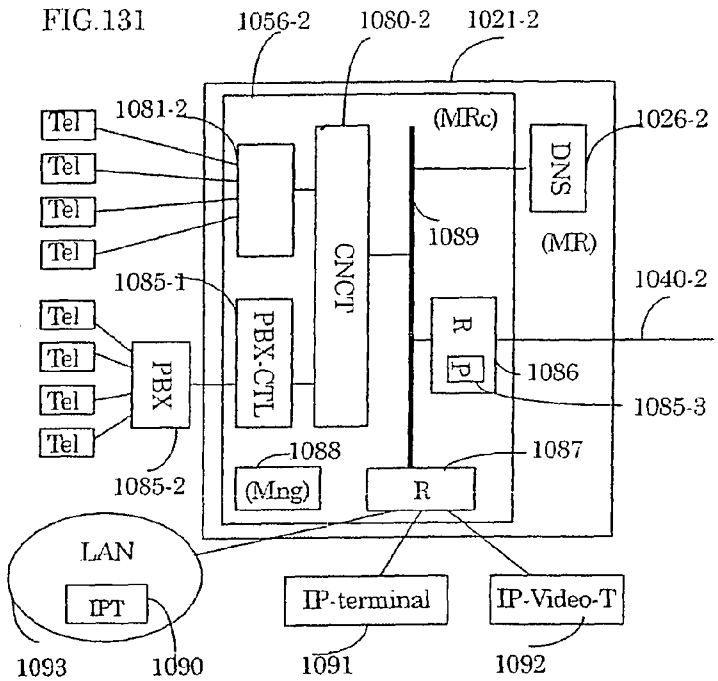
FIG.132
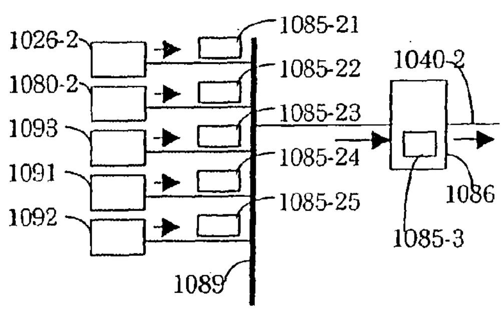
FIG.133
1085-3
| (priority) | (port-No.) |
|---|---|
| 2 (high) | 108 |
| 1 | 5060, 5004 to 5020 |
| 0 | others |

1085-4

| (priority) | ( IP address－port No. ) |
|---|---|
| 2 (high) | 150.1.2.3 －108 |
| 1 | 192.1.2.3－5060, 192.1.2.3－(5004 to 5020) |
| 0 | others |

1155

| Telephone Number | Domain Name Expression of Telephone No. |
|---|---|
| 1×× | 1. |
| 2×× | 2. |
| 3×× | 3. |

1156

| Question to Telephone Number Server | | Contents of Answer |
|---|---|---|
| Question | 1. | EA1 |
| | 2. | EA2 |
| | 3. | EA3 |

FIG.141
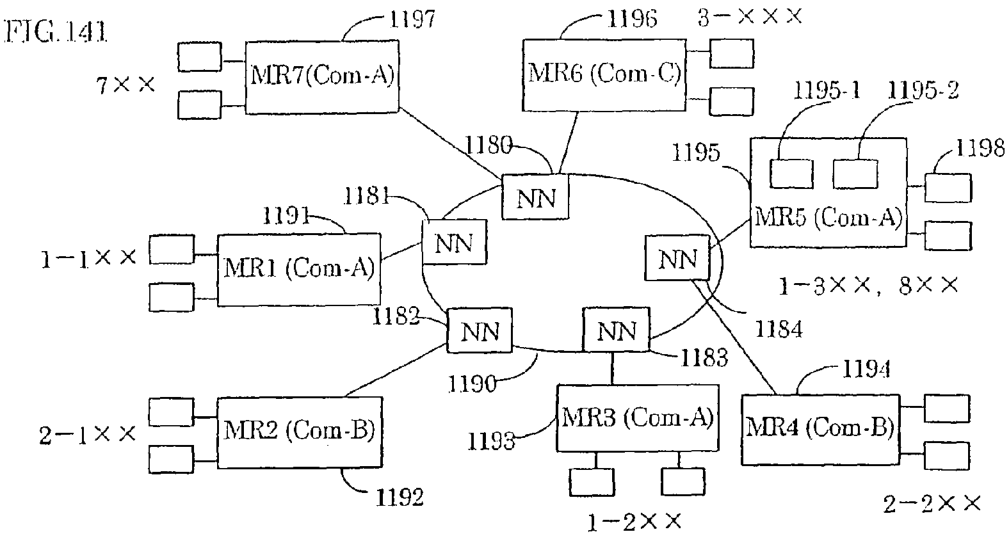
FIG.142
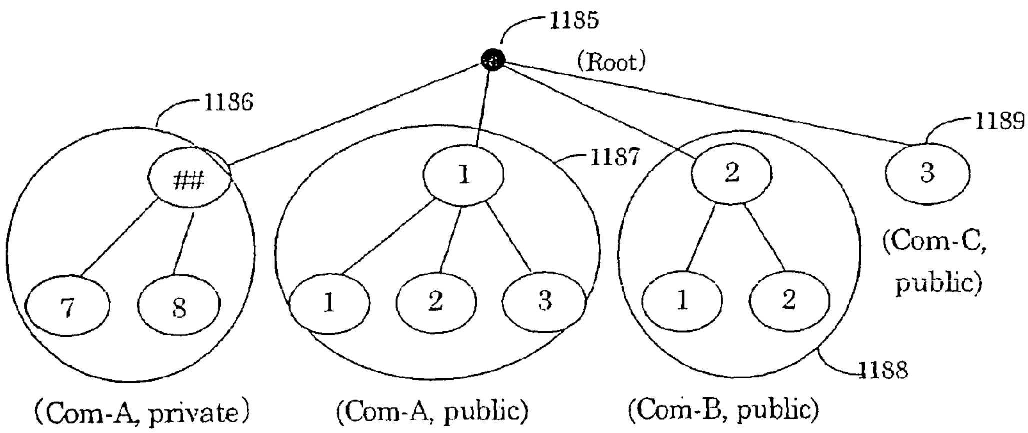
FIG.143
1185-1
| Telephone Number | Domain Name Expression of Telephone No. |
|---|---|
| 1−1×× | 1. 1. |
| 1−2×× | 2. 1. |
| 1−3×× | 3. 1. |
| 2−1×× | 1. 2. |
| 2−2×× | 2. 2. |
| 3−××× | 3. |
| 7×× | 7. #. |
| 8×× | 8. #. |
FIG.144
1185-2
| Question to Telephone No. Server | Contents of Answer |
|---|---|
| 1. 1. | IP Address of MR1 |
| 2. 1. | IP Address of MR3 |
| 3. 1. | IP Address of MR5 |
| 1. 2. | IP Address of MR2 |
| 2. 2. | IP Address of MR4 |
| 3. | IP Address of MR6 |
| 7. ##. | IP Address of MR7 |
| 8. ##. | IP Address of MR5 |

FIG.152
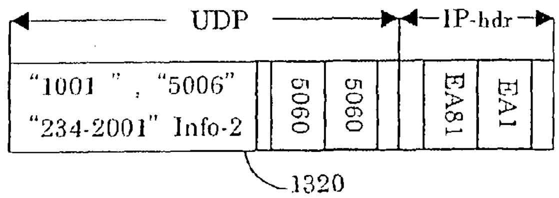
FIG.153
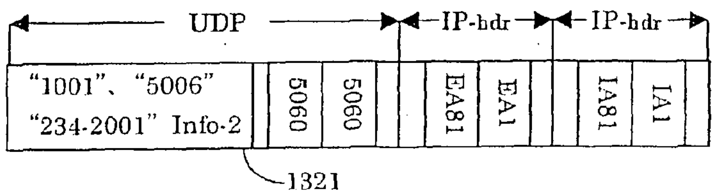
FIG.154
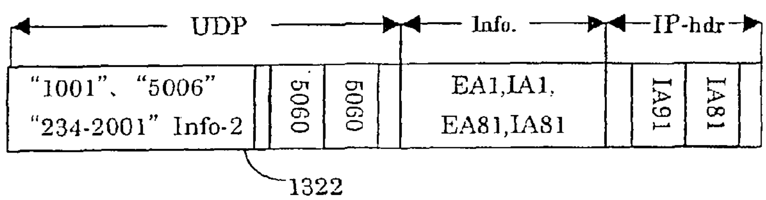
FIG.155
1323
| CIC No. | Sender Phone No. | Receiver Phone No. | IP Address | Step | Start Time | End Time |
|---|---|---|---|---|---|---|
| CIC-1 | "1004" | "××・・×" | ×,×,××・・ | ANM | St-1 | |
| CIC-2 | "1001" | "234-2001" | EA1,IA1,EA81, IA81,IA91 | IAM | St-2 | |
| ・・ | ・・ | ・・ | ・・ | ・・ | ・・ | ・・ |

FIG.156
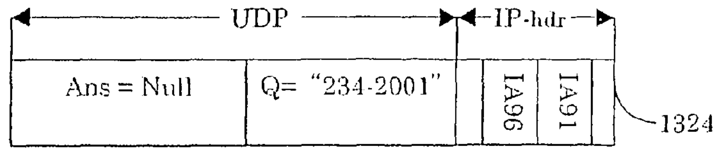
FIG.157
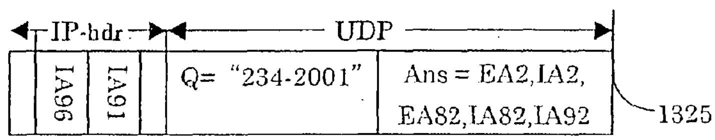
FIG.158
1326-1
| CIC No. | Sender Phone No. | Receiver Phone No. | IP Address | Step | Start Time | End Time |
|---|---|---|---|---|---|---|
| CIC-1 | "1004" | "××" | ×,×,×× · · | ANM | St-1 | |
| CIC-2 | "1001" | "234-2001" | EA1,IA1,EA81,IA81,IA91,EA2,IA2,EA82,IA82,IA92 | IAM | St-2 | |
| · · | · · | · · | · · | · · | · · | · · |
FIG.159
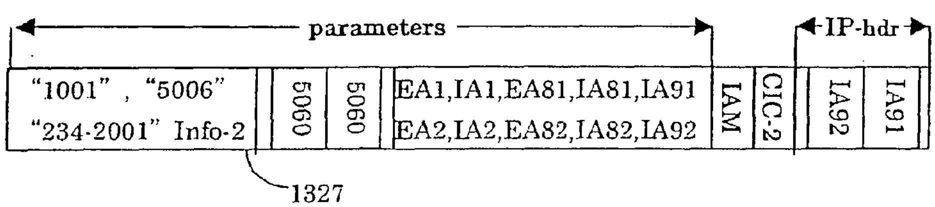
FIG.160
1326-2
| CIC No. | Sender Phone No. | Receiver Phone No. | IP Address | Step | Start Time | End Time |
|---|---|---|---|---|---|---|
| CIC-2 | "1001" | "234-2001" | EA1,IA1,EA81,IA81,IA91,EA2,IA2,EA82,IA82,IA92 | IAM | St-3 | |
| · · | · · | · · | · · | · · | · · | · · |

1326−5

| (MR IP Address) | No. of Using Line | Upper Lim.of Line |
|---|---|---|
| EA1 | 2 | 5 |
| EA6 | 3 | 4 |
| . . | . . | . . |

1326−6

| (MR IP Address) | No. of Using Line | Upper Lim. of Line |
|---|---|---|
| EA7 | 0 | 3 |
| EA2 | 2 | 7 |
| . . | . . | . . |

| Phone No. | Domain Name Expression of Phone No. |
|---|---|
| 1xxx | 1.a. |
| 2xxx | b. |
| 3xxx | c. |
| 1xx | 1.#.a. |
| 2xx | 2.#.a. |
| 3xx | 3.#.a. |
| others | o. |

| Domain Name Expression of Phone No. | IP Address |
|---|---|
| 1.a. | EA1 |
| b. | EA5 |
| c. | EA6 |
| 1.#.a. | EA1 |
| 2.#.a. | EA3 |
| 3.#.a. | EA4 |
| o. | EA81 |

| Phone No. | Domain Name Expression of Phone No. |
|---|---|
| 1xxx | 1.a. |
| 1xx | 1.#.a. |
| 2xx | 2.#.a. |
| 3xx | 3.#.a. |
| others | o. |

| Domain Name Expression of Phone No. | IP Address |
|---|---|
| 1.a. | EA1 |
| 1.#.a. | EA1 |
| 2.#.a. | EA3 |
| 3.#.a. | EA4 |
| o. | EA81 |

| Phone No. | Domain Name Expession of Phone No. |
|---|---|
| 1xxx | a. |
| 2xxx | b. |
| 3xxx | c. |
| others | o. |

| Domain Name Expression of Phone No. | IP Address |
|---|---|
| a. | EA1 |
| b. | EA5 |
| c. | EA6 |
| o. | EA81 |

| Range of Receiver Phone No. | Division | Phone No. of Input GW | Sig. Pt. Code of Input GW |
|---|---|---|---|
| 06-0000-0000～06-9999-9999 | NNI | | #2222 |
| 092-000-0000～092-999-9999 | UNI | 03-4444-4000～ 03-4444-4099 | |
| 045-777-8880～045-777-8890 | UNI | 03-4444-4000～ 03-4444-4099 | |
| 07-0000-0000～07-9999-9999 | UNI | 03-4444-4000～ 03-4444-4099 | |
| 093-000-0000～093-999-9999 | NNI | | #2222 |
| . . | | . . | . . |

\# hex-decimal

| Range of Sender Phone No. | Information of Output Line (IP Add. Range of Output GW/MR) |
|---|---|
| 06-0000-0000～06-9999-9999 | 10.240.240.1～10.240.240.255 |
| 092-000-0000～092-999-9999 | 10.240.241.1～10.240.241.31 |
| 045-777-8880～045-777-8890 | 10.241.1.1 ～ 10.241.1.3 |
| 07-0000-0000～07-9999-9999 | 10.240.240.1～10.240.240.255 |
| 093-000-0000～093-999-9999 | 10.240.241.1～10.240.241.31 |
| . . | . . |

FIG.216
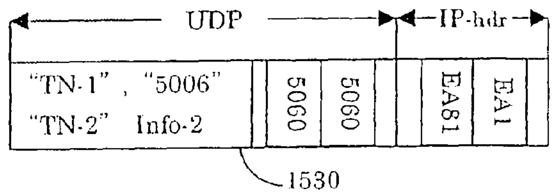
FIG.217
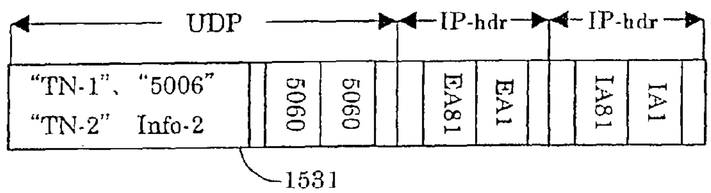
FIG.218
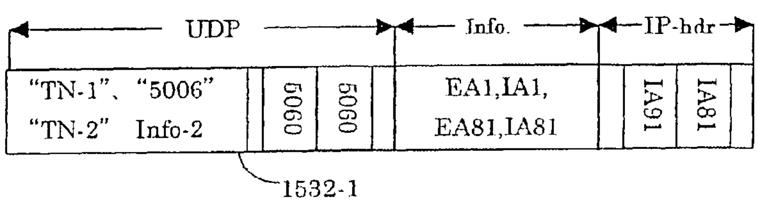
FIG.219
1571-1
| Adr. for Call Control | CIC No. | Step | Phone No. | Address for User | Voice Port No. | TPS Address | Start Time | End Time |
|---|---|---|---|---|---|---|---|---|
| IA91 | | IAM | TN-1 TN-2 | EA1,IA1 | 5006 | EA81,IA 81 | St2 | |
| | ・・ | ・・ | ・・ | ・・ | ・・ | | ・・ | ・・ |

FIG.220
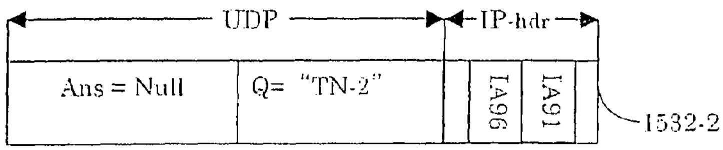
FIG.221
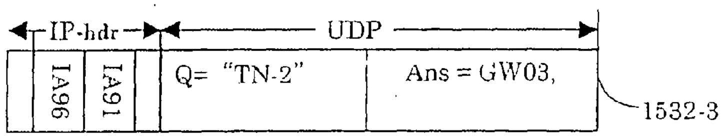
FIG.222
1571-2
| Adr. for Call Control | CIC No. | Step | Phone No. | Address for User | Voice Port No. | TPS Address | Start Time | End Time |
|---|---|---|---|---|---|---|---|---|
| IA91 GW03 | CIC-2 | IAM | TN-1 TN-2 | EA1,IA1 | 5006 | EA81,IA81 | St2 | |
| | . . | . . | . . | . . | . . | | . . | . . |
FIG.223
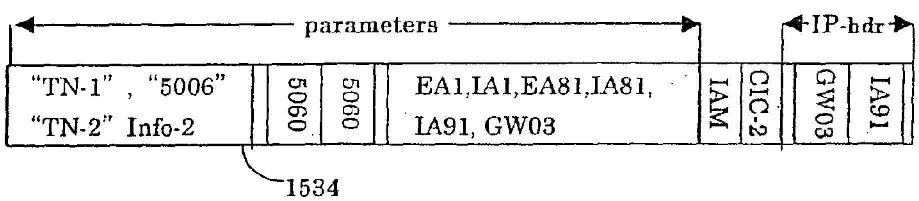
FIG.224
1513-1
| Adr. for Call Control | CIC No. | Step | Phone No. | Address for User | Voice Port No. | TPS Address | Start Time | End Time |
|---|---|---|---|---|---|---|---|---|
| IA91 GW03 | CIC-2 | IAM | TN-1 TN-2 | EA1,IA1 | 5006 | EA81,IA81 | St3 | |
| | . . | . . | . . | . . | . . | | . . | . . |

FIG.225
1527
| Range of Receiver Phone No. | Sig. Pt. Code |
|---|---|
| 02-0000-0000~06-9999-9999 | #1112 |
| 09-0000-0000~09-9999-9999 | #1119 |
| (default) | #1111 |
hex-decimal
FIG.226
1525-1
| No. | PSTN1501 | | | | IPnet1500 | | | MP-id |
|---|---|---|---|---|---|---|---|---|
| 1 | PC-3 | PC-19 | SLS-3 | CIC-3 | GW03 | IA91 | CIC-2 | MP-7 |
| 2 | | | | | | | | |
FIG.227
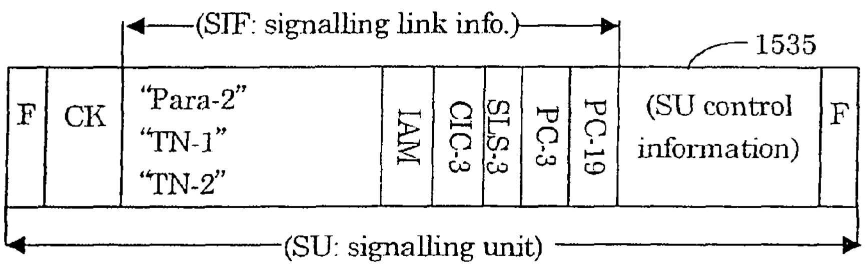
FIG.228
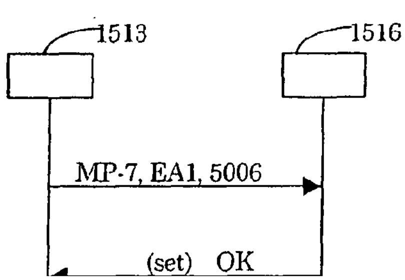
FIG.229
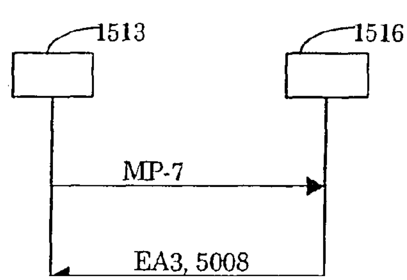

1528-1

| MP-id | IP-addr-d | Port-d | IP-addr-o | Port-o | Channel-S | Channel-R |
|---|---|---|---|---|---|---|
| Null | — | — | — | — | — | — |
| . . | . . | . . | . . | . . | . . | . . |

1528-2

| MP-id | IP-addr-d | Port-d | IP-addr-o | Port-o | Channel-S | Channel-R |
|---|---|---|---|---|---|---|
| MP-7 | | | EA1 | 5006 | CH-1 | |
| . . | . . | . . | . . | . . | . . | . . |

1528-3

| MP-id | IP-addr-d | Port-d | IP-addr-o | Port-o | Channel-S | Channel-R |
|---|---|---|---|---|---|---|
| MP-7 | EA3 | 5008 | EA1 | 5006 | CH-1 | CH-2 |
| . . | . . . | . . | . . | . . | . . | . . |

1513-2

| Adr. for Call Control | CIC No. | Step | Phone No. | Address for User | User Port No. | TPS Address | Start Time | End Time |
|---|---|---|---|---|---|---|---|---|
| IA91<br>GW03 | CIC-2 | IAM | TN-1<br>TN-2 | EA1,IA1<br>EA3,IA3 | 5006<br>5008 | EA81,IA81 | St3 | |
| | · · | · · | · · | · · | · · | | · · | · · |

FIG.236
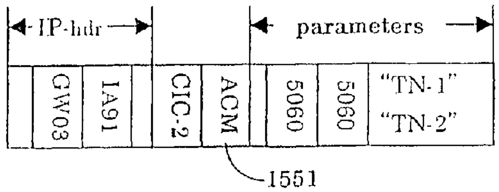
FIG.237
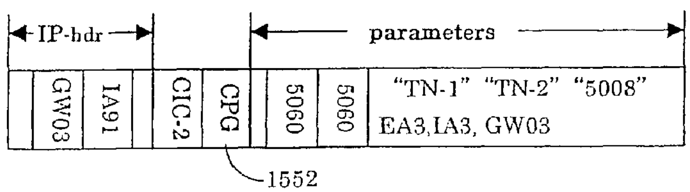
FIG.238
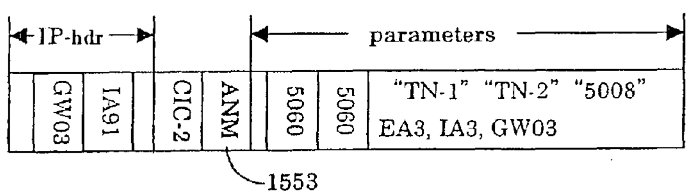
FIG.239
1513-3
| Adr. for Call Control | CIC No. | Step | Phone No. | Address for User | User Port No. | TPS Address | Start Time | End Time |
|---|---|---|---|---|---|---|---|---|
| IA91<br>GW03 | CIC-<br>2 | ANM | TN-1<br>TN-2 | EA1,IA1<br>EA3,IA3 | 5006<br>5008 | EA81,IA81 | St3 | |
| | . . | . . | . . | . . | . . | | . . | . . |

| Range of Receiver Phone No. | Range of IP Address |
|---|---|
| 06-0000-0000~06-9999-9999 | 10.240.240.1~10.240.240.2 |
| 092-000-0000~092-999-9999 | 10.240.241.1~10.240.241.1 |
| 045-777-8880~045-777-8890 | 10.241.1.1 ~ 10.241.1.3 |
| (default) | 10.242.1.1 |

| Range of Receiver Phone No. | Sig. Pt. Code |
|---|---|
| 06-0000-0000~06-9999-9999 | #1111 |
| 092-000-0000~092-999-9999 | #1122 |
| 045-777-8880~045-777-8890 | #3344 |
| (default) | #1113 |

hex-decimal (DPC-3=OPC-2, OPC-3=DPC-2)
(SLS-3=SLS-2,CIC-3=CIC-2,MSG-=ACM)

(S-ad-u=D-ad-x, D-ad-u=S-ad-x)
(CIC-u= CIC-x, MSG-u=ACM)

(DPC-4=OPC-1, OPC-4=DPC-1)
(SLS-4=SLS-1,CIC-4=CIC-1, MSG-4=ACM)

| Adr. for Call Control | CIC No. | Step | Phone No. | Address for User | User Port No. | TPS Address | Start Time | End time |
|---|---|---|---|---|---|---|---|---|
| GW05 | CIC-2 | IAM | TN-1<br>TN-2 | EA5,IA5 | 5010 | | St5 | |
| | . . | . . | . . | . . | . . | | . . | . . |

| Adr. for Call Control | CIC No. | Step | Phone No. | Address for User | User Port No. | TPS Address | Start Time | End Time |
|---|---|---|---|---|---|---|---|---|
| GW06<br>GW05 | CIC-2 | ANM | TN-1<br>TN-2 | <br>EA5,IA5 | <br>5010 | | St6 | |
| | . . | . . | . . | . . | . . | | . . | . . |

| Adr. for Call Control | CIC No. | Step | Phone No. | Address for User | User Port No. | TPS Address | Start Time | End Time |
|---|---|---|---|---|---|---|---|---|
| GW06<br>GW05 | CIC-2 | CPG | TN-1<br>TN-2 | EA6,IA6<br>EA5,IA5 | 5012<br>5010 | | St6 | |
| | . . | . . | . . | . . | . . | | . . | . . |

| Adr. for Call Control | CIC No. | Step | Phone No. | Address for User | User Port No. | TPS Address | Start Time | End Time |
|---|---|---|---|---|---|---|---|---|
| GW05<br>GW06 | CIC-2 | CPG | TN-1<br>TN-2 | EA5,IA5<br>EA6,IA6 | 5010<br>5012 | | St5 | |
| | . . | . . | . . | . . | . . | | . . | . . |

| No. | PSTN1405 | | | | IPnet1400 | | | MP-id |
|---|---|---|---|---|---|---|---|---|
| 1 | | | | | | | | |
| 2 | | | | | | | | |

| No. | PSTN1405 | | | | IPnet1400 | | | MP-id |
|---|---|---|---|---|---|---|---|---|
| 1 | DPC-1 | OPC-1 | SLS-1 | CIC-1 | S-ad-x | D-ad-x | CIC-x | MP-8 |
| 2 | | | | | | | | |

| No. | PSTN1406 | | | | IPnet1400 | | | MP-id |
|---|---|---|---|---|---|---|---|---|
| 1 | | | | | | | | |
| 2 | | | | | | | | |

| No. | PSTN1406 | | | | IPnet1400 | | | MP-id |
|---|---|---|---|---|---|---|---|---|
| 1 | OPC-2 | DPC-2 | SLS-2 | CIC-2 | D-ad-x | S-ad-x | CIC-x | MP-9 |
| 2 | | | | | | | | |

| MP-id | IP-addr-d | Port-d | IP-addr-o | Port-o | Channel-S | Channel-R |
|---|---|---|---|---|---|---|
| MP-8 | EA5 | 5010 | | | CH-1 | CH-2 |
| . . | . . | . . | . . | . . | . . | . . |

| MP-id | IP-addr-d | Port-d | IP-addr-o | Port-o | Channel-S | Channel-R |
|---|---|---|---|---|---|---|
| MP-9 | EA6 | 5012 | EA5 | 5010 | CH-3 | CH-4 |
| . . | . . | . . | . . | . . | . . | . . |

| MP-id | IP-addr-d | Port-d | IP-addr-o | Port-o | Channel-S | Channel-R |
|---|---|---|---|---|---|---|
| MP-8 | EA5 | 5010 | EA6 | 5012 | CH-1 | CH-2 |
| . . | . . | . . | . . | . . | . . | . . |

1620-1

| Source IP address | Source Port No | Dest. IP address | Dest. Port No | Output I/F |
|---|---|---|---|---|
| EA1 | 5060 | EA91 | 5060 | IF1612 |
| EA23 | 5060 | EA91 | 5060 | IF1612 |
| Null | | | | |
| . . | | | | |

1671-1

| Adr.for Call Control | CIC No. | Step | Phone No. | Ext. IP Address | Port No. | Start Time | End Time |
|---|---|---|---|---|---|---|---|
| IA91 | | IAM | TN-1<br>TN-2 | EA1 | 5006 | St6 | |
| | . . | . . | . . | . . | . . | . . | . . |

FIG.282
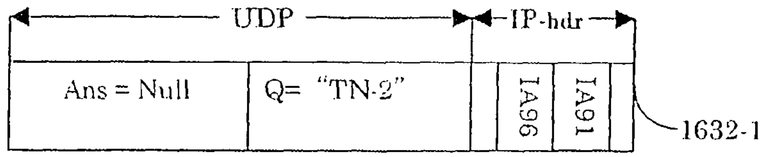
FIG.283
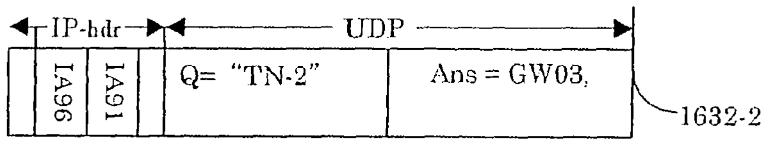
FIG.284
1671-2
| Adr. for Call Control | CIC No. | Step | Phone No. | Ext. IP Address | Port No. | Start Time | End Time |
|---|---|---|---|---|---|---|---|
| IA91 GW03 | CIC-2 | IAM | TN-1 TN-2 | EA1 | 5006 | St6 | |
| | . . | . . | . . | . . | . . | . . | . . |
FIG.285
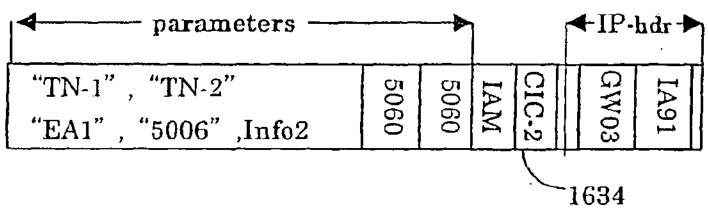
FIG.286
1605-1
| Adr. for Call Control | CIC No. | Step | Phone No. | Ext. IP Address | Port No. | Start Time | End Time |
|---|---|---|---|---|---|---|---|
| IA91 GW03 | CIC-2 | IAM | TN-1 TN-2 | EA1 | 5006 | St7 | |
| | . . | . . | . . | . . | . . | . . | . . |

1627

| Range of Receiver Phone No. | Sig. Pt. Code |
|---|---|
| 02-0000-0000～06-9999-9999 | #1102 |
| 09-0000-0000～09-9999-9999 | #1109 |
| (default) | #1101 |

hex-decimal 1625-1

| No. | PSTN1601 | | | | IPnet1600 | | | MP-id |
|---|---|---|---|---|---|---|---|---|
| 1 | PC-3 | PC-09 | SLS-3 | CIC-3 | GW03 | IA91 | CIC-2 | MP-7 |
| 2 | | | | | | | | |

1628-1

| MP-id | IP-addr-d | Port-d | IP-addr-o | Port-o | Channel-S | Channel-R |
|---|---|---|---|---|---|---|
| MP-7 | | | EA1 | 5006 | CH-1 | |
| . . | . . | . . | . . | . . | . . | . . |

1628-2

| MP-id | IP-addr-d | Port-d | IP-addr-o | Port-o | Channel-S | Channel-R |
|---|---|---|---|---|---|---|
| MP-7 | EA7 | 5008 | EA1 | 5006 | CH-1 | CH-2 |
| . . | . . | . . | . . | . . | . . | . . |

FIG.292
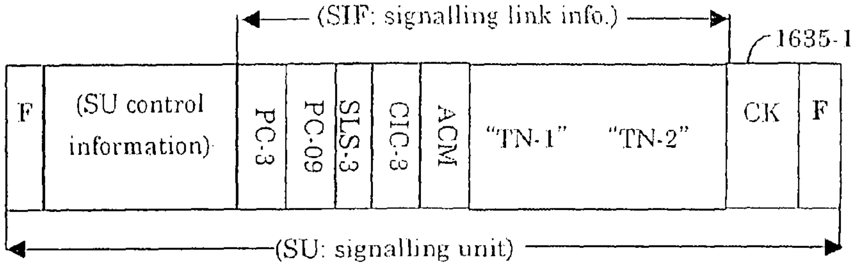
FIG.293
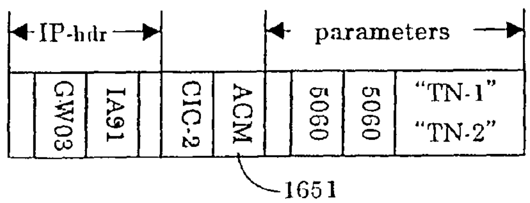
FIG.294
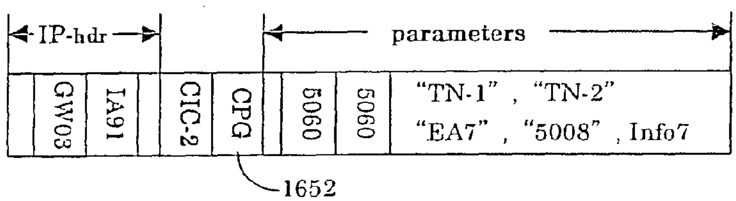
FIG.295
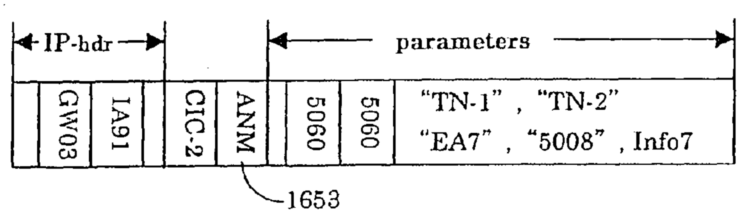
FIG.296
1605-2
| Adr. for Call Control | CIC No. | Step | Phone No. | Ext. IP Address | Port No. | Start Time | End Time |
|---|---|---|---|---|---|---|---|
| IA91<br>GW03 | CIC-2 | ANM | TN-1<br>TN-2 | EA1<br>EA7 | 5006<br>5008 | St7 | |
| | . . | . . | . . | . . | . . | . . | . . |

FIG.297
1671-3
| Adr. for Call Control | CIC No. | Step | Phone No. | Ext. IP Address | Port No. | Start Time | End Time |
|---|---|---|---|---|---|---|---|
| IA91<br>GW03 | CIC-2 | ANM | TN-1<br>TN-2 | EA1<br>EA7 | 5006<br>5008 | St6 | |
| | . . | . . | . . | . . | . . | . . | . . |
FIG.298
1620-2
| Source IP address | Source Port No | Dest. IP address | Dest. Port No | Output I/F |
|---|---|---|---|---|
| EA1 | 5060 | EA91 | 5060 | IF1612 |
| EA23 | 5060 | EA91 | 5060 | IF1612 |
| EA1 | 5006 | EA7 | 5008 | IF1614 |
| Null | | | | |
| . . | | | | |
FIG.299
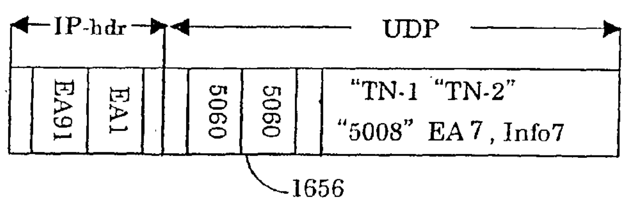
FIG.300
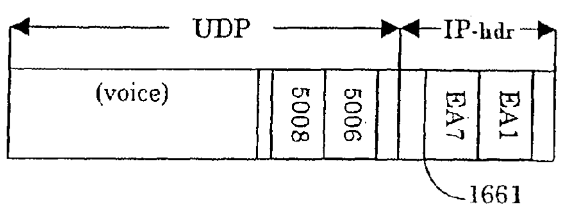

FIG.301
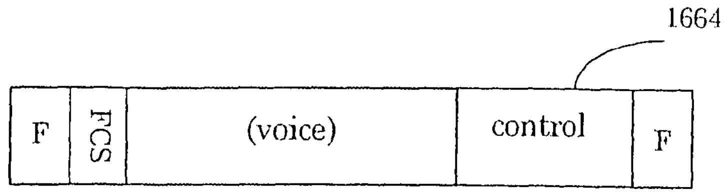
FIG.302
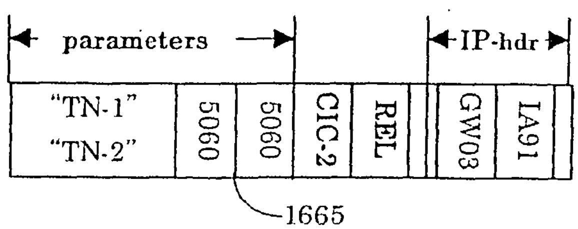
FIG.303
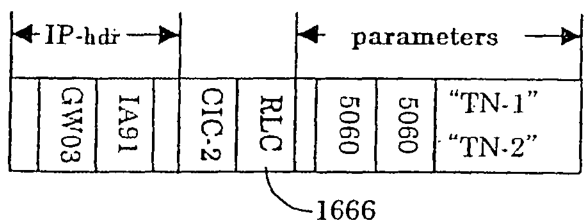
FIG.304
1620-3
| Output I/F | Port No |
|---|---|
| IF1612 | 5060 |
| IF1614 | From 5004 to5048, |
| . . | . . |

FIG.307
1711-1
| Address for Call Control | CIC No. | Step | Phone No. | Ext. IP Address | Port No. | Start Time | End Time |
|---|---|---|---|---|---|---|---|
| D-ad-4 S-ad-4 | CIC-4 | IAM | TN-1 TN-2 | EA1722 | 5014 | St5 | |
FIG.308
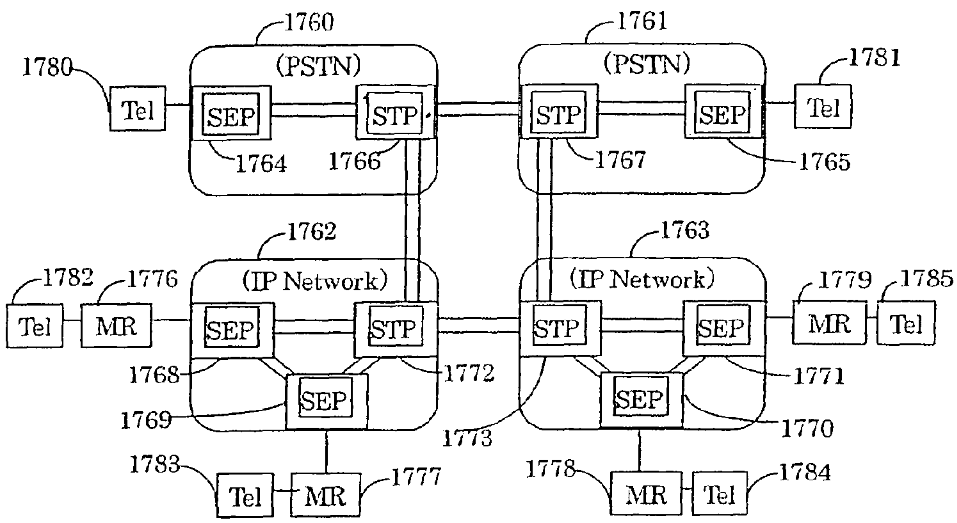
FIG.309
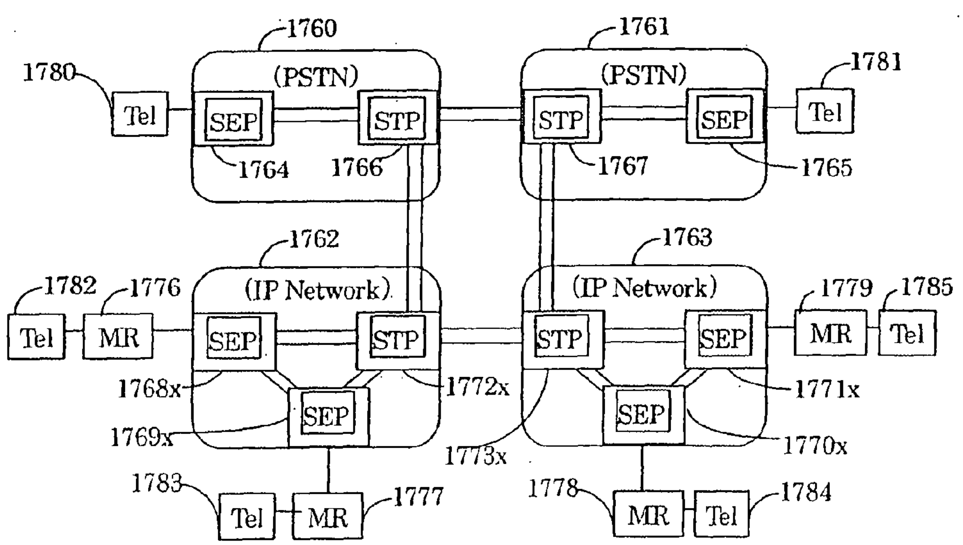

1869

| | N1801 | N1802 | N1803 | N1804 | N1805 | R1807 | R1808 | R1809 | · |
|---|---|---|---|---|---|---|---|---|---|
| N1801 | | | | | | 1 | | 2 | · |
| N1802 | | | | | | 2 | | 1 | · |
| N1803 | | | | | | | 1 | | · |
| N1804 | | | | | | | 4 | 1 | · |
| N1805 | | | | | | | | 1 | · |
| R1807 | 1 | 2 | | | | | 1 | 3 | |
| R1808 | | | 1 | 4 | | 1 | | 3 | · |
| R1809 | 2 | 1 | | 1 | 1 | 3 | 3 | | |
| · · | · · | · · | · · | · · | · · | · · | · · | · · | · |

(note: blank = no connection)

1870

| | |
|---|---|
| N1801 | T1810−2 |

1871

| | |
|---|---|
| N1803 | T1810−11、T1810−13 |
| N1804 | T1810−14 |
| N1805 | T1810−17、T1810−18 |

1811-2

| | | | | | |
|---|---|---|---|---|---|
| I01 | E01 | M2 | IM2 | G02,G03 | 0 |

1813-2

| | | | | | |
|---|---|---|---|---|---|
| IM2 | M2 | E01 | I01 | 0 | F10,F12 |

1814-2

| | | | | | |
|---|---|---|---|---|---|
| IM2 | M2 | E01 | I01 | 0 | F14 |

1815-2

| | | | | | |
|---|---|---|---|---|---|
| IM2 | M2 | E01 | I01 | 0 | F17,F18 |

1817-2

| | |
|---|---|
| IM2 | G12 |

1818-2

| | |
|---|---|
| IM2 | G27 |

1819-2

| | |
|---|---|
| IM2 | G21,G22 |

| Here | There | | Int-PK Output I/F | Ext-PK Output I/F |
|---|---|---|---|---|
| I01 | M2 | IM2 | G02,G03 | 0 |
| I04 | . . | . . | G01 | F01 |
| I01 | E26 | I26 | G03 | F02 |
| I05 | E27 | I27 | G03 | F03 |
| I01 | E20 | I20 | G02 | F02 |
| I05 | E24 | I24 | G03 | F03 |
| . . | . . | . . | . . | . . |

| Here | | | There | | | Int-PK Out I/F | Ext-PK Out I/F |
|---|---|---|---|---|---|---|---|
| I-adr | Mask | E-adr | Mask | E-adr | I-adr | | |
| I01 | M-h01 | E01x | M-t2 | M2x | IM2 | G02,G03 | 0 |
| I04 | M-h04 | E04x | . . | . . | . . . | G01 | F01 |
| I01 | M-h01 | E01x | M-t26 | E26x | I26 | G03 | F02 |
| I05 | M-h05 | E05x | M-t27 | E27x | I28 | G03 | F03 |
| I01 | M-h01 | E01x | M-t20 | E20x | I20 | . . | . . |
| I05 | M-h05 | E05x | M-t24 | E24x | I24 | . . | . . |
| . . | . . | . . | . . | . . | . . | . . | . . |

| Here | | There | | Int-PK Output I/F | Ext-PK Output I/F |
|---|---|---|---|---|---|
| I01 | E01 | M2 | IM2 | MT-1 | 0 |
| I04 | E04 | . . | . . | G01 | F01 |
| I01 | E01 | E26 | I26 | G03 | F02 |
| I05 | E05 | E27 | I28 | G03 | F03 |
| I01 | E01 | E20 | I20 | . . | . . |
| I05 | E05 | E24 | I24 | . . | . . |
| . . | . . | . . | . . | . . | . . |

| | |
|---|---|
| MT-1 | G02,G03 |
| . . | . . |

| Here | | There | | Int-PK output | Ext-PK output |
|---|---|---|---|---|---|
| I05 | E05 | M5 | IM5 | . . | 0 |
| I05 | E05 | E92 | I92 | . . | F05 |
| I05 | E05 | E94 | I94 | . . | F05 |
| I05 | E05 | E96 | I96 | . . | F05 |
| I08 | E08 | E92 | I92 | . . | F08 |
| I08 | E08 | E94 | I94 | . . | F08 |
| I08 | E08 | E96 | I96 | . . | F08 |
| I08 | E08 | E05 | I05 | . . | F08 |
| I05 | E05 | E08 | I08 | . . | F05 |
| I09 | E09 | E44 | I44 | . . | F09 |
| . . | . . | . . | . . | . . | . . |

GIG.358
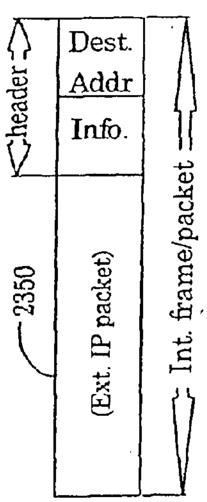
FIG.359
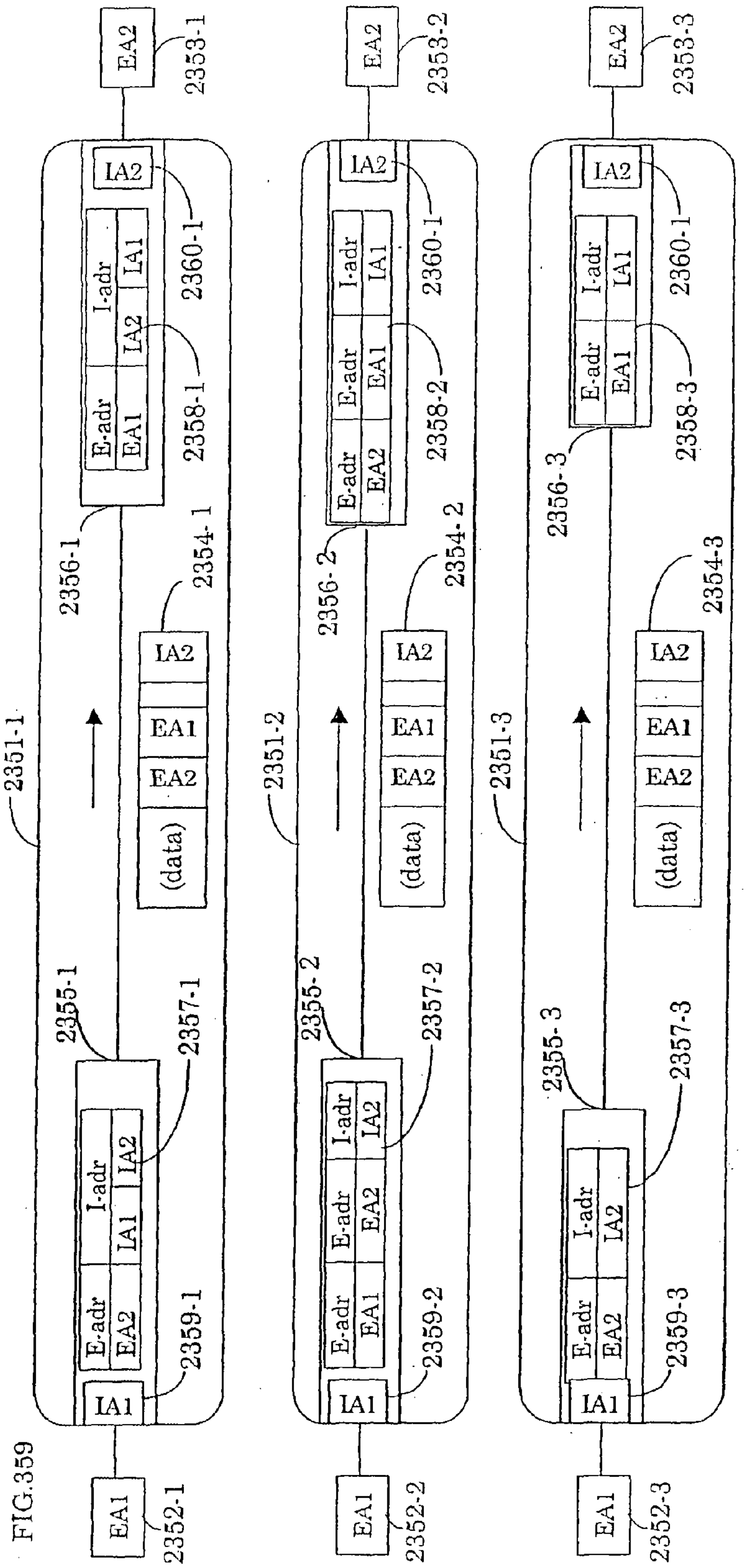

TERMINAL-TO-TERMINAL COMMUNICATION CONNECTION CONTROL METHOD USING IP TRANSFER NETWORK

CROSS-REFERENCE TO RELATED APPLICATIONS

This application is a divisional of U.S. application Ser. No. 09/827,267, filed on Apr. 5, 2001, now U.S. Pat. No. 7,301, 952, which claims priority to Japanese Application No. 2000-105023 filedon Apr. 6, 2000; Japanese Application No. 2000-179234 filed on Jun. 15, 2000; Japanese Application No. 2000-367085 filed on Dec. 1, 2000; Japanese Application No. 2000-382682 filed on Dec. 15, 2000; and Japanese Application No. 2001-031448 filed on Feb. 7, 2001, each of which is incorporated herein by reference.

BACKGROUND OF THE INVENTION

1. Field of the Invention

The present invention is related to a terminal-to-terminal (inter-terminal) communication connection control method using an IP(Internet Protocol) transfer network, which is applicable to an IP communication established between two terminal units such as an IP terminal, an IP telephone, and a voice/image apparatus(audio/visual apparatus), and also applicable to a 1: n type IP communication utilizing a multicast IP technique.

2. Description of the Prior Art

As a method capable of realizing various terminal-to-terminal communications such as mail transmissions/receptions, telephone, and image communications while an IP transfer network is utilized, Japanese Patent Application No. 128956/1999 (will be referred to as a "prior patent application" hereinafter) has been filed by the Applicant. This prior patent application discloses the method of realizing "integrated IP transfer network" containing therein a plurality of IP transfer networks having various characteristics, while separating these IP transfer networks. These IP transfer networks are known as an IP telephone network, an IP image network, and IP electronic data general-purpose network. To realize the IP transfer network for uniting various sorts of terminal-to-terminal communications, contents disclosed by the above-explained prior patent application will now be briefly explained with reference to FIG. 1.

Inside integrated IP transfer network 901, a plurality of IP transfer networks having different characteristics such as the IP image network 902, the IP electronic data general-purpose network 903, and the IP telephone network 904 are virtually installed. While the address management tables are set inside the network node apparatus 905-X and the network node apparatus 905-Y, which are provided at the input points to the integrated IP transfer network 901 from the external unit for the integrated IP transfer network 901, the address of the terminal unit is previously registered into the address management table. Since the address written into the IP packet entered into the integrated IP transfer network 901 is compared with the address registered in the address management table, the IP packets can be transmitted, while these IP packets are separated to the individual IP transfer networks within the integrated IP transfer network 901.

Next, in connection with the present invention, the terminal-to-terminal communication connection control method (No. 7-common line signal system) employed in a public switched telephone network(PSTN) will now be simply explained.

In FIG. 2, reference numerals 98-1 and 98-3 show exchangers (subscriber exchangers) to which telephone sets are connected, reference numeral 98-2 indicates a relay exchanger, and also reference numerals 98-4 and 98-5 represent telephone sets. Reference numerals 98-6 to 98-8 show communication path control units of the exchangers, reference numerals 98-9 to 98-11 indicate internal control units of the exchangers, and also reference numerals 98-12 to 98-14 indicate signalling points for controlling terminal-to-terminal connections of telephone sets. The internal control units of the exchangers perform information exchanges used to set/recover communication lines between the communication path control units and the signalling points in conjunction with the internal operation controls of the exchangers.

In particular, reference numerals 98-12 and 98-14 will be referred to as signalling end points(SEP). More specifically, reference numeral 98-13 is called as a signalling transfer point(STP). Also, reference numeral 98-15 denotes another signalling end point. These signalling end points 98-12 to 98-15 are connected via signal lines 98-24 to 98-27 to a signal network 98-16. While information used to control terminal-to-terminal communication connections and also execute maintenance/operations of networks is stored into a signalling unit (SU), these signalling end points 98-12 to 98-15 mutually transmit/receive the stored information to each other. A 16-bit point code(PC) is applied to one signalling end point in order to discriminate the own signalling end point from another signalling end point. On the other hand, reference numerals 98-21 to 98-22 show communication lines used to transfer telephone voice (speech), but not used to transfer information for controlling terminal-to-terminal communication connections. The telephone lines 98-20 and 98-23 correspond to interfaces (UNI) through which a combination between voice and control information of terminal-to-terminal communication connections is transferred in an integral form. Namely, both the voice and the control information of terminal-to-terminal communication connections are transferred through the interfaces without being separated from each other. The No. 7-common line signal system is featured by that the signal lines 98-24 to 98-26 are separated from the communication lines 98-21 and 98-22 inside the public switched telephone network (PSTN).

A signalling unit indicated in FIG. 3 contains a "destination point code (DPC)", an "origin point code (OPC)", a "circuit identification code (CIC)", a "message type (MSG)" and a parameter of the message.

The destination point code shows a destination to which a signalling unit is transmitted, the origin point code indicates a transmission source of a signalling unit, and the circuit identification code represents an identification number for identifying a communication line set between a transmission source signal point and a destination signal point. As the message, for example, there are IAM, ACM, CPG, ANM, REL, RLC, SUS, RES and CON, which are used to control terminal-to-terminal communication connections. Such a signalling unit which is written as "IAM" into a message area of the signalling unit is referred to as an initial address message (IAM). Similarly, such a signalling unit which is written as "ACM" into the message area of the signalling unit is referred to as an address completion message (ACM), such a signalling unit which is written as "CPG" into the message area of the signalling unit is referred to as a call pass message (CPG), and also such a signalling unit which is written as "ANM" into the message area of the signalling unit is referred to as an answering message (ANM). Similarly, such a signalling unit which is written as "REL" into the message area of the signalling unit is referred to as a release message (REL), such a signalling unit which is written as "PRLC" into the message area of the signalling unit is referred to as a release completion message (RLC), and also such a signalling unit which is written as "SUS" into the message area of the signalling unit is referred to as an interrupt message (SUS). Similarly, such a signalling unit which is written as "RES" into the message area of the signalling unit is referred to as a restart message (RES), and such a signalling unit which is written as "CON" into the message area of the signalling unit is referred to as a connection message (CON).

Referring now to FIG. 2, a description will be made of a method for controlling a terminal-to-terminal connection control by which a telephone communication is established from the telephone set 98-4 via the exchangers 98-1, 98-2, 98-3 to the telephone set 98-5, as shown in FIG. 2. It should be noted that the respective signalling points exchange such a signalling unit via the signal lines 98-24 to 98-27 and the common line signal network 98-16 to each other. In the signalling unit, the signalling point codes applied to the respective signalling points are set as addresses indicative of designations and transmission sources. The telephone set 98-4 is connected via the telephone line 98-20 to the exchanger 98-1. The terminal-to-terminal connection control of the telephone set 98-4 is loaded to the signalling point 98-12 within the exchanger 98-1. Similarly, the telephone set 98-5 is connected via the telephone line 98-23 to the exchanger 98-3. The terminal-to-terminal connection control of the telephone set 98-5 is loaded to the signalling point 98-14 within the exchanger 98-3.

When a user issues a call request from the telephone set 98-4, the signalling point 98-12 receives this call request (Step X1 of FIG. 4), and a communication line is determined by using a destination telephone number received from the telephone number 98-4 because of the functions of both the communication path control unit 98-6 and the exchanger internal control unit 98-9 of the exchanger 98-1. A signalling unit into which a circuit line identifier (CIC) of the determined communication line is written is formed as an initial address message (IAM). In the parameter area of the initial address message (IAM), at least the telephone number of the telephone set 98-5, namely a destination telephone number "Tel-No-98-5" is written. Furthermore, the telephone number of the telephone 98-4, namely, a telephone number of a transmission source "Tel-No-98-4" may be written thereinto.

Next, the signalling point 98-12 sends the initial address message (IAM) for issuing the telephone call to the signalling point 98-13 provided in the exchanger 98-2 (Step X2). The initial address message IAM contains a line number "98-4-98-5" of a communication line corresponding to the logic communication line inside the telephone communication line 98-21, the destination telephone number "Tel-No-98-5", the transmission source telephone number "Tel-No-98-4" (omittable option), and the like. After the signalling point 98-12 has sent the IAM, the operation of the signalling point 98-12 is advanced to a waiting condition for an address completion message (ACM: will be explained later), and also initiates an ACM waiting timer.

The signalling point 98-13 provided within the exchanger 98-2 receives the above-explained IAM, and then notifies the line number "98-4-98-5" via the exchanger internal control unit 98-10 to the telephone communication line control unit 98-7. The telephone communication line control unit 98-7 executes a conducting test in order that the telephone communication line 98-21 can be used for the telephone communication. The signalling point 98-13 sends the IAM to the signalling point 98-14 provided in the exchanger 98-3 (step X3). The signalling point 98-14 checks the content of the received IAM in order that the telephone communication line 98-22 can be used for the telephone communication via the control unit 98-11 and the telephone communication line control unit 98-8. Furthermore, while the signalling point 98-14 connects the telephone set 98-5 to the exchanger 98-3, this signalling point 98-14 checks as to whether or not a call reception is permitted. When the call reception is allowed, the signalling point 98-14 issues a call setting request to the telephone set 98-5 (Step X4). Further, the signalling point 98-14 returns such an address completion message (ACM) which notifies that the IAM is received (Step X5). The ACM message is reached via the signalling point 98-13 to the signalling point 98-12 (Step X6). Upon receipt of the ACM message, the signalling point 98-12 stops the counting operation of the ACM waiting timer which has been set. In such a case that the counting operation of the ACM waiting timer is completed at a time instant before the ACM message is received, the telephone communication line is released.

When the signalling point 98-14 within the exchanger 98-3 receives information for implying such a fact that the calling request is being received from the telephone set 98-5 (Step X7), the signalling point 98-14 transmits the call pass message(CPG) to the signalling point 98-13 (Step X8). The signalling point 98-13 transmits the received CGP to the signalling point 98-12 (Step X9). The signalling point 9-12 within the switching point 98-1 receives the CPG message. Next, the signalling point 98-12 sends a calling sound to the telephone set 99-4 (Step X10). When the telephone set 98-5 responds to the above-described call setting request (Step X11), the telephone communication line 98-23 between the telephone set 98-5 and the exchanger 98-4 can be used for the telephone communication, and further the response message (ANM) for indicating that the telephone set 98-5 responds to the call setting request is sent to the signalling point 98-13 (Step X12).

The signalling point 98-13 transmits the received ANM to the signalling point 98-12 (Step X13), the signalling point 98-12 notifies stopping of the calling sound under transmission to the telephone set 98-4 (Step X14), and thus, telephone voice (speech) can be transmitted/received between the telephone set 98-4 and the telephone set 98-5. The operation is advanced to a telephone communication phase (Step X15). In the case that the handset of the telephone set 98-4 is put on (on-hook), the release request (REL) is sent out (Step X16), and the signalling point 98-12 receives the release request (REL), the signalling point 98-12 sends out a next release request (REL) to the signalling point 98-13 (Step X17), and furthermore, notifies to the telephone set 98-4, such a release completion (RLC) for indicating that the telephone communication line is brought into an empty state (Step X18). Then, upon receipt of the release request (REL), the signalling point 98-13 sends out the next release request (REL) to the signalling point 98-14 (Step X19), and further, notifies such a release completion (RLC) for indicating that the telephone communication line is brought into the empty state to the signalling point 98-12 (Step X20). Then, upon receipt of the release request (REL), the signalling point 98-14 sends out the next release request (REL) to the telephone set 98-5 (Step X21), and further, notifies such a release completion (RLC) for indicating that the telephone communication line is brought into the empty state to the signalling point 98-13 (Step X22). There are several variations in the sequential operations of the terminal-to-terminal communication connection controls which are transmitted/received between the telephone set 98-4 and the signalling point 98-12, and also between the signalling point 98-14 and the telephone set 98-15, depending upon sorts of telephone sets. For instance, a confirmation notification with respect to a release completion may be issued from the telephone set 98-4 to the signalling point 98-12 just after the above-explained Step X18. Alternatively, a confirmation notification with respect to the release completion may be issued from the signalling point 98-14 to the telephone set 98-5 just after the Step X23.

FIG. 5 is an explanatory diagram for explaining another control method for controlling terminal-to-terminal connections by which a telephone communication is made from the telephone set 98-4 via the exchanger 98-1 through the exchanger 98-3 to the telephone set 98-5. This terminal-to-terminal communication connection control method corresponds to such a communication connection control method made by eliminating the process operations defined at the Steps X5 and X6 (namely, by eliminating address completion message ACM) from the terminal-to-terminal communication connection control method as explained in FIG. 4. It should be understood that at the Step X2, the signalling point 98-12 sets the CPG waiting timer instead of the above-explained ACM waiting timer, and the signalling point 98-12 stops the CPG waiting timer after the Step X9. The above-explained terminal-to-terminal communication connection control method is such a control method applied to such a case that the exchanger is not an ISDN exchanger, but is an analog exchanger.

FIG. 6 is an explanatory diagram for explaining another method of controlling terminal-to-terminal communication connections between the telephone set 98-4 and the telephone set 98-5. This terminal-to-terminal communication connection control method corresponds to such a control method example that in the above-described terminal-to-terminal communication connection control method, a series of process steps for interrupting a telephone communication without waiting for the response completion message (Step X14) and the telephone communication phase (Step X15) is carried out (Step X16 to Step X23).

FIG. 7 is an explanatory diagram for explaining a further control method for controlling terminal-to-terminal communication connections by which a telephone communication is made from the telephone set 98-4 via the exchanger 98-1 through the exchanger 98-3 to the telephone set 98-5. This terminal-to-terminal communication connection control method corresponds to such a control method. That is, while a telephone communication is carried out (Step X15), the handset of the telephone set 98-4 is positioned only for a short time period(on hook), and an interrupt message is transmitted in order to temporarily stop the telephone communication (Steps X30 to X33). Then, the handset is returned to the original setting position(off hook), and the restart message for restarting the telephone communication is transmitted (Steps X35 to X38), and thus, the process operation is returned to the telephone communication (Step X39). The subsequent steps of the release (REL) and the release completion (RLC) are similar to those as explained with reference to FIG. 5 (Steps X40 to X47).

Next, with respect to the IP telephone communication, there is proposed "multimedia communication system based on JT-H323" of TTC standard, which is described in, for instance, ITU-T recommendation H323 ANNEX D regulation (version of April, 1999). The technical idea "SIGNALLING PROTOCOL AND PACKETING. OF MEDIA SIGNAL" by which the call connections are controlled in the multimedia terminal-to-terminal communication is defined as JT-H225. Also, the technical idea "CONTROL PROTOCOL FOR MULTIMEDIA COMMUNICATION" in the multimedia terminal-to-terminal communication is defined as JT-H245.

Next, referring to FIG. 8 to FIG. 11, the basic functions of the JT-H323 gateway defined by ITU will be described. The present invention also refers to the basic functions.

In FIG. 8, a block 800 indicates the JT-H323 gateway. In this gateway 800, a voice(speech) signal and/or an image (picture) signal entered from an SCN line 801 is converted into a digital signal in an SCN terminal function 802, a data format and/or a signal transmission/reception rule is converted in a conversion function 803, and then, the data format is converted into the format of the IP packet in a terminal function 804. The resulting IP packet is sent out to an IP communication line 805. Also, as to a packet flow along an opposite direction, namely, an IP packet containing voice (speech) data and/or image data entered from the IP communication line 805 is decoded in a digital data format by the terminal function 804, and a data format and/or a signal transmission/reception rule are converted by the conversion function 803. The resultant digital data is converted into a signal flowing through the SCN line by the SCN terminal function 802 and sent to the SCN line 801. In this case, both a voice signal and an image signal may be separated into both "call control data" and "net data." This call control data is used so as to send/receive a telephone number with respect to a communication third party. The net data constitutes voice and/or images itself. Through a communication line 805, an IP packet 810 (refer to FIG. 9) functioning as the call control data flows, an IP packet 811 (refer to FIG. 10) functioning as the net data which constitutes the voice itself flows, and an IP packet 812 (refer to FIG. 11) functioning as the net data which constitutes the image itself flows. In the case of an ISDN line, the SCN terminal function 802 corresponds to a data line terminating apparatus(DSU). Also, the terminal function 804 owns such a terminal communication function required for the bidirectional(interactive) communication between the JT-323 telephone set and the JT-323 voice/image apparatus.

Next, the integrated information communication network proposed in Japanese Patent No. 3084681-B2 closely related to the terminal-to-terminal communication connection control method of the present invention will now be briefly explained with reference to FIG. 12.

A block 191 shows an integrated IP communication network, an IP terminal 192-1 owns an IP address "EA01", and another IP terminal 192-2 owns an IP address "EA02". This example corresponds to such an example that an external IP packet 193-1 is transferred from the IP terminal 192-1 via the integrated IP communication network to the IP terminal 192-2. Both the IP addresses "EA01" and "EA02" are referred to as "external IP addresses", since these IP addresses are used outside the integrated IP communication network 191. In FIG. 12 to FIG. 15, as to head portions of IPs, only IP address portions are described, and other items are omitted.

When the network node apparatus 195-1 receives the external IP packet 193-1, this network node apparatus 195-1 confirms that the internal IP address is equal to "IA01", and the destination external IP address of the IP packet 193-1 is equal to "EA02". The internal IP address is applied to the terminal unit (logic terminal) of the logic communication line 194-1 into which the IP packet 193-1 is entered. Then, the network node apparatus 195-1 retrieves the content of the address management table 196-1 shown in FIG. 12, and retrieves such a record in which the internal IP address of the transmission source is equal to "IA01" in the beginning, and thereafter, the destination external IP address is equal to "EA02". Furthermore, the network node apparatus 195-1 checks as to whether or not the external IP address "EA01" of the transmission source within the IP packet 193-1 is contained in the previously detected record. It should be understood that such a check operation as to whether or not the external IP address "EA01" of the transmission source within the IP packet 193-1 is contained in the previously-detected record may be omitted.

In the present example, while it is such a record containing the IP addresses "EA01, EA02, IA01, IA02" on the second row from the top row, an IP packet 193-2 having such an IP header is formed(namely, IP packet is encapsulated) using the IP addresses "IA01" and "IA02" located inside the record. The IP header is such that the transmission source IP address is "IA01", and the destination IP address is "IA02". In this case, symbols "IA01" and "IA02" are called as internal IP addresses of the integrated IP communication network 191. The internal IP packet 193-2 is reached through the routers 197-1, 197-2 and 197-3 to the network node apparatus 195-2. The network node apparatus 195-2 removes the IP header of the received internal IP packet 193-2 (anti-encapsulation of IP packet), sends out the acquired external IP packet 193-3 to the communication line 194-2, and then, the IP terminal 192-2 receives the external IP packet 193-3. Is should also be noted that 197-6 is an example of such a server that the external IP address is "EA81", and the internal IP address is "IA81".

FIG. 13 indicates another embodiment of an address management table. That is, the address management table 196-1 of FIG. 12 is replaced by an address management table 196-3 of FIG. 13, the address management table 196-2 of FIG. 12 is replaced by an address management table 196-4 of FIG. 13, and other portions are identical to those of the above-explained address management table. The known address mask technique may be applied to the address management tables 196-3 and 196-4.

In the beginning, the record of the address management table 196-3 containing the internal IP address "IA01" is retrieved. This internal IP address is applied to the logic terminal of the terminal unit of the communication line 194-1. In this case, both the record of the first row at the record of the second row in the address management table 196-3 from the top row correspond to the records of interest. With respect to the record of the first row, a check is made as to whether or not an AND-gating result between a destination-use external IP mask "Mask81" and the destination external IP address "EA02" within the external IP packet 193-1 is coincident with a destination external IP address "EA81*x*" within the first row record(refer to the below-mentioned formula (1)). In this case, the AND-gating result is not coincident with the external IP address "EA81*x*". With respect to the record of the second row, a check is made as to whether or not an AND-gating result between a destination-use external IP mask "Mask2" and the destination external IP address "EA02" within the external IP packet 193-1 is coincident with a destination external IP address "EA02*y*" within the second row record(refer to the below-mentioned formula (2)). In this case, the AND-gating result is coincident with the external IP address "EA02*y*". Also, with respect to the transmission source IP address, a comparison is made in accordance with the below-mentioned formula (3) in a similar manner:

If ("Mask81" and "EA02"="EA81x") (1)

If ("Mask2" and "EA02"="EA02y") (2)

If ("Mask1y" and "EA01"="EA01y") (3)

Based upon the above-explained comparison result, the record of the second row is selected, and both the internal records "IA01" and "IA02" contained in the record of the second row are employed so as to perform the encapsulation, so that the internal IP packet 193-2 is formed. It should be noted that the comparison using above-mentioned formula (3) can not be made when the regions of both the transmission source external IP address and the address mask in the record of the address administration table 196-3 are omitted.

FIG. 14 indicates a further embodiment of an address management table. That is, the address management table 196-1 of FIG. 12 is replaced by an address management table 196-5 of FIG. 14, the address management table 196-2 of FIG. 12 is replaced by an address management table 196-6 of FIG. 14, and other portions are identical to those of the above-explained address management table. In this example, the address management tables 196-5 and 196-6 do not contain the transmission source external IP addresses, and the transmission source external IP address is not cited in the IP encapsulation. When the IP packet 193-1 is encapsulated, the destination internal IP address "IA02" is determined based upon the transmission source internal IP address "IA01" and the destination external IP address "EA02" inside the address management table 196-5.

FIG. 15 illustratively shows a further embodiment of the address management table. This embodiment corresponds to such an embodiment that the integrated IP communication network of FIG. 12 is replaced by an optical network, and the internal IP packet is substituted by an internal optical frame. This further embodiment will now be briefly explained. In this drawing, a block 191*x* indicates an IP packet transfer network, and also represents an optical network in which an IP packet is transferred by employing an optical frame. The optical frame is transferred to an optical communication path provided inside the optical network 191*x*. This optical communication path is equal to such a function of a communication-1 layer and a communication-2 layer. An optical link address is applied to a header portion of an optical frame. In such a case that the optical frame corresponds to an HDLC frame, the optical link address corresponds to an HDLC address employed in the HDLC frame.

An IP terminal 192-1*x* owns an IP address "EA1", and another IP terminal 192-2*x* owns an IP address "EA2". This example corresponds to such an example that an external IP packet 193-1*x* is transferred from the IP terminal 193-1*x* via the optical network 191*x* to the IP terminal 192-2*x*. In FIG. 15, only IP address portion is described as to a header portion of an IP, only header portion is similarly described as to an optical frame, and other items are omitted.

When the network node apparatus 195-1*x* receives the external IP packet 193-1*x*, this network node apparatus 195-1*x* confirms such a fact that an internal optical link address is equal to "IA1", and an external destination IP address of the IP packet 193-1*x* is equal to "EA2", and the internal optical link address is applied to a termination unit (logic terminal) of a logic communication line 194-1*x* into which the IP packet 193-1*x* is inputted. Then, the network node apparatus 195-1*x* retrieves a content of an address administration table 196-1*x* shown in FIG. 15, and also retrieves a record containing such addresses that an internal optical link address of a transmission source corresponds to "IA1" in the beginning, and subsequently, an external destination IP address corresponds to "EA2". Furthermore, the network node apparatus 195-1 checks as to whether or not the transmission source external IP address "EA1" contained in the IP packet 193-1*x* is included in the above-detected record. Alternatively, the checking operation as to whether or not the transmission source external IP address "EA1" contained in the IP packet 193-1*x* is included in the detected record may be omitted.

In this example, while the record is equal to such a record containing addresses of "EA1, EA2, IA1, IA2" on the second column from the top column, an optical frame 193-2*x* is produced by employing to optical link addresses "IA1" and "IA2" present inside the record(namely, IP packet is capsulated). This optical frame 193-2*x* owns such a header that the optical link address of the transmission link address is "IA1" and the optical link address of the destination is "IA2". In this case, symbols "IA1" and "IA2" correspond to internal addresses of the optical communication network 191*x*. The internal optical frame 193-2*x* is reached to the network node apparatus 195-2*x* via routers 197-1*x*, 197-2*x* and 197-3*x*, which own an optical frame transfer function. The network node apparatus 195-2*x* removes a header of the received internal optical frame 193-2*x* (namely, optical frame is inverse-capsulated), sends out the acquired external IP packet 193-3*x* to a communication line 194-2*x*, and the IP terminal 192-2*x* receives an external IP packet 193-3*x*.

In accordance with the present invention, while IP addresses are applied to an IP telephone set, a media router (will be explained later), and various sorts of servers (these appliances will be referred to as "IP transmittable/receivable nodes" hereinafter), the IP packets are transmitted/received, so that the data may be exchanged in a mutual manner. These appliances will be referred to as "IP communication means". FIG. 15 shows such an example that while an IP transmittable/receivable node 340-1 and another IP transmittable/receivable node 340-2 own IP addresses "AD1" and "AD2" respectively, an IP packet 341-1 having the transmission source IP address "AD1" and the destination IP address "AD2" is transmitted from the terminal 340-1 to the terminal 340-2. Also, both the IP transmittable/receivable nodes 340-1 and 340-2 receive the IP packet 341-2 along the opposite direction, so that the various sorts of data are mutually transmitted/received. A data portion from which the header of the IP packet is removed may also be called as a "payload".

Next, there are provided with IP data multicast networks, IP base TV broadcast networks and, IP base movies distribution networks, while the multicast technique corresponding to one of the IP techniques is employed as the IP transfer networks. In the IP data multicast network, IP data such as electronic books and electronic newspapers is transferred from one distribution source to a plurality of destinations. In both the IP base TV broadcast networks and IP base movie distribution networks, which may function as IP sound (speech)/image networks, both TV sound data and TV picture (image) data are transferred(broadcasted) to a plurality of destinations. Referring now to FIG. 16, a multicast type IP transfer network 27-1 for transferring from one distribution source to a plurality of destinations will now be explained.

In FIG. 16, reference numerals 27-11 to 27-20 show routers. Each of these routers 27-11 to 27-20 holds a router-sort multicast table. This router-sort multicast table represents that a received IP packet should be transferred to a plurality of communication lines in accordance with multicast addresses contained in the received IP packets. In this embodiment, a multicast address designates "MA1". In such a case that an IP packet 29-1 having the multicast address "MA1" is transmitted from an IP terminal 28-1, and then is reached via the router 27-11 to the router 27-18, this router 27-18 copies an IP packet 29-2, and transfers both an IP packet 29-3 and another IP packet 29-4 to a communication line by citating the router-sort multicast table held in the router 27-18. Also, the router 27-17 copies the received IP packet 29-3, and transfers an IP packet 29-5 to a communication line 29-17 by referring to the router-sort multicast table held in the router 27-18. Also, this router 27-17 transfers an IP packet 29-6 to a communication line 29-18 by referring to the router-sort multicast table. Since the router 27-19 owns no router-sort multicast table, the IP packet 29-4 directly passes through the router 27-19 to become another IP packet 29-7 which will be transferred to the router 27-14.

As indicated in FIG. 17, the router 27-17 inputs the IP packet 29-3 from the communication line 29-16, and makes such a confirmation that the transmission source IP address of the IP packet 29-3 is equal to "SRC1" and the destination IP address thereof is equal to the multicast address "MA1". Since the output interfaces with respect to the multicast address "MA1" are designated as "IF-1" and "IF-2" in the multicast table 29-15, the router 27-17 copies the IP packet 29-3, and outputs the copied IP packet as an IP packet 29-5 to the communication line 29-17 whose output interface is equal to "IF-1". Furthermore, the router 27-17 copies the IP packet 29-3, and then outputs the copied IP packet as an IP packet 29-6 to the communication line 29-18 whose output interface is equal to "IF-2".

The router 27-12 copies the received IP packet 29-5, and then transfers the IP packet 29-8 to the IP terminal 28-2 and also the IP packet 29-9 to the IP terminal 28-3 by referring to the route-sort multicast table. Also, the router 27-13 copies the received IP packet 29-6, and then transfers the IP packet 29-10 to the IP terminal 28-4 and also the IP packet 29-11 to the IP terminal 28-5 by referring to the route-sort multicast table. Also, the router 27-14 copies the received IP packet 29-7, and then transfers the IP packet 29-12 to the IP terminal 28-6 and also the IP packet 29-13 to the IP terminal 28-7 by referring to the route-sort multicast table. In the case that the IP terminal 28-1 of the transmission source transfers a digital-formatted electronic book and a digital-formatted electronic newspaper to the IP transfer network 27-1, this IP transfer network 27-1 corresponds to an IP data multicast network which is employed so as to distribute an electronic book and an electronic newspaper; whereas the IP terminals 28-2 to 28-8 constitute IP terminals of users who purchase the electronic books and the electronic newspapers. In such a case that the IP terminal 28-1 of the transmission source is replaced by a TV broadcasting sound/image transmission apparatus so as to broadcast a TV program (both sound and image), the IP transfer network may constitute an IP base TV broadcast network, whereas the IP terminals 28-2 to 28-7 may constitute IP terminals equipped with TV reception functions for TV audiences.

In the above-described embodiment of the multicast system shown in FIG. 16, the IP terminal 28-1 constitutes the transmitter to transmit the multicast data, whereas the IP terminals 28-2 to 28-7 constitute the receivers to receive the multicast data. The multicast system with employment of such a method is utilized in the Internet and broadband LANs as a test purpose. However, in the multicast system, since any of the IP terminals may constitute the transmission source for transmitting the multicast data, the following risk may occur. That is, while a transmitter having a ill-intention appears, the transmitter continuously transmits multicast data in an endless manner, so that a network may be congested by the multicast data, and thus, a network function should be stopped. There is another risk that since multicast tables contained in routers are rewritten and/or a very large amount of data are supplied into routers in an endless manner, source routers are brought into overload conditions, and finally shut down. A large expectation is made of realizing such a multicast system with highly improved information securities, while employing the following security methods. That is, while a multicast data transmission source is limited, any of unfair users may be eliminated, and/or attacking of overload/shut-down of routers may be avoided.

SUMMARY OF THE INVENTION

Terminal-to-terminal(inter-terminal) communication connection control methods for IP terminals which mainly transmit/receive data have been established as, for example, a terminal-to-terminal communication connection control method capable of transmitting/receiving an electronic mail in the Internet. In accordance with the present invention, such a terminal-to-terminal communication connection control method could be established, in which the terminal-to-terminal communication connection control method among the IP terminals, which has been established in the Internet and the like and mainly transmits/receives data, may be applied to multimedia communications such as communications among IP telephone sets, voice/image communications, and IP multicast communications by employing a technical idea different from the above-explained TTC standard.

The present invention has been made to solve the above-explained problem, and has an object to provide a terminal-to-terminal communication connection control system which can be applied to multimedia communications such as communications established among IP telephones, voice (speech)/image communications, and IP multicast communications.

In accordance with the present invention, since the line connection control method of the No. 7-common line signal system is rearranged so as to be fitted to an IP transfer network, the terminal-to-terminal communication connection control method may be realized in which IP packets are transferred via the IP transfer network among terminals known as telephone sets, IP terminals, audio-moving image transmitting/receiving terminals and facsimiles.

In FIG. 18, reference numeral 1 shows an IP transfer network having an IP packet transmission/reception function, reference numerals 1-1 and 1-2 indicate terminals (telephone set, IP terminal, audio-moving image transmitting/receiving terminal, facsimiles etc.), reference numerals 1-3 and 1-4 represent media routers for connecting one, or more terminals to the IP transfer network, and reference numerals 1-5 and 1-6 show connection servers, and further reference numeral 1-7 denotes a relay connection server. A function similar to the line connection control of the subscriber exchanger (LS) of the public switched telephone network (PSTN) is applied to each of the connection servers 1-5 and 1-6. A function similar to the line connection control of the relay exchanger (TS) is applied to the relay connection server 1-7.

A user inputs a destination telephone number from the terminal 1-1 so as to send a call setting signal (Step Z1), and then, the media router 1-3 returns a call setting acceptance (Step Z2). Next, the media router 1-3 transmits an IP packet to the connection server 1-5 (Step Y1). This IP packet contains the destination telephone number and a telephone number of a transmission source, and is to set a telephone call. The connection server 1-5 determines a communication line for a terminal communication provided in an IP transfer network by using the received destination telephone number, and produces both a line number(circuit number: CIC) used to identify a communication line, and an IP packet containing both the destination telephone number and the transmission source telephone number. In this case, the line number (CIC) is exclusively determined in such a manner that the circuit number is capable of identifying a set of both the destination telephone number and the transmission source telephone number. The IP packet will be referred to as an IP packet containing an initial address message (IAM), or simply referred to as an initial address message (IAM). The above-explained communication line for the terminal communication corresponds to, for example, such an IP communication line used to transfer a digitalized voice packet. The IP communication line may be defined as a set of a transmission source IP address and a destination IP address, which is set to a voice IP packet, or a label of an MPLS technique applied to an IP packet. When other terminals such as an IP terminal, an audio-moving image data, facsimile data are used, a communication line corresponds to a data transferring communication line for an IP terminal, and/or a data transferring communication line for an audio-moving image data and facsimile data.

Next, the connection server 1-5 sends the initial address message (IAM) to the connection server 1-7 (Step Y2), and operation of the connection server is advanced to an address completion message (ACM) waiting condition and initiates an ACM waiting timer (will be explained later). The relay connection server 1-7 receives the message IAM, and then sends this message IAM to the connection server 1-6 (Step Y3). The connection server 1-6 checks the content of the received IAM message, and also Judges as to whether or not a communication line is set to such a media router 1-4 which is connected to the telephone set 1-2 having the destination telephone number. In other words, the connection server 1-6 checks as to whether or not the media router 1-4 is allowed to receive a connection request call. When the connection request call reception is allowed, the connection server 1-6 requests the media router 1-4 to set the connection request call (Step Y4). The media router 1-4 requests the telephone set 1-2 to set the telephone call (Step Z4). Furthermore, the connection server 1-6 produces such an IP packet for notifying such a fact that the message IAM is received. The connection server 1-6 returns the produced IP packet(called as address completion message: ACM) to the relay connection server 1-7 (Step Y5). The message ACM is reached via the relay connection server 1-7 to the relay connection server 1-5 (Step Y6). When the connection server 1-5 receives the message ACM, the connection server 1-5 stops the previously set ACM waiting timer. In the case that the ACM waiting timer is fully counted up before the message ACM is received, the telephone communication line is released. Alternatively, the message ACM may succeed the line number (CIC) from the message IAM and may save it inside the message ACM or the message ACM forms a line number from the caller's telephone number and the address telephone number at the Step Y5 and save it inside the message ACM.

The terminal 1-2 produces a connection request call reception sound, and reports the call reception to the media router 1-4 (Step Z7). The media router 1-4 sends to the connection server 1-6, the connection request call reception notice. The connection server 1-6 produces such an IP packet for notifying such a fact that the telephone set 1-2 issues the telephone set 1-2 receives the connection request call. This produced IP packet is referred to as an "IP packet containing a call pass message(CPG)", or simply called as a call pass message (CPG). The connection server 1-6 sends this call pass message "CPG" to the relay connection server 1-7 (Step Y8). The relay connection server 1-7 sends the received message CPG to the connection server 1-5 (Step Y9), and the connection server 1-5 receives the message CPG. Then, the connection server 1-5 notifies such a fact that the terminal 1-2 is being called by considering the content of the message CPG to the media router 1-3 (Step Y10). The media router 1-3 notifies the telephone calling sound to the telephone set 1-1 (Step Z10). It should be noted that as to the message CPG, at the Step Y5, while the line number is formed from the set of the transmission source telephone number and the destination telephone number, and then may be saved in the message CPG.

When the terminal 1-2 responds to the call setting request made at the Step Z4 (Step Z11), the media router 1-4 notifies such a fact that the terminal 1-2 responds the connection request call to the connection server 1-6 (Step Y11). The connection server 1-6 produces such an IP packet for indicating that the terminal 1-2 responds to the request of the call setting operation. The IP packet is referred to as an IP packet containing a response message (ANM), or simply called as a response message (ANM). The connection server 1-6 transmits the produced ANM message packet to the relay connection server 1-7 (Step Y12). The relay connection server 1-7 sends the received ANM message to the connection server 1-5 (Step Y13). Then, this connection server 1-5 notifies such a fact that the destination terminal 1-2 responds to the media router 1-3 (Step Y14). The media router 1-3 notifies the calling sound stop transmitted to the terminal 1-1 (Step Z14), so that the IP packet on which the digital voice is superimposed can be transmitted/received by employing the communication which is specified by the line number (CIC) between the terminals 1-1 and 1-2. Then, the operation is advanced to a terminal communication phase (Step Y15). As to the ANM message IP packet, at the Step Y5, the line number may be formed from a set of the transmission source telephone number and the destination terminal number, and may be saved in the message ANM. When a call interrupt request is issued (Step Z16), the media router 1-3 notifies the call interrupt request to the connection server 1-5 (Step Y16) and notifies a cut confirmation to the terminal 1-1 (Step Z18).

When the connection server 1-5 receives the interrupt request, this connection server 1-5 discriminates the line number (CIC) from the set of the transmission source terminal number and the destination terminal number, and then produces such an IP packet employing a release request (REL) of the communication line. The produced IP packet is referred to as an IP packet containing a release (REL), or simply referred to as a release message (REL). The release message (REL) contains the line number (CIC). The connection server 1-5 sends the release message (REL) to the relay connection server 1-7 (Step Y17), and further, returns to the media router 1-3, such a recovery completion for indicating a completion of the interrupt request (Step Y18). The relay connection server 1-7 sends out the release request (REL) to the connection server 1-6 (Step Y19), and furthermore, produces such an IP packet indicative of a completion of the release request (REL). The produced IP packet is called as an IP packet containing a release completion (RLC), or simply referred to as a release completion message (RLC). This release completion message (RLC) is returned to the connection server 1-5 (Step Y20).

When the connection server 1-6 receives the release request (REL), the connection server 1-6 sends out an interrupt request to the media router 1-4 (Step Y21), and also returns a release completion message (RLC) to the relay connection server 1-7 (Step Y22). The release completion message (RLC) implies that the release request (REL) is completed. When the media router 1-4 receives the interrupt request, the media router 1-4 notifies an interrupt instruction of a connection request call to the terminal 1-2 (Step Z22), and also to the connection server 1-6, an interrupt completion for indicating that the interrupt instruction is carried out (Step Y23). The terminal 1-2 notifies a recovery completion to the media router (Step E23). In the procedure for accomplishing the terminal communication, the terminal 1-2 may send the interrupt request of the terminal communication to the media router 1-4, which is similar to the above-explained procedure. Alternatively, while the relay connection server 1-7 is not present, a method for a terminal-to-terminal communication control between the connection servers 1-5 and 1-6 may be realized. After the terminal communication between the terminals 1-1 and 1-2 has been accomplished, namely at the Steps Y18 and Y22, both the connection servers 1-5 and 1-6 may acquire a terminal communication record including a line number (CIC), a communication time instant, and a telephone number, and may record the terminal communication record inside the connection server so as to be used for the charging and operation managing purposes.

In the above described terminal-to-terminal communication connection control, when the terminal is a telephone set, the digital media is digitalized voice and the media communication is telephone communication, when the terminal is an IP terminal, the digital media is characters or digitalized still images and the media communication is IP data communication, when the terminal is an audio-moving image transmission/reception terminal, the digital media is digitalized audio-moving image and the media communication is voice-moving image communication, and when the terminal is a facsimile terminal, the digital media is digitalized facsimile image and the media communication is facsimile communication. The telephone number to discriminate the communicating terminals may be a terminal discrimination number to individually define specified terminals, for example, a terminal original number which is effective within the specified communication network.

Also, there are various sorts of modified terminal-to-terminal communication connection control methods between a media router and a connection server, and between connection servers. Alternatively, the initiation of the ACM waiting timer defined at the Step Y2 may be omitted, and also the above-mentioned Step Y5 and Y6, namely address completion message (ACM) can be omitted. However, CPG waiting timer is set instead of the ACM waiting timer and is stopped after Step Y9. These means will be explained with reference to a following embodiment.

The present invention is related to a terminal-to-terminal communication control method with employment of an IP transfer network. The above-explained object of the present invention may be achieved by such a terminal-to-terminal communication connection control method with employment of an IP transfer network wherein: in order to perform a multimedia IP communication between a first IP terminal and a second IP terminal, the first terminal transmits such an IP packet containing a host name of the second IP terminal via a domain name server contained in a media router and a network node apparatus to a domain name server contained in a integrated IP transfer network; the domain name server contained in the integrated IP transfer network returns such an IP address corresponding to the host name of the second IP terminal in an 1-to-1 correspondence relationship via the domain name server contained in the media router, or directly to the first IP terminal; when the first terminal sends out an IP packet to be transmitted to the second IP terminal, the IP packet reaches another network node apparatus connected to said second IP terminal via the media router connected to said first IP terminal and then the network node apparatus and more than one routers inside the IP transfer network, so as to deliver the IP packet to said IP terminal via another media router through a communication line and the domain name server is utilized.

Also, the above-explained object of the present invention may be achieved by such a terminal-to-terminal communication connection control method with employment of an IP transfer network, wherein: in order to perform a telephone communication between a first dependent type IP telephone set and a second dependent type IP telephone set, when a handset of the first dependent type IP telephone set is taken up, such an IP packet for notifying a telephone call is transmitted from the first dependent type IP telephone set; a first H323 termination unit inside a first media router detects the IP packet, and returns a response IP packet to the first dependent type IP telephone set; the first dependent type IP telephone set transmits an IP packet containing the telephone number of the second dependent type IP telephone set via the first H323 termination unit and reach a first domain name server inside the first media router and a first network node apparatus connected with the first media router via the communication line; the first network node apparatus transmits the IP packet to a second domain name server inside a integrated IP transfer network; the second domain name server returns a second IP address corresponding to the telephone number of the first dependent type IP telephone set in an 1-to-1 correspondence relationship via the first domain name server or without passing through the first domain name server to the first H323 termination unit; when a first IP address is a source IP address in an 1-to-1 correspondence relationship with the first dependent type IP telephone set and the first H323 termination unit generates and sends an IP packet with a destination IP address as being the second IP address, the IP packet passes through the second H323 termination unit, the second network node apparatus, the more than one router inside the IP transfer network, the first network node apparatus and the first H323 termination unit, and reaches the first dependent IP telephone set; when the first user hangs up a handset upon completion of telephone communication, an IP packet indicating the completion of telephone communication is generated/transmitted with a source IP address as being the first IP address and a destination IP address as being the second IP address; when [the IP packet] passes through the first H323 termination unit, the first network node apparatus, the more than one router inside the IP transfer network, the second network node apparatus and the second H323 termination unit, and reaches the second dependent IP telephone set, thereby enabling the second user to acknowledge the completion of telephone communication;

when the second user hangs up the telephone set and an IP packet for acknowledgement of completed telephone communication is generated and sent with a source IP address as being the second IP address and a destination IP address as being the first IP address, the IP packet passes through the second H323 termination unit, the second network node apparatus, the more than one router inside the IP transfer network and the first network node apparatus, and reaches the first H323 termination unit; when telephone communication is completed between the first dependent type IP telephone set and the second dependent type IP telephone set and an IP packet for transmitting the second dependent type IP telephone set from the H323 termination unit, the IP packet passes through the network node apparatus and the more than one router inside the IP transfer network and reaches another network node apparatus connected to the second dependent type IP telephone set, and the IP packet enters another media router via a communication line thereby enabling the same to reach the second dependent IP telephone set via the H323 termination unit; the IP packet reaches another second network node apparatus connected to the second dependent IP telephone set via the first network node apparatus and more than one routers inside the IP transfer network and arrives via the communication line at a second H323 termination unit which is inside another second router and connected to the second type dependent type telephone set;

when a first user starts a telephone call, the first dependent IP telephone set sends an IP packet containing a voice sound expressed in digital form with a source IP address as being the first IP address and a destination IP address as being the second IP address; the IP packet passes through the first H323 termination unit, and reaches the second dependent IP telephone set; and when a second user causes a voice sound, the second dependent IP telephone set sends an IP packet containing a voice sound expressed in digital form with a source address as being the second IP address and a destination IP address as being the first IP address.

The present invention is featured by that while an address management table is set to a network node apparatus employed in an IP transfer network, the means for registering an address of a terminal into this address management table (refer to Japanese Patent Application No. 128956/1999) is applied to the multicast technique, which will now be described. As a network in which an IP transfer network is operated/managed by a communication company, a network node apparatus is provided in this IP transfer network. Since the IP addresses of the IP terminals are registered into the network node apparatus, the IP packet transmission by the multicast method with improving the information security performance can be realized. When such an IP packet containing a multicast IP address which is not yet registered into the network node apparatus is received, this received IP packet is discarded(IP address filtering operation).

Referring now to FIG. 19, both network node apparatus 1-11 to 1-14 and routers 1-15 to 1-20 are installed into an IP transfer network 1-10. These network node apparatus are directly connected to the routers by using an IP communication line, or in directly connected to the routers via the network node apparatus and the routers. IP terminals 1-21 to 1-27 having an IP packet transmission/reception function are connected to the network node apparatus by way of an IP communication line. An IP terminal does not directly allow the connection to the router. The network node apparatus 1-11 to 1-14 register thereinto at least an IP address among the IP terminal information about the IP terminals connected to the own node apparatus.

As a first IP packet acceptance check, a check is made as to whether or not a destination IP address contained in a header of an external IP packet which is entered into an IP transfer network is registered into the address management table of the node apparatus. In the case that the destination IP address is not registered, this IP packet is discarded. As a second IP packet acceptance check, a check is made as to whether or not a transmission source IP address contained in a header of an external IP packet which is entered into an IP transfer network is registered into the address management table of the node apparatus. In the case that the destination IP address is not registered, this IP packet is discarded. As a first address registration check, while a destination multicast address is registered into the address management table of the network node apparatus, in such a case that a destination multicast address contained in a header of an external IP packet entered into the network node apparatus is not registered into the address management table, the network node apparatus discards the entered IP packet. As a result, it is possible to avoid such a condition that an unexpected IP packet is mixed into the IP transfer network. Also, since an address of a multicast transmission person is not allowed to be registered into an address management table of a network node apparatus of a packet reception person, an ACK packet cannot pass through the network node apparatus. The ACK packet is sent so as to confirm a reception of an IP packet, and is directed from the multicast IP packet reception person to the multicast IP packet transmission person. As a consequence, it is possible to prevent an occurrence of congestion of the IP transfer network, which is caused by ACK implosion of these ACK packets.

Also, while an IP address of a router is not allowed to be registered as a destination address, a dangerous IP packet is not sent out from an IP transfer network to a router of the IP transfer network. The dangerous IP packet may mistakenly rewrite a content of a multicast table. Alternatively, while an IP address of an operation management server for multicast operation provided in an IP transfer network is not allowed to be registered, such an access operation from the IP transfer net work into the operation management server employed in the IP transfer network cannot be carried out, so that the information security performance can be improved. As a second address registration check, a transmission source of an IP packet containing multicast data is limited, so that an occurrence of unfair user can be suppressed. Also, in such a case that unfair action is carried out, an IP packet transmission source can be easily specified, so that the information security performance of the IP transfer network can be improved.

BRIEF DESCRIPTION OF THE DRAWINGS

In the accompanying Drawings:

FIG. 25 is a diagram for explaining an address management table contained in a network node apparatus according to the first embodiment of the present invention;

FIG. 26 is a diagram for explaining a mode of an IP packet appearing in two IP terminal-to-terminal communications;

FIG. 27 is a diagram for explaining a mode of an IP packet appearing in two IP terminal-to-terminal communications;

FIG. 28 is a diagram for explaining a mode of an IP packet appearing in two IP terminal-to-terminal communications;

FIG. 29 is a diagram for explaining a mode of an IP packet appearing in two IP terminal-to-terminal communications;

FIG. 30 is a diagram for explaining a mode of an IP packet appearing in two IP telephones communication;

FIG. 31 is a diagram for explaining a mode of an IP packet appearing in two IP telephones communication;

FIG. 47 is a diagram for showing an example of a media router condition table provided in the media router;

FIG. 48 is a block diagram for representing a conceptional structure of an independent type telephone set;

FIG. 49 is a block diagram for representing a conceptional structure of an independent type IP voice/image apparatus;

FIG. 86 is a diagram for explaining another address management table employed in the network node apparatus according to the second embodiment of the present invention;

FIG. 87 is a description example of a gateway condition table in the second embodiment of the present invention;

FIG. 88 is a schematic diagram for showing an arrangement of a media router mounted inside a CATV system according to a third embodiment of the present invention;

FIG. 89 is a diagram for explaining a method of connecting various sorts of terminals by using a wireless terminal storage apparatus and a gateway apparatus according to a fourth embodiment of the present invention;

FIG. 111 is a diagram for indication an example of a communication company segment table of telephone numbers;

FIG. 112 is a diagram for representing an example of a telephone management server segment table of telephone numbers;

FIG. 119 is a flow chart for indicating an operation example of the eighth embodiment of the present invention;

FIG. 120 is an explanatory diagram for explaining the eighth embodiment of the present invention;

FIG. 121 is an explanatory diagram for explaining the eighth embodiment of the present invention;

FIG. 122 is an explanatory diagram for explaining the eighth embodiment of the present invention;

FIG. 123 is an explanatory diagram for explaining the sixth embodiment of the present invention;

FIG. 124 is an explanatory diagram for explaining the eighth embodiment of the present invention;

FIG. 125 is an explanatory diagram for explaining the sixth embodiment of the present invention;

FIG. 126 is an explanatory diagram for explaining the eighth embodiment of the present invention;

FIG. 127 is an explanatory diagram for explaining the eighth embodiment of the present invention;

FIG. 128 is a diagram for explaining an eighth embodiment (another example of media router) of the present invention;

FIG. 129 is an explanatory diagram for explaining the eighth embodiment of the present invention;

FIG. 130 is an explanatory diagram for explaining the eighth embodiment of the present invention;

Figures 134, 135:
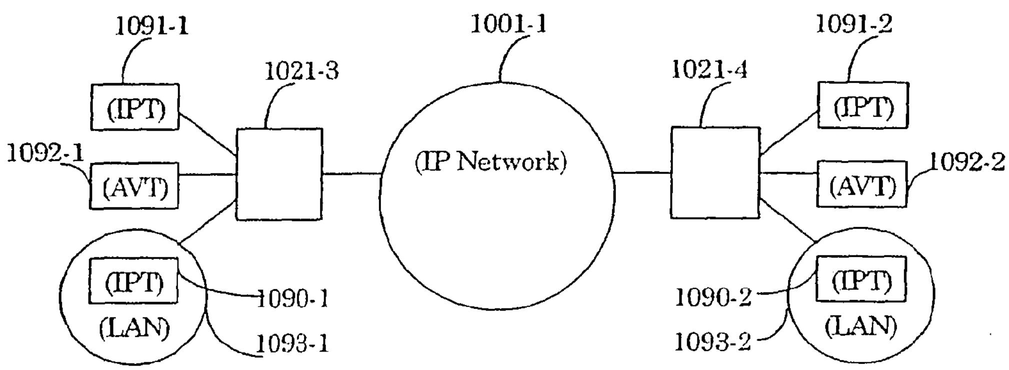
Figure 136:
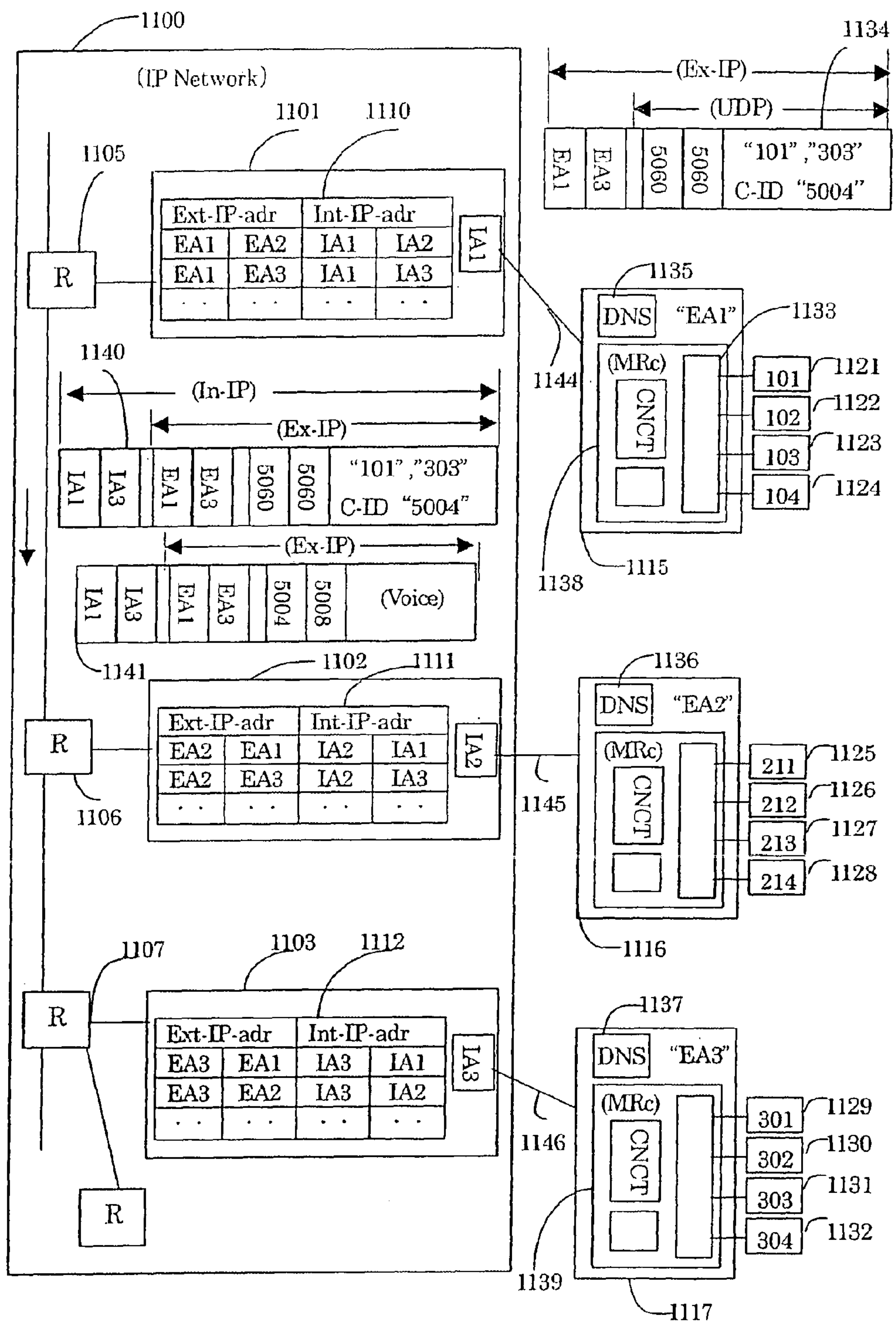
Figure 137:
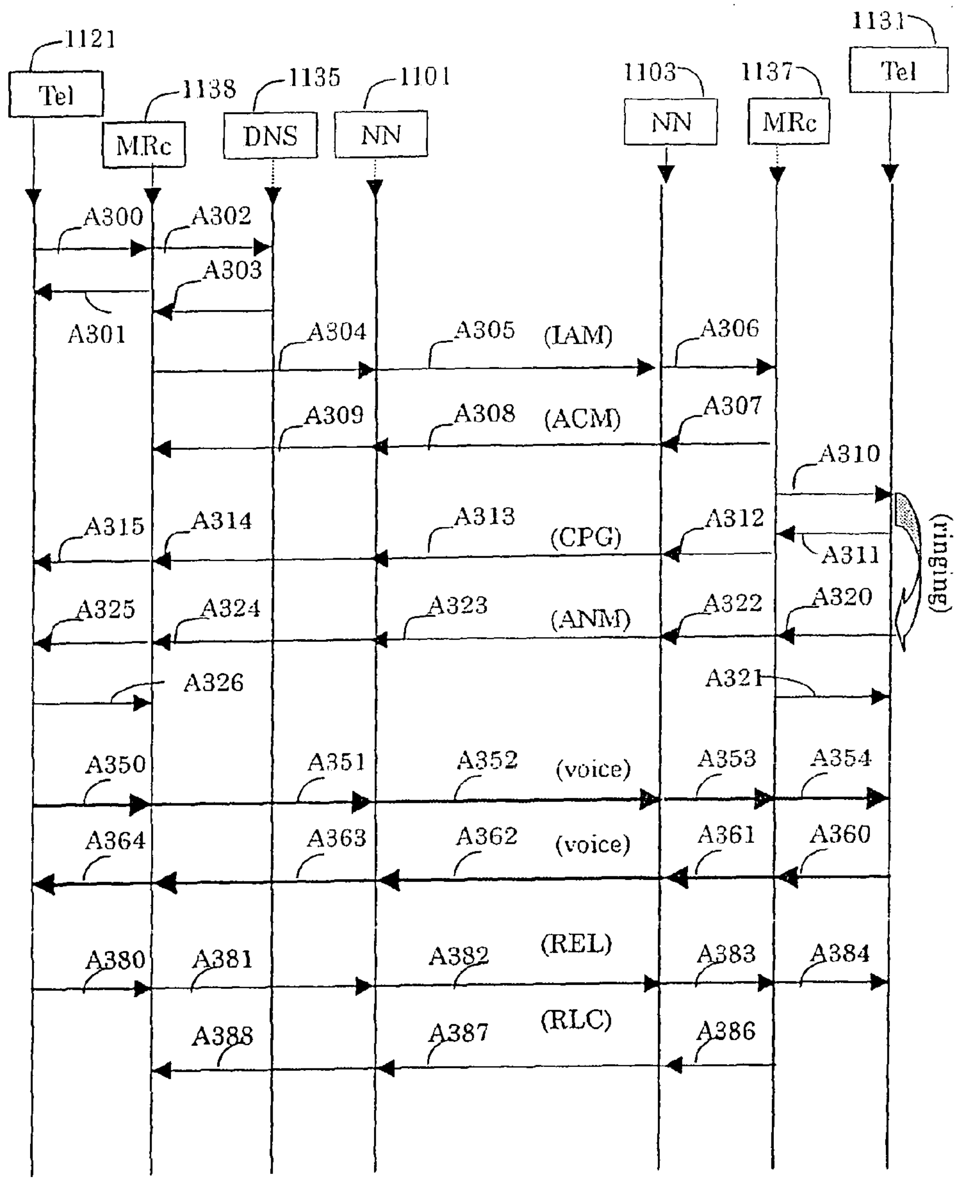
Figures 138, 139, 140:
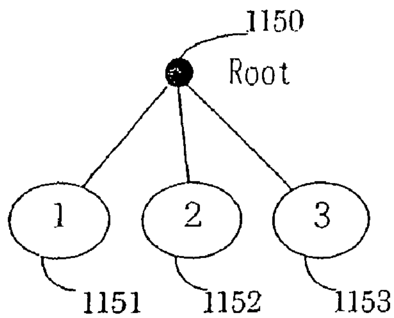
Figure 145:
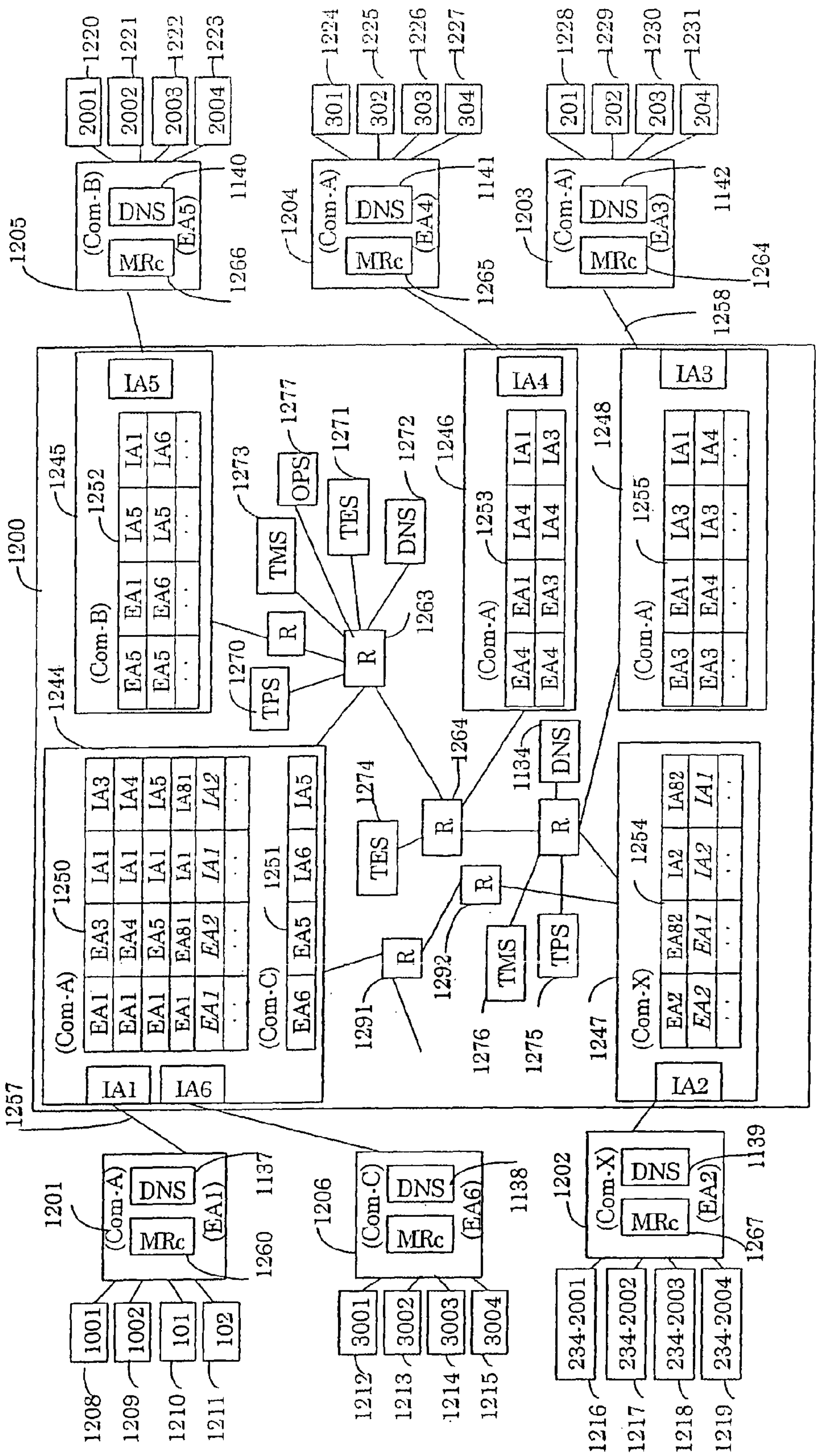
Figure 146:
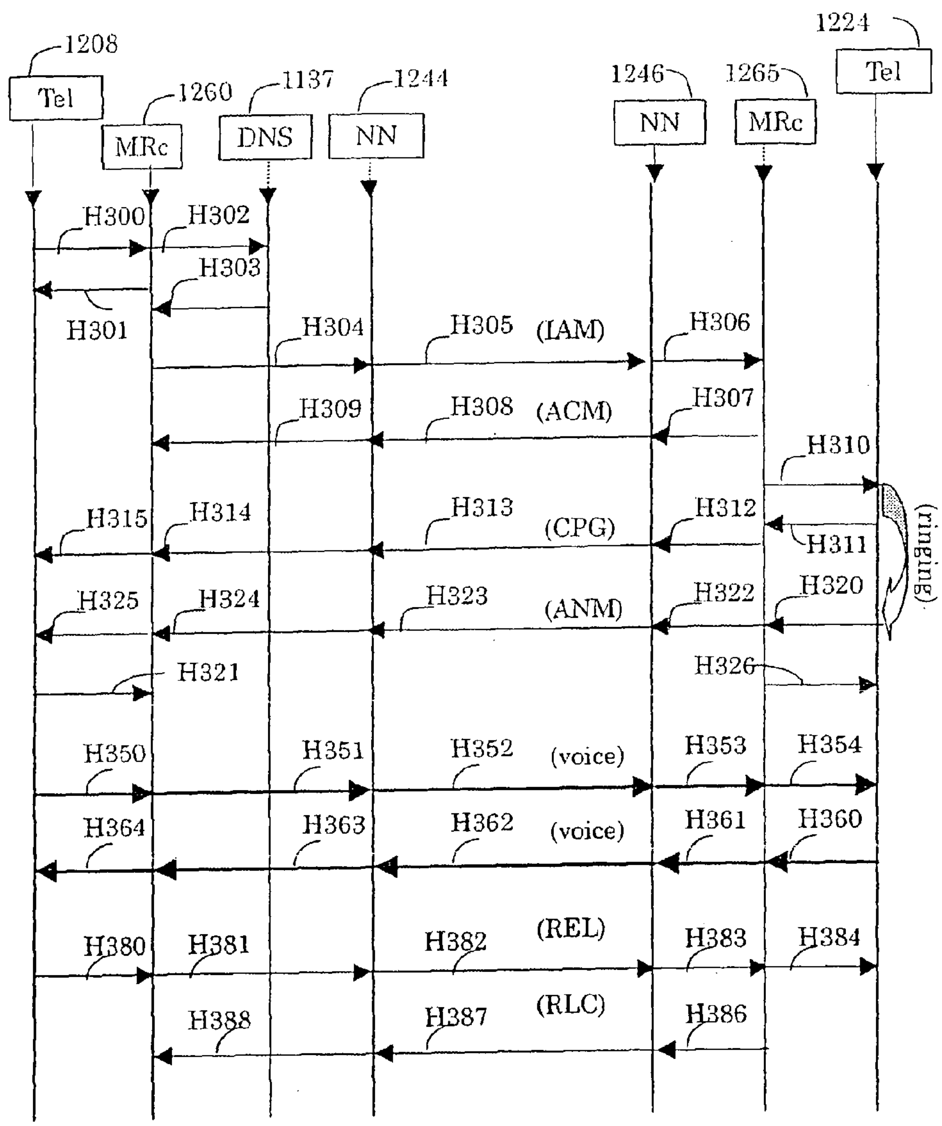
Figure 147:
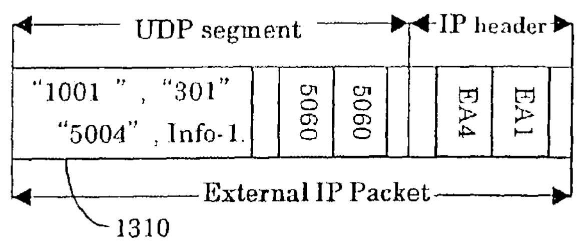
Figure 148:
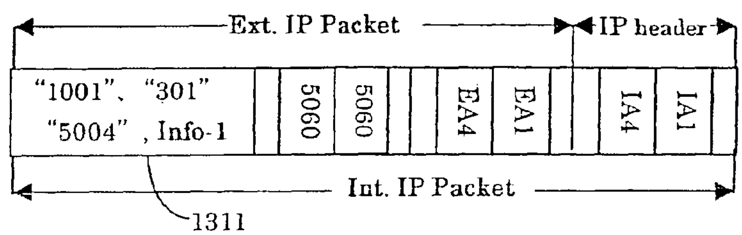
Figure 149:
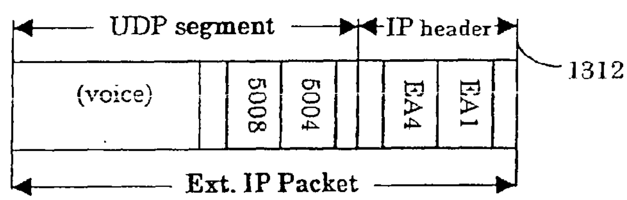
Figure 150:
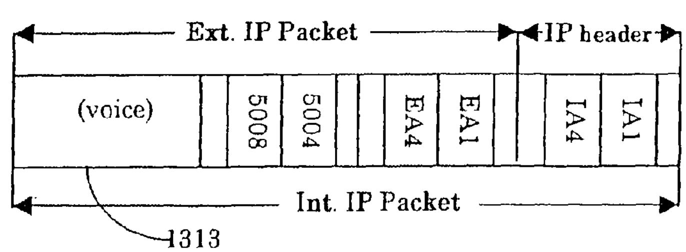
Figure 151:
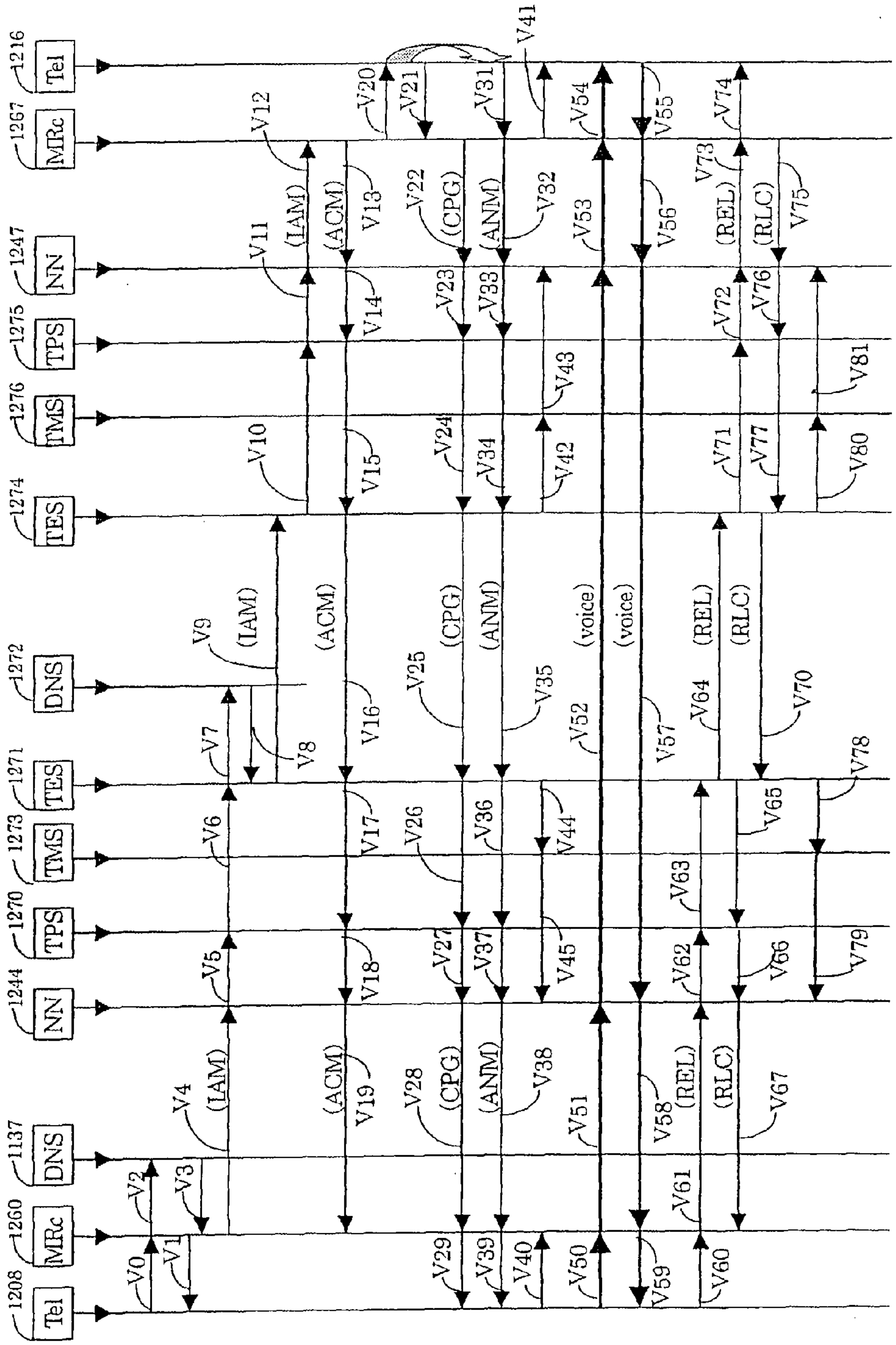
Figure 161:
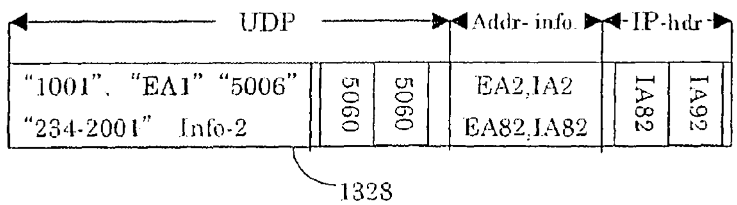
Figure 162:
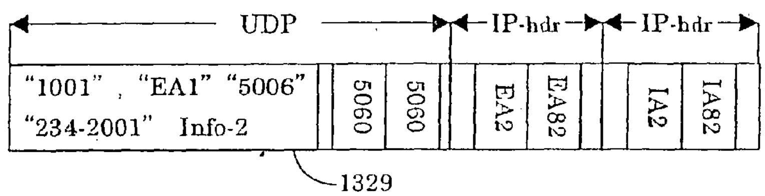
Figure 163:
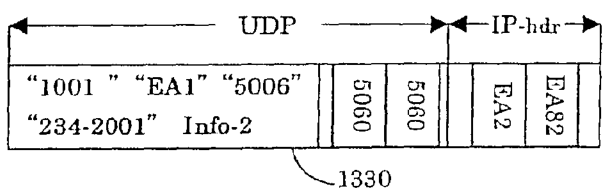
Figure 164:
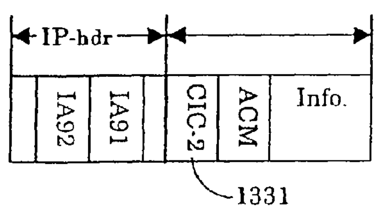
Figure 165:
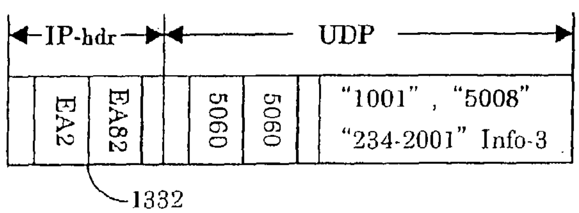
Figure 166:
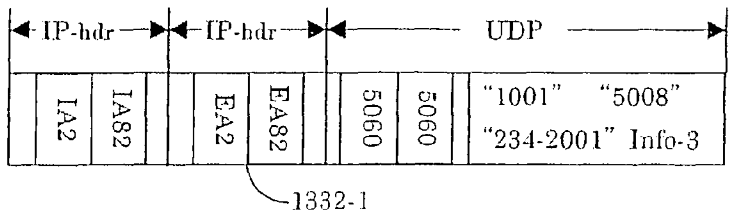
Figure 167:
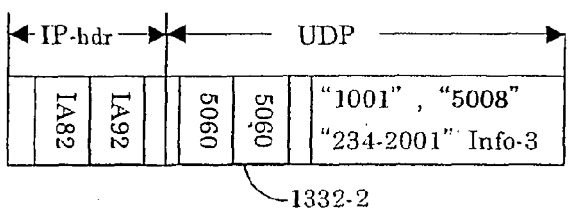
Figure 168:
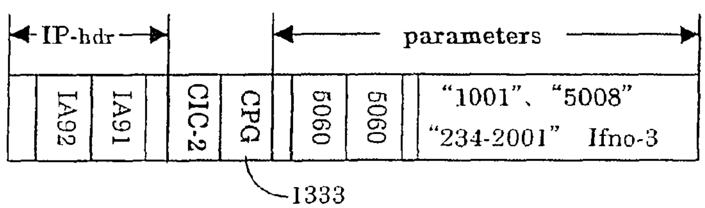
Figure 169:
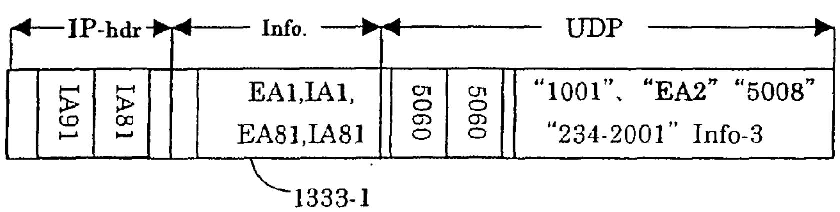
Figure 170:
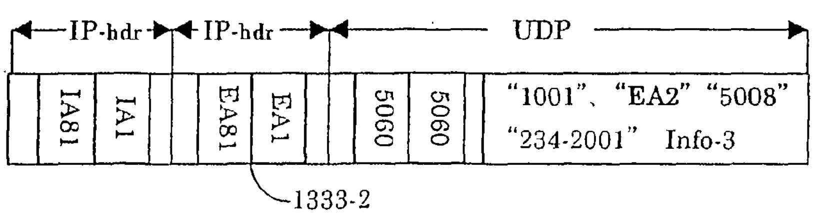
Figure 171:
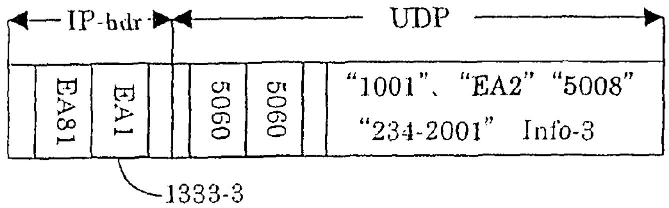
Figure 172:
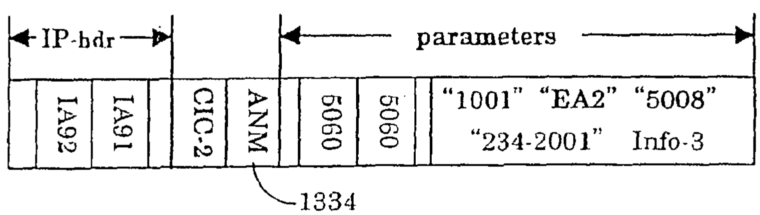
Figure 173:
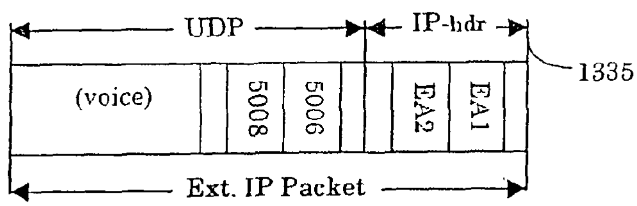
Figure 174:
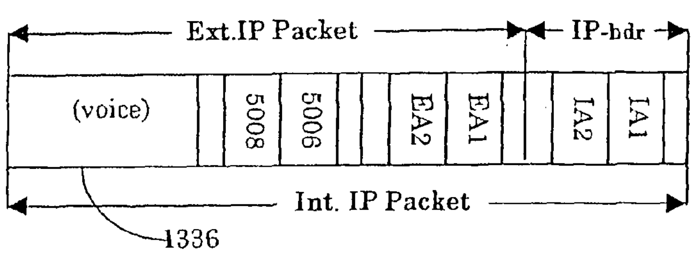
Figure 175:
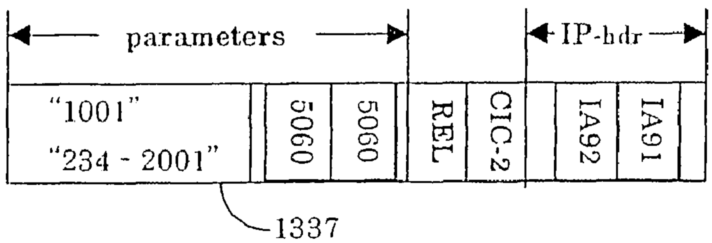
Figure 176:
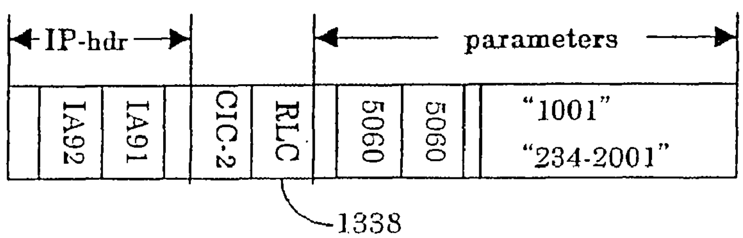
Figures 177, 178, 179:
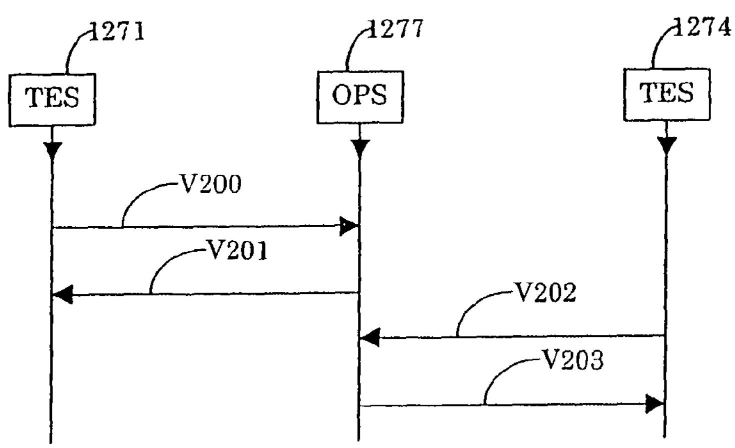
Figure 180:
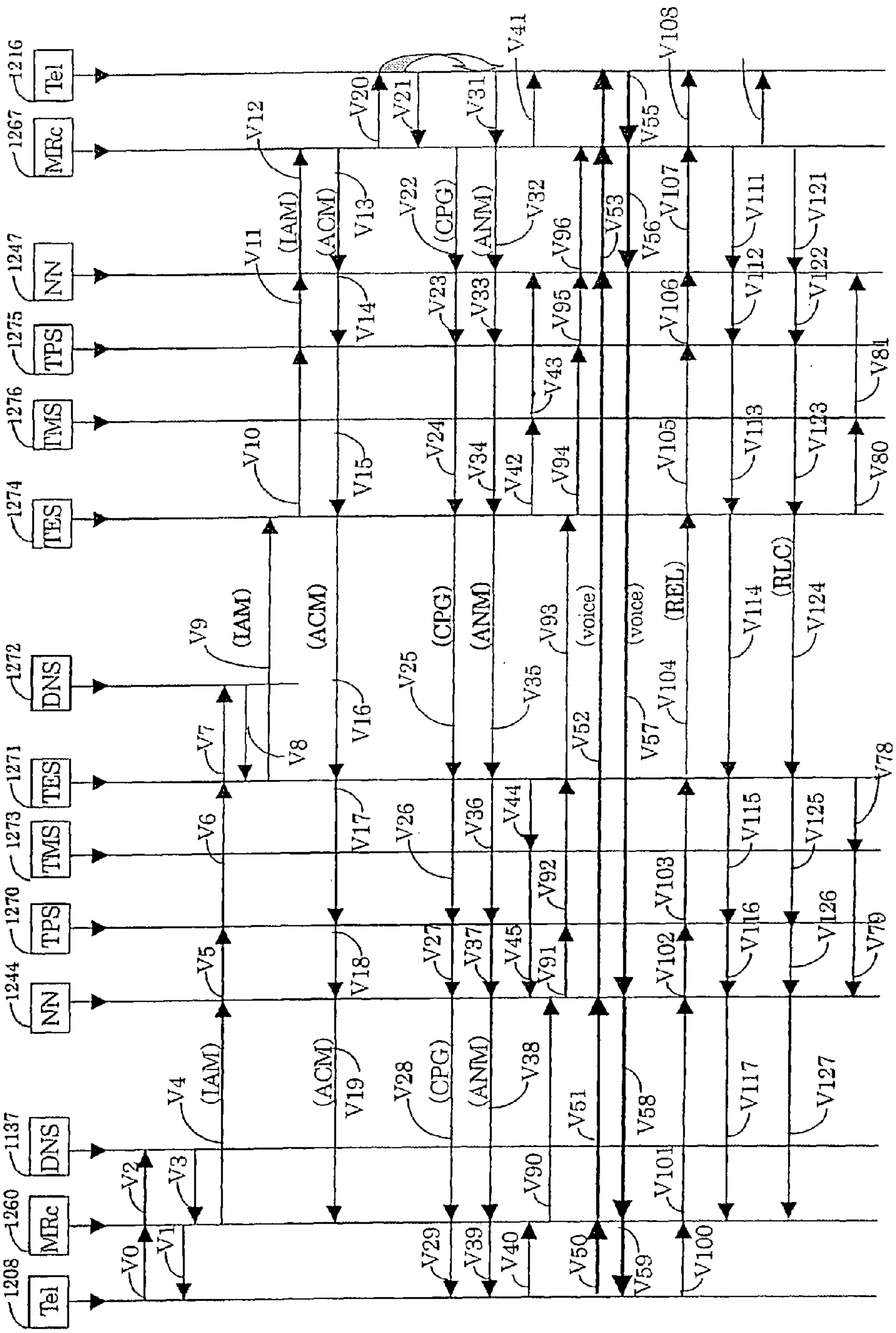
Figure 181:
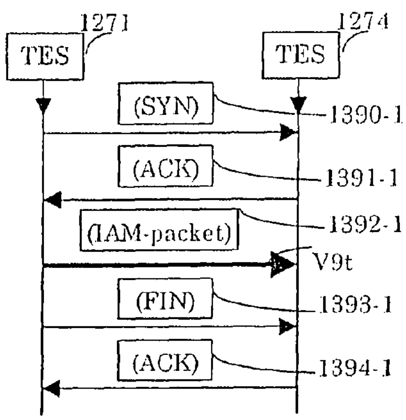
Figure 182:
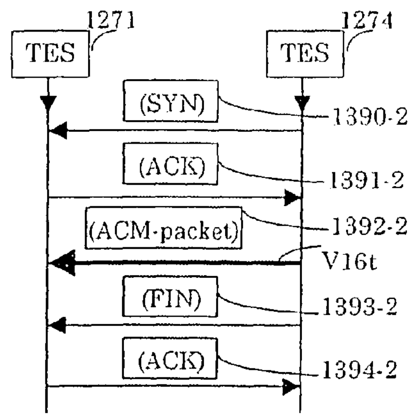
Figure 183:
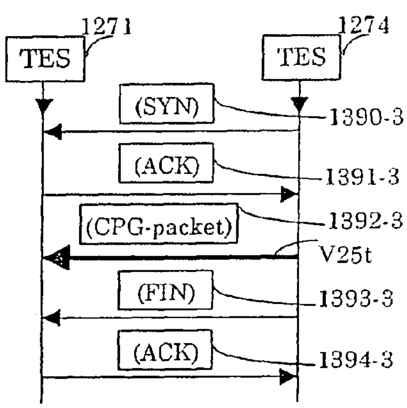
Figure 184:
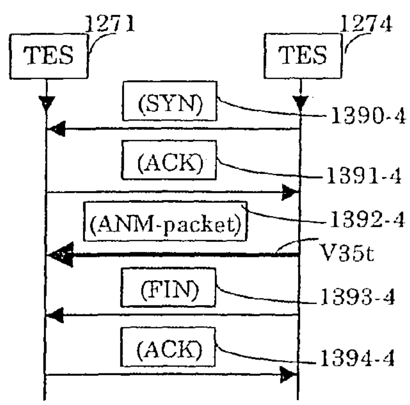
Figure 185:
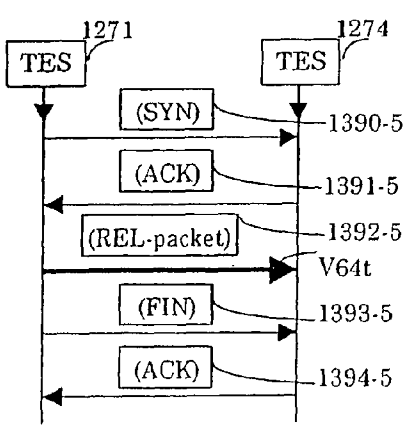
Figure 186:
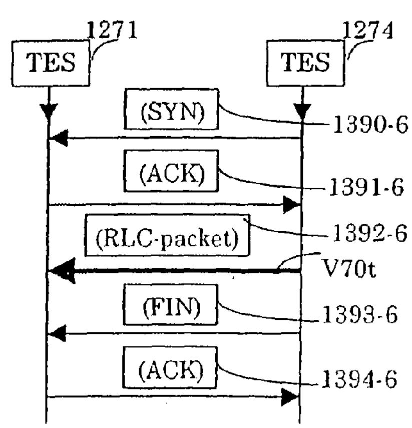
Figure 187:
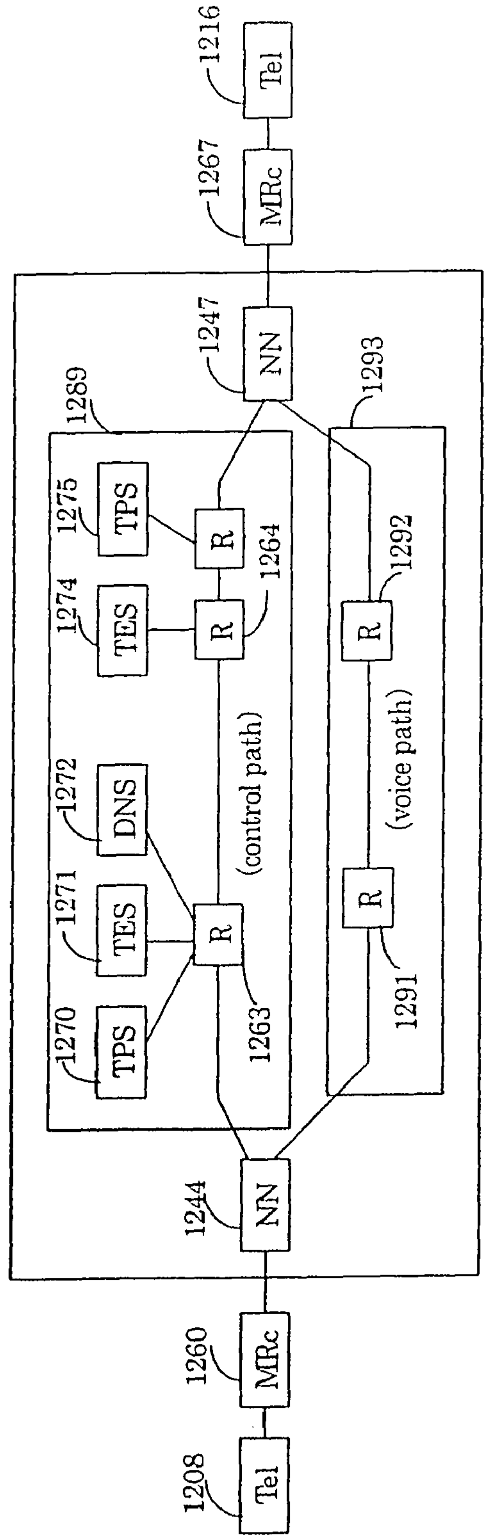
Figure 188:
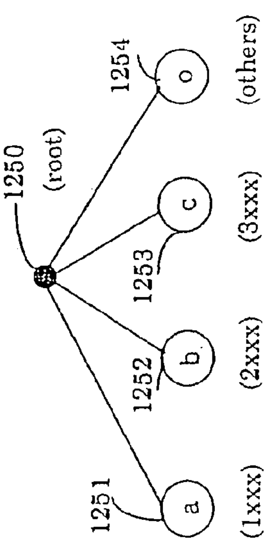
Figure 189:
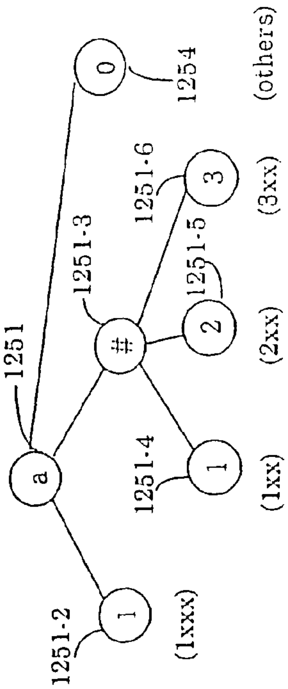
Figure 190:
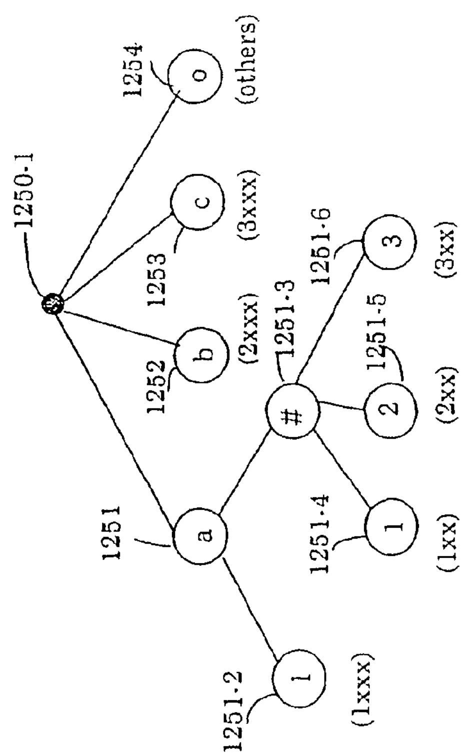
Figure 191:
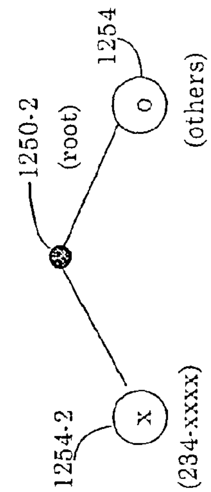
Figure 198:
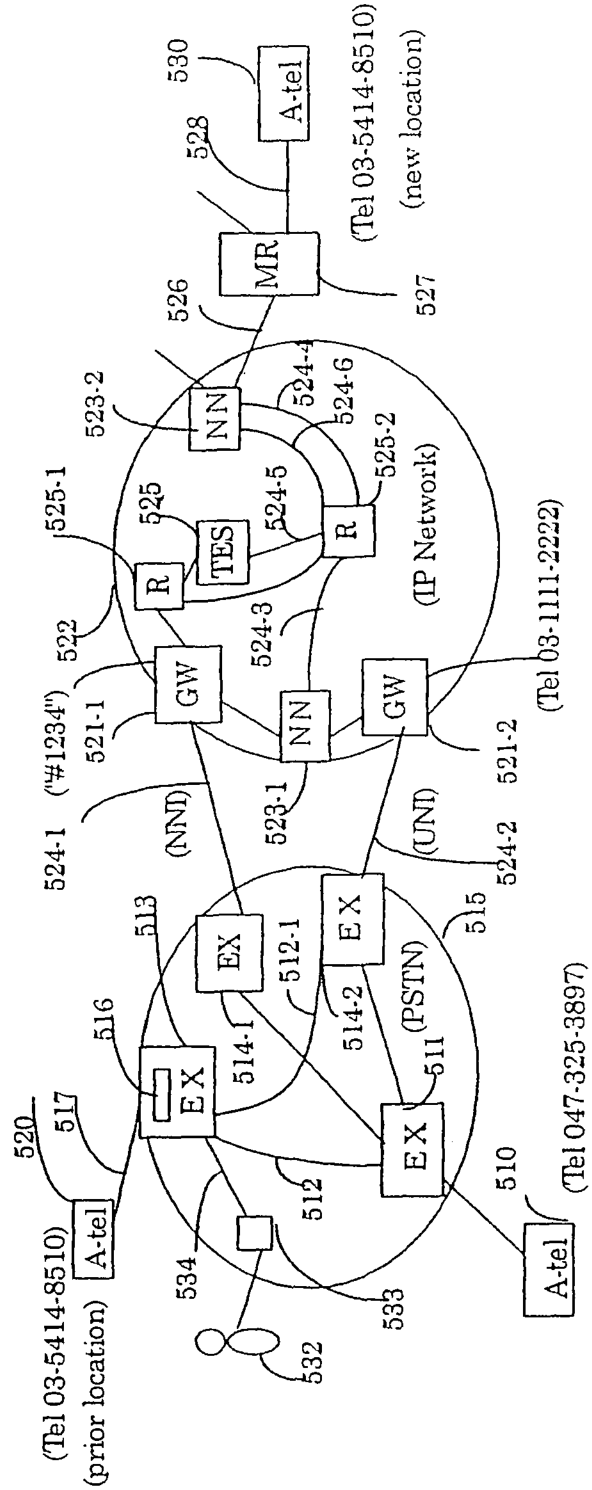
Figure 199:
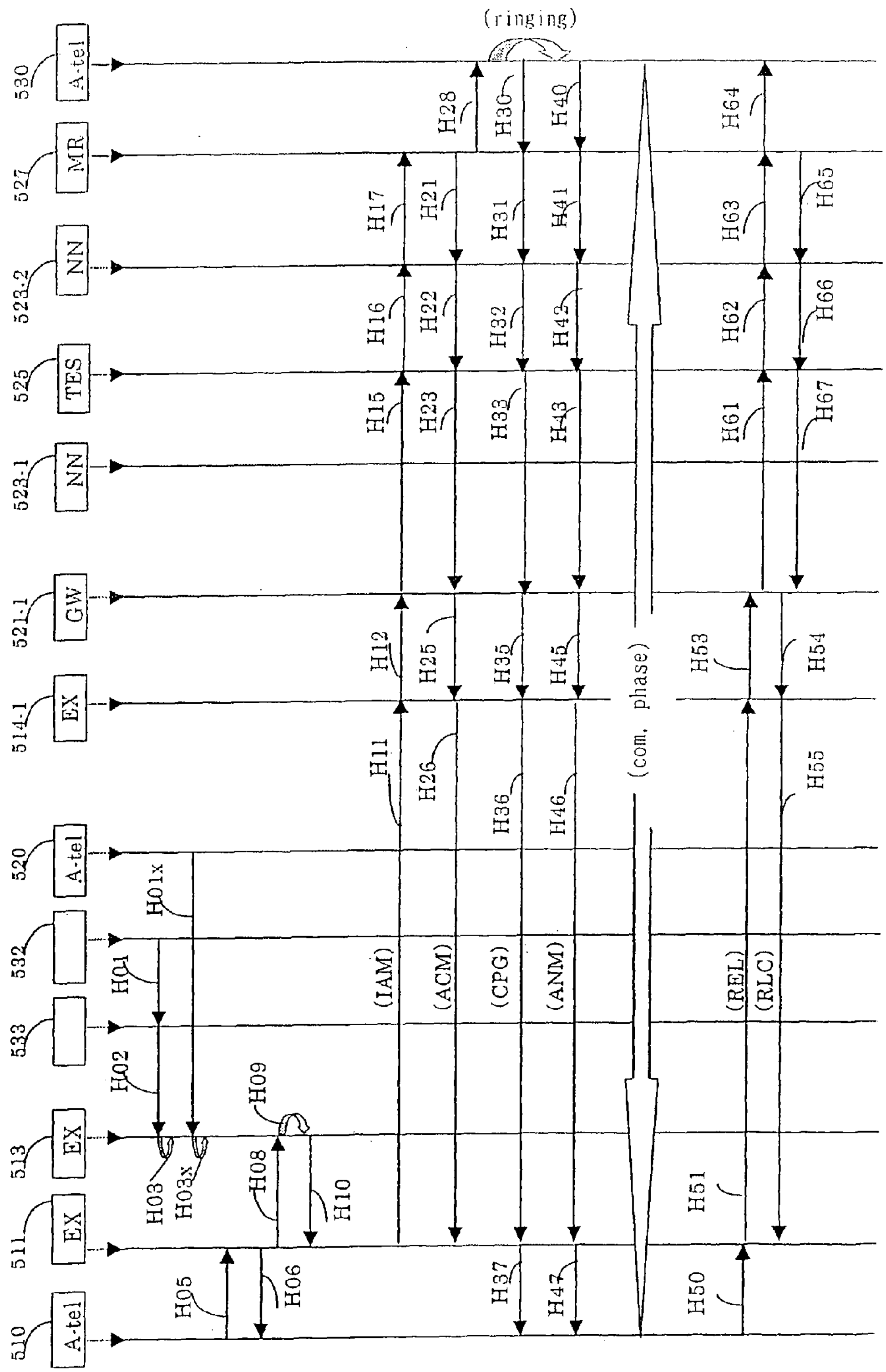
Figure 200:
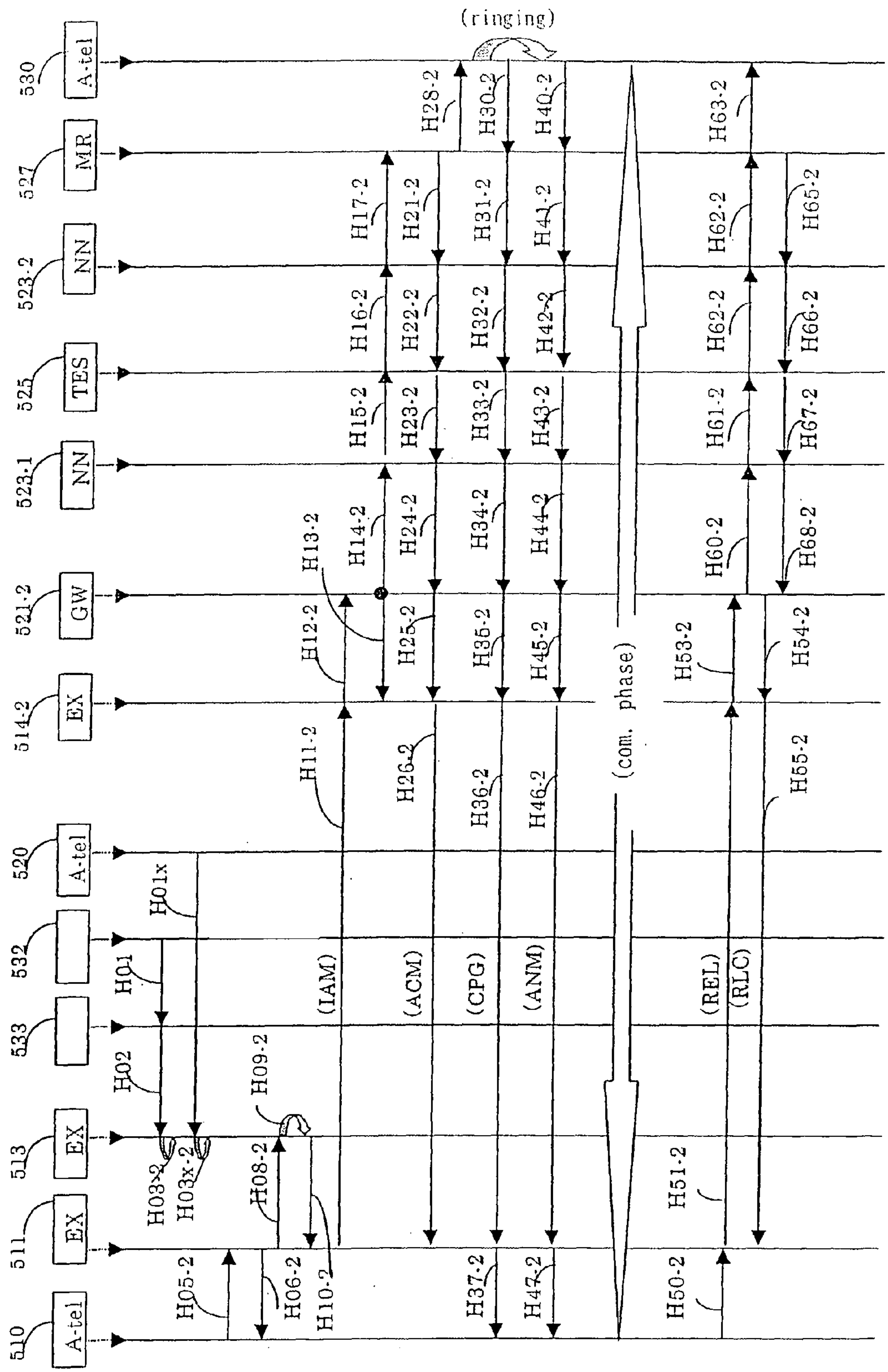
Figure 201:
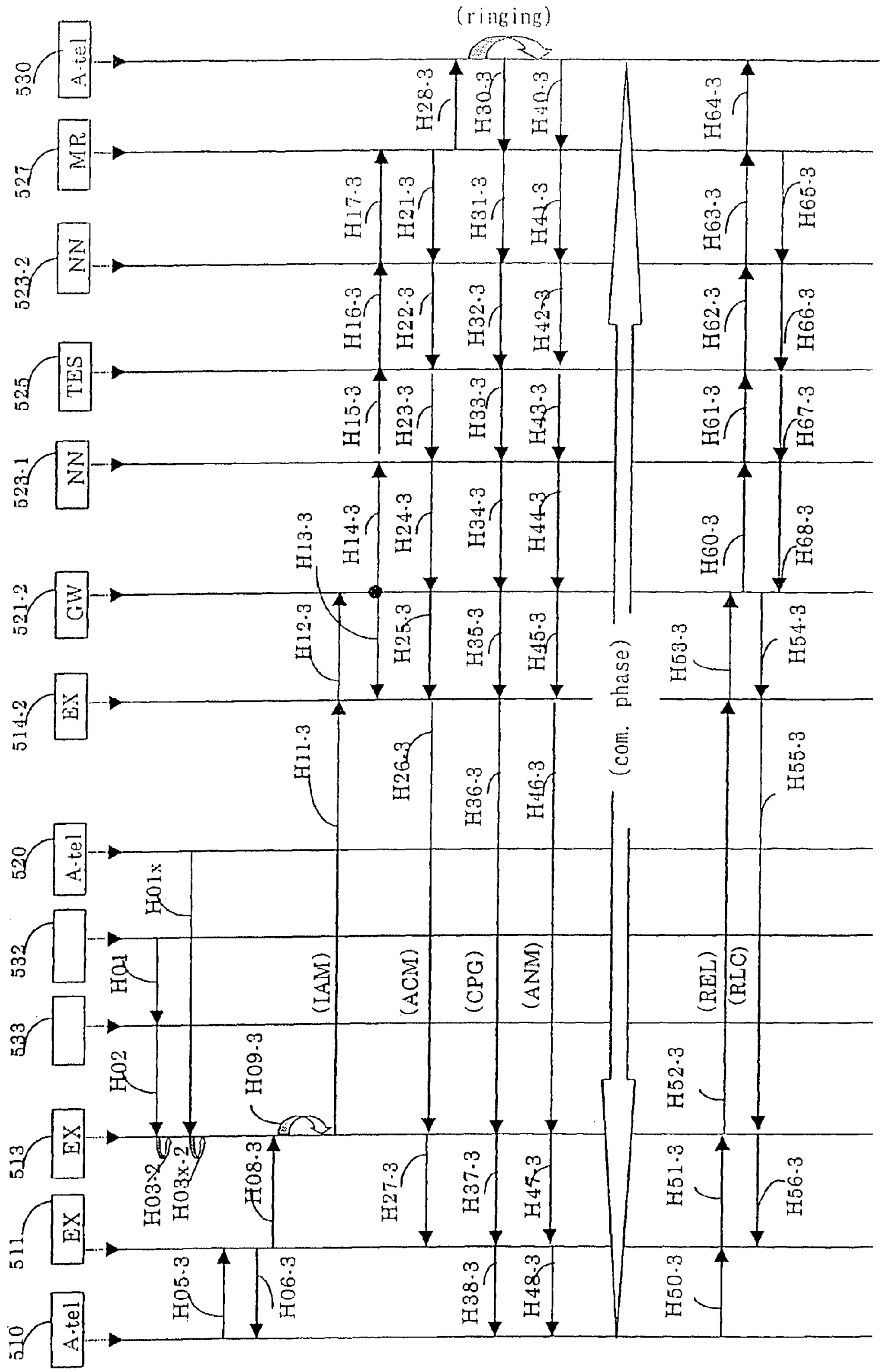
Figure 202:
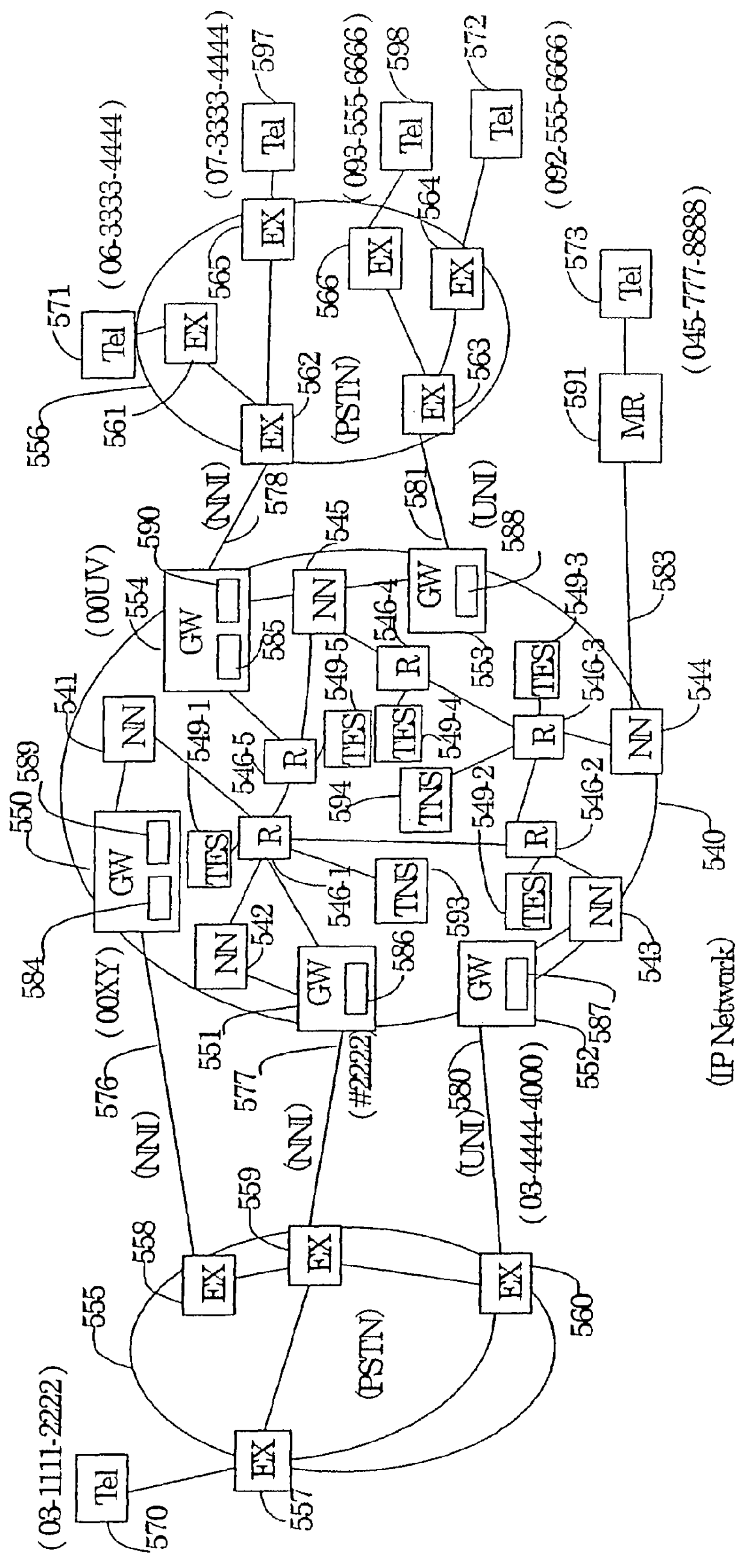
Figure 205:
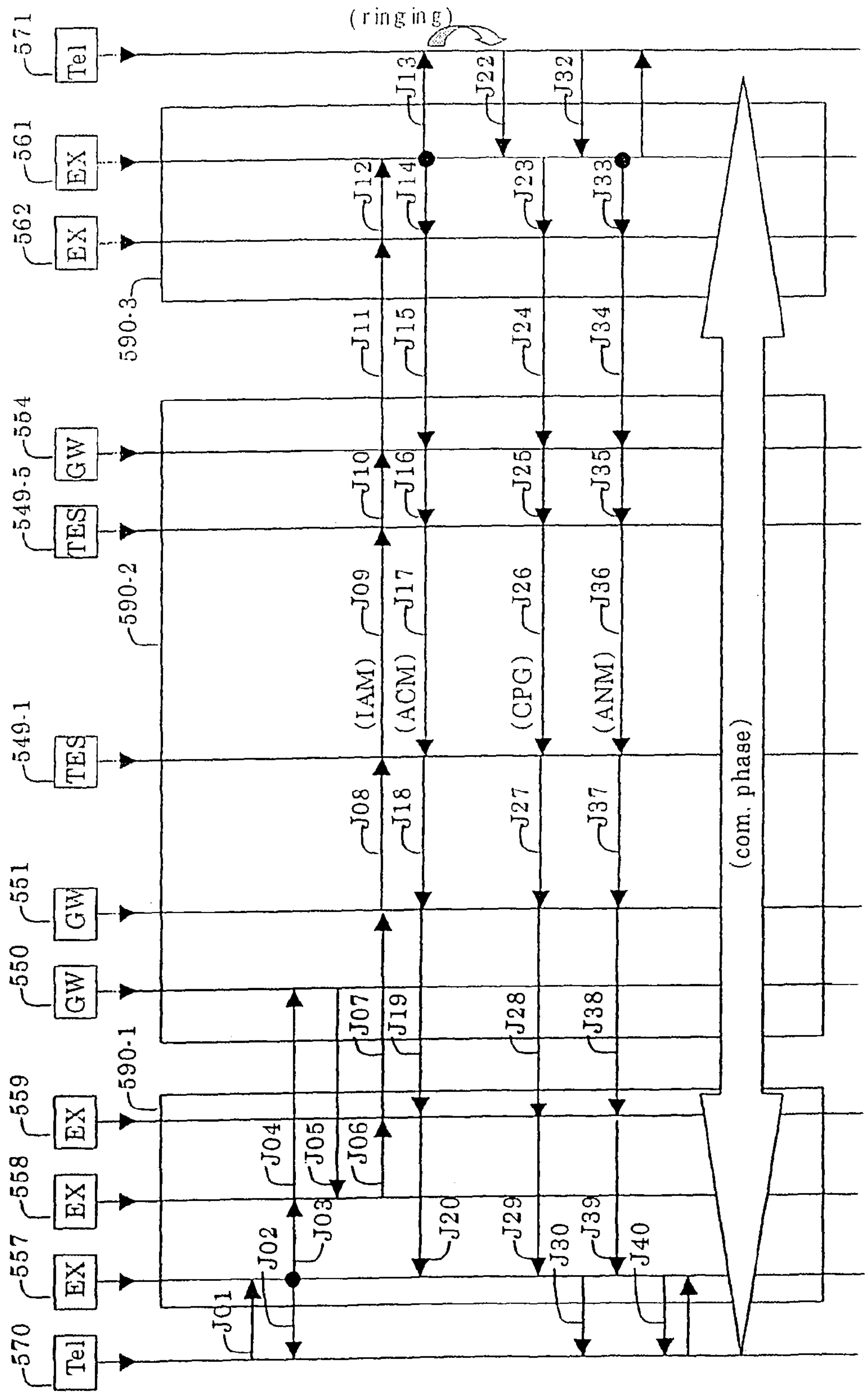

FIG. 131 is an explanatory diagram for explaining the eighth embodiment of the present invention;

FIG. 132 is a schematic diagram for indicating an internal portion of a media router, and a connection condition of IP terminal and LAN, connected to this media router;

FIG. 133 is a diagram for indicating an example of a calling priority order control management table;

FIG. 134 is a diagram for indicating an example of a calling priority order control management table;

FIG. 135 is a diagram for explaining a ninth embodiment of the present invention;

FIG. 136 is a block diagram for indicating an arrangement of the ninth embodiment of the present invention;

FIG. 137 is a flow chart for explaining an operation example of the ninth embodiment of the present invention;

FIG. 138 is an explanatory diagram for explaining the ninth embodiment of the present invention;

FIG. 139 is an explanatory diagram for explaining the ninth embodiment of the present invention;

FIG. 140 is an explanatory diagram for explaining the ninth embodiment of the present invention;

FIG. 141 is an explanatory diagram for explaining the ninth embodiment of the present invention;

FIG. 142 is an explanatory diagram for explaining the ninth embodiment of the present invention;

FIG. 143 is an explanatory diagram for explaining the ninth embodiment of the present invention;

FIG. 144 is an explanatory diagram for explaining the ninth embodiment of the present invention;

FIG. 145 is a block diagram for indicating an arrangement of the tenth embodiment of the present invention;

FIG. 146 is a flow chart for explaining an operation example of the tenth embodiment of the present invention;

FIG. 147 is an explanatory diagram for explaining the tenth embodiment of the present invention;

FIG. 148 is an explanatory diagram for explaining the tenth embodiment of the present invention;

FIG. 149 is an explanatory diagram for explaining the tenth embodiment of the present invention;

FIG. 150 is an explanatory diagram for explaining the tenth embodiment of the present invention;

FIG. 151 is an explanatory diagram for explaining the tenth embodiment of the present invention;

FIG. 152 is an explanatory diagram for explaining the tenth embodiment of the present invention;

FIG. 153 is an explanatory diagram for explaining the tenth embodiment of the present invention;

FIG. 154 is an explanatory diagram for explaining the tenth embodiment of the present invention;

FIG. 155 is an explanatory diagram for explaining the tenth embodiment of the present invention;

FIG. 156 is an explanatory diagram for explaining the tenth embodiment of the present invention;

FIG. 157 is an explanatory diagram for explaining the tenth embodiment of the present invention;

FIG. 158 is an explanatory diagram for explaining the tenth embodiment of the present invention;

FIG. 159 is an explanatory diagram for explaining the tenth embodiment of the present invention;

FIG. 160 is an explanatory diagram for explaining the tenth embodiment of the present invention;

FIG. 161 is an explanatory diagram for explaining the tenth embodiment of the present invention;

FIG. 162 is an explanatory diagram for explaining the tenth embodiment of the present invention;

FIG. 163 is an explanatory diagram for explaining the tenth embodiment of the present invention;

FIG. 164 is an explanatory diagram for explaining the tenth embodiment of the present invention;

FIG. 165 is an explanatory diagram for explaining the tenth embodiment of the present invention;

FIG. 166 is an explanatory diagram for explaining the tenth embodiment of the present invention;

FIG. 167 is an explanatory diagram for explaining the tenth embodiment of the present invention;

FIG. 168 is an explanatory diagram for explaining the tenth embodiment of the present invention;

FIG. 169 is an explanatory diagram for explaining the tenth embodiment of the present invention;

FIG. 170 is an explanatory diagram for explaining the tenth embodiment of the present invention;

FIG. 171 is an explanatory diagram for explaining the tenth embodiment of the present invention;

FIG. 172 is an explanatory diagram for explaining the tenth embodiment of the present invention;

FIG. 173 is an explanatory diagram for explaining the tenth embodiment of the present invention;

FIG. 174 is an explanatory diagram for explaining the tenth embodiment of the present invention;

FIG. 175 is an explanatory diagram for explaining the tenth embodiment of the present invention;

FIG. 176 is an explanatory diagram for explaining the tenth embodiment of the present invention;

FIG. 177 is an explanatory diagram for explaining the tenth embodiment of the present invention;

FIG. 178 is an explanatory diagram for explaining the tenth embodiment of the present invention;

FIG. 179 is a flow diagram for showing an operation example of the tenth embodiment of the present invention;

FIG. 180 is a flow diagram for showing an operation example of the tenth embodiment of the present invention;

FIG. 181 is a flow chart for describing an operation example (TCP-IAM) of the tenth embodiment of the present invention;

FIG. 182 is a flow chart for explaining an operation example (TCP-ACM) of the tenth embodiment of the present invention;

FIG. 183 is a flow chart for describing an operation example (TCP-CPG) of the tenth embodiment of the present invention;

FIG. 184 is a flow chart for explaining an operation example (TCP-ANM) of the tenth embodiment of the present invention;

FIG. 185 is a flow chart for describing an operation example (TCP-REL) of the tenth embodiment of the present invention;

FIG. 186 is a flow chart for explaining an operation example (TCP-RLC) of the tenth embodiment of the present invention;

FIG. 187 is an explanatory diagram for explaining the tenth embodiment of the present invention;

FIG. 188 is an explanatory diagram for explaining the tenth embodiment of the present invention;

FIG. 189 is an explanatory diagram for explaining the tenth embodiment of the present invention;

FIG. 190 is an explanatory diagram for explaining the tenth embodiment of the present invention;

FIG. 191 is an explanatory diagram for explaining the tenth embodiment of the present invention;

FIG. 192 is an explanatory diagram for explaining the tenth embodiment of the present invention;

FIG. 193 is an explanatory diagram for explaining the tenth embodiment of the present invention;

FIG. 194 is an explanatory diagram for explaining the tenth embodiment of the present invention;

FIG. 195 is an explanatory diagram for explaining the tenth embodiment of the present invention;

FIG. 196 is an explanatory diagram for explaining the tenth embodiment of the present invention;

FIG. 197 is an explanatory diagram for explaining the tenth embodiment of the present invention;

FIG. 198 is a block diagram for showing an arrangement of an 11-th embodiment of the present invention;

FIG. 199 is a flow chart for showing operations of the 11-th embodiment of the present invention;

FIG. 200 is a flow chart for showing operations of the 11th embodiment of the present invention;

FIG. 201 is a flow chart for showing operations of the 11th embodiment of the present invention;

FIG. 202 is a block diagram for showing an arrangement of a 12-th embodiment of the present invention;

FIG. 203 is an explanatory diagram for explaining the 12th embodiment of the present invention;

FIG. 204 is an explanatory diagram for explaining the 12th embodiment of the present invention;

FIG. 205 is a flow chart for showing operations of the 12th embodiment of the present invention.

Figure 206:
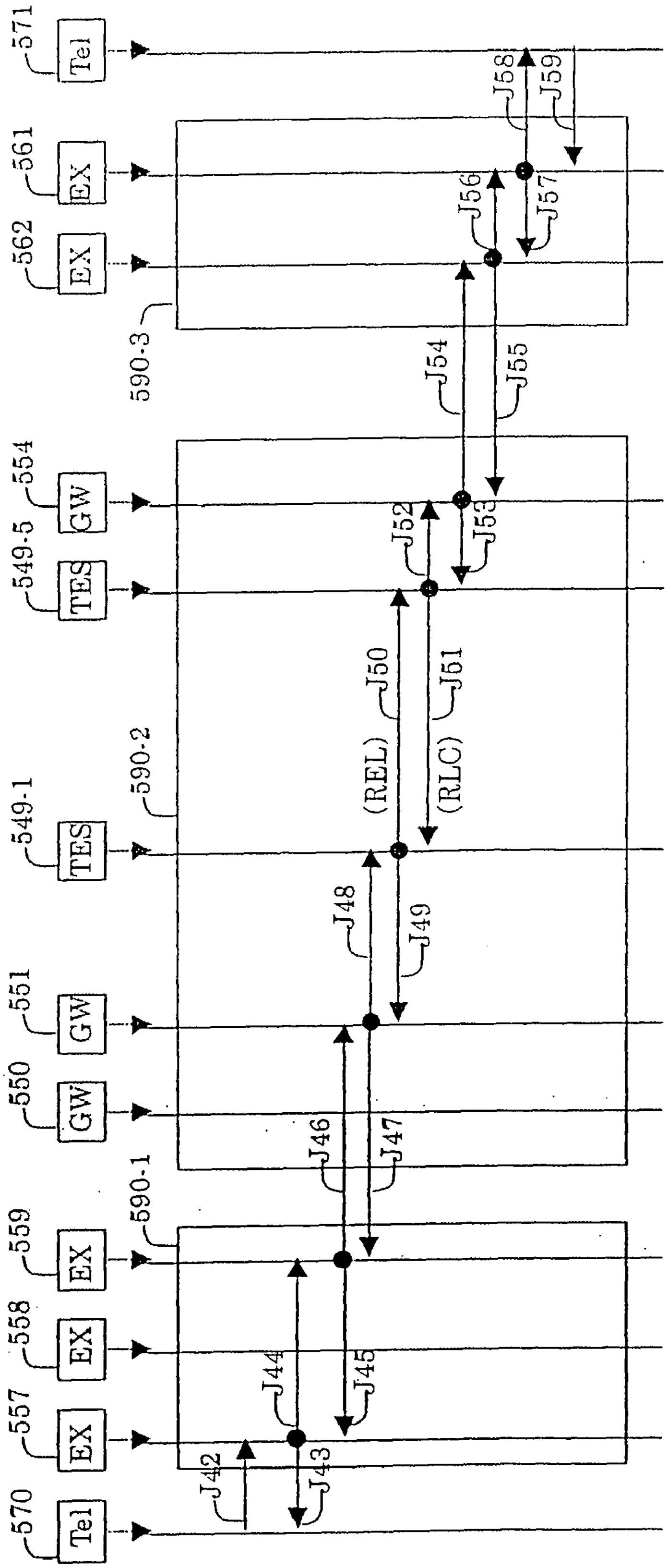
Figure 207:
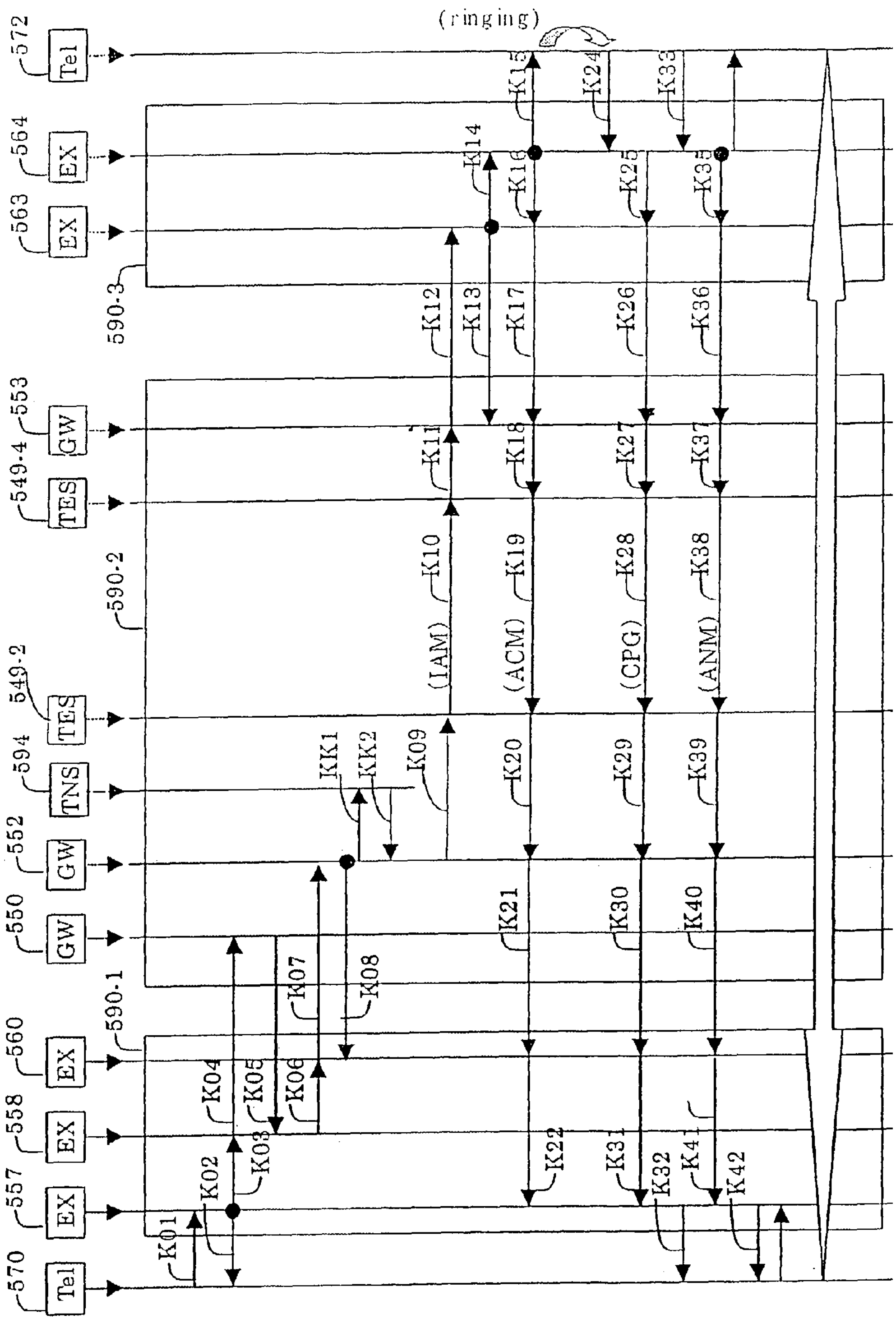
Figure 208:
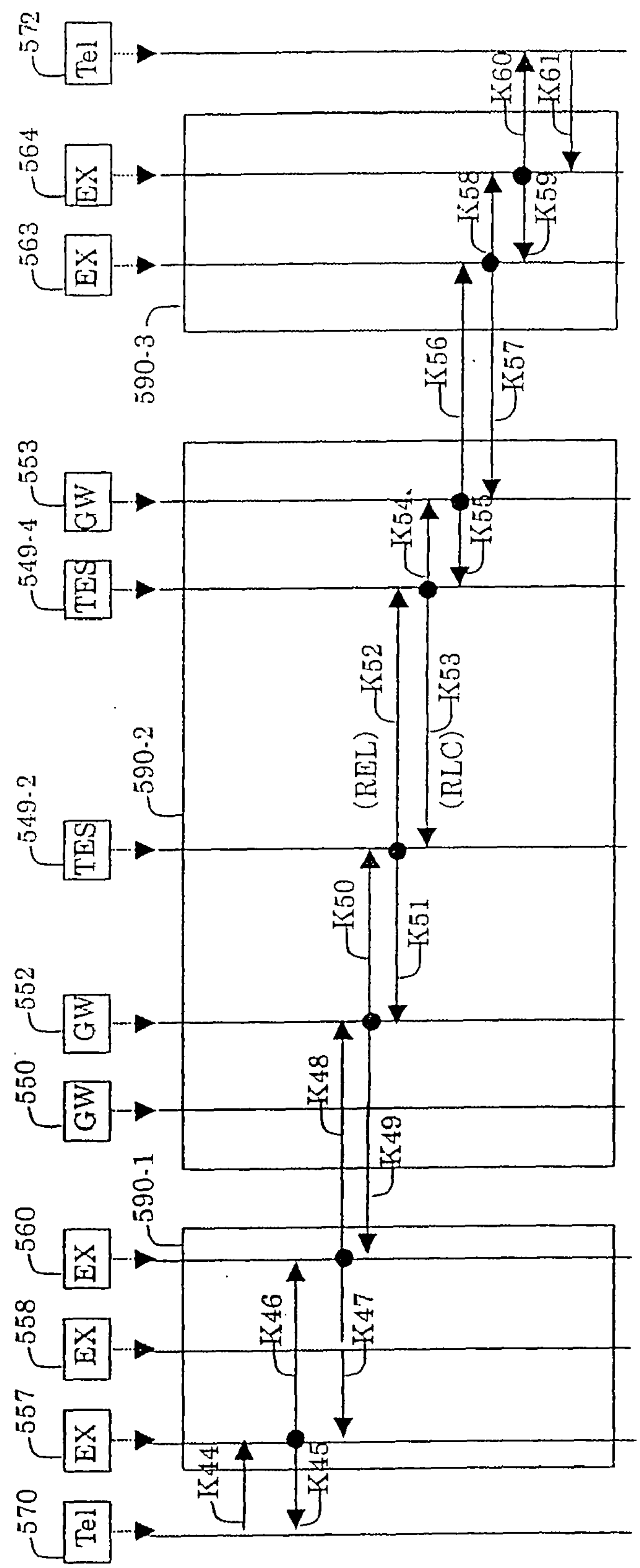
Figure 209:
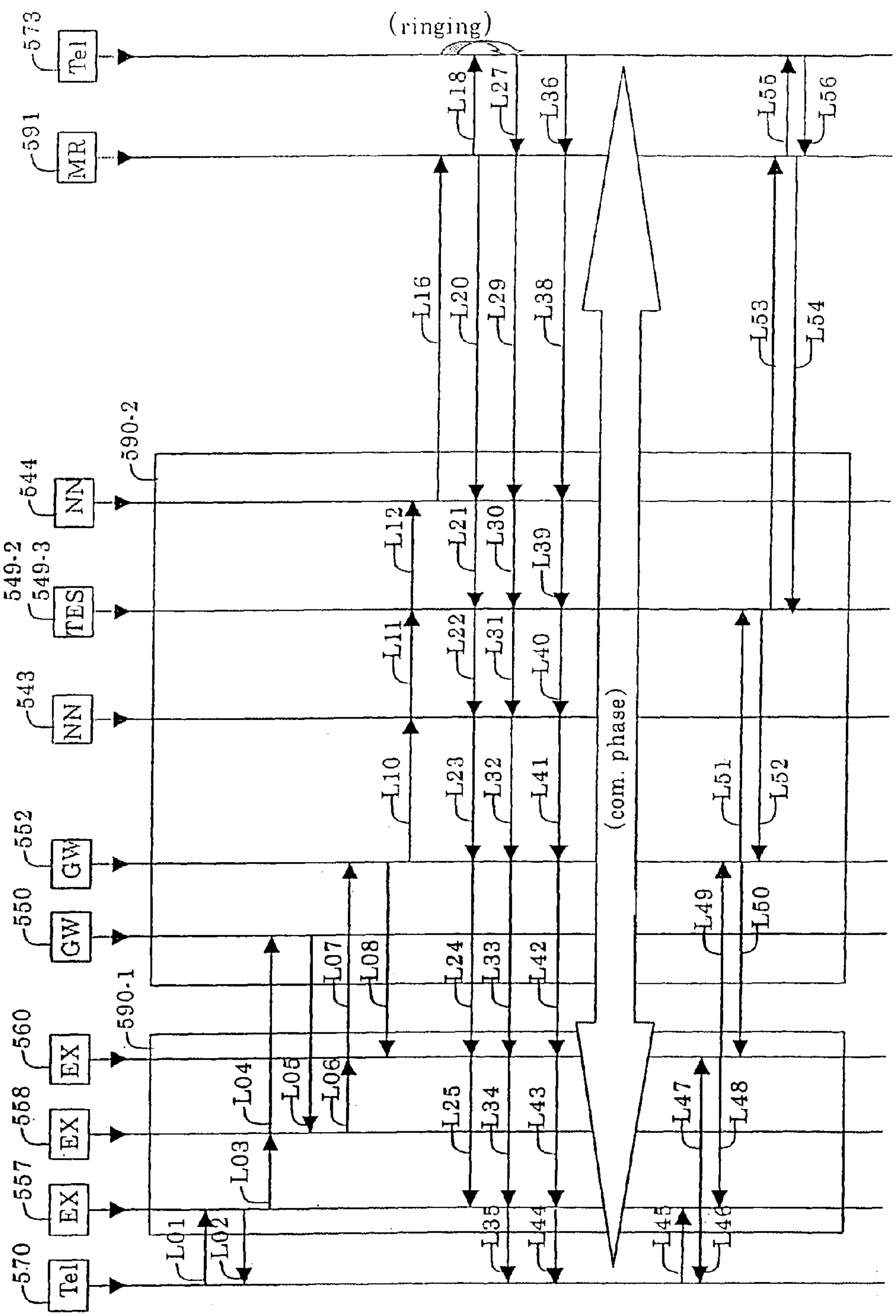
Figure 210:
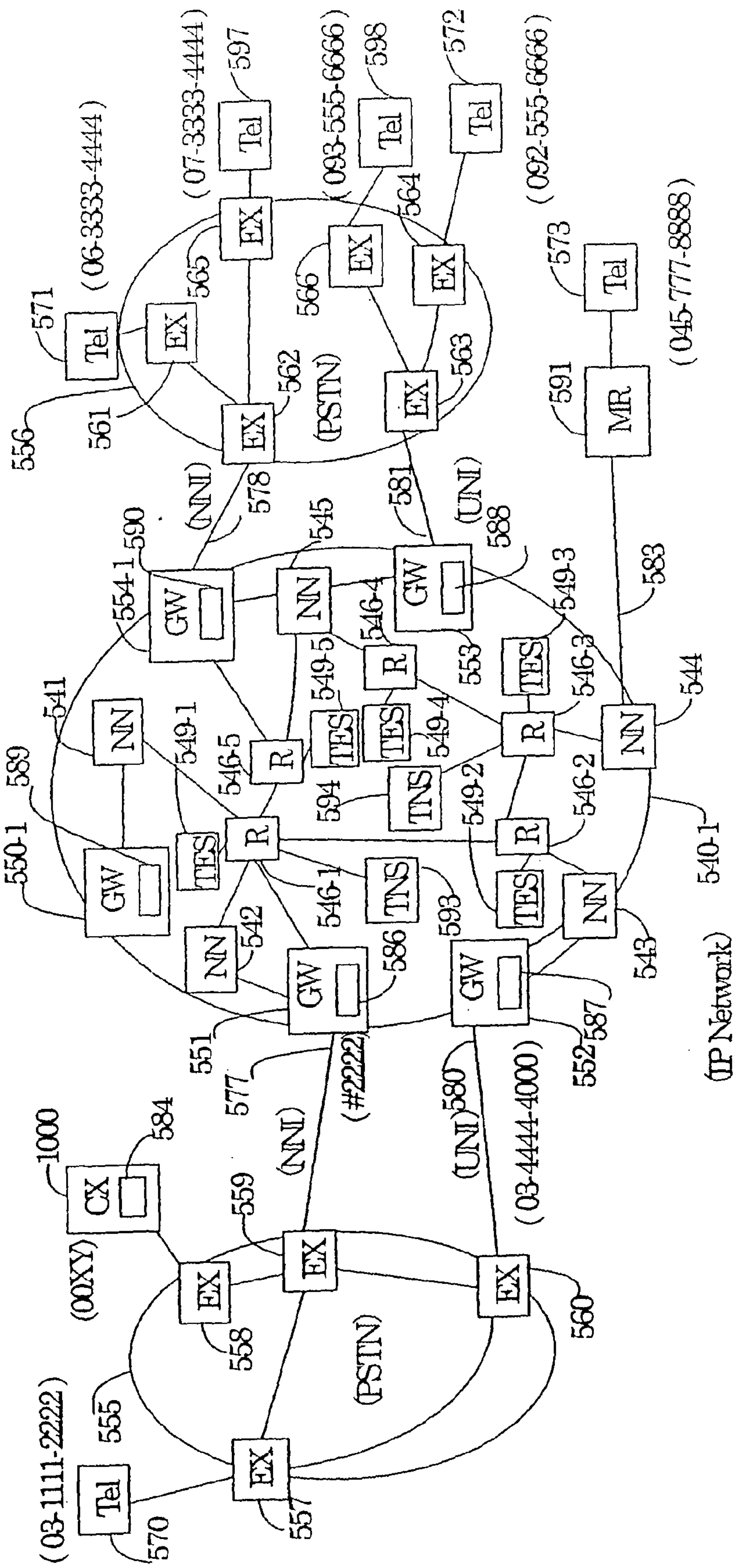
Figure 211:
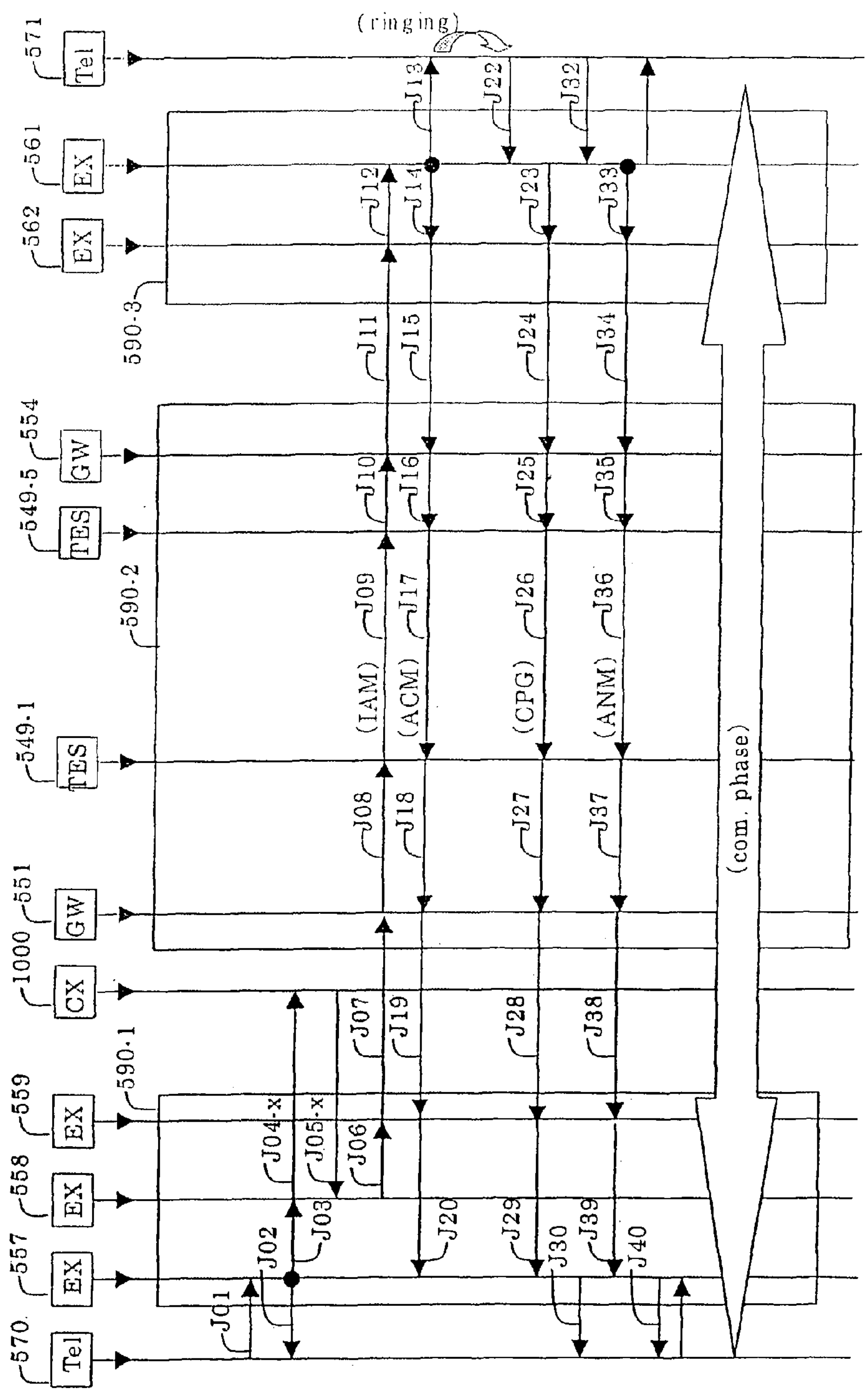
Figure 212:
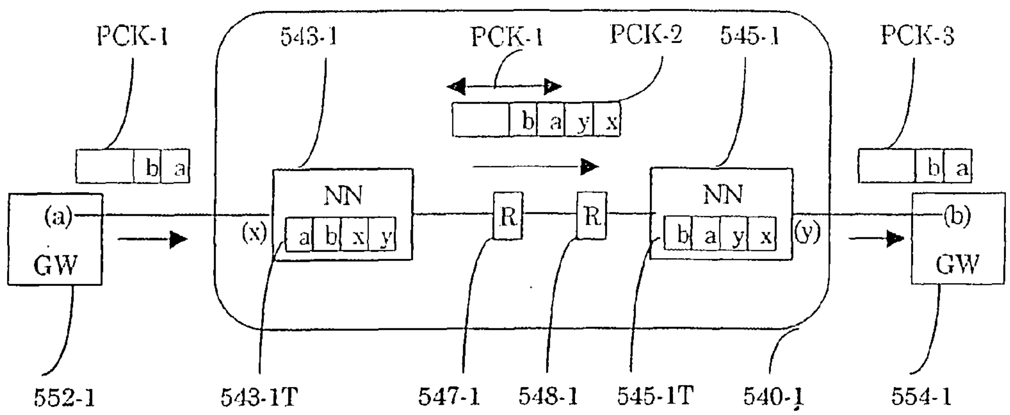
Figure 213:
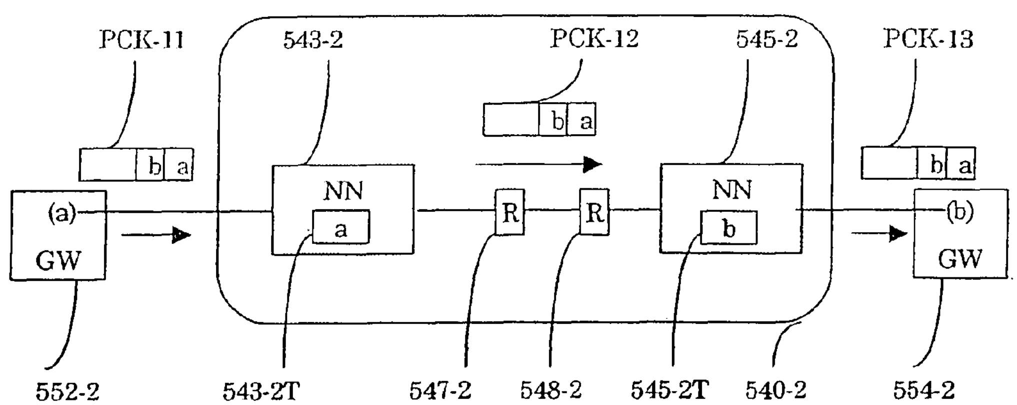
Figure 214:
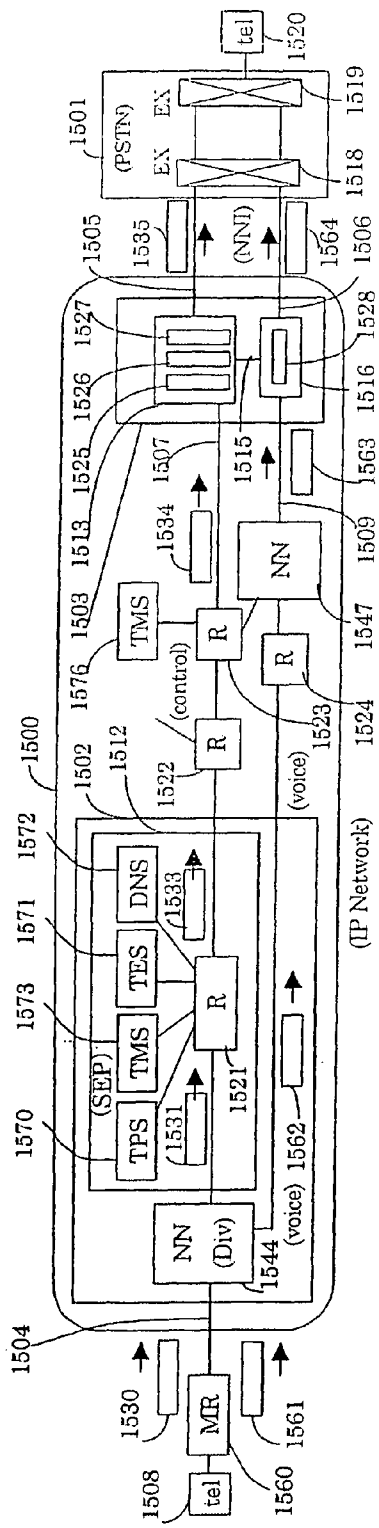
Figure 215:
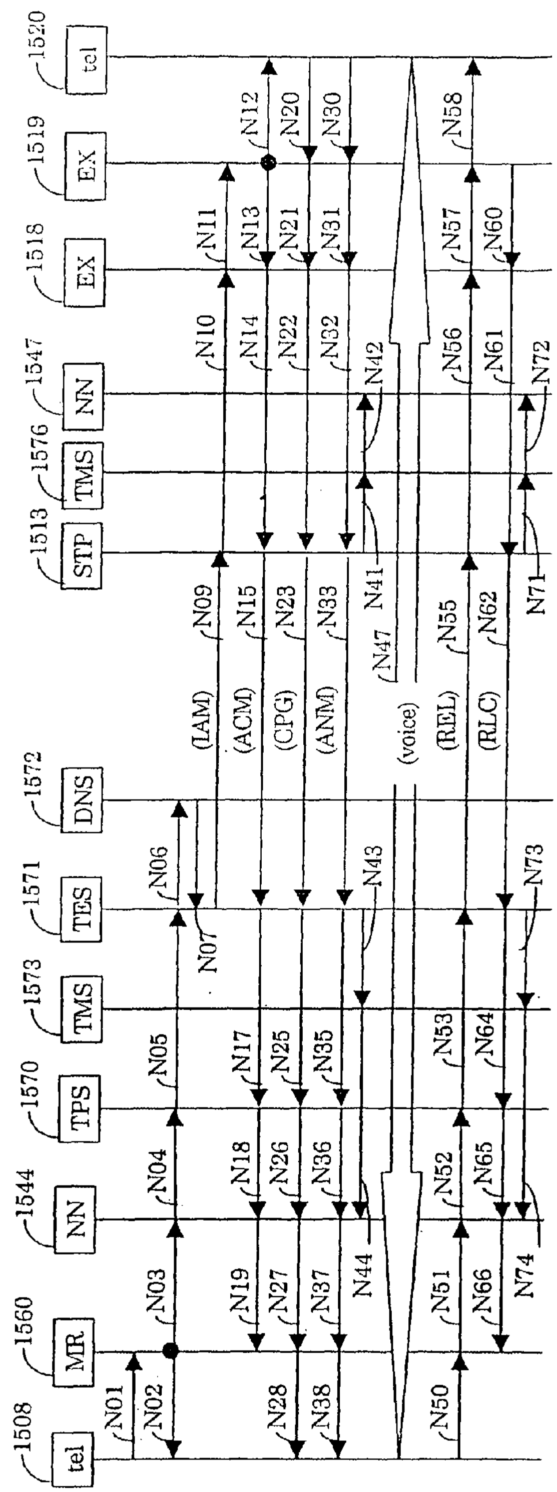
Figures 230, 231, 232, 233:
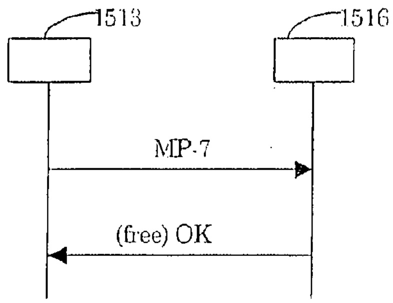
Figures 234, 235:
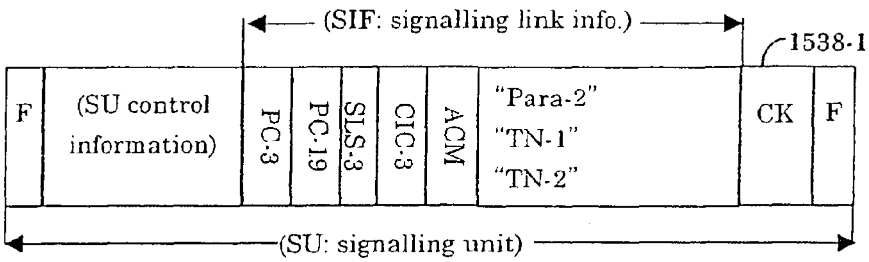
Figure 240:
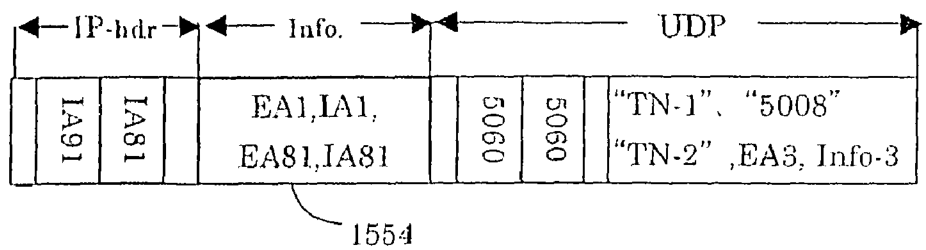
Figure 241:
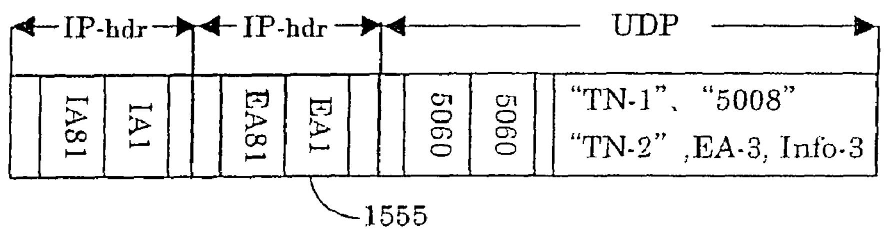
Figure 242:
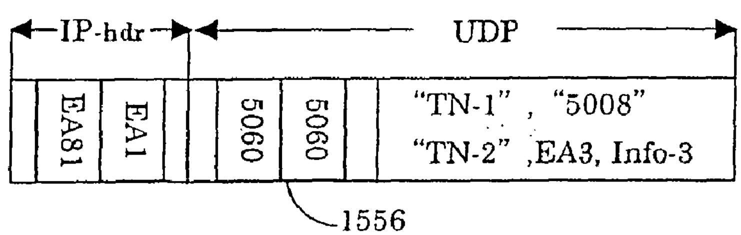
Figure 243:
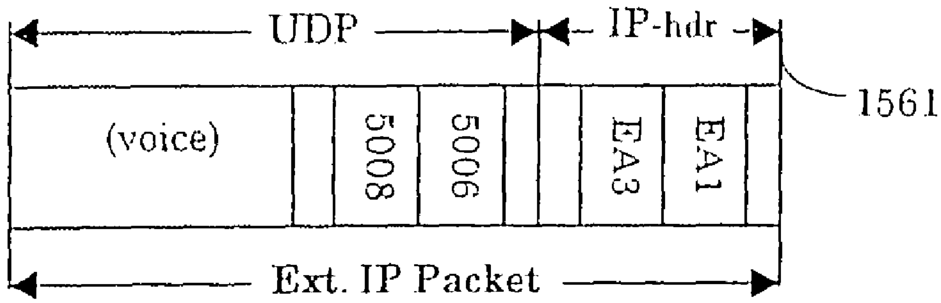
Figure 244:
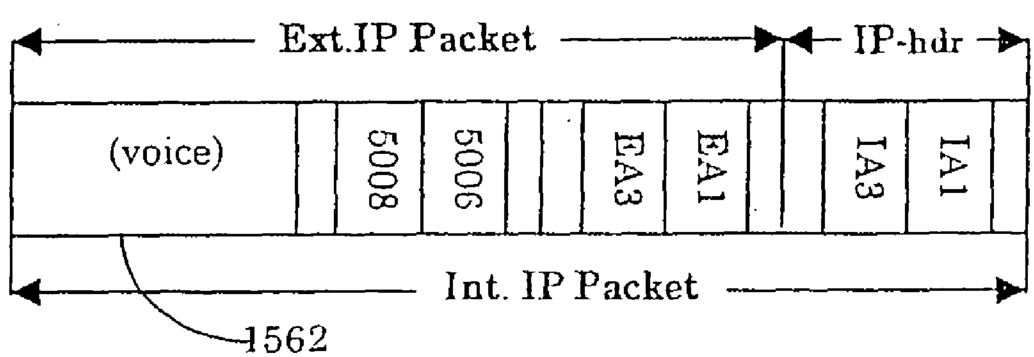
Figure 245:
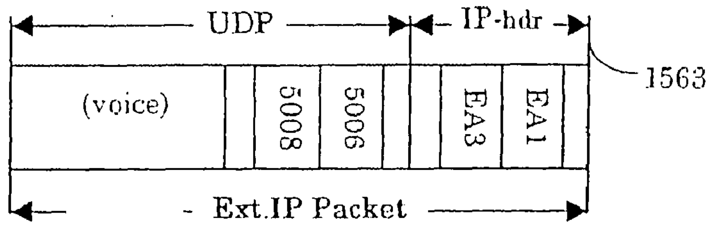
Figure 246:
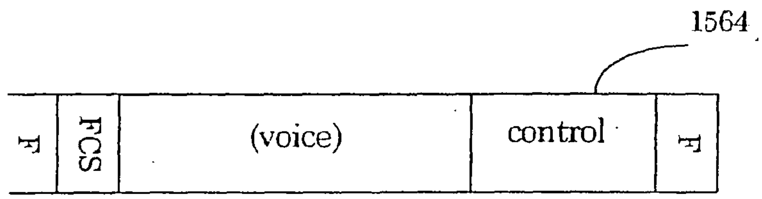
Figure 247:
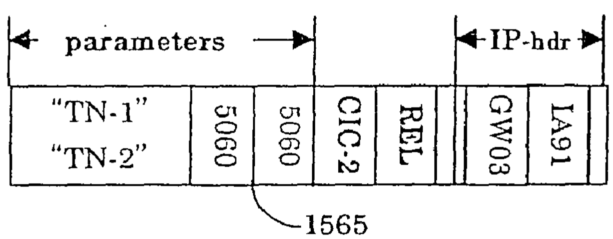
Figure 248:
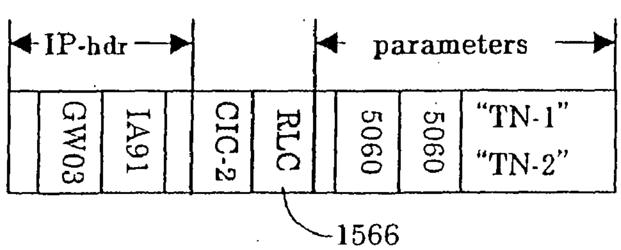
Figure 249:
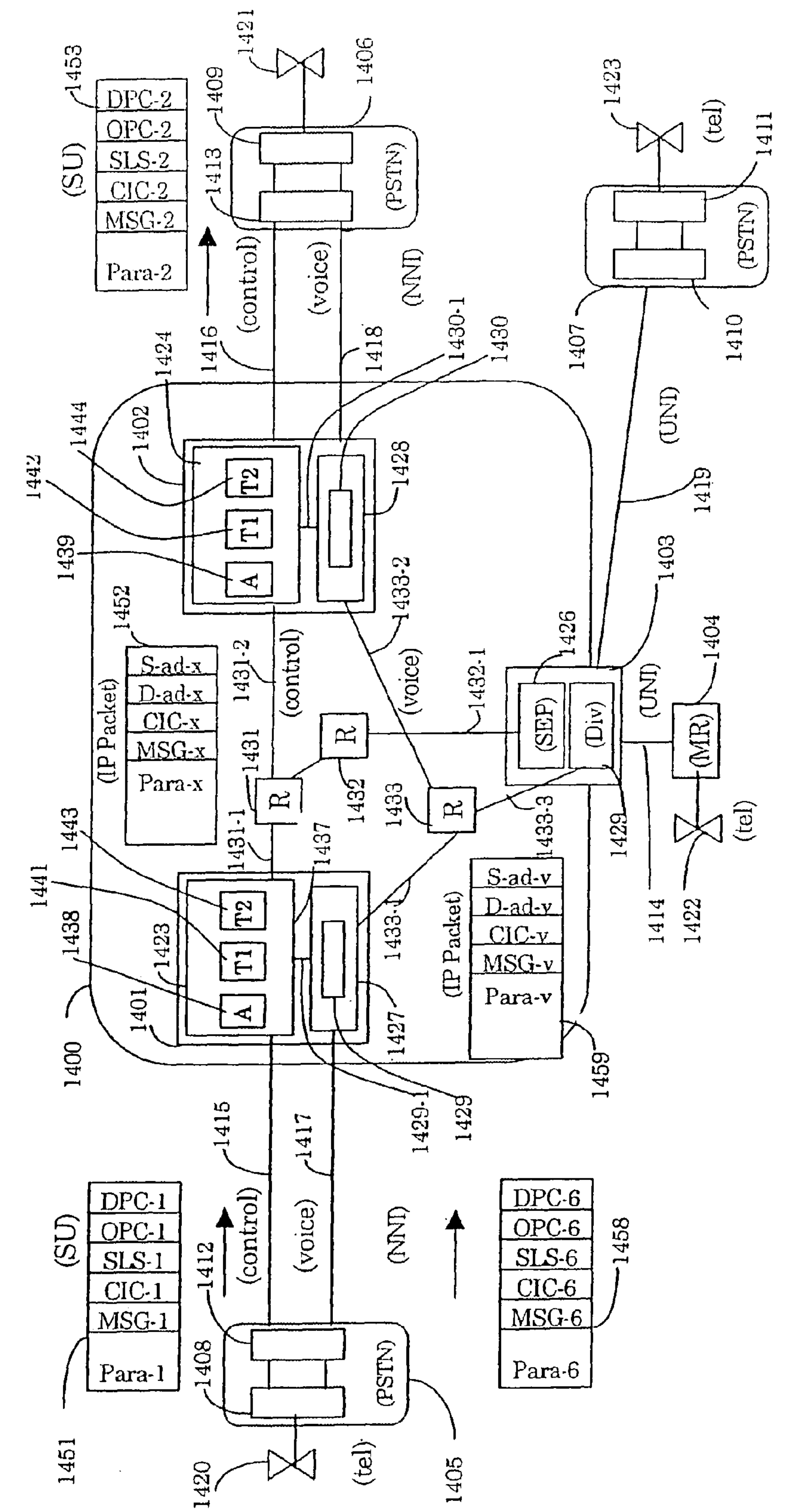
Figure 250:
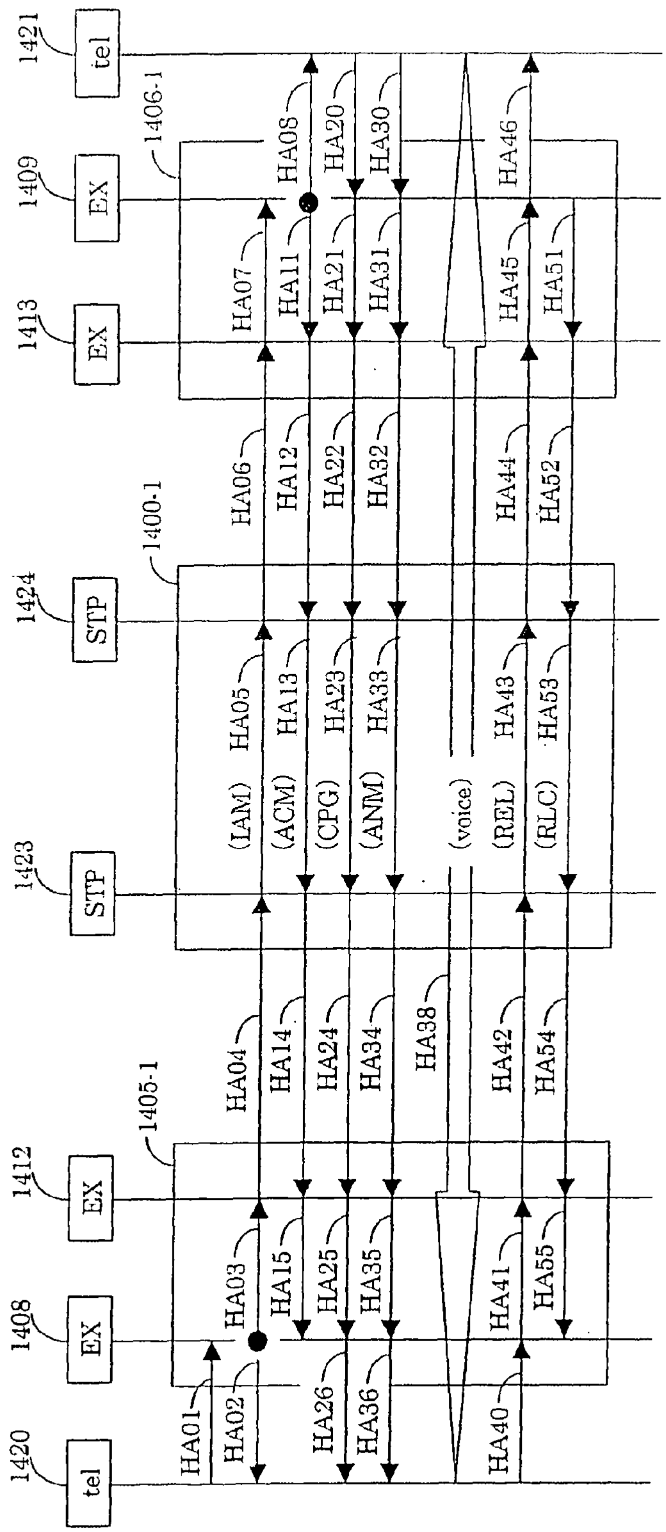
Figure 253:
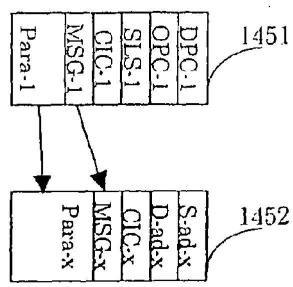
Figure 254:
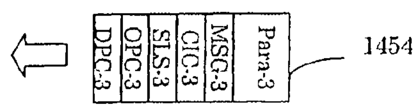
Figure 255:
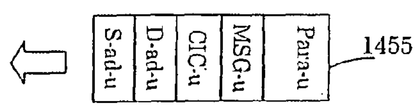
Figure 256:
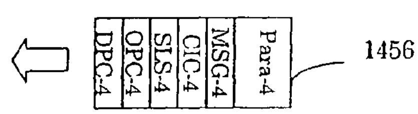
Figure 268:
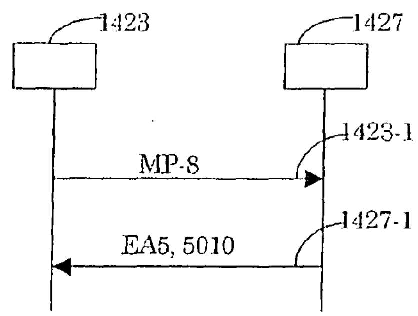
Figure 269:
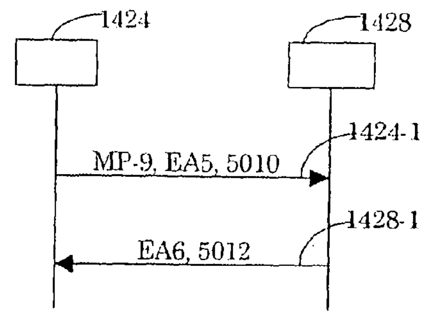
Figure 270:
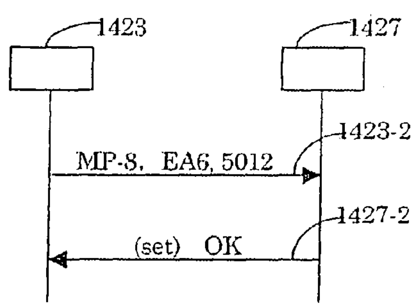
Figure 271:
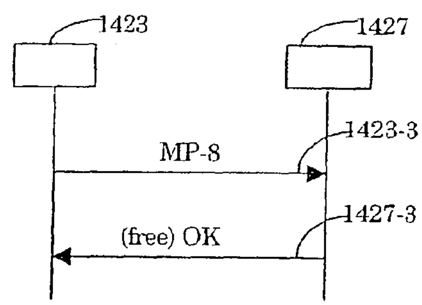
Figure 272:
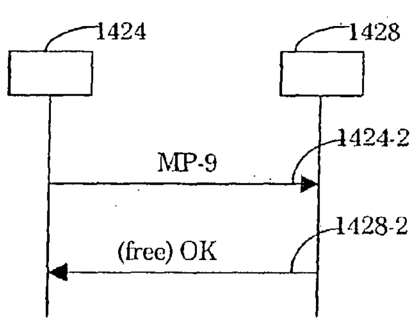
Figure 273:
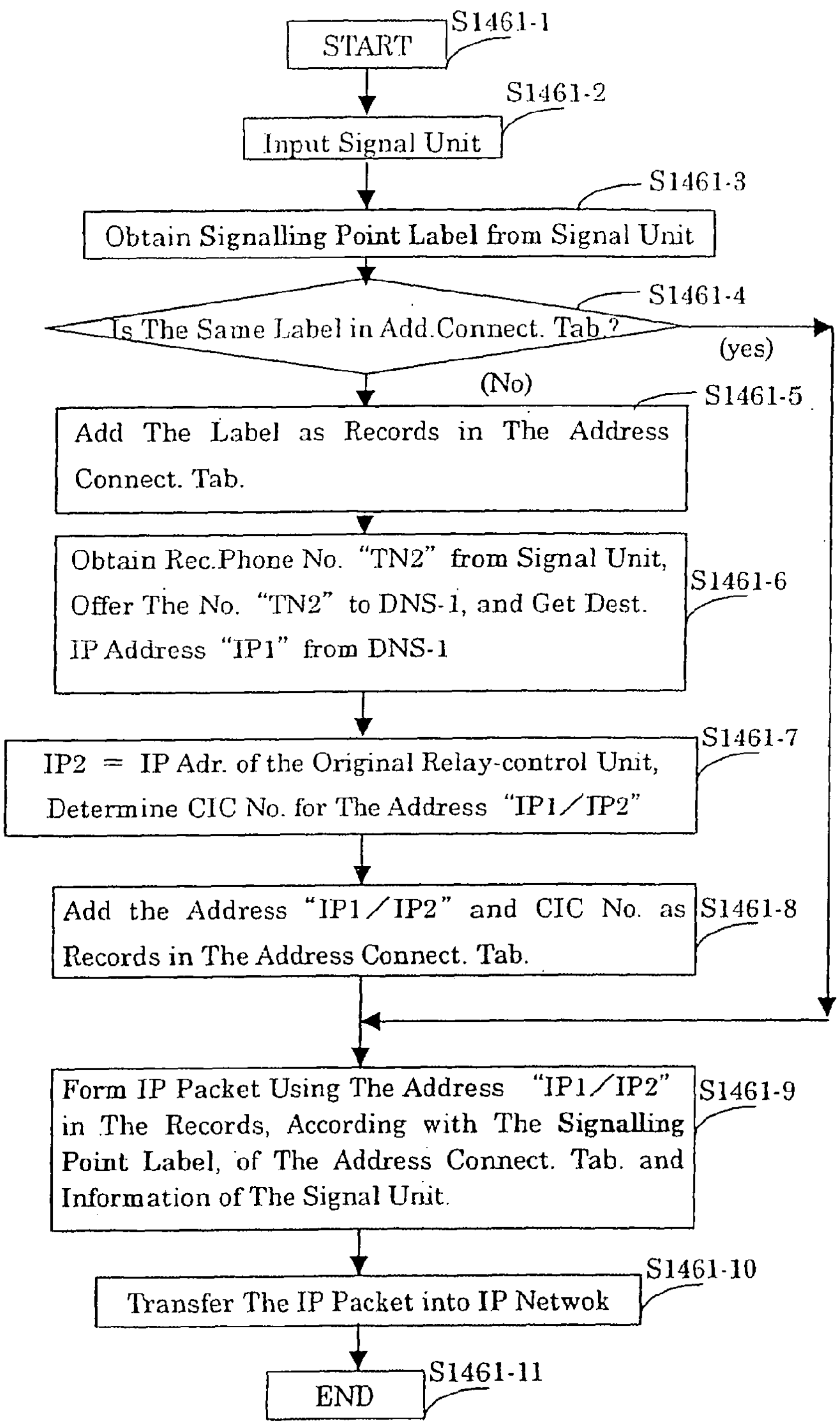

FIG. 206 is a flow chart for showing operations of the 12th embodiment of the present invention;

FIG. 207 is a flow chart for showing operations of the 12th embodiment of the present invention;

FIG. 208 is a flow chart for showing operations of the 12th embodiment of the present invention;

FIG. 209 is a flow chart for showing operations of the 12th embodiment of the present invention;

FIG. 210 is a flow chart for showing operations of the 12th embodiment of the present invention;

FIG. 211 is a flow chart for showing operations of the 12th embodiment of the present invention;

FIG. 212 is a flow chart for showing operations of the 12th embodiment of the present invention;

FIG. 213 is a flow chart for showing operations of the 12th embodiment of the present invention;

FIG. 214 is a block diagram for showing a 13-th embodiment of the present invention;

FIG. 215 is a flow chart for describing an operation example of the 13-th embodiment of the present invention;

FIG. 216 is an explanatory diagram for explaining the 13th embodiment of the present invention;

FIG. 217 is an explanatory diagram for explaining the 13th embodiment of the present invention;

FIG. 218 is an explanatory diagram for explaining the 13th embodiment of the present invention;

FIG. 219 is an explanatory diagram for explaining the 13th embodiment of the present invention;

FIG. 220 is an explanatory diagram for explaining the 13th embodiment of the present invention;

FIG. 221 is an explanatory diagram for explaining the 13th embodiment of the present invention;

FIG. 222 is an explanatory diagram for explaining the 13th embodiment of the present invention;

FIG. 223 is an explanatory diagram for explaining the 13th embodiment of the present invention;

FIG. 224 is an explanatory diagram for explaining the 13th embodiment of the present invention;

FIG. 225 is an explanatory diagram for explaining the 13th embodiment of the present invention;

FIG. 226 is an explanatory diagram for explaining the 13th embodiment of the present invention;

FIG. 227 is an explanatory diagram for explaining the 13th embodiment of the present invention;

FIG. 228 is an explanatory diagram for explaining the 13th embodiment of the present invention;

FIG. 229 is an explanatory diagram for explaining the 13-th embodiment of the present invention;

FIG. 230 is an explanatory diagram for explaining the 13th embodiment of the present invention;

FIG. 231 is an explanatory diagram for explaining the 13th embodiment of the present invention;

FIG. 232 is an explanatory diagram for explaining the $13^{th}$ embodiment of the present invention;

FIG. 233 is an explanatory diagram for explaining the 13th embodiment of the present invention;

FIG. 234 is an explanatory diagram for explaining the 13th embodiment of the present invention;

FIG. 235 is an explanatory diagram for explaining the 13th embodiment of the present invention;

FIG. 236 is an explanatory diagram for explaining the 13th embodiment of the present invention;

FIG. 237 is an explanatory diagram for explaining the 13th embodiment of the present invention;

FIG. 238 is an explanatory diagram for explaining the 13th embodiment of the present invention;

FIG. 239 is an explanatory diagram for explaining the 13th embodiment of the present invention;

FIG. 240 is an explanatory diagram for explaining the 13th embodiment of the present invention;

FIG. 241 is an explanatory diagram for explaining the 13th embodiment of the present invention;

FIG. 242 is an explanatory diagram for explaining the 13th embodiment of the present invention;

FIG. 243 is an explanatory diagram for explaining the 13th embodiment of the present invention;

FIG. 244 is an explanatory diagram for explaining the 13th embodiment of the present invention;

FIG. 245 is an explanatory diagram for explaining the 13th embodiment of the present invention;

FIG. 246 is an explanatory diagram for explaining the 13th embodiment of the present invention;

FIG. 247 is an explanatory diagram for explaining the 13th embodiment of the present invention;

FIG. 248 is an explanatory diagram for explaining the 13th embodiment of the present invention;

FIG. 249 is a block diagram for showing a 14-th embodiment of the present invention;

FIG. 250 is a flow chart for describing an operation example of the 14-th embodiment of the present invention;

FIG. 251 is an explanatory diagram for explaining the 14th embodiment of the present invention;

FIG. 252 is an explanatory diagram for explaining the 14th embodiment of the present invention;

FIG. 253 is an explanatory diagram for explaining the 14th embodiment of the present invention;

FIG. 254 is an explanatory diagram for explaining the 14th embodiment of the present invention;

FIG. 255 is an explanatory diagram for explaining the 14th embodiment of the present invention;

FIG. 256 is an explanatory diagram for explaining the 14th embodiment of the present invention;

FIG. 257 is an explanatory diagram for explaining the 14th embodiment of the present invention;

FIG. 258 is an explanatory diagram for explaining the 14th embodiment of the present invention;

FIG. 259 is an explanatory diagram for explaining the 14th embodiment of the present invention;

FIG. 260 is an explanatory diagram for explaining the 14th embodiment of the present invention;

FIG. 261 is an explanatory diagram for explaining the 14th embodiment of the present invention;

FIG. 262 is an explanatory diagram for explaining the 14th embodiment of the present invention;

FIG. 263 is an explanatory diagram for explaining the 14th embodiment of the present invention;

FIG. 264 is an explanatory diagram for explaining the 14th embodiment of the present invention;

FIG. 265 is an explanatory diagram for explaining the 14th embodiment of the present invention;

FIG. 266 is an explanatory diagram for explaining the 14th embodiment of the present invention;

FIG. 267 is an explanatory diagram for explaining the 14th embodiment of the present invention;

FIG. 268 is an explanatory diagram for explaining the 14th embodiment of the present invention;

FIG. 269 is an explanatory diagram for explaining the 14th embodiment of the present invention;

FIG. 270 is an explanatory diagram for explaining the 14th embodiment of the present invention;

FIG. 271 is an explanatory diagram for explaining the 14th embodiment of the present invention;

FIG. 272 is an explanatory diagram for explaining the 14th embodiment of the present invention;

FIG. 273 is an explanatory diagram for explaining the 14-th embodiment of the present invention.

Figure 274:
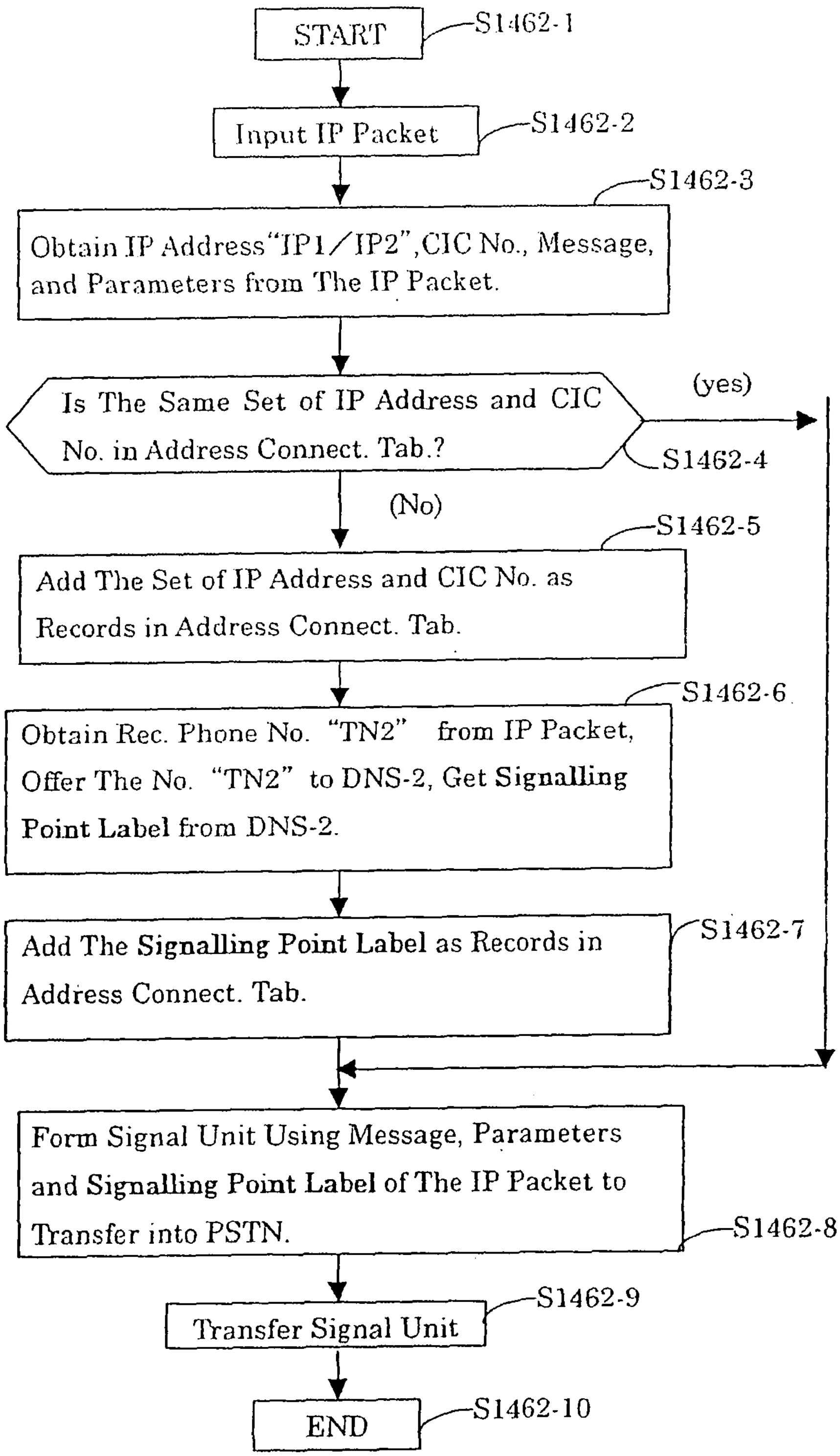
Figure 275:
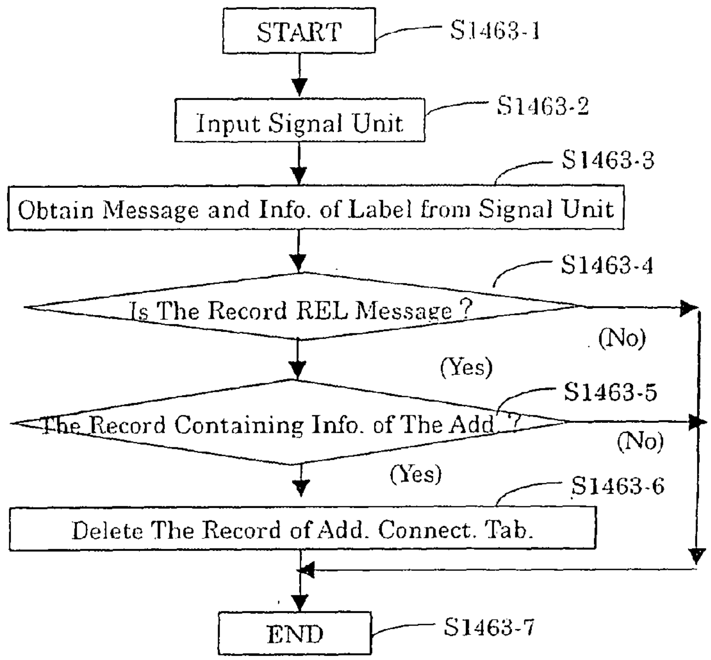
Figure 276:
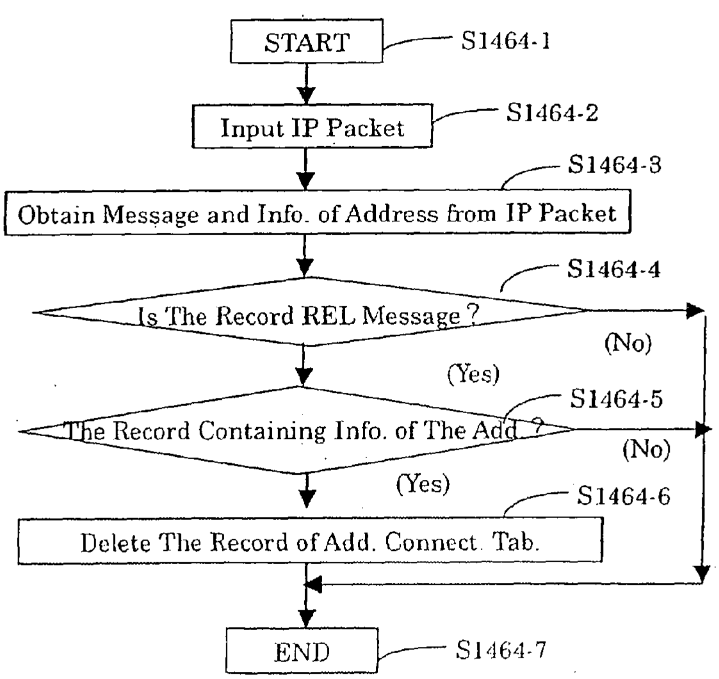
Figure 277:
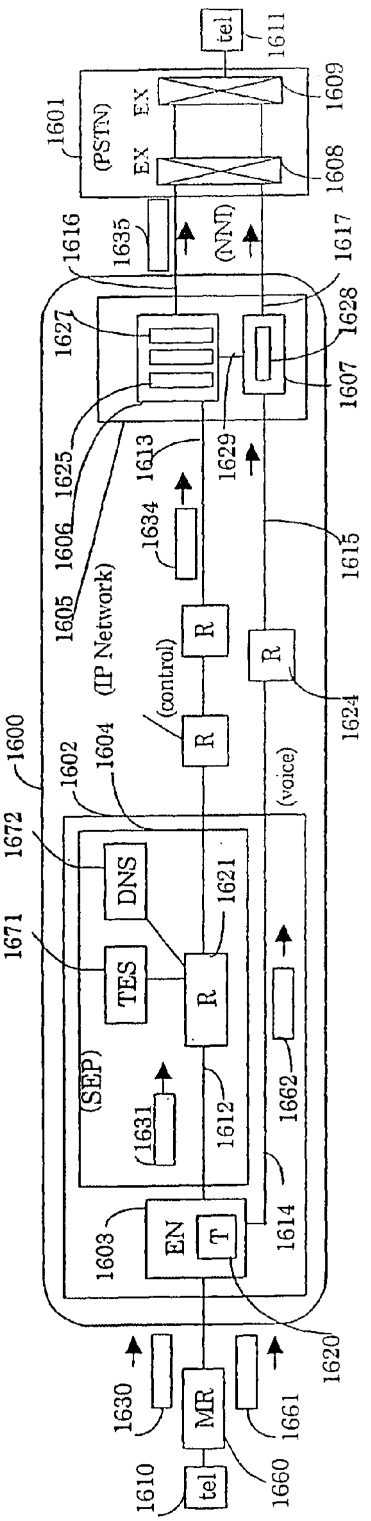
Figure 278:
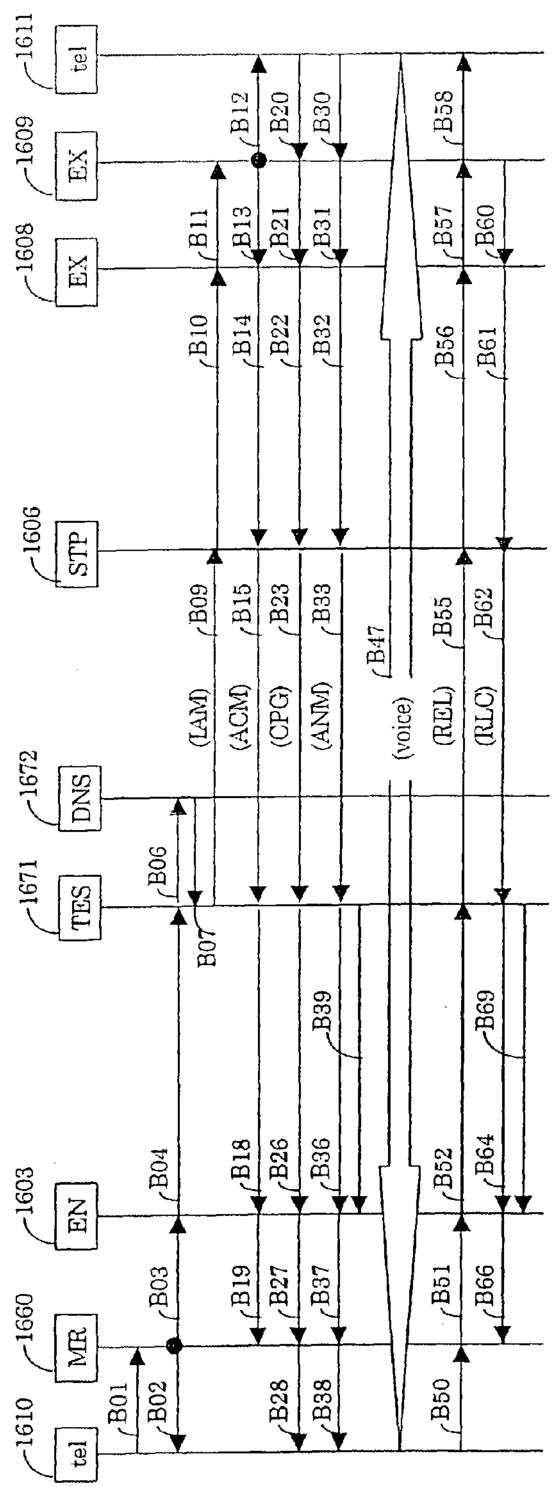
Figures 279, 280, 281:
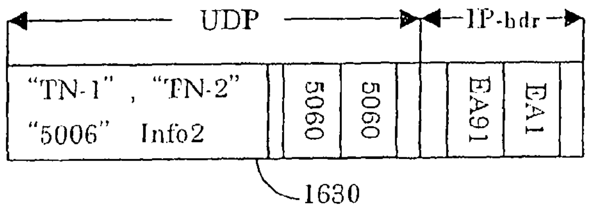
Figures 287, 288, 289, 290, 291:
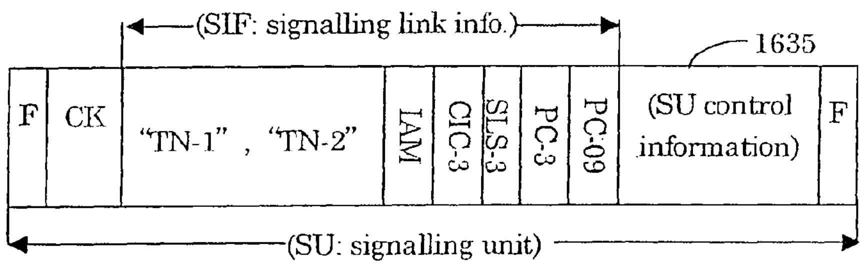
Figure 305:
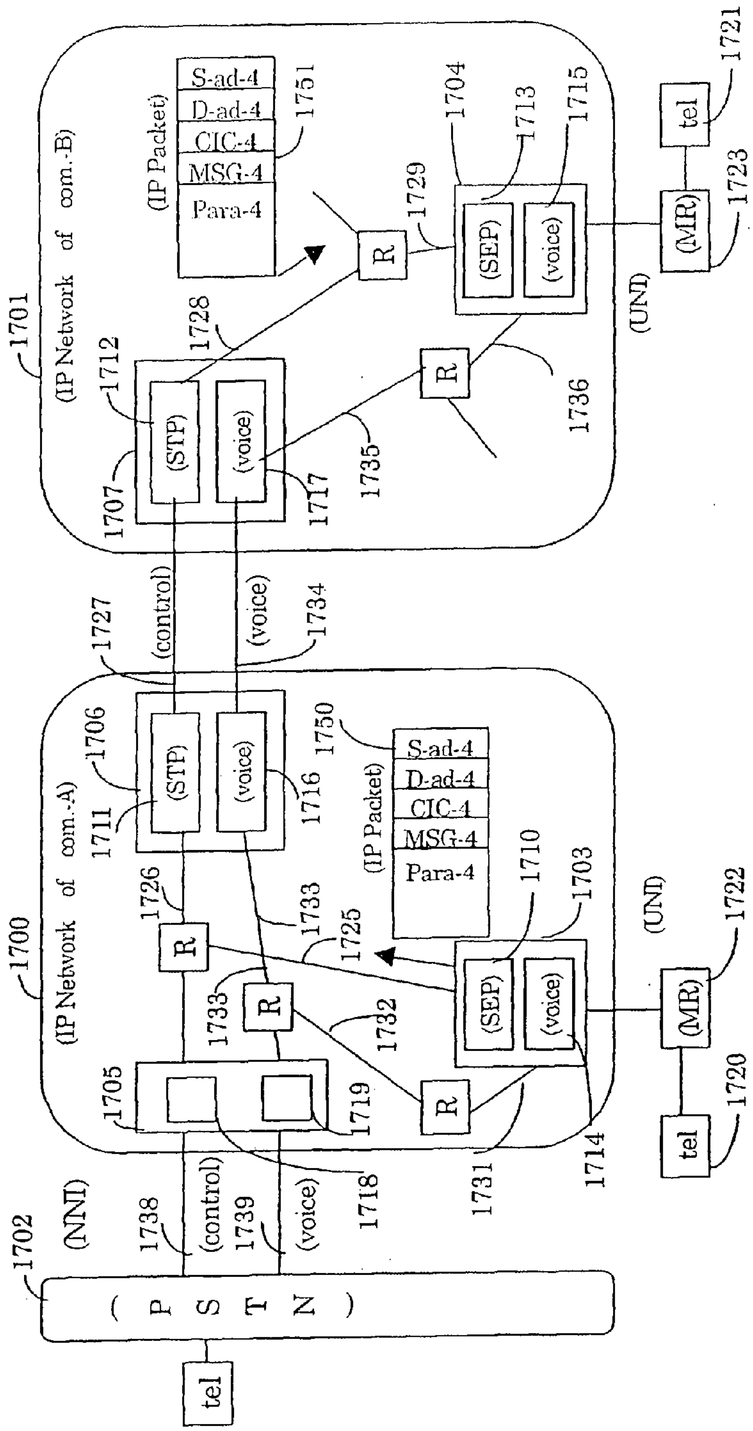
Figure 306:
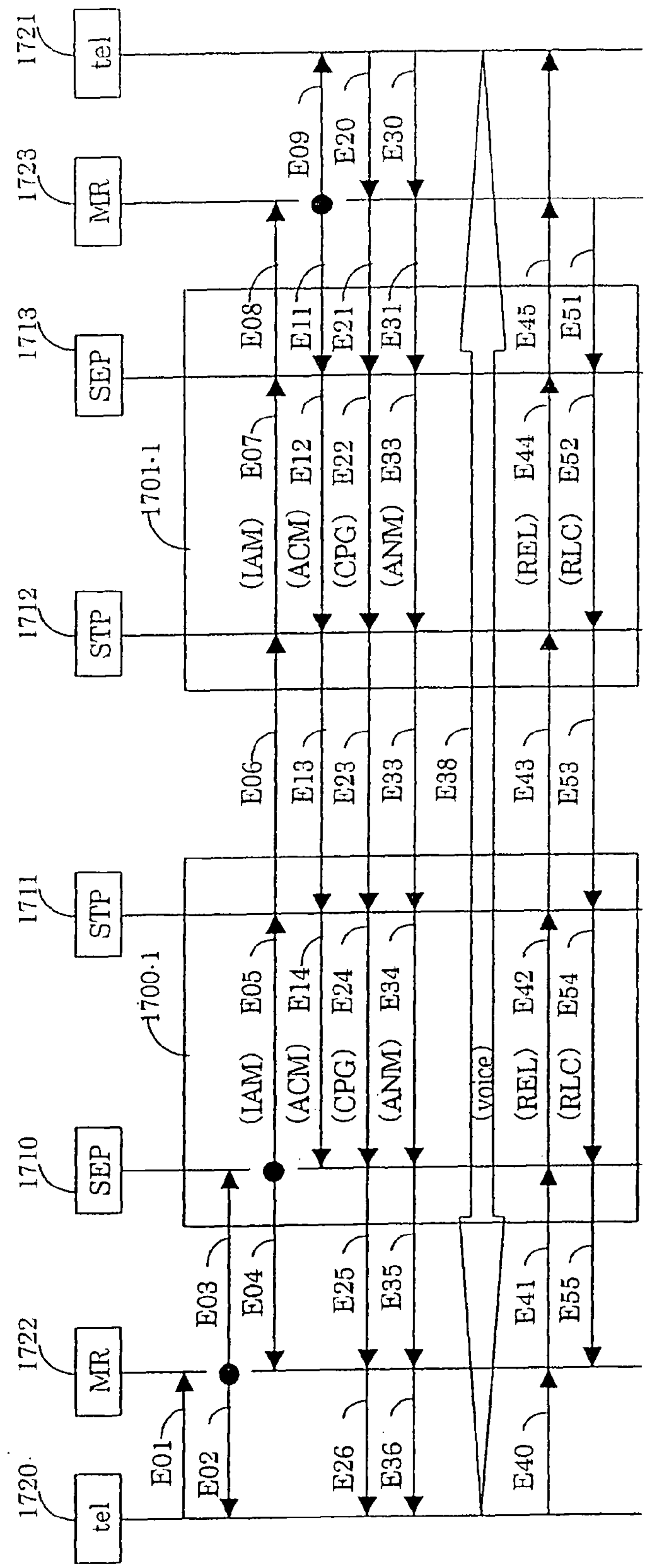
Figure 310:
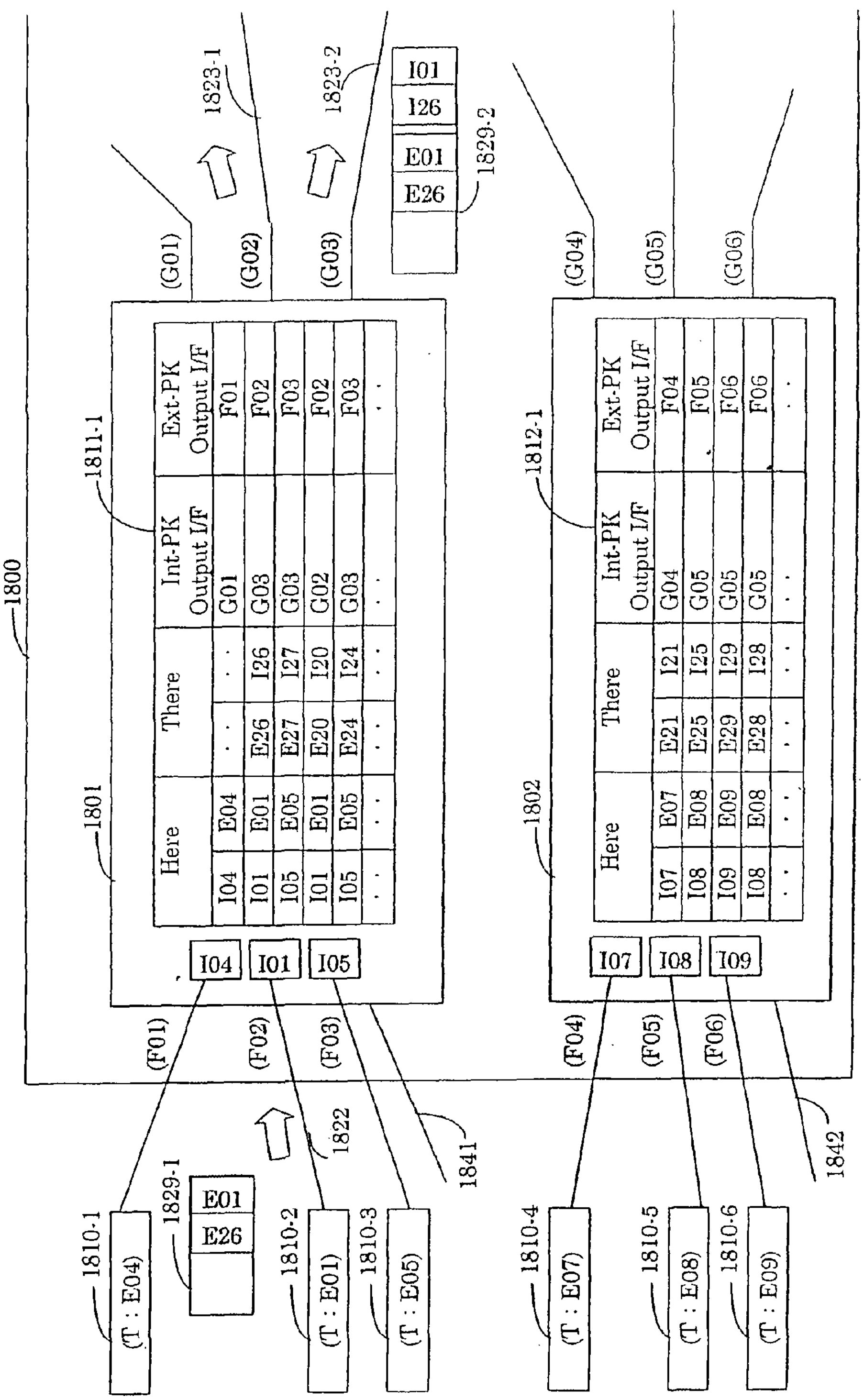
Figure 311:
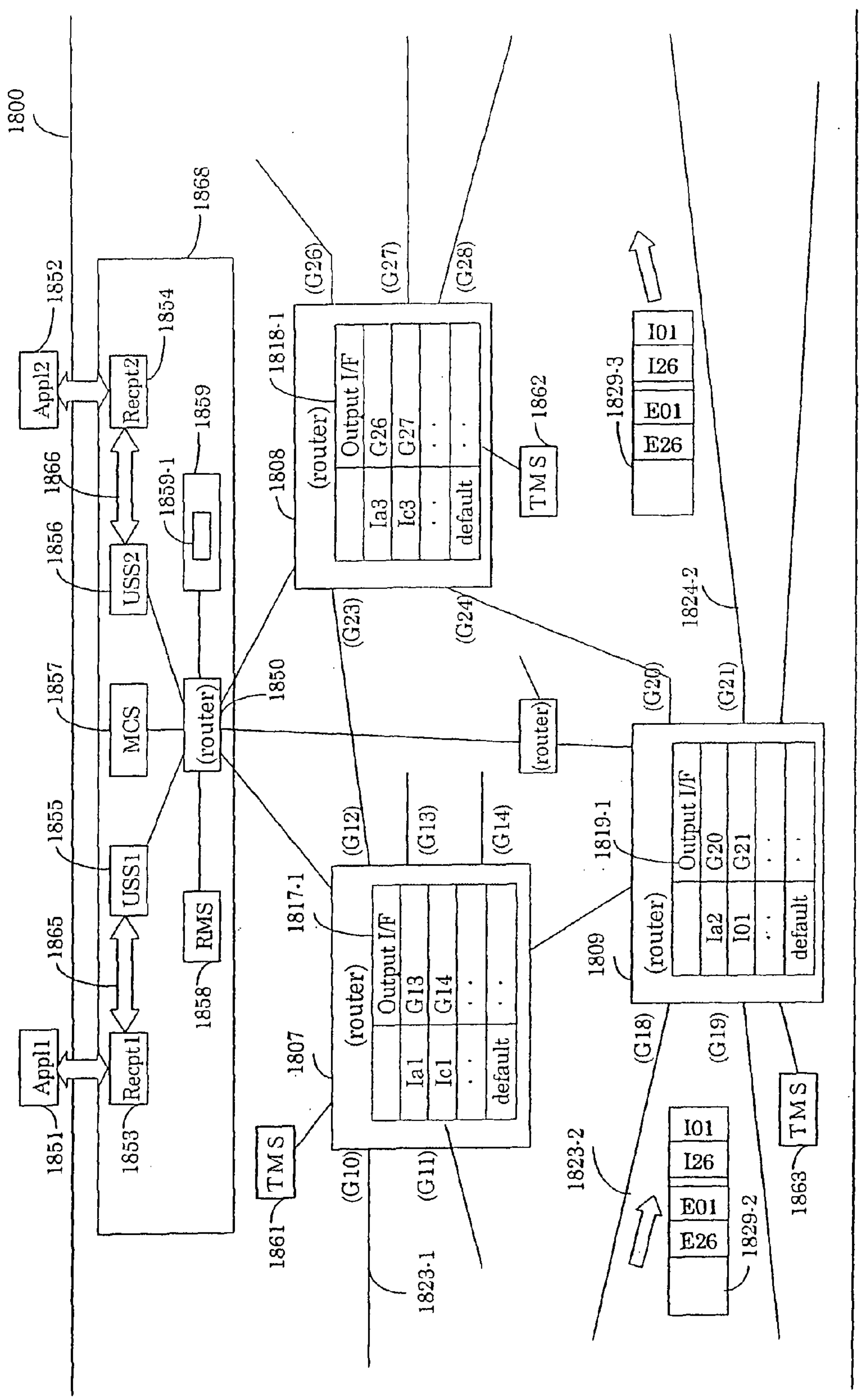
Figure 312:
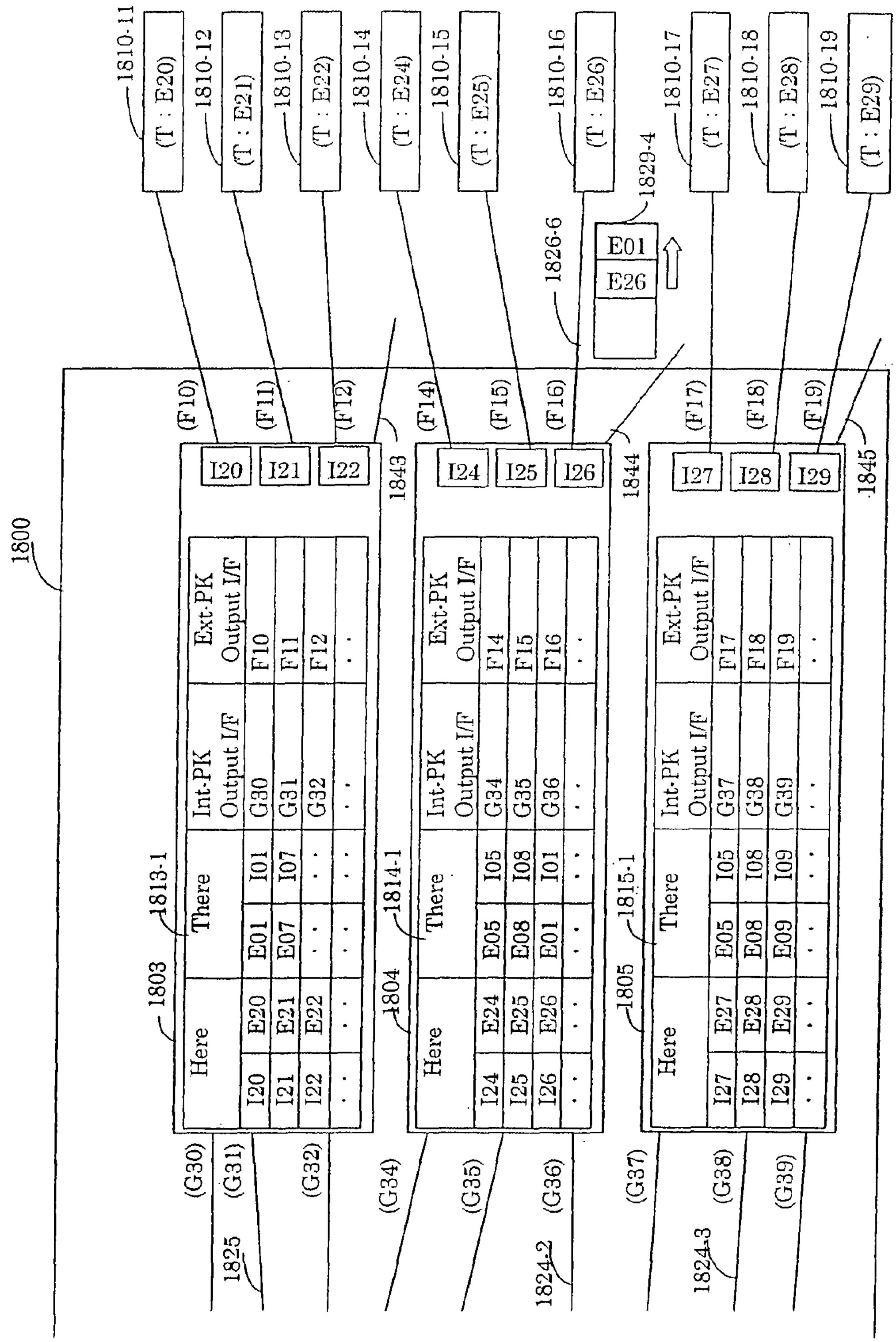
Figures 313, 314, 315, 316:
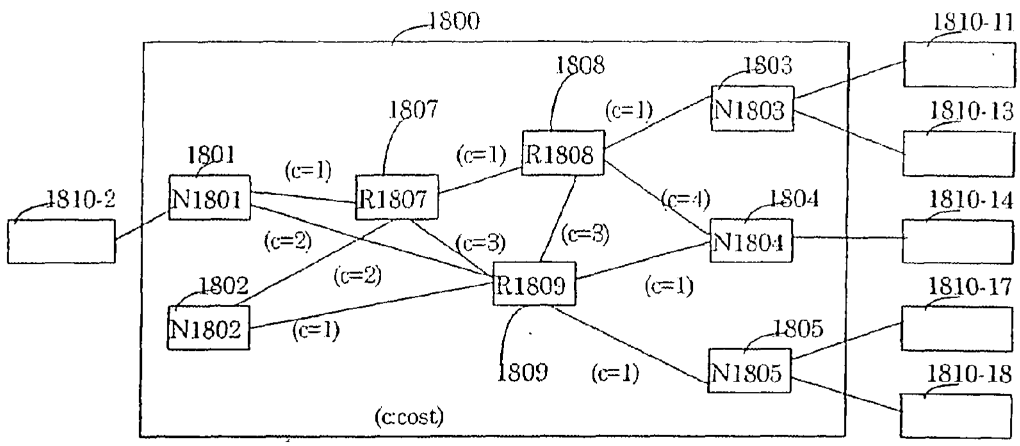
Figure 317:
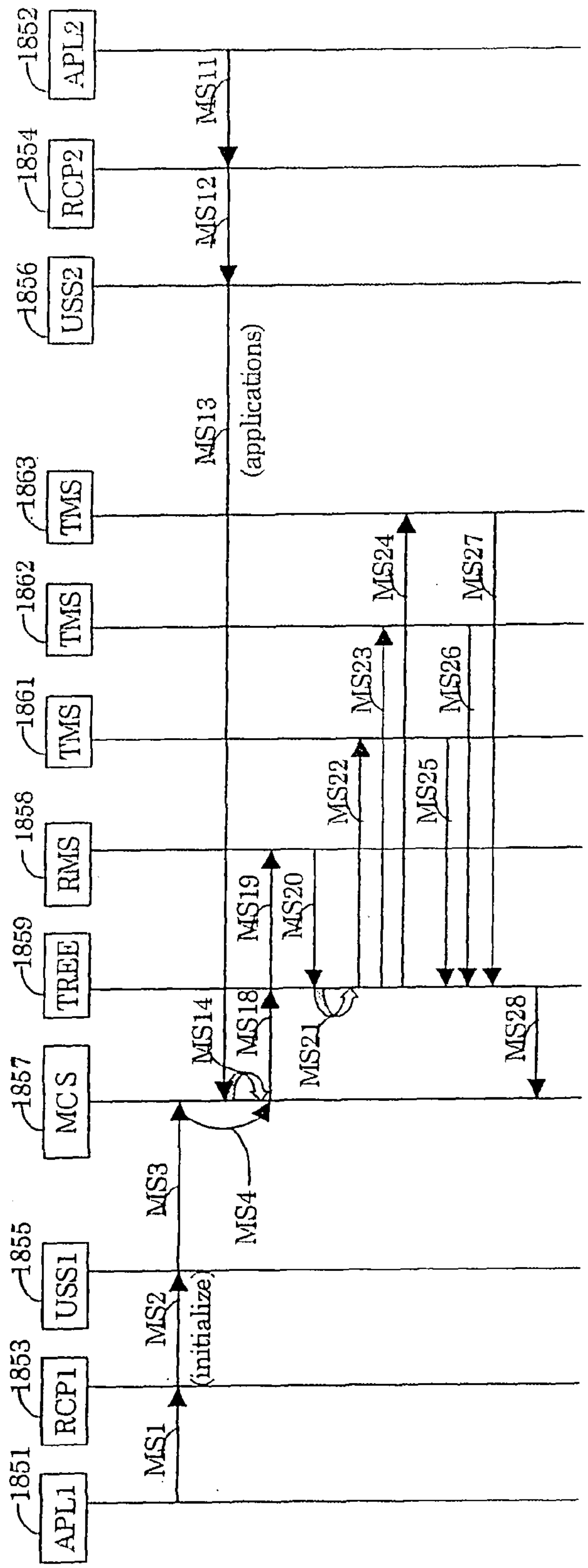
Figures 318, 319, 320, 321, 322, 323, 324, 325:
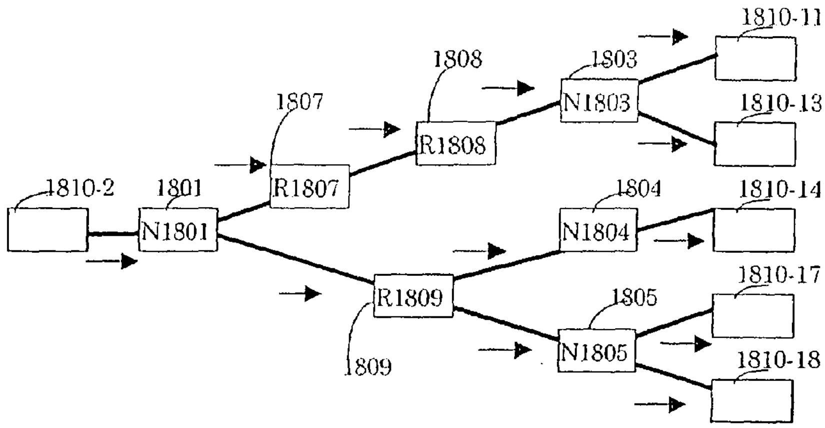
Figure 326:
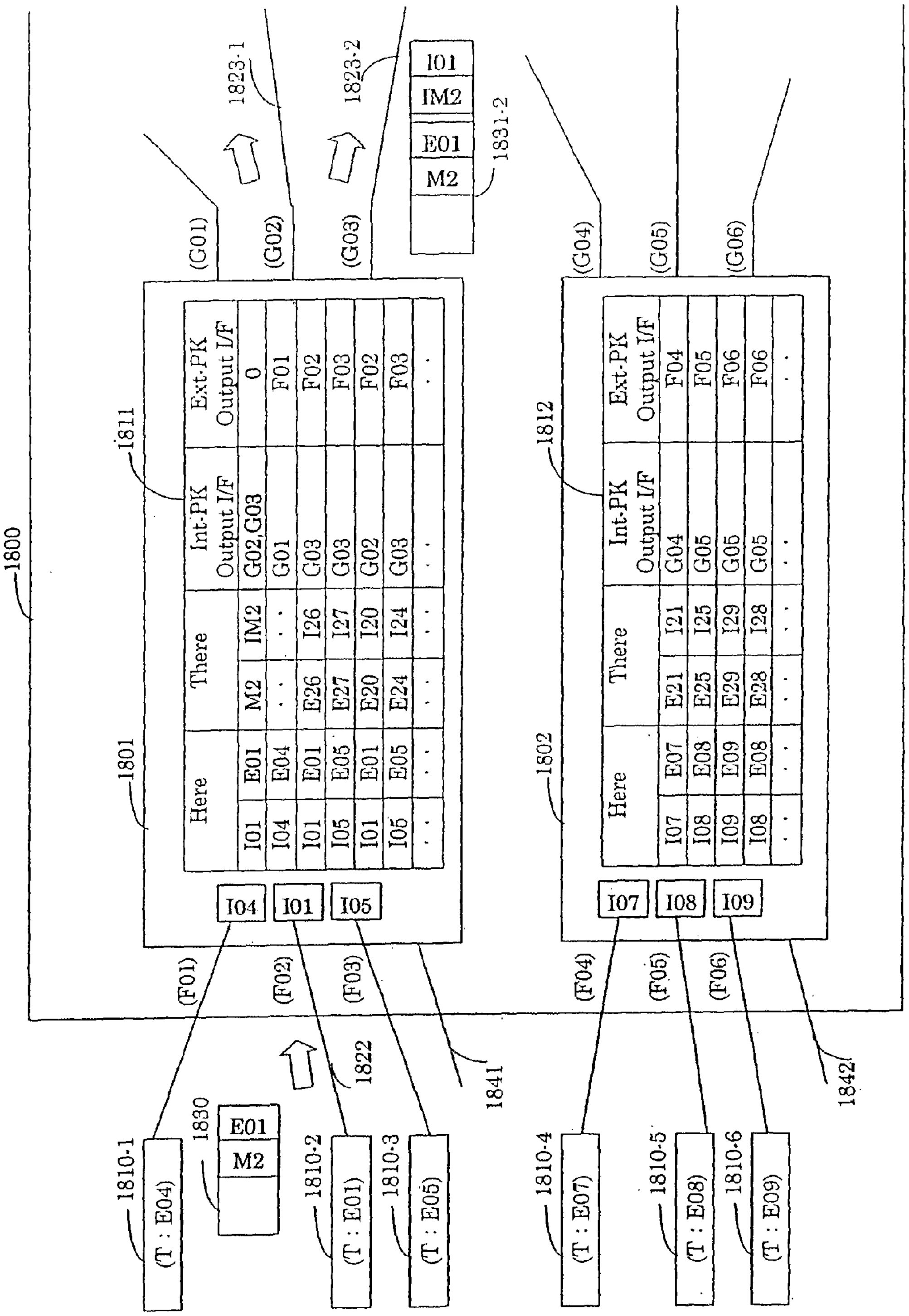
Figure 327:
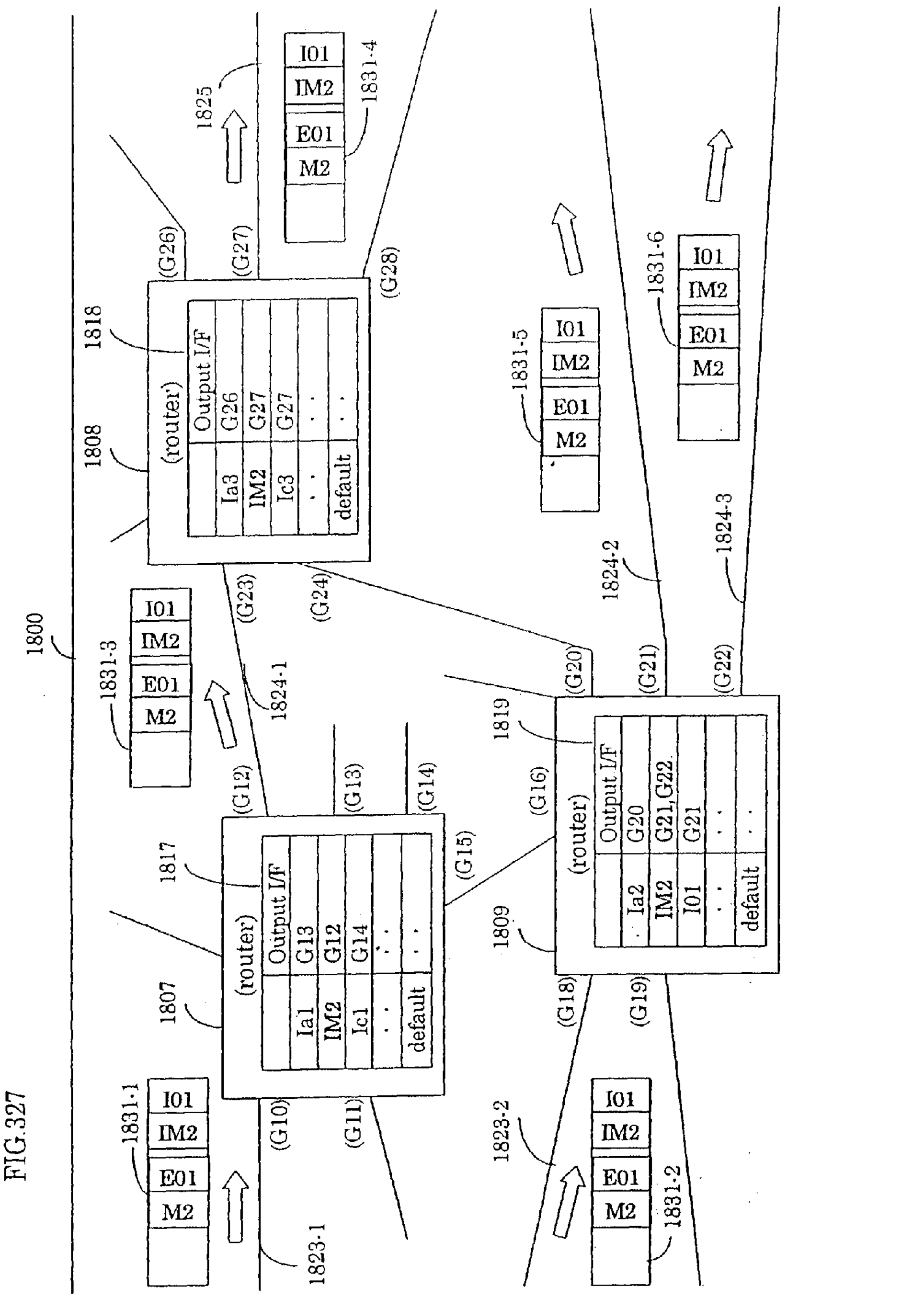
Figure 328:
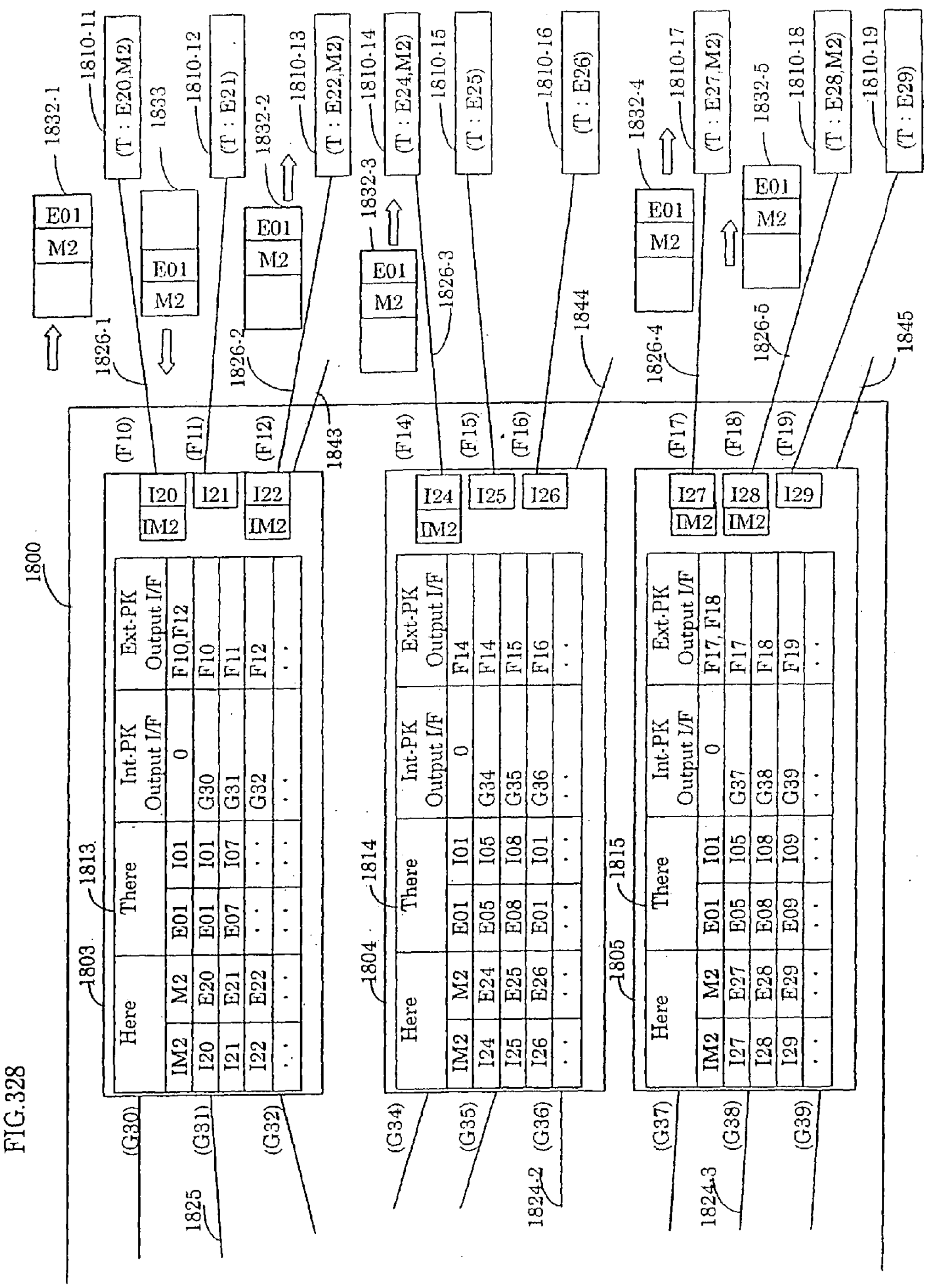
Figure 329:
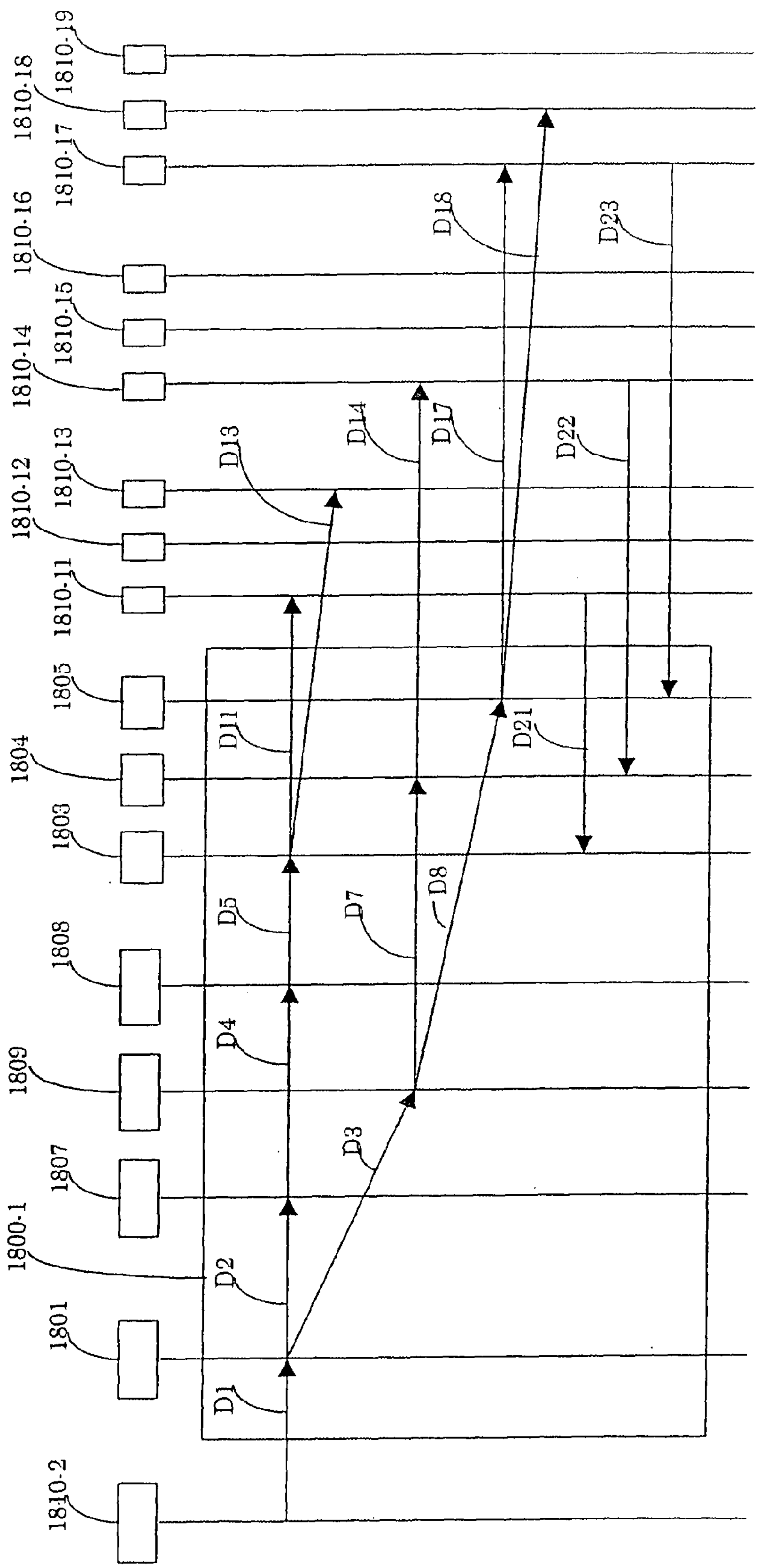
Figure 330:
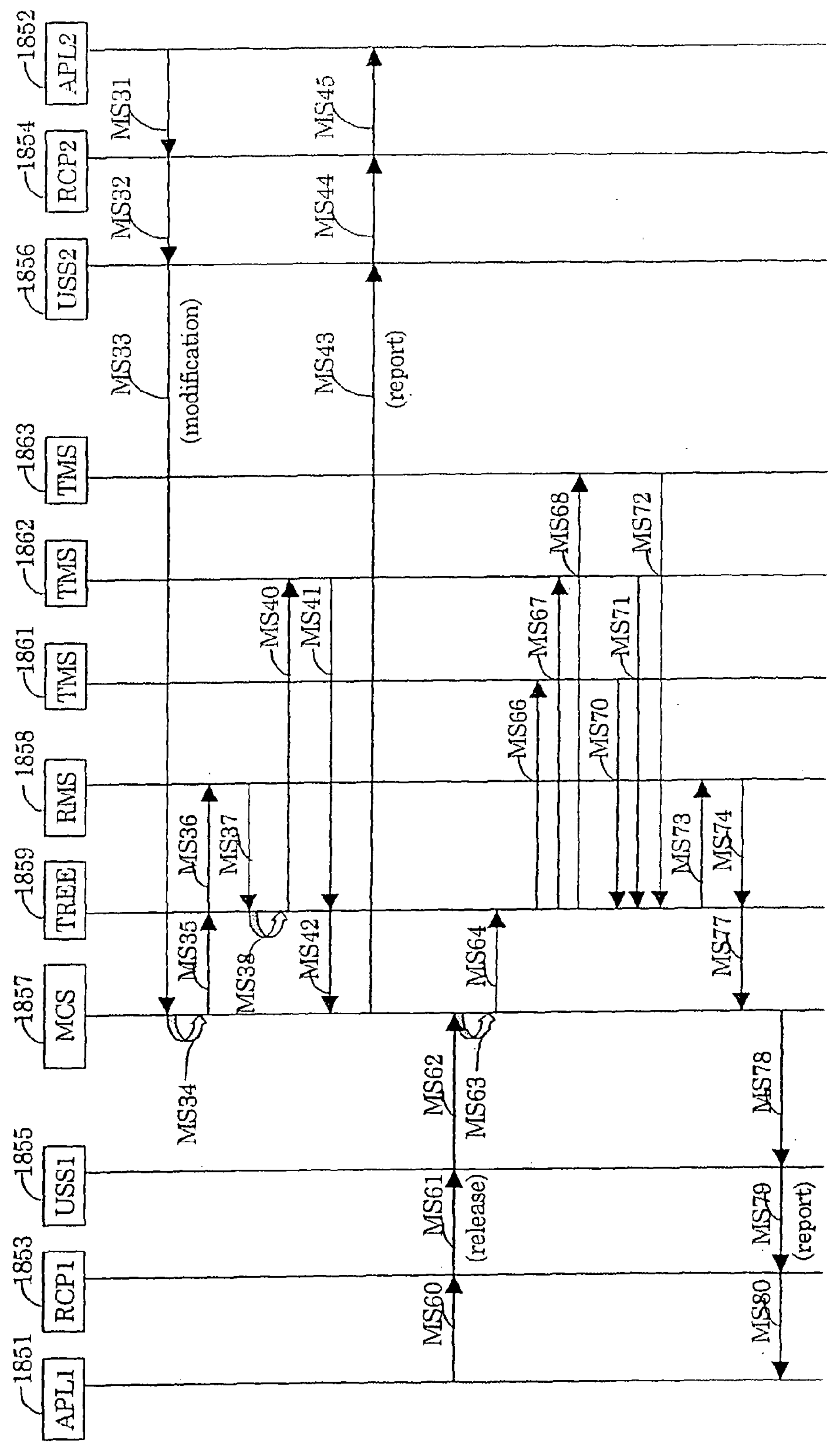
Figure 331:
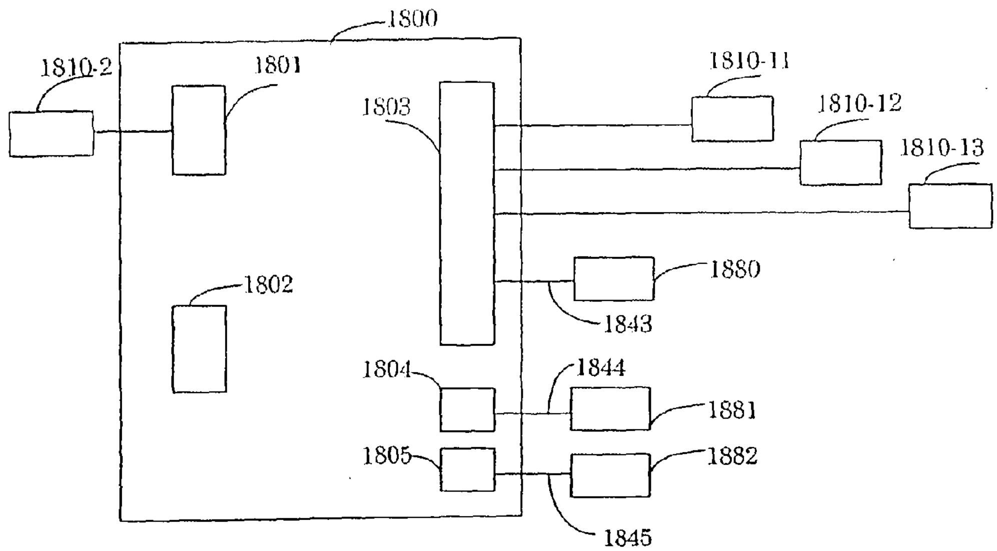
Figure 332:
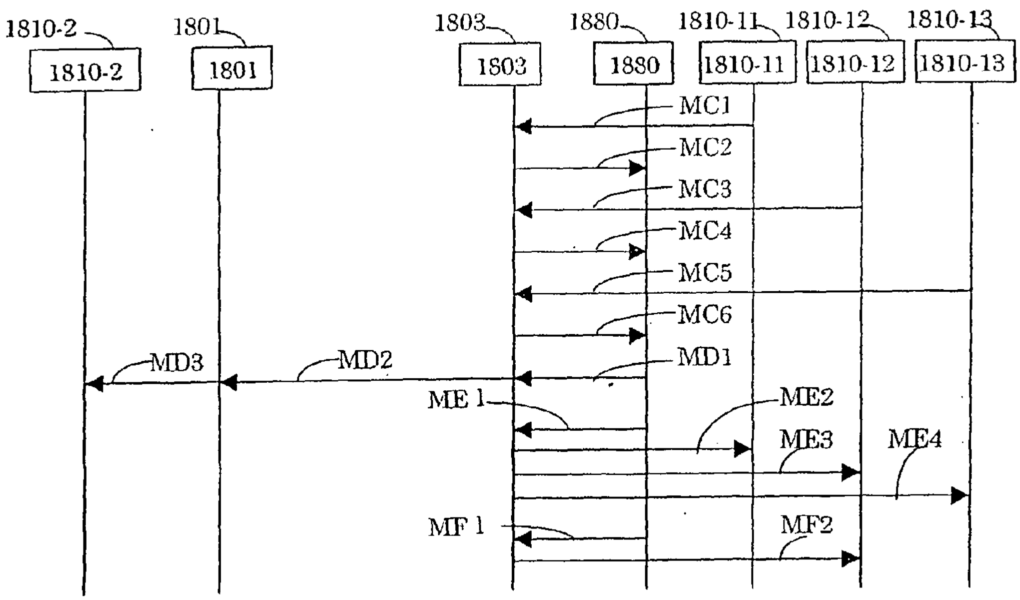
Figure 333:
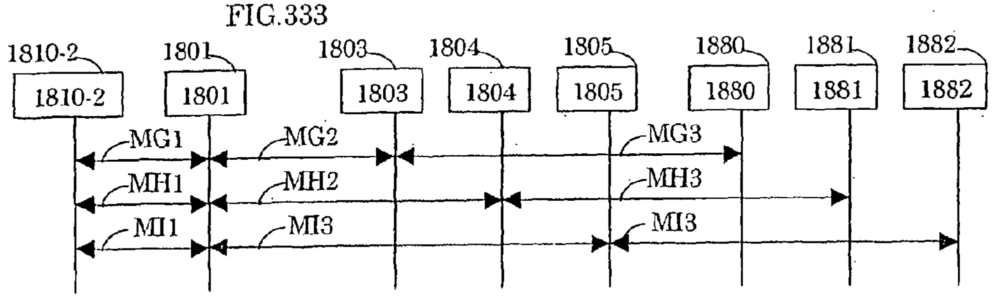
Figure 338:
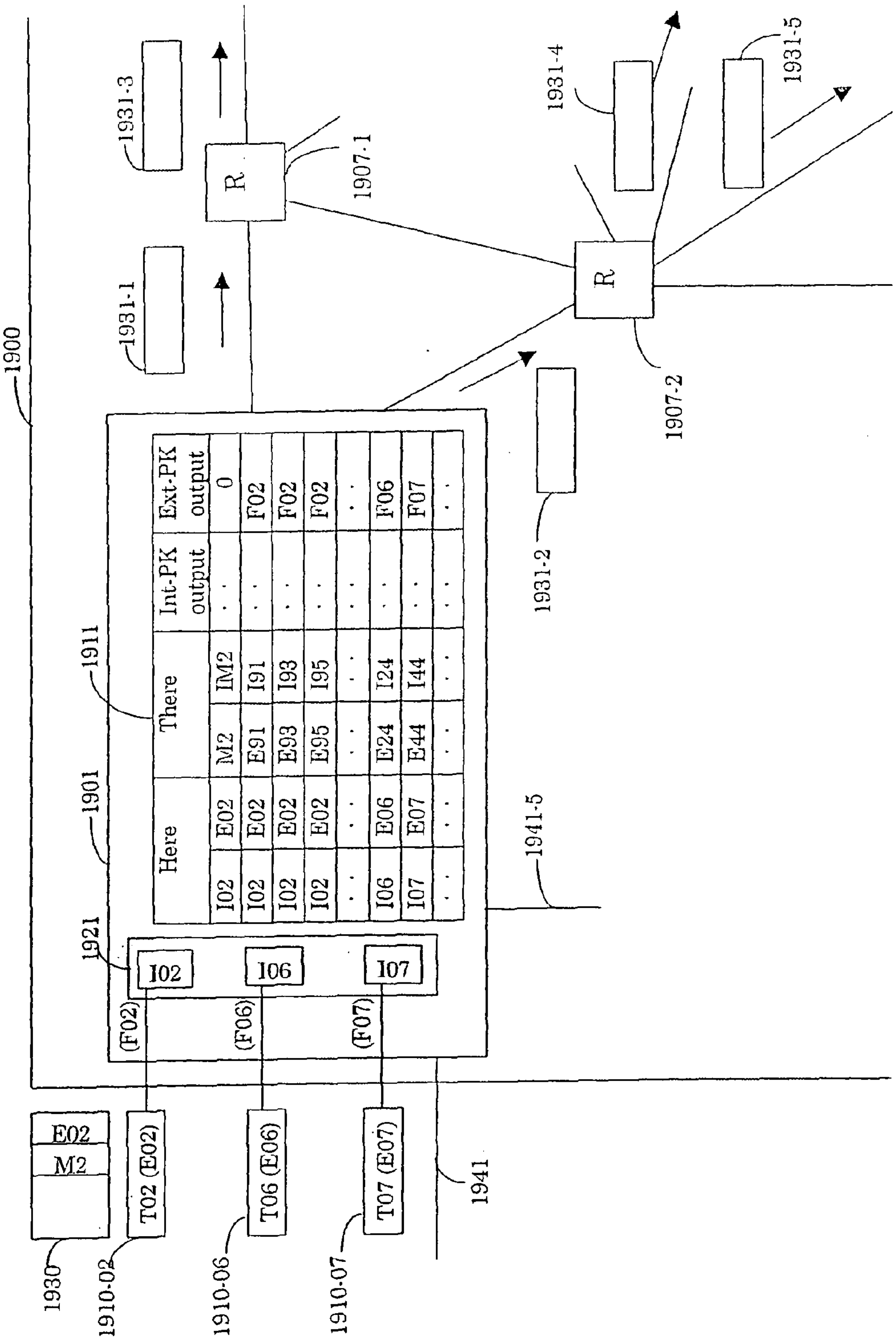
Figure 339:
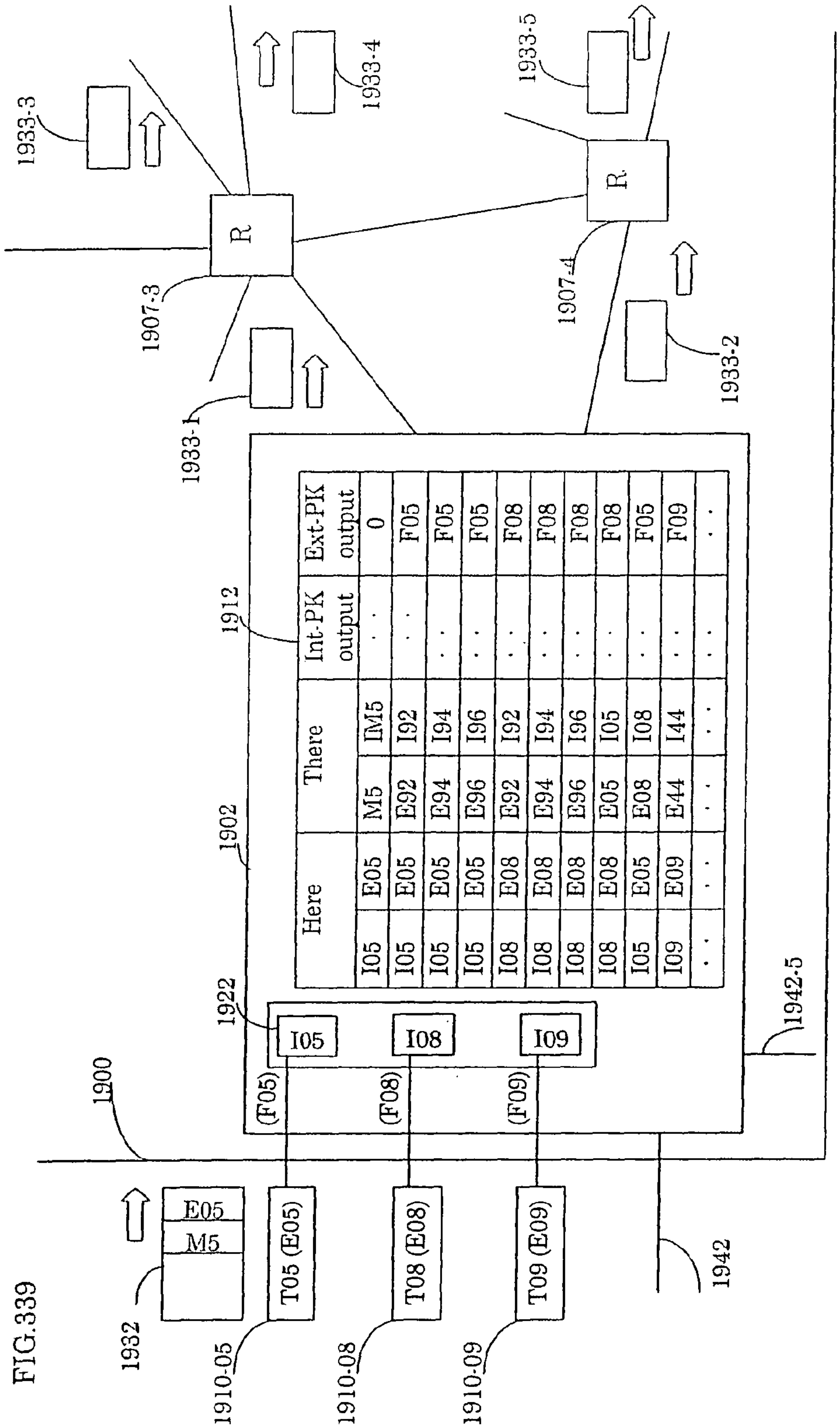
Figure 340:
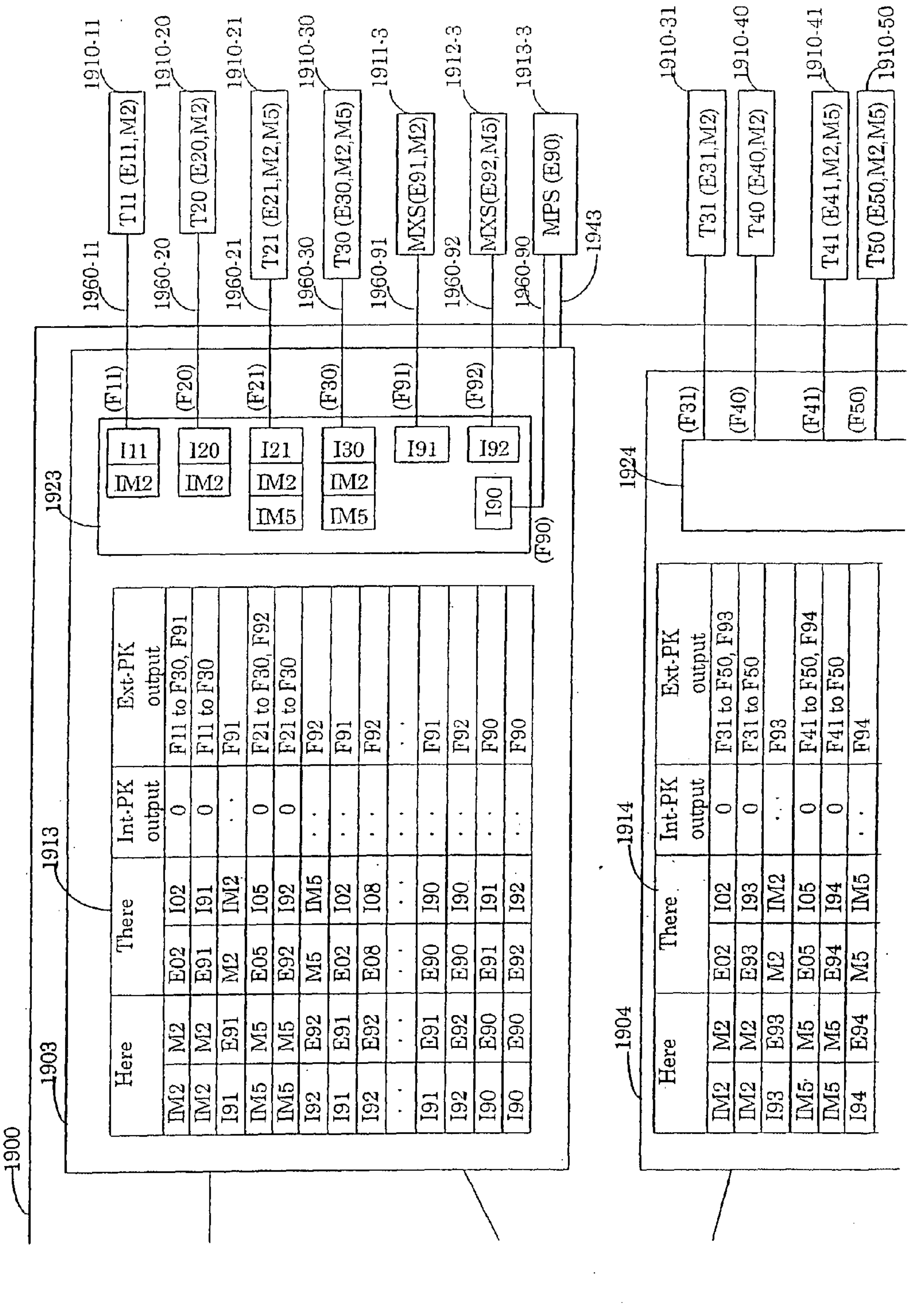
Figure 341:
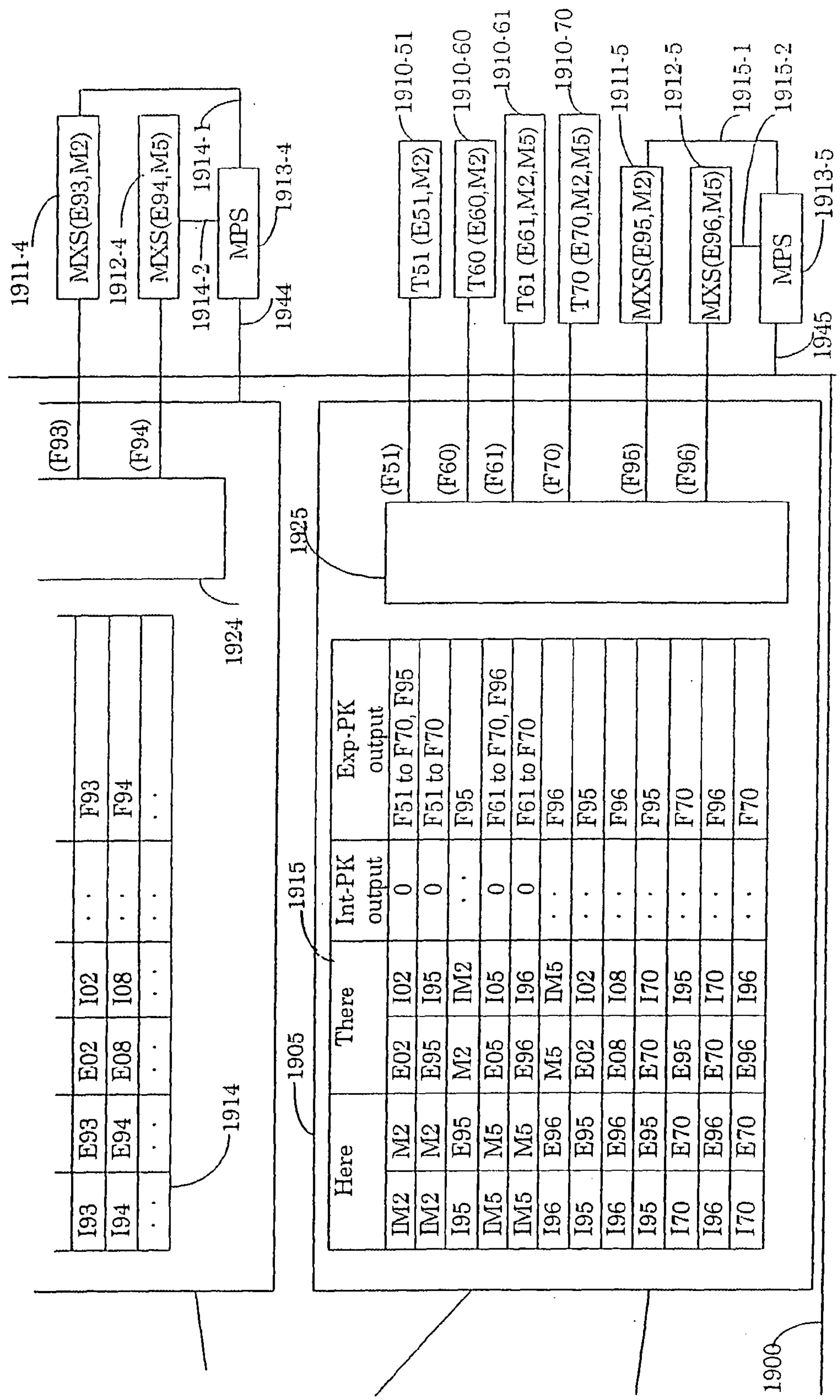
Figure 342:
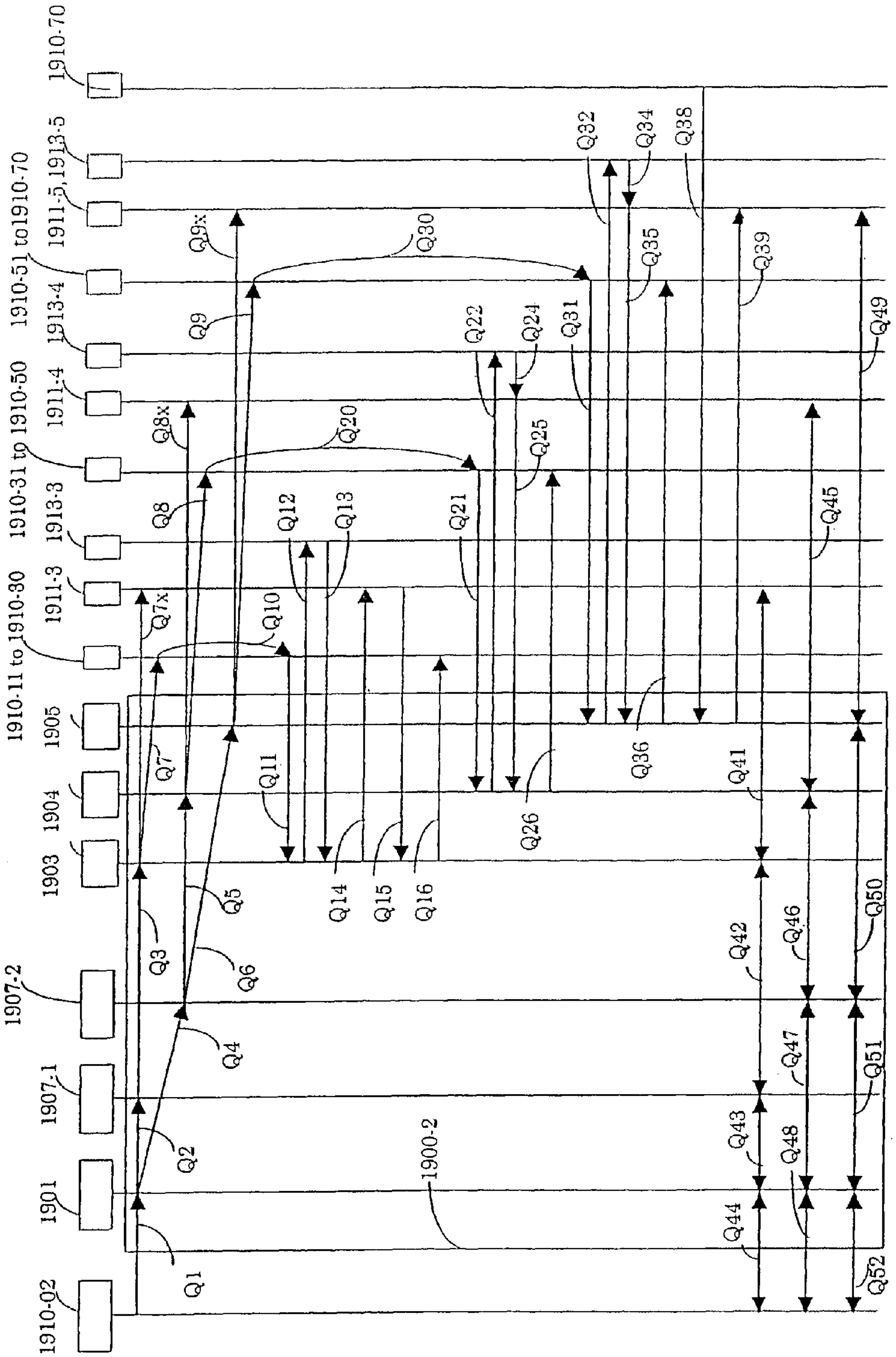
Figure 343:
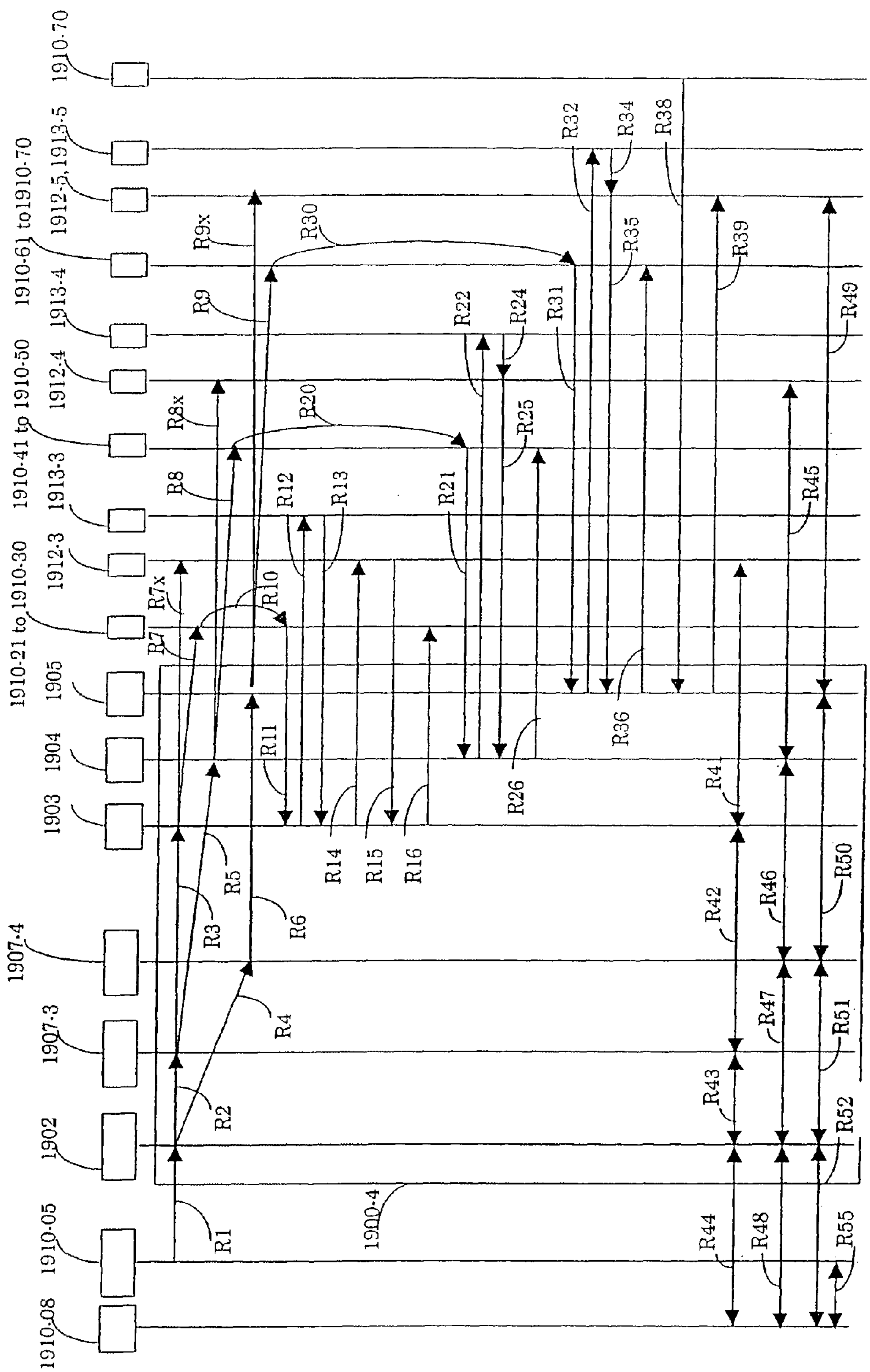
Figure 344:
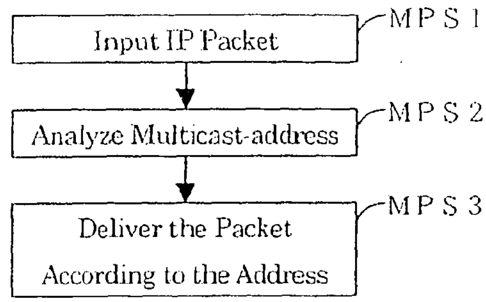
Figure 345:
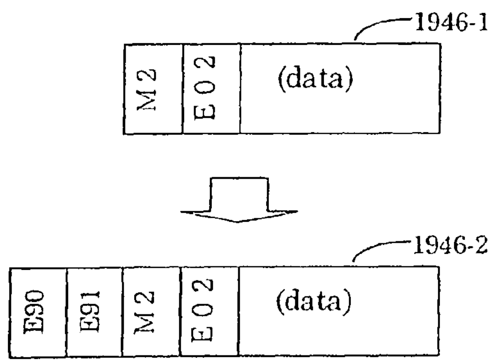
Figure 346:
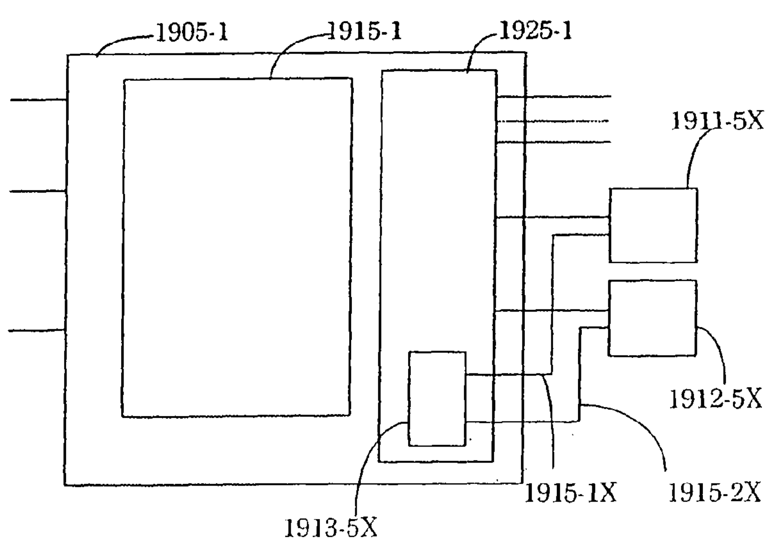
Figure 347:
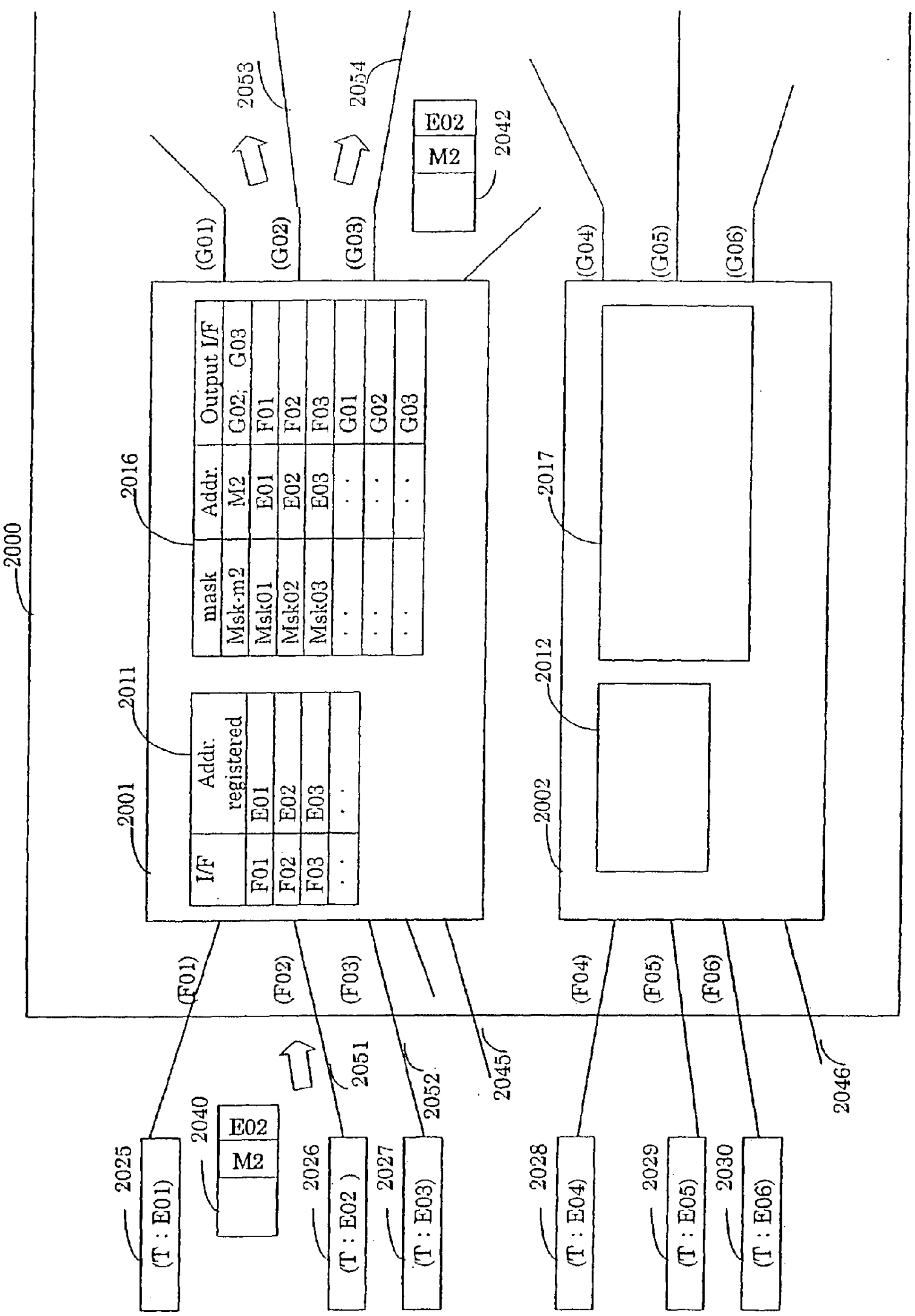
Figure 348:
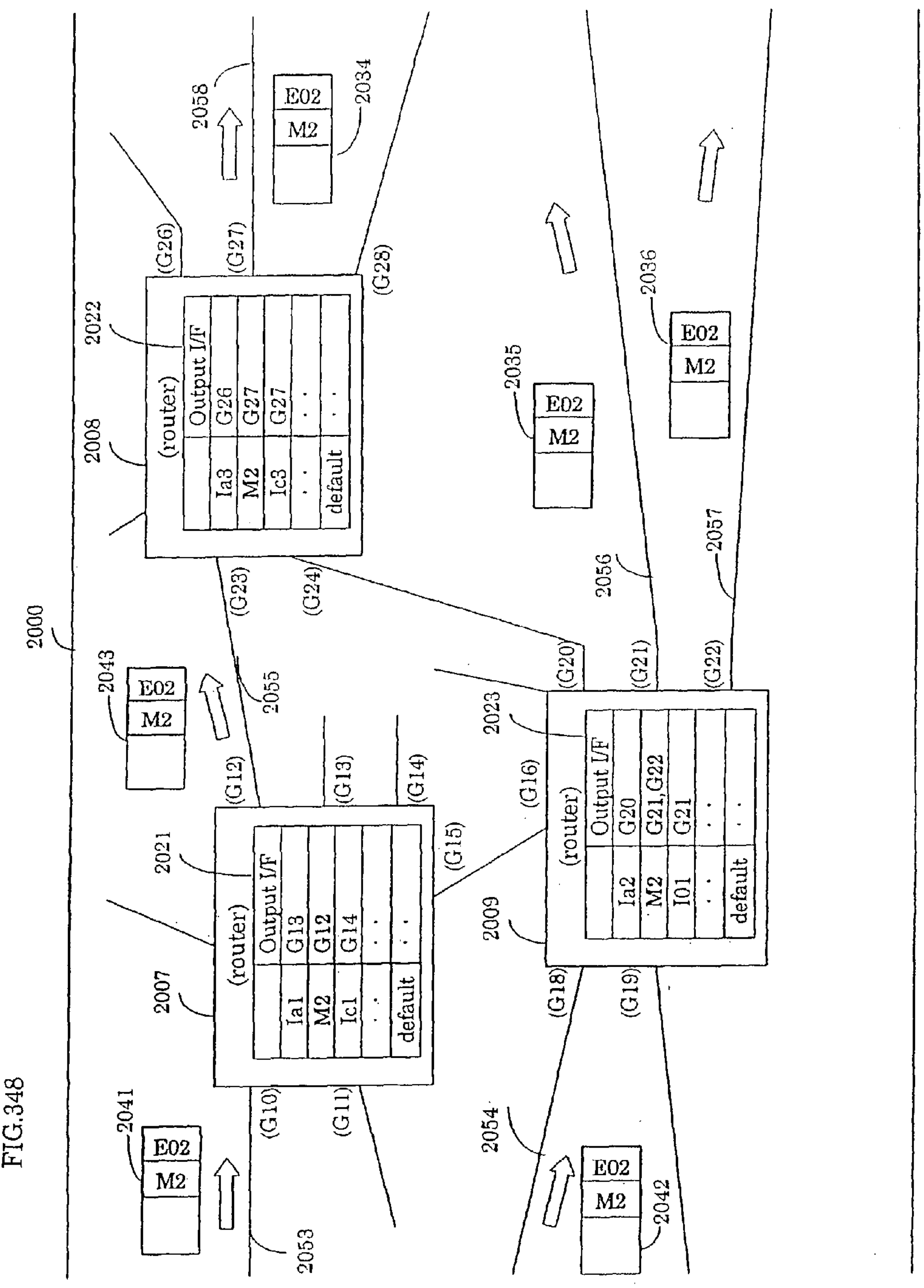
Figure 349:
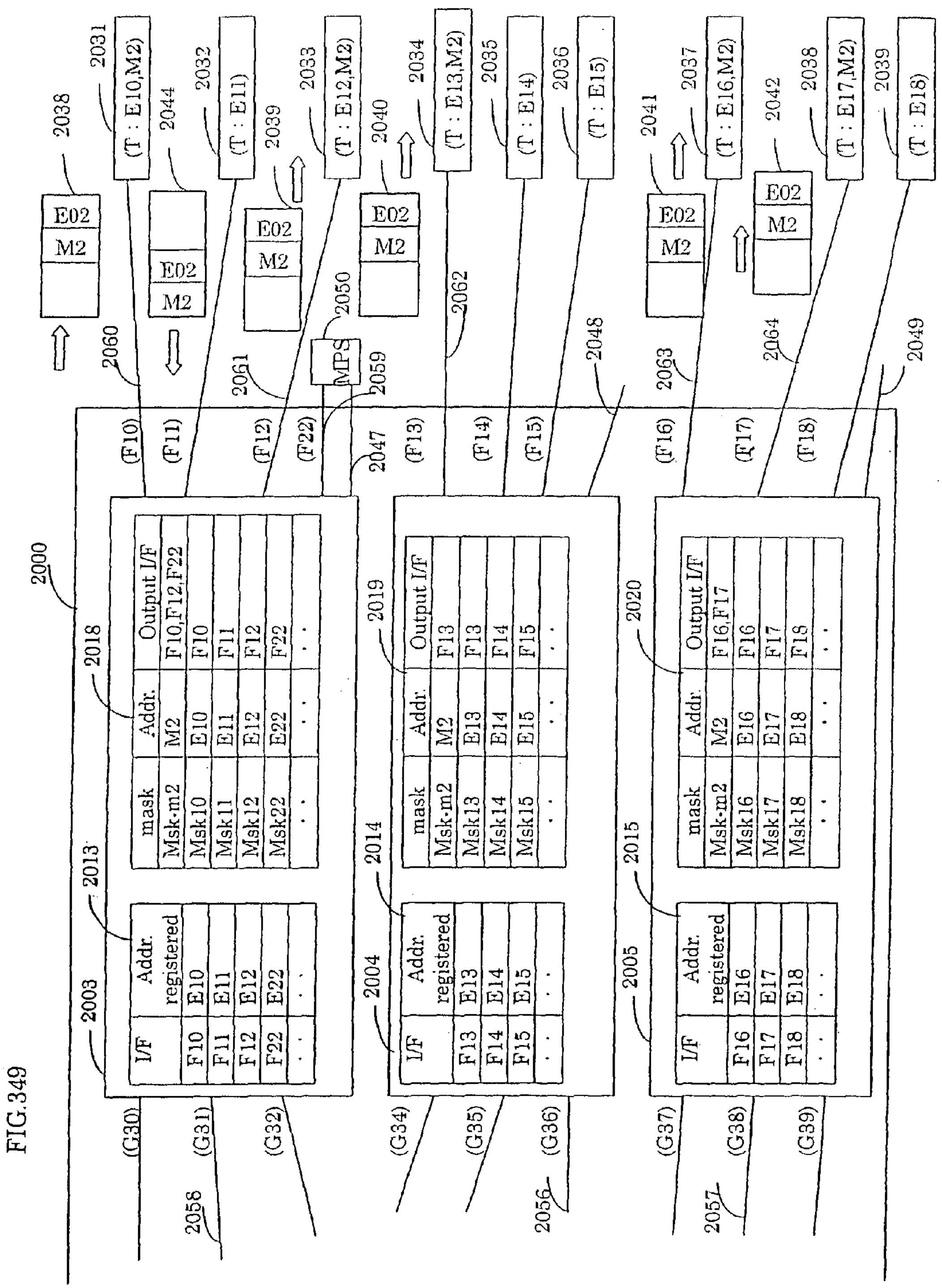
Figure 350:
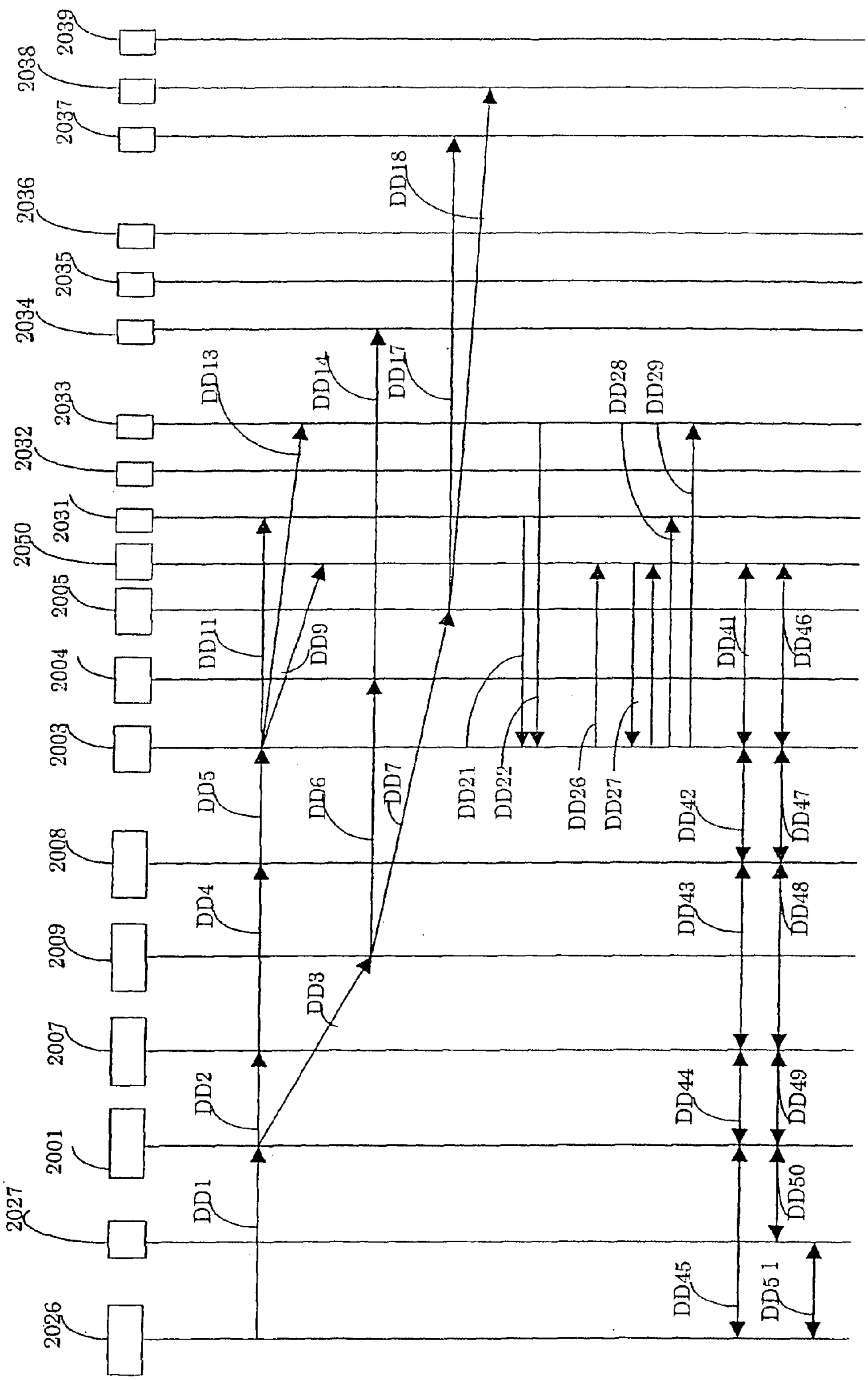
Figure 351:
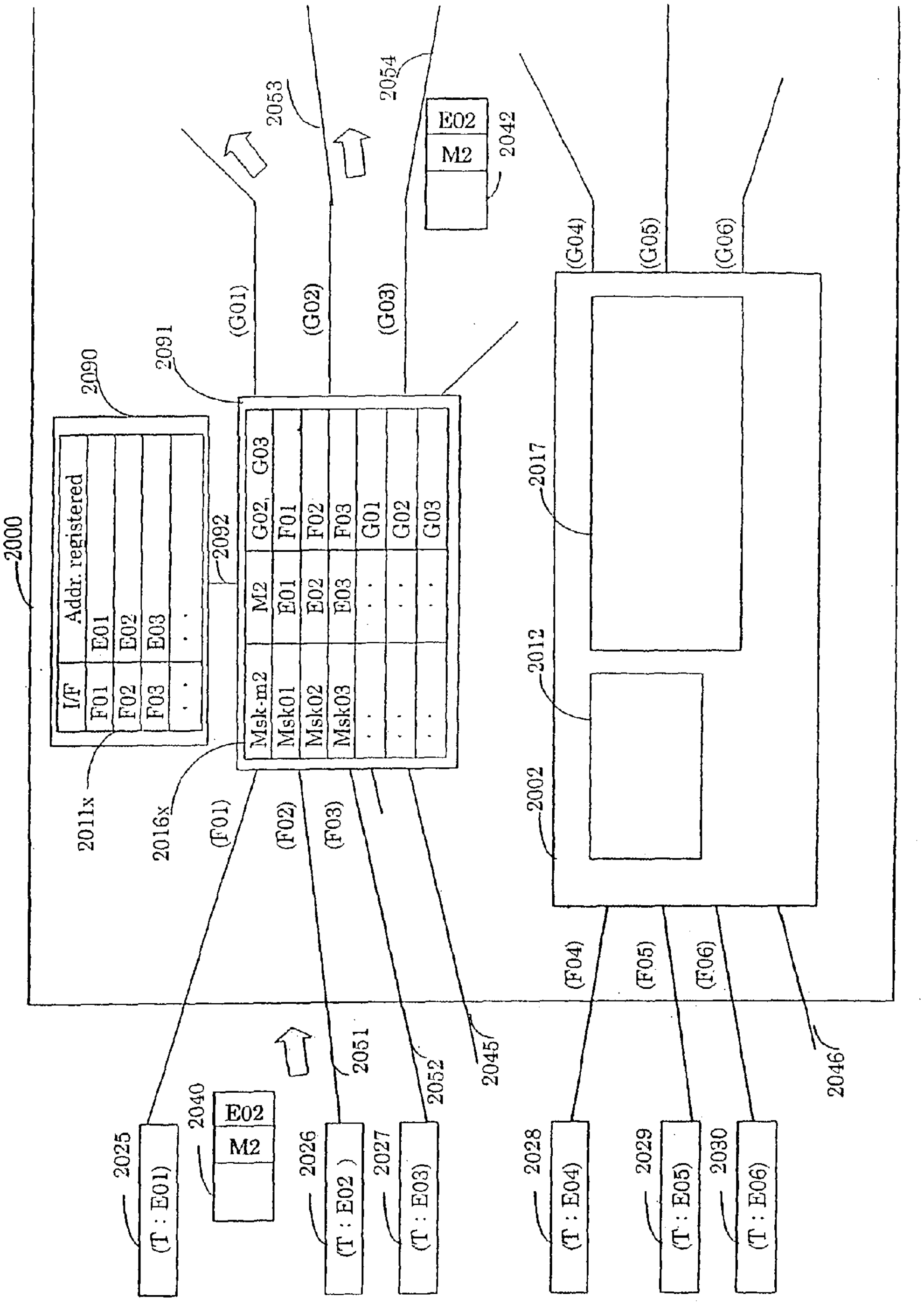
Figure 352:
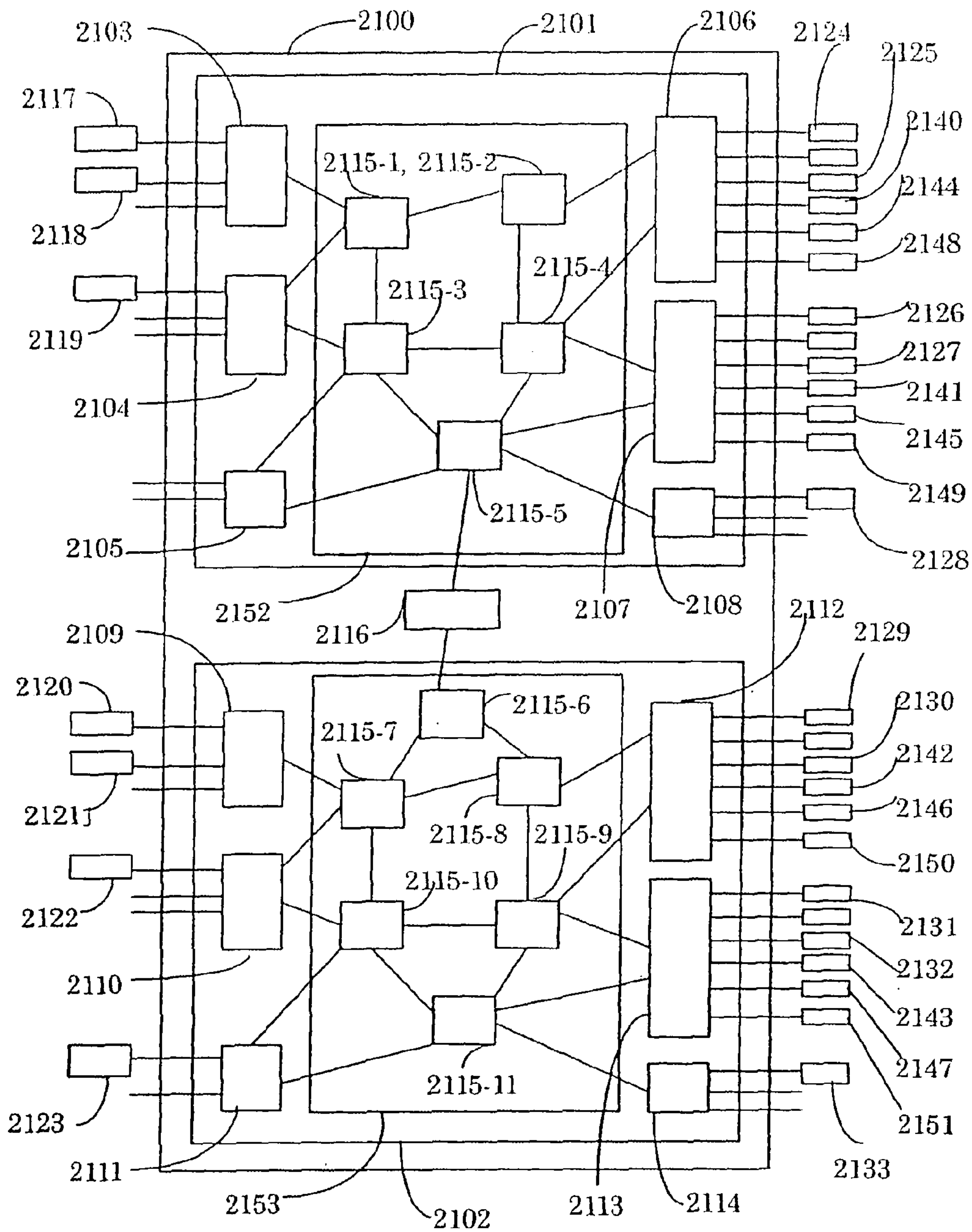
Figure 353:
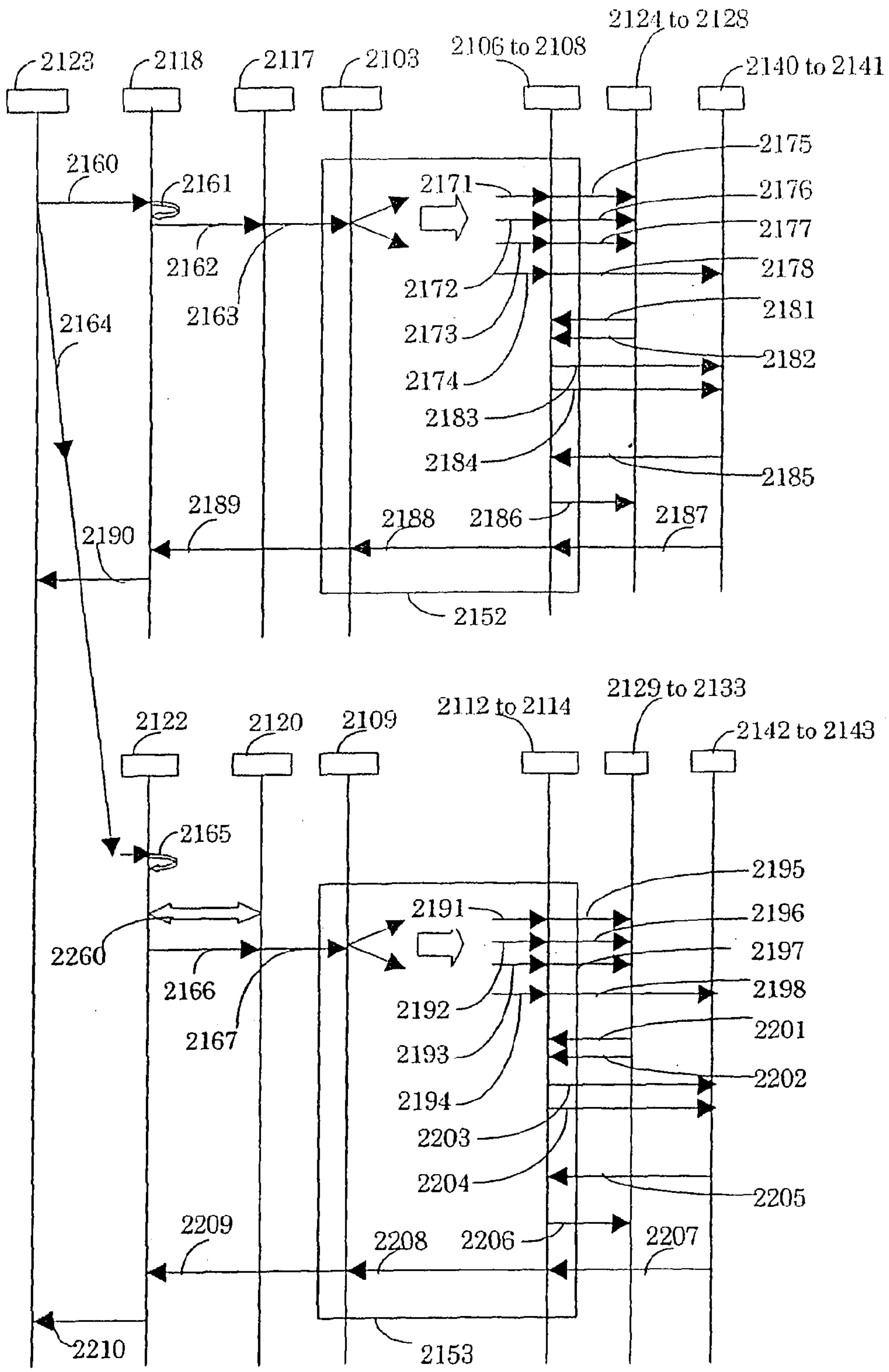
Figure 354:
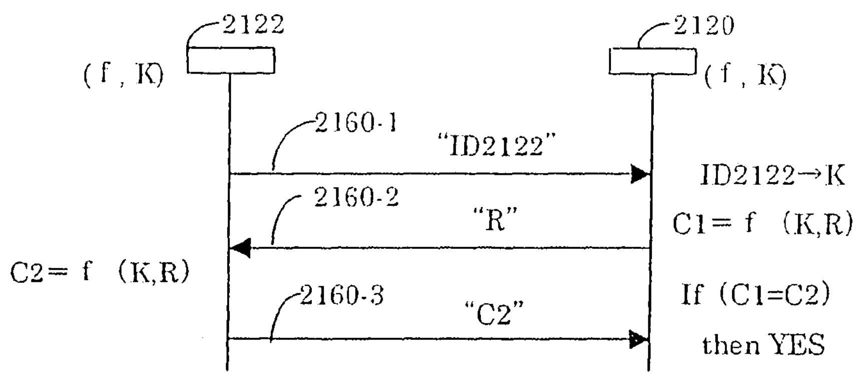
Figure 355:
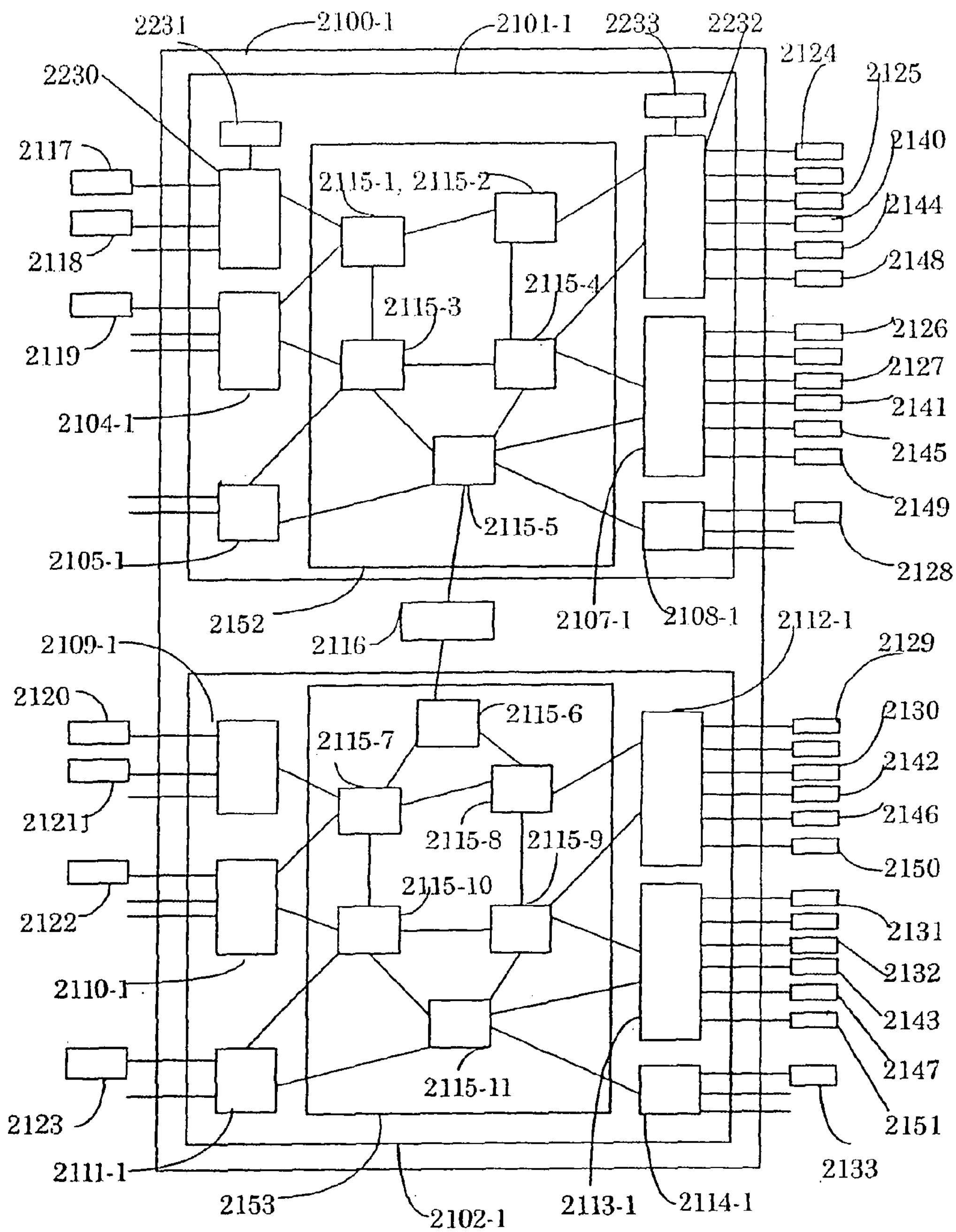
Figure 356:
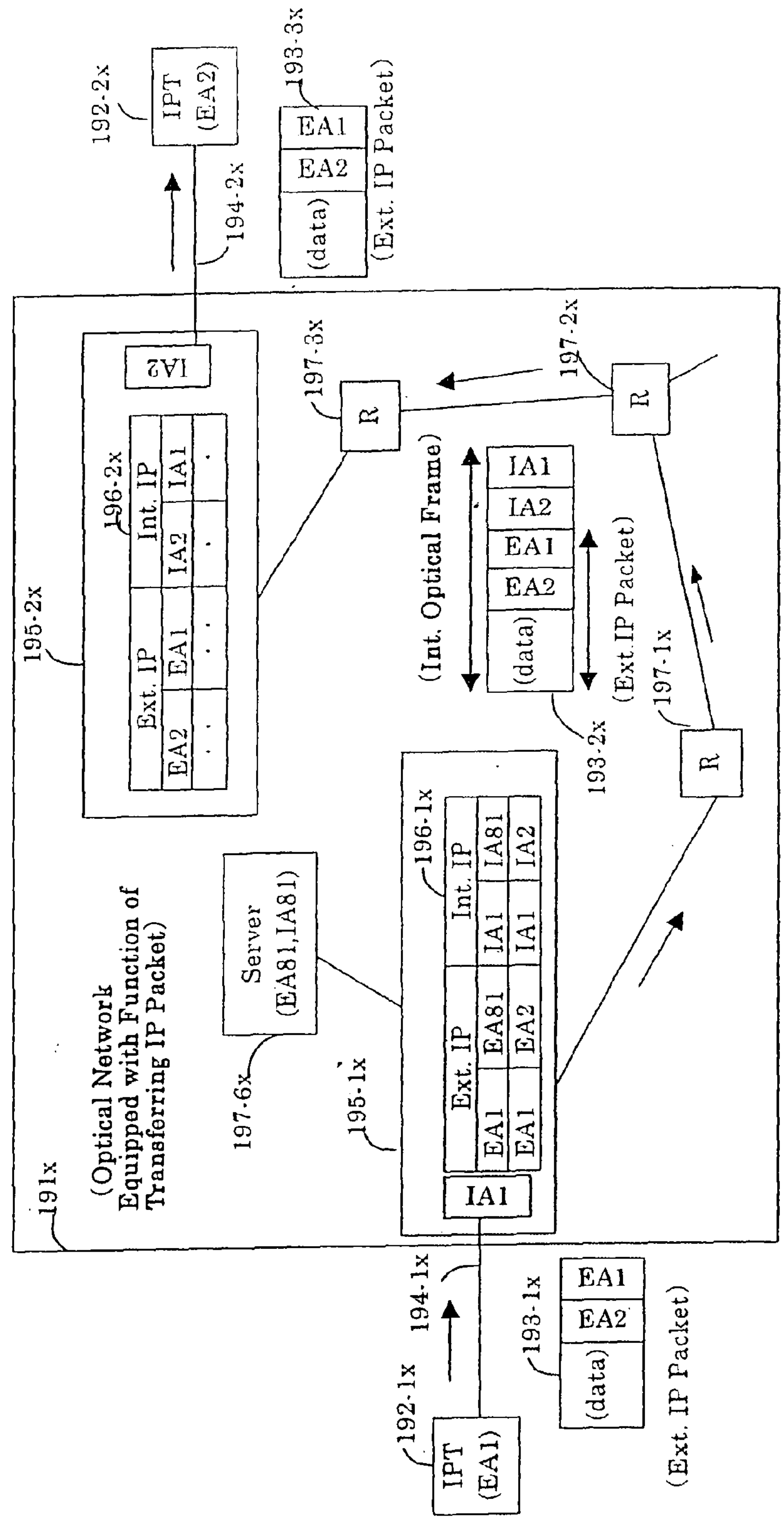
Figure 357:
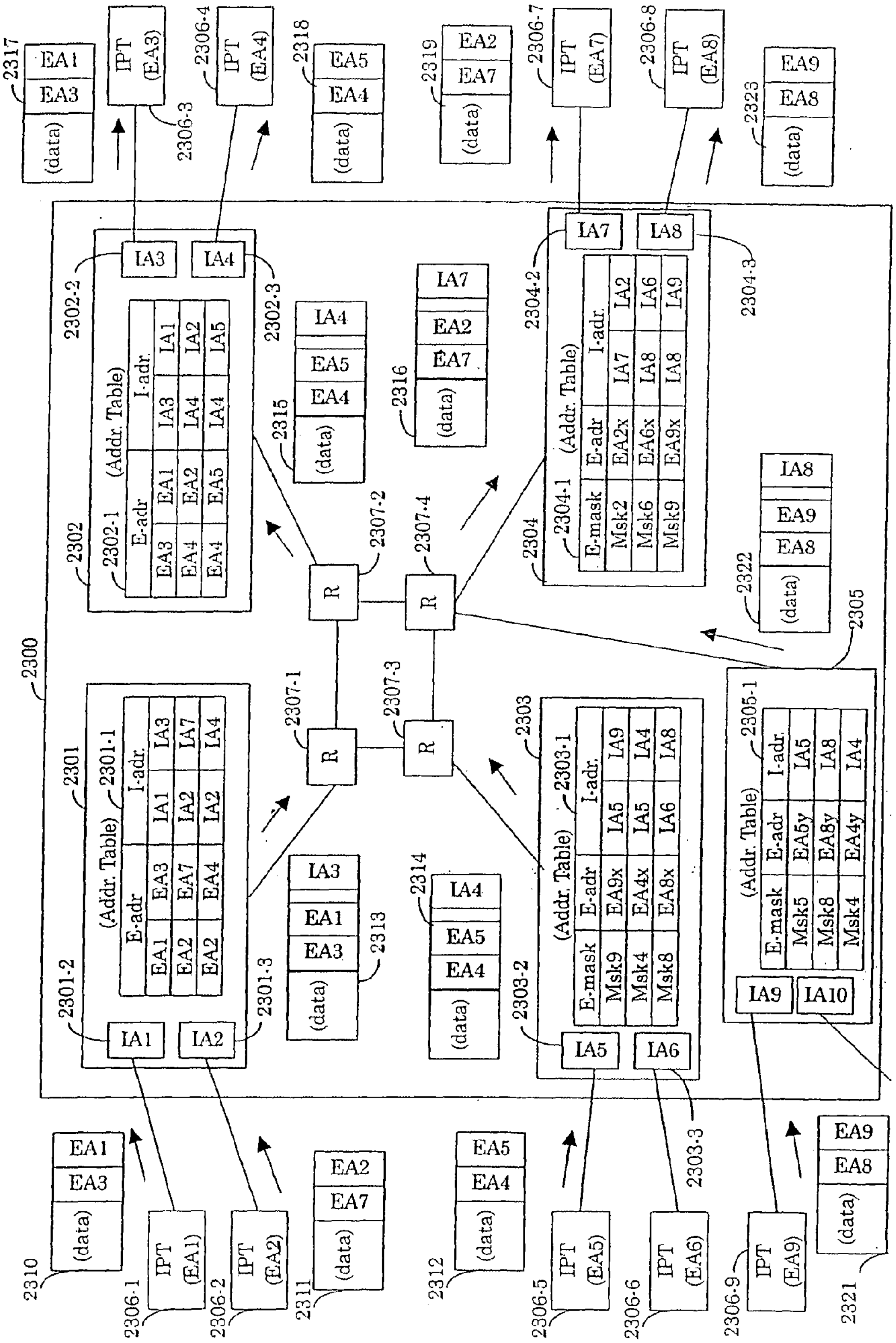
Figure 360:
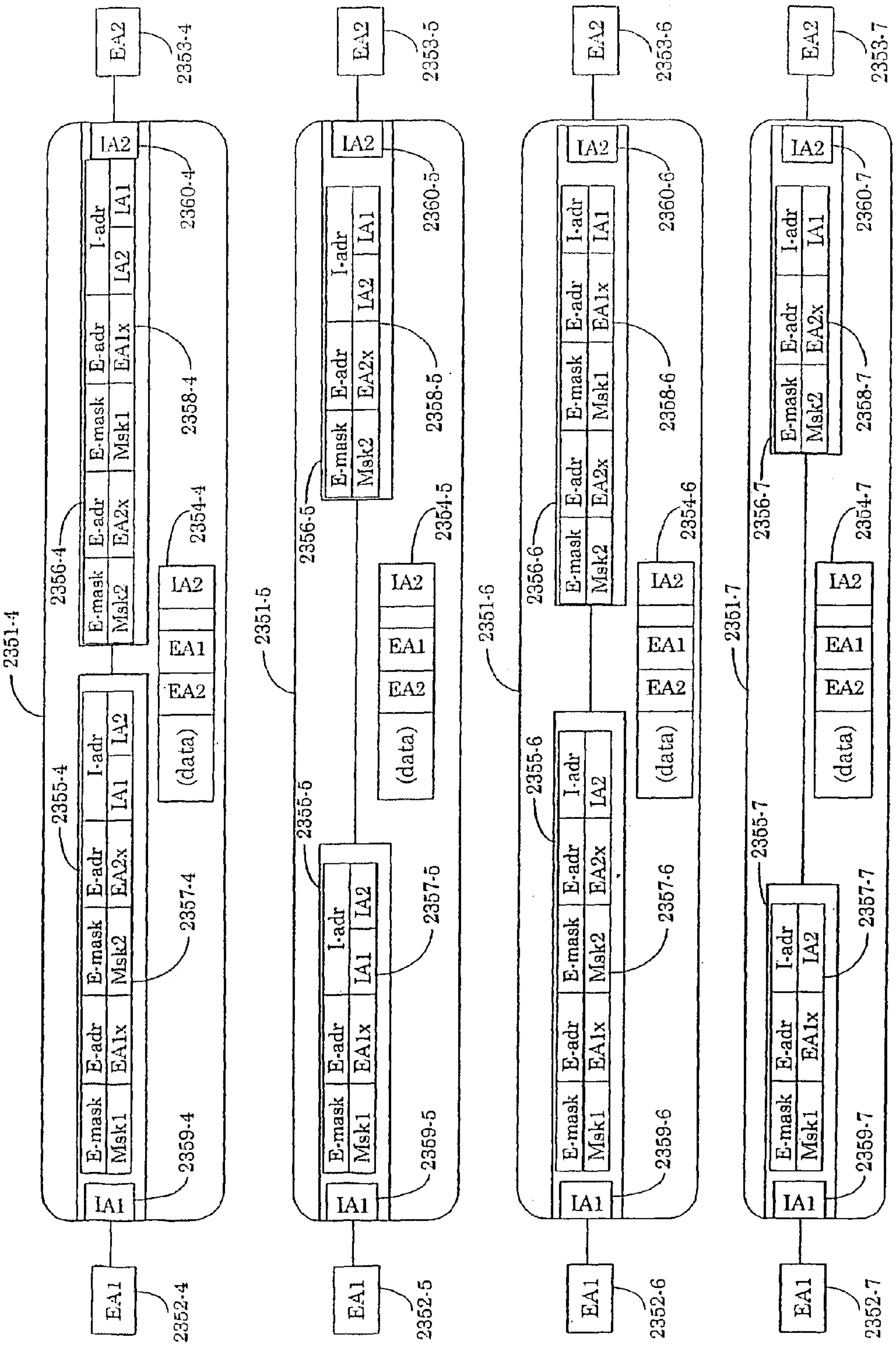

FIG. 274 is an explanatory diagram for explaining the 14th embodiment of the present invention;

FIG. 275 is an explanatory diagram for explaining the 14th embodiment of the present invention;

FIG. 276 is an explanatory diagram for explaining the 14th embodiment of the present invention;

FIG. 277 is a block diagram for showing a 15-th embodiment of the present invention;

FIG. 278 is a flow chart for describing an operation example of the 15-th embodiment of the present invention;

FIG. 279 is an explanatory diagram for explaining the 15th embodiment of the present invention;

FIG. 280 is an explanatory diagram for explaining the 15th embodiment of the present invention;

FIG. 281 is an explanatory diagram for explaining the 15th embodiment of the present invention;

FIG. 282 is an explanatory diagram for explaining the 15th embodiment of the present invention;

FIG. 283 is an explanatory diagram for explaining the 15th embodiment of the present invention;

FIG. 284 is an explanatory diagram for explaining the 15th embodiment of the present invention;

FIG. 285 is an explanatory diagram for explaining the 15th embodiment of the present invention;

FIG. 286 is an explanatory diagram for explaining the 15th embodiment of the present invention;

FIG. 287 is an explanatory diagram for explaining the 15th embodiment of the present invention;

FIG. 288 is an explanatory diagram for explaining the 15th embodiment of the present invention;

FIG. 289 is an explanatory diagram for explaining the 15th embodiment of the present invention;

FIG. 290 is an explanatory diagram for explaining the 15th embodiment of the present invention;

FIG. 291 is an explanatory diagram for explaining the 15th embodiment of the present invention;

FIG. 292 is an explanatory diagram for explaining the 15th embodiment of the present invention;

FIG. 293 is an explanatory diagram for explaining the 15th embodiment of the present invention;

FIG. 294 is an explanatory diagram for explaining the 15th embodiment of the present invention;

FIG. 295 is an explanatory diagram for explaining the 15th embodiment of the present invention;

FIG. 296 is an explanatory diagram for explaining the 15th embodiment of the present invention;

FIG. 297 is an explanatory diagram for explaining the 15th embodiment of the present invention;

FIG. 298 is an explanatory diagram for explaining the 15th embodiment of the present invention;

FIG. 299 is an explanatory diagram for explaining the 15th embodiment of the present invention;

FIG. 300 is an explanatory diagram for explaining the 15th embodiment of the present invention;

FIG. 301 is an explanatory diagram for explaining the 15th embodiment of the present invention;

FIG. 302 is an explanatory diagram for explaining the 15th embodiment of the present invention;

FIG. 303 is an explanatory diagram for explaining the 15th embodiment of the present invention;

FIG. 304 is an explanatory diagram for explaining the 15th embodiment of the present invention;

FIG. 305 is a block diagram for showing a 16-th embodiment of the present invention;

FIG. 306 is a flow chart for describing an operation example of the 16-th embodiment of the present invention;

FIG. 307 is an explanatory diagram for explaining the 16th embodiment of the present invention;

FIG. 308 is an explanatory diagram for explaining the 16th embodiment of the present invention;

FIG. 309 is an explanatory diagram for explaining the 16th embodiment of the present invention;

FIG. 310 is a part of a block diagram for showing a 17-th embodiment of the present invention;

FIG. 311 is a part of a block diagram for showing a 17-th embodiment of the present invention;

FIG. 312 is a part of a block diagram for showing a 17-th embodiment of the present invention;

FIG. 313 is an explanatory diagram for explaining the 17th embodiment of the present invention;

FIG. 314 is an explanatory diagram for explaining the 17th embodiment of the present invention;

FIG. 315 is an explanatory diagram for explaining the 17th embodiment of the present invention;

FIG. 316 is an explanatory diagram for explaining the 17th embodiment of the present invention;

FIG. 317 is an explanatory diagram for explaining the 17th embodiment of the present invention;

FIG. 318 is an explanatory diagram for explaining the 17th embodiment of the present invention;

FIG. 319 is an explanatory diagram for explaining the 17th embodiment of the present invention;

FIG. 320 is an explanatory diagram for explaining the 17th embodiment of the present invention;

FIG. 321 is an explanatory diagram for explaining the 17th embodiment of the present invention;

FIG. 322 is an explanatory diagram for explaining the 17th embodiment of the present invention;

FIG. 323 is an explanatory diagram for explaining the 17th embodiment of the present invention;

FIG. 324 is an explanatory diagram for explaining the 17th embodiment of the present invention;

FIG. 325 is an explanatory diagram for explaining the 17th embodiment of the present invention;

FIG. 326 is a part of a diagram for explaining the address management table in the 17-th embodiment of the present invention;

FIG. 327 is a part of a diagram for explaining the address management table in the 17-th embodiment of the present invention;

FIG. 328 is a part of a diagram for explaining the address management table in the 17-th embodiment of the present invention;

FIG. 329 is an explanatory diagram for explaining the 17th embodiment of the present invention;

FIG. 330 is an explanatory diagram for explaining the 17th embodiment of the present invention;

FIG. 331 is an explanatory diagram for explaining the 17th embodiment of the present invention;

FIG. 332 is an explanatory diagram for explaining the 17th embodiment of the present invention;

FIG. 333 is an explanatory diagram for explaining the 17th embodiment of the present invention;

FIG. 334 is an explanatory diagram for explaining the 17th embodiment of the present invention;

FIG. 335 is an explanatory diagram for explaining the 17th embodiment of the present invention;

FIG. 336 is an explanatory diagram for explaining the 17th embodiment of the present invention;

FIG. 337 is an explanatory diagram for explaining the 17th embodiment of the present invention;

FIG. 338 is a part of a block diagram for showing the 18th embodiment of the present invention;

FIG. 339 is a part of a block diagram for showing the 18th embodiment of the present invention;

FIG. 340 is a part of a block diagram for showing the 18th embodiment of the present invention;

FIG. 341 is a part of a block diagram for showing the 18th embodiment of the present invention;

FIG. 342 is an explanatory diagram for explaining the 18th embodiment of the present invention;

FIG. 343 is an explanatory diagram for explaining the 18th embodiment of the present invention;

FIG. 344 is an explanatory diagram for explaining the 18th embodiment of the present invention;

FIG. 345 is an explanatory diagram for explaining the 18th embodiment of the present invention;

FIG. 346 is an explanatory diagram for explaining the 18th embodiment of the present invention;

FIG. 347 is a part of a block diagram for showing a 19-th embodiment of the present invention;

FIG. 348 is a part of a block diagram for showing a 19-th embodiment of the present invention;

FIG. 349 is a part of a block diagram for showing a 19-th embodiment of the present invention;

FIG. 350 is an explanatory diagram for explaining the 19th embodiment of the present invention;

FIG. 351 is an explanatory diagram for explaining the 19th embodiment of the present invention;

FIG. 352 is a block diagram for showing a 20-th embodiment of the present invention;

FIG. 353 is an explanatory diagram for explaining the 20th embodiment of the present invention;

FIG. 354 is an explanatory diagram for explaining the 20th embodiment of the present invention;

FIG. 355 is an explanatory diagram for explaining the 20th embodiment of the present invention;

FIG. 356 is an explanatory diagram for explaining the present invention;

FIG. 357 is an explanatory diagram for explaining the present invention;

FIG. 358 is an explanatory diagram for explaining the present invention;

FIG. 359 is an explanatory diagram for explaining the present invention; and FIG. 360 is an explanatory diagram for explaining the present invention.

DESCRIPTION OF THE PREFERRED EMBODIMENTS

It should be understood that both the IP-capsulation operation and the IP-inverse-capsulation operation, which are explained in the embodiment of the present invention, may be replaced by both a capsulation operation and an inverse-capsulation operation executed in a layer lower than the communication layer-3 layers, for instance, may be substituted by both a capsulation operation and an inverse-capsulation operation by a header of an optical HDLC-frame of the communication Layer-2 layers. Furthermore, an internal address of a transmission source is not contained in a header which is applied in a capsulation operation and an inverse-capsulation operation. In other words, both a simple capsulation operation and a simple inverse-capsulation operation may be realized to which a simple header is applied. It should also be noted that similarly in this simple capsulation operation, an address administration table having the same function is employed, which is used in the capsulation operation and the inverse-capsulation operation. Referring now to FIG. 357, the simple capsulation operation will be described.

In this drawing, block 2300 indicates an IP communication network; reference numerals 2301, 2302, 2303, 2304, 2305 denote network node apparatus; reference numerals 2301-1, 2302-1, 2303-1, 2304-1, 2305-1 show address administration tables; and reference numerals 2301-1, 2301-3, 2302-2, 2302-3, 2303-2, 2303-3, 2304-2, 2304-3 represent contents (logic terminals) between termination units of communication lines and the network node apparatus. Internal addresses "IA1", "IA2", "IA3", "IA4", "IA5", "IA6", "IA7", "IA8" are applied to these logic terminals. Reference numerals 2306-1 to 2306-9 show IP terminals having functions for transmitting/receiving IP packets, and own external IP addresses "EA1" to "EA9". Reference numerals 2307-1 to 2307-4 shown routers. The above-explained network node apparatus and routers are directly connected via a communication line to each other, or are indirectly connected via routers to each other. The terminals are connected via a communication line to the network node apparatus. In the description of FIG. 357, only an IP header portion is described as a header portion of an IP, and other items are omitted.

In the case that the terminal 2306-1 transmits such a IP packet 2310 whose transmission source address is equal to "EA1" and whose destination address is equal to "EA3" and also the network node apparatus 2301 receives an IP packet 2310, the network node apparatus 2301 confirms such a fact that an internal address applied to a logic terminal of a terminal of a communication line into which the IP packet 2310 is entered is equal to "IA1", and furthermore, a destination external IP address of the IP packet 2310 is equal to "EA3". Then, the network node apparatus 2301 retrieves a content of the address administration table 2301-1, and also retrieves a record containing such addresses that an internal IP address of a transmission source corresponds to "IA1" in the beginning, and subsequently, an external destination IP address corresponds to "EA3". Furthermore, the network node apparatus 2301 checks as to whether or not the transmission source external IP address "EA1" contained in the IP packet 2310 is included in the above-detected record.

In this example, a record of a first column of the address administration table 2301-1 from a top column is equal to "EA1, EA3, IA1, IA3". While using the address of "IA3" present in this record, a simple header is applied to the IP packet 2310 so as to form an internal packet 2313 (namely, simple capsulation operation). It should be noted that the simple header does not contain the transmission source internal address "IA1". The formed internal packet 2313 is reached via the routers 2307-1 and 2307-2 to the network node apparatus 2302. The network node apparatus 2302 removes the simple header of the received internal packet 2313 (simple inverse-capsulation operation), and sends out the acquired external IP packet 2317 (having the same content of IP packet 2310) to the communication line. Then, the IP terminal 2306-3 receives this IP packet 2317. It should also be noted that the record "EA3, EA1, IA3, IA1" of the first column of the address administration table 2302-1 is used so as to transfer the IP packet by employing a method similar to the above-described method along a direction opposite to the above-explained direction.

When the simple capsulation operation is carried out in the network node apparatus 2301, such a checking operation may be omitted. That is, the network node apparatus 2301 checks as to whether or not the transmission source external IP address "EA1" contained in the IP packet 2310 is included in the detected record within the address administration table 2301-1. In such a case of the above-explained checking operation of the IP address "EA1", the respective records of the address administration table 2301-1 can be made excluding the transmission source external IP address. Furthermore, with respect to two external IP addresses(namely, transmission source IP address and destination IP address) contained in each of the records of the address administration table 2301-1, such a simple capsulation technical method which is made based upon a similar principle idea to an address mask technical method (will be discussed later) may be applied.

A description will now be made of another example where an IP packet is transferred.

In the case that the terminal 2306-5 transmits such an IP packet 2312 whose transmission source address is equal to "EA5" and whose destination address is equal to "EA4" and also the network node apparatus 2303 receives an IP packet 2312, the network node apparatus 2303 confirms such a fact that an internal address applied to a logic terminal of a terminal of a communication line into which the IP packet 2312 is entered is equal to "IA5", and furthermore, a destination external IP address of the IP packet 2312 is equal to "EA4".

Then, the network node apparatus 2303 retrieves a content of the address administration table 2303-1, and also retrieves such a record that the transmission source internal IP address is equal to "IA5" in the beginning. In this case, a record "Mask7, EA7*x*, IA5, IA7" of a first column of the address administration table 2303-1 from a top column corresponds to a record "Mask4, EA4*x*, IA5, IA4" of a second column of this address administration table. As to the record of the first column, the network node apparatus 2303 checks as to whether or not a result of "AND"-gating operation between the mask "Mask7" and the destination external IP address "EA4" contained in the external IP packet 2312 is made coincident with the destination external IP address "EA7*x*" contained in the record of the first column (refer to below-mentioned formula (4)). In this case, the "AND"-gating result is not made coincident with the destination external IP address "EA7*x*". Next, as to the record of the second column, the network node apparatus 2303 checks as to whether or not a result of "AND"-gating operation between the destination external IP mask "Mask4" and the destination external IP address "EA4" contained in the external IP packet 2312 is made coincident with the destination external IP address "EA4*x*" contained in the record of the second column (refer to below-mentioned formula (5)). In this case, this "AND"-gating result is made coincident with the destination external IP address "EA4*x*".

If ("Mask7" and "EA4"="EA7x") (4)

If ("Mask4" and "EA4"="EA4x") (5)

In this example, a record of a second column of the address administration table 2303-1 from a top column is equal to "Mask4, EA4*x*, IA5, IA4". While using the address of "IA4" present in this record, a simple header is applied to the IP packet 2312 so as to form an internal packet 2314 (namely, simple capsulation operation). It should be noted that the simple header does not contain the transmission source internal address "IA5". The formed internal packet 2314 is reached via the routers 2307-3, 2307-4 and 2307-2 to the network node apparatus 2302. The network node apparatus 2302 removes the simple header of the received internal packet 2314 (simple inverse-capsulation operation), and sends out the acquired external IP packet 2318 (having the same content of IP packet 2312) to the communication line. Then, the IP terminal 2306-4 receives this IP packet 2318.

Next, in the network node apparatus 2301-1, an IP packet 2311 which is sent from the terminal 2306-2 to the terminal 2306-7 is simple-capsulated in a capsulation manner similar to the above-explained capsulation manner by employing a record "EA2, EA7, IA2, IA7" of a second column of the address administration table 2301-1 so as to become an internal capsule 2316. This internal capsule 2316 is reached via the routers 2307-1, 2307-2 and 2307-4 to the network node apparatus 2304. This network node apparatus 2304 removes the simple header of the received internal packet 2316 (namely, simple reverse-capsulation operation), and then sends out the acquired external IP packet 2319 (having the same content of IP packet 2311) to the communication line, and the IP terminal 2306-7 receives this IP packet 2319.

It should also be understood that the above-explained address mask technical method has a similar basic idea to that of the address mask technical method as explained with reference to FIG. 351. As another example of the capsulation operation and the inverse-capsulation operation by employing the simple header, the known MPLS label by way of the MPLS technical method may be utilized. In this example, while the MPLS label contains the destination internal address, the MPLS label does not contain the transmission source internal address.

Next, in the network node apparatus 2305, the IP packet 2321 sent out from the terminal 2306-9 to the terminal 2306-8 undergoes a simple encapsulation using the record "Msk8, EA8*y*, IA8" in the second line of the address management table 2305-1 according to a method similar to that of the above-mentioned case thereby to become an internal capsule 2322, which goes through the router 2307-4 and then reaches the network node apparatus 2304. The network node apparatus 2304 removes the simple header of the received internal packet 2322 (simple decapsulation), and then sends out the external IP packet 2323 (having the same contents of the IP packet 2321) obtained as described above onto the communication line. The IP terminal 2306-8 then receives the IP packet 2319.

FIG. 358 shows the form of an internal packet(referred to also as an internal frame) formed in the above-mentioned simple encapsulation. The internal packet has a form in which a simple header is added to an external IP packet. The simple header includes a destination internal address and an information region, but does not include a transmission source internal address. The information region includes the information(protocol and the like) concerning the payload region of the internal packet. Another embodiment of the above-mentioned simple encapsulation and decapsulation is described below with reference to FIGS. 359 and 360. In the figure, reference numerals 2351-1 to 2351-7 indicate IP transfer networks. Reference numerals 2352-1 to 2352-7 indicate terminals having an external IP address "EA1". Reference numerals 2353-1 to 2353-7 indicate terminals having an external IP address "EA2". Reference numerals 2354-1 to 2354-7 indicate internal packets (internal frames). Reference numerals 2355-1 to 2355-7 and 2356-1 to 2356-7 indicate network node apparatuses. Each reference numeral 2359-1 to 2359-7 indicates a connection point(logical terminal) between a communication line and a network node apparatus, and an internal IP address "IA1" is assigned. Each reference numeral 2360-1 to 2360-7 indicates a connection point(logical terminal) between a communication line and a network node apparatus, and an internal IP address "IA2" is assigned. Reference numerals 2357-1 to 2357-7 and 2358-1 to 2358-7 indicate address administration tables. Each terminal and each network node apparatus are interconnected by a communication line, and so are each network node apparatus and the other terminals. An IP packet is transmitted and received between each terminal and each network node apparatus, while an above-mentioned internal packet(internal frame) is transferred between the network node apparatuses.

The terminal 2352-1 transmits an IP packet having a transmission source address "EA1" and a destination address "EA2". On receiving the IP packet, the network node apparatus 2355-1 confirms that the internal address assigned to the logical terminal at the termination end of the communication line to which the IP packet is inputted is "IA1", and that the destination external IP address of the IP packet is "EA2". The network node apparatus then searches the inside of the address administration table 2357-1 thereby to find a record having firstly the transmission source internal IP address "IA1" and secondly the destination external IP address "EA2". In this example, this is the record "EA2, IA1, IA2" in the first line of the address administration table 2357-1. By using the address "IA2" within the record, a simple header is added to the IP packet, whereby an internal packet 2354-1 is formed (simple encapsulation). The formed internal packet 2354-1 goes through the communication line and then reaches the network node apparatus 2356-1. The network node apparatus 2356-1 removes the simple header of the received internal packet 2354-1 (simple decapsulation), and then sends out the obtained external IP packet to the communication line. The IP terminal 2353-1 then receives the restored IP packet.

The terminal 2352-2 transmits an IP packet having a transmission source address "EA1" and a destination address "EA2". On receiving the IP packet, regardless of the internal address assigned to the logical terminal at the termination end of the communication line to which the IP packet is inputted, the network node apparatus 2355-2 confirms that the transmission source external IP address of the IP packet is "EA1", and that the destination external IP address is "EA2". The network node apparatus then searches the inside of the address administration table 2357-2. In this example, the result is the record "EA1, EA2, IA2" in the first line of the address administration table 2357-2. By using the address "IA2" within the record, a simple header is added to the IP packet, whereby an internal packet 2354-2 is formed(simple encapsulation). The formed internal packet 2354-2 goes through the communication line and then reaches the network node apparatus 2356-2. The network node apparatus 2356-2 removes the simple header of the received internal packet 2354-1 (simple decapsulation), and then sends out the obtained external IP packet to the communication line. The IP terminal 2353-2 then receives the restored IP packet.

The terminal 2352-3 transmits an IP packet having a transmission source address "EA1" and a destination address "EA2". On receiving the IP packet, regardless of the internal address assigned to the logical terminal at the termination end of the communication line to which the IP packet is inputted, the network node apparatus 2355-3 confirms that the destination external IP address of the IP packet is "EA2". The network node apparatus then searches the inside of the address administration table 2357-1 thereby to find a record having the destination external IP address "EA2". In this example, the result is the record "EA2, IA2" in the first line of the address administration table 2357-1. By using the address "IA2" within the record, a simple header is added to the IP packet, whereby an internal packet 2354-3 is formed(simple encapsulation). The formed internal packet 2354-3 goes through the communication line and then reaches the network node apparatus 2356-3. The network node apparatus 2356-1 removes the simple header of the received internal packet 2354-3 (simple decapsulation), and then sends out the obtained external IP packet to the communication line. The IP terminal 2353-3 then receives the IP packet.

The terminal 2352-4 transmits an IP packet having a transmission source address "EA1" and a destination address "EA2". On receiving the IP packet, the network node apparatus 2355-4 confirms that the internal address assigned to the logical terminal at the termination end of the communication line to which the IP packet is input is "IA1", and that the destination external IP address of the IP packet is "EA2". The network node apparatus then searches the inside of the address administration table 2357-4 thereby to find a record having firstly the transmission source internal IP address "IA1". In this example, the result is the record "Msk1, EA1*x*, Msk2, EA2*x*, IA1, IA2" in the first line of the address administration table 2357-4. The network node apparatus checks first whether the result of the "and" operation between the mask "Msk2" of the record in the first line and the destination external IP address "EA2" of the input external IP packet coincides with the destination external IP address "EA2*x*" of the record in the first line or not (the following equation (6)), and further checks whether the result of the "and" operation between the transmission source external IP mask "Msk1" and the transmission source external IP address "EA1" in the external IP packet coincides with the destination external IP address "EA1*x*" in the record or not (the following equation (7)). They coincide in this case.

If ("Msk2" and "EA2"="EA2x") (6)

If ("Msk1" and "EA1"="EA1x") (7)

In this example, it is the above-mentioned record in the first line of the address administration table 2357-4. By using the address "IA2" within the record, a simple header is added to the IP packet, whereby an internal packet 2354-4 is formed (simple encapsulation). The formed internal packet 2354-4 goes through the communication line and then reaches the network node apparatus 2356-4. The network node apparatus 2356-4 removes the simple header of the received internal packet 2354-4 (simple decapsulation), and then sends out the obtained external IP packet to the communication line. The IP terminal 2353-4 then receives the IP packet.

The case that the terminal 2352-5 transmits an IP packet having a transmission source address "EA1" and a destination address "EA2" and that the network node apparatus 2355-5 receives the IP packet is similar to the case that the terminal 2352-4 transmits the IP packet having a transmission source address "EA1" and a destination address "EA2". The point of difference is not to carry out the "and" operation between the destination external IP mask and the destination external IP address in the external IP packet. The other points are the same.

The case that the terminal 2352-6 transmits an IP packet having a transmission source address "EA1" and a destination address "EA2" and that the network node apparatus 2355-6 receives the IP packet is similar to the case that the terminal 2352-4 transmits the IP packet having a transmission source address "EA1" and a destination address "EA2". The point of difference is not to carry out the confirmation on the internal address assigned to the logical terminal at the termination end of the communication line to which the IP packet is inputted. The other points are the same.

The case that the terminal 2352-7 transmits an IP packet having a transmission source address "EA1" and a destination address "EA2" and that the network node apparatus 2355-7 receives the IP packet is similar to the case that the terminal 2352-5 transmits the IP packet having a transmission source address "EA1" and a destination address "EA2". The point of difference is not to carry out the confirmation on the internal address assigned to the logical terminal at the termination end of the communication line to which the IP packet is inputted. The other points are the same.

In accordance with the present invention, the terminal-to-terminal communication connection control method applicable to IP transfer networks may be realized, while combining several functions with each other, or changing some functions, which are disclosed in Japanese Patent Application No. 128956/1999 filed by the Applicant, the line(circuit) connecting method of the No. 7-common line signal system, "JT-H323 gateway standardized by ITU-T recommendation H323 ANNEX D", "SIP telephone protocol", and the embodiment-36 of Japanese Patent No. 3084681-B2. Furthermore, while a media router, a gateway, and an IP network service operation/management server are conducted, the arrangements and the operation sequences of the media router and the gateway are concretely defined; modes of IP packets used in terminal-to-terminal communications with employment of the media router and the gateway are concretely defined; and also the functions which should be owned by the IP network service operation/management servers are concretely defined.

In accordance with Japanese Patent Application No. 128956/1999, the integrated IP transfer network contains a plurality of IP transfer networks. In other words, the integrated IP transfer network contains at least two, or more networks of the IP data network, the IP telephone network, the IP voice/image network (IP audio/visual network), the best effort network, the IP data multicast network, the IP base TV broadcast network, and the network node apparatus. The network node apparatus is connected via the communication line to any one, or more of the IP transfer networks. On the other hand, the network node apparatus terminal of the network node apparatus is connected via the communication line to the terminal externally provided with the integrated IP transfer network.

In the present invention, an integrated IP transfer network contains thereinto one, or more gateways. Alternatively, the integrated IP transfer network is directly connected via a communication line connected to a network node apparatus to one, or more media routers, otherwise, is indirectly connected to a media router provided inside a LAN. Both a gateway and a media router correspond to one sort of such a router having a function that an IP terminal, an IP telephone set, an IP voice/image(audio/visual) apparatus, and the like are directly connected to the router so as to be stored thereinto. While either the gateway or the media router, and a domain name server provided inside the integrated IP transfer network, are employed, a connection control of terminal-to-terminal communications is carried out by employing an IP transfer network among terminals. In order that terminals are registered/recorded into the IP transfer network, at least addresses of these terminals are recorded/saved in an address management table employed in the network node apparatus, or in the domain name server installed in the IP transfer network. Also, an IP network service operation/management server is provided in each of the IP transfer networks. This IP network service operation/management server is provided so as to manage resources of network in a batch mode every communication industry. As the network resources, there are operation/management of the IP transfer network, services provided by the IP transfer networks, the routers, and communication lines.

The sort of the above-explained IP service operation/management servers may be determined with respect to each of the various IP transfer networks. For instance, an IP data service operation/management server(DNS) for managing IP data communications in a batch mode may be installed inside the IP data network. Also, an IP telephone service operation/management server (TES) for managing telephone communications in a batch mode may be installed inside the IP telephone network. Also, an IP voice/image service operation/management server (AVS) for managing voice/image communications in a batch mode may be installed inside the IP voice/image network. A best effort service operation/management server (BES) for managing best effort communications in a batch mode may be installed inside a best effort network. An IP data multicast service operation/management server (DMS) for managing IP data multicast communications in a batch mode may be installed inside an IP data multicast network. Further, an IP base TV broadcast service operation/management server (TVS) for managing IP base TV broadcasting operations in a batch mode may be installed in an IP base TV broadcast network. It should be understood that a service operation/management server provided in each of the IP transfer networks may be subdivided into a network service server and a network operation/management server. The network service server mainly manages network services provided by the respective IP transfer networks, whereas the network operation/management server mainly manages resources of a network.

Referring now to drawings, various embodiments of the present invention will be described.

1. First Embodiment Using Media Router

Figure 20:
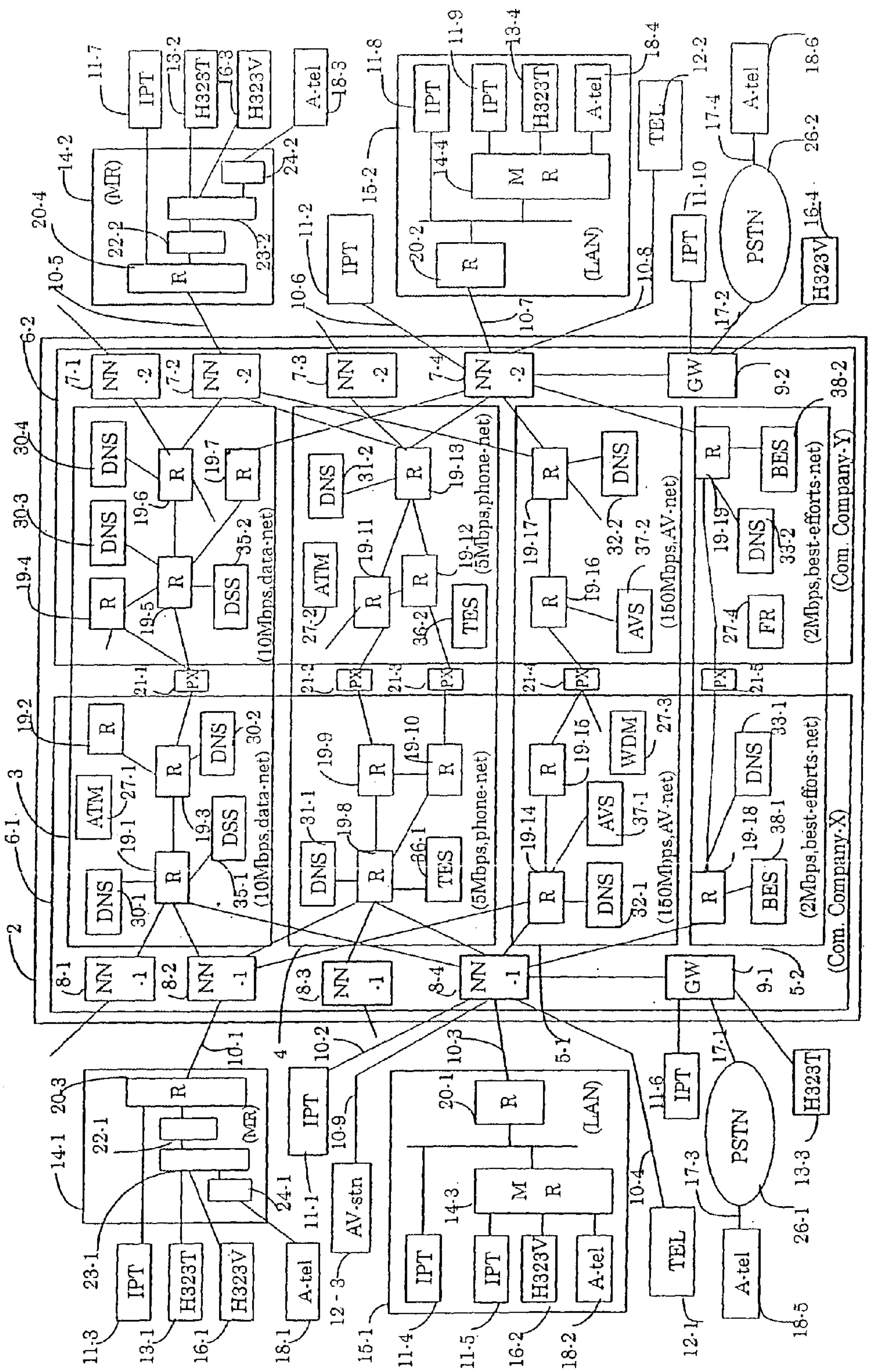
FIG. 20 is a schematic diagram for showing a node of an IP transfer network directed to the present invention.

In FIG. 20, reference numeral 2 shows an integrated IP transfer network, reference numeral 3 indicates an IP data network, reference numeral 4 represents an IP telephone network, reference numeral 5-1 denotes an IP voice/image network, reference numeral 5-2 shows a best effort network, reference numeral 6-1 indicates a range of an IP transfer network operated/managed by a communication company "X", and reference numeral 6-2 represents a range of an IP transfer network operated/managed by a communication company "Y". Also, reference numerals 7-1, 7-2, 7-3, 7-4, 8-1, 8-2, 8-3 and 8-4 show a network node apparatus, respectively. Reference numerals 9-1 and 9-2 represent gateways. Reference numerals 10-1 to 10-8 show communication lines, reference numerals 11-1 to 11-10 denote IP terminals, reference numerals 12-1 and 12-2 show independent type IP telephone sets, and reference numerals 13-1 to 13-4 represent dependent type IP telephone sets. Further, reference numerals 16-1 to 16-4 represent dependent type IP voice/image apparatus.

The network node apparatus is connected to any of the IP transfer networks via a communication line. In other words, the network node apparatus is connected to one, or more networks of the IP data network 3, the IP telephone network 4, the IP voice/image network 5-1 and the best effort network 5-2. On the other hand, the network node apparatus is connected via the communication lines 10-1 to 10-8 to the IP terminals 11-1 and 11-2, the independent type IP telephone sets 12-1 and 12-2, the media routers 14-1 and 14-2, and the LANs 15-1 and 15-2. The IP terminals are installed outside the integrated IP transfer network. The media routers 14-3 and 14-4 are installed inside the LAN 15-1 and the LAN 15-2, and are indirectly connected to the network node apparatus. The media routers 14-1 to 14-4 are directly connected to the dependent type IP telephone sets 13-1, 13-2, 13-4; the dependent type IP voice/image apparatuses 16-1, 16-2, 16-3; and analog telephone sets 18-1 to 18-4 so as to store thereinto them. Other analog telephone sets 18-5 and 18-6 are connected via public switched telephone networks 26-1 and 26-2 to the gateways 9-1 and 9-2. The gateway 9-1 is connected via a communication line to the network node apparatus 8-4, and the gateway 9-2 is connected via a communication line to the network node apparatus 7-4.

Reference numerals 19-1 to 19-19 show routers which transfer IP packets, and reference numerals 26-1 and 26-2 represent public switched telephone networks (will be referred to as a "PSTN" hereinafter). The media router 14-1 is connected via the communication line 10-1 to the network node apparatus 8-2, the media router 14-2 is connected via the communication line 10-5 to the network node apparatus 7-2, the LAN 15-1 is connected via the communication line 10-3 to the network node apparatus 8-4, and the LAN 15-2 is connected via the communication line 10-7 to the network node apparatus 7-4.

The analog telephone set 18-5 is connected to the network node apparatus 8-4 via the telephone line 17-3, the public switched telephone network 26-1, the telephone line 17-1 and the gateway 9-1. Similarly, the analog telephone set 18-6 is connected to the network node apparatus 7-4 via the telephone line 17-4, the public switched telephone network 26-2, the telephone line 17-2 and the gateway 9-2. The media router 14-1 contains a router 20-3, a connection control unit 22-1, an H323 termination unit 23-1 and an SCN interface 24-1. The router 20-3 is connected to the connection control unit 22-1. The connection control unit 22-1 is connected to the H323 termination unit 23-1. The H323 termination unit 23-1 is connected to the SCN interface. Similarly, the media router 14-2 contains a router 20-4, a connection control unit 22-2, an H323 termination unit 23-2 and an SCN interface 24-2.

The router 20-1 provided inside the LAN 15-1 is connected via the communication line 10-3 to the network node apparatus 8-4. The LAN 15-1 is connected via a LAN communication line such as the Ethernet to both the IP terminal 11-4 and the media router 14-3. Also, the media router 14-3 is connected via the communication line to the IP terminal 11-5, the dependent type IP voice/image apparatus 16-2, and the analog telephone set 18-2, respectively. Similarly, the router 20-2 provided inside the LAN 15-2 is connected via the communication line 10-7 to the network node apparatus 7-4. The LAN 15-2 is connected via a LAN communication line such as the Ethernet to both the IP terminal 11-8 and the media router 14-4. Also, the media router 14-4 is connected via the communication line to the IP terminal 11-9, the dependent type IP telephone set 13-4 and the analog telephone set 18-4, respectively.

Reference numerals 21-1 to 21-5 show routers which transfer IP packets between the range 6-1 managed by the communication company "X" and the range 6-2 managed by the communication company "Y". Also, reference numerals 27-1 and 27-2 show ATM(asynchronous transfer mode) networks, reference numeral 27-3 indicates an optical communication network, and reference numeral 27-4 denotes a frame relay (FR) switching network, which are employed as a high speed main line network used to transfer an IP packet, respectively. It should also be noted that the ATM network, the optical communication network and the frame relay switching network may be employed as any of elements of sub-IP networks employed in the integrated IP transfer network.

The IP data service operation/management server 35-1, the IP telephone service operation/management server 36-1, the IP voice/image service operation server 37-1, and the best effort service operation/management server 38-1 are managed by the communication company "X", respectively, and are provided within the range 6-1 of the network which is managed by the communication company "X". Also, the IP data service operation/management server 35-2, the IP telephone service operation/management server 36-2, the IP voice/image service operation server 37-2 and the best effort service operation/management server 38-2 are managed by the communication company "Y", respectively, and are provided within the range 6-2 of the network which is managed by the communication company "Y".

Various sorts of multimedia terminals which are connected via the communication lines outside the integrated IP transfer network 2, namely, an IP telephone set and an IP voice/image apparatus can be specified as to internal location positions of the integrated IP transfer network 2 by using host names as addresses for identifying multimedia terminals in a similar manner to other IP terminals. The host names of the IP terminals and of the multimedia terminals are similar to host names of computers used in the Internet. These host names may be applied in correspondence with IP addresses applied to the respective IP terminals and multimedia terminals. In accordance with the present invention, telephone numbers which are applied to IP telephone sets and IP voice/image apparatus are employed as the host names of the IP telephone sets and the IP voice/image apparatus.

A domain name server(will be referred to as a "ADNS" hereinafter) holds information as to a one-to-one correspondence relationship between a host name and an IP address. A major function of the domain name server is given as follows: When a host name is provided, an IP address is answered. The major function owns a similar function used in the Internet.

With respect to the IP terminals 11-3, 11-1, 11-4, 11-6 and the like, which are employed in the IP data network connected to the network node apparatus managed by the communication company "X", a domain name server 30-1 dedicated to the IP data network holds information as to a one-to-one correspondence relationship among host names and IP addresses, which are applied to the respective terminals. Also, with respect to the IP terminals 11-7, 11-2, 11-8 and the like, which are employed in the IP data network connected to the network node apparatus managed by the communication company "Y", a domain name server 30-4 dedicated to the IP data network holds information as to a one-to-one correspondence relationship among host names and IP addresses, which are applied to the respective terminals.

With respect to the dependent type IP telephone sets 13-1, 13-3, and the analog telephone sets 18-1, 18-2, 18-5, which are employed in the IP telephone network connected to the network node apparatus managed by the communication company "X", a domain name server 31-1 dedicated to the IP telephone network holds information as to a one-to-one correspondence relationship among host names (telephone numbers) and IP addresses, which are applied to the telephone sets. Also, with respect to the dependent type IP telephone set 13-2 and the analog telephone sets 18-3, 18-4, 18-6, which are employed in the IP telephone network connected to the network node apparatus managed by the communication company "Y", a domain name server 31-2 dedicated to the IP telephone network holds information as to a one-to-one correspondence relationship among host names (telephone numbers) and IP addresses, which are applied to these telephone sets.

With respect to the dependent type IP voice/image apparatus 16-1 and the independent type IP voice/image apparatus 12-3, which are employed in the IP voice/image network connected to the network node apparatus managed by the communication company "X", a domain name server 32-1 dedicated to the voice/image network holds information as to a one-to-one correspondence relationship among host names (numbers of IP voice/image apparatus) and IP addresses, which are applied to the IP voice/image apparatus. Also, with respect to the dependent type IP voice/image apparatus 16-3 and 16-4 which are employed in the IP voice/image network connected to the network node apparatus managed by the communication company "Y", a domain name server 32-2 dedicated to the IP voice/image network holds information as to a one-to-one correspondence relationship among host names(numbers of IP voice/image apparatus) and IP addresses, which are applied to the IP voice/image apparatus.

With respect to the IP terminal 11-5 and the dependent type IP voice/image apparatus 16-2, which are employed in the best effort network connected to the network node apparatus managed by the communication company "X", a domain name server 33-1 dedicated to the best effort network holds information as to a one-to-one correspondence relationship among host names and IP addresses, which are applied to the terminals. Also, with respect to the IP terminal 11-9, 11-10 and the dependent type IP telephone set 13-4, which are employed in the best effort network connected to the network node apparatus managed by the communication company "Y", a domain name server 33-2 dedicated to the best effort network holds information as to a one-to-one correspondence relationship among host names and IP addresses, which are applied to the terminals.

Figure 21:
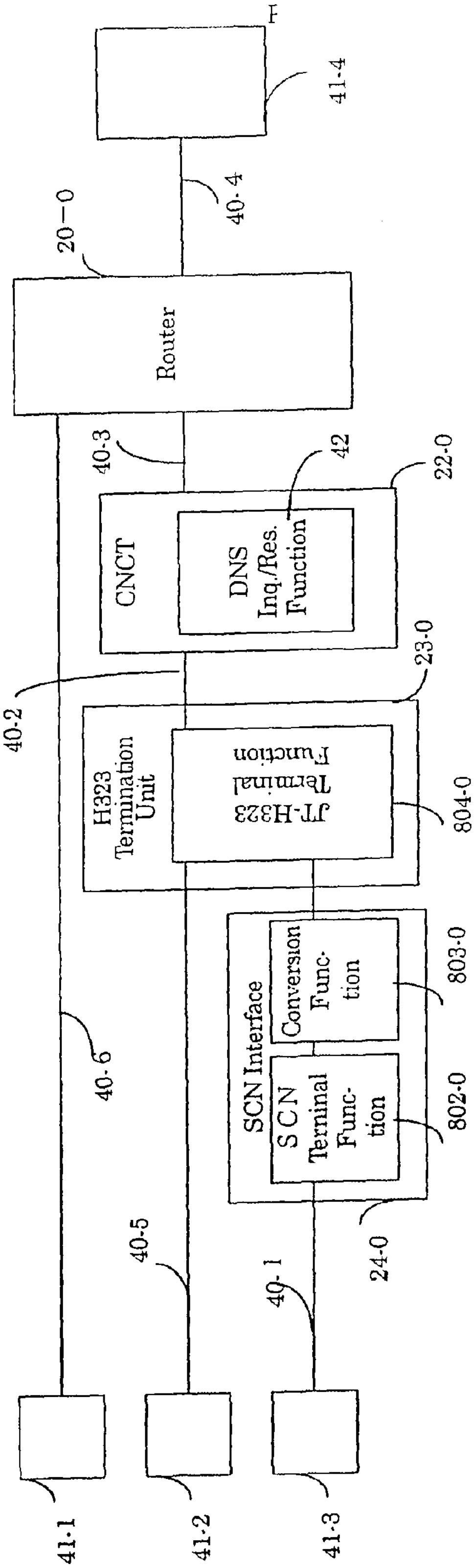
FIG. 21 is an auxiliary diagram for explaining a function of a media router disclosed as a first embodiment of the present invention, and a function of a gateway disclosed as a second embodiment.
Figure 22:
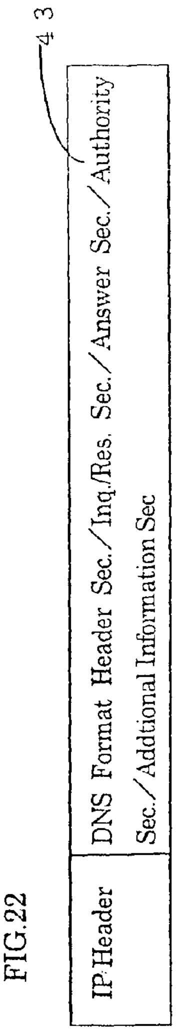
FIG. 22 is an explanatory diagram for explaining one mode of an IP packet used to describe the functions of the media router/gateways according to the first embodiment and the second embodiment of the present invention.

Next, both a basic function of a media router and a basic function of a gateway, which constitute the major elements of the present invention, will now be described with reference to FIG. 21 and FIG. 22.

An SCN terminal function 802-0, a conversion function 803-0 and a terminal function 804-0 contain the functions owned by the above-explained SCN terminal function 802, conversion function 803 and terminal function 804, respectively. A voice signal and an image signal, which are entered from the analog telephone set 41-3 via the SCN line 40-1, are converted into digital data signals in the SCN terminal function 802-0. In the conversion function 803-0, a data format and a signal transmission/reception rule are converted. In the terminal function 804-0, the converted digital data signal is converted into an IP packet format which is transmitted to the IP communication line 40-2. Also, a signal flow along a direction opposite to the above-described signal flow direction will now be explained.

That is, an IP packet containing voice data and image data, which is entered from the IP communication line 40-2, is decoded into a digital data format in the terminal function 804-0. In the conversion function 803-0, both the data format and a signal transmission/reception rule are converted. The converted digital data is further converted into a signal flowing through the SCN line in the SCN terminal function 802-0. Then, the signal is transmitted via the SCN line 40-1 to the analog telephone set 41-3. An SCN interface 24-0 contains both an SCN terminal function 802-0 and a conversion function 803-0. Since an H323 termination unit 23-0 contains the terminal function 804-0 and this terminal function 804-0 contains the above-explained H323 termination function, the H323 termination unit 23-0 can perform an interactive communication through the terminal 41-2 and the communication line 40-5. The multimedia terminal 41-2 employed in the present invention corresponds to an IP telephone set, an IP voice/image apparatus and the like, which are designed in accordance with the H323 specification.

A connection control unit 22-0 is connected via the communication line 40-2 to the H323 termination unit 23-0, and via the line 40-3 to a router 20-0. The router 20-0 is connected via the communication line 40-4 to a network node apparatus 41-4, and also via the communication line 40-6 to an IP terminal 41-1. An IP packet 810 functioning as call control data flows through the communication line 40-2, another IP packet 811 functioning as net data which constitutes voice flows through the communication line 40-2, and another IP packet 812 functioning as net data which constitutes an image itself flows through the communication line 40-2.

The call control data corresponds to a host name such as a telephone number and a personal computer. On the other hand, the IP packet 43 flowing through the communication line 40-3 may employ such a data format that a host name is notified to a DNS so as to obtain an inquiry response, namely a DNS inquiry/response format, for example, RFC 1996 (A Mechanism for Prompt Notification of Zone Changes). A DNS inquiry/response function 42 has such a function that the H323 format call control data 810 is converted into the DNS inquiry/response format data 43, and the DNS is inquired to obtain an IP address corresponding to a host name. It should be understood that the IP packet 811 which constitutes the voice, and also the IP packet 812 which constitutes the image itself will pass through the connection control unit 42 in the transparent manner.

When the above-explained operations are summarized, the telephone number entered from the analog telephone set 41-3 is changed into the digital telephone number by the SCN interface 24-0, and then the digital telephone number is inputted into the H323 termination unit 23-0. Otherwise, both the telephone number and the host name of the multimedia terminal are entered as the H323 format type call control data 810 into the H323 termination unit 23-0. The telephone number and the host name of the multimedia terminal are entered from the H323 format type IP telephone set 41-2, and are designed in accordance with the H323 specification. Both the telephone numbers correspond to the H323 format type call control data 810 on the communication line 40-2, and the H323 format type call control data 810 are converted into the DNS inquiry/response format 43 via the connection control unit 22-0. It should be understood that the call control data sent from the IP terminal 41-1 originally employs the DNS inquiry/response format 43 and need not use the function of the connection control unit 22-0, the call control data is directly connected to the router 20-0. In this case, the router 20-0 collects both the communication lines 40-3 and 40-6, and also penetrates the IP packet through the own router 20-0. It should also be noted that the net data which constitutes the voice and the image itself contained in the IP packets 811 and 812 may pass through the connection control unit 22-0 without being changed. The IP packets are transmitted/received via the line 40-4 between the net node apparatus 41-4 and the router 20-0.

A concrete example of the DNS inquiry/response will now be explained. In the case that both a telephone number "81-47-325-3897" and an IP address "192.1.2.3" are applied to an IP telephone set, when the telephone number "81-47-325-3897" is inquired to the domain name server DNS, the DNS responds as the IP address "192.1.2.3". Alternatively, in such a case that both a host name "host1.dname1.dname2.co.jp" and an IP address "128.3.4.5" are applied to a personal computer corresponding to an IP terminal, when the host name "host1.dname1.dname2.co.jp" is inquired to the DNS, this DNS answers the IP address "128.3.4.5" of the personal computer.

Since an IP packet is transmitted/received among the IP terminal 41-1, the multimedia terminal 41-2 and the analog terminal 41-3, a communication can be established. In other words, the IP terminal 41-1 transmits/receives the IP packet with respect to the multimedia terminal 41-2 via the router 20-0, the connection control unit 22-0, and the H323 termination unit 23-0, so that the mutual communication can be established between the IP terminal 41-1 and the multimedia terminal 41-2. Further, the IP terminal 41-1 may mutually communicate with the analog telephone set 41-3 via the SCN interface 24-0. Also, the multimedia terminal 41-2 may mutually communicate with the analog telephone set 41-3 via the H323 termination unit 23-0 and the SCN interface 24-0.

<<Operation of Media Router>>

Operations of the media router 14-1 according to the present invention will now be explained with reference to FIG. 23. The router 20-3 which constitutes one element of the media router 14-1 owns the function of the router 20-0 shown in FIG. 21. A connection control unit 22-1 of FIG. 23 owns the function of the connection control unit 22-0 shown in FIG. 21. An H323 termination unit 23-1 of FIG. 23 owns the function of the H323 termination unit 23-0 indicated in FIG. 21. An SCN interface 24-1 of FIG. 23 owns the function of the SCN interface 24-0 shown in FIG. 21. Reference numeral 48-1 of FIG. 23 owns a similar function as to the above-explained DNS. An RAS mechanism 49-1 corresponds to such a mechanism capable of registering/certificating a terminal into the media router 14-1, and also capable of managing an internal condition of the media router(for example, the internal components and their utilization conditions are managed in a batch mode).

In this case, the registration by the RAS mechanism 49-1 implies that the terminal is connected to the media router, whereas the certification thereof implies that the RAS mechanism 49-1 confirms as to whether or not the terminal is formally utilized in accordance with the connection permission condition of the terminal. Reference numeral 50-1 shows an information processing mechanism capable of executing an information processing operation within the media router 14-1. Reference numeral 51-1 shows an operation input/output unit of the media router 14-1. As a consequence, the respective functions owned by the connection control unit 22-1, the H323 termination unit 23-1, and the SCN interface 24-1 employed in the media router 14-1 of FIG. 23 may be apparent from the descriptions as to the connection control unit 22-0, the H323 termination unit 23-0, and the SCN interface 24-0 indicated in FIG. 21.

<<Communication Connection Control Between IP Terminals>>

Referring now to FIG. 23, FIG. 24, and FIG. 25 to FIG. 31, a description will be made of a sequential process operation that data stored in an IP packet is transmitted, or received from the IP terminal 11-3 to the IP terminal 11-7. The IP terminal 11-3 transmits such an IP packet 45-1 shown in FIG. 26 via a communication line 52-1 to a domain name server 48-1. The IP packet 45-1 stores thereinto the own address, namely a transmission source IP address "A113"; an address of a domain name server 48-1 employed in the medic router 14-1, namely a destination IP address "A481"; and a host name "IPT-11-7 name" of the IP terminal 11-7 of the communication party. In this case, the inquiry content shown in the IP packet 45-1, namely "IPT-11-7 name" is stored in "inquiry portions" within the "DNS inquiry/response format" indicated in FIG. 22.

The domain name server 48-1 checks the content of the received IP packet 45-1, and inquires to a domain name server 30-1 dedicated to the IP data network via the communication line 10-1 and the network node apparatus 8-2 (Step ST10). When the domain name server 30-1 returns an IP packet containing an IP address "A117" which corresponds to the above-explained host name "IPT-11-7 name" in a 1:1 correspondence to the domain name server 48-1 (Step ST11), the domain name server 48-1 returns an IP packet 45-2 to the IP terminal 11-3. In the above-explained sequential process operation, the network node apparatus 8-2 checks as to whether or not the transmission source address "A113" contained in the received IP packet 45-1 is registered into an address administration table with reference to the address administration table 44-1 of FIG. 25. In this case, the address administration table 44-1 indicates that an external IP address is "A113" on a record of a second row of the table from a top row, and a communication line discrimination symbol "Line-10-1" is equal to such an IP packet entered from the communication line 10-1. As a result, it can be confirmed that the IP terminal 11-3 is allowed/registered so as to be communicable through the network node apparatus. In the case that the IP terminal is not registered in the address administration table 44-1, the network node apparatus 8-2 can discard the received IP packet 45-1.

Next, in the case that the IP terminal 11-3 produces an IP packet 45-3 which is transmitted to the IP terminal 11-7 and then transmits the produced IP packet 45-3 via the router 20-3 to the network node apparatus 8-2, if this network node apparatus 8-2 transfers the IP packet 45-3 to the internal unit of the integrated IP transfer network 1, then the IP packet 45-3 passes through the communication lines and a plurality of routers(namely, routers 19-1, 19-3, 21-1, 19-5 and 19-6) employed in the IP data network 3 of FIG. 20, and thereafter, is reached to the network node apparatus 7-2. As a result, the network node apparatus 7-2 sends out the received IP packet 45-3 to the communication line 10-5 shown in FIG. 24 (Step ST12), the router 20-4 receives the IP packet 45-3, and then, transfers the IP packet via the communication line 52-2 to the IP terminal 11-7. When the IP terminal 11-7 which receives the IP packet 45-3 produces a returning IP packet 45-4, and then sends out the returning IP packet 45-4 via the communication line to the router 20-4, the returning IP packet 45-4 is reached to the network node apparatus 8-2 through the communication line 10-5 (Step ST13), the network node apparatus 7-2, and the IP data network 3 provided within the integrated IP transfer network 2. Then, such an IP packet 45-4 shown in FIG. 29 is supplied via the communication line 10-1 to the IP terminal 11-3. Since the IP packet is transmitted/received between the IP terminal 11-3 and the IP terminal 11-7 in the above-explained sequential process operation, the communication can be established.

It should be understood that the domain name server 48-1 employed in the media router may be removed from the media router 14-1 in the above-explained communication sequential operation from the IP terminal. In this alternative case, the IP terminal 11-3 transmits the IP packet 45-5 to the domain name server 30-1. The IP packet 45-5 stores thereinto the transmission source IP address "A113", the IP address "A301" of the domain name server 30-1 dedicated to the IP data network, and the host name "IPT-11-7 name" of the IP terminal 11-7 of the communication party. The domain name server 30-1 returns such an IP packet 45-6 containing an IP address "A117" which corresponds to the host name "IPT-11-7 name" in a 1-to-1 correspondence manner. It should also be noted that the technical method capable of directly accessing the domain name server 30-1 except for the domain name server 48-1 provided in the media router may be realized by way of the known technical method related to the domain name server.

When the above-explained process operation defined at the Step ST11 is accomplished, both the IP terminals 11-3 and 11-7 are brought into such a preparation condition that the communication is commenced. Under this preparation condition, when the network node apparatus 8-2 detects both the IP packets 45-2 and 45-6, a record of communications established between the IP terminals may be saved/recorded within the network node apparatus 8-2 in combination with this time instant, if necessary. In other words, a record of communications mode between the IP terminal 11-3 and the IP terminal 11-7 may be saved/recorded.

<<Communication Connection Control Between Dependent Type IP Telephone Sets>>

Next, a description will now be made of a sequential operation in which while a telephone number is dialed, a telephone communication is carried out from the dependent type IP telephone set 13-1 to the dependent type IP telephone set 13-2. In this example, a "dependent type IP telephone sets" indicates such an IP telephone set which is connected to the media routers 14-1, 14-2 and the like so as to establish a telephone communication, whereas an "independent type IP telephone set" indicates the IP telephone sets 12-1 and 12-2 shown in FIG. 20, which are not connected to the media router, but are directly connected to the network node apparatus. This communication sequence will be explained later.

Figure 23:
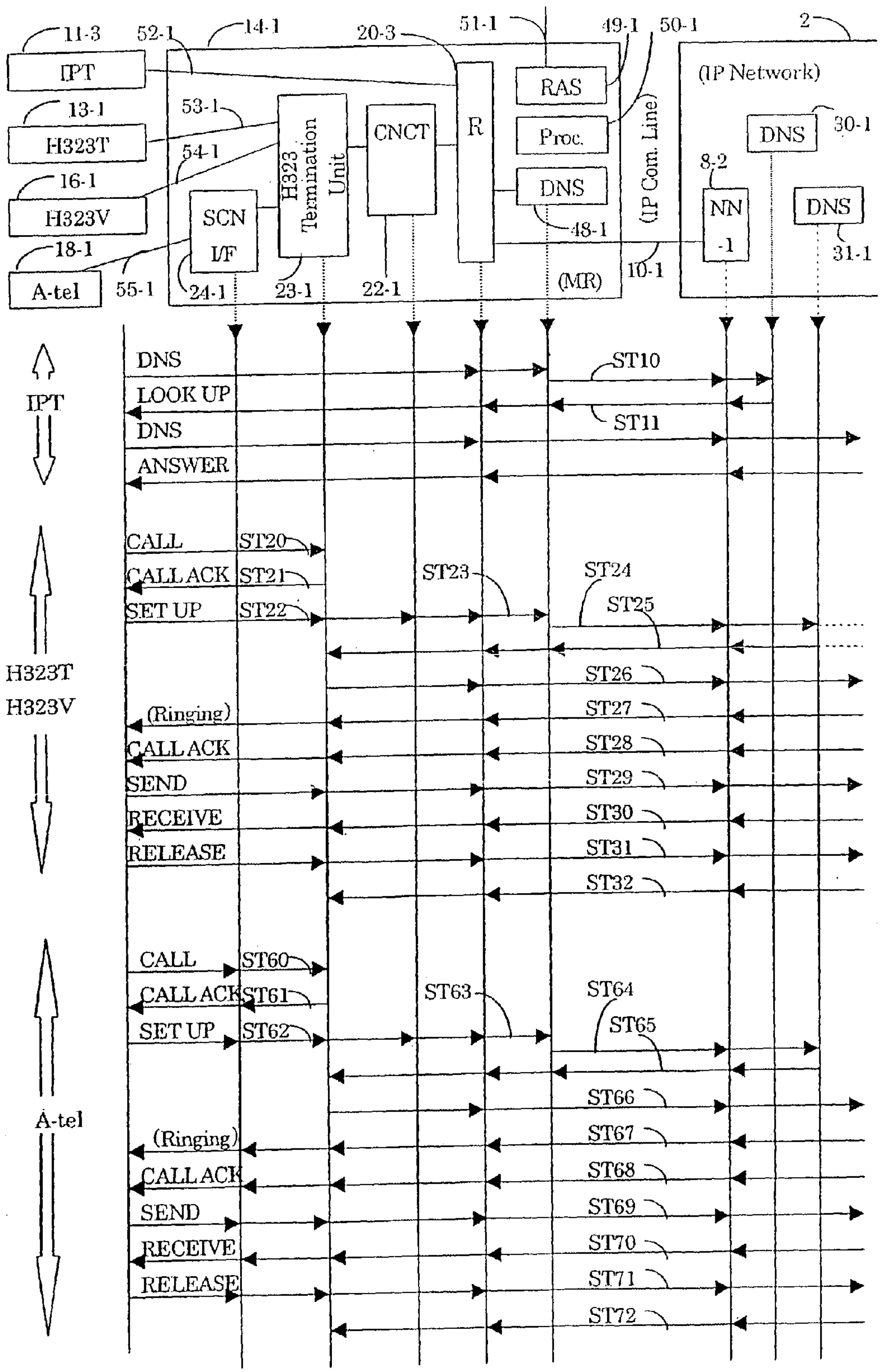
FIG. 23 is an auxiliary diagram for schematically representing an arrangement of the media router according to the first embodiment of the present invention, and for explaining operation sequence of this media router.
Figure 24:
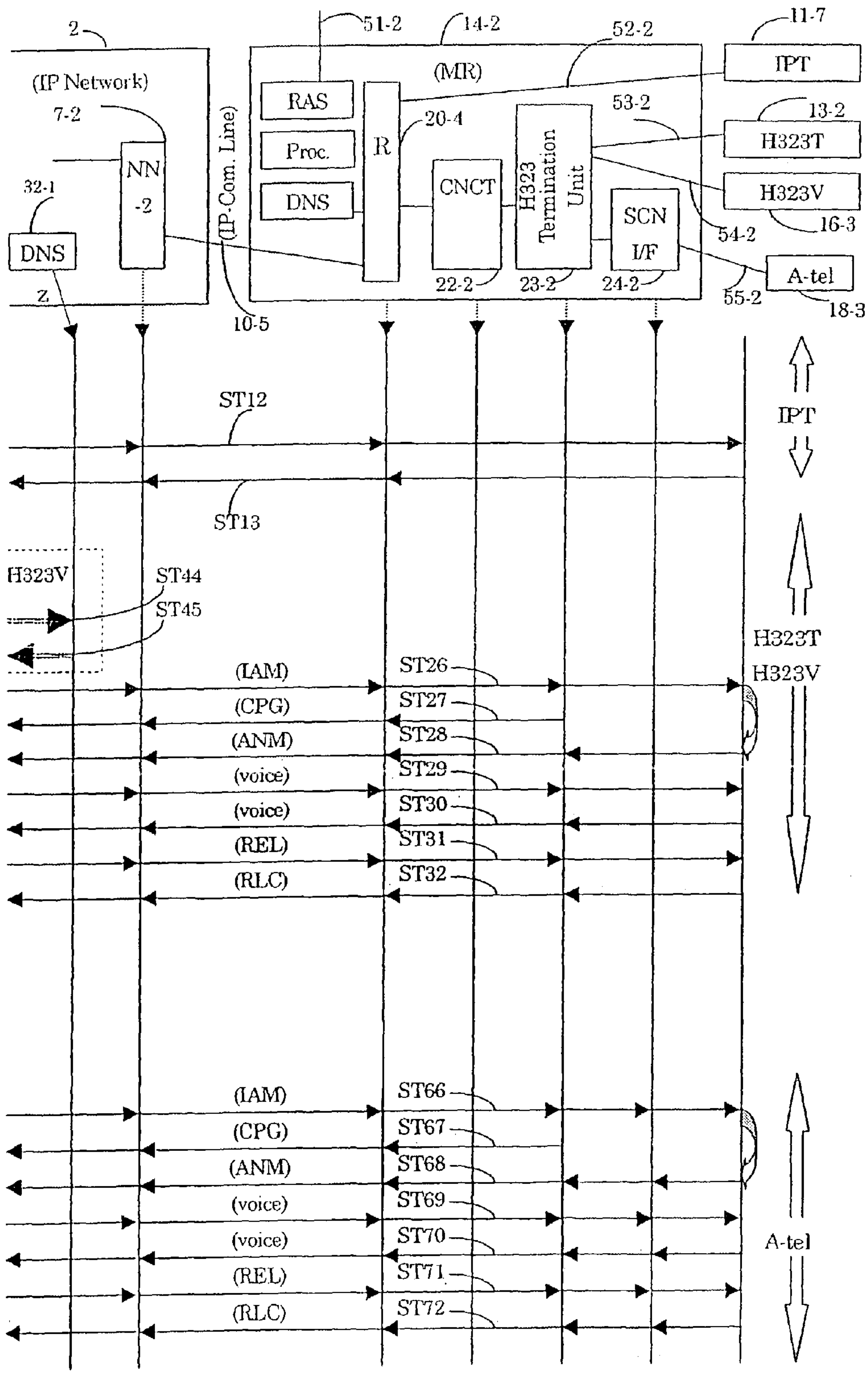
FIG. 24 is an auxiliary diagram for schematically representing an arrangement of the media router according to the first embodiment of the present invention, and for explaining operation sequence of this media router.

The dependent type IP telephone set 13-1 of FIG. 23 is connected via the communication line 53-1 to the H323 termination unit 23-1, and the dependent type IP telephone 13-2 of FIG. 24 is connected via the communication line 53-2 to the H323 termination unit 23-2.

Figure 32:
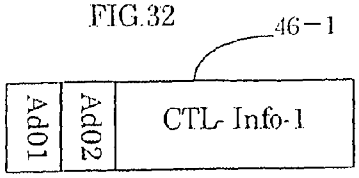
FIG. 32 is a diagram for explaining a mode of an IP packet appearing in two IP telephones communication.
Figure 33:
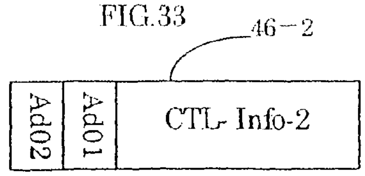
FIG. 33 is a diagram for explaining a mode of an IP packet appearing in two IP telephones communication.
Figure 34:
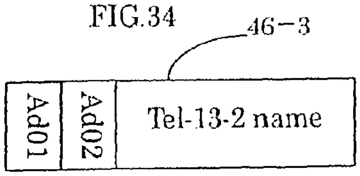
FIG. 34 is a diagram for explaining a mode of an IP packet appearing in two IP telephones communication.
Figure 35:
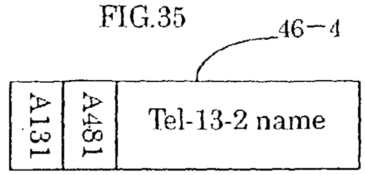
FIG. 35 is a diagram for explaining a mode of an IP packet appearing in two IP telephones communication.
Figure 36:
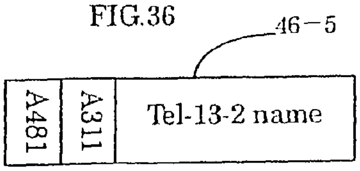
FIG. 36 is a diagram for explaining a mode of an IP packet appearing in two IP telephones communication.
Figure 37:
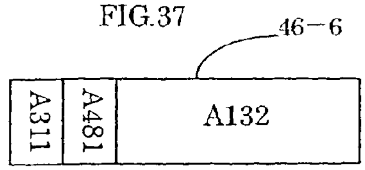
FIG. 37 is a diagram for explaining a mode of an IP packet appearing in two IP telephones communication.
Figure 38:
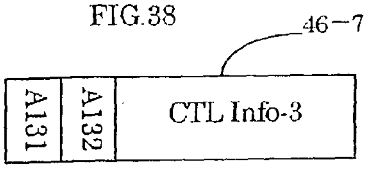
FIG. 38 is a diagram for explaining a mode of an IP packet appearing in two IP telephones communication.
Figure 39:
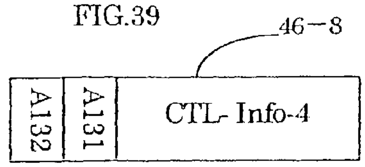
FIG. 39 is a diagram for explaining a mode of an IP packet appearing in two IP telephones communication.
Figure 40:
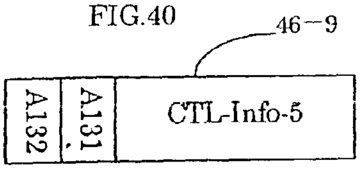
FIG. 40 is a diagram for explaining a mode of an IP packet appearing in two IP telephones communication.
Figure 41:
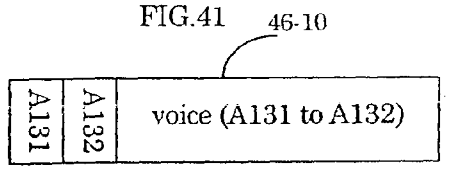
FIG. 41 is a diagram for explaining a mode of an IP packet appearing in two IP telephones communication.
Figure 42:
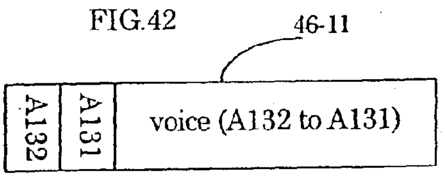
FIG. 42 is a diagram for explaining a mode of an IP packet appearing in two IP telephones communication.
Figure 43:
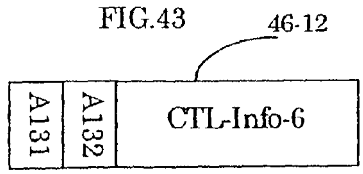
FIG. 43 is a diagram for explaining a mode of an IP packet appearing in two IP telephones communication.
Figure 44:
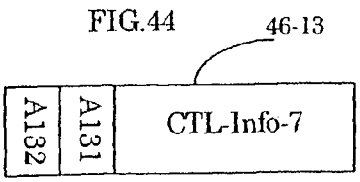
FIG. 44 is a diagram for explaining a mode of an IP packet appearing in two IP telephones communication.
Figure 45:
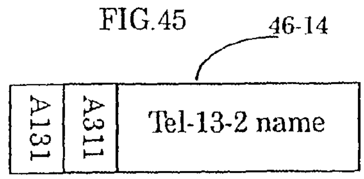
FIG. 45 is a diagram for explaining a mode of an IP packet appearing in two IP telephones communication.
Figure 46:
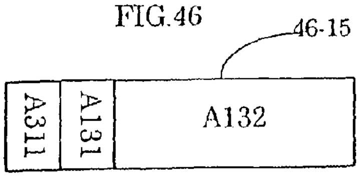
FIG. 46 is a diagram for explaining a mode of an IP packet appearing in two IP telephones communication.
Figure 50:
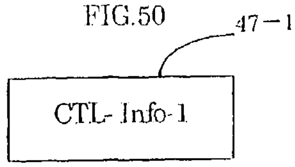
FIG. 50 is a diagram for explaining another embodiment mode of an IP packet appearing in two IP telephone sets communication.
Figure 51:
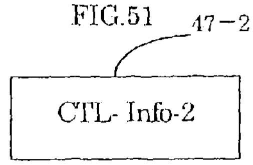
FIG. 51 is a diagram for explaining another embodiment mode of an IP packet appearing in two IP telephone sets communication.

When the handset of the dependent type IP telephone 13-1 is took up (off hook), such an IP packet 46-1 shown in FIG. 32, which notifies a telephone call, is sent to the communication line 53-1 indicated in FIG. 23 (Step ST20 of FIG. 23). Then, the H323 termination unit 23-1 detects that the telephone call is entered from the communication line 53-1, and returns an IP packet 46-2 in order to confirm the telephone call (Step ST21). In this case, symbol "CTL-Info-1" described in a payload(data field) of the IP packet 46-1 corresponds to call control information, whereas symbol "CTL-Info-2" described in a payload of the IP packet 46-2 corresponds to call confirmation information.

Next, when the user of the dependent type IP telephone set 13-1 dials a telephone number of the dependent type IP telephone set 13-2 as the communication counter party, such an IP packet 46-3 having, for example, the call control data format defined by H.225 is produced within the dependent type IP telephone set 13-1. The IP packet 46-3 contains a telephone number ("Tel-13-2 name") of the communication counter party, the telephone number of the dependent type IP telephone set 13-1, and the IP address. The IP packet 46-3 is transmitted via the communication line 53-1 to the H323 termination unit 23-1. A condition as to whether or not both the telephone number of the dependent type IP telephone 13-1 and the IP address are contained in the IP packet 46-3 may be optionally selected. The H323 termination unit 23-1 receives the IP packet 46-3 from the communication line 53-1 to retrieve records contained in a media router state table 100-1 shown in FIG. 47.

Then, the H323 termination unit 23-1 detects a line identifier indicative of the communication line 53-1, namely, a record of a first row of the media router state table 100-1 from a top row, i.e., "53-1". Also, the H323 termination unit 23-1 reads out a telephone number "81-3-1234-5679" and an IP address "32.3.53.1" of the dependent type IP telephone set 13-1, which are described in the detected record. Also, when both the IP address and the telephone number are not contained in the IP packet 46-3, the H323 termination unit 23-1 may set the values described in the media router state table to the IP packet 46-3. Alternatively, even when the information related to the IP address and the telephone number is written, if the above values are not made coincident with the above-described IP packet/telephone number, then the H323 termination unit 23-1 discards the IP packet 46-3 as an error process. In this case, a concrete numeral value of the IP address "A131" of the dependent type IP telephone set 13-1 is selected to be "32.3.53.1" (Step ST22).

Next, the H323 termination unit 23-1 transmits an IP packet 46-4 to a domain name server 48-1 employed inside the media router 14-1 of FIG. 23 (Step ST23). The IP packet 46-4 stores thereinto the address of the dependent type IP telephone set 13-1, namely a transmission source IP address "A131"; the address of the domain name server 48-1, namely a destination IP address "A481"; and a telephone number "Tel-13-2 name" of a communication counter party. The domain name server 48-1 checks the content of the received IP packet 46-4, and subsequently, transmits an IP packet 46-5 via a the communication line 10-1 and the network node apparatus 8-2 to the domain name server 31-1 dedicated to the IP telephone network (Step ST24). When the domain name server 31-1 dedicated to the IP telephone network returns such an IP packet to the domain name server 48-1 (Step ST25), the domain name server 48-1 returns an IP packet 46-6 to the H323 termination unit 23-1. The above-explained returned IP packet contains an IP address "A132" which corresponds to the host name "Tel-13-2 name" in a 1-to-1 correspondence manner.

Next, when the H323 termination unit 23-1 produces an IP packet 46-7 which is sent to the H323 termination unit 23-2, and then transmits the produced IP packet 46-7 via the router 20-3 to the network node apparatus 8-2 (Step ST26), the network node apparatus 8-2 transfers the received IP packet 46-7 to the internal arrangement of the integrated IP transfer network 2 shown in FIG. 20. Thus, the IP packet 46-7 passes through the routers 19-8, 19-9, 21-2, 19-11 and 19-13 provided inside the IP telephone network 4, and then is reached to the network node apparatus 7-2. As a result, the network node apparatus 7-2 sends out the received IP packet 46-7 to the communication line 10-5, and the H323 termination unit 23-2 receives the IP packet 46-7 via the router 20-4. The H323 termination unit 23-3 interprets the IP packet 46-7 as a telephone call, and thus executes the below-mentioned two procedure operations. As a first procedure operation, the H323 termination unit 23-2 produces a returning IP packet 46-8 and then returns the IP packet 46-8 to the router 20-4. As a second procedure operation, the H323 termination unit 23-2 transfers the IP packet 46-7 via the communication line 53-2 shown in FIG. 24 to the dependent type IP telephone set 13-2.

Referring now to FIG. 24, the following operation is made: The IP packet 46-8 produced in the first procedure is transmitted via the communication line 10-5 (Step ST27), the network node apparatus 7-2, and the IP telephone network 4 to the network node apparatus 8-2, and then is reached via the communication line 10-1 to the router 20-3 and also via the H323 termination unit 23-1 to the dependent type IP telephone set 13-1, respectively. The dependent type IP telephone 13-1 interprets that the communication counter party is being called by receiving the IP packet 46-8.

Because of the second procedure, the dependent type IP telephone 13-2 produces a telephone call sound by receiving the IP packet 46-7. The user of the dependent type IP telephone set 13-2 hears the telephone call sound, and then takes up the handset of the dependent type IP telephone set 13-2 (off hook). As a result, the dependent type IP telephone set 13-2 produces an IP packet 46-9 to be sent out to the line 53-2 (Step ST28), and the H323 termination unit 23-2 receives the IP packet 46-9. Then, the IP packet 46-9 is supplied via the network node apparatus 7-2 and the IP telephone network 4 to the network node apparatus 8-2, and is reached via the communication line 10-1 to the router 20-3, and also via the H323 termination unit 23-1 to the dependent type IP telephone set 13-1. As a result, the user of the dependent type IP telephone set 13-1 may be informed that the telephone communication counter party takes up the handset of the dependent type IP telephone set 13-2.

The above-described Step ST28 corresponds to such a procedure that information of a response is transferred, namely, the IP packet 46-9 is transferred which notifies such a fact that the telephone communication is commenced between the dependent type IP telephone set 13-1 and the dependent type IP telephone set 13-2. When the network node apparatus 7-2 and 8-2 detect the IP packet 46-9, a record of the commencement of the telephone communication may be saved in a charge record file. In other words, such a fact that the telephone communication is commenced between the dependent type IP telephone sets 13-1 and 13-2 is saved in the charge record file. Namely, this charge record file stores thereinto a portion of the contents of the IP packet 46-9 set into the network node apparatus, for example, a transmission source IP address, a destination IP address, a transmission source port number, a destination port number and detection time instants thereof.

When the user of the dependent type IP telephone set 13-1 starts his telephone conversation, the dependent type IP telephone set 13-1 produces an IP packet 46-10 containing digitalized voice(speech), and transmits the IP packet 46-10 to the communication line 53-1 (Step ST29). The voice packet 46-10 is supplied to the dependent type IP telephone set 13-2 via the H323 control unit 23-1; the router 20-3; the network node apparatus 8-2; the routers 19-8, 19-9, 21-2, 19-11 and 19-13; the network node apparatus 7-2; the router 20-4; and the H323 termination unit 23-2. The voice of the user of the dependent type IP telephone set 13-2 is stored in an IP packet 46-11 in a digital form. The voice packet is supplied to the dependent type IP telephone set 13-1 along a direction opposite to the above-explained packet flow direction (Step ST30), namely, is supplied via the H323 control unit 23-2; the router 20-4; the network node apparatus 7-2; the routers 19-13, 19-11, 21-2, 19-9 and 19-8; the network node apparatus 8-2; the router 20-3; and the H323 termination unit 23-1.

When the user of the dependent type IP telephone set 13-1 puts on(hangs up) the handset thereof in order to finish the telephone communication, the dependent type IP telephone set 13-1 produces an IP packet 46-12 which indicates that the telephone communication is ended, and then sends out the IP packet 46-12 to the communication line 53-1 (Step ST31). The IP packet 46-12 is supplied to the dependent type IP telephone set 13-2 via the H323 control unit 23-1; the router 20-3; the network node apparatus 8-2; the routers 19-8, 19-9, 21-2, 19-11, and 19-13; the network node apparatus 7-2; the router 20-4; and the H323 termination unit 23-2. The user of the dependent type IP telephone set 13-2 may know such a fact that the telephone communication is ended, and then, when the user puts on the handset of the dependent type telephone set 13-2, an IP packet 46-13 is produced. The produced IP packet 46-13 is supplied along a direction opposite to the above-explained packet flow direction, namely, is supplied to the H323 control unit 23-2; the router 20-4; the network node apparatus 7-2; the routers 19-13, 19-11, 21-2, 19-9 and 19-8; the network node apparatus 8-2; the router 20-3; and the H323 termination unit 23-1 (Step ST32).

The above-described Step ST32 corresponds to such a procedure that confirmation information of a call interrupt is transferred, namely, the IP packet 46-13 is transferred which notifies such a fact that the telephone communication is ended between the dependent type IP telephone set 13-1 and the dependent type IP telephone set 13-2. When both the network node apparatus 7-2 and 8-2 detect the IP packet 46-13, a record of the completion of the telephone communication may be saved in the charge record file. In other words, such a fact that the telephone communication is ended between the dependent type IP telephone sets 13-1 and 13-2 is saved in the charge record file. Namely, this charge record file stores thereinto a portion of the contents of the IP packet 46-13 set into the network node apparatus, for example, a transmission source IP address, a destination IP address, a transmission source port number, a destination port number and detection time instant thereof.

Since both the dependent type IP telephone set 13-1 and the dependent type IP telephone set 13-2 transmit and also receive the IP packets in accordance with the above-explained procedures, the telephone communications can be established.

In the above-described communication procedures, while the domain name server 48-1 contained in the media router may be removed from the media router 14-1, the above-explained Steps ST23 to ST25 may be replaced by the below-mentioned Steps ST23*x* and ST25*x*. In other words, the H323 termination unit 23-1 transmits an IP packet 46-14 via the communication line 10-1 and the network node apparatus 8-2 to the domain name server 31-1 dedicated to the IP telephone network (Step ST23*x*). The IP packet 46-14 stores thereinto the address of the dependent type IP telephone set 13-1, namely the transmission source IP address "A131"; the address of the domain name server 31-1 dedicated to the IP telephone network, namely the destination IP address "A311"; and the telephone number of the communication counter party "Tel-13-2 name". The domain name server 31-1 returns another IP packet 46-15 to the H323 termination unit 23-1 (Step ST25*x*). The IP packet 46-15 contains the IP address "A132" which corresponds to the telephone number of the communication counter party "Tel-13-2 name" in a 1-to-1 correspondence manner.

In the above-explained procedures defined from the Steps ST23 to the Step ST25, or by both the Step ST23*x* and the Step ST25*x*, the network node apparatus 8-2 may confirm that the dependent type IP telephone set 13-1 is allowed to be communicated from the communication line 10-1 via the network node apparatus 8-2 by checking as to whether or not the combination between the transmission source address "A481" contained in the IP packet 46-5 received via the communication line 10-1 and the communication line identification symbol "Line-10-1" similarly received is registered in the address management table 44-1 (refer to FIG. 25), or by checking as to whether or not the combination between the transmission source address "A131" contained in the IP packet 46-14 received via the communication line 10-1 and the communication line identification symbol "Line-10-1" similarly received is registered in the address management table 44-1 (refer to FIG. 25).

<<Communication Connection Control Between Independent Type IP Telephone Sets>>

Since the dependent type IP telephone set 13-1 of FIG. 23 contains the termination function of the H323 termination unit 23-1, this dependent type IP telephone set 13-1 may be formed with the connection control unit 22-1 in an integral form. Because of this reason, a dependent type IP telephone set 13-11 provided inside such an independent type IP telephone set 12-1 shown in FIG. 48 is directly connected via a communication line to a connection control unit 22-11. A communication line 10-4 is derived from the connection control unit 22-11, and then is connected to the network node apparatus 8-4 of FIG. 20. Both the independent type IP telephone set 12-1 and an independent type IP telephone set 12-2 can carry out a telephone communication by transmitting/receiving an IP packet. This communication procedure is similar to that defined from the Step ST20 to the Step ST32, in which the above-described dependent type IP telephone sets 13-1 and 13-2 perform the telephone communication by transmitting/receiving the IP packets. However, there is a first different point. That is, since the domain name server 48-1 inside the media router 14-1 is not present, both the Step ST23 and the Steps ST24 may be regarded as an integrated steps without passing through the domain name server 48-1. As a second different point, since the H323 termination units 23-1 and 23-2 are not present, the portions of the H323 termination units 23-1 and 23-2 are required to be replaced by such a communication line through which the IP packets may pass.

<<Communication Between Two Dependent Type IP Voice/Image Apparatus>>

Since an IP packet is transmitted, or received from the dependent type IP voice/image(audio/visual) apparatus 16-1 to the dependent type IP voice/image(audio/visual) apparatus 16-3, a host name for identifying an apparatus can be realized by a voice/image communication for transmitting/receiving an IP packet. The communication procedure is similar to that defined from the Step ST20 to the Step ST32 in which both the dependent type IP telephone set 13-1 and the dependent type IP telephone set 13-2 use the domain name server 31-1 dedicated to the IP telephone network. As a technical different point, while the domain name server 32-1 dedicated to the IP voice/image network of FIG. 24 is employed without using the domain name server 31-1 dedicated to the IP telephone network, a process operation of a Step ST44 is executed instead of the Step ST24, and also a process operation of a Step ST45 is executed instead of the Step ST25.

The dependent type IP voice/image apparatus 16-1 inquires the domain name server 32-1 dedicated to the IP image inside the IP transfer network as to the host name of the dependent type IP voice/image apparatus 16-2 to thereby acquire an IP address of the dependent type IP voice/image apparatus 16-2. Next, since the voice/image data is transmitted from the dependent type IP voice/image apparatus 16-1 to the dependent type IP voice/image apparatus 16-2, the voice/image communication for transmitting/receiving the voice/image data can be carried out between the dependent type IP voice/image apparatus 16-1 and the dependent type IP voice/image apparatus 16-2.

<<Communication Between Independent Type IP Voice/Image Apparatus and Dependent Type IP Voice/Image Apparatus>>

Since the dependent type IP voice/image apparatus 16-1 shown in FIG. 23 contains the termination function of the H323 termination unit 23-1, this dependent type IP voice/image apparatus 16-1 may be formed with the connection control unit 22-1 in an integral form. Because of this reason, a dependent type IP voice/image apparatus 16-12 provided inside such an independent type IP voice/image apparatus 12-3 shown in FIG. 49 is directly connected via a communication line to a connection control unit 22-12. A communication line 10-9 is derived from the connection control unit 22-12, and then is connected to the network node apparatus 8-4 of FIG. 20.

Both the independent type IP voice/image apparatus 12-3 and the dependent type IP voice/image apparatus 16-3 can execute a voice/image communication for transmitting/receiving an IP packet. The communication procedure thereof is similar to the process operations defined from the Step ST20 to the Steps ST32, in which both the dependent type IP voice/image apparatus 16-1 and the dependent type IP voice/image apparatus 16-3 use the domain name server 32-1 dedicated to the IP voice/image network 5-1 so as to transmit/receive the IP packet, so that the voice/image communication is carried out. As a technical different point, since the domain name server 48-1 within the media router 14-1 is not present, both the Step ST23 and the Step ST24 are recorded as an integrated step, without passing through the domain name server 48-1.

By connecting the independent type IP voice/image apparatus 16-4 with the network node apparatus 7-4, the voice/image communication to transmit/receive the IP packet is carried out between the independent type IP voice/image apparatus 12-3 and he independent type IP voice/image apparatus 16-4 via the network node apparatus 8-4, the IP voice/image network 5-1 and the network node apparatus 7-4.

Assuming now that the independent type IP voice/image apparatus 12-3 is regarded as a sales means of a voice (sound)/image goods selling firm for selling voice/image goods, and also both the dependent type IP voice/image apparatus 16-3 and the independent type IP voice/image apparatus 16-4 are regarded as a purchase means of a voice(sound)/image goods purchaser, such a virtual market can be realized through which the voice/image goods can be distributed with employment of the IP transfer network. A purchaser may order voice/image goods to a sales firm by using a voice/image slip, and thus, the sales firm can send digital voice/image goods.

<<Communication Among Analog Telephone Sets>>

Referring now to FIG. 20, FIG. 23, FIG. 24, and FIG. 50 to FIG. 64, a description will be made of a sequential operation in which while a telephone number is dialed, a telephone communication is established from one normal telephone set to another normal telephone set, not an IP telephone set, namely from one analog telephone set 18-1 to another analog telephone set 18-3.

The analog telephone set 18-1 of FIG. 23 is connected via a communication line 55-1 to the SCN interface 24-1, and the analog telephone set 18-3 of FIG. 24 is connected via a communication line 55-2 to the SCN interface 24-2. When the handset of the analog telephone 18-1 is taken up(off hook), a telephone calling analog signal is sent out via the communication line 55-1 to the SCN interface 24-1, and then this SCN interface 24-1 converts the received analog calling signal into digital-format calling data. Next, the SCN interface 24-1 converts the transmission/reception rule of the digital calling data, and produces such a digital-data 47-1 shown in FIG. 50 which notifies a telephone call. The digital data 47-1 is inputted to the H323 termination unit 23-1 (Step ST60 of FIG. 23). The H323 termination unit 23-1 returns digital data 47-2 of FIG. 51 used to confirm the telephone call to the SCN interface 24-1 (Step ST61). In this case, symbol "CTL-Info-1" contained in the digital data 47-1 indicates call control information, and symbol "CTL-Info-2" contained in the digital data 47-2 shows call confirmation information.

Figure 52:
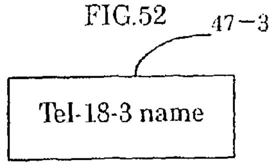
FIG. 52 is a diagram for explaining another embodiment mode of an IP packet appearing in two IP telephone sets communication.

Next, when a user of the analog telephone set 18-1 dials a telephone number of the analog telephone set 18-3 as a communication counter party, the analog telephone set 18-1 sends out a call setting analog signal to the communication line 55-1, and the SCN interface 23-1 produces a data block 47-3 of FIG. 52 for notifying the telephone number by using the "call setting" analog signal to send out the data block 47-3 to the H323 termination unit 23-1. In this case, the H323 termination unit 23-1 retrieves records contained in a media router state table 100-1 of FIG. 47 so as to detect a line identifier indicative of the communication line 55-1, a record on a third row of the media router state table 100-1 from a top row, namely "55-1". Next, the H323 termination unit 23-1 reads a telephone number "81-47-325-3887" of the analog telephone set 18-1 and an IP address "20.0.55.1", which are described in the record. In this case, a concrete numeral value of the IP address "A181" of the analog telephone set 18-1 is selected to be "20.0.55.1" (Step ST62).

Figure 53:
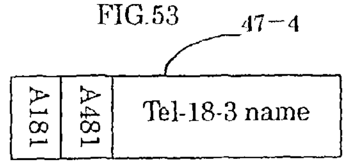
FIG. 53 is a diagram for explaining another embodiment mode of an IP packet appearing in two IP telephone sets communication.
Figure 54:
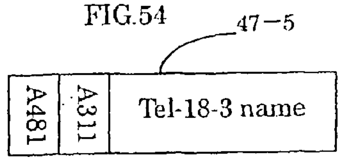
FIG. 54 is a diagram for explaining another embodiment mode of an IP packet appearing in two IP telephone sets communication.
Figure 55:
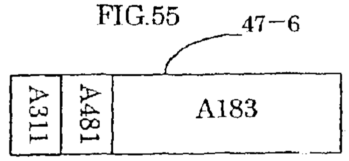
FIG. 55 is a diagram for explaining another embodiment mode of an IP packet appearing in two IP telephone sets communication.
Figure 56:
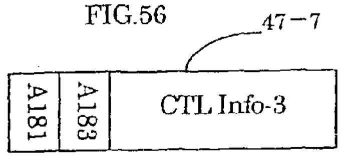
FIG. 56 is a diagram for explaining another embodiment mode of an IP packet appearing in two IP telephone sets communication.
Figure 57:
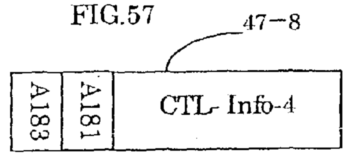
FIG. 57 is a diagram for explaining another embodiment mode of an IP packet appearing in two IP telephone sets communication.
Figure 58:
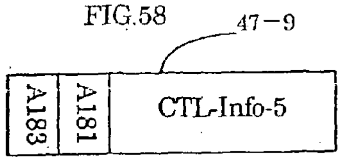
FIG. 58 is a diagram for explaining another embodiment mode of an IP packet appearing in two IP telephone sets communication.
Figure 59:
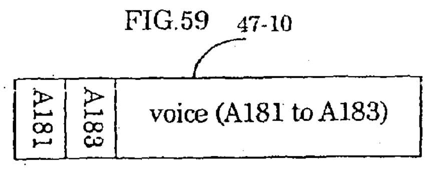
FIG. 59 is a diagram for explaining another embodiment mode of an IP packet appearing in two IP telephone sets communication.
Figure 60:
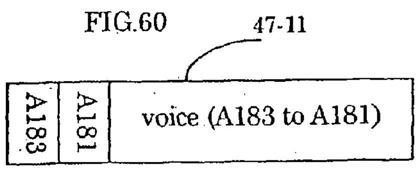
FIG. 60 is a diagram for explaining another embodiment mode of an IP packet appearing in two IP telephone sets communication.
Figure 61:
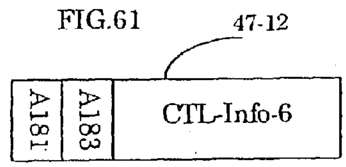
FIG. 61 is a diagram for explaining another embodiment mode of an IP packet appearing in two IP telephone sets communication.
Figure 62:
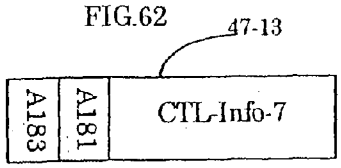
FIG. 62 is a diagram for explaining another embodiment mode of an IP packet appearing in two IP telephone sets communication.
Figure 63:
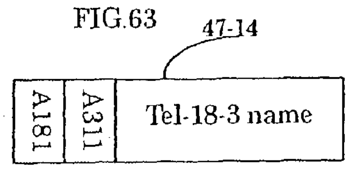
FIG. 63 is a diagram for explaining another embodiment mode of an IP packet appearing in two IP telephone sets communication.
Figure 64:
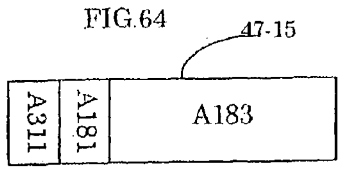
FIG. 64 is a diagram for explaining another embodiment mode of an IP packet appearing in two IP telephone sets communication.

Next, the H323 termination unit 23-1 produces an IP packet 47-4 of FIG. 53, and then transmits the produced IP packet 47-4 to the domain name server 48-1 (Step ST63). This IP packet 47-4 stores thereinto an address which is virtually applied to the analog telephone set 18-1, namely a transmission source IP address "A181"; an address of the domain name server 48-1 provided inside the media router, namely a destination IP address "A481"; and a telephone number "Tel-

18-3 name" of a communication counter party. The domain name server 48-1 checks the content of the received IP packet 47-4, and subsequently, transmits an IP packet 47-5 via the communication line 10-1 and the network node apparatus 8-2 to the domain name server 31-1 dedicated to the IP telephone network (Step ST64). When the domain name server 31-1 dedicated to the IP telephone network returns such an IP packet 47-6 to the domain name server 48-1 (Step ST65), the domain name server 48-1 returns an IP packet 47-6 to the H323 termination unit 23-1. The above-explained returned IP packet 47-6 contains an IP address "A183" which corresponds to the host name "Tel-13-3 name" in a 1-to-1 correspondence manner.

Next, when the H323 termination unit 23-1 produces an IP packet 47-7 which is sent to the H323 termination unit 23-2, and then transmits the produced IP packet 47-7 via the router 20-3 to the network node apparatus 8-2 (Step ST66), the network node apparatus 8-2 transfers the received IP packet 47-7 to the internal arrangement of the integrated IP transfer network 2 shown in FIG. 20. Thus, the IP packet 47-7 passes through the routers 19-8, 19-9, 21-2, 19-11 and 19-13 provided inside the IP telephone network 4, and then is reached to the network node apparatus 7-2. As a result, the network node apparatus 7-2 sends out the received IP packet 47-7 to the communication line 10-5, and the H323 termination unit 23-2 receives the IP packet 47-7 via the router 20-4. The H323 termination unit 23-2 interprets the IP packet 47-7 as a telephone call, and thus executes the below-mentioned two procedure operations. As a first procedure operation, the H323 termination unit 23-2 produces a returning IP packet 47-8 and then returns the IP packet 47-8 to the router 20-4. Also, since the analog telephone set 18-3 receives the IP packet 47-7, this analog telephone set 18-3 produces a calling bell sound. As a second procedure operation, the H323 termination unit 23-2 transfers the IP packet 47-7 via the SCN interface 24-2 to the analog telephone 18-3.

Referring now to FIG. 24, the following operation is made: The IP packet 47-8 produced in the first procedure is transmitted via the communication line 10-5 (Step ST67), the network node apparatus 7-2, and the IP telephone network 4 to the network node apparatus 8-2, and then is reached via the communication line 10-1 to the router 20-3 and also via the H323 termination unit 23-1 and the SCN interface 24-1 to the analog telephone set 18-1. The analog telephone set 18-1 interprets that the communication counter party is being called by receiving the IP packet 47-8.

Because of the second procedure, the user of the analog telephone set 18-3 hears the telephone call sound, and then takes up the handset of the analog telephone set 18-3 (off hook). As a result, the H323 termination unit 23-2 produces an IP packet 47-9 (Step ST68). The H323 termination unit 23-2 sends out the IP packet 47-9 to the router 20-4. Then, the IP packet 47-9 is supplied via the network node apparatus 7-2 and the IP telephone network 4 to the network node apparatus 8-2, and is reached via the communication line 10-1 to the router 20-3, and also via the H323 termination unit 23-1 and the SCN interface 24-1 to the analog telephone set 18-1. As a result, the user of the analog telephone set 18-1 may be informed as sound for notifying that the telephone communication counter party takes up the handset of the analog telephone set 18-3. This sound is to confirm a call setting operation.

The above-described Step ST68 corresponds to such a procedure that information of a call setting confirmation is transferred, namely, the IP packet 47-9 is transferred which notifies such a fact that the telephone communication is commenced between the analog telephone set 18-1 and the analog telephone set 18-3. When both the network node apparatus 7-2 and 8-2 detect the IP packet 47-9, a record of the commencement of the telephone communication may be saved in a charge record file. In other words, such a fact that the telephone communication is commenced between the analog telephone sets 18-1 and 18-3 is saved in the charge record file. Namely, this charge record file stores thereinto a portion of the contents of the IP packet 47-9 set into the network node apparatus, for example, a transmission source IP address, a destination IP address, a transmission source port number, a destination port number and detection time instants thereof.

When the user of the analog telephone set 18-1 commences a telephone conversation of a telephone communication, the voice (speech) signal is transferred via the communication line 55-1 to the SCN interface 24-1, and is converted into a digital voice signal. Next, the H323 termination unit 23-1 produces such an IP packet 47-10 containing the digitalized voice, and then sends out the produced IP packet 47-10 to the communication line 10-1 (Step ST69). The voice packet 47-10 is supplied to the analog telephone set 18-3 via the H323 control unit 23-1; the router 20-3; the network node apparatus 8-2; the routers 19-8, 19-9, 21-2, 19-11 and 19-13; the network node apparatus 7-2; the router 20-4; and the H323 termination unit 23-2. The voice of the user of the analog telephone set 18-3 is supplied to the analog telephone set 18-1 along a direction opposite to the above-explained packet flow direction (Step ST70), namely, is supplied via the H323 control unit 23-2; the router 20-4; the network node apparatus 7-2; the routers 19-13, 19-11, 21-2, 19-9 and 19-8; the network node apparatus 8-2; the router 20-3; and the H323 termination unit 23-1.

When the user of the analog telephone set 18-1 puts on the handset in order to accomplish the telephone conversation, the analog telephone set 18-1 sends out a call interrupt signal to the communication line 55-1. The call interrupt signal indicates the completion of the telephone communication. The SCN interface 24-1 converts the call interrupt signal into a digital data format. Next, the H323 termination unit 23-1 produces an IP packet 47-12 for indicating that the telephone communication is ended, and then sends to the IP packet 47-12 to the communication line 10-1 (Step ST71). The IP packet 47-12 is supplied to the analog telephone set 18-3 via the H323 control unit 23-1; the router 20-3; the network node apparatus 8-2; the routers 19-8, 19-9, 21-2, 19-11 and 19-13; the network node apparatus 7-2; the router 20-4; and the H323 termination unit 23-2. The user of the analog telephone set 18-3 may know such a fact that the telephone communication is ended, and then, when the user puts on the handset of the analog telephone set 18-3, an IP packet 47-13 is produced. The produced IP packet 47-13 is supplied along a direction opposite to the above-explained packet flow direction (Step ST72), namely, is supplied via the H323 control unit 23-2; the router 20-4; the network node apparatus 7-2; the routers 19-13, 19-11, 21-2, 19-9 and 19-8; the network node apparatus 8-2; the router 20-3; and the H323 termination unit 23-1.

The above-described Step ST72 corresponds to such a procedure that formation for confirming a call interrupt is transferred, namely, the IP packet 47-13 is transferred which notifies such a fact that the telephone communication is ended between the analog telephone set 18-1 and the analog telephone set 18-3. When both the network node apparatus 7-2 and 8-2 detect the IP packet 47-13, a record of the completion of the telephone communication may be saved in a charge record file. In other words, such a fact that the telephone communication is completed between the analog telephone sets 18-1 and 18-3 is saved in the charge record file. Namely, the charge record file stores thereinto a portion of the contents of the IP packet 47-13 set into the network node apparatus, for example, a transmission source IP address, a destination IP address, a transmission source port number, a destination port number and detection time instants thereof.

Since both the analog telephone set 18-1 and the analog telephone set 18-3 transmit and also receive the IP packets in accordance with the above-explained procedures, the telephone communications can be established.

In the above-described communication procedures, while the domain name server 48-1 contained in the media router may be removed from the media router 14-1, the above-explained Steps ST63 to ST65 may be replaced by the below-mentioned Steps ST63*x* and ST65*x*. In other words, the H323 termination unit 23-1 transmits an IP packet 47-14 via the communication line 10-1 and the network node apparatus 8-2 to the domain name server 31-1 dedicated to the IP telephone network (Step ST63*x*). The IP packet 47-14 stores thereinto the address of the analog telephone set 18-1, namely the transmission source IP address "A181"; the address of the domain name server 31-1 dedicated to the IP telephone network, namely the destination IP address "A311"; and the telephone number of the communication counter party "Tel-18-3 name". The domain name server 31-1 returns another IP packet 47-15 to the H323 termination unit 23-1 (Step ST65*x*). The IP packet 47-15 contains the IP address "A183" which corresponds to the telephone number of the communication counter party "Tel-18-3 name" in a 1-to-1 correspondence manner.

In the above-explained procedures defined from the Step ST63 to the Step ST65, or by both the Step ST63*x* and the Step ST65*x*, the network node apparatus 8-2 may confirm that the analog telephone set 18-1 is allowed to be communicated from the communication line 10-1 via the network node apparatus 8-2 by checking as to whether or not the combination between the transmission source address "A481" contained in the IP packet 47-5 received via the communication line 10-1 and the communication line identification symbol "Line-10-1" similarly received is registered in the address administration table 44-1 (refer to FIG. 25), or by checking as to whether or not the combination between the transmission source address "A181" contained in the IP packet 47-14 received via the communication line 10-1 and the communication line identification symbol "Line-10-1" similarly received is registered in the address administration table 44-1 (refer to FIG. 25).

<<IP Data Service Operation/Management Server>>

The IP data service operation/management server 35-1 managed by the communication company "X" acquires the IP terminal-to-terminal communication record which is formed by the network node apparatus at the Step ST11 in such a manner that the IP data service operation/management server 35-1 periodically, or temporarily transmits/receives an inquiry IP packet with respect to both the network node apparatus 8-2 and 8-4. Also, the IP data service operation/management server 35-1 checks as to whether or not the internal resources of the IP data network managed by the communication company "X" are operated under normal condition by using such a means for transmitting/receiving an ICMP packet(namely, failure management). These internal resources are, for instance, the routers 19-1, 19-2, 19-3; the domain name servers 30-1 and 30-2 dedicated to the IP data network; and the communication lines among the routers. Also, the IP data service operation/management server 35-1 monitors as to whether or not the congestion of the IP packets within the IP data network is excessively increased(namely, communication quality control) in order that the IP data network of the communication company "X" may be operated/managed in a batch mode.

Similarly, the IP data service operation/management server 35-2 managed by the communication company "Y" acquires the above-explained IP terminal-to-terminal communication record in such a manner that the IP data service operation/management server 35-2 periodically, or temporarily transmits/receives an inquiry IP packet with respect to both the network node apparatus 7-2 and 7-4. Also, the IP data service operation/management server 35-2 operates/manages the failure management and the communication quality of the IP data network of the communication company "Y" in a batch manner. It should be understood that both the IP data service operation/management servers 35-1 and 35-2 may be subdivided into an IP data service server which exclusively manages the IP data services, and also an IP data network operation/management server which exclusively manages the resources of the IP data network.

<<IP Telephone Service Operation/Management Server>>

The IP telephone service operation/management server 36-1 managed by the communication company "x" acquires the above-explained telephone communication starting record and also telephone communication end record in such a manner that the IP telephone service operation/management server 36-1 periodically, or temporarily transmits/receives an inquiry IP packet with respect to both the network node apparatus 8-2 and 8-4. Also, the IP telephone service operation/management server 36-1 checks as to whether or not the internal resources of the IP telephone network managed by the communication company "X" are operated under normal condition by using such a means for transmitting/receiving an ICMP packet(namely, failure management). These internal resources are, for instance, the routers 19-8, 19-9, 19-10; the domain name server 31-1 dedicated to the IP telephone network, and the communication lines among the routers. Also, the IP telephone service operation/management server 36-1 monitors as to whether or not the congestion of the IP packets within the IP telephone network is excessively increased (namely, communication quality control) in order that the IP telephone network of the communication company "X" may be operated/managed in a batch mode.

Similarly, the IP telephone service operation/management server 36-2 managed by the communication company "Y" acquires the above-explained telephone communication starting record and telephone communication end record in such a manner that the IP telephone service operation/management server 36-2 periodically, or temporarily transmits/receives an inquiry IP packet with respect to both the network node apparatus 7-2 and 7-4. Also, the IP telephone service operation/management server 36-2 operates/manages the failure management and the communication quality of the IP telephone network of the communication company "Y" in a batch manner.

It should also be noted that the record about the telephone communication commencement defined at the Steps ST28 and ST68, and the record about the end of the telephone communication defined at the Steps ST32 and ST72 among the above-explained procedure may be omitted. In this alternative case, the acquisitions of both the telephone communication starting record and the telephone communication end record by the communication company "X" and the communication company "Y" may be omitted.

It should also be noted that both the IP telephone service operation/management servers 36-1 and 36-2 may be subdivided into an IP telephone service server which exclusively manages the IP telephone services, and also an IP telephone network operation/management server which exclusively manages the resources of the IP telephone network.

<<IP Voice/Image Service Operation/Management Server>>

The IP voice/image(audio/visual) service operation/management server 37-1 managed by the communication company "X" acquires the above-explained voice/image communication starting record and voice/image communication end record in such a manner that the IP voice/image service operation/management server 37-1 periodically, or temporarily transmits/receives an inquiry IP packet with respect to both the network node apparatus 8-2 and 8-4. Also, the IP voice/image service operation/management server 37-1 checks as to whether or not the internal resources of the IP voice/image network managed by the communication company "X" are operated under normal condition by using such a means for transmitting/receiving an ICMP packet(namely, failure management). These internal resources are, for instance, the routers 19-14, 19-15; the domain name server 32-1 dedicated to the IP telephone network; and the communication lines among the routers. Also, the IP voice/image service operation/management server 37-1 monitors as to whether or not the congestion of the IP packets within the IP voice/image network is excessively increased(namely, communication quality control) in order that the IP voice/image network of the communication company "X" may be operated/managed in a batch mode.

Similarly, the IP voice/image service operation/management server 37-2 managed by the communication company "Y" acquires the above-explained voice/image communication starting record and voice/image communication end record in such a manner that the IP voice/image service operation/management server 37-2 periodically, or temporarily transmits/receives an inquiry IP packet with respect to both the network node apparatus 7-2 and 7-4. Also, the IP voice/image service operation/management server 37-2 operates/manages the failure management and the communication quality of the IP voice/image network of the communication company "Y" in a batch manner. It should be understood that both the IP voice/image service operation/management servers 37-1 and 37-2 may be subdivided into an IP voice/image service server which exclusively manages the IP voice/image services, and also an IP voice/image network operation/management server which exclusively manages the resources of the IP voice/image network.

<<Best Effort Service Operation/Management Server>>

A best effort service operation/management server 38-1 managed by the communication company "X" operates/manages failure managements and communication qualities of a best effort network of the communication company "X" in a batch manner. Similarly, a best effort service operation/management server 38-2 managed by the communication company "Y" operates/manages failure managements and communication qualities of a best effort network of the communication company "Y" in a batch manner. It should be noted that both the best effort service operation/management services 38-1 and 38-2 may be subdivided into a best effort service server for exclusively managing best effort services, and also a best effort network operation/management server for exclusively managing resources of a best effort service network, respectively.

In the above-described description, the names of elements employed in the embodiment are applied as, for example, "H323 termination unit and "H323 gateway". This does not imply that these element names are made in accordance with the ITU-H323 recommendation. Instead, these element names own meanings related to the ITU-H323 recommendation.

Figure 65:
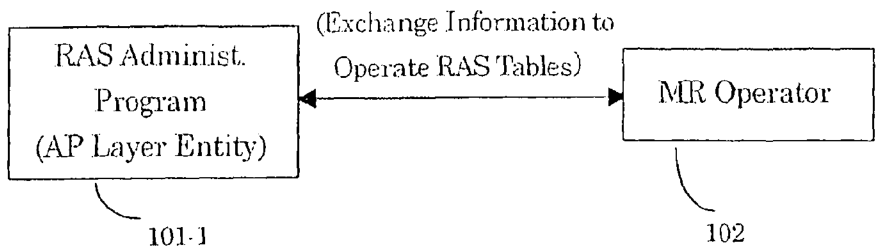
FIG. 65 is a diagram for explaining another embodiment mode of an IP packet appearing in two IP telephone sets communication in the first embodiment of the present invention.

As indicated in FIG. 65, a media router operator 102 exchanges information via an operation input/output unit 51-1 with respect to an RAS administration program 101-1 employed in the RAS mechanism 49-1, or rewrites a RAS table provided in the RAS administration program 101-1 so as to manage registration/certification of terminals, and also manage an internal state of the media router 14-1.

Figure 66:
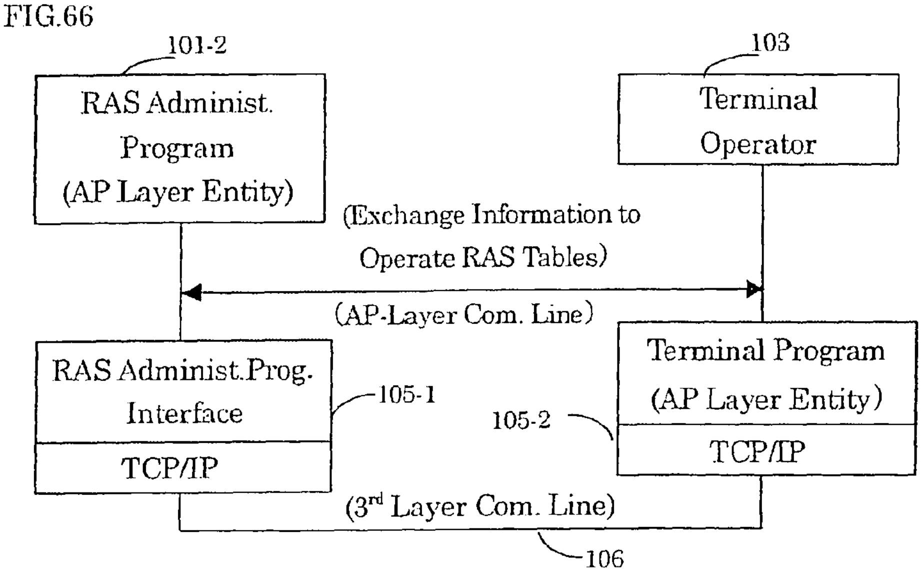
FIG. 66 is a diagram for explaining another embodiment mode of an IP packet appearing in two IP telephone sets communication in the first embodiment of the present invention.

As represented in FIG. 66, while a terminal operator 103 operates the dependent type IP telephone set 13-1, this operation information is supplied via an H323 terminal program 105-2 and subsequently a 3-layer communication path 106 which is virtually present within a communication line 53-1 so as to be exchanged with an interface 105-1 of the RAS administration program employed in the RAS mechanism 49-1 and an AP layer 101-2 of the RAS administration program. Also, the RAS table provided in the RAS administration program is rewritten, so that the terminal operator 103 manages registration/certification of terminals and an internal state of the media router 14-1.

Figure 67:
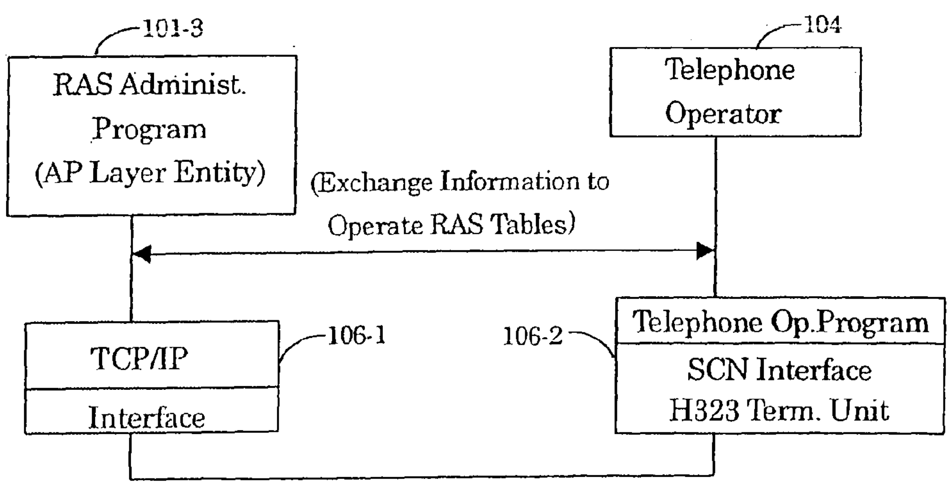
FIG. 67 is a schematic diagram for explaining a RAS management of the media router in the first embodiment of the present invention.

As represented in FIG. 67 while a telephone operator 104 operates the analog telephone set 18-1, this operation information is supplied so as to be exchanged with a telephone operation program 106-2 employed in the SCN interface 24-1, and subsequently a TCP/IP interface 106-1 of the RAS administration program employed in the RAS mechanism 49-1 and an AP layer 101-3 of the RAS administration program. Also, the RAS table provided in the RAS administration program is rewritten, so that the telephone operator 104 manages registration/certification of terminals and an internal state of the media router 14-1.

In the embodiment of FIG. 20, all of the elements provided within the range 6-2 of the IP transfer network which is operated/managed by the communication company "Y" may be eliminated, and furthermore, the routers 21-1 through 21-5 may be eliminated. In such an alternative case, the internal elements of the integrated IP transfer network 2 are arranged only by employing the range 6-1 of the IP transfer network operated/managed by the communication company "X", the network node apparatus 7-1 to 7-4 and 8-1 to 8-4 and the gateways 9-1 to 9-2. In the case of the IP data communication, for example, the information is transferred from the network node apparatus 8-2 via the router 19-1 and the router 19-3 to the network node apparatus 7-2. In the case of the IP telephone communication, for instance, the information is transferred from the network node apparatus 8-2 via the router 19-8 and the router 19-9 to the network node apparatus 7-2.

2. Second Embodiment Using Gateway

<<Communications Among Analog Telephone Sets Via Gateway>>

Figure 68:
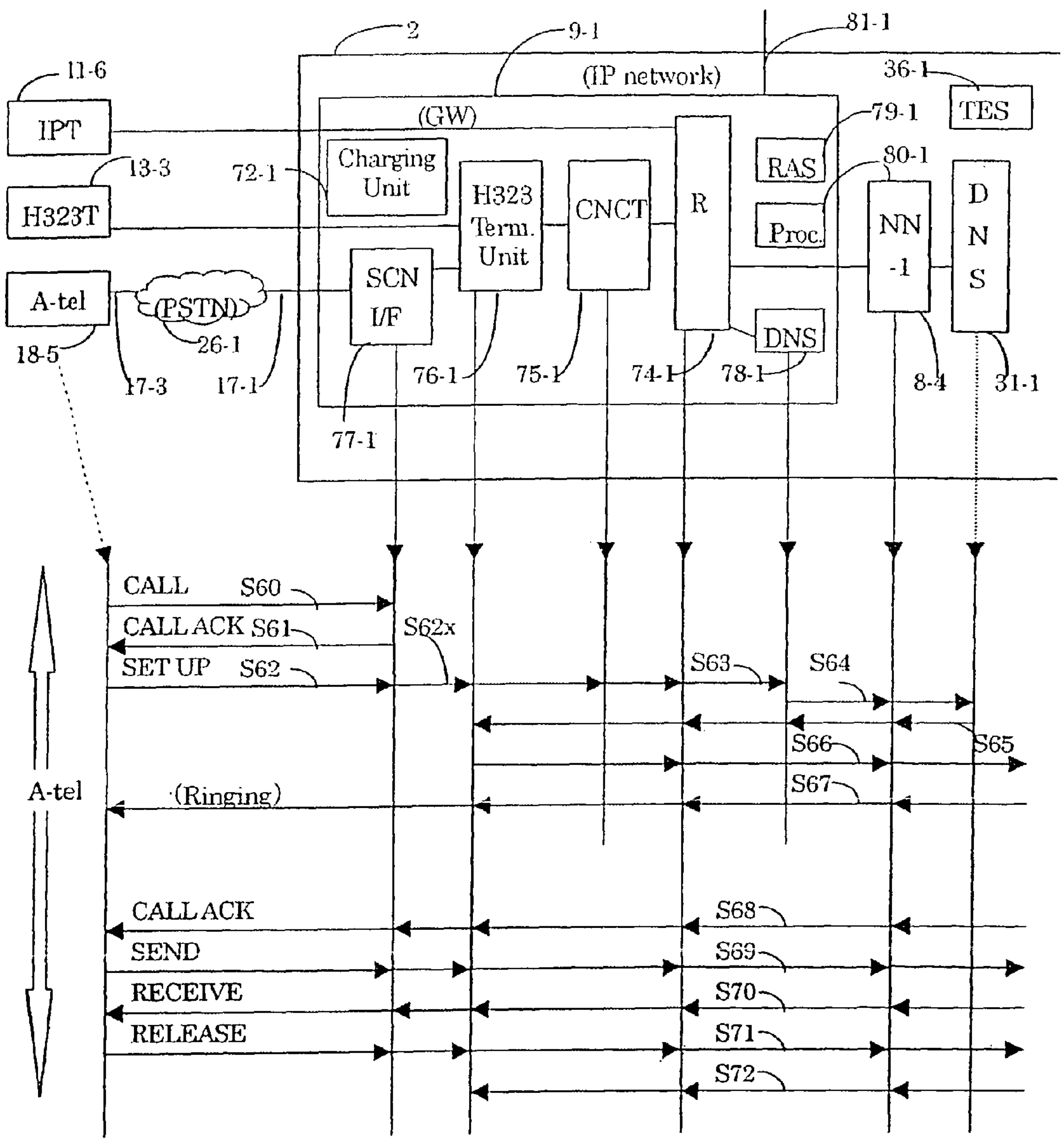
FIG. 68 is an auxiliary diagram for schematically showing a structure of a gateway according to a second embodiment of the present invention, and for explaining operation sequence of this gateway.
Figure 69:
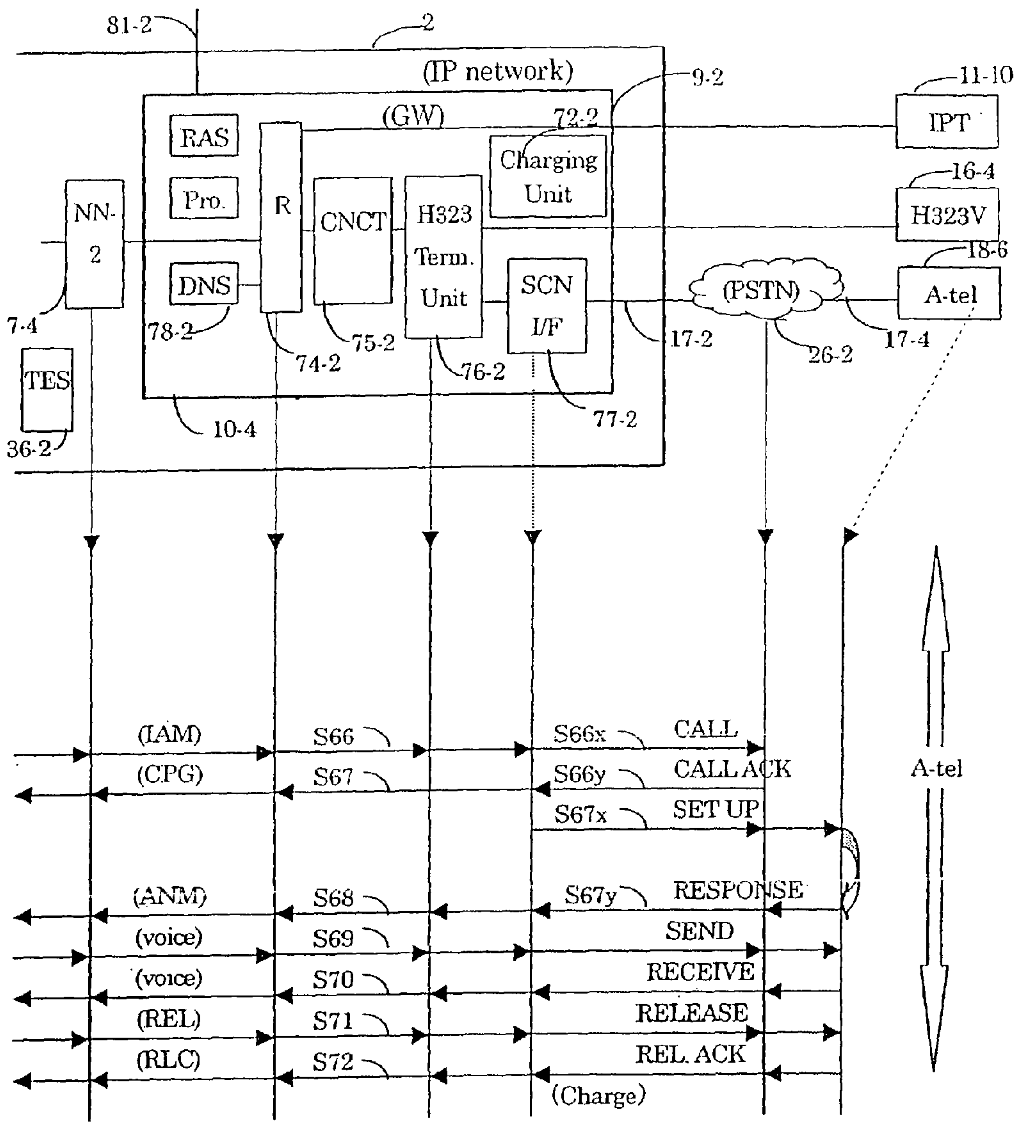
FIG. 69 is an auxiliary diagram for schematically showing a structure of a gateway according to a second embodiment of the present invention, and for explaining operation sequence of this gateway.
Figure 70:
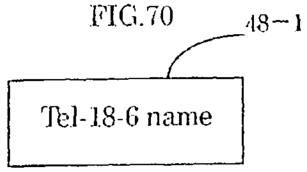
FIG. 70 is a diagram for describing another embodiment mode of an IP packet appearing in two IP telephone sets communication.
Figure 71:
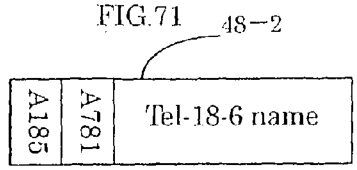
FIG. 71 is a diagram for describing another embodiment mode of an IP packet appearing in two IP telephone sets communication.
Figure 72:
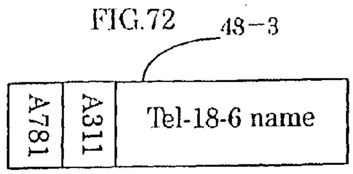
FIG. 72 is a diagram for describing another embodiment mode of an IP packet appearing in two IP telephone sets communication.
Figure 73:
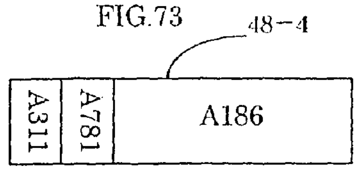
FIG. 73 is a diagram for explaining another embodiment mode of an IP packet appearing in two IP telephone sets communication in the second embodiment of the present invention.
Figure 74:
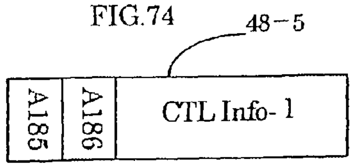
FIG. 74 is a diagram for describing another embodiment mode of an IP packet appearing in two IP telephone sets communication.
Figure 75:
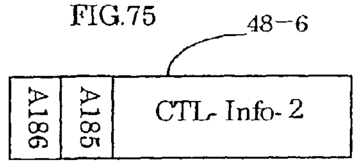
FIG. 75 is a diagram for describing another embodiment mode of an IP packet appearing in two IP telephone sets communication.
Figure 76:
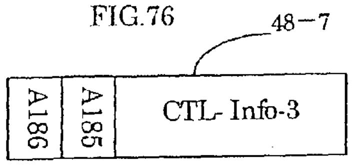
FIG. 76 is a diagram for describing another embodiment mode of an IP packet appearing in two IP telephone sets communication.
Figure 77:
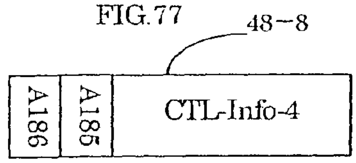
FIG. 77 is a diagram for describing another embodiment mode of an IP packet appearing in two IP telephone sets communication.
Figure 78:
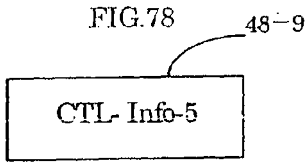
FIG. 78 is a diagram for describing another embodiment mode of an IP packet appearing in two IP telephone sets communication.
Figure 79:
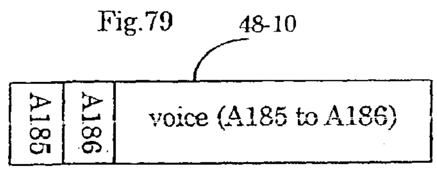
FIG. 79 is a diagram for describing another embodiment mode of an IP packet appearing in two IP telephone sets communication.
Figure 80:
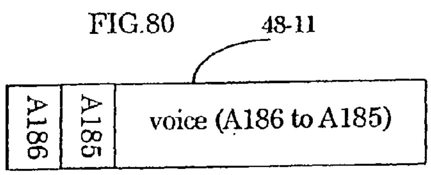
FIG. 80 is a diagram for describing another embodiment mode of an IP packet appearing in two IP telephone sets communication.
Figure 81:
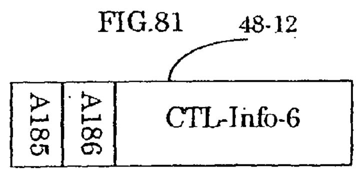
FIG. 81 is a diagram for describing another embodiment mode of an IP packet appearing in two IP telephone sets communication.
Figure 82:
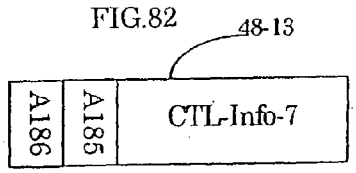
FIG. 82 is a diagram for describing another embodiment mode of an IP packet appearing in two IP telephone sets communication.
Figure 83:
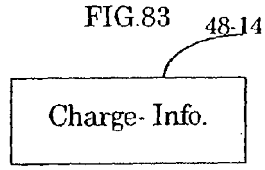
FIG. 83 is a diagram for describing another embodiment mode of an IP packet appearing in two IP telephone sets communication.
Figure 84:
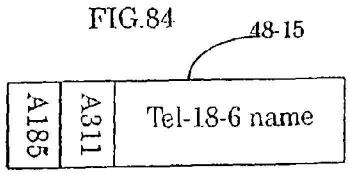
FIG. 84 is a diagram for describing another embodiment mode of an IP packet appearing in two IP telephone sets communication.
Figure 85:
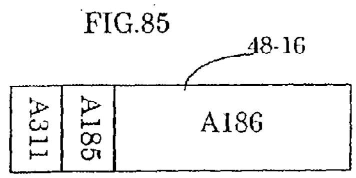
FIG. 85 is a diagram for describing another embodiment mode of an IP packet appearing in two IP telephone sets communication.

Both the media routers 14-1 and 14-2 shown in FIG. 23 and FIG. 24 own the substantially same internal arrangements and also functions as those of a gateway 9-1 shown in FIG. 68 and of a gateway 9-2 indicated in FIG. 69. There are the below-mentioned technical different points. That is, the media routers 14-1 and 14-2 are provided outside the integrated IP transfer network 2, whereas the gateways 9-1 and 9-2 are provided inside the integrated IP transfer network 2. Also, charging units 72-1 and 72-2 are provided inside the gateways 9-1 and 9-2. Each internal structure of the media routers 14-11, 14-2 and the gateways 9-1, 9-2 is constituted by common internal element blocks such as an SCN interface, an H323 termination unit, a connection control unit and a router. Also, reference numeral 79-1 shows a RAS mechanism of the gateway 9-1, reference numeral 80-1 denotes an information process mechanism of the gateway 9-1, and reference numeral 81-1 shows an operation input/output unit of the gateway 9-1. Both the media routers and the gateways are arranged by substantially similar functions to each other, except for process operations related to the charging units.

An IP terminal 11-6 and a dependent type IP telephone set 13-3 are connected via a communication line to the gateway 9-1, whereas an IP terminal 11-10 and a dependent type IP voice/image apparatus 16-4 are connected via a communication line to the gateway 9-2. In order that a terminal-to-terminal communication can be established via a media router, the below-mentioned terminal-to-terminal communications are realized via the gateway 9-1, the integrated IP transfer network 2 and the gateway 9-2. For example, a terminal-to-terminal communication may be established between the IP terminal 11-6 and the IP terminal 11-10 shown in FIG. 20. Also, a terminal-to-terminal communication may be established between the dependent type IP telephone set 13-3 and the dependent type IP telephone set 13-4 shown in FIG. 20. Also, a terminal-to-terminal communication may be established between the dependent type IP voice/image apparatus 16-1 and the dependent type IP voice/image apparatus 16-4 shown in FIG. 20.

Referring now to FIG. 68 to FIG. 85, a description will be made of communication process operations executed between an analog telephone set 18-5 and an analog telephone set 18-6 via the gateway 9-1, the integrated IP transfer network 2 and the gateway 9-2.

When the handset of the analog telephone set 18-5 is taken up, a telephone call signal is reached via a telephone line 17-3, a public switched telephone network 26-1, and a telephone line 17-1 to an SCN interface 77-1 provided within the gateway 9-1 (Step S60 of FIG. 68), and then, the SCN interface 77-1 returns a call confirmation signal via the public switched telephone network 26-1 to the analog telephone set 18-5 (Step S61). Next, when the user of the analog telephone set 18-5 dials a telephone number "Tel-18-6 name" of the telephone set 18-6 of the communication counter party, if the analog telephone set 18-5 sends out a call setting signal to the communication line 17-3, then the call setting signal is reached via the public switched telephone network 26-1 and the telephone line 17-1 to the SCN interface 77-1 (Step S62). A data block 48-1 shown in FIG. 70, which is produced by digitalling the call setting signal, is transferred to the H323 termination unit 76-1 (Step S62*x*). The H323 termination unit 76-1 retrieves records contained in a gateway state table 100-2 of FIG. 87, and then detects a line identifier indicative of the communication line 17-1, newly a record(i.e., "17-1") on a first row of this gateway state table 100-2 from the top row.

Next, the H323 termination unit 76-1 reads out a telephone number "81-3-9876-5432" of the analog telephone set 18-5 and an IP address "100.101.102.103" thereof, which are described in the record. Furthermore, the H323 termination unit 76-1 produces an IP packet 48-2 and transmits it to a domain name server 78-1 (Step S63). The IP packet 48-2 stores thereinto the address of the analog telephone set 18-5, namely a transmission source IP address "A185"; the address of the domain name server 78-1 within the gateway, namely a destination IP address "A781"; and a telephone number "Tel-18-6 name" of a communication counter party. The domain name server 78-1 checks the content of the received IP packet 48-2, and subsequently, transmits an IP packet 48-3 via the network node apparatus 8-4 to the domain name server 31-1 dedicated to the IP telephone network (Step S64). When the domain name server 31-1 dedicated to the IP telephone network returns such an IP packet 48-4 to the domain name server 78-1 (Step S65), the domain name server 78-1 returns the IP packet 48-4 to the H323 termination unit 76-1. The above-explained returned IP packet 48-4 contains an IP address "A186" which corresponds to the telephone number "Tel-18-6 name" of the communication counter party in a 1-to-1 correspondence manner.

Next, in such a case that the H323 termination unit 76-1 produces an IP packet 48-5 and transmits the IP packet 48-5 to the network node apparatus 8-4 (Step S66), when the network node apparatus 8-4 transfers the received IP packet 48-5 to the internal arrangement of the integrated IP transfer network 2 shown in FIG. 20, the IP packet 48-5 passes through the routers 19-8, 19-9, 21-2, 19-11 and 19-13 provided inside the IP telephone network 4, and then is reached to the network node apparatus 7-4. As a result, the network node apparatus 7-4 sends out the received IP packet 48-5 via the router 74-2 and the H323 termination unit 76-2 to the SCN interface 77-2. This SCN interface 77-2 interprets the IP packet 48-5 as a telephone call to the analog telephone set 18-6, and sends out a telephone call signal to the telephone line 17-2 (Step S66*x*). Upon receipt of a call confirmation signal from the public switched telephone network 26-2 (Step S66*y*), the SCN termination unit 77-2 executes the below-mentioned two procedure operations. As a first procedure operation, the SCN interface 77-2 produces a returning IP packet 48-6 and then returns the IP packet 48-6 to the router 74-2. As a second procedure operation, the SCN interface 77-2 sends out a call setting signal via the line 17-2 to the public switched telephone network 26-2.

The IP packet 48-6 produced by the first procedure operation is reached via the network node apparatus 7-4 (Step S67) and the IP telephone network 4 to the network node apparatus 8-4, and is finally delivered to the H323 termination unit 76-1 provided within the gateway 9-1. Next, the H323 termination unit 76-1 interprets the received IP packet 48-6 as such a fact that a telephone set of a communication counter party(analog telephone set 18-6) is being called, and thus, sends out a data block 48-7 for implying a telephone calling sound to the SCN interface 77-1. As a result, the SCN interface 77-1 sends out the telephone calling sound to the communication line 17-1. When the calling sound is reached via the public switched telephone network 26-1 and the communication line 17-3 to the analog telephone set 18-5, the analog telephone set 18-5 interprets that the analog telephone set 18-6 is being called as the communication counter party.

While the above-explained second procedure operation is carried out, the analog telephone set 18-6 receives the call setting signal (Step S67*x*) and produces the telephone call sound. When the user of the analog telephone set 18-6 hears the telephone call sound and then picks up the handset of the analog telephone set 18-6, a call setting confirmation signal is sent out from the analog telephone set 18-6. The call setting confirmation signal is reached via the line 17-4, the public switched telephone network 26-2, and the line 17-2 to the SCN interface 77-2. When a response received from the SCN interface 77-2 is transferred to the H323 termination unit 76-2 (Step S67*y*), the H323 termination unit 76-2 produces an IP packet 48-8, and, then sends out the IP packet 48-8 to the H323 termination unit 76-1 (Step S68). As a result, the IP packet 48-8 is reached via the network node apparatus 7-4 and the IP telephone network 4 to the network node apparatus 8-4, and then, is received via the router 74-1 within the gateway 9-1 to the H323 termination unit 76-1.

The H323 termination unit 76-1 understands that the received IP packet 48-8 is a response(namely, user of analog telephone set 18-6 takes up handset), and thus, sends out a data block 48-9 for implying a call setting confirmation to the SCN interface 77-1. As a result, the SCN interface 77-1 sends out a call setting confirmation signal to the communication line 17-1, and then, is delivered via the public switched telephone network 26-1 and the communication line 17-3 to the analog telephone set 18-5.

The above-described Step S68 corresponds to such a procedure that information of a response is transferred, namely, the IP packet 48-9 is transferred which notifies such a fact that the telephone communication is commenced between the analog telephone set 18-5 and the analog telephone set 18-6. When both the network node apparatus 7-4 and 8-4 detect the IP packet 48-9, a record of the commencement of the telephone communication may be saved in a charge record file. In other words, such a fact that the telephone communication is commenced between the analog telephone sets 18-5 and 18-6 and a time instant thereof is saved in the charge record file.

When the user of the analog telephone set 18-1 starts a telephone conversation, a voice(speech) signal is transferred via the communication line 17-3, the public switched telephone network 26-1, and the communication line 17-1 to the SCN interface 77-1 so as to be converted into digital voice data. Next, the H323 termination unit 76 produces an IP packet 48-10 containing the digital voice data. The voice packet 48-10 is delivered to the analog telephone set 18-6 via the router 74-1; the network node apparatus 8-4; the routers 19-8, 19-9, 21-2, 19-11 and 19-13; the network node apparatus 7-4; the H323 termination unit 76-3; the SCN interface 77-2; the communication line 17-2; the public switched telephone network 26-2; and the communication line 17-4 (Step S69). The voice of the user of the analog telephone set 18-6 is delivered to the analog telephone set 18-5 along a direction opposite to the above-explained packet flow direction (Step S70), namely, is supplied via the SCN interface 77-2; the H323 control unit 76-2; the network node apparatus 7-4; the routers 19-13, 19-11, 21-2, 19-9 and 19-8; the network node apparatus 8-4; the H323 termination unit 76-1 provided inside the gateway 9-1; the SCN interface 77-1; and the communication line 17-1.

When the user of the analog telephone set 18-5 puts on the handset in order to end the telephone communication, the analog telephone set 18-5 sends out a call interrupt signal indicative of ending of the telephone conversation to the communication line 17-3. The SCN interface 77-1 converts the call interrupt signal into a digital data format. Next, the H323 termination unit 76-1 produces an IP packet 48-12 which indicates that the telephone communication is ended, and then sends out the IP packet 48-12 to the router 74-1 (Step S71). Then, the IP packet 48-12 is delivered to the analog telephone set 18-6 via the network node apparatus 8-4; the routers 19-8, 19-9, 21-2, 19-11 and 19-13; the network node apparatus (7-4); the H323 termination unit 76-2; and the SCN termination unit 77-2. The user of the analog telephone set 18-6 may know such a fact that the telephone communication is ended, and then, when this user puts on the handset of the analog telephone set 18-6, the SCN interface 77-2 interprets a confirmation of a call interrupt(namely, end of telephone communication), and requests the public switched telephone network 26-2 to notify "use fee of public switched telephone network" which is required for the telephone communication between the analog telephone sets 18-5 and 18-6. For example, when the communication line 17-2 is the ISDN line, charge information is notified when the telephone communication is ended.

The SCN interface 77-2 notifies the acquired use fee of the public switched telephone network as a charge fee to the H323 termination unit 76-2. The H323 termination unit 76-2 grasps both a call release confirmation and the charge fee, so that the below-mentioned two procedure operations can be carried out. As the first procedure operation, the H323 termination unit 76-2 produces an IP packet 48-13, and sends out the IP packet 48-13 to the router 74-2. As a result, the IP packet 48-13 is delivered to the H323 termination unit 76-1 (Step S72) along a direction opposite to the above-explained packet flow direction, namely, is supplied via the network node apparatus 7-4; the routers 19-13, 19-11, 21-2, 19-9 and 19-8; the network node apparatus 8-4 to the H323 termination unit 76-1. Furthermore, as the second procedure process, the H323 termination unit 76-2 notifies a data block 48-14 to a charging unit 72-2 by employing a data transfer function operable within the gateway 9-2. The datablock 48-14 contains the information about the charge fee which has been acquired in accordance with the above-explained procedure. The charging unit 72-2 may save thereinto the acquired charge information when the public switched telephone network 26-2 is used in the telephone communication established between the analog telephone sets 18-5 and 18-6.

In accordance with the above-explained procedure operation, the analog telephone set 18-5 transmits/receives the IP packet to/from the analog telephone set 18-6, so that the telephone communication can be established.

The above-described Step S72 corresponds to such a procedure that information of a call interrupt confirmation is transferred, namely, the IP packet 48-13 is transferred which notifies such a fact that the telephone communication is ended between the analog telephone set 18-5 and the analog telephone set 18-6. When both the network node apparatus 8-4 and 7-4 detect the IP packet 48-13, a record of the completion of the telephone communication may be saved in a charge record file. In other words, such a fact that the telephone communication is ended between the analog telephone sets 18-5 and 18-6 and an ending time instant are saved in the charge record file.

The IP telephone service operation/management server 36-1 managed by the communication company "X" acquires the above-described telephone communication starting record and telephone communication end record, in such a manner that the IP telephone service operation/management server 36-1 periodically, or temporarily transmits/receives an inquiry IP packet with respect to the network node apparatus 8-4. Also, the IP telephone service operation/management server 36-1 acquires the above-explained charge information by transmitting/receiving the inquiry IP packet to/from the charging unit 72-1. Similarly, the IP telephone service operation/management server 36-2 managed by the communication company "Y" acquires the above-explained telephone communication starting record and telephone communication end record in such a manner that the IP telephone service operation/management server 36-2 periodically, or temporarily transmits/receives an inquiry IP packet with respect to the network node apparatus 7-4. Furthermore, the IP telephone service operation/management server 36-2 acquires the charge information by transmitting/receiving the inquiry IP packet to/from the charging unit 72-2.

In the above-described communication procedures, while the domain name server 78-1 may be removed from the gateway 9-1, the above-explained Steps S63 to S65 may be replaced by the below-mentioned Steps S63*x* and S65*x*. In other words, the H323 termination unit 76-1 transmits an IP packet 48-15 via the network node apparatus 8-4 to the domain name server 31-1 (Step S63*x*). The IP packet 48-15 stores thereinto the address of the analog telephone set 18-5, namely the transmission source IP address "A185"; the address of the domain name server 31-1 dedicated to the IP telephone network, namely the destination IP address "A311"; and the telephone number of the communication counter party "Tel-18-6 name". The domain name server 31-1 dedicated to the IP telephone network returns another IP packet 48-16 to the H323 termination unit 76-1 (Step S65x). The IP packet 48-16 contains the IP address "A186" which corresponds to the telephone number of the communication counter party "Tel-18-6 name" in a 1-to-1 correspondence manner.

In the above-explained procedures defined from the Step S63 to the Step S65, or by both the Step S63x and the Step S65x, the network node apparatus 8-4 may confirm that the analog telephone set 18-5 is allowed to be communicated from the communication line 17-1 via the network node apparatus 8-4 by checking as to whether or not the combination between the transmission source address "A781" contained in the IP packet 48-3 produced in the domain name server 78-1 in the gateway and the communication line identification symbol "Line-17-1" similarly produced is registered in the address administration table 44-2 (refer to FIG. 86), or by checking as to whether or not the combination between the transmission source address "A185" contained in the IP packet 48-15 produced in the H323 termination unit 76-1 and the communication line identification symbol "Line-17-1" similarly produced is registered in the address administration table 44-2 (refer to FIG. 86).

<<Telephone Service Operation/Management Server>>

The IP telephone service operation/management server 36-1 managed by the communication company "X" acquires the above-explained telephone communication starting record and also telephone communication end record in such a manner that the IP telephone service operation/management server 36-1 periodically, or temporarily transmits/receives an inquiry IP packet with respect to both the network node apparatus 8-2 and 8-4. Also, the IP telephone service operation/management server 36-1 checks as to whether or not the internal resources of the IP telephone network managed by the communication company "X" are operated under normal condition by using such a means for transmitting/receiving an ICMP packet(namely, failure management). These internal resources are, for instance, the routers 19-8, 19-9, 19-10; the domain name server 31-1, and the communication lines among the routers. Also, the IP telephone service operation/management server 36-1 monitors as to whether or not the congestion of the IP packets within the IP telephone network is excessively increased(namely, communication quality control) in order that the IP telephone network of the communication company "X" may be operated/managed in a batch mode.

Similarly, the IP telephone service operation/management server 36-2 managed by the communication company "Y" acquires the above-explained telephone communication starting record and telephone communication end record in such a manner that the IP telephone service operation/management server 36-2 periodically, or temporarily transmits/receives an inquiry IP packet with respect to both the network node apparatus 7-2 and 7-4. Also, the IP telephone service operation/management server 36-2 operates/manages the failure management and the communication quality of the IP telephone network of the communication company "Y" in a batch manner.

It should also be noted that the record about the telephone communication commencement defined at the Step S68, and the record about the end of the telephone communication defined at the Step S72 among the above-explained procedure may be omitted. In this alternative case, the acquisitions of both the telephone communication starting record and the telephone communication end record by the communication company "X" and the communication company "Y" may be omitted. It should also be noted that both the IP telephone service operation/management servers 36-1 and 36-2 may be subdivided into an IP telephone service server which exclusively manages the IP telephone services, and also an IP telephone network operation/management server which exclusively manages the resources of the IP telephone network.

3. Third Embodiment Using Media Router Inside CATV Communication Network

Referring now to FIG. 88, a description will be made of a third embodiment featured by that since the media router according to the present invention is used inside a CATV communication network, terminals are communicated/connected to each other with employment of an IP transfer network.

A media router 115 is located within a CATV gateway 113-2 employed inside a CATV network 113-1, and is connected via a communication 112 to a network node apparatus 111 provided in an integrated IP transfer network 110. Also, the media router 115 is connected via any one of a CATV line interface 114, and CATV lines 119-1 through 119-4 to IP terminals 116-1 through 116-3; an analog telephone set 117, a dependent type IP telephone set 118-1, and a dependent type IP voice/image apparatus 118-2. The CATV lines 119-1 to 119-4 contain communication lower layers(namely, communication physical layer and data link layer) specific to the CATV lines, and also have functions for transferring IP packets in a communication network. An IP packet transmitted from the IP terminal 116-1 is entered via the CATV line 119-1 to the CATV line interface 114 in which the IP packet is derived. The derived IP packet is sent to the media router 115. The media router 115 is arranged in a similar manner to that of the media router 14-1 shown in FIG. 23, and contains the same function as that of the media router 14-1, for example, a domain name server. Because of this reason, the media router 115 can convert an IP packet containing call control data into DNS inquiry response format data, and can send out the converted IP packet to the communication line 112.

Also, such an IP packet is transmitted via the media router 115 to the communication line 112. The IP packet is inputted from the analog telephone set 117, the dependent type IP telephone set 118-1, or the dependent type IP voice/image apparatus 118-2 through the CATV lines 119-2 to 119-4 and the CATV line interface 114. Conversely, an IP packet which is sent from the network node apparatus 111 via the communication line 112 may be transmitted via the media router 115, the CATV line interface 114, and thereafter any one of the CATV lines 119-1 to 119-4 to any one of the IP terminal 116-1, the analog telephone set 117, the dependent type IP telephone set 118-1 and the dependent type IP voice/image apparatus 118-2.

As previously explained in other embodiments, the IP terminal 116-1, the analog telephone set 117, the dependent type IP telephone set 118-1 and the dependent type IP voice/image apparatus 118-2 provided inside the CATV network 113-1 can establish the terminal-to-terminal communications via the integrated IP transfer network 110 with respect to other various terminals connected to the integrated IP transfer network 110, namely an IP terminal, an analog telephone set, an IP telephone set, and an IP voice/image apparatus, while using the domain name server within the integrated IP transfer network.

Since the IP terminal 116-1 indicates a host name of an IP terminal functioning as a communication counter party to the domain name server within the integrated IP transfer network 110 via the CATV line 119-2 and the CATV gateway 113-2 so as to acquire an IP address of the IP terminal of the counter party and subsequently data is transmitted/received from/to the IP terminal 116-1 to the IP terminal of the counter party, a terminal-to-terminal communication for transmitting/receiving data can be carried out. Similarly, since the analog telephone set 117 indicates a host name of an analog telephone functioning as a communication counter party, i.e., a telephone number of a telephone set thereof to the domain name server within the integrated IP transfer network 110 via the CATV line 119-2 and the CATV gateway 113-2 so as to acquire an IP address of the telephone set of the counter party and subsequently voice data is transmitted/received from the analog telephone set 117 to the analog telephone set of the counter party, a telephone communication can be carried out.

Similarly, since the dependent type IP telephone set 118-1 indicates a host name of an analog telephone set functioning as a communication counter party, i.e., a telephone number of a telephone set of the counter party to the domain name server within the integrated IP transfer network 110 via the CATV line 119-2 and the CATV gateway 113-2 so as to acquire an IP address of the analog telephone of the counter party and subsequently voice data is transmitted/received from the analog telephone set 117 to this analog telephone set of the counter party, a telephone communication can be carried out.

4. Fourth Embodiment Using Gateway

Referring now to FIG. 89, a fourth embodiment will be explained in which while a terminal storage wireless apparatus is combined with the gateway according to the present invention, terminals are connected/communicated with each other by employment of an IP transfer network.

In this drawing, reference numeral 120 shows an integrated IP transfer network, reference numeral 121 denotes a network node apparatus, reference numeral 122 represents a gateway apparatus, 123 indicates a wireless transmission/reception unit, reference numeral 124-1 shows a wireless interface conversion unit, reference numeral 124-2 represents a communication line, reference numeral 125 indicates a wireless communication path, reference numeral 126 shows a terminal storage wireless apparatus, reference numeral 127 indicates a wireless transmission/reception unit, reference numeral 128-1 is an IP terminal, reference numeral 128-2 represents a dependent type IP telephone set, reference numeral 128-3 shows a dependent IP voice/image apparatus, and reference numerals 129-1 to 129-3 indicate wireless interface conversion unit. The gateway 122 owns the same function as that of the above-described gateway 9-1 shown in FIG. 68. When terminals such as an IP terminal, an H323 terminal and an analog telephone set are connected via the communication line 124-2, the gateway 122 may be employed for carrying out a terminal-to-terminal communication. Because of this reason, since an IP terminal, an IP telephone set, and an IP voice/image apparatus are connected to each other by using the communication line 124-2, the gateway 122 may perform the terminal-to-terminal communication.

Both data having a DNS inquiry/response format sent from the IP terminal 128-1 and text data which will be transmitted/received are converted into an input data format of a wireless transmission/reception unit by the wireless interface conversion unit 129-1, and then the converted data format is entered into the wireless transmission/reception unit 127, and further supplied via the wireless communication path 125 to the wireless transmission/reception unit 123. Then, the data format is converted into such a data format of an IP packet which is applicable to a gateway in the wireless interface conversion unit 124-1, and then the converted IP packet is sent out via the communication line 124-2 to the gateway 122. Both telephone call controlling data and digitally-represented voice (speech) data to be transmitted/received, which are transmitted from the dependent type IP telephone set 128-2, are converted into the input data formats of a wireless transmission/reception unit by the wireless interface conversion unit 129-2, and then the converted data formats are inputted to the wireless transmission/reception unit 127. The converted data formats are supplied via the wireless communication path 125, the wireless transmission/reception unit 123, and the communication line 124-2 to the wireless interface conversion unit 124-1 so as to be converted into data formats of IP packets which is applicable to a gateway by the wireless interface conversion unit 124-1. These data formats are sent to the gateway 122.

Both call control data of an IP voice/image apparatus and digitally-expressed voice/moving image data to be transmitted/received, which are transmitted from the dependent type IP voice/image apparatus 128-3 are converted into the input data formats of a wireless transmission/reception unit by the wireless interface conversion unit 129-3, and then the converted data formats are inputted to the wireless transmission/reception unit 127. The converted data formats are supplied via the wireless communication path 125, the wireless transmission/reception unit 123, the wireless interface conversion unit 124-1 and the communication line 124-2 to the wireless interface conversion unit 124-1 so as to be converted into data formats of IP packets which is applicable to a gateway by the wireless interface conversion unit 124-1. These data formats are sent to the gateway 122. Also, as a data flow along a direction opposite to the above-described direction, for instance, an IP packet of an IP telephone supplied from the network node apparatus 121 is delivered via the gateway 122, the communication line 124-2, the wireless interface converting unit 124-1, the wireless transmission/reception unit 123, the wireless communication path 125, the wireless transmission/reception unit 127, and the wireless interface conversion unit 129-2 to the dependent type IP telephone set 128-2.

Furthermore, the IP terminal 128-1, the dependent type IP telephone set 128-2 and the dependent type IP voice/image apparatus 128-3, which are connected to the terminal storage wireless apparatus 126, may establish the terminal-to-terminal communication with respect to other various terminals which are connected via the integrated IP transfer network 120 to the integrated IP transfer network 120, namely an IP terminal, an analog telephone set, an IP telephone set, an IP voice/image apparatus and the like.

5. Fifth Embodiment with Gateway Having Different Structure

This fifth embodiment is a gateway having a different structure from that of the gateway 9-1 shown in FIG. 68 of the second embodiment, and will now be explained with reference to FIG. 90.

In this drawing, reference numeral 9-5 shows a gateway, reference numeral 74-5 shows a router, reference numeral 78-5 denotes a domain name server, and reference numeral 79-5 represents a RAS mechanism. This RAS mechanism 79-5 manages registration/certification of terminals to the gateway 9-5, and also internal states (for example, communication state and rest state) of the gateway 9-5. In this case, "registration of terminal" implies that a terminal is connected to the gateway, whereas "certification of terminal" is to confirm as to whether or not a terminal can be formally utilized in accordance with a connection permission condition of the terminal. Reference numeral 80-5 shows an information processing mechanism for executing an information process operation within the gateway 9-5. Reference numeral 81-5 shows an operation input/output unit of the gateway 9-5, and reference numeral 72-5 represents a charging unit. Reference numeral 82-3 represents a gateway unit for H323 communication procedure(H323-GW), reference numeral 75-3 denotes an H323 connection control unit, reference numeral 76-3 shows an H323 termination unit, and reference numeral 77-3 denotes an SCN interface. Also, reference numeral 82-4 indicates a gateway unit for SIP communication procedure (SIP-GW), reference numeral 75-4 shows an SIP connection control unit, reference numeral 76-4 denotes an SIP termination unit, and reference numeral 77-4 represents an SCN interface. Reference numeral 52-3 shows an IP communication line to which an IP terminal is connectable, reference numeral 53-3 indicates a communication line to which an IP telephone set of H323 communication procedure is connectable, and reference numeral 53-4 shows a communication line to which an IP telephone set of SIP communication procedure is connectable. Also, reference numerals 17-3 and 17-4 denote communication lines connected to a public switched telephone network, respectively.

Figure 90:
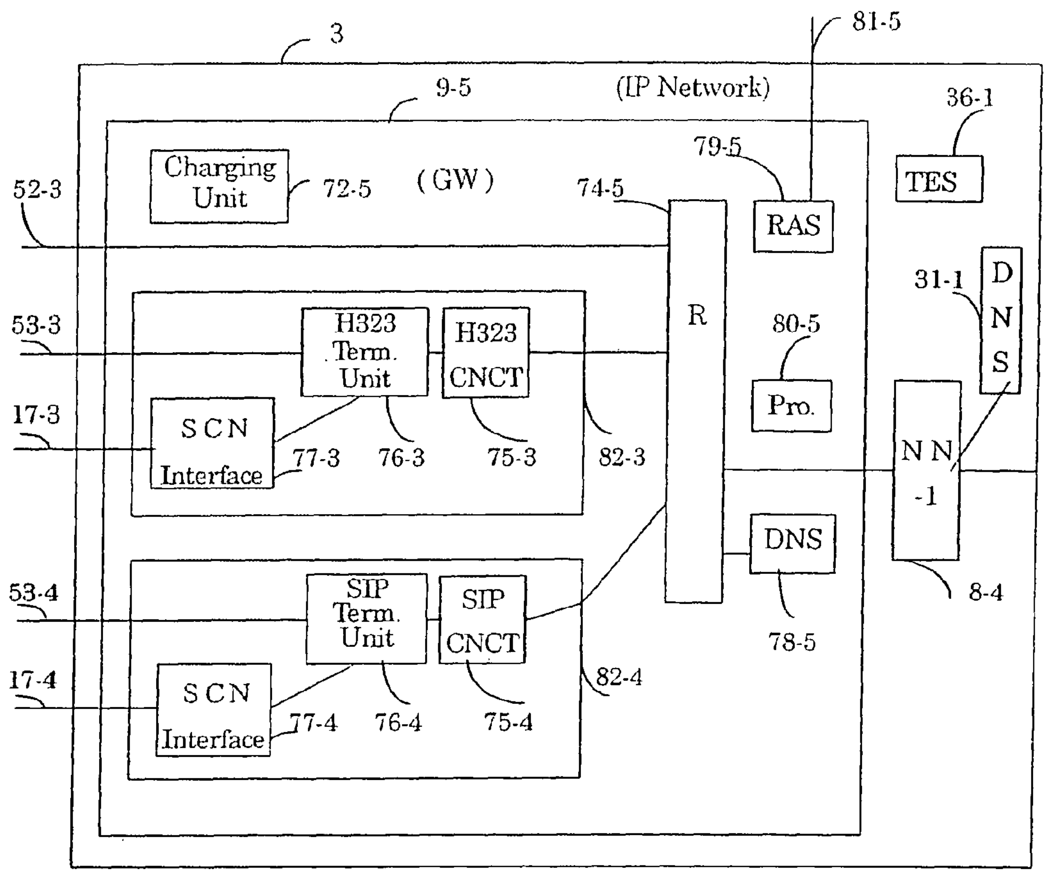
FIG. 90 is a block diagram for indicating a structural example of a gateway according to a fifth embodiment of the present invention.

The gateway 9-5 of FIG. 90 is replaceable by the gateway 9-1 shown in FIG. 68 of the second embodiment, and the router 74-5 is replaceable by the router 74-1. Also, the domain name server 78-5 is replaceable by the domain name server 78-1, the RAS mechanism 79-5 is replaceable by the RAS mechanism 79-1, the information processing mechanism 80-5 is replaceable by the information processing mechanism 80-1, and the operation input/output unit 81-5 is replaceable by the operation input/output unit 81-1. Also, the charging unit 72-5 is replaceable by the charging unit 72-1, the H323 connection control unit 75-3 is replaceable by the H323 connection control unit 75-1, the H323 termination unit 76-3 is replaceable by the H323 termination unit 76-1, and further, the SCN interface 77-3 is replaceable by the SCN interface 77-1. Under such a circumstance, after the gateway 9-5 of FIG. 90 has been replaced by the gateway 9-1 of FIG. 68, a communication may be carried out by the following manner. That is, an IP terminal is connected to a tip of the IP communication line 52-3, an IP telephone set of H323 communication procedure is connected to a tip of the communication line 53-3, an analog telephone set is connected to a tip of the communication line 17-3, and also is connected via the gateway 9-5 to the terminals 11-10 and 18-6 of FIG. 69 in the second embodiment, which are connected to the integrated IP transfer network 2. Further, reference numeral 82-3 of H323-GW indicates gateway communication interface function unit for H323 communication procedure.

Similarly, symbol SIP-GW 82-4 is a gateway communication interface function unit for SIP communication procedure, and is connected to the telephone set 18-6 of FIG. 69 from the IP telephone set for SIP communication procedure connected to a tip of a communication line 53-4 via the communication line 53-4, the SIP termination unit 76-4 which operates the terminal in accordance with the SIP communication procedure, and also the SIP connection control unit 75-4 and the router 74-5, for connecting the terminals in accordance with the SIP communication procedure, so that the communication can be carried out. Moreover, SIP-GW 82-4 is connected from a telephone set connected to a tip of the communication line 17-4 via the SCN interface 77-4 to the telephone set 18-6, so that the communication can be carried out.

Both H323-GW 82-3 and SIP-GW 82-4 may provide communication line interfaces corresponding to the two communication procedures. In future, when a communication means is newly developed, a gateway used for this new communication means may be additionally provided at the locations of both the gateways 82-3 and 82-4. Alternatively, since a plurality of gateway communication interface function units depending upon a sort of communication procedures are employed, the gateway may be applied to various telephone connection controls for various communication procedures.

6. Sixth Embodiment Using Telephone Management Server

Figure 91:
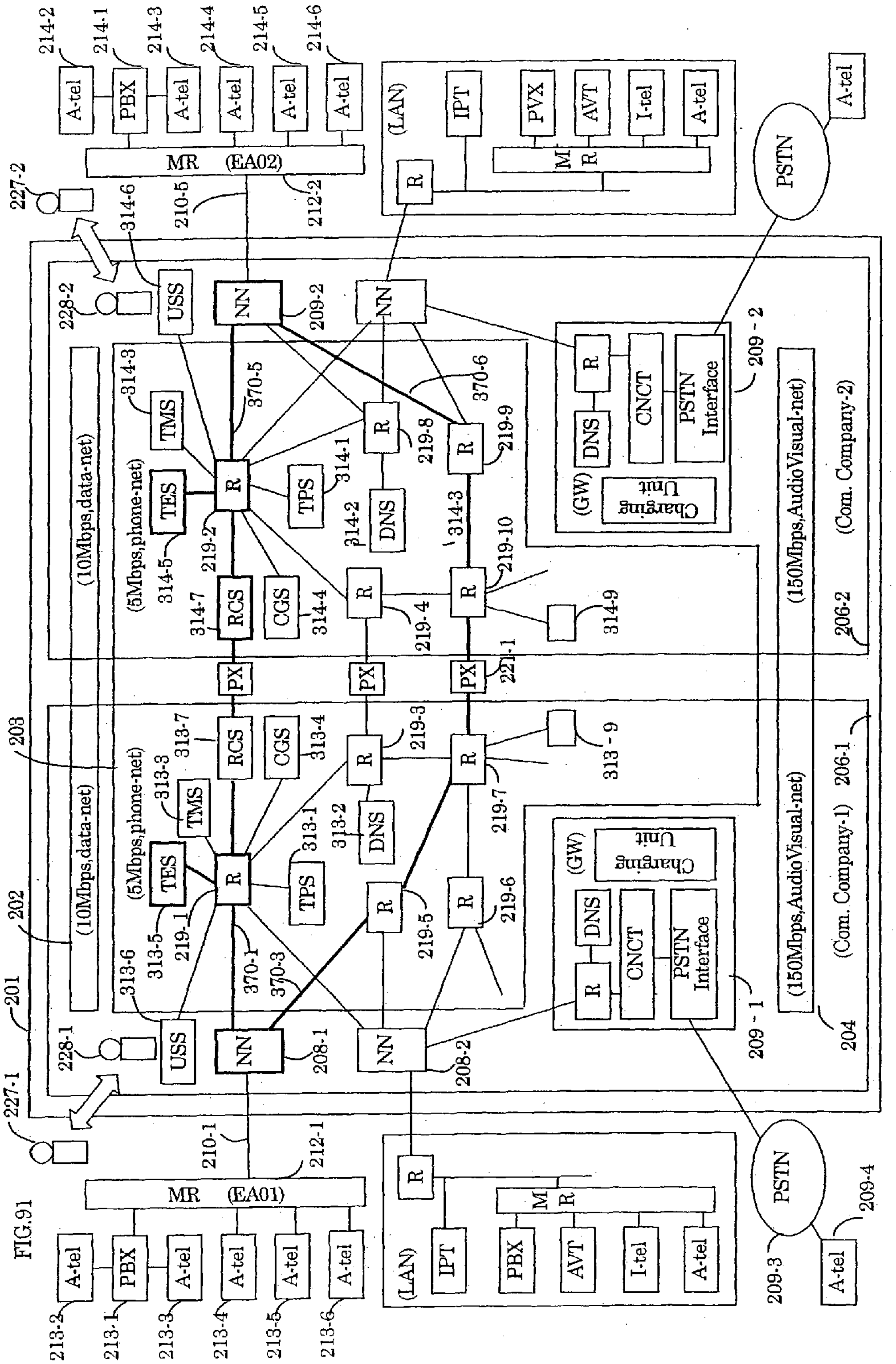
FIG. 91 is a block diagram for showing a structural diagram in the case of employing a telephone communication control server in a sixth embodiment of the present invention.
Figure 92:
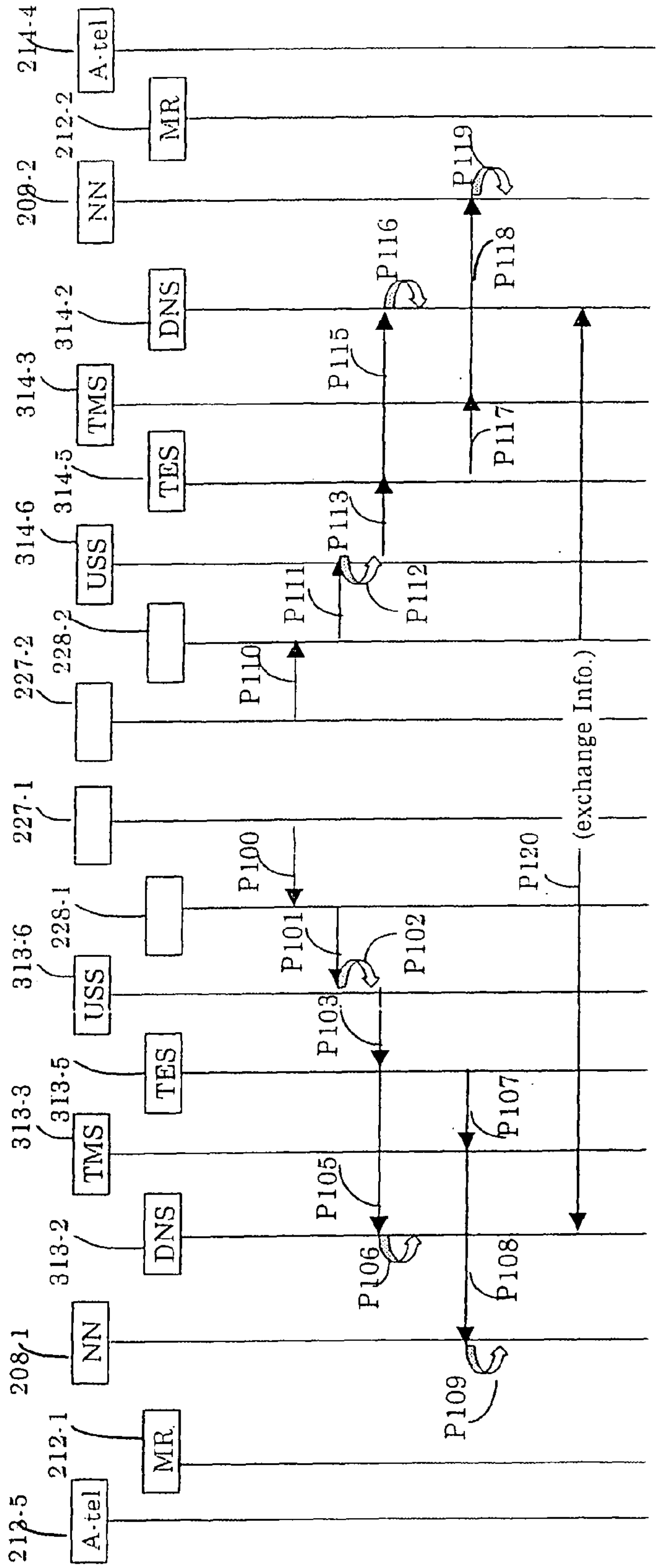
FIG. 92 is a flow chart for explaining operations of the sixth embodiment of the present invention.

In FIG. 91, reference numeral 201 is an integrated IP communication network, reference numeral 202 indicates an IP data network, reference numeral 203 shows an IP telephone network, and reference numeral 204 represents a voice/image network. Also, reference numeral 206-1 shows a range of an integrated IP communication network which is operated/managed by a communication company "1", and reference numeral 206-2 denotes a range of an integrated IP communication network which is operated/managed by a communication company "2". Referring now to FIG. 91 and FIG. 92, a preparation of a telephone communication is explained as follows. That is, a description is made of a terminal-to-terminal communication control method by which a telephone communication is made from an analog telephone set 213-5 to another analog telephone set 214-4 via a media router 212-1, a communication line 210-1, a network node apparatus 208-1, an internal structure of an IP telephone network 203, a network node apparatus 209-2, a communication line 210-5 and also a media router 212-2. In this embodiment, reference numerals 219-1 to 219-10 and 221-2 represent routers.

Figure 1:
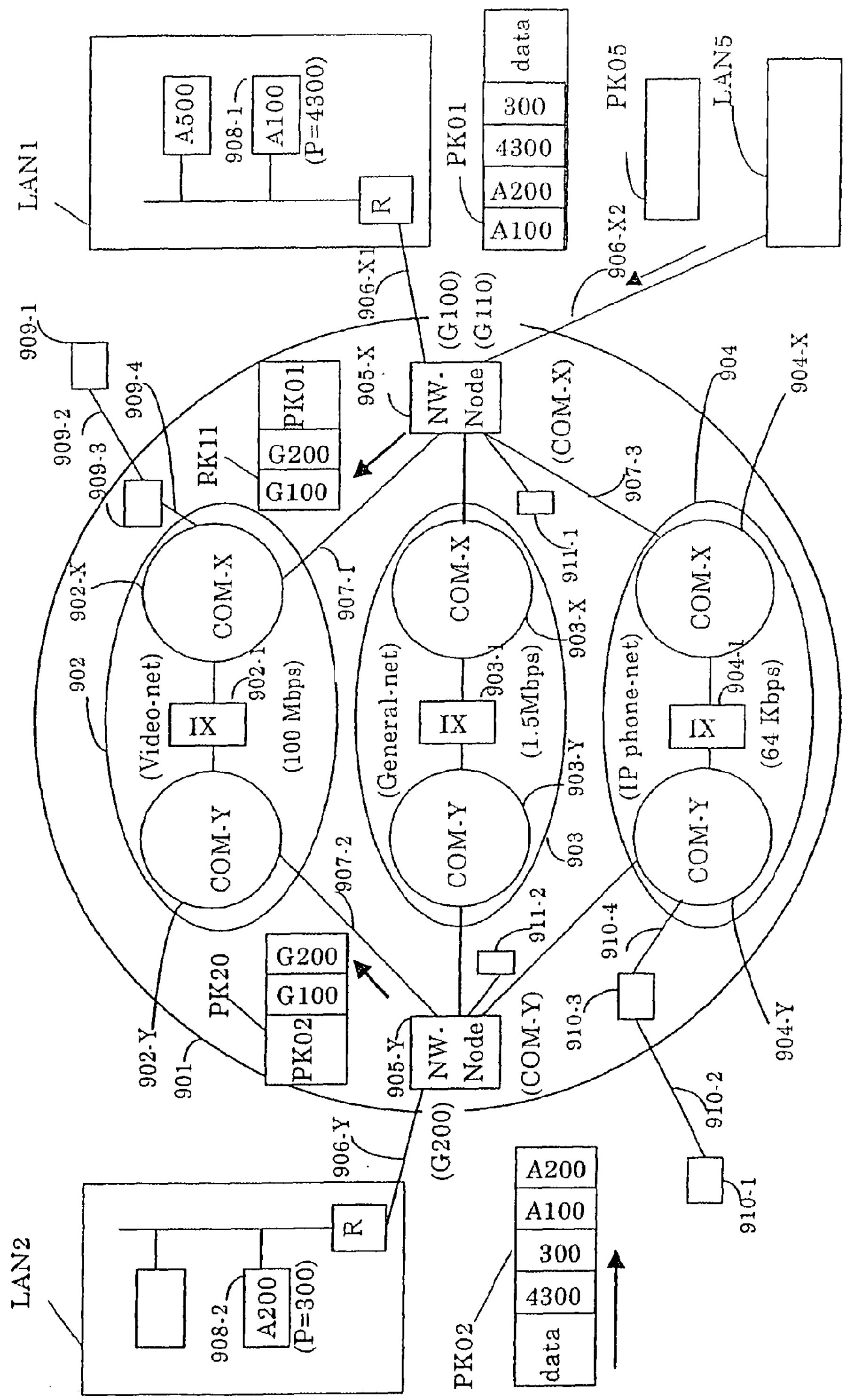
FIG. 1 is a block diagram for simply indicating a integrated IP transfer network.
Figure 2:
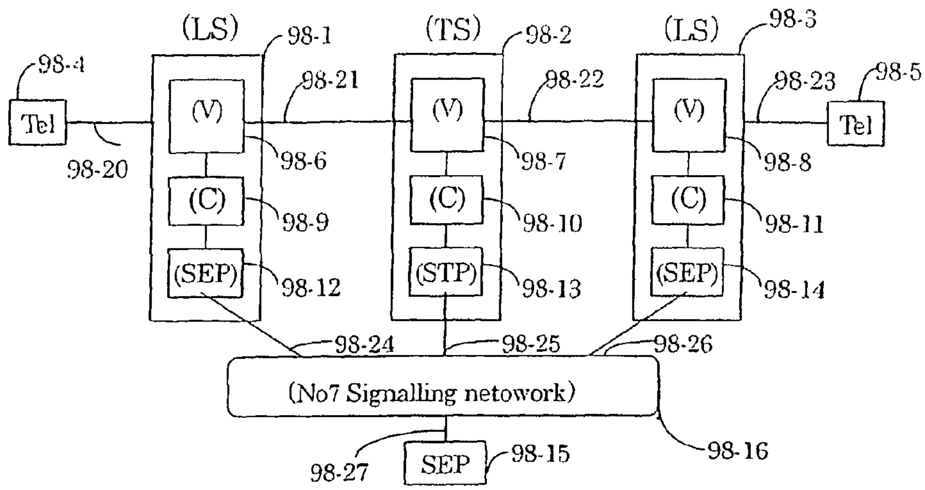
FIG. 2 is a block diagram for explaining a relationship between a exchanger and a signal network.
Figure 3:
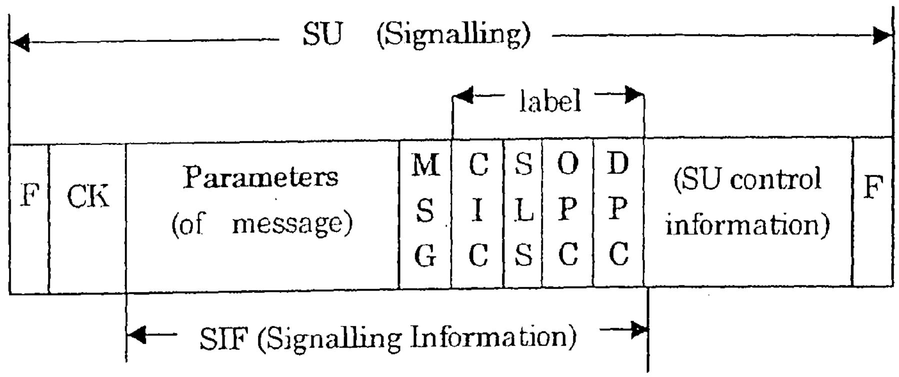
FIG. 3 is a diagram for indicating an example of a signalling unit of the No. 7-common line signal system.
Figure 4:
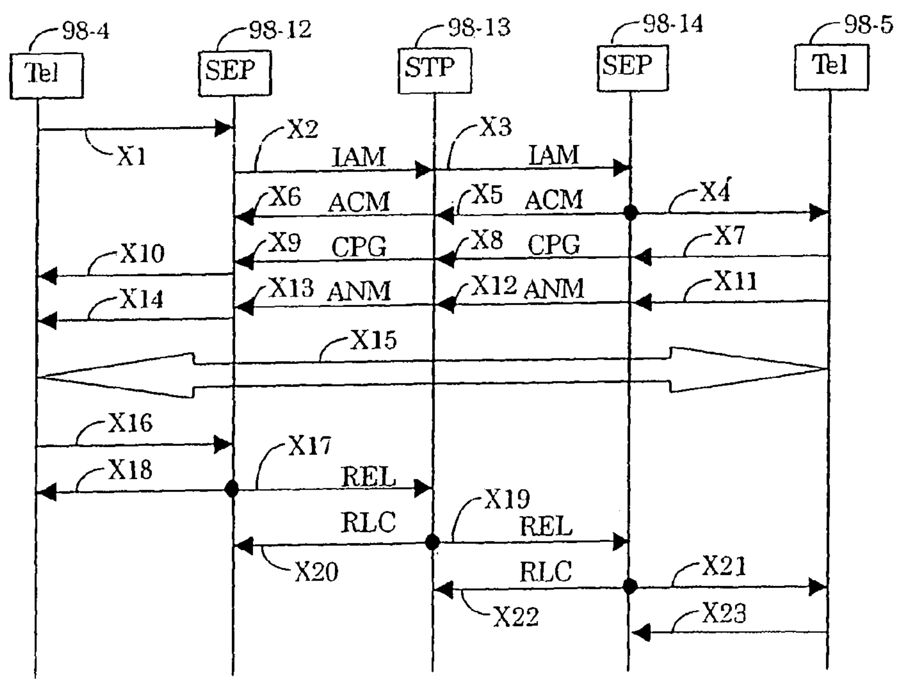
FIG. 4 is a flow chart for explaining a relationship between a exchanger and a signal network.
Figure 5:
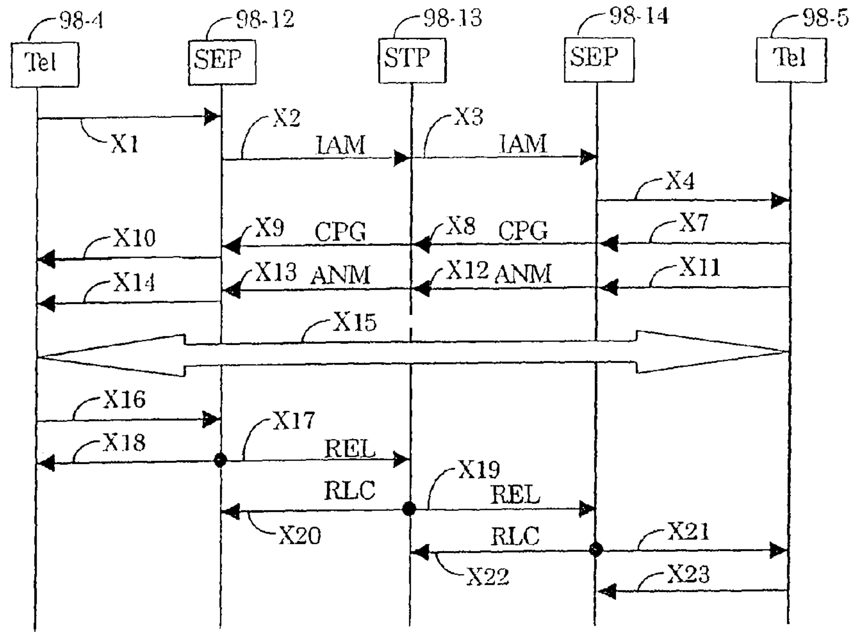
FIG. 5 is a flow chart for explaining a relationship between a exchanger and a signal network.
Figure 6:
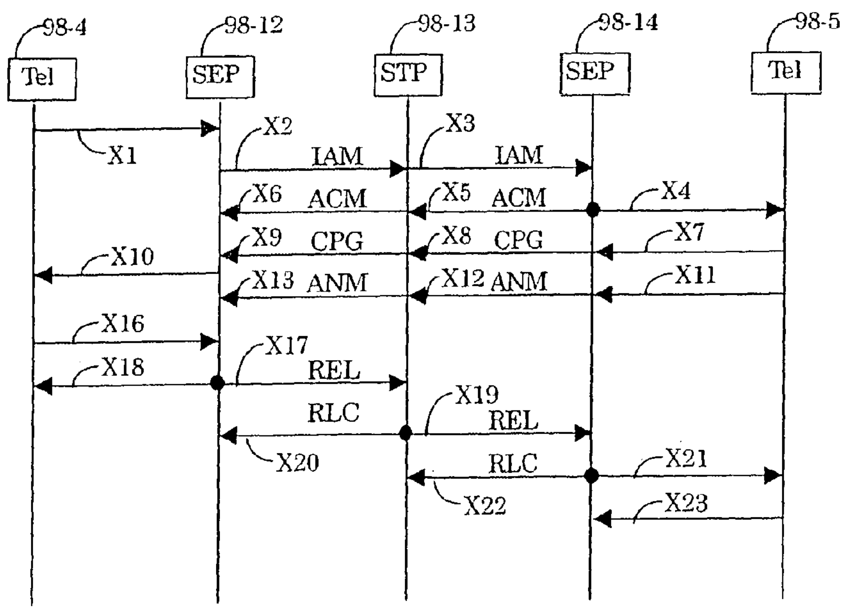
FIG. 6 is a flow chart for explaining a relationship between a exchanger and a signal network.
Figure 7:
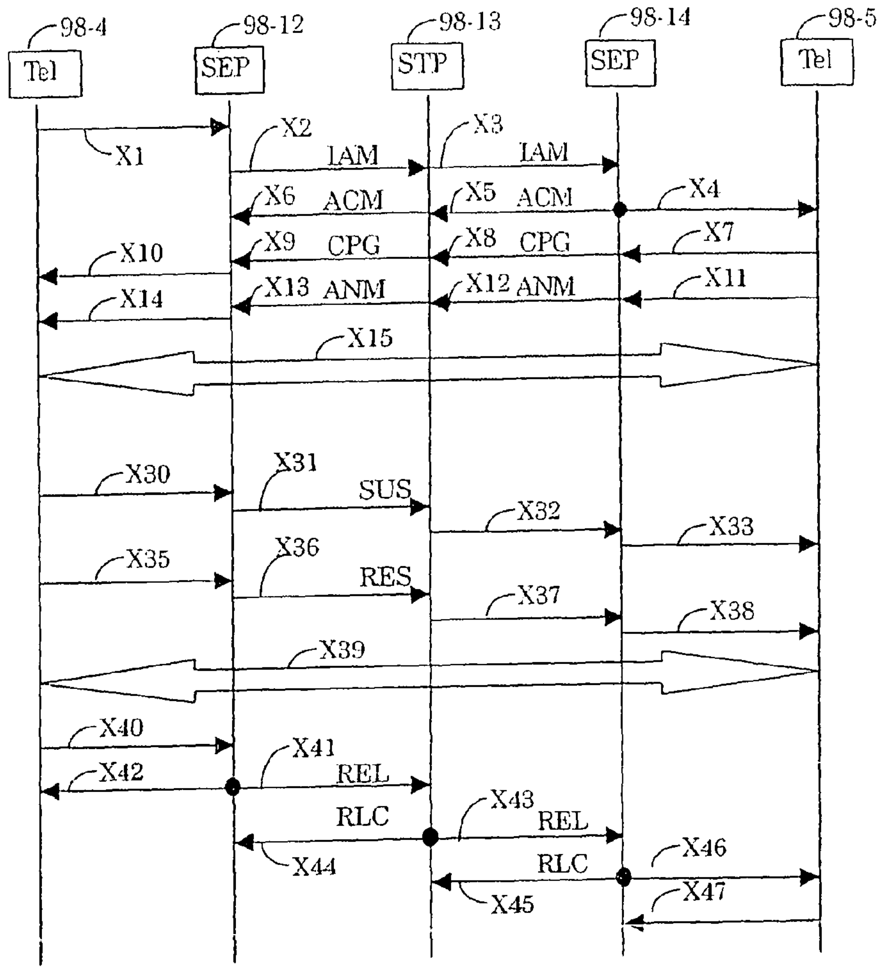
FIG. 7 is a flow chart for explaining a relationship between a exchanger and a signal network.
Figure 8:
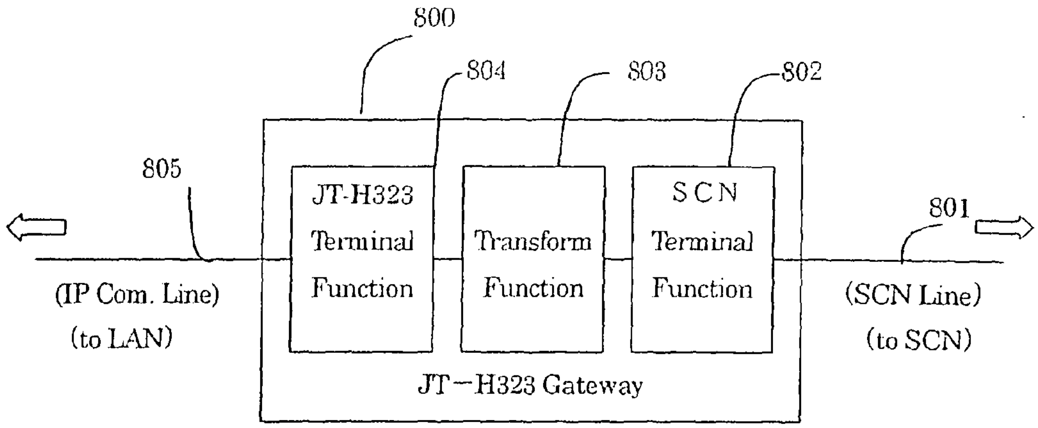
FIG. 8 is block structural diagram for Indicating a basic function of a gateway.
Figure 9:
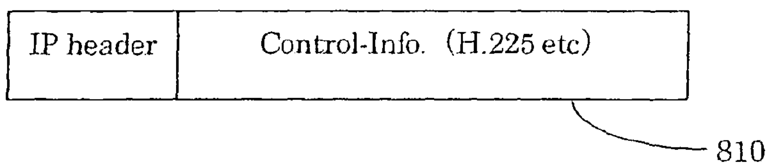
FIG. 9 is a diagram for representing an example of call control data contained in an IP packet.
Figure 10:
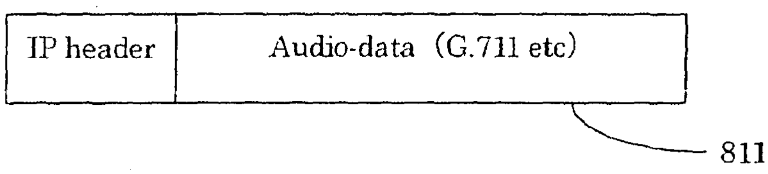
FIG. 10 is a diagram for showing an example of voice data contained in an IP packet.
Figure 11:
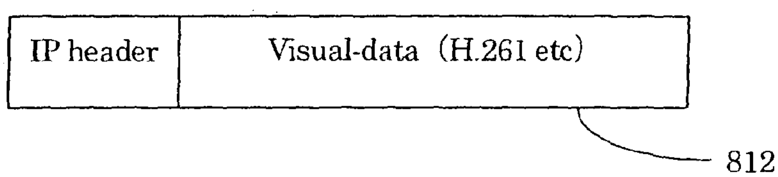
FIG. 11 is a diagram for showing an example of image data contained in an IP packet.
Figure 12:
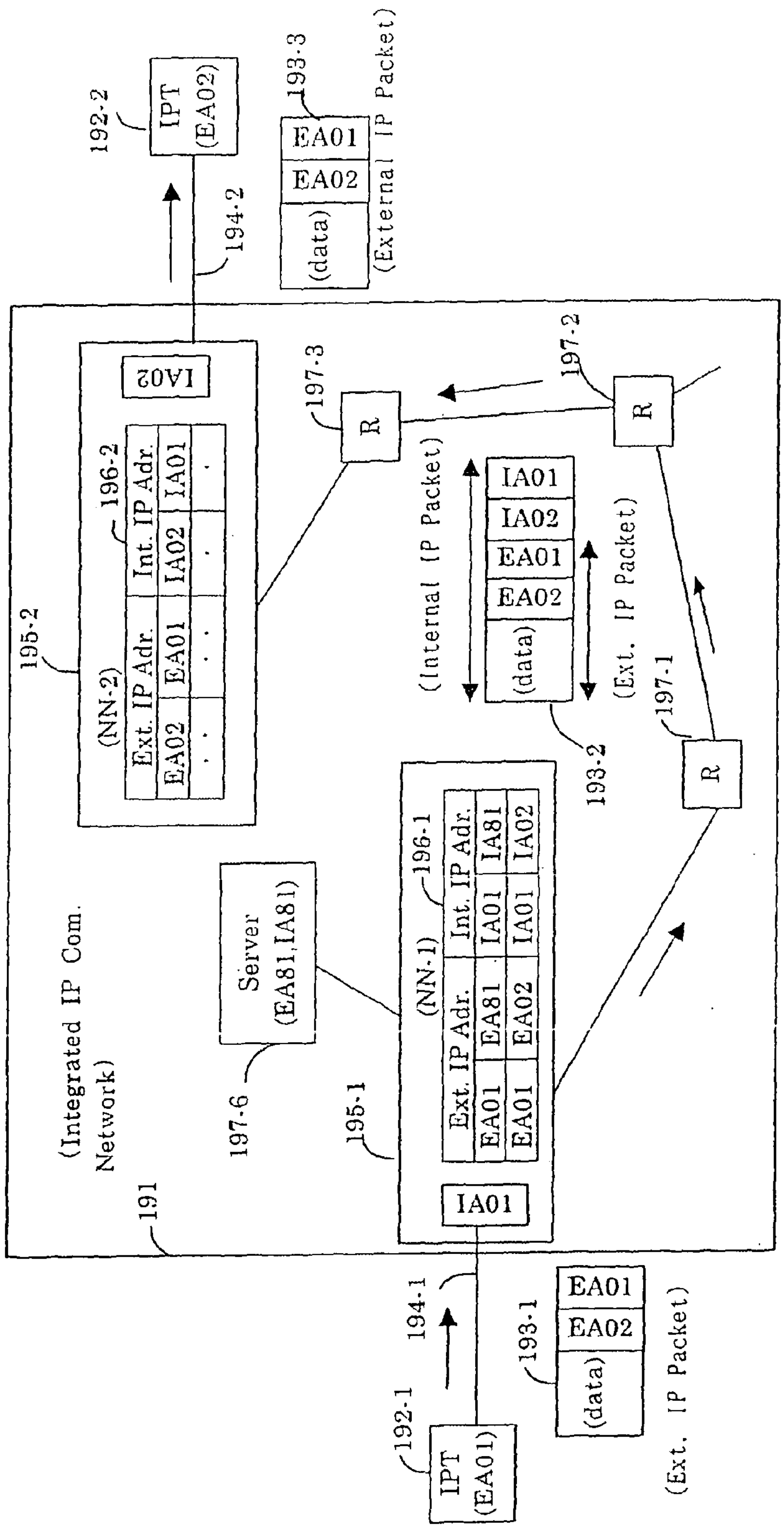
FIG. 12 is a block diagram for indicating a basic idea of a integrated information communication network.
Figure 13:
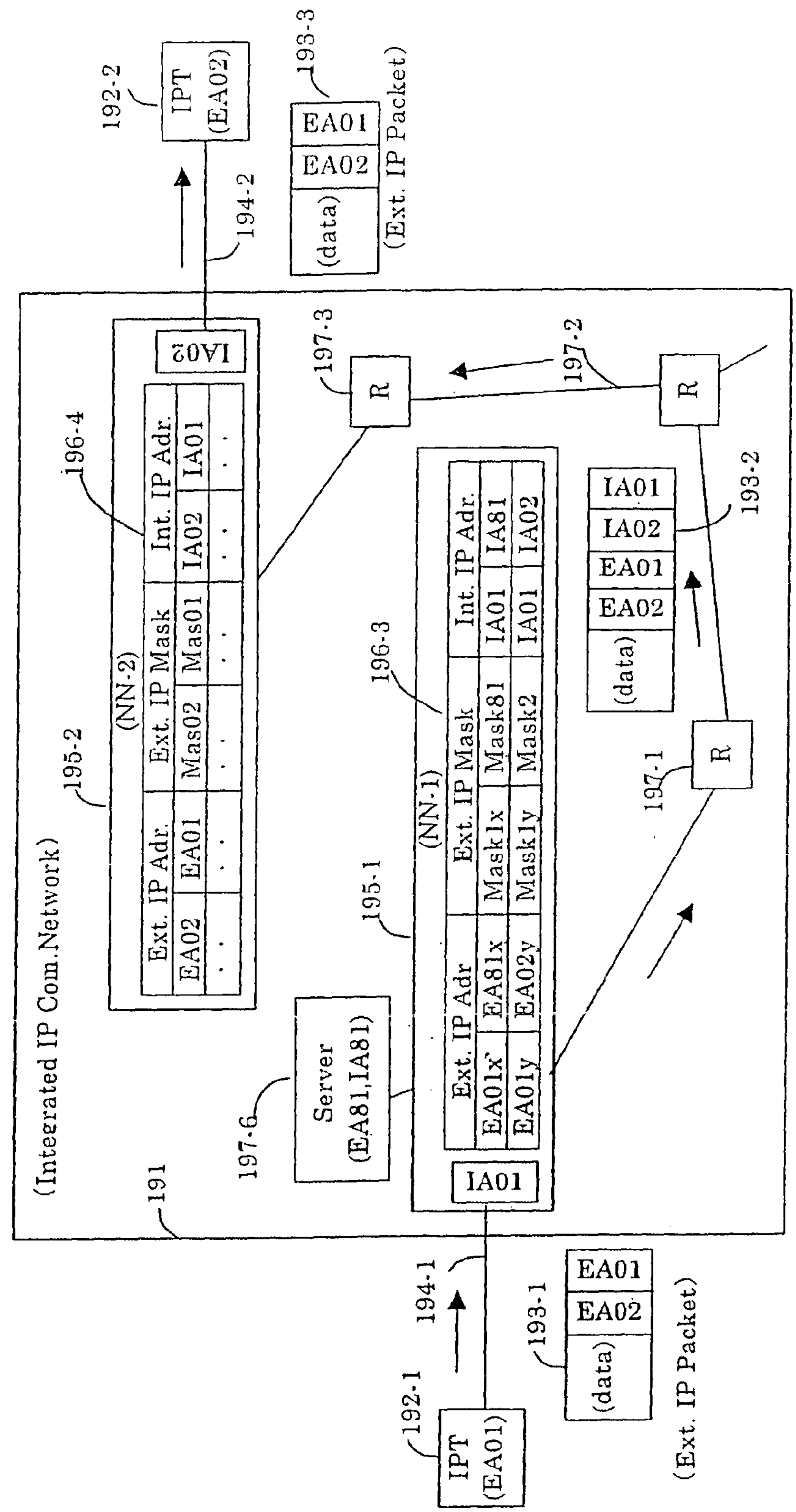
FIG. 13 is a block diagram for indicating a basic idea of a integrated information communication network.
Figure 14:
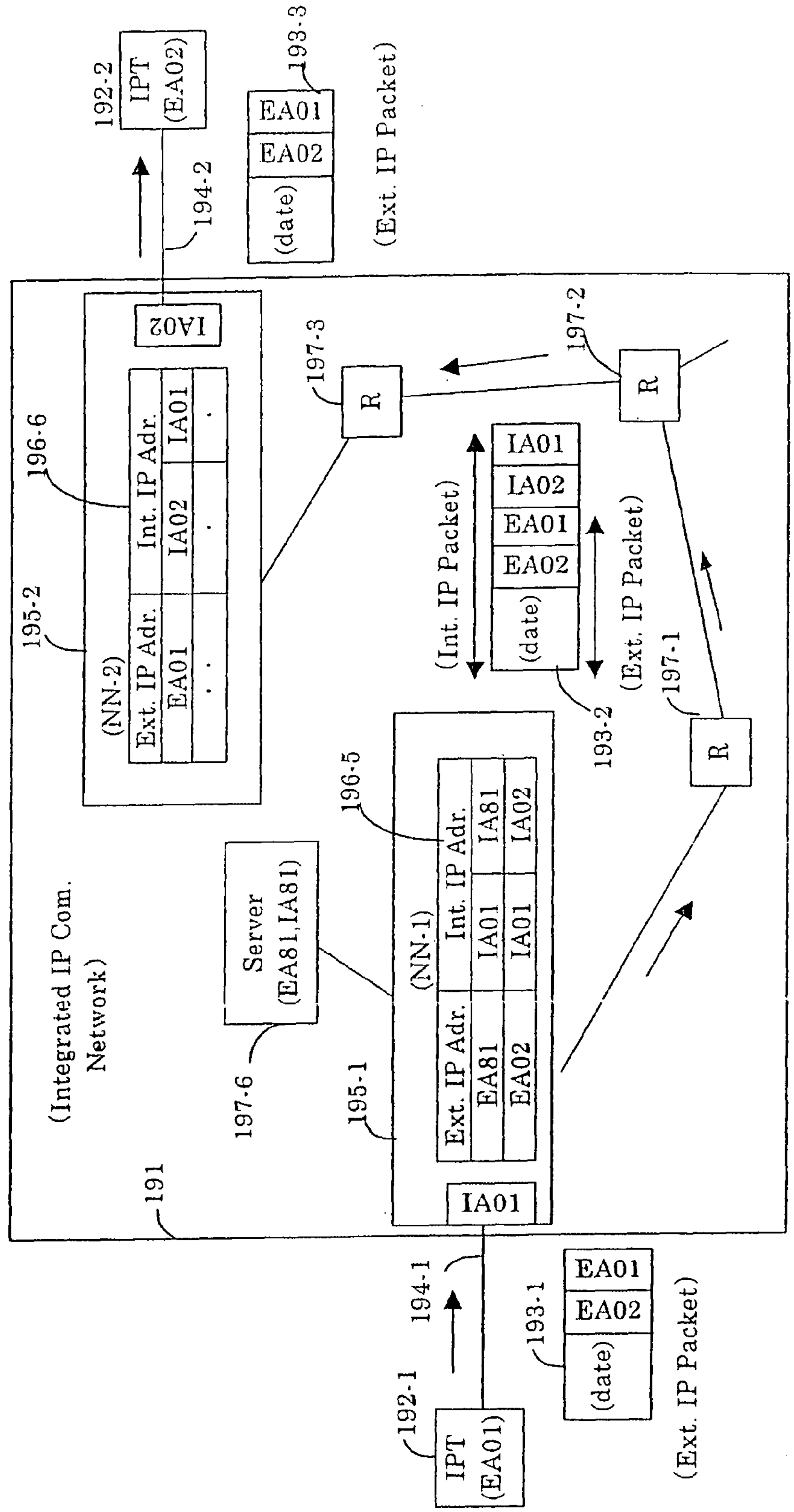
FIG. 14 is a block diagram for indicating a basic idea of a integrated information communication network.
Figure 15:
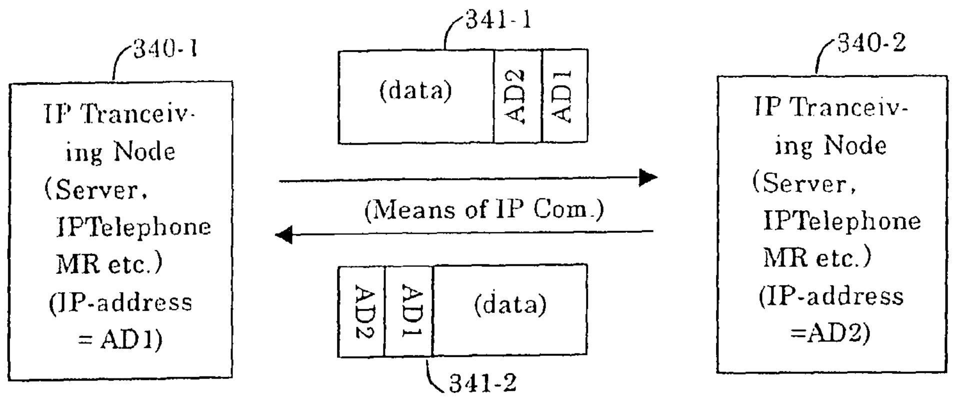
FIG. 15 is a diagram for explaining operation of the integrated information communication network.
Figure 16:
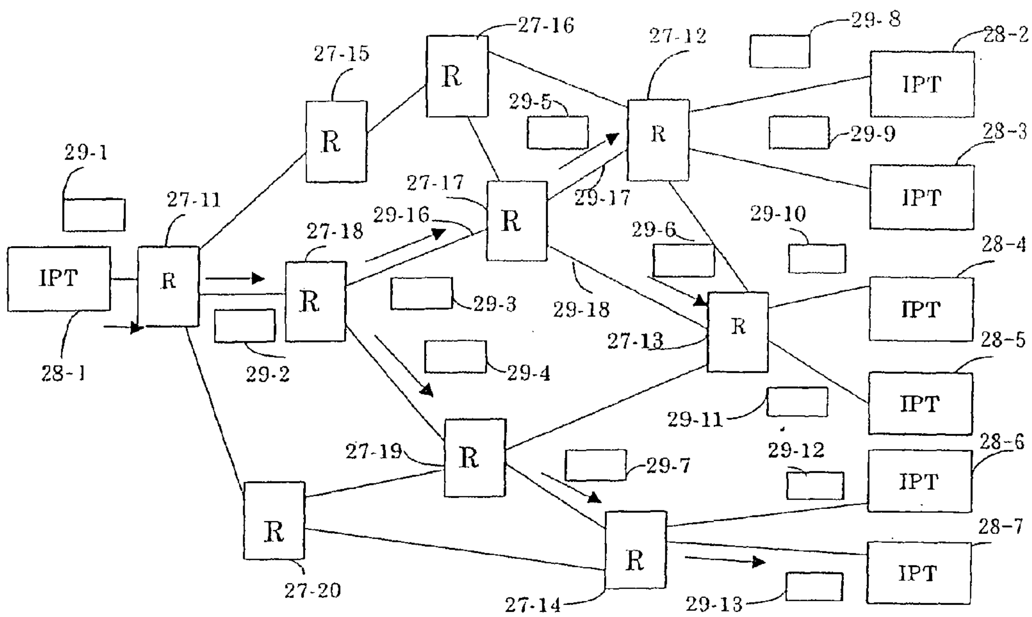
FIG. 16 is a block diagram for showing a structural example of a multicast IP transfer network.
Figure 17:
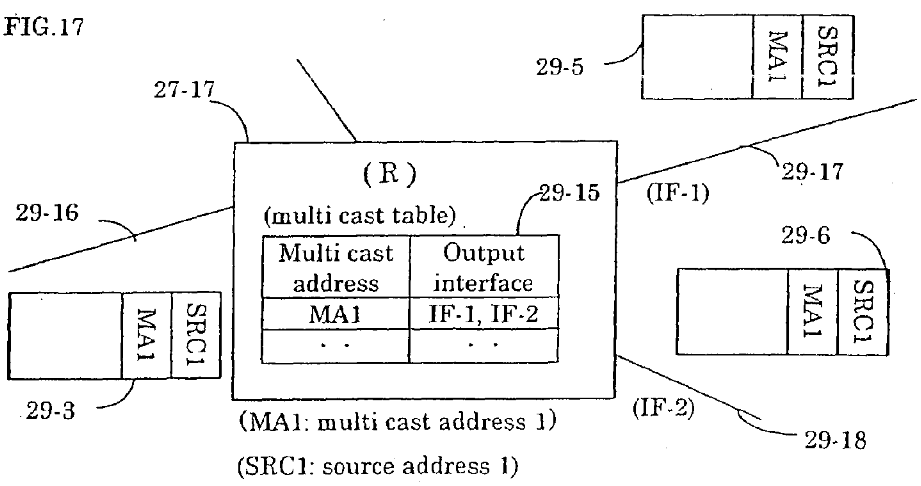
FIG. 17 shows an example of a multicast table used in the multicast IP transfer network.
Figure 18:
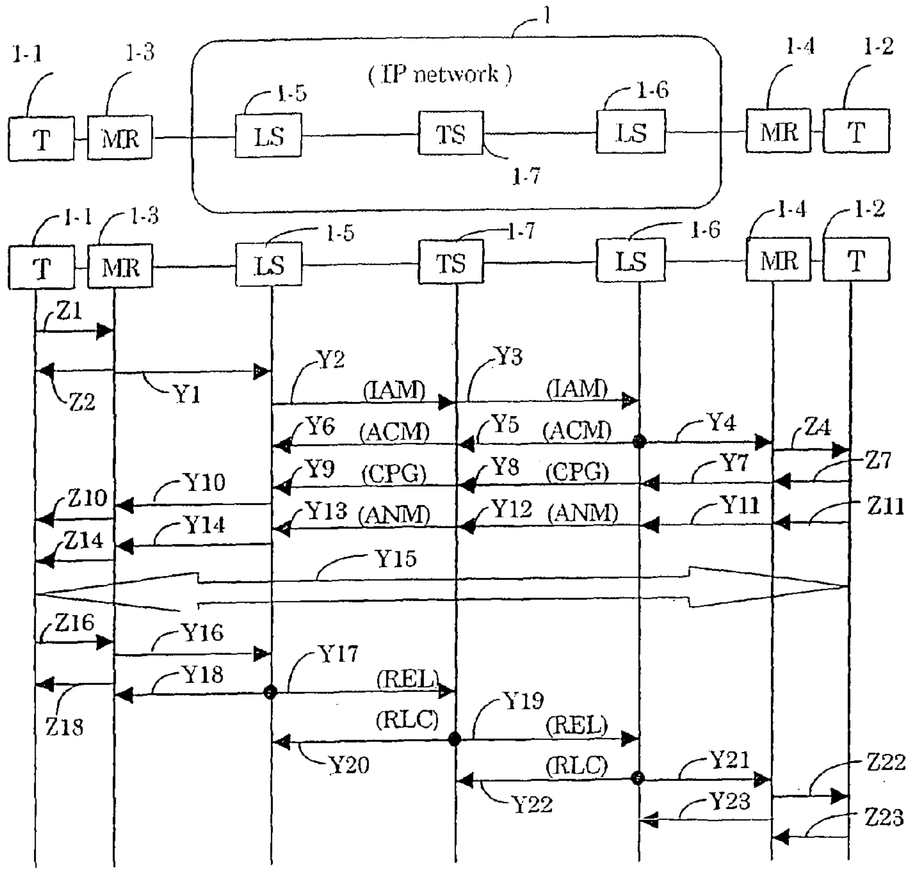
FIG. 18 is a diagram for explaining a terminal-to-terminal communication connection control method of an IP transfer network to which the common line communication signal system is applied.
Figure 19:
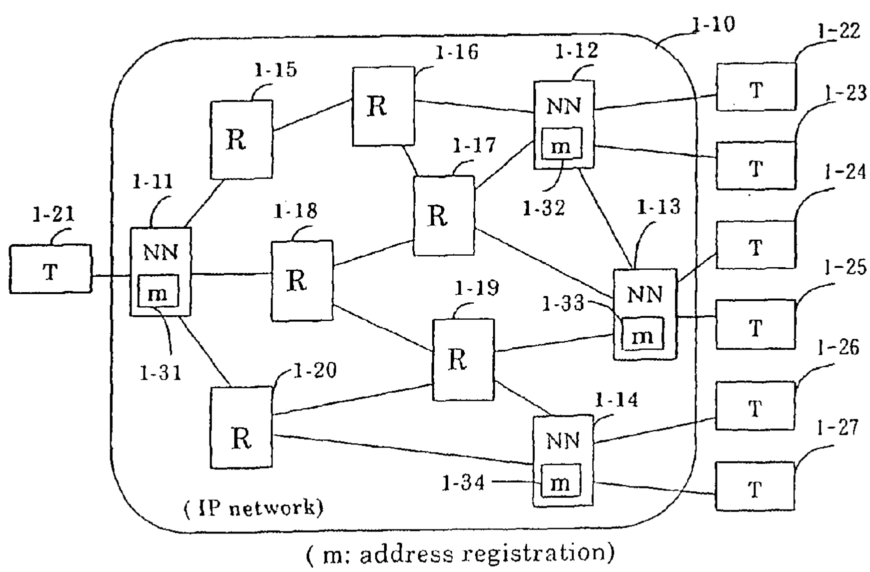
FIG. 19 is a schematic diagram for describing a structure of a management type IP network for registering terminals according to the present invention.

Also, various sorts of severs are installed within the integrated IP communication network 201, and IP addresses are applied to the respective servers. As indicated in FIG. 91, various sorts of servers, the routers, and the node apparatus are connected to each other via IP communication lines, and may exchange data with each other by transmitting/receiving IP packets by using IP communication means owned in the respective units. Reference numerals 209-1 to 209-2 show telephone gateways by which a telephone communication can be carried out, for example, from the analog telephone set 209-4 via a public switched telephone network 209-3 to other telephone sets (which has been explained in other embodiments). It should be noted that telephone administration servers 313-5 and 314-5 are substantially equal to the connection servers 1-5 and 1-6 of FIG. 18. Both the gateways 209-1 and 209-2 are substantially equal to the relay connection server 1-7 of FIG. 18. The functions of these gateways will be described in other embodiment.

Reference numerals 213-1 and 214-1 show PBX for storing analog telephone sets, and reference numerals 213-2 to 213-6 and 214-2 to 214-6 represent analog telephone sets. The telephone sets 213-2 to 213-3 are connected to the PBX 213-1, whereas the telephone sets 214-2 and 214-3 are connected to the PBX 214-1. The telephone sets 213-4 to 213-6 are connected to the media router 212-1, and the telephone sets 214-4 to 214-6 are connected to the media router 212-2.

An IP address "EA01" is applied to the media router 212-1, and an IP address "EA02" is applied to the media router 212-2. A representative telephone number "Tel-No-1" is applied to the telephone sets 213-4 to 213-6, a representative telephone number "Tel-No-2" is applied to the telephone sets 214-4 to 214-6, and extension telephone numbers "2132", "2133", "2142" and "2143" are applied to the telephone sets 213-2, 213-3, 214-2 and 214-3, respectively. In this example, no telephone communication is established by the extension telephone sets 213-2 and 213-3 from the media router 212-1 to a telephone set provided on the side of the IP telephone network 203. Similarly no telephone communication is established by the extension telephone sets 214-2 and 214-3 from the media router 212-2 to a telephone set provided on the side of the IP telephone network 203.

<<Preparation of Telephone Communication>>

A user 227-1 who wishes to use an IP telephone requests an IP telephone acceptance person 228-1 belonging to the communication company "1" to use an IP telephone service (Step P100 of FIG. 92). The IP telephone acceptance person 228-1 acquires from the user 227-1, a user name, a user address, a payment way of a communication fee, and a user telephone number "Tel-No-1", which constitute the propose information of the IP telephone. Also, an external IP address "EA01" applied to the media router 212-1, an identification symbol "L210-1" of the communication line 210-1 used to be connected to the media router 212-1 by the user, and also a network node apparatus identification number "NN-208-1" of the network node apparatus 208-1 to which the communication line 210-1 is connected are notified to a user service server 313-6(Step P101). In this case, the user 227-1 indicates the IP address "EA01" to the IP telephone acceptance person 228-1.

The user sets the IP address "EA01" to the media router 212-1, which is used in correspondence with the user telephone number "Tel-No-1". Next, the user service server 313-6 applies to the user 227-1, a user identification symbol "UID-1" used to identify the accepted telephone user, and determines an internal IP address "IA01" for the user 227-1 while the symbol "UID-1" is made in correspondence with the external IP address "EA01". Then, the user service server 313-6 stores information into a database of the user service server (Step P102). This information is related to the user name, the user address, the payment way of the communication fee, the user telephone number "Tel-No-1", and the external IP address "EA01". Since the telephone set 213-5 uses the external IP address "EA01" corresponding to the telephone number "Tel-No-1", such a representation that the external address of the telephone set 213-5 is equal to "EA01" in the telephone communication by using the IP telephone network 203.

Next, the user service server 313-6 notifies at least the above-described user telephone number "Tel-No-1", external IP address "EA01", internal IP address "IA01" of the IP telephone request person to the telephone administration server 313-5 by employing the IP communication means (Step P103).

The telephone administration server 313-5 notifies one set of corresponding information, namely, the user telephone number "Tel-No-1", the external IP address "EA01" and the internal IP address "IA01", to the telephone domain name server 313-2 (Step P105). The telephone domain name server 313-2 saves the user telephone number "Tel-NO-1", "the external IP address" and "internal IP address" in such a format as the resource records which are determined based on the operation rule of the domain name server defined as RFC 1996 (Step P106).

Furthermore, the telephone administration server 313-5 notifies four addresses "EA01, EA81, IA01, IA81" to a table administration server 313-3 (Step P107). It should be understood that the telephone administration server 313-5 continuously saves both an external IP address "EA81" and an internal IP address "IA81" of a telephone proxy server 313-1.

Figure 93:
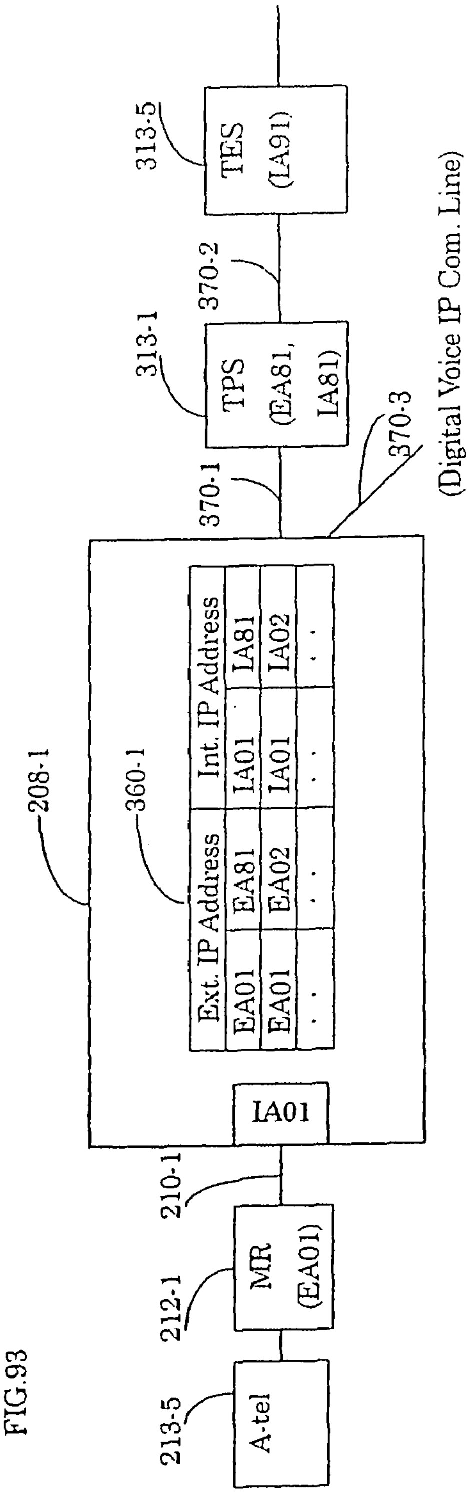
FIG. 93 is a flow chart for explaining operations of the sixth embodiment of the present invention.

When the table administration server 313-3 notifies the above-explained four addresses "EA01, EA81, IA01, IA81" with respect to the network node apparatus 208-1 (Step P108), the network node apparatus 208-1 holds four addresses "EA01, EA81, IA01, IA81" (Step P109). These four addresses are indicated on a first record of the address administration table 360-1 provided in the network node apparatus 208-1 as indicated in FIG. 93. In this case, the address "IA01" corresponds to an IP address which is applied to a joint point(logic terminal) between the communication line 210-1 and the network node apparatus 208-1. This IP address "IA01" will be referred to as an "internal IP address" hereinafter, which is applied to the logic terminal of the communication line 210-1. At this time, a record indicated in a second row of the address administration table 360-1 is empty.

It should be understood that the record indicated in the first row of the address administration table 360-1 is called as an "IP communication record" of the address administration table of the network node apparatus, and then the IP communication record is defined based upon the external IP address "BA01" of the transmission source, the external IP address "EA81" of the destination, the internal IP address "IA01" of the transmission source, and also the internal IP address "IA81" of the destination. In particular, this IP communication record is referred to as the "IP communication record" of an address administration table of a network node apparatus which defines an IP communication path established between the representative telephone proxy server 313-1 and the media router 212-1.

Similarly, a user 227-2 who wishes to use an IP telephone requests an IP telephone acceptance person 228-2 belonging to the communication company "2" to use an IP telephone service (Step P110 of FIG. 92). The IP telephone acceptance person 228-2 acquires from the user 227-2, a user name, a user address, a payment way of a communication fee and a user telephone number "Tel-No-2", which constitute the propose information of the IP telephone. Also, the external IP address "EA02" applied to the media router 212-2, an identification symbol "L210-5" of the communication line 210-5 used to be connected to the media router 212-2 by the user, and also a network node apparatus identification number "NN-209-2" of the network node apparatus 209-2 to which the communication line 210-5 is connected are notified to a user service server 314-6 (Step P111). In this case, the user 227-2 indicates the acquired IP address "EA02" to the IP telephone acceptance person 228-2.

The user sets the IP address "EA02" to the media router 212-2, which is used in correspondence with the user telephone number "Tel-No-2". Next, the user service server 314-6 applies to the user 227-2, a user identification symbol "UID-2" used to identify the accepted telephone user, and determines an internal IP address "IA02" for the user 227-2 in correspondence with the external IP address "EA02". Then, the user service server 314-6 stores information into a database of the user service server (Step P112). The information is related to the user name, the user address, the payment way of the communication fee, the user telephone number "Tel-No-2" and the external IP address "EA02". Since the telephone set 214-4 uses the external IP address "EA02" corresponding to the telephone number "Tel-No-2", such a representation is used that the external IP address of the telephone set 214-4 is equal to "EA02" in the telephone communication by using the IP telephone network 203.

Next, the user service server 314-6 notifies at least the above-described user telephone number "Tel-No-2", external IP address "EA02", internal IP address "IA02" of the IP telephone request person to the telephone administration server 314-5 by employing the IP communication means (Step P113). The telephone administration server 314-5 notifies one set of corresponding information, namely, the user telephone number "Tel-No-2", the external IP address "EA02" and the internal IP address "IA02", to the telephone domain name server 314-2 (Step P115). The telephone domain name server 314-2 saves one set of such information which is made in correspondence with the user telephone number "Tel-No-2", the external IP address "EA02" and internal IP address "IA02" in such as format as the resource records (Step P116). Furthermore, the telephone administration server 314-5 notifies four addresses "EA02, EA82, IA02, IA82" to a table administration server 314-3 (Step P117).

It should also be noted that the telephone administration server 314-5 continuously saves the external IP address "EA82" and the internal IP address "IA82" of the a telephone proxy server 314-1. Also, both the telephone domain name servers 313-2 and 314-2 owns a redialing function similar to that of a domain name server used in the Internet. Thus, the telephone domain name servers 313-2 and 314-2 may exchange there own information to each other, if necessary (Step P120).

Figure 94:
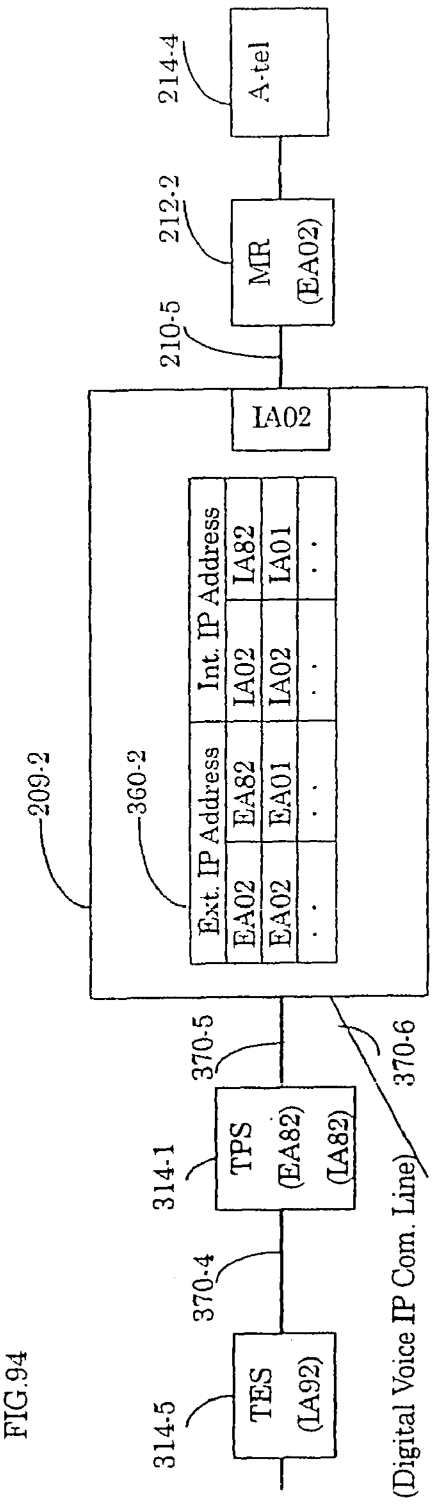
FIG. 94 is a flow chart for explaining operations of the sixth embodiment of the present invention.

When the table administration server 314-3 notifies the above-explained four addresses "EA02, EA82, IA02, IA82" with respect to the network node apparatus 209-2 (Step P118), the network node apparatus 209-2 holds four addresses "EA02, EA82, IA02, IA82" (Step P119). These four addresses are indicated on a first record of the address administration table 360-2 provided in the network node apparatus 209-2 as indicated in FIG. 94. In this case, the address "IA02" corresponds to an IP address which is applied to a joint point(logic terminal) between the communication line 210-5 and the network node apparatus 209-2. At this time, a record indicated in a second row of the address administration table 360-2 is empty. In particular, this IP communication record is referred as an "IP communication record" of an address administration table of a network node apparatus which defines an IP communication path established between the telephone proxy server 314-1 and the media router 212-2.

<<Communication Path Establishing Phase>>

Referring now to FIG. 91, and FIG. 93 to FIG. 95, a description will be made of a method for controlling a terminal-to-terminal communication connection in which a telephone call is made from the telephone set 213-5 to the telephone set 214-4.

The media router 212-1 holds both the telephone number of "Tel-No-1" and the external IP address "EA01", and the media router 212-2 holds both the telephone number of "Tel-No-2" and the external IP address "EA02". When the telephone set 213-5 establishes a telephone communication with another telephone set, the telephone number of "Tel-No-1" applied to the media router 212-1 is used, whereas when the telephone set 214-4 establishes a telephone communication with another telephone set, the telephone number of "Tel-No-2" applied to the media router 212-2 is employed.

<<Connection Phase>>

In the case that the user picks up the handset of the telephone 213-5 (off hook), dials the telephone number of "Tel-No-2" of the telephone set 214-4 functioning as the communication counter party, and then transmits the inputted telephone number to the media router 212-1 (Step P200), the media router 212-2 responds to this telephone number (Step P201).

Next, the media router 212-1 produces such an IP packet (refer to 379 of FIG. 96) which contains at least the transmission source telephone number "Tel-No-1", the destination telephone number "Tel-No-2", and the user identification information(User-Info.), and then transmits the IP packet to the network node apparatus 208-1, so that the media router 212-1 commences a procedure of telephone call setting operation (Step P204). It should be noted that the user identification information(User-Info.) may be delivered to the media router 212-2 at a Step P219 (will be explained later). This user identification information is constituted by a telephone call identifier "C-id" used to manage, for example, a telephone call on the user side; an identification symbol for a voice (speech) compression system of an IP telephone; and an identification symbol of a voice code conversion codes. A payload portion of an IP packet 379 shown in FIG. 96 may be used as an UDP segment. For instance, both a transmission source port number and a destination port number may be employed as "5060" in order that a program for controlling the telephone communication connection provided inside the media router 212-1 and 212-2 is discriminated from other programs.

Figure 97:
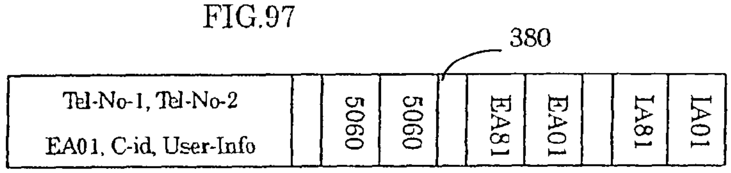
FIG. 97 is a flow chart for explaining operations of the sixth embodiment of the present invention.
Figure 98:
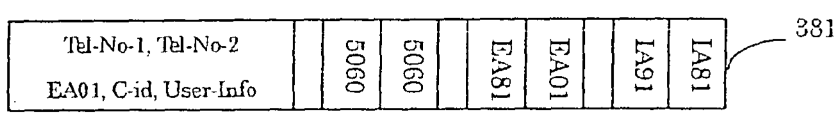
FIG. 98 is a flow chart for explaining operations of the sixth embodiment of the present invention.

Upon receipt of the IP packet, the network node apparatus 208-1 retrieves the address administration table 360-1 shown in FIG. 93 so as to seek such a record that the transmission source IP address is "EA01" as the external IP address and the destination IP address of "EA81" is contained. In this example, when the network node apparatus 208-1 finds out the record indicated in the first row of the address administration table 360-1 from the top row, namely, the record being equal to "EA01, EA81, IA01, IA81", the network node apparatus 208-1 applies the capsulating technique of the IP packet to form an IP packet 380 equal to an internal IP packet shown in FIG. 97 by using the IP addresses "IA01" and "IA81", which are described in third and fourth addresses inside the record. Thereafter, the network node apparatus 208-1 transmits such a telephone proxy server 313-1 whose IP address is equal to "IA81" (Step P205). In this case, a payload portion of the IP packet 380 corresponds to "379" of the IP packet.

When the telephone proxy server 313-1 receives the IP packet 380, the telephone proxy server 313-1 produces an IP packet 381 whose payload portion is equal to the IP packet 379, and sends the produced IP packet 381 to the telephone administration server 313-5 whose IP address is equal to "IA91" (Step P206). The telephone administration server 313-5 determines a communication line identifier (CIC-1-2) as, for instance, CIC-1-2="Tel-1-No-1"+"Tel-No-2", depending upon a combination between the transmission source telephone number "Tel-No-1" and the destination telephone number "Tel-No-2", and then saves the communication line identifier (CIC-1-2) into the telephone administration server 313-5. In this case, symbol "+" implies that the telephone number is arranged(namely, coupling of data).

Figure 99:
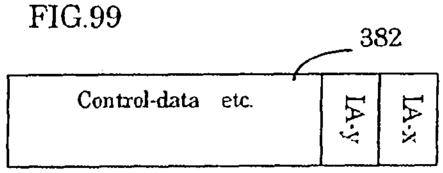
FIG. 99 is a flow chart for explaining operations of the sixth embodiment of the present invention.

The telephone administration server 313-5 notifies both the transmission source telephone number "Tel-No-1" and the destination telephone number "Tel-No-2", which are received at the previous Step P206, to the telephone domain name server 313-2 (Step P207). The telephone administration server 313-5 receives from the telephone domain name server 313-2, the external IP address of "EA01" corresponding to the telephone number "Tel-No-1" in a 1-to-1 correspondence relationship; the internal IP address of "IA01"; and both the IP address "EA02" and the internal IP address "IA02", which correspond to the telephone number "Tel-No-2" in a 1-to-1 correspondence relationship (Step P208). In this case, the telephone domain name server 313-2 inquires IP address information of the telephone number "Tel-No-2" to the telephone domain name server 314-2 by employing the redialing function so as to acquire the IP address information. The telephone administration server 313-5 checks as to whether or not the IP address "EA01" received from the telephone domain name server 313-2 is made coincident with the transmission source IP address "EA01" which has been acquired from the inside of the IP-packet 381 at the Step P206. When the IP address is not made coincident with the transmission source IP address, the telephone administration server 313-5 stops the telephone connection procedure. To the contrary, when the IP address is made coincident with the transmission source IP address, the telephone administration server 313-5 additionally saves the IP address "EA01" of the transmission source telephone set, the internal IP address "IA01" thereof, the IP address "EA02" of the destination telephone set, and also the internal IP address "IA02" thereof into the information of the held communication line identifier (CIC-1-2). It should be noted that as to the IP packet of the communication among the servers provided inside the integrated IP communication network, an IP packet 382 having a format shown in FIG. 99 is transmitted/received by employing the internal IP address.

Figure 96:
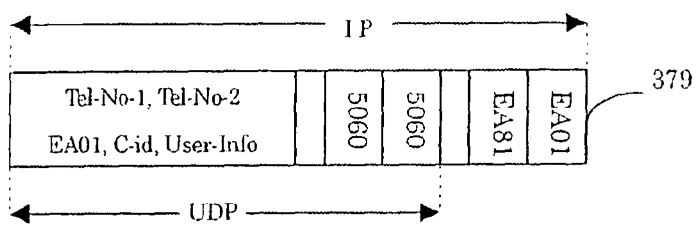
FIG. 96 is a flow chart for explaining operations of the sixth embodiment of the present invention.
Figure 101:
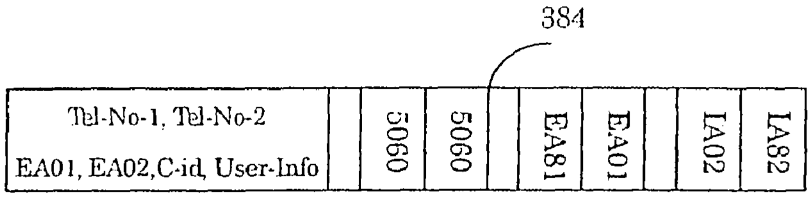
FIG. 101 is a flow chart for explaining operations of the sixth embodiment of the present invention.

The network node apparatus is not equal to the server. The IP packet transmitted/received between the network node apparatus and the telephone proxy server corresponds to such an IP packet having a capsulated format shown in FIG. 97 and FIG. 101, whereas the IP packet transmitted/received between the network node apparatus and the media router corresponds to an IP packet before being capsulated, to which the external IP address as shown in FIG. 96 has been applied.

Next, the telephone administration server 313-5 transmits such an IP packet (IAM packet) via a representative server 313-7 of the communication company "1" (Step P214) and via a representative server 314-7 of the communication company "2" (Step P215) to the telephone administration server 314-5 of the communication company "2" (Step P216). The IP packet contains the IP address "EA01" of the transmission source telephone set, the internal IP address "IA01" thereof, the transmission source telephone number "Tel-No-1", the IP address "EA02" of the destination telephone set, the internal IP address "IA02" thereof, the destination telephone number "Tel-No-2", the user identification number(User Info.), and the communication line identifier (CIC-1-2). Then, the telephone administration server 314-5 receives the four IP addresses "EA01, IA01, EA02, IA02"; the two telephone numbers "Tel-No-1" and "Tel-No-2"; the communication line identifier "CIC-1-2"; and the user identification information(User-Info.), and saves all of the received items other than the user identification information (User-Info.) into the internal circuit thereof.

Figure 100:
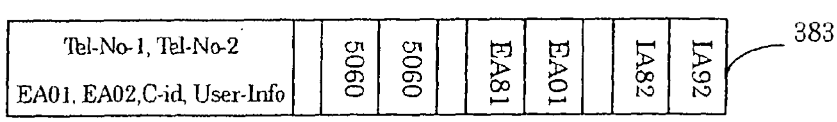
FIG. 100 is a flow chart for explaining operations of the sixth embodiment of the present invention.
Figure 102:
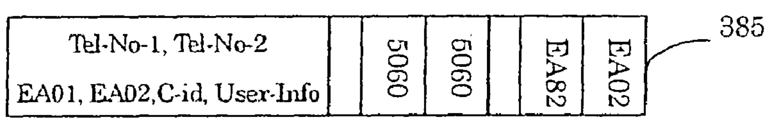
FIG. 102 is a flow chart for explaining operations of the sixth embodiment of the present invention.
Figure 103:
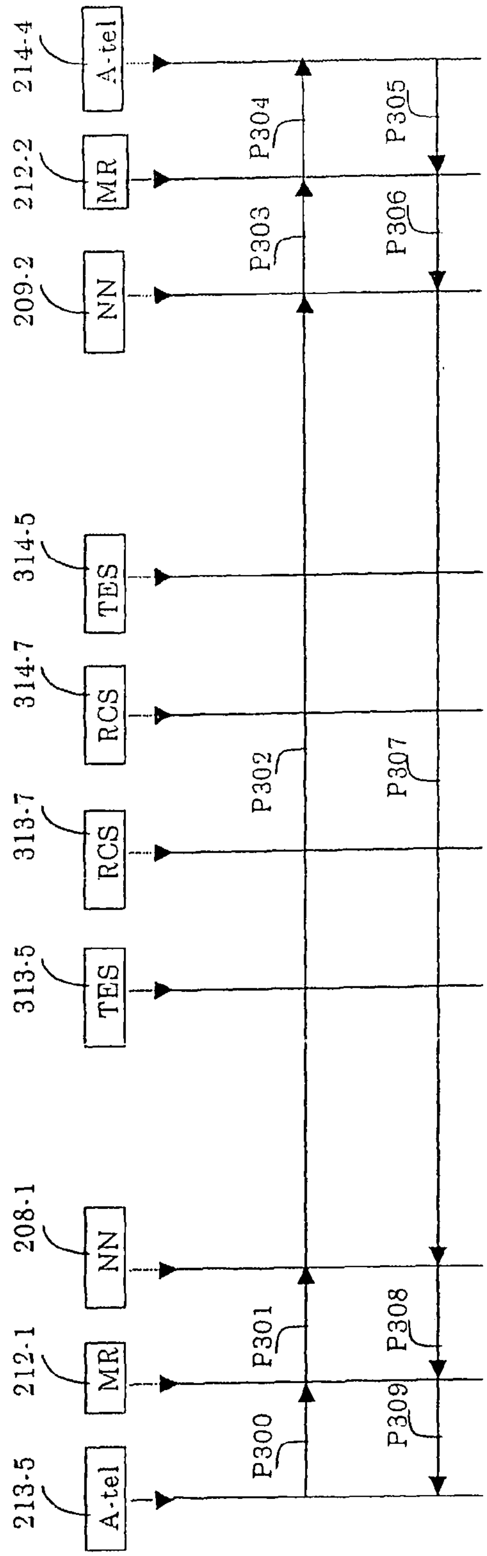
FIG. 103 is a flow chart for explaining operations of the sixth embodiment of the present invention.
Figure 104:
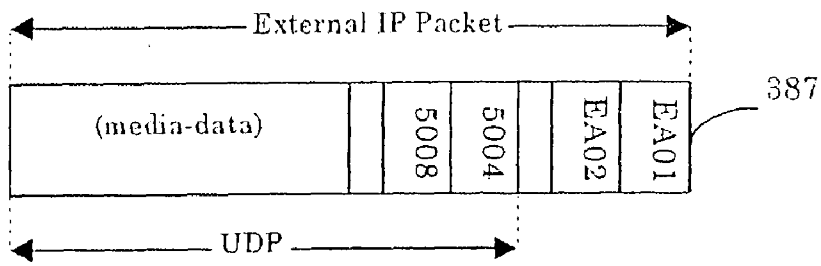
FIG. 104 is a flow chart for explaining operations of the sixth embodiment of the present invention.
Figure 105:
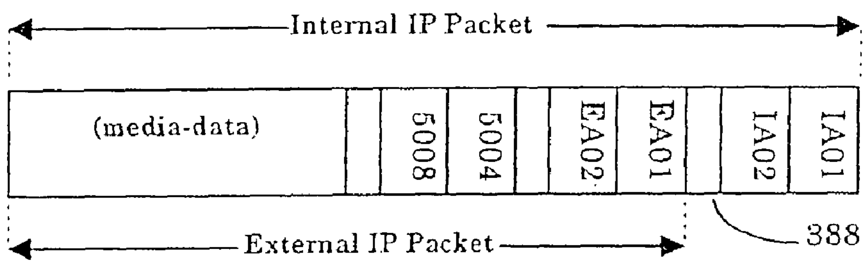
FIG. 105 is a flow chart for explaining operations of the sixth embodiment of the present invention.
Figure 106:
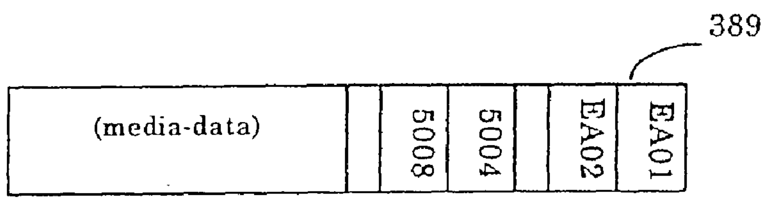
FIG. 106 is a flow chart for explaining operations of the sixth embodiment of the present invention.

Furthermore, the telephone administration server 314-5 whose internal address is "IA92" notifies the IP packet 383 of FIG. 100 to the telephone proxy server 314-1 whose internal IP address is equal to "IA82" (Step P217). In this case, the IP packet 383 contains the IP address "EA01" of the transmission source telephone set, the IP address "EA02" of the destination telephone set, the transmission source telephone number "Tel-No-1", the destination telephone number "Tel-No-2", and the user additional information(User-Info.). Then, the telephone proxy server 314-1 forms an IP packet 384 shown in FIG. 101 and sends the IP packet 384 to the network node apparatus 209-2 (Step P218). The network node apparatus 209-2 performs the inverse-capsulation of such an IP packet by removing the header of the IP packet 384 to form an IP packet 385 shown in FIG. 102, and then transmits the IP packet 385 to the media router 212-2 (Step P219). The media router 212-2 acquires the IP address "EA01" of the transmission source telephone set, the IP address "EA02" of the destination telephone set, the transmission source telephone number "Tel-No-1", the destination telephone number "Tel-No-2" and the user additional information (User-Info.).

Next, the media router 212-2 returns the reception of the above-explained information for notifying the telephone reception in connection with two sets of the telephone numbers "Tel-No-1" and "Tel-No-2" to the telephone administration server 314-5 (Steps P221, P222, P223). This telephone administration server 314-5 restores the communication line identifier (CIC-1-2) from the two telephone numbers "Tel-No-1" and "Tel-No-2", and then transmits a reception confirmation(acknowledgment) IP packet(ACM packet) of above-explained information containing the communication line identifier (CIC-1-2) via the telephone administration server 313-5 to the media router 212-1 (Steps P224 to P229).

Next, the media router 212-2 notifies the telephone call (call reception) to the telephone set 214-4 (Step. P230), and when the telephone set 214-4 accepts the telephone call, the telephone set 214-4 produces telephone calling sound. The media router 212-2 notifies such a fact that the telephone set 214-4 having the called telephone number "Tel-No-2" is being called via the network node apparatus 209-2 (Step P231) and further via the telephone proxy server (Step P232) to the telephone administration server 314-5, while attaching a set of the transmission source telephone number "Tel-No-1" and the destination telephone number "Tel-No-2" (Step P233). The telephone administration server 314-5 of the communication company 2 restores the communication line identifier (CIC-1-2) by employing the set of the transmission source telephone number "Tel-No-1" and the destination telephone number "Tel-No-2" sent from the media router 212-2. Next, the telephone administration server 314-5 forms a reception confirmation IP packet (CPG packet) of the above-explained information containing the communication line identifier (CIC-1-2), and then sends the CPG packet to the telephone administration server 313-5 (Steps P234, P235, P236). The telephone administration server 313-5 receives the CPG packet and reads the communication line identifier (CIC-1-2) from the CPG packet.

Next, while the telephone administration server 313-5 employs the communication line identifier (CIC-1-2), in such a case that the telephone administration server 313-5 reads out both the address and the telephone number which are recorded/saved at the Step P214, and then transmits at least the IP address "EA01" of the media router 212-1 connected to the transmission source telephone set; the IP address "EA02" of the media router 212-2 connected to the destination telephone set; the transmission source telephone number "Tel-No-1"; and the destination telephone number "Tel-No-2" to the telephone proxy server 313-1 (Step P237), these items are notified via the network node apparatus 208-1 (Step P238) to the media router 212-1 (Step P239). The media router 212-1 informs that the destination telephone set 214-4 is being called to the transmission source telephone set 213-5 (Step P240), and the transmission source telephone 213-5 produces the telephone calling sound.

On the other hand, when the user of the telephone set 214-4 hears the telephone calling sound to take up the handset of this telephone set(off hook), the IP telephone set 214-4 notifies the off hook condition to the media router 212-2 (Step P241). Then, the media router 212-2 notifies the off hook notification via the network node apparatus 209-2 (Step P242), and further, via the telephone proxy server (Step P243) to the telephone administration server 314-5 (Step P244). The telephone administration server 314-5 of the communication company 2 restores the communication line identifier (CIC-1-2) from the set of both the transmission source telephone number "Tel-No-1" and the destination telephone number "Tel-No-2", and forms a reception confirmation IP packet (ANM packet) of the above-explained information containing the communication line identifier (CIC-1-2) to transmit the ANM packet to the telephone administration server 313-5 (Steps P245, P246, P247). The telephone administration server 313-5 receives the ANM packet so as to read out the communication line identifier (CIC-1-2) from the ANM packet.

While the telephone administration server 314-5 employs the communication line identifier (CIC-1-2) held at the stage of the Step P245, the telephone administration server 314-5 reads both the IP address and the telephone number which are held/stored at the previous Step P217. Next, the telephone administration server 314-5 notifies both the IP address "EA01" and the internal IP address "IA01" of the transmission source telephone set and the IP address "EA02" and the internal IP address "IA02" of the media router 212-2 connected to the destination telephone set to the table administration server 314-3 (Step P250). The table administration server 314-3 saves thereinto a set of the communication line identifier (CIC-1-2); both the IP address "EA01" and the internal IP address "IA01" of the transmission source telephone set; and both the IP address "EA02" and the internal IP address "IA02" of the destination telephone set, and also stores these IP addresses into the address administration table 360-2 contained in the network node apparatus 209-2 (Step P251). This condition is indicated as a record of a second row of the address administration table 360-2 of FIG. 94.

While using the read communication line identifier (CIC-1-2), the telephone administration server 313-5 reads out both the IP address and the telephone number saved/stored at the Step P214. Next, the telephone administration server 313-5 notifies the communication line identifier (CIC-1-2), both the IP address "EA01" and the internal IP address "IA01" of the transmission-sided media router 212-1; and both the IP address "EA02" and the internal IP address "IA02" of the destination media router 212-2 to the table administration server 313-3 (Step P252). The table administration server 313-3 holds thereinto the communication line identifier (CIC-1-2); both the IP address "EA01" and the internal IP address "IA01" of the transmission source telephone set; and both the IP address "EA02" and the internal IP address "IA02" of the destination telephone set, and further holds these items into the address administration table 360-1 provided in the network node apparatus 208-1 (Step P253). This condition is indicated as the record of the second row of the address administration table 360-1 of FIG. 93.

The record of the second row in the address administration table 360-1 of FIG. 93 corresponds to an "IP communication record of address administration table" which is set into the network node apparatus. The content of the IP communication record is ruled based upon such a definition made of the transmission source external IP address "EA01", the destination external IP address "EA02", the transmission source internal IP address "IA01", and the destination internal IP address "IA02".

The IP communication record of the second row of the address administration table 360-1 contains both the external IP address "EA01" and the external IP address "EA02", and determines such an IP communication path defined between the media router 212-1 to which the external IP address "EA01" is applied, and the media router 212-2 to which the external IP address "EA02" is applied. Also, the IP communication record of the second row of the address administration table 360-2 determines an IP communication path established between the media router 212-1 and the media router 212-2.

It should be noted that the transmission source external IP address "EA01" is determined in a 1-to-1 correspondence relationship with respect to the telephone number "Tel-No-1", and similarly, the destination external IP address "EA02" is determined in a 1-to-1 correspondence relationship with respect to the telephone number "Tel-No-2", and when the transmission source is not discriminated from the destination, the IP communication record of the address administration table of the network node apparatus is merely equal to a record of an address administration table for determining an IP communication path between the telephone number "Tel-No-1" and the telephone number "Tel-No-2".

The above-explained Step P245 corresponds to such a procedure capable of notifying response information for confirming a call setting operation, namely capable of notifying such a possibility that the telephone communication between the telephone set 213-5 and the telephone set 214-4 is commenced. The telephone administration server 314-5 notifies, for instance, the communication line identifier (CIC-1-2); the IP address "EA01" of the transmission source media router 212-1; the IP address "EA02" of the destination media router 212-2; the transmission source telephone number "Tel-No-1"; the destination telephone number "Tel-No-2" to a charging administration server 314-4 on the basic of such a time instant when the telephone communication can be started (Step P254). Then, the charging administration server 314-4 can record/hold thereinto the communication line identifier (CIC-1-2); the transmission source telephone number "Tel-No-1"; the destination telephone number "Tel-No-2"; the IP address "EA01" of the transmission source media router 212-1; and the IP address "EA02" of the destination media router 212-2 (Step P254).

Similarly, the charging administration server 313-4 can record/hold thereinto the transmission source telephone number "Tel-No-1"; the destination telephone number "Tel-No-2"; the IP address "EA01" of the transmission source telephone set; and the IP address "EA02" of the destination telephone set (Step P255). Also, the telephone administration server 313-5 notifies to the telephone set 213-5, such a fact that the user of the destination telephone set 214-4 takes up the handset so as to respond to the telephone call. In other words, the telephone administration server 313-5 notifies the response to the telephone call via the telephone proxy server 313-1 (Step P256), and furthermore via the network node apparatus 208-1 (Step P257) and the media router 212-1 (Step P258) to the telephone set 213-5 (Step P259).

A series of the above-explained steps defined from the Step P200 up to the step P259 will be referred to as a "connection phase of a telephone communication". At the Step P200, the user of the IP telephone set 213-5 takes up the handset. At the Step P259, the completion of the call setting operation is notified to the telephone 213-5. Also, in the above-explained terminal-to-terminal connection control, such a communication line connected from the network node apparatus 208-1 via the communication line 370-1, and also via the router 219-1, the representative servers 313-7 and 314-7, the router 219-2, and the communication line 370-5 to the network node apparatus 209-2 will be referred to as a "connection control line" inside the IP telephone network 203. The connection control line is used in order to transmit/receive an IP packet for controlling the terminal-to-terminal communication connection.

<<Communication Phase>>

Referring now to FIG. 103 to FIG. 106, a communication phase will be described. Voice entered into the telephone set 213-5 is transferred to a media router (Step P300), and the media router digitalizes the voice to form an IP packet 387, and transmits the IP packet 387 to the network node apparatus 208-1 (Step P301). The IP packet 387 is capsulated and then is converted into an internal IP packet 388. This internal packet 388 is reached via a communication line 370-3; routers 219-5, 219-7, 221-1, 219-10 and 219-9; a communication line 370-6 to a network node apparatus 209-2 (Step P302). Then, the IP packet 387 is inverse-capsulated by removing the IP header to be converted into an IP packet 389. This IP packet 389 is delivered via a media router 212-2 (Step P303) to a telephone set 214-4 (Step P304). Voice of a user of the telephone set 214-4 is transferred along a direction opposite to the above-explained direction. In other words, the voice of the user of the telephone set 214-4 is reached via the media router 212-2 (Step P305), the network node apparatus 209-2 (Step P306), and the routers 219-9, 219-10, 221-1, 219-7, 219-5 to the network node apparatus 208-1 (Step P307), and then is delivered via the media router 212-1 (Step P308) to a telephone set 213-5 (Step P309).

In the above-explained communication phase, while payload portions of the IP packets 387 and 389 are used as "UDP segments", both a transmission source UDP port number and a destination UDP port number are changed into, for example, "5004", "5006", "5010", "5012", "5016" etc., so that a telephone communication for transferring other voice can be established. An IP packet 388 containing digitalized voice is transferred through a communication line which connects from the network node apparatus 208-1 via the communication line 370-3; the routers 219-5, 219-7, 221-1, 219-10, 219-9; and the communication line 370-6 to the network node apparatus 209-2. As a result, the IP communication line is called as a "voice communication line" employed in the IP telephone network 203. The voice communication line may be discriminated from the above-described "connection control line" of the IP telephone network 203 in the connection phase.

In the communication phase, a record indicated on a second row of an address administration table 360-1 shown in FIG. 93 is carried out by employing a record of an address administration table for determining the IP communication path between the telephone number "Tel-No-1" and the telephone number "Tel-No-2", namely the IP communication record equal to the transmission source external IP address "EA01"; the destination external IP address "EA02"; the transmission source internal IP address "IA01"; and the destination internal IP address "IA02".

<<Release Phase>>

Figure 107:
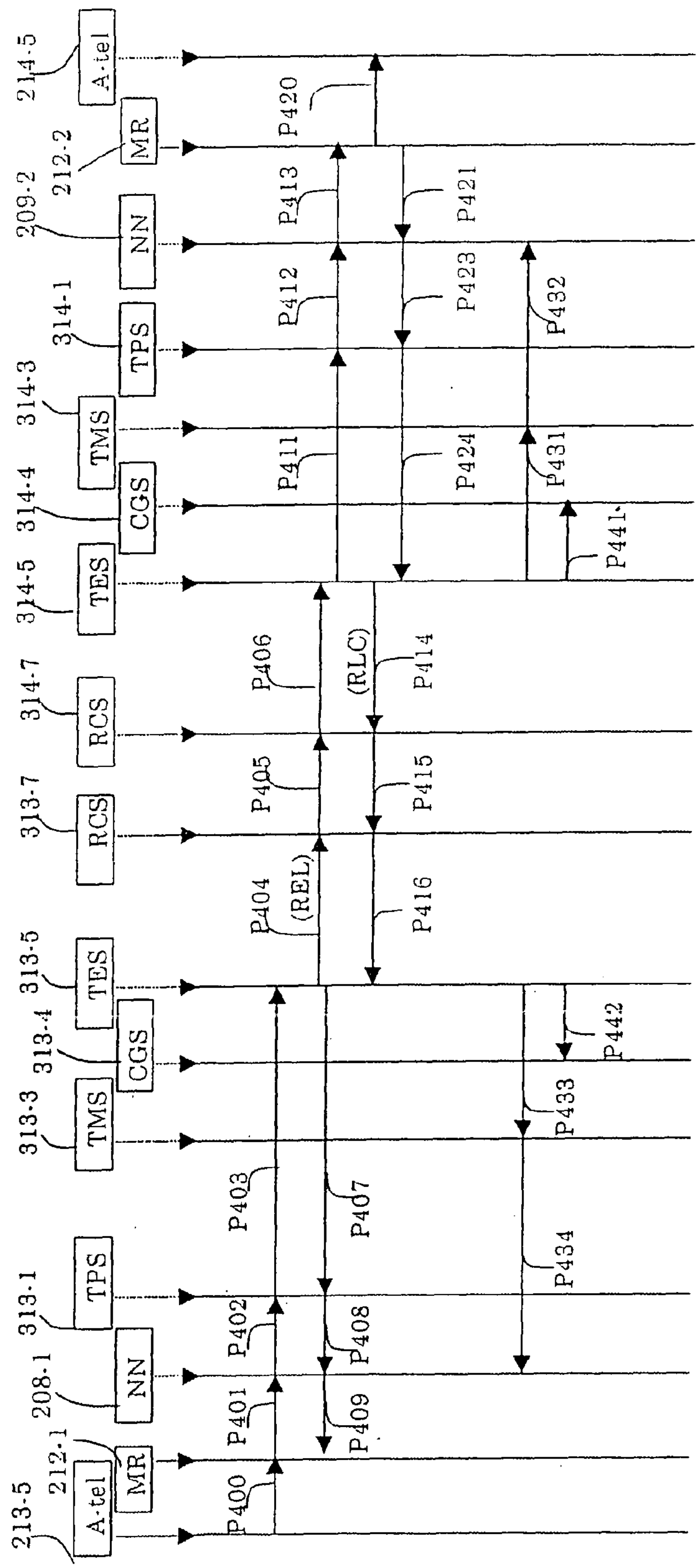
FIG. 107 is a flow chart for explaining a sixth embodiment (release phase) of the present invention.

Referring now to FIG. 107, a release phase is explained. In such a case that the user of the telephone set 213-5 puts on the handset thereof in order to accomplish the telephone communication and then notifies the end of the telephone communication to the media router 212-1 (Step P400), the media router 212-1 produces such an IP packet which contains at least an indication of a request for releasing a telephone communication, the transmission source telephone number "Tel-No-1", and the destination telephone number "Tel-No-2". When the media router 212-1 sends the produced IP packet to a network node apparatus 208-1 (Step P401), this network node apparatus 208-1 produces such an IP packet made by that the received IP packet is capsulated by employing a record of a first row of the address administration table 360-1 shown in FIG. 93, and then transmits the produced IP packet to the telephone proxy server 313-1 (Step P402). Next, the pilot telephone administration server 313-1 produces such an IP packet containing the indication of the telephone release request, the transmission source telephone number "Tel-No-1", and the destination telephone number "Tel-No-2", which have been produced by the media router in the beginning and transmits the produced IP packet to the telephone administration server (Step P403). The above-explained formats of the IP packets and the setting method of the IP addresses used in the above-explained Steps P401, P402, P403 are identical to those of the Steps P204, P205, P206 in the telephone communication connection phase.

The telephone administration server 313-5 restores the communication line identifier (CIC-1-2) from both the telephone numbers "Tel-No-1" and "Tel-No-2" so as to produce an IP packet(REL packet) containing both the indicative of requesting the release of the telephone communication and the communication line identifier (CIC-1-2), and then sends the IP packet to the representative server 313-7 of the communication company "1" (Step P404). The IP packet is reached via the representative server 314-7 of the communication company 2 (Step P405) to the telephone administration server 314-5 under management of the communication company "2" (Step P406).

Next, the telephone administration server 313-5 returns such a release completion IP packet via the telephone proxy server 313-1 and the network node apparatus 208-1 to the media router 212-1 (Steps P407, P408, P409). This release completion IP packet reports that the release request defined at the Steps P400 to P403 is carried out. Also, the telephone administration server 313-5 transmits an IP packet containing the communication line identifier (CIC-1-2) to the table administration server 313-3 (Step P433). Since the table administration server 313-3 holds the address corresponding to the communication line identifier (CIC-1-2) after the process operation of the Step P252 has been carried out, the table administration server 313-3 confirms to receive an instruction for deleting the four IP addresses "EA01, EA02, IA01, IA02", and then deletes the record indicated on the second row of the address administration table 360-1 employed in the network node apparatus 208-1 shown in FIG. 93. In other words, the table administration server 313-3 deletes the transmission source external IP address "EA01"; the destination external IP address "EA02"; the transmission source internal IP address "IA01"; the destination internal IP address "IA02"; and the IP communication record (Step P434). That is to say, the table administration server 313-3 deletes the record of the address administration table which determines the IP communication path between the telephone number "Tel-No-1" and the telephone number "Tel-No-2".

When the telephone administration server 314-5 receives the IP packet containing both the communication line identifier (CIC-1-2) and the indication of the release request at the Step P406, the telephone administration server 314-5 forms a release requesting IP packet and sends the IP packet to the telephone proxy server 314-1. The IP packet for implying the instruction of the release request is reached via the network node apparatus 209-2 to the media router 212-2 (Steps P411, P412, P413). Also, since the telephone administration server 314-5 reports that the process operation of the Step P411 is accomplished, the telephone administration server 314-5 produces an IP packet (RLC packet) containing the communication line identifier (CIC-1-2), and then sends the RLC packet to the representative server 314-7 of the communication company “2” (Step P414). The RLC packet is reached via the representative server 313-7 of the communication company 1 (Step P415) to the telephone administration server 313-5 under administration of the communication company “1” (Step P416). The telephone administration server 313-5 which receives the release completion IP packet notifies the end of the telephone communication to the charging administration server 313-4 (Step P442), this charging administration server 313-4 knows such a fact that the telephone communication is ended, which is identified by the communication line number (CIC-1-2), and then records the result inside the server.

Next, the telephone administration server 314-5 transmits the IP packet containing the communication line identifier (CIC-1-2) to the table administration server 314-3 (Step P431), and this table administration server 314-3 deletes a set of 4 addresses defined by “EA02, EA01, IA02, IA01” corresponding to the content of the record on the second row of the address administration table 360-2 provided in the network node apparatus 209-2 shown in FIG. 94 (Step P432). When the media router 212-2 knows the release request of the telephone communication at the Step P413, the media router 212-2 instructs the telephone set 214-5 to cutoff the telephone communication (Step P420), and subsequently returns the release completion IP packet to the network node apparatus 209-2, the telephone proxy server 314-1, and the telephone administration server 314-5 (Steps P421, P423, P424). The IP packet reports that the release request is carried out at the Step P413. When the telephone administration server 314-5 notifies the end of the telephone communication of the call number to the charging administration server 314-4 (Step P441), this charging administration server 314-4 knows such a fact that the telephone communication is ended, which is identified by the communication line number (CIC-1-2), and then records the result inside the server.

<<Items Related to Telephone Communication Connection Control>>

The following case is conceivable. That is, a telephone user keeps a telephone communication for a long time, and does not accomplish this telephone communication. Namely, a telephone ending Step P400 shown in FIG. 107 is not executed. In this case, such a risk may be expected that a telephone communication fee is increased to an infinite amount. To avoid such a risk, for example, the telephone administration server 313-5 may inquire a telephone communication fee to the charging administration server 313-4 every time a long time period(e.g., 24 hours) has passed. When the telephone administration server 313-5 detects the long telephone communication, the telephone administration server 313-5 may separately carry out the process operations defined at the Steps P404, P407, P433, P442 except for the process operations defined from the Steps P400 to P403 of FIG. 107.

<<Collecting Method of Other Communication Fees>>

As to a communication fee, for instance, while a charging information collection server for the communication company “1” is installed inside the integrated IP communication network 201, charging information collected by the charging administration server 313-4 is acquired to be notified to the user service server 313-6, and then the telephone fee may be charged to the telephone user from the charging server. Similarly, a charging information collection server may be installed in the communication company “2”. The above-explained collected charging information may be exchanged between the communication company “1” and the communication company “2” by employing the IP communication means via the representative servers 313-7 and 314-7 of the communication companies.

<<In Case of Single Communication Company>>

Figure 95:
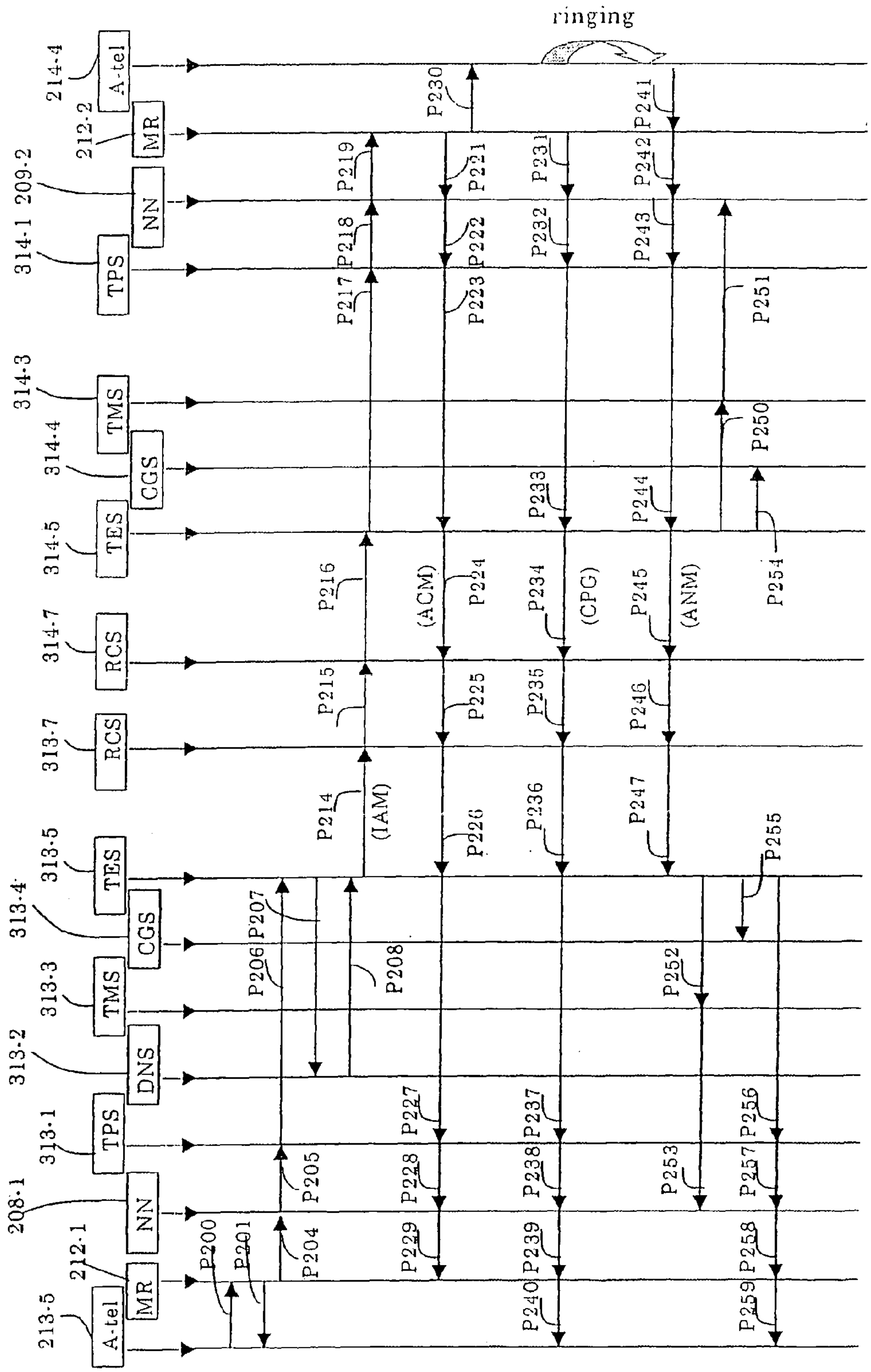
FIG. 95 is a flow chart for explaining operations of the sixth embodiment of the present invention.
Figure 108:
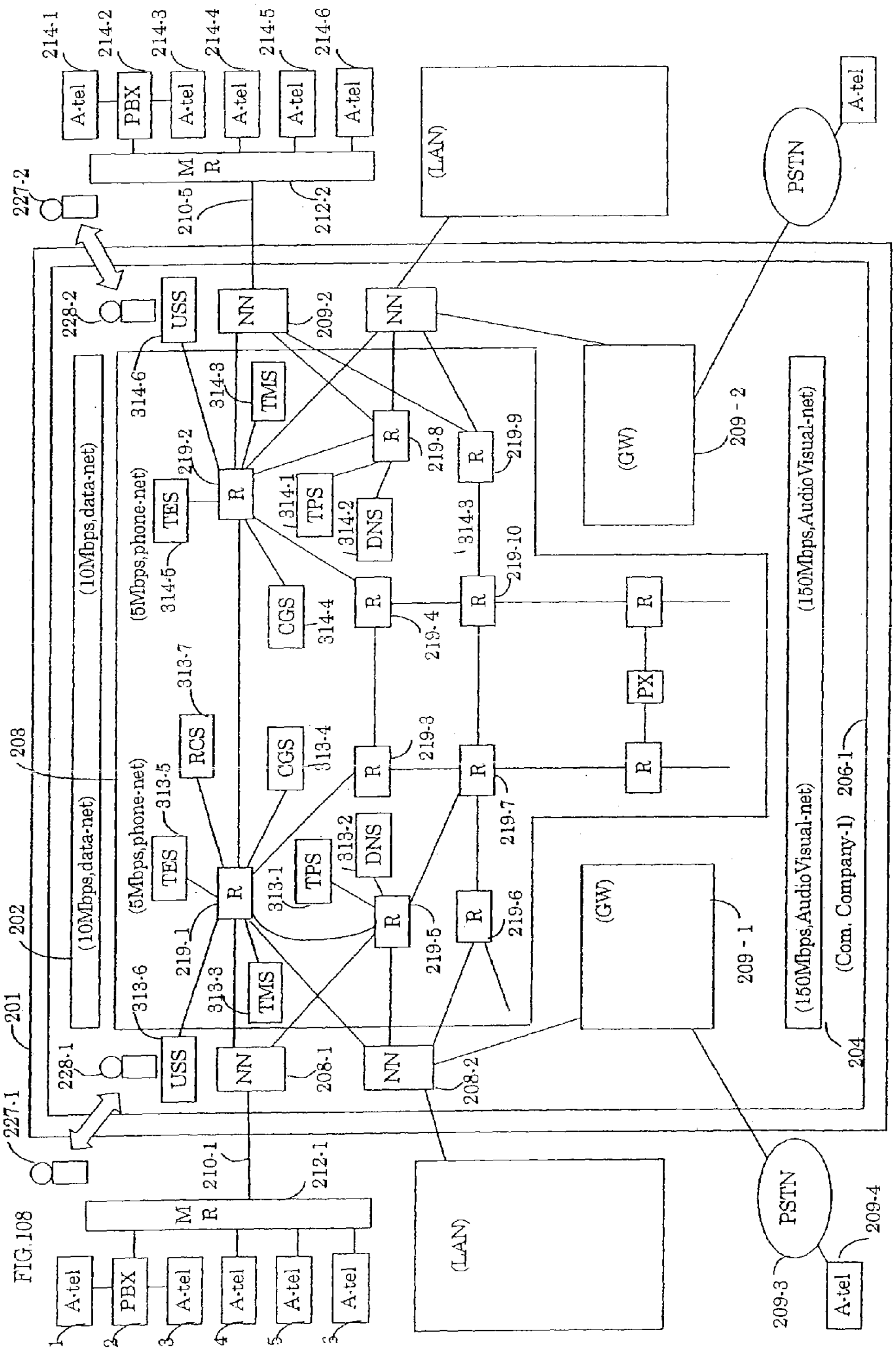
FIG. 108 is a diagram for explaining a sixth embodiment (one communication company) of the present invention.

Even in such a case that the operation/management range 206-2 of the communication company 2 shown in FIG. 91 is not present, and the IP telephone network 203 constitutes the operation/management range of the communication company “1”, the operation of the above-described telephone connection phase is available. As a result, as represented in FIG. 108, the operation/management range 206-2 of the communication company “2” is changed into the operation/management range of the communication company “1”, the representative server 314-7 of the communication company 2 is avoidable, and the IP communication line is employed so as to connect the router 219-1 to the router 219-2 with each other. As a consequence, in the connection phase of the telephone communication, the Steps P214 to P216 shown in FIG. 95 become a Step P214X shown in FIG. 109; the Steps P224 to P226 shown in FIG. 95 become another Step P224X indicated in FIG. 109; the Steps P234 to P236 shown in FIG. 95 become another Step P234X indicated in FIG. 109; and the Steps P245 to P247 shown in FIG. 95 become a further Step P245X indicated in FIG. 109; and also other Steps of FIG. 95 are identical to those of FIG. 109.

Figure 109:
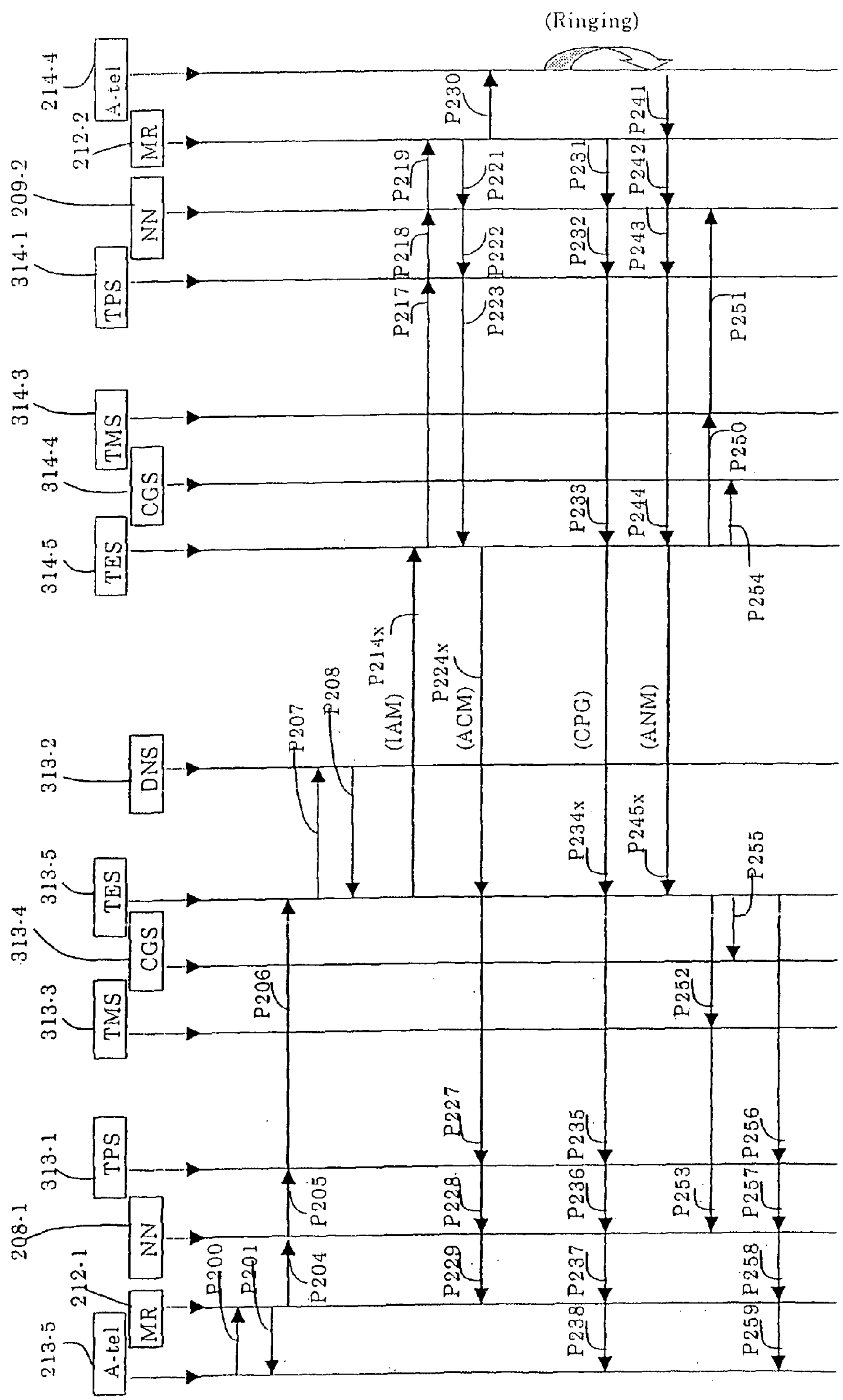
FIG. 109 is a flow chart for explaining the sixth embodiment of the present invention.
Figure 110:
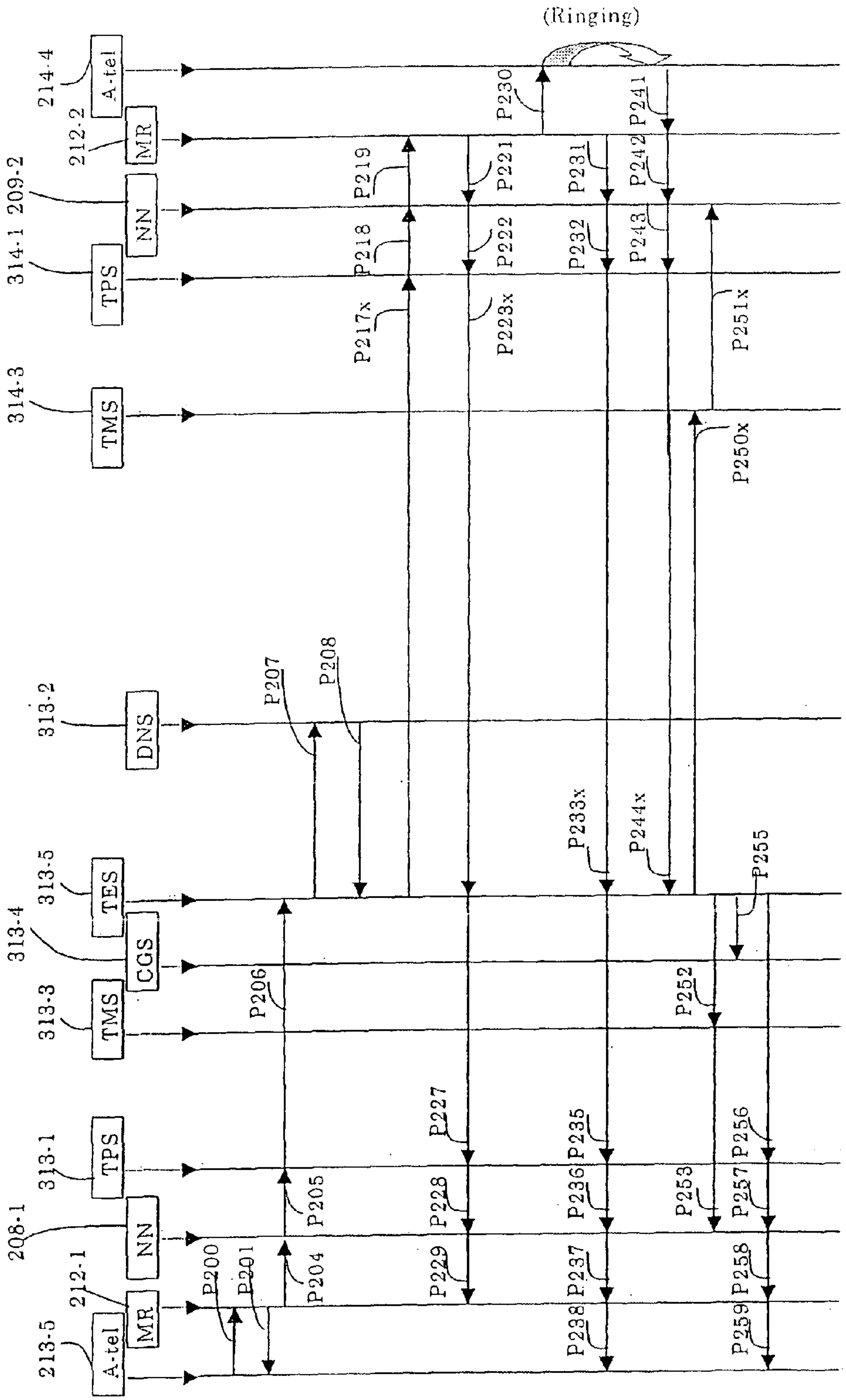
FIG. 110 is a flow chart for explaining the sixth embodiment of the present invention.

A series of all telephone communication preparations of the communication company “2” are changed into those of the communication company “1”. Among a series of the above-explained steps described in both the telephone communication connection phase and the telephone communication release phase, the communication established between the telephone administration server 313-5 and the telephone administration server 314-5 is left, and a series of the processing steps which are carried out by both the representative server 313-7 of the communication company 1 and the representative server 314-7 of the communication company 2 are omitted. Moreover, such a telephone administration server may be formed by employing the telephone administration server 313-5 and the telephone administration server 314-5. As a result, in the above-described telephone communication connection phase, the Steps P214X, P224X, P234X, P245X, P254X indicated in FIG. 109 are omitted; the Steps P217, P223, P233, P244, P250, P251 become P217x, P223x, P233x, P244x, P250x, P251x shown in FIG. 110, respectively; and other Steps shown in FIG. 109 are identical to those of FIG. 110.

<<Explanation No. 1 Related to Connection Control of Telephone. Administration Server>>

In the above-explained Step P214 in which the communication is made from the telephone administration server 313-5 to the representative server 313-7 of the communication company, before inquiring to the telephone domain name server 313-2, it can be known as to whether the destination telephone number “Tel-No-2” belongs (/is joined) to the IP telephone network managed/operated by the own communication company, or the IP telephone network managed/operated by another communication company. This process operation is carried out as follows:

The telephone administration server 313-5 may solve the above problem by employing “communication company section table of telephone number”. A description will now be made of an example of the communication company section table of the telephone number shown in FIG. 111. As a record of a serial No. 1 of the communication company section table, “81-3-5414-xxxx” is indicated in the column of “telephone number”; “No” is denoted in the column of “own communication company?"; and "Com-130" is indicated in the column of "identification information of another communication company". Symbol "xxxx" implies decimal notation of "0000" to "9999". In this case, the telephone numbers "81-3-5414-0000" to "81-3-5414-9999" show such a fact that these telephone numbers belong to the IP telephone network managed by the communication company identified by symbol "Com-130". Also, a telephone number "1-2245-5678" described on a record of a serial No. 2 of the communication company section table belongs to the IP telephone network operated/managed by the communication company identified by symbol "Com-025". Also, a telephone number "81-47-327-3887" described on a record of a serial No. 3 of the communication company section table belongs to the IP telephone network operated/managed by the communication company to which the telephone administration server 313-5 belongs.

<<Explanation No. 2 Related to Connection Control of Telephone Administration Server>>

In the above-explained Step P214 in which the communication is made from the telephone administration server 313-5 to the representative server 313-7 of the communication company, even when it can be seen that the IP telephone set of the destination telephone number "Tel-No-2" is operated/managed by the own communication company, it is possible to know as to whether or not such a telephone set whose telephone number is "Tel-No-2" and to which another telephone administration server is connected is joined to which network node apparatus, which will be explained as follows: The telephone administration server 313-5 may solve this problem by way of a telephone administration server section table of telephone number. An explanation will be made of an example of a telephone administration server section table of telephone numbers shown in FIG. 112.

The telephone number "81-47-325-3887" on the record of the serial No. 1 of the telephone administration server section table represents such a fact that the telephone set is joined (namely, the communication line is connected) to the network node apparatus operated/managed by the telephone administration server 313-5. The telephone number "81-245-56*xx*" described on the record of the serial No. 2 of the telephone administration server section table indicates such a fact that the telephone numbers of "81-2245-5600" to "1-2245-5699" are joined(namely, communication line is connected) to the network node apparatus which is operated/managed by such a communication company in which the IP address of the telephone administration server is equal to "100.10.11.40". Next, the telephone number "81-6-1234-xxxx" described on the record of the serial No. 3 of the telephone administration server section table indicates such a fact that the telephone numbers of "81-6-1234-0000" to "81-6-1234-9999" are joined(namely, communication line is connected) to the network node apparatus which is operated/managed by such a communication company.

<<Operation/Management of Network by Operation/Management Server>>

While the operation/management server 313-9 of the communication company "1" perioridically, or temporarily uses internal resources of the operation/management range 206-1 of the communication company "1", namely the network node apparatus 208-1, 208-2; the routers 219-1, 219-3, 219-5, 219-6, 219-7; the telephone domain name server 313-2; the telephone administration server 313-5; the pilot telephone administration server 313-1; the table administration server 313-3; the charging management server 313-4; the representative server 313-7; the user service server 313-6; and the telephone gateway 209-1; and further the IP communication means, or the means for transmitting/receiving the ICMP packet, the operation/management server 313-9 checks as to whether or not these resources are operated under normal conditions. Alternatively, the operation/management server 313-9 checks as to whether or not the communication lines among the resources are operable under normal states(failure management), or checks as to whether or not congestion of the IP packet within the network becomes excessively large (communication quality control). As a result, the operation/management server 313-9 operates/manages the internal resources of the operation/management range 206-1 of the communication company "1" in a batch manner. Both the failure condition and the communication quality condition of the network resources containing the communication line, which are acquired by the operation/management results, may be reported via the user service server 313-6 to the telephone user 227-1.

Similarly, while the operation/management server 314-9 of the communication company "2" periodically, or temporarily communicates various sorts of resources provided inside the operation/management range 206-2 of the communication company 2, the server checks as to whether or not these resources are operated under normal condition. Alternatively, the operation/management server 314-9 checks as to whether or not the communication lines among the resources are operable under normal states(failure management), or checks as to whether or not congestion of the IP packet within the network becomes excessively large(communication quality control). As a result, the operation/management server 314-9 operates/manages the internal resources of the operation/management range 206-2 of the communication company "2" in a batch manner. Both the failure condition and the communication quality condition of the network resources containing the communication line, which are acquired by the operation/management results, may be reported via the user service server 314-6 to the telephone user 227-2.

Since the above-described network operation/management are carried out by the operation/management servers 313-9 and 314-9, it is possible to improve the reliability in the terminal-to-terminal communication connection control of the telephone network 203 provided inside the IP transfer network 201 established between the IP telephone set 213-5 and the IP telephone set 214-4. Similarly, since the network operation economical base of the communication company can be supported by the collecting means of the communication fees by the charging administration servers 313-4 and 314-4, it is possible to improve the reliability in the terminal-to-terminal communication connection control of the telephone network 203 within the IP transfer network 201.

The contents of the embodiment 6 will now be summarized with supplemental information as follows: That is, the IP transfer network contains at least the network node apparatus, the telephone administration server, the media router, the telephone domain name server and the table administration server. A user "i" (i=1,2,3, . . . ) sets the individual external IP address "EA-i" to the media router of the user located outside the IP transfer network, one, or more telephone sets are connected to the media router of the user "i", and the media router is connected via the communication line to any one of the network node apparatus. An internal IP address "IA-i" used for the communication of the user "i" is applied to the termination unit (logic terminal) on the side of the network node apparatus of the communication line, and also the telephone number of the individual user is applied to the media router. Also, the telephone domain name server holds the set constituted by the telephone number of the individual user; the external IP address "EA-i" of the media router; and the internal IP address "IA-i". When the telephone domain name server is inquired as to the telephone number of the individual user, the telephone domain name server responds both the external IP address and the internal IP address, and also sets the IP communication record for determining the IP communication path established between the media router and the telephone proxy server into the network node apparatus.

The IP communication record is used to request the transmission source telephone set, and is transferred via the telephone proxy server to the telephone administration server. The telephone administration server requests the telephone domain name server so as to acquire both the external IP address of the transmission source media router and the internal IP address("EA-i, IA-i") thereof from the transmission source telephone number, or both the external IP address and the internal IP address("EA-j, IA-j") of the destination media router from the destination telephone number. Then, the table administration server sets these IP addresses to the network node apparatus on the transmission side and the network node apparatus on the destination side as the IP communication records which are used in the telephone communications between the transmission source telephone set and the destination telephone set. When the telephone set on the transmission source side requests the call setting operation, the media router on the transmission source side sends the IP packet containing both the destination telephone number and the transmission source telephone number to the telephone administration server on the transmission source side. Then, the telephone administration server on the transmission source side exclusively determines the line number (CIC) for identifying the communication line for the telephone voice based upon the set of the destination telephone number and the transmission source telephone number.

Next, the telephone administration server on the transmission source transmits "IAM packet for requesting telephone call setting operation" which contains the transmission source telephone number, the destination telephone number, and the line number to the telephone administration server on the destination side. The telephone administration server on the destination side notifies the call reception to the media router on the destination side. When the telephone reception of the telephone set is allowed, the telephone administration server on the destination side transmits the above-explained "ACM packet for notifying reception of IAM packet" via the telephone administration server on the transmission source to the media router on the transmission source side. Also, the media router on the destination side requests the telephone set on the destination side to execute the telephone call setting operation. When the telephone set produces the telephone calling sound, the media router informs to the telephone administration server on the destination side, such a fact that the telephone set is being called. The telephone administration server on the destination side transmits "CPG packet for notifying call reception" to the telephone administration server on the transmission source, and then, the telephone management server on the transmission source side notifies the call reception via the media router to the telephone set on the transmission source side.

In response to the call setting request, the telephone set on the destination side notifies the response via the media router on the destination side to the telephone administration server on the destination side. The telephone administration server on the destination side produces ANM packet for indicating response to call setting request, and transmits the ANM packet to the telephone administration server on the transmission side. The telephone administration server on the transmission source side notifies the response to request the call setting operation to the media router on the transmission source side. The telephone set on the transmission source side stops the calling sound, and is advanced to the communication phase. When the telephone communication of the telephone set on the transmission source side, or the destination side is ended, and also the cut request of the telephone calling operation is notified, this cut request is notified via the media router to the telephone administration server.

The telephone administration server which requests telephone call interruption forms "REL packet for requesting end of telephone communication" by employing the line number (CIC), and then, transmits the REL packet to the telephone administration server on the call interrupt side. This telephone administration server on the call interrupt side returns "RLC packet for reporting reception of REL packet". The telephone administration server on the call interrupt side notifies the end report of the telephone communication to the media router on the interrupt request side.

After the telephone communication is ended, the telephone administration server may collect the telephone communication record containing the line number, the communication time instant, and the telephone number, and then may notify the telephone communication record to both the operation managing server and the charging server. In the terminal-to-terminal communication connection control established between the telephone administration server and the relay telephone administration server, and also the terminal-to-terminal communication connection control established between the two telephone administration servers, the above-explained IAM, ACM, CPG, ANM, REL and RLC are transmitted/received. The IP packet is transmitted/received between the telephone administration server and the media router so as to perform the terminal-to-terminal connection control.

While the payload portion of the IP packet is used as the UDP segment, and also both the telephone call connection phase and the telephone release phase are used as a single port number, a single call control program for managing both the connection phase and the telephone release phase may be utilized in the different telephone communications. Also, in the telephone communication phase, since the UDP port numbers different from each other every telephone set are allocated, even when the media router is only one IP address, the different voice every telephone set may be transferred. In order that one telephone administration server may solely play: both the function of the telephone administration server on the transmission side and the function of the telephone administration server on the reception side, the above-explained telephone administration server may perform the procedures of both the telephone communication connection phase and the telephone release phase in combination with both the transmission source media router and the destination media router via the telephone proxy server.

In order that the telephone administration server may know as to whether the destination telephone number belongs to the IP telephone network operated/managed by the own communication company, or by another communication company, the telephone administration server may employ the communication company segment table of the telephone number. Also, in order to know such a fact that the telephone set having the destination telephone number is joined to which network node apparatus, the telephone administration server may employ the telephone administration server segment table of the telephone number. Since the operation/management server of the communication company exchanges the information with respect to the network node apparatus of the operation/management range of the communication company, the various sorts of servers, and also the telephone gateway so as to operate/manage the internal resources of the network in the batch node, the reliability in the terminal-to-terminal communication connection control inside the network can be improved. Otherwise, the operation/management server can improve the reliability of the terminal-to-terminal communication connection control of the IP transfer network in conjunction with the charging administration server.

Furthermore, in this embodiment, the above-mentioned IP encapsulation and reverse-capsulation by the network node apparatus can be replaced to the simple encapsulation which forms an internal packet by adding a simple header to an external IP packet and the simple reverse-capsulation which removes the simple header from the internal packet, respectively.

Figure 113:
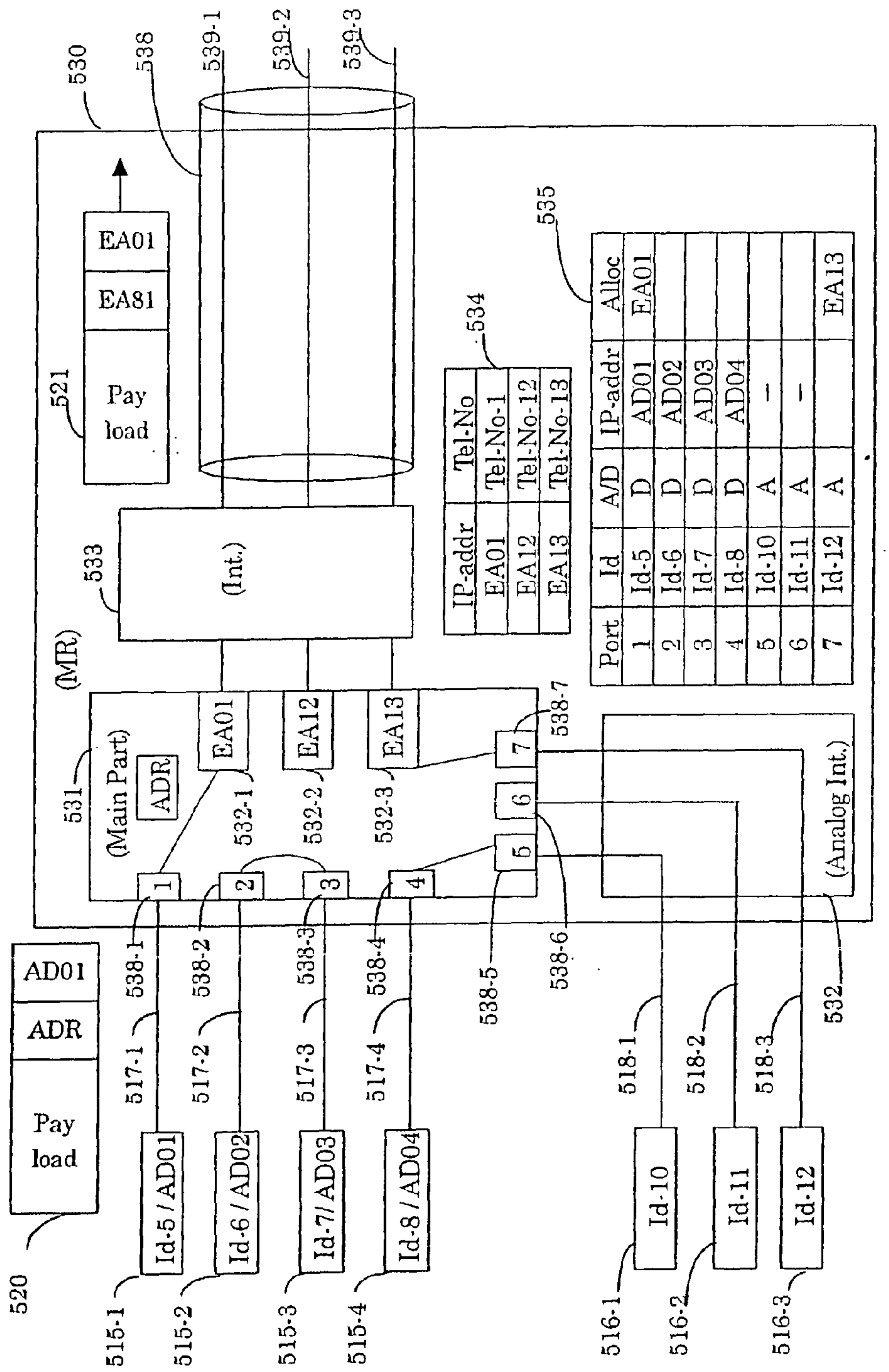
FIG. 113 is a block diagram for indicating a structural example of a media router according to a seventh embodiment of the present invention.
Figure 114:
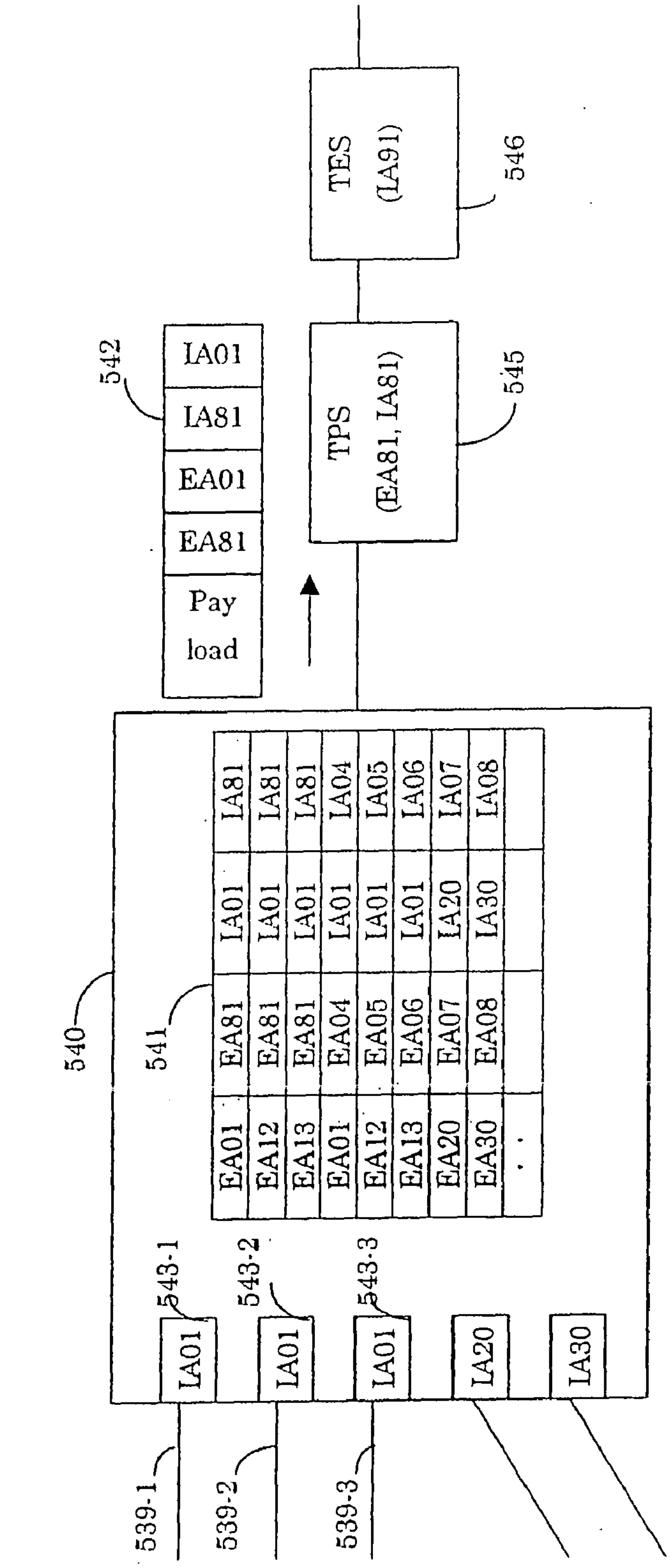
FIG. 114 is an explanatory diagram for explaining the seventh embodiment of the present invention.

7. Seventh Embodiment in which Structures of Media Routers are Different from Each Other FIG. 113 is a schematic diagram for explaining a method for applying an IP address and a telephone number with respect to a media router. FIG. 114 is an explanatory diagram for explaining a capsulation relation item of an IP packet of a network node apparatus. Referring to these drawings, a seventh embodiment will now be explained.

A media router 530 stores IP telephone sets 515-1 to 515-4, and analog telephone sets 516-1 to 516-3, and is connected from the line interface unit 533 via logic communication lines 539-1 through 539-3 for transmitting/receiving IP packets to a network node apparatus 540. In this case, a physical communication line 538 contains all of these logic communication lines 539-1 to 539-3.

The media router 530 executes a telephone call control, and other major process operations of the media router 530. The media router 530 contains an analog interface unit 532 having a connection interface between a media router major unit 531 and an analog telephone set, a line interface unit 533, an address telephone number correspondence table 534, and a telephone set administration table 535. The media router major unit 531 contains thereinto IP addresses "EA01", "EA12", "EA13" and "ADR". The IP address "EA01" is made in 1-to-1 correspondence with the telephone number "Tel-No-1"; the IP address "EA12" is made in 1-to-1 correspondence with the telephone number "Tel-No-12"; and also the IP address "EA13" is made in 1-to-1 correspondence with the telephone number "Tel-No-13". This condition is indicated in an address telephone number correspondence table 534. Telephone numbers applied to both an IP telephone set and an analog telephone set are managed by employing an address administration table. As a result, when a telephone number is changed, the address administration table is rewritten.

While ports 538-1 to 538-7 are provided inside the media router major unit 531, such port numbers as "1" to "7" are applied to these ports. Furthermore, these ports are directly connected via communication lines to IP telephone sets, or indirectly connected via an analog interface unit 532 to analog telephone sets 516-1 to 516-3. To these IP telephone sets 515-1 to 515-4, such identifier names as "Id-5" to "Id-8" and IP addresses "AD01" to "AD04" are applied. This condition is represented on such records within a telephone set administration table 535 in which port numbers are selected to be 1 to 4. Symbol "D" within the telephone set administration table shows an IP telephone set, and symbol "A" denotes an analog telephone set. The IP address "EA01" is applied to the port 532-1, the IP address "EA12" is applied to the port 532-2, and the IP address "EA13" is applied to the port 532-3. Both the ports 538-1 and 532-1 are connected to each other by the communication line, and both the ports 538-7 and 532-3 are connected to each other by the communication line. Since the IP telephone set 515-1 is connected via the communication line 517-1 to the port 538-1, when the IP telephone 515-1 is connected via the media router 530 to the network node apparatus, the IP address "EA01" may be employed. Similarly, the IP address "EA13" is fixedly allocated to the analog telephone set 516-3. When the analog telephone set 516-3 is connected via the media router 530 to the network node apparatus, the IP address "EA13" may be continuously employed. This condition is indicated in such a record equal to the port 1 of the address administration table 535, and also such a record equal to the port 7 thereof.

Both the port 538-4 and the port 538-5 are connected to each other via the communication line. The IP telephone set 515-4 is connected via the communication line 517-4; the ports 538-4 and 538-5; the analog interface 532; and the communication line 518-1 to the analog telephone set 516-1, so that the IP telephone set 515-4 can establish the telephone communication with the analog telephone set 516-1. Similarly, the IP telephone set 515-2 is connected via the communication line 517-2; the ports 538-2 and 538-3; and the communication line 517-3 to the IP telephone set 515-3, so that the IP telephone set 515-2 can establish the telephone communication with the IP telephone set 515-3.

The telephone communication between two analog telephone sets may be established by a function of an analog interface unit. The IP telephone sets 515-1 to 515-4 digitalize voice, and superimpose the digitalized voice on an IP packet to thereby send the IP packet, and also restore the digitalized voice to obtain analog voice as a reverse function. The analog interface unit digitalizes the voice received from the analog telephone sets 516-1 to 516-3 and then sends the digitalized voice to the media router major unit 531, and also restores the digitalized voice received from the media router major unit 531 to obtain analog voice as a reverse function thereof, and then supplies the analog voice to the analog telephone set.

<<A Series of Procedures Executed in Media Router and Network Node Apparatus for Telephone Connection>>

When the handset of the IP telephone set 515-1 is taken up, a calling IP packet 520 is transferred via the communication line 517-1 to the media router major unit 531. In this case, a transmission source IP address is "AD01", and a destination IP address is "ADR", which are written in a header contained in the IP packet 520. The media router major unit 531 returns an IP packet of "call acceptance" to the IP telephone set 515-1. Next, when the user of the IP telephone set 515-1 dials the telephone number "Tel-No-4" of the communication counter party, such a "call setting" IP packet is produced inside the IP telephone set 515-1, and then is transmitted to the media router 530. The IP packet contains the transmission source telephone number "Tel-No-1" and the telephone number "Tel-No-4" of the communication counter party in the payload of the IP packet.

The media router 530 receives the above IP packet in the media router major unit 531, and produces such an IP packet containing at least both the transmission source telephone number "Tel-No-1" and the destination telephone number "Tel-No-4", and then transmits the produced IP packet to the network node apparatus 540 so as to commence the call setting procedure.

When the network node apparatus 540 receives an IP packet 521, an address administration table 541 shown in FIG. 114 is retrieved so as to seek such a record which contains the transmission source IP address of "EA01" as the external IP address and the destination IP address of "EA81". In this case, when the network node apparatus 540 finds out a record indicated on a first row of the address administration table 541 from a top row, namely such a record described as "EA01, EA81, IA01, IA81", the network node apparatus 540 produces an internal IP packet 542 by using the IP address of "IA01" and IA81" described in a third row and a fourth row with the record by applying the capsulation method of the IP packet, and then transmits the IP packet 542 to such a pilot telephone administration server 545 whose IP address is equal to "IA81". In this case, the payload portion of the IP packet 542 is the IP packet 521. It should be understood that since the physical communication line 538 contains all of the logic communication lines 539-1 to 539-3 in the above-explained case, the logic terminals 543-1 to 543-3 are selected to be all of the same internal IP address values "IA01".

Furthermore, in this embodiment, the above-mentioned IP encapsulation and reverse-capsulation by the network node apparatus can be replaced to the simple encapsulation which forms an internal packet by adding a simple header to an external IP packet and the simple reverse-capsulation which removes the simple header from the internal packet, respectively.

8. 8th Embodiment for Executing Closed-Area Telephone Communication

Figure 115:
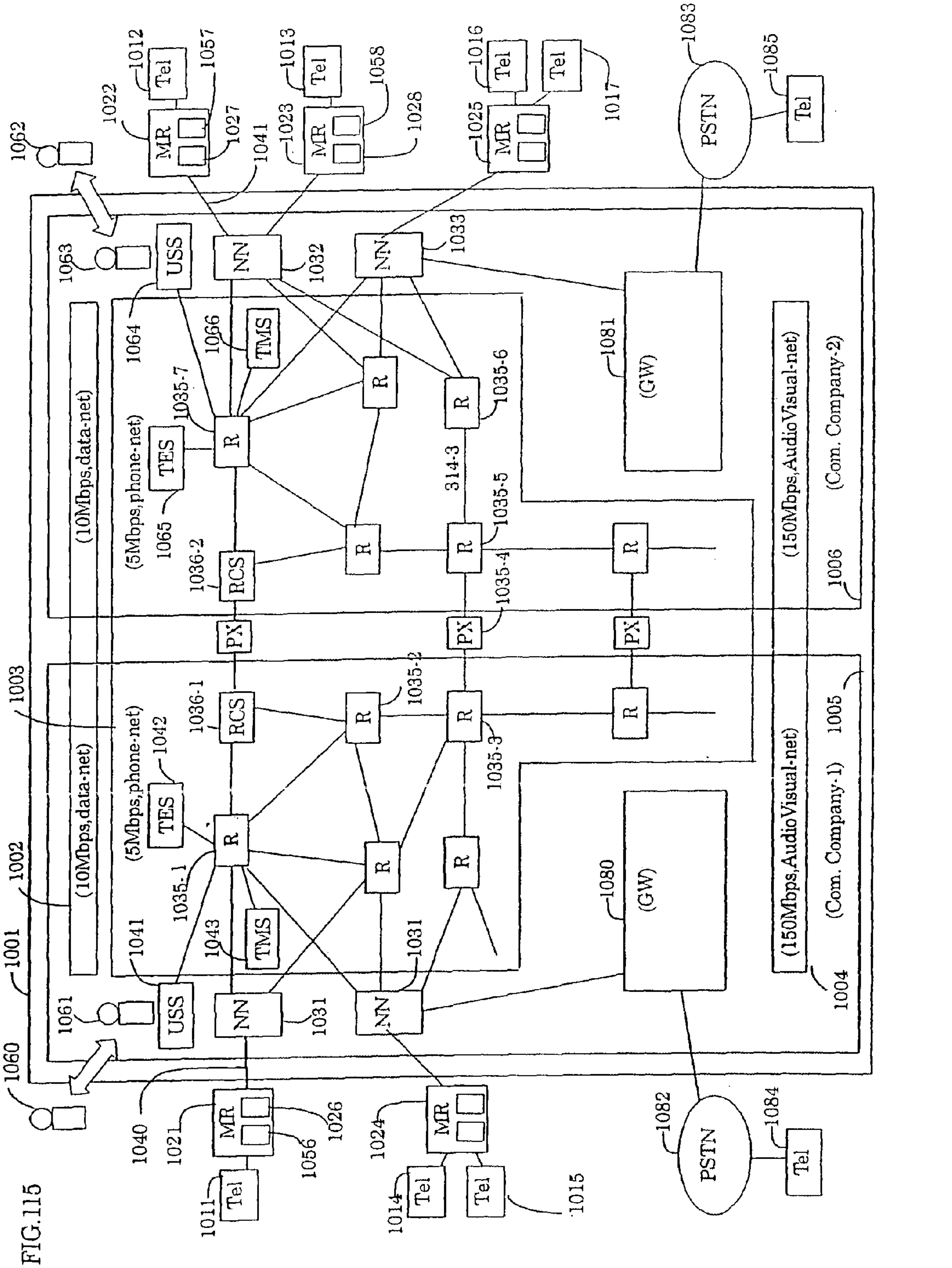
FIG. 115 is a block diagram for representing an arrangement of an eighth embodiment of the present invention.

In FIG. 115, reference numeral 1001 shows an integrated IP communication network, reference numeral 1002 indicates an IP data network, reference numeral 1003 represents an IP telephone network, reference numeral 1004 denotes an IP voice/image(audio/visual) network, reference numeral 1005 indicates a range of an integrated IP communication network operated/managed by a communication company "1", and reference numeral 1006 represents a range of an integrated IP communication network operated/managed by a communication company "2". Also, reference numerals 1002 to 1004 also correspond to IP transfer networks having IP packet transfer functions. These IP transfer networks may exchange information by employing the IP communication means for transmitting/receiving IP packets inside the IP transfer networks. An IP address used outside the integrated IP communication network 1001 is called as an external IP address, whereas an IP address employed inside the integrated IP communication network 1001 is referred to as an internal IP address. Also, reference numerals 1011 to 1017 indicate telephone sets. Reference numerals 1021 to 1025 show media routers, and reference numerals 1080 and 1081 indicate telephone gateways. Reference numerals 1082 and 1083 show public switched telephone networks(PSTN), and reference numerals 1084 and 1085 represent telephone sets.

Next, a description will now be made of a "method for controlling terminal-to-terminal communication connection" in which a telephone communication connection is carried out from the telephone set 1011 via the media router 1021, the communication line 1040, the network node apparatus 1031, the inside of the IP telephone network 1003, the network node apparatus 1032, the communication line 1041 and the media router 1022 to the telephone set 1012.

Figure 117:
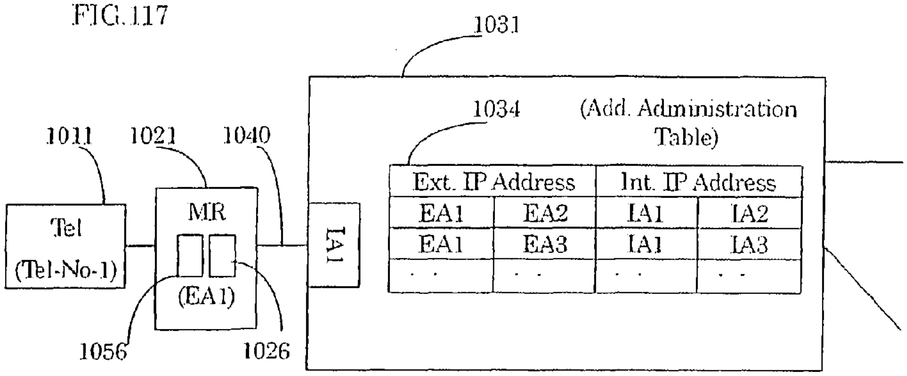
FIG. 117 is an explanatory diagram for explaining the eighth embodiment of the present invention.
Figure 118:
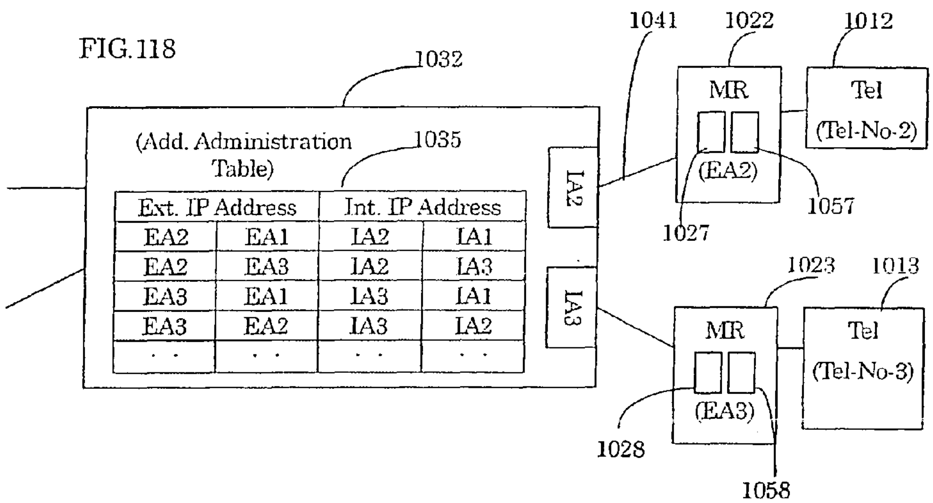
FIG. 118 is an explanatory diagram for explaining the eighth embodiment of the present invention.

The users of the telephone sets 1011 to 1013 previously determine telephone numbers, and values of external IP addresses which are applied to the media routers connected to these telephone sets. Referring now to FIG. 117 and FIG. 118, the telephone set 1011 uses the telephone number "Tel-No-1", and the external IP address "EA1" is applied to the media router 1021. Also, telephone set 1012 uses the telephone number "Tel-No-2", and the external IP address "EA2" is applied to the media router 1022, and further, the telephone set 1013 uses the telephone number "Tel-No-3", and the external IP address "EA3" is applied to the media router 1023. Also, such a setting operation is made as follows. That is, when the telephone number "Tel-No-1" is indicated, any of the telephone number servers 1026 to 1028 answer the external IP address "EA1". When the telephone number "Tel-No-2" is indicated, any of the telephone number servers 1026 to 1028 answer the external IP address "EA2". Also, when the telephone number "Tel-No-3" is indicated, any of the telephone number servers 1026 to 1028 answer the external IP address "EA3". This method may be realized by applying the known technique of the domain name server(DNS) in which, for example, a telephone number group such as extension telephone numbers "100" to "199" is made in correspondence with a domain name "1" by way of a predetermined rule, for instance, 100-digit numbers are set to "1".

<<Preparation of Telephone Communication>>

Figure 116:
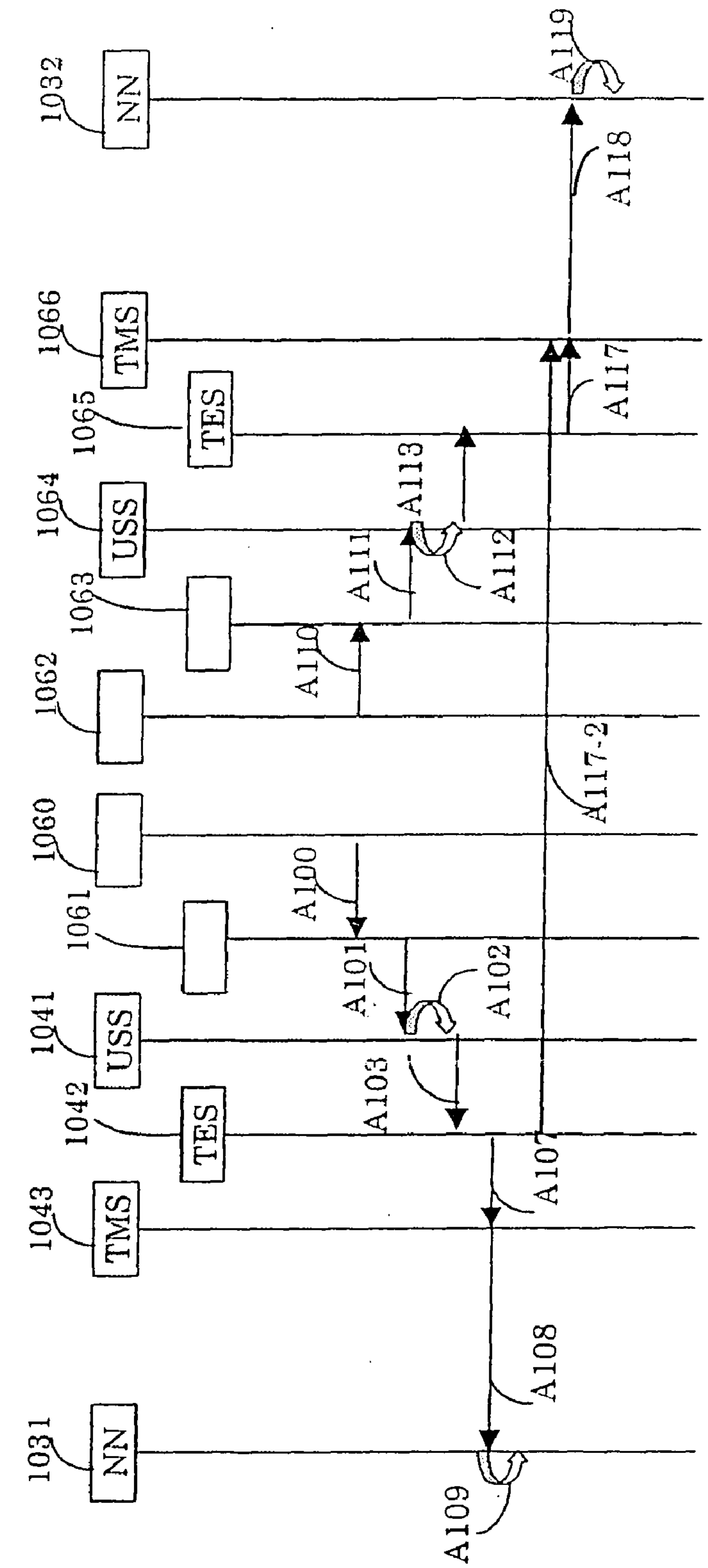
FIG. 116 is a flow chart for showing an operation example of the eighth embodiment of the present invention.

A preparation of a telephone communication will now be explained with reference to FIG. 115 and FIG. 116, a user 1060 proposes a telephone acceptance person 1061 to use a telephone (Step A100 of FIG. 116). The telephone acceptance person 1061 acquires from the user 1060, a user name, a user address, a payment way of a communication fee, and the external IP addresses "EA1" and "EA2" which constitute the propose information of the telephone, an identification symbol "L-1040" of the communication line 1040 and also a network node apparatus identification number "NN-1031" of the network node apparatus 1031, an identification symbol "L-1041" of a communication line 1041, and an identification symbol "NN-1032" of a network node apparatus 1032, and then notifies these acquired items to a user service server 1041 (Step A101). The user service server 1041 determines a user identification symbol "UTD-1" used to identify the user 1060, and saves the user propose information such as the external IP addresses "EA1" and "EA2" and the user name acquired from the above acceptance into a database owned in the user server 1041 (Step A102).

Next, when the user service server 1041 notifies to a telephone administration server 1042, the external IP addresses "EA1" and "EA2"; the identification symbols "L-1040" and "L-1041" of the communication line; and the identification symbols "NN-1031" and "NN-1032" of the network node apparatus, which are obtained by the above procedure (Step A103), the telephone administration server 1042 determines internal IP addresses "IA1" and "IA2", and notifies the four addresses "EA1, EA2, IA1, IA2" to the table administration server 1043 (Step A107). In this case, the internal IP address of "IA1" is such an internal IP address applied to a joint point between the communication line 1040 and the network node apparatus 1031, and the internal IP address of "IA2" is such an internal IP address applied to a joint point between the communication line 1041 and the network node apparatus 1032, which are values internally determined by the integrated IP transfer network 1001 by employing the identification symbols "NN-1031" and "NN-1032" of the network node apparatus, and the identification symbols "L-1040" and "L-1041" of the communication line. Both the telephone administration servers 1042 and 1065 exchange information with the IP communication means so as to confirm that these values are identical to each other in advance.

When the table administration server 1043 notifies the above-explained four addresses to the network node apparatus 1031 (Step A108), the network node apparatus 1031 holds the four addresses "EA1, EA2, IA1, IA2" as a first record of the address administration table 1034 provided in the network node apparatus as shown in FIG. 117 (Step A109). A record of a first row in the address administration table 1034 is defined as an IP communication record between the media router 1021 having the external IP address "EA1" and the media router 1022 having the external IP address "EA2". The IP communication record may provide address information contained in an IP header, while the IP packet is capsulated to produce the internal IP packet. Similarly, as a record of a second row of the address administration table 1034, the four addresses "EA1, EA3, IA1, IA3" are set as the IP communication record.

Another user 1062 proposes the telephone acceptance person 1063 to receive a telephone service in a similar manner. As indicated in FIG. 118, an IP communication record is set between the media router 1022 having the external IP address "EA2" and the media router 1021 having the external IP address "EA1" within the network node apparatus 1032 in a similar procedure(namely, Steps A110 to A119 of FIG. 116). In accordance with the same principle idea, an IP communication record is set, or another IP communication record is set between the media router 1022 having the external IP address "EA2" and the media router 1023 having the external IP address "EA3" in the first record to the fourth record of the address administration table 1035. Instead of the above-described procedure in which the user 1062 proposes to telephone acceptance person 1063 so as to set the IP communication record between the media router 1022 and the media router 1021, another user 1060 may propose another telephone acceptance person 1061 so as to set an IP communication record between the media router 1022 and the media router 1021. As a result, when the telephone administration server 1042 executes the above Step "A107", this server simultaneously executes the step "A117-2" (refer to FIG. 116) in order to request the table administration server 1066 to set the IP communication record.

<<Connection Phase>>

Figure 119:
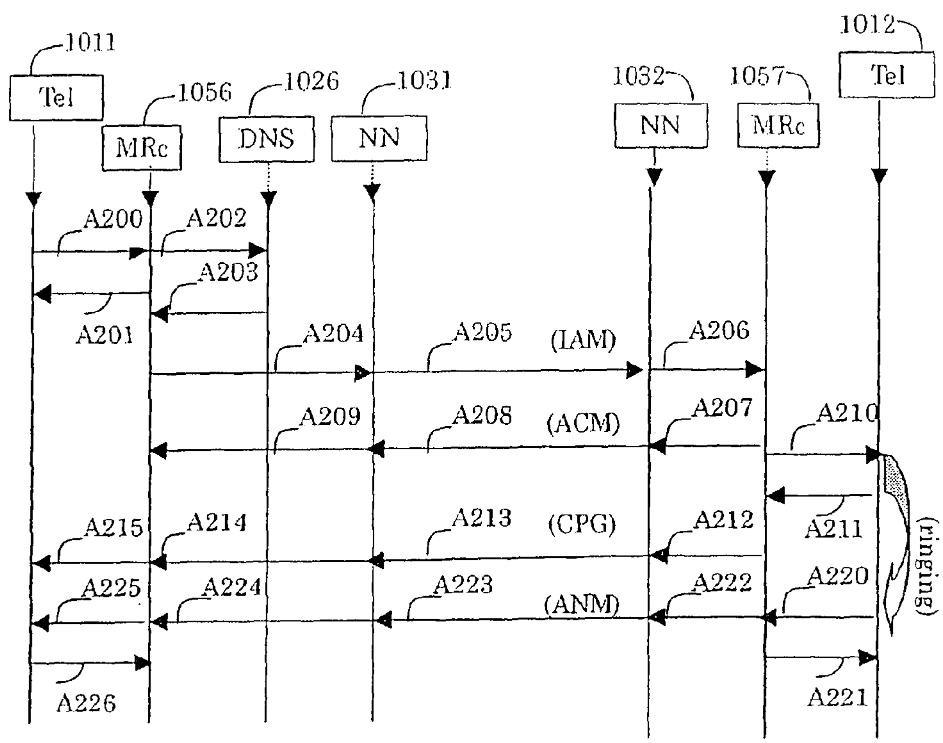

The user takes up the handset of the telephone set 1011 to dial the telephone number "Tel-No-2" of the telephone set 1012 of the communication counter party, and sends a telephone call to the media router administration unit 1056 provided inside the media router 1021 (Step A200 of FIG. 119). The media router administration unit 1056 confirms the telephone call (Step S201).

Figure 120:
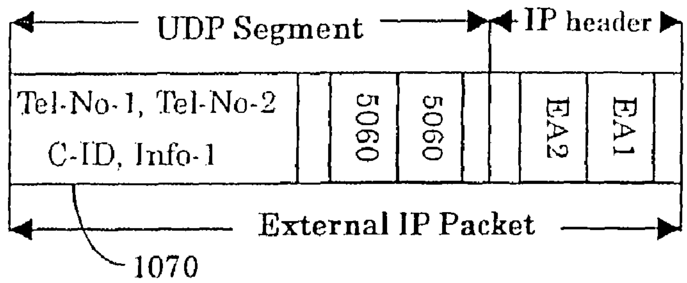

The media router administration unit 1056 indicates the telephone number "Tel-No-2" to the telephone number server 1026 (Step A202), acquires the corresponding IP address "EA2" of the media router 1022 (Step A203), and produces an external IP packet 1070 (refer to FIG. 120) used to set a telephone calling operation, and then sends the external IP packet 1070 to the network node apparatus 1031 (Step A204). The external IP packet 1070 contains the transmission source telephone number "Tel-No-1", the destination telephone number "Tel-No-2", the telephone call identifier "C-ID", and the connection control relative information "Info-1". In this case, such an example is made that an IP address area of an IP header of the external IP packet 1070 corresponds to both the transmission source IP address "EA1" and the destination IP address "EA2"; a payload portion of the external IP packet 1070 corresponds to a UDP segment; the transmission source port number is "5060"; and the destination port number is "5060". A telephone call identifier "C-ID" is employed in order that a telephone call defined from the connection phase up to the voice communication phase, and the release phase after the telephone call has been issued in the telephones communication may be discriminated from other telephone calls. The connection control relative information "Info-1" contains at least the UDP port number, for example, "5004" in the voice communication phase, and also may include an identification symbol of a voice compression system, a voice code conversion code identification symbol, and the IP address "EA1" of the media router 1021 as other contents. In this case, both the media router administration units 1056 and 1057 set both the telephone call identifier "C-ID" and the connection control relative information "Info-1" based upon a previously determined rule, and may refer to them.

Upon receipt of the IP packet 1070, the network node apparatus 1031 confirms that the internal IP address is equal to "IA1", the internal IP address is applied to the termination unit (logic terminal) of the communication line 1040 into which the IP packet 1070 is inputted, and also the destination external IP address of the IP packet 1070 is equal to "EA2", and thereafter retrieves the address administration table 1034 shown in FIG. 117. In the beginning, the network node apparatus 1031 retrieves such an IP communication record whose transmission source internal IP address is equal to "IA1", and subsequently, retrieves as to whether or not the destination external IP address "EA2" is contained in the IP communication record within the detected IP communication record.

Figure 121:
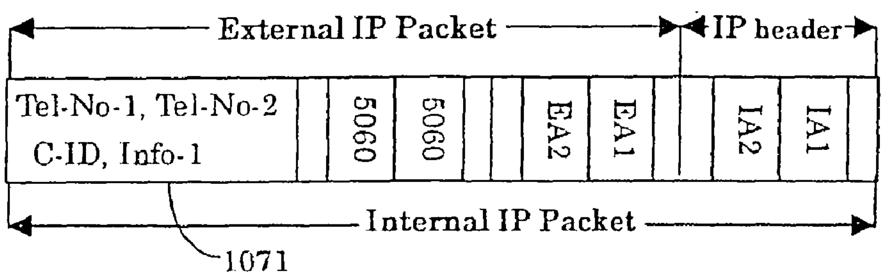

Next, the network node apparatus 1031 checks as to whether or not the transmission source external IP address "EA1" within the IP packet 1070 is contained in the detected IP communication record. In such a case that the network node apparatus 1031 finds out such an IP communication record "EA1, EA2, IA1, IA2", namely a first row of the address administration table 1034 from the top row, the network node apparatus 1031 applies the capsulation technical method of the IP packet by employing the address "IA1" and "IA2" described in the third row and the fourth row inside the IP communication record so as to produce an internal IP packet 1071 shown in FIG. 121. The capsulation technical method is to apply a new IP header to the external IP packet 1070.

Figure 122:
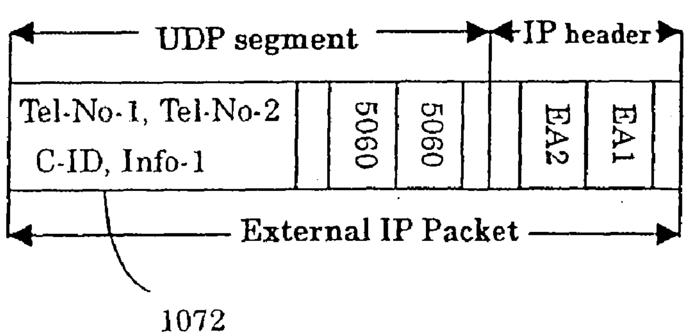

In the above-explained retrieving operation of the IP communication record within the address administration table in the beginning, the network node apparatus 1031 retrieves such an IP communication record whose transmission source internal IP address is equal to "IA1" (plural subjects and present), and subsequently, retrieves as to whether or not the destination external IP address "EA2" is contained in the IP communication record within the detected IP communication record. Alternatively, such a retrieve operation of the transmission source external IP address "EA1" may be omitted. When the IP packet is capsulated, both the transmission source IP address "IA1" of the internal IP address and the destination IP address "IA2" are set to the IP address area of the header portion of the internal IP packet. The formed internal IP packet 1071 is transmitted to the network node apparatus 1032 (Step A205), and is reached via the routers 1035-1 to 1035-6 to the network node apparatus 1032. The network node apparatus 1032 executes the inverse-capsulation of the IP packet except for the header of the IP packet 1071 so as to restore an IP packet 1072 (refer to FIG. 122). Then, this IP packet 1072 is sent to the media router 1022 (Step A206).

While the above-described IP packet is inverse-capsulated, the network node apparatus 1032 may use such an IP communication record whose addresses are equal to "EA2, EA1, IA2, IA1" as follows: In other words, the network node apparatus 1032 confirms that the IP packet may be inverse-capsulated, since the IP communication record containing the four IP address is present in the address administration table 1035 inside the network node apparatus 1032, the addresses or "IA2" and IA1" are present in the IP address area of the header of the received internal IP packet 1071, and also the addresses "EA2" and "EA1" are present in the IP address area contained in the external IP packet 1072. When there is no such an IP communication record, the four addresses("EA2, EA1, IA2, IA1") are made coincident with each other, the received IP packet may be discarded. Alternatively, when there is no such IP communication record, the three addresses ("EA1, IA2, IA1") are made coincident with each other within the address administration table 1035, since the destination IP address "EA2" contained in the IP packet 1071 is not checked, the network node apparatus 1032 does not execute the inverse-capsulation, but may discard the received IP packet.

The media router administration unit 1057 acquires the transmission source telephone number "Tel-No-1", the destination telephone number "Tel-No-2", the telephone call identifier "C-ID", and the connection control relative information "Info-1" from the external IP packet 1072. The media router administration unit 1057 acquires, for example, "5004" from the inside of the connection control relative information "Info-1" as a port number which is employed by a transmission source telephone set in the voice communication phase. Also, while using the telephone call identifier "C-ID", the media router administration unit 1057 may discriminate the received telephone call from other telephone calls.

A series of the above-explained Steps A204, A205, A206 are called as a "call setting operation", and the series of Steps may be abbreviated as "IAM".

The media router administration unit 1057 returns such an IP packet containing the telephone call identifier "C-ID", the transmission source telephone number "Tel-No-1", and the destination telephone number "Tel-No-2" to the media router administration unit 1056 in order to notify a call setting acceptance with respect to the above-explained call setting operation (Steps A207, A208, A209). A series of these Steps A207, A208 and A209 will be referred to as a "call setting acceptance" which is expressed by "ACM" as an abbreviation symbol. The media router administration unit 1057 may return to use only the telephone call identifier "C-ID" in the above-explained call setting acceptance, and may not return both the transmission source telephone number "Tel-No-1" and the destination telephone number "Tel-No-2".

Next, when the media router administration unit 1057 transfers a telephone call (call reception) to the telephone set 1012 (Step A210), the telephone set 1012 returns a response in order to confirm the telephone reception (Step A211), and produces the telephone call sound. In order to notify that the telephone set 1012 is being called, the media router administration unit 1057 produces such an IP packet containing the telephone call identifier "C-ID", the transmission source telephone number "Tel-No-1", and the destination telephone number "Tel-No-2", and then transmits the IP packet to the media router administration unit 1056 (Steps A212, A213, A214). A series of these Steps A212, A213, A214 is called as either a call passing or a call issuing, and are expressed by "CPG" as an abbreviation symbol. In the call passing steps, both the transmission source telephone number "Tel-No-1" and the destination telephone number "Tel-No-2" may not be returned. The media router administration unit 1056 notifies such a fact that the destination telephone set 1012 is being called to the transmission source telephone set 1011 (Step A215).

On the other hand, when the user of the telephone set 1012 hears the calling sound of the telephone set, and notifies the call reception to the media router administration unit 1057 by taking up the handset thereof (Step A220), the media router administration unit 1057 produces such an IP packet containing the telephone call identifier "C-ID", the transmission source telephone number "Tel-No-1", the destination telephone number "Tel-No-2" and the connection control relative information "Info-2" and then notifies the IP packet to the media router administration unit 1056 provided within the media router 1021 (Steps A222, A223, A224). A series of these Steps A222, A223 and A224 is referred to as a "response", and is expressed as "ANM" as an abbreviation symbol. At least, the UDP port number employed in the voice communication phase, for example, "5006" is contained in the connection control relative information "Info-2". The format of the above IP packet owns the same format of the internal IP packet 1071 shown in FIG. 121. Alternatively, it is possible to omit such that both the transmission source telephone number "Tel-No-1" and the destination telephone number "Tel-No-2" are written into the IP packet. The media router administration unit 1056 confirms the response (Step A220) of the telephone set 1012 (Step A221).

The media router administration unit 1056 may know the destination port number, for example, "5006" which is employed in the communication phase from the connection control relative information "Info-2", and notifies the response(off hook) issued from the telephone set 1012 (Step A225) to the telephone set 1011. Then, the telephone set 1011 confirms the response (Step A226). It should also be noted that the above-explained Steps A221 and A226 may be omitted. With execution of the above-explained process operations, the connection phase of the telephone calling operation is accomplished.

It should also be noted that the Steps A200 and A210 are called as "call setting operation"; the Steps A201 and A211 are called as "call setting acceptance"; the Step A215 is referred to as "calling"; the Steps S220 and S225 are called as "response"; and the Steps A221 and A226 are called as "response confirmation" among the above-explained steps.

<<Communication Phase>>

Figure 123:
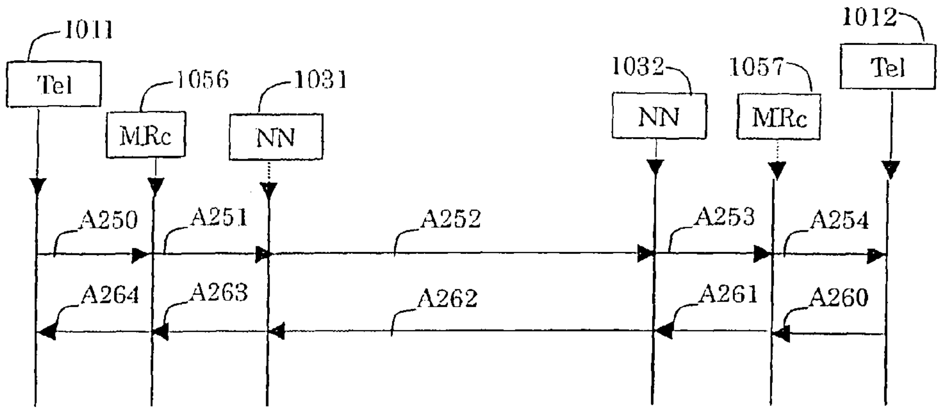
Figure 124:
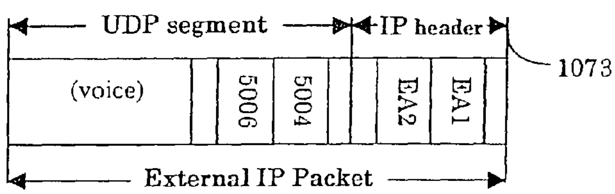
Figure 125:
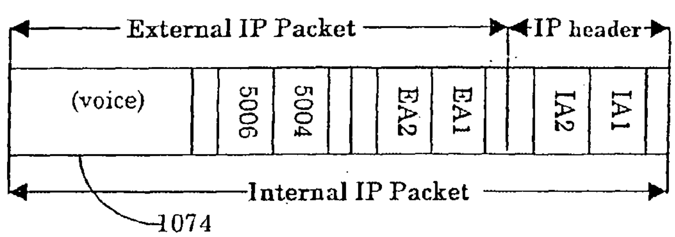
Figure 126:
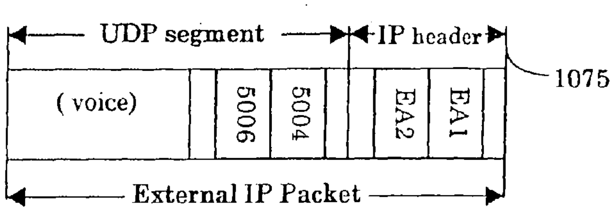

When the user of the telephone set 1011 starts a telephone conversation by voice(speech), a voice signal is sent to the media router administration unit 1056 (Step A250 of FIG. 123). Then, the media router administration unit 1056 digitalizes the voice signal, and furthermore, segments the digital data to form a proper length, and then forms an external IP packet 1073 of FIG. 124. Then, the digitalized voice data is stored into a payload portion of an internal UDP segment of this external IP packet 1073, and the resulting IP packet 1073 is transmitted to the network node apparatus 1031 (Step A251). In the connection phase, as an internal transmission source port number of the UDP segment, both the transmission source port number "5004" and the destination port number "5006" are utilized which are acquired by being mutually exchanged by the media router administration units 1056 and 1057.

Upon receipt of the external IP packet 1073, the network node apparatus 1031 may find out the IP communication record equal to "EA1, EA2, IA1, IA2" inside the address administration table, while using the IP communication record, the external IP packet 1073 is capsulated to constitute an internal IP packet 1074. The internal IP packet 1074 is reached via the routers 1035-1 to 1035-6 to the network node apparatus 1032 (Step A252). Then, the external IP packet 1075 is restored, and the external IP packet 1075 is delivered via the media router administration unit 1057 (Step A253) to the telephone set 1012 (Step A254). An IP packet containing the voice of the user of the telephone set 1012 is transmitted along a direction opposite to the above-explained direction, namely is reached via the media router administration unit 1057 (Step A260), the network node apparatus 1032 (Step A261), and the routers 1035-6 to 1035-1 to the network node apparatus 1031 (Step A262), and also is delivered via the media router administration unit 1056(Step A263) to the telephone set 1011 (Step A264).

<<Release Phase>>

Figure 127:
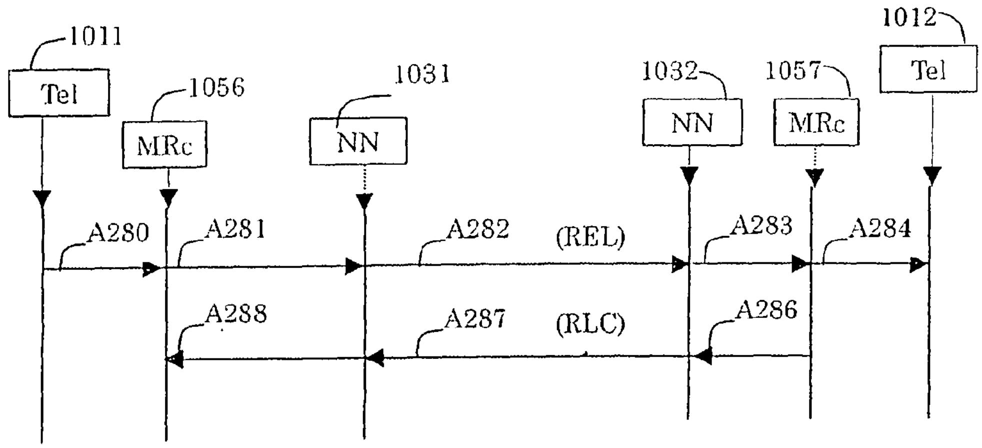

In the case that the user of the telephone set 1011 puts on the handset thereof so as to end the telephone communication, and notifies the end of the telephone communication to the media router administration unit 1056 (Step A280 of FIG. 127), the media router administration unit 1056 produces such an IP packet containing at least information and the telephone call identifier "C-ID". The information implies that the telephone communication is ended. The IP packet is transmitted to the network node apparatus 1031 (Step A281), and is capsulated in the network node apparatus 1031. The capsulated IP packet is reached via the IP transfer network 1003 to the network node apparatus 103 (Step A282). The IP packet is inverse-capsulated in the network node apparatus 1032, and then, the resulting IP packet is reached via the media router administration unit 1057 (Step A283) to the telephone set 1012 (Step A284). A series of these Steps A281, A282, A283, A284 is called as a "release", and is expressed by "REL" as an abbreviation symbol.

Next, such an IP packet for reporting a completion of the release is notified along a direction opposite to the above direction (Steps A286, A287, A288). A series of these Steps A286, A287, A288 is called as a "completion of release", and is expressed by "RLC" as an abbreviation symbol. Both the format of the IP packet and the setting method of the IP address used in the steps A281, A282, A283 are identical to those of the Steps A204, A205, A206 in the connection phase of the telephone communication.

<<Communication Among Other Telephone Sets>>

In a similar manner, a telephone communication may be made from the telephone set 1011 to such a telephone set 1013 having a telephone number "Tel-No-3". When an inquiry is sent to the telephone number server 1026, an external IP address "EA3" corresponding to the telephone number "Tel-No-3" is answered. Both the IP communication records "EA1, EA3, IA1, IA3" provided inside the address administration table 1034 and the IP communication records "EA3, EA1, IA3, IA1" provided inside the address administration table 1035 are used so as to capsulate and also inverse-capsulate the IP packet. Also, a telephone communication may be made from a telephone set 1012 to another telephone set 1013 by way of a method for controlling a terminal-to-terminal communication connection similar to the above embodiment. When the telephone communication is ended, both the port number "5004" and the port number "5006" may be employed as empty numbers in the next telephone communication.

<<Case of Single Communication Company>>

Even in such a case that there is no such an operation/management range 1006 of the communication company 2 of FIG. 115, but the IP telephone network 1003 constitutes the operation/management range of the communication company 1, the above-described telephone call connection phase, communication phase thereof, and also release phase thereof may be realized. In this case, the operation/management range 1006 of the communication company 2 is changed into the operation/management range of the communication company 1; the representative server 1 of the communication company "1" and the representative servers 1036-1 to 1036-2 of the communication company 2 are discontinued; and also, the router 1035-7 is connected to the router 1035-1 by employing the IP communication line.

Other Embodiments of Media Router

Figure 128:
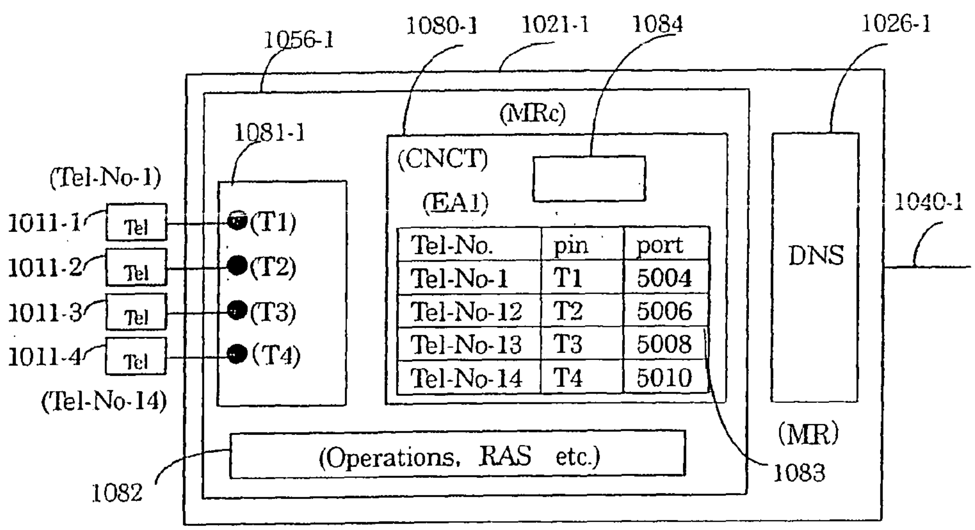

Referring now to FIG. 128, other embodiment as to the media router will be explained. A media router 1021-1 contains the function of the media router 1021 shown in FIG. 115, a media router administration unit 1056-1 contains the function of the media router administration unit 1056, and a telephone number server 1026-1 owns the function of the telephone number server 1026. Reference numeral 1040-1 shows a communication line to the network node apparatus. Reference numeral 1080-1 represents a connection control unit, reference numeral 1081-1 shows a telephone control unit, reference numeral 1082 shows a media router operation/management unit, and also, reference numeral 1083 indicates a correspondence table for telephone number/pin number/UDP port number. The media router operation/management unit 1028 contains a function capable of recording a telephone communication, and also a reliability administration function by detecting a failure occurred inside a media router. A telephone control unit 1081-1 is connected via a communication line to telephone sets 1011-1 through 1011-4. The telephone control unit 1081-1 has such a function that a protocol conversion is performed, a voice code conversion is effected, a fluctuation control is carried out, analog voice is converted into digital voice, or inverse-converted in a telephone communication. Reference numeral 1084 shows a line interface unit which contains a function capable of transmitting/receiving the IP packet, and owns a communication line 1040-1. The media router operation/managements unit 1056-1 may perform both a telephone connection control and a release control, which are similar to those of the media router operation/management unit 1056. In other words, the media router operation/management unit 1056-1 can execute the telephone connection control as explained with reference to FIG. 119, and also the telephone release control as explained with reference to FIG. 127.

The telephone number/pin number/UDP port number correspondence table 1083 indicates that the telephone number "Tel-No-1" corresponds to a pin number "T1" in the telephone control unit 1081-1 in a 1-to-1 correspondence relationship, and furthermore, a UDP port number "5004" corresponds to the pin number "T1" in a 1-to-1 correspondence relationship. Similarly, the correspondence table 1083 shows that the telephone number "Tel-No-12" corresponds to a pin number "T2" in the telephone control unit 1081-1 in a 1-to-1 correspondence relationship, and furthermore, a UDP port number "5006" corresponds to the pin number "T2" in a 1-to-1 correspondence relationship. Similarly, the correspondence table 1083 shows that the telephone number "Tel-No-13" corresponds to a pin number "T3" in the telephone control unit 1081-1 in a 1-to-1 correspondence relationship, and furthermore, a UDP port number "5008" corresponds to the pin number "T3" in a 1-to-1 correspondence relationship. Similarly, the correspondence table 1083 shows that the telephone number "Tel-No-14" corresponds to a pin number "T4" in the telephone control unit 1081-1 in a 1-to-1 correspondence relationship, and furthermore, a UDP port number "5010" corresponds to the pin number "T4" in a 1-to-1 correspondence relationship. Since the above-described correspondence relationship is established, for instance, in the case that the telephone number "Tel-No-1" is employed, the UDP port number is selected to be "5004" with reference to the telephone number/pin number/UDP port number correspondence table 1083. The UDP port number is used as a port number for identifying the known RTP used in the voice communication(namely, voice communication RTP port number).

Reference numeral 1083-1 of FIG. 129 shows another embodiment of a telephone number/pin number/UDP port number correspondence table, and is replaceable with the telephone number/pin number/UDP port number correspondence table 1083. In this case, the telephone number "Tel-No-1" indicates a pilot telephone number, the telephone sets 1011-1 to 1011-4 own the same telephone number "Tel-No-1", and the UDP port numbers are "5004" to "5010" different from each other. As a result, the telephone sets 1011-1 to 1011-4 may perform the telephone voice communications at the same time instant without interference, or jamming by using the different port numbers.

Reference numeral 1083-2 of FIG. 130 shows another embodiment of a telephone number/pin number/UDP port number correspondence table, and is replaceable with the telephone number/pin number/UDP port number correspondence table 1083. In this case, the telephone set 1011-2 having the telephone number "Tel-No-12" makes a telephone at a preceding time instant, and the UDP port number "5004" is applied. At the connection phase stage where the telephone communication is commenced, other unallocated UDP port numbers a "5006" and "5008" are applied to other telephone sets 1011-1, 1011-3 and 1011-4. In the release phase of the telephone call, the application of the applied UDP port number is stopped(returned). The connection control unit 1080-1 may realize the above-explained pilot telephone number by properly changing the correspondence combination between the pin number and the UDP port number.

Another Embodiment of Media Router

Referring now to FIG. 131, another embodiment as to the media router will be explained. A media router 1021-2 contains the function of the media router 1021 shown in FIG. 115, a connection control unit 1080-2 contains the function of the connection control unit 1080-1 shown in FIG. 128, and a telephone control unit 1081-2 contains the function of the telephone control unit 1081-1. Reference numeral 1040-2 shows a communication line to the network node apparatus. A media router administration unit 1056-2 contains the function of the media router administration unit 1056, and a telephone number server 1026-2 owns the function of the telephone number server 1026. Reference numeral 1085-1 shows a PBX control unit. Reference numeral 1085-2 represents a PBX control unit, reference numerals 1086 and 1087 show routers, reference numeral 1088 shows a media router operation/management unit, reference numeral 1089 indicates a communication line using the Ethernet, and reference numerals 1090 and 1091 show IP terminals having functions capable of transmitting/receiving IP packets. Also, reference numeral 1092 is a moving image transmitter/receiver having a function capable of transmitting/receiving an audio/visual(voice/image) signal. Both the IP terminals 1090 and 1091, and the moving image transmitter/receiver 1092 are connected to the router 1087 via the IP communication line. Also, the router 1087 is connected via an IP communication line to a LAN 1093. The connection control unit 1080-2, the telephone number server 1026-2, and the routers 1086/1087 are connected to each other via the communication line 1089.

The PBX 1085-2 implies a private branch ex change for storing a plurality of telephones. The PBX control unit 1085-1 is located between the connection control unit 1080-2 and the PBX 1085-2, and performs interface operations between both units, for example, performs a voice code (speech code) converting operation and a speech compressing operation. Since the above-explained arrangement is made, the media router 1021-2 directly stores a large number of telephone sets via the telephone control unit 1081-2, or via the PBX 1085-2. These telephone sets may establish the telephone communication via the IP transfer network to other telephone sets.

Since the media router 1021-2 is arranged in the above-explained manner, an IP packet entered from the communication line 1040-2 may be reached via the router 1086 and the communication line 1089 to the connection control unit 1080-2. Also, the IP packet may be transferred along a direction opposite to the above-described direction, namely transferred from the connection control unit 1080-2 toward the communication line 1089, the router 1086, and the communication line 1040-2. Similarly, an IP packet entered from the communication line 1040-2 may be reached via the router 1086, the communication line 1089, the router 1087, and the communication line to the IP terminal 1090, the IP terminal 1091, and the moving image transmitter/receiver 1092 employed in the LAN 1093. Also, the IP packet may be transferred along a direction opposite to the above-described direction, namely from the IP terminal 1090, the IP terminal 1091, and the moving image transmitter/receiver 1092 to the communication line, the router 1087, the communication line 1089, the router 1086, and the communication line 1040-2.

<<Calling Priority Order Control>>

Next, a description will now be made of a function of a calling priority order control executed by the media router 1021-2. FIG. 132 is a schematic diagram for representing a partial inner arrangement of the media router 1021-2, and a connection condition between an IP terminal and a LAN, connected to the media router 1021-2. If should be noted that communication lines provided in a half way are omitted. Reference numeral 1085-21 shows an IP packet sent from the telephone number server 1026-2, reference numeral 1085-22 represents an IP packet sent from the connection control unit 1080-2, reference numeral 1085-23 shows an IP packet sent from the LAN 1093, reference numeral 1085-24 indicates an IP packet sent from the IP terminal 1091, and also reference numeral 1085-25 denotes an IP packet sent from the moving image transmitter/receiver 1092. The IP packets 1085-21 to 1085-25 are transmitted via the Ethernet communication line 1089 and the router 1086 to the communication line 1040-2. In such a case that payloads of the IP packets 1085-21 to 1085-25 are equal to TCP, or UDP segments, both transmission source port numbers and destination port numbers are contained inside these segments.

Reference numeral 1085-3 of FIG. 133 shows a calling priority order control administration table used to determine a sequential order by which the above-explained IP packet is transmitted from the Ethernet communication line 1089 to the communication line 1040-2. In such a case that an IP packet is entered from the Ethernet communication line 1089, passes through the router 1086, and then is outputted to the communication line 1040-2, a check is made as to whether a payload contained inside the passing IP packet is equal to a TCP segment, or a UDP segment. When the payload corresponds to either the TCP segment or the UDP segment, a transmission source port number contained in the IP packet is checked. In such a case that the IP packets are reached to the router 1086 at time instants which are temporally closed to each other, such an IP packet containing either a TCP segment or a UDP segment, the transmission source port number of which is equal to "108", is transmitted with a top priority in view of temporal aspects. Next, IP packets are transmitted which contain TCP segments or UDP segments, the transmission source port numbers of which are equal to "5060", or "5004" to "5020".

Alternatively, the values of the port numbers described in the calling priority order control administration table 1085-3 may be replaced by other values to be used. Also, the calling priority order administration table 1085-3 may be substituted by the calling priority order control management table 1085-4 of FIG. 134 to be used. In such a case that the calling priority order control management table 1085-4 is used, such an IP packet whose transmission source IP address is "150.1.2.3" and also whose transmission source port number is "108" is employed as a top priority order, and then, such an IP packet whose transmission source IP address is "192.1.2.3" and whose transmission source port number is "5060", "5004" to "5020" is employed as a second top priority order.

The above-explained embodiment is featured by that while the port number designated by the calling priority order control administration table 1085-3 is used as a reference, or a set of both the IP address and the port number designated by the calling priority order control administration table 1085-4 is employed as a reference, the media router 1021-2 owns the function capable of determining the transmission sequence of the IP packets sent to the communication line 1040-2.

Next, a description is made of the embodiment with reference to FIG. 135. The media router 1021-3 is connected via the IP transfer network 1001-1 to the media router 1021-4; the IP terminal 1091-1, the moving image transmitter/receiver 1092-1, and the LAN 1093-1 are connected to the media router 1021-3; and the IP terminal 1090-1 is contained in the LAN 1093-1. Similarly, the IP terminal 1091-2, the moving image transmitter/receiver 1092-2 and the LAN 1093-2 are connected to the media router 1021-4; and the IP terminal 1090-2 is contained in the LAN 1093-2. Both the media routers 1021-3 and 1021-4 contain the function of the media router 1021-2 shown in FIG. 131. Since the above-explained circuit arrangement is made, the IP packet can be transmitted/received via the media router 1021-3, the IP transfer network 1001-1, and the media router 1021-4, for example, between the IP terminal 1090-1 and the IP terminal 1090-2; between the IP terminal 1091-1 and the IP terminal 1090-2; and between the moving image transmitter/receiver 1092-1 and the moving image transmitter/receiver 1092-2.

The operations of this embodiment will now be summarized. That is, the IP transfer network contains two, or more network node apparatus; the media router is connected via the IP communication line to any one of these network node apparatus; the internal IP address is applied to the termination units on the side of the network node apparatus of the IP communication line; the external IP addresses are applied to the respective media routers; and while telephone number server is contained in the media router, the media router is connected via the communication line to one, or more telephone sets. Also, as the record of the address administration table contained in the network node apparatus, both the external IP address and the internal IP address are contained; at least the IP communication record for determining the IP capsulating method is previously set; at least the transmission source telephone number and the destination telephone number are employed inside the call setting IP packet, and furthermore, the common port number is used for a plurality of telephone sets in the connection control. Also, since the individual voice communication with respect to each of the telephone sets is performed by allocating the different port numbers to the plural telephone sets, the media router contains either one or two sets of the PBX control unit; and the telephone control unit; and the media router is connectable to the IP terminal having the function of transmitting/receiving the IP packet, or the LAN, or to the voice/image transmitter/receiver having the function capable of transmitting/receiving the voice/image by being stored into the IP packet through the IP communication line. The media router contains the calling priority order control administration table. While the media router employs the transmission source port number of either the TCP segment or the UDP segment contained in the IP packet which is transferred from the telephone set, the IP terminal and the moving image transmitter/receiver, which are connected to the media router, and further employs the transmission source IP address, this media router may send out the IP packets to the communication line provided on the side of the network node apparatus in the order of the top priority order in accordance with the instruction of the calling priority order control administration table.

Furthermore, in this embodiment, the above-mentioned IP encapsulation and reverse-capsulation by the network node apparatus can be replaced to the simple encapsulation which forms an internal packet by adding a simple header to an external IP packet and the simple reverse-capsulation which removes the simple header from the internal packet, respectively.

9. 9th it in which Closed-Area Telephone Communication is Carried Out

In FIG. 136, reference numeral 1100 shows an IP transfer network. An IP address used outside the IP transfer network 1100 is called as an external IP address, and an IP address used inside the IP transfer network 1100 is called as an internal IP address. The external IP addresses "EA1" to "EA3" are applied to media routers 1115 to 1117, respectively. The telephone numbers "101", "102", "103" and "104" are applied to telephone sets 1121 to 1124, respectively. Similarly, the telephone numbers "211", "212", "213" and "214" are applied to telephone sets 1125 to 1128, respectively. Similarly, the telephone numbers "301", "302", "303" and "304" are applied to telephone sets 1129 to 1132, respectively.

Telephone number servers 1135 to 1137 own such a function similar to that of a domain name server(DNS) which is widely used in the Internet. In this embodiment, when a telephone number is indicated, the telephone number server answers an external IP address of a media router which stores thereinto a telephone set having the indicated telephone number. For instance, when the telephone number "212" is inquired to the telephone number server 1135, this telephone number server 1135 answers the external IP address "EA2" of the media router 1116 which stores the telephone set 1126 having the telephone number "212".

<<Preparation of Telephone Communication>>

In the network node apparatus 1101 to 1103, IP communication records are set as records of address administration tables 1110 to 1112 provided thereinto. For example, as an IP communication record indicated on a second row of the address administration table 1110, "EA1, EA3, IA1, IA3" are set. The IP communication record is employed in the telephone communication established between the media router 1115 having the external IP address "EA1" and the media router 1117 having the external IP address "EA3". Also, the internal IP address "IA1" is applied to the termination unit (logic terminal) provided on the side of the network node apparatus 1101 of a logic IP communication line 1144, and the internal IP address "IA3" is applied to the termination unit (logic terminal) provided on the side of the network node apparatus 1103 of a logic IP communication line 1146. Next, a description will now be made of a "terminal-to-terminal communication connection control method" used to execute a telephone communication from the telephone set 1121 via the media router 1115, the IP transfer network 1100, and the media router 1117 to the telephone set 1131.

<<Connection Phase>>

The user takes up the handset of the telephone set 1121 to dial the telephone number "303" of the telephone set 1131 of the communication counter party, and sends a telephone call to the media router administration unit 1138 provided inside the media router 1115 via the telephone control unit 1133 (Step A300 of FIG. 137). The media router administration unit 1138 confirms the telephone call (Step A301). The media router administration unit 1138 indicates the telephone number "303" to the telephone number server 1135 (Step A302), acquires the corresponding IP address "EA3" of the media router 1117 (Step A303), and produces an external IP packet 1134 (refer to FIG. 136), and then sends the external IP packet 1134 to the network node apparatus 1101 (Step A304). The external IP packet 1134 contains the transmission source telephone number "101", the destination telephone number "303", the telephone call identifier "C-ID", and the UDP port number "5004" as the connection control relative information.

In this case, such an example is made that an IP address area of an IP header of the external IP packet 1134 corresponds to both the transmission source IP address "EA1" and the destination IP address "EA3"; a payload portion of the external IP packet 1134 corresponds to a UDP segment; the transmission source port number is "5060;" and the destination port number is "5060".

Upon receipt of the IP packet 1134, the network node apparatus 1101 produces an internal IP packet 1140 by applying the capsulation method of the IP packet, while using the IP communication record indicated on the second row of the address administration table 1110 from the top row, namely "EA1, EA3, IA1, IA3", and then transmits the IP packet 1140 to the network node apparatus 1103 (Step A305). The internal IP packet 1140 is reached via the routers 1105, 1106, 1107 to the network node apparatus 1103. Then, the network node apparatus 1103 restores an IP packet 1134 by executing the inverse-capsulation method of such an IP packet except for a header thereof, and then sends the restored IP packet 1134 to the media router administration unit 1117 (Step A306). A series of these Steps A304, A305, A306 is called as a "call setting operation", and is expressed by "IAM" as an abbreviation symbol.

After the media router administration unit 1139 has acquired the transmission source telephone number "101", the destination telephone number "303", the IP address "EA1" of the media router 1115, the telephone call identifier "C-ID" from the above received IP packet, and the UDP port number "5004" which is used as the connection control relative information by the transmission source telephone set in the voice communication phase, the media router administration unit 1139 returns a confirmation of a telephone call (Steps A307, A308, A309). A series of these Steps A307, A308, A309 is called as a "call setting acceptance", and is expressed by "ACM" as an abbreviation symbol. Next, the media router administration unit 1139 sends such an IP packet for informing the telephone call(call reception) to the telephone set 1131 (Step A310), and then, the telephone set 1131 returns a response (Step A311). When the telephone set 1131 knows the telephone calling, the telephone calling sound (ringing) is produced. When the media router administration unit 1139 returns the telephone calling operation of the telephone set 1131 to the media router administration unit 1138 (Steps A312, A313, A314), this media router administration unit 1138 notifies to the transmission source telephone set 1121, such a fact that the destination telephone set 1131 is being called (Step A315). A series of these Steps A312, A313, A314 is called as either "call pass" or "calling", and is expressed by "CPG" as an abbreviation symbol.

When the user of the telephone set 1131 takes up the handset thereof(off hook), this off hook signal is notified to the media router administration unit 1139 (Step A320), and the media router administration unit 1139 returns a response (Step A321: response confirmation). Furthermore, the media router administration unit 1139 produces such an IP packet and then returns the IP packet to the media router administration unit 1138 (Steps A322, A323, A324). The IP packet contains the transmission source telephone number "101", the destination telephone number "303", the telephone call identifier "C-ID", and also the UDP port number "5008" which is used by the telephone set 1131 as the connection control relative information in the voice communication phase. The media router administration unit 1138 knows the UDP port number "5008" used by the destination telephone set from the received information. The media router administration unit 1138 reports the off hook notification sent from the telephone set 1131 to the telephone set 1121 (Step A325), and then the telephone set 1121 returns a response (Step A326: response confirmation). A series of these Steps A322, A323, A324 is called as a "response", is expressed by "ANM" as an abbreviation symbol. The Steps A321 and A326 of the response confirmation correspond to optional process steps. Thus, the connection phase of the telephone is accomplished by executing the above-explained process operation.

<<Communication Phase>>

When the user of the telephone set 1121 starts a telephone conversation by voice (speech), a voice signal is sent to the media router management unit 1138 (Step A350 of FIG. 137). Then, this media router administration unit 1138 stores the voice signal digitalized by the telephone control unit 1133 into a payload portion of an internal UDP segment of the IP packet, and thereafter the resulting IP packet is transmitted to the network node apparatus 1101 (Step A351). In the connection phase, as an internal transmission source port number of the UDP segment, both the transmission source port number "5004" and the destination port number "5006" are utilized.

Upon receipt of the IP packet containing the digitalized voice, the network node apparatus 1101 may capsulate the IP packet to constitute an internal IP packet 1141. The internal IP packet 1141 is reached via the routers 1105, 1106, 1107 to the network node apparatus 1103 (Step A352). The network node apparatus 1103 executes an IP inverse-capsulation of the internal IP packet 1141 except for the internal IP header, and then, transmits the resulting external IP packet to the media router administration unit 1139 (Step A353) so as to deliver the external IP packet to the telephone set 1131 (Step A354). An IP packet containing the digitalized voice of the user of the telephone set 1131 is transmitted along a direction opposite to the above-explained direction to the telephone set 1121 (Steps A360 to A364).

<<Release Phase>>

In the case that the user of the telephone set 1121 notifies the end of the telephone communication to the media router administration unit (Step A380 of FIG. 137), the resulting IP packet is reached to the telephone set 1131 via a series of process steps (Steps A381 to A383) in a similar manner to those as explained in other embodiments (Step A384). The end report of the telephone communication is returned via Steps A386 through A388 to the media router unit 1138. A series of these Steps A380, A381, A382, A383, A384 is called as a "release", and is expressed by "REL" as an abbreviation symbol. Furthermore, a series of these Steps A386, A387, A388 is called as a "completion of release", and is expressed by "RLC" as a abbreviation symbol.

The telephone communications may be established among other telephone sets. For example, a telephone communication may be established from the telephone set 1121 to another telephone set 1126 having a telephone number "212", and a telephone communication may be established from the telephone set 1132 to another telephone set 1127 having a telephone number "213" by way of a terminal-to-terminal communication connection control method similar to the previous control method.

<<Detailed Description of Telephone Number Server>>

The function of the telephone number server will now be explained more in detail. The telephone sets having the telephone numbers of 100 digits are connected to the media router 1115, the telephone sets having the telephone numbers of 200 digits are connected to the media router 1116, and the telephone sets having the telephone numbers of 300 digits are connected to the media router 1117. Considering the connection relationship, a tree structure of the telephone numbers may be determined as represented in FIG. 138. Domains 1151 to 1153 may be defined in the form of the tree structure at the same level under low grade of the route 1150. Thus, the domain 1151 may provide information related to the telephone numbers of 100 digits, the domain 1152 may provide information related to the telephone numbers of 200 digits, and the domain 1153 may provide information related to the telephone numbers of 300 digits. The following rules are made: The telephone numbers of 100 digits are expressed as a domain name of "1.", the telephone numbers of 200 digits are expressed as a domain name of "2.", and the telephone numbers of 300 digits are expressed as a domain name of "3.", and also these domain names/telephone numbers are rearranged as shown in FIG. 139. In FIG. 139, symbol "1XX" shows the telephone numbers of 100 digits, symbol "2XX" indicates the telephone numbers of 200 digits, and symbol "3XX" represents the telephone numbers of 300 digits.

It should be understood that while the known technical idea as to the domain name server DNS is applied, such a function capable of handling a function of a telephone number server for managing the route 1150 may be applied to the telephone number server 1135. As the function of the telephone number server for managing the route 1150, when "1. " is inquired, the telephone number server answers the IP address "EA1" of the telephone number server 1135 for directly managing the domain 1151. When "2." and "3." are inquired, the server answers the addresses "EA2" and "EA3", respectively. In the case that the telephone number server is inquired as to the domain names which are directly managed by the server, this server may answer an IP address of another telephone number server in a half way. However, the telephone number server finally answers the IP address corresponding to the inquired domain name(refer to FIG. 140). As a consequence, when "3." N is inquired to the telephone number server 1136, the IP address "EA3" corresponding to "3." may be acquired. Such a concrete realizing method of "redialing function of telephone number server" in which inquires are repeatedly made between telephone number servers can be realized by employing the redialing function of the domain name server known in the technical field.

<<Another Embodiment of Telephone Number Server>>

As indicated in FIG. 141, while the media routers 1191 to 1197 are connected via the communication line to any one of the network node apparatus 1180 to 1184 of the IP transfer network 1190, a telephone number of a telephone set which is connected to the media router 1191 belonging to a company "A" is equal to the opened telephone number "1-1XX" which is notified to other companies "B" and "C". In this case, symbol "-" is neglected and is equal to an empty space as a telephone number, and symbol "XX" implies numbers of "00" to "99" in the decimal notation. Also, a telephone number of a telephone set which is connected to the media router 1193 belonging to the company "A" is equal to the opened telephone number "1-2XX". A telephone number of a telephone set which is connected to the media router 1195 belonging to the company "A" corresponds to the telephone number "1-3XX" opened to other companies, and also an extension telephone number "8XX" which is not opened to other companies than the company "A". A telephone number of a telephone set which is connected to the media router 1192 belonging to the company "B" corresponds to the opened telephone number "2-1XX", and a telephone number of a telephone set which is connected to the media router 1194 belonging to the company "B" corresponds to the opened telephone number "2-2XX". A telephone number of a telephone set which is connected to the media router 1196 belonging to the company "C" corresponds to the opened telephone number "3-XXX". Symbol "XXX" implies numbers "000" to "999" of the decimal notation. A telephone number of a telephone set which is connected to the media router 1197 belonging to the company "A" corresponds to an extension telephone number "7XX" which is not opened to other companies than the company "A".

FIG. 142 represents the system of the above-explained telephone numbers as a tree structure of telephone numbers. Reference numeral 1185 shows a route domain, reference numeral 1186 indicates a domain directed to the non-opened extension telephone number of the company "A", and reference numeral 1187 shows a domain directed to the opened telephone number of the company "A", and reference numeral 1188 indicates a domain made of the opened telephone number of the company "B", and also reference numeral 1189 is a domain directed to the opened telephone number of the company "C". In this case, a domain name "##" of the reference numeral 1186 corresponds to a secret domain name which is used only in the media routers 1195 and 1197 belonging to the company "A". The secret domain name contains no numeral, and the length of the secret domain name is determined as such a long name of 20 characters. As explained above, any one can hardly know and/or acquire the value of the secret domain name "##", or the secret domain name "##" itself which is exclusively used by the company "A" from the media routers 1192, 1194, 1196 of the company "B" and the company "C". For example, no IP address is answered with respect to the inquiry "##". As a result, safety characteristics may be improved in view of the following implication. That is, a telephone user of either the company "B" or the company "C" can hardly access the telephone-set having the extension telephone number of the company "A", namely can hardly use the extension telephone number.

When the user of the telephone set 1198 dials the destination telephone number "2-145", the media router administration unit 1195-1 provided in the media router 1195 converts the telephone number "2-145" into "1.2." corresponding to the domain name of the telephone number, as indicated in a conversion table 1185-1 of FIG. 143. Next, when the user of the telephone set inquiries by indicating the domain name format "1.2." to the telephone number server 1195-2 of the media router 1195, the telephone number server 1195-2 answers an IP address "MR2" of the media router 1192 corresponding to "1.2.", as indicated in a table 1185-2 of FIG. 144.

A condition as to whether or not a telephone call can be made from a telephone set having an extension telephone number "700" of the company "A" to a telephone set having a telephone number of "2-100" of the company "B" may be determined based upon setting conditions of the domain name server. Both conditions may be realized.

The above-explained operations of the ninth embodiment will now be summarized. That is, the IP transfer network contains two, or more network node apparatus; the media router is connected via the logic IP communication line to any one of these network node apparatus; the internal IP address is applied to the termination units on the side of the network node apparatus of the logic IP communication line; the external. IP addresses are applied to the respective media routers; and while telephone number server is contained in the media router, the media router is connected via the communication line to one, or more telephone sets. Also, as the record of the address administration table contained in the network node apparatus, both the external IP address and the internal IP address are contained and at least the IP communication record for determining the IP capsulating method is previously set. While preselected IP communication records are set within the network node apparatus among the company "A", the company "B" and the company "C", such a closed-area telephone communication network can be set. In this communication network, the telephone numbers("1-XXX", "2-XXX", "3-XXX") which are effective only among the companies "A", "B", "C" are used.

The telephone communications can be established as follows: A telephone call may be issued from a telephone set having a telephone number "1-100" of the company "A" to a telephone set having a telephone number "1-200" of the company "A". Also, a telephone call may be issued from the telephone set having telephone number "1-100" of the company "A" to a telephone set having a telephone number "2-100" of the company "B". Also, a telephone call can be issued from the telephone set having the telephone number "1-100" of the company "A" to a telephone set having a telephone number "3-110" of the company "C", and also to telephone sets having extension telephone numbers "700" and "800" of this company "A". Also, a telephone call can be issued from a telephone set having an extension telephone number "700" of the company "A" to a telephone set having an extension telephone number "800" of the company "A", and also to a telephone set having telephone number "1-200" of the company "A". As previously explained by using symbol "##", no telephone call can be made from a telephone set having a telephone number "2-100" of the company "B" to the telephone set having the extension telephone number "800" of the company "A".

Assuming now that a total number of the companies is selected to be "N", the following telephone communications can be established. While an IP communication code is set in order that the telephone communications can be made only among preselected companies "A-1", "A-2", . . . , "A-N" (symbol N>2), the closed area telephone communication can be carried out. A telephone set of the company "A-1" which is connected to the closed area telephone communication network which is effective among the companies "A-1", "A-2", . . . , "A-N" (symbol N>2) may establish a telephone communication with an extension telephone set of the company "A-1", but telephone sets of companies other than the company "A-1" cannot establish a telephone communication with the extension telephone set of the company "A-1".

Furthermore, in this embodiment, the above-mentioned IP encapsulation and reverse-capsulation by the network node apparatus can be replaced to the simple encapsulation which forms an internal packet by adding a simple header to an external IP packet and the simple reverse-capsulation which removes the simple header from the internal packet, respectively.

10. 10th Embodiment Combined with Closed-Area Telephone Communication and Open-Area Telephone Communication In FIG. 145, reference numeral 1200 shows an IP transfer network, and external IP addresses "EA1" to "EA6" are applied to media routers 1201 to 1206, respectively. A telephone number "1001" is applied to a telephone set 1208, and a telephone number "1002" is applied to a telephone set 1209. A telephone number "101" is applied to a telephone set 1210, and a telephone number "102" is applied to a telephone set 1211. Also, telephone numbers "3001" to "3004" are applied to telephone sets 1212 to 1215, respectively. Telephone sets 1216 to 1219 connected to the media router 1202 own telephone numbers "234-2001" to "234-2004", respectively.

Also, telephone numbers "2001" to "2004" are applied to telephone sets 1220 to 1223, respectively, and telephone numbers "301" to "304" are applied to telephone sets 1224 to 1227, respectively. Further, telephone numbers "201" to "204" are applied to telephone sets 1228 to 1231, respectively. In this case, telephone numbers "1XX", "2XX" and "3XX" are equal to extension telephone numbers which are exclusively used to the company "A", and symbol "X" shows numeral values defined from "0" to "9" in the decimal notation. A telephone number "1XXX" is a telephone number of the company "A", and a telephone number "2XXX" is a telephone number of the company "B", and a telephone number "3XXX" shows a telephone number of the company "C". These three telephone numbers "1XXX", "2XXX" and "3XXX" correspond to telephone numbers which constitute a logical closed-area telephone network used to establish a telephone communication only among the company A, the company B and the company C, and are referred to as closed-area telephone numbers. It should be noted that telephone numbers "234-2001" to "234-2004" are equal to such telephone numbers which are employed so as to establish a telephone communication with respect to an undefinite communication counter party, and will be referred to as open-area telephone numbers.

The telephone number servers 1134, 1272, and 1137 to 1142 own such a function similar to that of a domain name server(DNS) used in the Internet. When a telephone number is indicated, a telephone number server answers an external IP address of a media router which stores a telephone set having a telephone number thereof. For example, when a telephone number "3001" is inquired to the telephone number server 1137, the external IP address "EA6" of the media router 1206 which stores the telephone set 1212 having the telephone number "3001" is answered.

<<Preparation of Terminal-to-Terminal Connection Control for Telephone Communication>>

As indicated in FIG. 145, network node apparatus 1244 to 1248 contain address administration tables 1250 to 1255, respectively, in which IP communication records, as explained in other embodiments, are set. For instance, as an IP communication record indicated in a first row of the address administration table 1250, "EA1, EA3, IA1, IA3" are set. The IP communication record is used in a telephone communication established between the media router 1201 having the external IP address "EA1" and the media router 1203 having the external IP address "EA3". The internal IP address "IA1" is applied to a termination unit (logic terminal) provided on the side of the network node apparatus 1244 of a logic IP communication line 1257, whereas the internal IP address "IA3" is applied to a termination unit provided on the side of the network node apparatus 1248 of a logic IP communication line 1258.

Referring now to FIG. 145 to FIG. 146, a "terminal-to-terminal communication connection control method" will be described which is employed so as to establish a telephone communication from the telephone set 1208 having the telephone number "1001" via the IP transfer network 1200 to the telephone set 1224 having the telephone number "301".

<<Connection Phase>>

When the handset of the telephone set 1208 is taken up to dial the telephone number "301" of the telephone set 1224 having the communication counter party, a telephone call signal is transferred to the media router administration unit 1260 (Step H300), and then the media router administration unit 1260 confirms a telephone call (Step H301). The media router administration unit 1260 checks a table 1255-1 of FIG. 192 which is held in the media router administration unit 1260 so as to know such a fact that a domain name of a telephone number corresponding to the telephone number "301" is equal to "3.#.a", and then, inquires the telephone number domain name "3.#.a" to the telephone number server 1137 (Step H302). The telephone number server 1137 answers the IP address "EA4" of the media router 1204 in accordance with a rule shown in a table 1255-2 of FIG. 193 (Step H303).

Next, the telephone number server 1137 produces an external IP packet 1310 (FIG. 147), and then transmits the produced external IP packet 1310 to the network node apparatus 1244 (Step H304). The external IP packet 1310 contains at least the transmission source telephone number "1001", the destination telephone number "301", and also the UDP port number "5004" which is used in the telephone communication transmissions of the telephone set 1208. Alternatively, it should be understood that relative information "Info-1" may be contained in the external IP packet 1310, and the relative information "Info-1" is constituted by an identification number of a telephone call, a speech compression system, and an identification title such as a speech (voice) code conversion, which are related to the media router 1260.

Upon receipt of the IP packet 1310, the network node apparatus 1244 produces an internal IP packet 1311 (refer to FIG. 148) to transmit the internal IP packet 1311 by employing both the IP packet 1310 and the IP communication record (namely, EA1, EA4, IA1, IA4) indicated on the second row of the address administration table 1250 from the top row, while applying the capsulating technical method of the IP packet. The internal IP packet 1311 is reached via the routers 1263 and 1264 shown in FIG. 145 to the network node apparatus 1246 (Step H305). Then, the network node apparatus 1246 performs the inverse-capsulation of the IP packet so as to restore a IP packet, and then, sends the restored IP packet to the media router 1204 (Step H306).

The media router management unit 1265 acquires at least the transmission source telephone number "1001", the destination telephone number "301", and the communication-purpose UDP port number "5004" from the received IP packet, and thereafter, returns a confirmation of a telephone calling operation (Steps H307, H308, H309).

Next, the media router administration unit 1265 transfers the telephone call (call reception) to the telephone set 1224 (Step H310). The telephone set 1224 returns to the media router administration unit 1265 (Step H311), and furthermore, produces a telephone calling sound (ringing). The media router administration unit 1265 notifies the telephone call of the telephone set 1224 via the media router administration unit 1260 to the destination telephone set 1208 (Steps H312, H313, H314, H315). At the Step H314, the media router administration unit 1265 notifies the transmission source telephone number "1001", the destination telephone number "301", and the UDP port number "5008" used in the telephone communication transmission of the telephone set 1224 to the telephone set 1208.

When the user of the telephone set 1224 takes up the handset thereof, the telephone set 1224 notifies the fact to the media router administration unit 1265 (Step H320). The media router administration unit 1265 responds a response made at the step H320 via the media router 1260 to the telephone set 1208 of the transmission source (Steps H322, H323, H324, H325). The telephone set 1208 confirms the response with respect to the media router 1260 (Step H321), and then, the media router 1265 confirms the response with respect to the telephone set 1224 (Step H326). It should also be noted that the Steps H321 and H326 correspond to an optical process step. With execution of the above-described process operations, the connection phase of the telephone set is completed.

In the above-described connection phase, an internal portion of an external IP packet is a UDP segment, and as both a transmission UDP port number and a reception UDP port number, for example, "5060" is employed.

<<Communication Phase>>

A telephone communication established between the user of the telephone set 1208 and the telephone set 1224 corresponds to steps similar to those explained in other embodiments. In this telephone communication, both an IP communication record indicated in the second row of the address administration table 1250 (namely, records of "EA1, EA4, IA1, IA4", and an IP communication record indicated in a first row of an address administration table 1253 (namely, records of "EA4, EA1, IA4, IA1") are employed. The voice (speech) is sent from the telephone set 1208 to the media router management unit 1260 (step H350). In the media router administration unit 1260, the above-described voice signal is digitalized, and the digital voice data is transferred to a payload portion of an external IP packet 1312 (refer to FIG. 149), and then the resulting IP packet 1312 is reached to the network node apparatus 1244. Then, after the external IP packet is IP-capsulated to be converted into an internal IP packet 1313 (refer to FIG. 150), the internal IP packet 1313 is transferred into the inside of the IP transfer network 1200, and then, is reached to the network node apparatus 1246. The network node apparatus 1246 inverse-capsulates the internal IP packet 1313 and supplies the inverse-capsulated IP packet to the media router administration unit 1265 (Steps H351 to H353). In this media router management unit 1265, the digitalized voice data is converted into an analog voice signal, and then, the analog voice signal is reached to the telephone set 1224 (Step H354).

The telephone voice signal produced from the telephone set 1224 may be similarly transferred to the telephone set 1208 along a direction opposite to the above-explained direction (Steps H360 to H364). In the communication phase, such an example is shown that an internal portion of the external IP packet 1312 is a UDP segment, a UDP port number sent from the telephone set 1208 is "5004", and a UDP port number received by the telephone set 1208 is "5008".

<<Release Phase>>

When the user of the telephone set 1208 notifies the end of the telephone communication (Step H380 of FIG. 146), a series of process steps(namely, Steps H381 to H383) are performed in a similar manner to those as explained in other embodiment. The notification is reached to the telephone set 1224 (Step H384). Then, media router administration unit 1265 notifies a release completion to the media router administration unit 1260 (Steps H386 to H388). In the above-explained release phase, a format of an external IP packet is similar to that of the IP packet 1310 used in the above-described connection phase. That is, a payload portion of this external IP packet is the UDP segment, and as to both the transmission UDP port number and the reception UDP port number, for instance, "5060" is employed.

Another Example Using Telephone Number Server Contained in Media Router

When the user takes up the handset of the telephone set 1208 so as to dial a telephone number "2001" of a telephone set 1220 belonging to another company of a communication counter party, the media router administration unit 1260 checks a table 1255-1 held therein, and knows that a domain name of a telephone number corresponding to the telephone number "2001" is equal to "b.". Next, the media router administration unit 1260 inquires the telephone number domain name "b." to the telephone number server 1137. Then, the telephone number server 1137 answers the IP address "EA5" of the media router 1205 which is connected to the telephone set 1220. As a result, the telephone communication can be established between the telephone set 1208 and the telephone set 1220, which belong to different companies in accordance with such a similar terminal-to-terminal communication connection control method.

In the above-explained terminal-to-terminal communication connection control method, while both the telephone number servers 1134 and 1272 employed inside the IP transfer network 1200 are not used, the telephone number server 1137 provided in the media router 1201 is used. There is such a feature that the IP communication records are used which have already been set in the address administration tables 1250, 1253 and 1252.

<<Method for Producing IP Communication Record to Establish Telephone Communication by Employing Telephone Number Server Within IP Transfer Network>>

Referring now to FIG. 151, a description will be made of a terminal-to-terminal communication connection control method for establishing a telephone communication from the telephone set 1208 having the telephone number "1001" to a telephone set 1216 having a telephone number "234-2001".

<<Connection Phase>>

When the handset of the telephone set 1208 is taken up, a calling signal is transferred to the media router administration unit 1260 (Step V0). Then, this media router administration unit 1260 confirms the telephone calling operation (Step V1), and checks the table 1255-1 (refer to FIG. 192) held therein so as to grasp that a domain name of a telephone number corresponding to the telephone number "234-2001" is equal to "0.". Next, the media router administration unit 1260 inquiries the telephone number domain name "0." to the telephone number server 1137 (Step V2), and the telephone number server 1137 answers the external IP address "EA81" of the telephone proxy server 1270 to the media router administration unit 1260 (Step V3). The external IP address is employed so as to access the telephone number server 1272 for managing the above-explained domain name "0.".

Next, while the transmission source IP address is selected to be the IP address "EA1" of the media router 1201 and also the destination IP address is selected to be the previously acquired IP address "EA81", the media router administration unit 1260 produces such an IP packet 1320 (refer to FIG. 152), and thereafter transmits the IP packet 1320 to the network node apparatus 1244 (Step V4). The IP packet 1320 contains the transmission source telephone number "1001", the destination telephone number "234-2001", the UDP port number "5006" used in the telephone voice communication, and also the additional information "Info-2". A payload portion of the IP packet 1320 corresponds to a UDP packet, and both the transmission source port number and the destination port number are selected to be "5060". The additional information corresponds to such information which is internally used in the media router 1260. The additional information corresponds to, for example, the speech compression system (G.711 and G729A) employed so as to use the telephone set 1208, the speech code conversion system, and also the number for discriminating the telephone call. It should be noted that both the telephone administration server 1271 and the telephone proxy server 1270 are not related to the above-explained additional information.

The network node apparatus 1244 retrieves the IP communication record contained in the address administration table 1250 of FIG. 145 by employing both the internal IP address "IA1" and the destination IP address "EA81" contained in the IP packet 1320. The internal IP address "IA1" is applied to the termination unit of the logic communication line 1257 into which the external IP packet 1320 is entered. Furthermore, the network node apparatus 1244 confirms such a fact that the transmission source IP address "EA1" contained in the IP packet 1320 is involved in the IP communication record. In this case, the network node apparatus 1244 produces an IP packet 1321 (refer to FIG. 153) by employing a record indicated in a fourth row of the address administration table 1250 from the top row, namely "EA1, EA81, IA1, IA81" equal to IP address (i.e., "IA1" and "IA81") which are described on a third address and a fourth address within the record, while applying the IP packet capsulating technical idea. Then, the network node apparatus 1244 transmits the produced IP packet 1321 to the telephone proxy server 1270 whose internal IP address is equal to "IA81" (Step V5).

When the telephone proxy server 1270 receives the IP packet 1321, the pilot telephone administration server 1270 produces a payload portion of the IP packet 1321, and such an IP packet 1322 (refer to FIG. 154) in which the above-explained addresses "EA1, IA1, EA81, IA81" are contained in the payload portion thereof, and then, transmits the IP packet 1322 to the telephone administration server 1271 (Step V6). In this case, the telephone proxy server 1270 uses an IP address "IA91" of the telephone administration server 1271, which is previously saved.

<<Control of Telephone Calling Line Number>>

The telephone administration server 1271 derives the address "EA1" of the media router 1201 on the transmission side from the received IP packet 1322, and compares the derived address with a telephone call line administration table 1326-5 of FIG. 177. As to such a record whose IP address is equal to "EA1", the telephone administration server 1271 increases the under use line number by "1" to compare the increased line number with the upper-limit line number. In this 10-th embodiment, since the under use line number is equal to "2" and the upper-limit line number is equal to "5", the subsequent procedure is carried out. Then the under use line number is larger than the upper-limit line number, the telephone administration server 1271 interrupts the present process operation, which the process operation is not advanced to the subsequent connection phase. Alternatively, the telephone administration server 1271 forms such an IP packet for explaining the interrupt reason, and then notifies the IP packet via the telephone proxy server 1270 to the transmission source media router administration unit 1260. The telephone administration server 1271 may selectively determine as to whether or not the telephone call line number control is carried out.

<<Management of Line Number>>

The telephone administration server 1271 reads out the IP packet 1322 (FIG. 154) so as to acquire both the transmission source telephone number "1001" and the destination telephone number "234-2001", and then, calculates a line number "CIC-2" (Circuit Identification Code) for managing a voice communication line from a set of these two telephone numbers. Next, the telephone administration server 1271 writes in a record of a CIC administration table 1323 (refer to FIG. 155), the line number "CIC-2"; the transmission source telephone number "1001"; the destination telephone number "234-2001"; both the external IP address "EA1" and the internal IP address "IA1" of the media router 1201 to which the telephone set 1208 is connected; both the external IP address "EA81" and the internal IP address "IA81" of the telephone proxy server 1270; an IP address "IA91" of the telephone administration server 1271; the procedure segment "IAM"; and a writing time instant (year, month, day, time, minute, second) "St-2".

Next, the telephone administration server 1271 indicates an IP packet 1324 (refer to FIG. 156) to the telephone number server 1272 (Step V7). The IP packet 1324 inquires the IP address related to the destination telephone number "234-2001". The telephone number server 1272 answers an IP packet 1325 (refer to FIG. 157) to the telephone administration server 1271 (Step V8). The IP packet 1325 contains both the external IP address "EA2" and the internal IP address "IA2" of the media router 1202 connected to the telephone set 1216; both the external IP address "EA82" and the internal IP address "IA82" of the telephone proxy server 1275; and the IP address "IA92" of the telephone administration server 1274. Then, the telephone administration server 1271 adds five sets of IP addresses("EA2, IA2, EA82, IA82, IA92") acquired from the telephone number server 1272 to the CIC administration table 1323 (refer to FIG. 155). This result is indicated in a column of an IP address item of the second row record of the CIC administration table 1326-1 (refer to FIG. 158).

Next, the telephone administration server 1271 produces an IP packet 1327 (refer to FIG. 159, will be referred to as an "IAM packet") from the packet 1322 (FIG. 154) with reference to the IP address information of the CIC administration table 1326-1 (FIG. 158), and then transmits the formed IP packet 1327 to the telephone administration server 1274 (Step V9). In this case, the transmission source IP address of the IP packet 1327 corresponds to "IA91" of the telephone administration server, and the destination IP address thereof corresponds to "IA92" of the telephone administration server 1274. The operation of the telephone administration server 1271 is advanced to a waiting state of a Step V16 (will be discussed later), and also initiates the Step V16 waiting timer corresponding to the line number "CIC-2". When the counting operation of this timer is completed, a release procedure of a communication line is commenced similar to a process operation defined at a Step V60 (will be explained later).

<<Control of Call Receiving Line Number>>

The telephone administration server 1274 derives the address "EA2" of the media router 1202 on the destination side from the received IP packet 1327 (FIG. 159), and compares the derived address with a telephone call line administration table 1326-6 of FIG. 178. The telephone administration server 1274 increases the under use line number by "1" to compare the increased line number with the upper-limit line number. In this 10-th embodiment, since the under use line number is equal to "2" and the upper-limit line number is equal to "7", the subsequent procedure is carried out, as to the record of the address "EA2". While the telephone call reception line administration table 1326-6 is employed, the telephone administration server 1271 may selectively determine as to whether or not the telephone call line number control is carried out.

<<Management of Line Number>>

Upon receipt of the IP packet 1327, the telephone administration server 1274 derives the line number "CIC-2", the procedure segment "IAM", the transmission source telephone number "1001", the destination telephone number "234-2001", and the IP addresses("EA1", "IA1", "EA81", "IA81", "IA91", "EA2", "IA2", "EA82", "IA82", "IA92"), which are contained in the payload portion of the received IP packet 1327, and thereafter writes these derived items as a record of a CIC administration table 1326-2 (refer to FIG. 160) managed by the telephone administration server 1274. This writing time instant "St-3" is also written into the record of the CIC administration table 1326-2 by the telephone administration server 1274.

Subsequently, the telephone administration server 1274 forms an IP packet 1328 (refer to FIG. 161) by employing the information acquired from the IP packet 1327, and transmits the formed IP packet 1328 to the telephone proxy server 1275 (Step V10). The payload of the IP packet 1328 contains both a UDP segment and an address area, the IP address "EA1" of the transmission source media router 1206 is additionally written into the UDP segment. The address area contains the IP addresses "EA2, IA2, EA82, IA82".

The telephone proxy server 1275 produces an IP packet 1329 (refer to FIG. 162) by using the information acquired from the IP packet 1328, and then sends the produced IP packet 1329 to the network node apparatus 1247. The IP packet 1329 having the transmission source address of "IA82" and the destination address of "IA2" is reached to the network node apparatus 1247 (Step V11). Then, the network node apparatus 1247 executes the inverse-capsulating operation as to the received IP packet 1329 to produce an IP packet 1330 (refer to FIG. 163), and thereafter transmits the produced IP packet 1330 to the media router administration unit 1267 (Step V12).

The media router administration unit 1267 receives the IP packet 1330 so as to confirm as to whether or not the destination telephone number "234-2001" contained in the IP packet 1330 can be received. When the destination telephone number can be received, the media router administration unit 1267 notifies the telephone call (call reception) to the telephone set 1216 (Step V20). Furthermore, the media router administration unit 1267 reads out the contents of the IP packet 1330 to save the read contents, namely the transmission source telephone number "1001", the destination telephone number "234-2001", the IP address "EA1" of the transmission source, the UDP port number "5006" of the transmission source, and the additional information Info-2. In order that a call reception possibility (namely, discrimination between call receivable and call not receivable) of the telephone set 1216 is notified, the media router administration unit 1267 produces such an IP packet containing the transmission source telephone number "1001", the destination telephone number "234-2001", and the call reception possibility. Then, the media router administration unit 1267 notifies this produced IP packet to the telephone administration server 1274 (Steps V13, V14, V15). It should be noted that the format of the IP packet used at the Steps V13, V14, V15 is similar to a format of an IP packet employed in Steps V22, V23, V24 (will be discussed later).

The telephone administration server 1274 receives the above-explained IP packet which has been formed and transmitted by the media router administration unit 1267, and then, derives the transmission source telephone number "1001", the destination telephone number "234-2001", and the information of the call reception possibility from the received IP packet. Then, the telephone administration server 1274 calculates the line number "CIC-2" from the two telephone numbers, and produces such an IP packet 1331 (refer to FIG. 164, will be referred to as an "ACM packet") which contains the line number "CIC-2" and the information as to the call reception possibility of the telephone set 1216, and then transmits the IP packet to the telephone administration server 1271 (Step V16). The telephone administration server 1271 derives both the line number "CIC-2" and the procedure segment "ACM" from the received IP packet 1331, and stops the ACM waiting timer corresponding to the line number "CIC-2" which has been set at the time instant of the above Step V9. The telephone administration server 1271 checks the CIC administration table 1326-1 (refer to FIG. 158) held by the telephone administration server 1271 so as to find out such a record whose line number is equal to "CIC-2", and rewrites a procedure segment column of the above-explained record into the above-mentioned procedure segment "ACM".

Next, the telephone administration server 1271 produces such an IP packet for indicating that the ACM packet is received (the IP packet includes information of call reception possibility of telephone set 1216), and then notifies the IP packet to the media router administration unit 1260 (Steps V17, V18, V19). It should be noted that the format of the IP packet used at the Steps V17, V18, V19 is identical to a format of an IP packet employed in Steps V26, V27, V28 (will be discussed later). The process operations defined at the Steps V17, V18, V19 may be selectively carried out.

When the telephone set 1216 reports the telephone calling operation to the media router administration unit 1267 (Step V21), the media router administration unit 1267 produces such an IP packet 1332 (refer to FIG. 165) and transmits the IP packet 1332 to the network node apparatus 1247 in order to notify such a fact that the telephone set 1216 is being called (Step V22). The produced IP packet 1332 contains the transmission source telephone number "1001" the destination telephone number "234-2001", the UDP port number "5008" used in the voice communication by the telephone set, and the additional information Info-3. The network node apparatus 1247 capsulates the IP packet 1332 by using such a record that the address values of the address administration table 1254 are "EA2, EA82, IA2, IA82", and thus produces an IP packet 1332-2 (refer to FIG. 166). The IP packet 1332-1 is transmitted to the pilot telephone administration server 1275 (Step V23). The pilot telephone administration server 1275 forms an IP packet 1332-2 (refer to FIG. 167), and then transmits the IP packet 1332-2 to the telephone administration server 1274 (Step V24).

The telephone administration server 1274 derives both the transmission source telephone number "1001" and the destination telephone number "234-2001" from the received IP packet 1332-2, and then calculates the line number "CIC-2" from the two telephone numbers so as to produce an IP packet 1333 (refer to FIG. 168, called as a "CPG" packet). The telephone administration server 1274 transmits the IP packet 1333 to the telephone administration server 1271 (Step V25). The IP packet 1333 contains both the UDP port number "5008" and the additional information "Info-3" acquired from the IP packet 1332-2.

The telephone administration server 1271 derives the line number "CIC-2", the procedure segment "CPG", the UDP port number "5008", and the additional information Info-3 from the received IP packet 1333, and rewrites the procedure segment of the line number "CIC-2" of the CIC management table 1326-1 (FIG. 158) as "CPG". Then, the telephone administration server 1271 reads out the IP addresses "EA1, IA1, EA81, IA81", the transmission source telephone number "1001", and the destination telephone number "234-2001", and then produces an IP packet 1333-1 (refer to FIG. 169) by employing all of the acquired information, and transmits the produced IP packet 1333-1 to the telephone proxy server (Step V26).

The telephone proxy server 1270 produces an IP packet 1333-2 (refer to FIG. 170) by using the information contained in the received IP packet 1333-1, and then sends the produced IP packet 1333-2 to the network node apparatus 1244 (Step V27). The network node apparatus 1244 executes the inverse-capsulating operation as to the received IP packet 1333-2 to produce an IP packet 1333-3 (refer to FIG. 171), and thereafter transmits the produced IP packet 1333-3 to the media router administration unit 1260 (Step V28). The media router administration unit 1260 reads out from the received IP packet 1333-3, the transmission source telephone number "1001", the destination telephone number "234-2001", the destination IP address "EA2", the destination UPD port number "5008", and the additional information Info-3 so as to save the read information. The media router administration unit 1260 notifies such a fact that the destination telephone set is being called to the telephone set 1208 (Step V29).

Next, when the user of the telephone set 1216 responds to the telephone call (Step V31), the telephone set 1216 transmits the IP packet containing both the transmission source telephone number "1001" and the destination telephone number "234-2001" to the telephone administration server 1274 in order to notify the response of the telephone set 1216 (Steps V32, V33, V34). The telephone administration server 1274 derives both the transmission source telephone number "1001" and the destination telephone number "234-2001" from the received IP packet so as to calculate the line number "CIC-2" from the two telephone numbers, and produces such an IP packet 1334 (refer to FIG. 172, is called as an "ANM" packet) containing at least the calculated line number "CIC-2", and then transmits the IP packet 1334 to the telephone administration server 1271 (Step V35). The telephone administration server 1271 derives both the line number "CIC-2" and the procedure segment "ANM" from the received IP packet 1334, and checks the CIC administration table 1326-1

(refer to FIG. 158) held by the telephone administration server 1271 so as to find out such a record in which the line number is equal to "CIC-2", and then rewrites the procedure segment column of the record into the above-explained procedure segment "ANM".

Next, the telephone administration server 1271 notifies the reception of the ANM packet to the media router administration unit 1260, namely the telephone administration server 1271 notifies that the telephone set 1216 responds to the telephone calling (Steps V36, V37, V38), and then, the media router administration unit 1260 sends a telephone call signal to the telephone set 1208 (Step V39).

<<Setting of IP Communication Record>>

At the Step V34, the telephone administration server 1274 acquires the line number "CIC-2" from the IP packet which passes through the telephone administration server 1274, and finds out such a record that the line number is "CIC-2" from the CIC administration table 1326-2 owned by the telephone administration server 1274 so as to derive the IP addresses "EA2", "EA1", "IA2", "IA1" from the record content. Then, the telephone administration server 1274 transmits the derived IP addresses to the table administration server 1276 (Step V42). The table administration server 1276 sets these transmitted IP addresses as a record "EA2, EA1, IA2, IA1" indicated on a second row of the address administration table 1254 provided in the network node apparatus 1247 (Step V43).

Similarly, at the above-described Step V35, the telephone administration server 1271 acquires the line number "CIC-2" from the IP packet which passes through the telephone administration server 1271, and finds out such a record that the line number is "CIC-2" from the CIC administration table 1323 owned by the telephone administration server 1271 so as to derive the IP addresses "EA1", "EA2", "IA1", "IA2" from the record content. Then, the telephone administration server 1271 transmits the derived IP addresses to the table administration server 1273 (Step V44). The table administration server 1273 sets these transmitted IP addresses as a record "EA1, EA2, IA2, IA2" indicated on a fifth row of the address administration table 1250 provided in the network node apparatus 1244 (Step V45).

<<Variation in Connection Phase>>

It should be noted that the media router administration unit 1267 can transmit a response confirmation with respect to the Step V31 to the telephone set 1216 (Step V41). Similarly, the telephone set 1208 can send a response confirmation with respect to the Step V39 to the media router administration unit 1260 (Step V40). The process operations defined at the Steps V41 and V40 correspond to optional process operation which may be selectively performed. Also, in the above-explained connection phase, the communication purpose UDP port and the addition information of the telephone set 1216 are transmitted at the Steps V22 to V29, but may be alternatively sent at the Steps V32 to V39.

<<Communication Phase>>

A telephone communication established between the user of the telephone set 1208 and the telephone set 1216 corresponds to steps similar to those explained in other embodiments. In this telephone communication, both an IP communication record indicated in the fifth row of the address administration table 1250 (namely, records of "EA1, EA2, IA1, IA2"), and an IP communication record indicated in a second row of an address administration table 1254 (namely, records of "EA2, EA1, IA2, IA1") are employed. The voice (speech) signal of the telephone set 1208 is digitalized, and the digitalized voice data is described on the payload of the IP packet 1335 (refer to FIG. 173). In this case, both the destination address and the UDP port number, which are acquired in the above-explained connection phase are employed. In other words, the transmission source address corresponds to the IP address "EA1" of the media router 1201, the destination address corresponds to the IP address "EA2" of the media router 1202 connected to the destination telephone set 1216, "5006" is employed as the transmission source UDP port number, and "5008" is used as the destination UDP port number. The analog voice is sent from the telephone set 1208 (Step V50), and the analog voice is digitalized to become a voice IP packet 1335 in the media router administration unit 1260, and then the voice IP packet 1335 is sent to the network node apparatus 1244 (Step V51). In this network node apparatus 1244, the digital voice data is capsulated to become an IP packet 1336 (refer to FIG. 174), and then, the IP packet 1336 is reached via the IP communication line, the router 1263, and the router 1264 of FIG. 145 to the network node apparatus 1247 (Step V52). The network node apparatus 1247 inverse-capsulates the internal IP packet 1336 and supplies the inverse-capsulated IP packet to the media router administration unit 1267 (Step V53). In this media router administration unit 1267, the digitalized voice data is converted into an analog voice signal, and then, the analog voice signal is reached to the telephone set 1216 (Step V54). The analog voice signal produced from the telephone set 1216 may be similarly transferred along a direction opposite to the above-explained direction (Steps V55 to V59).

<<Release Phase>>

When the user of the telephone set 1208 notifies the release of the telephone communication (Step V60 of FIG. 134), the notification is notified via the media router administration unit 1260, the network node apparatus 1244, and the pilot telephone administration server 1270 to the telephone administration server 1271 (Steps V60 to V63). The telephone administration server 1271 writes an end time instant "Ed-1" into a column of an end time instant of such a record in which the line number contained in the CIC administration table 1326-1 is "CIC-2". Next, the telephone administration server 1271 produces a release IP packet 1337 (refer to FIG. 175, and is called as a "REL" packet), and then notifies the REL packet to the telephone administration server 1274 (Step V64). The telephone administration server 1274 notifies the release of the telephone communication via the telephone proxy server 1275 to the telephone set 1216 (Steps V71 to V74). Furthermore, the telephone administration server 1274 writes an end time instant "Ed-2" into a column of an end time instant of such a record in which the line number contained in the CIC administration table 1326-2 is "CIC-2". Next, the telephone administration server 1274 produces a release completion IP packet 1338 (refer to FIG. 176, and is called as a "RLC" packet), and then returns the RLC packet to the telephone administration server 1271 (Step V70) in order that the telephone administration server 1274 notifies the reception of the release IP packet 1337.

After the Step V64, the telephone administration server 1271 informs a release instruction via the telephone proxy server 1270 and the network node apparatus 1244 to the media router administration unit 1260 (Steps V65, V66, V67). The media router administration unit 1260 notifies the release instruction to the telephone set 1216 (Step V74), and also informs a release report via the telephone proxy server to the telephone administration server 1274 (Steps V75, V76, V77).

<<Deletion of IP Communication Record>>

After the Step V64, the telephone administration server 1271 transmits the line number "CIC-2" written in the release IP packet 1337 to the table administration server 1273 (Step V78), and deletes a record of the address administration table 1250 corresponding to the line number "CIC-2" provided in the network node apparatus 1244. In this case, the telephone administration server 1271 deletes the IP communication records whose contents are "EA1, EA2, IA1, IA2" (Step-V79). After the Step V70, the telephone administration server 1274 transmits the line number "CIC-2" written in the release completion IP packet 1338 to the table administration server 1276 (Step V80), and deletes a record of the address administration table 1254 corresponding to the line number "CIC-2" provided in the network node apparatus 1247. In this case, the telephone administration server 1274 deletes the IP communication records whose contents are "EA2, EA1, IA2, IA1" (Step V81).

<<Acquisition of Telephone Communication Information>>

When the operation administration server 1277 employed in the IP transfer network 1200 inquires to the telephone administration server 1271 every a properly determined time instant, or a properly selected time interval (Step V200 of FIG. 179), the operation administration server 1277 detects such a record that a telephone communication is ended by considering as to whether or not an end time instant is written into the CIC administration table 1236-1. Then, the operation administration server 1277 notifies a telephone communication record such as a transmission source telephone number, a destination telephone number, a starting time instant, and an end time instant to the telephone administration server 1271 (Step V201). The operation administration server 1277 deletes a record of the CIC administration table 1326 in which a telephone communication is ended. Similarly, when the operation administration server 1277 employed in the IP transfer network 1200 inquires to the telephone management server 1274 (Step V202 of FIG. 179), the operation administration server 1277 detects such a record that a telephone communication is ended by considering as to whether or not an end time instant is written into the CIC administration table 1326-2. Then, the operation administration server 1277 notifies a telephone communication record such as a transmission source telephone number, a destination telephone number, a starting time instant, and an end time instant to the telephone administration server 1274 (Step V203). The operation administration server 1277 deletes a record of the CIC administration table 1326-2 in which the telephone communication is ended. As previously explained, the operation administration server can acquire the record of the telephone communication via the telephone administration server, namely, the transmission source telephone number, the destination telephone number, the starting time instant, the end time instant, which may be used in the charging operation of the telephone communication. The acquisition of the telephone communication instants may be selectively carried out.

<<Telephone Calling Line Administration and Call Receiving Line Administration>>

In the connection phase, when the telephone administration server 1271 forms the IAM packet 1327 shown in FIG. 159 (Step V9), the telephone administration server 1271 increases the under-use line number by "1", which corresponds to the address "EA1" of the media router provided on the transmission side of the calling line administration table 1326-5 shown in FIG. 177. Similarly, the telephone administration server 1274 increases the under-use line number by "1", which corresponds to the address "EA2" of the media router provided on the destination of the call receiving line administration table 1326-6 of FIG. 178.

In the release phase, when the telephone administration server 1271 forms the REL packet 1337 shown in FIG. 175 (Step V64), the telephone administration server 1271 decreases the under-use line number by "1", which corresponds to the address "EA1" of the media router provided on the transmission side of the calling line administration table 1326-5 shown in FIG. 177. Similarly, the telephone administration server 1274 decreases the under-use line number by "1", which corresponds to the address "EA2" of the media router provided on the destination of the call receiving line administration table 1326-6 of FIG. 178, while the RLC packet 1388 of FIG. 176 is produced (Step V70). It should be noted that both the telephone calling line administration and the call reception line administration may be selectively executed.

<<Another Example of Connection Phase>>

In the above-explained connection phase (Steps V0 to V45), a step for confirming a response may be additionally introduced, namely Steps V90 to V96, which will now be explained with reference to FIG. 180. When the media router administration unit 1260 receives a notification of a response (Step V38), the media router administration unit 1260 may produce such an IP packet which implies a notification of the response confirmation and may return the IP packet. The IP packet for confirming the response is transmitted via the network node apparatus 1244, the telephone proxy server 1270, the telephone administration server 1271, the telephone proxy server 1274, the telephone representative server 1275, and the network node apparatus 1247 to the media router administration unit 1267 (Steps V90 to V96). As previously explained, reliability of the communication may be improved.

<<Another Example of Release Phase>>

The above-explained release phase (Steps V60 to V77) may be replaced by the below-mentioned steps, which will be explained with reference to FIG. 180.

When the user of the telephone set 1208 notifies releasing of the telephone communication (Step V100 of FIG. 185), the notification is supplied via the media router administration unit 1260 the network node apparatus 1244, the pilot telephone administration server 1270, the telephone administration server 1271, the telephone administration server 1274, the telephone proxy server 1275, the network node apparatus 1247, and the media router administration unit 1267 to the telephone set 1216 (Steps V100 to V108). When the media router administration unit 1267 receives the notification of the communication release (Step V107), the media router administration unit 1267 notifies the release reception to the media router administration unit 1260 along a direction opposite to the above-explained direction, namely via the network node apparatus 1247, the telephone proxy server 1275, the telephone administration server 1274, the telephone administration server 1271, the pilot telephone proxy server 1270, and the network node apparatus 1244 (Steps V111 to V118). Subsequently, the release reception is notified via the same route as that of the notification for the release completion, namely, via the network node apparatus 1247, the telephone proxy server 1275, the telephone administration server 1274, the telephone administration server 1271, the telephone proxy server 1270, and the network node apparatus 1244 to the media router administration unit 1260 (Steps V121 to V127). Also, the deletion of the records employed in the address administration table 1250 employed in the network node apparatus 1244, and used in the voice communication within the address administration table 1254 provided in the network node apparatus 1247 is carried out in a similar manner to the above-explained Steps V80 and V81, or Steps V78 and V79. The reliability can be improved by executing the procedure of the release acceptance, and the procedure of the release completion two times.

<<Employment of TCP Technique>>

In the above-explained connection phase and release phase, the communication established between the telephone administration server 1271 and the telephone administration server 1274 (namely, UDP communication defined by the Steps V9, V16, V25, V35, V64 and V70 shown in FIG. 151) may be substituted by a TCP communication. Referring now to FIG. 181 to FIG. 186, the TCP communication will be explained.

FIG. 181 indicates an embodiment in which the Step V9 is carried out by way of the TCP communication. That is, while the telephone administration server 1271 transmits a TCP packet 1390-1 containing an SYN designation used to establish a TCP connection to the telephone administration server 1274, the telephone administration server 1274 responds a TCP packet 1391-1 containing an ACK indication of a communication start acknowledgment, and then the telephone administration server 1271 transmits a TCP packet 1392-1 to the telephone administration server 1274 (Step V9*t*). The TCP packet 1392-1 contains the same content(notification of call setting IAM) as that of the IP packet 1327. Next, the telephone administration server 1271 transmits a TCP packet 1393-1 containing an FIN designation used to end the TCP connection to the telephone administration server 1274, and the telephone administration server 1274 returns a TCP packet 1394-1 for an end confirmation to the telephone administration server 1271.

FIG. 182 indicates an embodiment in which the Step V16 is carried out by way of the TCP communication. That is, while the telephone administration server 1274 transmits a TCP packet 1390-2 containing an SYN designation used to establish a TCP connection to the telephone administration server 1271, the telephone administration server 1271 responds a TCP packet 1391-2 containing an ACK indication of a communication start acknowledgment, and then the telephone administration server 1274 transmits a TCP packet 1392-2 to the telephone administration server 1271 (Step V16*t*). The TCP packet 1392-2 contains the same content(notification of call setting acceptance ACM) as that of the IP packet 1331. Next, the telephone administration server 1274 transmits a TCP packet 1393-2 containing an FIN designation used to end the TCP connection to the telephone administration server 1271, and the telephone administration server 1271 returns a TCP packet 1394-2 for an end confirmation to the telephone administration server 1274.

FIG. 183 indicates an embodiment in which the Step V25 is carried out by way of the TCP communication. That is, while the telephone administration server 1271 transmits a TCP packet 1390-3 containing an SYN designation used to establish a TCP connection to the telephone administration server 1274, the telephone administration server 1274 responds a TCP packet 1391-3 containing an ACK indication of a communication start acknowledgment, and then the telephone administration server 1271 transmits a TCP packet 1392-3 to the telephone administration server 1274 (Step V25*t*). The TCP packet 1392-3 contains the same content(notification of call passing CPG) as that of the IP packet 1333. Next, the telephone administration server 1271 transmits a TCP packet 1393-3 containing an FIN designation used to end the TCP connection to the telephone administration server 1274, and the telephone administration server 1274 returns a TCP packet 1394-3 for an end confirmation to the telephone administration server 1271.

FIG. 184 indicates an embodiment in which the Step. V35 is carried out by way of the TCP communication. That is, the telephone administration server 1271 transmits a TCP packet 1392-4 to the telephone administration server 1274 (Step V35*t*). The TCP packet 1392-4 contains the same content (notification of call passing ANM) as that of the IP packet 1334. The TCP communication can be carried out in a similar manner to that of other communication methods. FIG. 185 shows an embodiment in which the step V64 is carried out by way of a TCP communication. That is, the telephone administration server 1271 transmits a TCP packet 1392-5 to the telephone administration server 1274. The TCP packet 1392-5 contains the same content(notification of release REL) as that of the IP packet 1337 (Step V64*t*). The TCP communication can be done in a similar manner to that of other communication methods.

FIG. 186 shows an embodiment in which the Step V70 is carried out by way of a TCP communication. That is, the telephone administration server 1274 transmits a TCP packet 1392-6 to the telephone administration server 1271. The TCP packet 1392-6 contains the same content (notification of release completion RLC) as that of the IP packet 1338 (Step V70*t*). The TCP communication can be done in a similar manner to that of other communication methods.

<<Separation Between Control Line and Telephone Communication Line>>

Next, a description will now be made of such a fact that in an open-area telephone communication, an IP communication line employed in a terminal-to-terminal connection control can be separated from a communication line used in a voice communication.

The IP packets 1322, 1327, 1328, 1331, 1332-2, 1333, 1333-1, 1334, 1337 and 1338 used in the terminal-to-terminal connection control are transferred to a range 1289 (refer to FIG. 187) of any of IP communication lines which connect the telephone proxy 1270, the telephone administration server 1271, the telephone administration server 1274, and the telephone proxy server 1275. On the other hand, the IP packets 1335 and 1336 used in the voice communication are transferred to a range 1293 (refer to FIG. 187) of IP communication lines which connect the network node apparatus 1244, the router 1291, the router 1292, and the network node apparatus 1247. The IP communication lines employed in the terminal-to-terminal connection control correspond to a line of a common line signal network of a switched communication network, whereas the communication lines used in the voice communication correspond to a voice communication line of a switched communication network.

As previously explained, the network node apparatus 1244 owns such a function that the IP packet for the terminal-to-terminal communication connection sent from the media router 1201 can be transmitted to the router 1263, and the IP packet for the voice communication can be separately transmitted to the router 1291. Considering the flow of the IP packet along the reverse direction, while the IP packet for the terminal-to-terminal communication connection is combined with the IP packet for the voice communication, the combined IP packet is transmitted to the media router 1201.

<<Tree Structure of Telephone Numbers and Telephone DNS Server>>

A tree structure shown in FIG. 188 corresponds to such a tree structure of telephone numbers managed by a telephone number server 1140 of a company "B". While domains 1251 to 1254 are related to each other at the same level in a tree structural form at a lower grade of a route 1250, the domain 1251 manages a telephone number "1XXX" (namely, telephone numbers of 1000 digits); the domain 1252 manages a telephone number "2XXX"; the domain 1253 manages the telephone number "3XXX"; and the domain 1254 manages IP addresses related to other telephone numbers. Also, a tree structure shown in FIG. 189 corresponds to such a tree structure of telephone numbers managed by a telephone number server 1142 of a company "A", respectively. While domains 1251-2, 1251-3 and 1254 are related to each other at the same level in a tree structural form at a low grade of a route 1251, the domain 1251-2 manages a telephone number "1XXX" of the company "A"; the domain 1251-3 manages a domain "#" of the company "A"; the domain 1251-4 manages an extension telephone number "1XX" of the company "A"; the domain 1251-5 manages an extension telephone number "2XX" of the company "A"; and also the domain 1251-6 manages IP addresses related to extension telephone number "3XX" of the company "A", respectively.

In this case, symbol "#" of the domain corresponds to a secret value which is exclusively used in the company "A", and is not opened to other companies. In other words, with respect to an inquiry issued from a telephone number server belonging to the company "B" and the company "C" other than the company "A", the telephone number server 1142 does not respond the information related to the domains 1151-4 through 1151-6 managed by the domain "#", The domain 1254 manages the IP addresses related to other telephone numbers.

A tree structure shown in FIG. 190 corresponds to such a tree structure of telephone numbers managed by a telephone number server 1137 of a company "A". While domains 1251 to 1254 are related to each other at the same level in a tree structural form at a lower grade of a route 1250-1, the domain 1251 manages a telephone number belonging to the company "A"; the domain 1252 manages a telephone number "2XXX" of the company "B"; the domain 1253 manages the telephone number "3XXX" of the company "C"; and the domain 1254 manages IP addresses related to other telephone numbers. The domain 1251-2 manages a telephone number "1XXX" of the company "A"; the domain 1251-3 manages a domain "#" of the company "A"; the domain 1251-4 manages an extension telephone number "1XX" of the company "A"; the domain 1251-5 manages an extension telephone number. "2XX" of the company "A"; and also the domain 1251-6 manages IP addresses related to extension telephone number "3XX" of the company "A", respectively.

In this case, symbol "#" of the domain corresponds to a secret value which is exclusively used in the company "A". A tree structure shown in FIG. 191 corresponds to such a tree structure of telephone numbers managed by a telephone number server 1139 of a company "X". While domains 1254-2 to 1254 are related to each other at the same level in a tree structural form at a lower grade of a route 1250-2, the domain 1254-2 manages a telephone number belonging to the company "X"; and the domain 1254 manages IP addresses related to other telephone numbers, respectively.

A table 1255-1 of FIG. 192 represents such a method that a media router administration unit 1260 converts telephone numbers into domain names, and these telephone numbers are telephone communication counter party of the telephone sets 1208 to 1211 connected to the media router 1201. For instance, a telephone number "1XXX" of a first row of the table 1255-1, e.g., a telephone number "1001" is represented by a telephone number domain name "1.a."; a telephone number "2XXX" of a second row of the table 1255-1 is expressed by a telephone number domain name "b."; and another telephone number of a seventh row of the table 1255-1 is represented by a telephone number domain name "0.", respectively. Other rows of this table are expressed in a similar manner. In accordance with the table 1255-2 of FIG. 193, for example, the telephone number server 1137 responds the IP address "EA1" when the telephone number domain name "1.a." is inquired; the telephone number server 1137 responds the IP address "EA5" when the telephone number domain name "b." is inquired; and the telephone number server 1137 answers the IP address "EA81" when the telephone number domain name "0." is inquired.

A table 1256-1 of FIG. 194 represents such a method that a media router administration unit 1264 converts telephone numbers into domain names, and these telephone numbers are telephone communication counter party of the telephone sets 1228 to 1231 connected to the media router 1203. For instance, a telephone number "1XXX" of a first row of the table 1256-1 is represented by a telephone number domain name "1.a."; a telephone number "1XX" of a second row of the table 1256-1 is expressed by a telephone number domain name "1.#.a."; and another telephone number of a fifth row of the table 1256-1 is represented by a telephone number domain name "0.", respectively. Other rows of the table are expressed in a similar manner. In accordance with the table 1256-2 of FIG. 195, for example, the telephone number server 1142 responds the IP address "EA1" when the telephone number domain name "1.a." is inquired; the telephone number server 1142 responds the IP address "EA5" when the telephone number domain name "1.#.a." is inquired; and the telephone number server 1142 answers the IP address "EA81" when the telephone number domain name "0." is inquired.

A table 1257-1 of FIG. 196 represents such a method that a media router administration unit 1266 converts telephone numbers into domain names, and these telephone numbers are telephone communication counter party of the telephone sets 1220 to 1223 connected to the media router 1205. For instance, a telephone number "1XXX" of a first row of the table 1257-1, is represented by a telephone number domain name "a."; a telephone number "2XXX" of a second row of the table 1257-1 is expressed by a telephone number domain name "b."; and another telephone number of a fourth row of the table 1256-1 is represented by a telephone number domain name "0.", respectively. Other rows of the table are expressed in a similar manner. In accordance with the table 1257-2 of FIG. 197, for example, the telephone number server 1140 responds the IP address "EA1" when the telephone number domain name "a." is inquired; the telephone number server 1140 responds the IP address "EA5" when the telephone number domain name "b." is inquired; and the telephone number server 1140 answers the IP address "EA81" when the telephone number domain name "0." is inquired.

The telephone number servers 1137 to 1142 call other telephone number servers by employing the known redialing function of the domain name server (DNS), and then acquire the IP addresses which are directly managed by other telephone number servers.

The operations of the above-explained tenth embodiment will now be summarized. That is, the media router 1 is connected via the IP transfer network to the media router 2; the telephone set 1 is connected to the media router 1; and the telephone set 2 is connected to the media router 2. While both the telephone set 1 and the telephone set 2 use the telephone number server employed in the media router 1, the telephone communication can be established without using the telephone number server employed in the IP transfer network. It should be noted that a plurality of telephone sets may be connected to either the media router 1 or the media router 2. Also, while the IP transfer network contains the specific telephone number server, both the telephone set 1 and the telephone set 2 access the telephone number server provided in the IP transfer network by employing the telephone number server inside the media router 1, and can telephone-communicate with the telephone set 2.

The IP transfer network contains two, or more network node apparatus; the media router is connected via the logic IP communication line to any one of these network node apparatus; the internal IP addresses are applied to the termination units provided on the side of the network node apparatus of the logic IP communication line; and the external IP addresses are applied to the media routers. The media router contains the telephone number server, and is connected via the communication line to one, or more telephone sets. As the records of the address administration table within the network node apparatus, both the external IP address and the communication record are previously set, the connection phase of the telephone communication is arranged by a series of processing steps made of the call setting operation (IAM), the call setting acceptance (ACM), the call passing (CPG) and the response (ANM). Also, the release phase of the telephone communication is arranged by a series of process steps made of the release (REL) and the release completion (RLC). Alternatively, while the response confirmation (ACK) is carried out after the response (ANM), the release acceptance may be executed between the release (REL) and the release completion (RLC).

The operations of the tenth embodiment will now be further summarized. That is, the IAM packet, the ACM packet, the CPG packet, the ANM packet, the REL packet and the RLC packet are transmitted/received between the telephone administration server provided on the telephone calling side and the telephone administration server provided on the call receiving side. In the closed-area telephone communication for limiting the telephone communication parties, the telephone number server provided inside the media router is employed. Also, in the open-area telephone communication not for restricting the telephone communication parties, since the telephone number server employed in the media router is used, the telephone number server employed in the IP transfer network is employed. In the open-area telephone communication, the IP communication line employed in the terminal-to-terminal connection control can be separated from the communication line used in the voice communication. While the telephone administration server contains the CIC administration table, the telephone administration server can record the transmission source telephone number, the destination telephone number, the starting time instant of the telephone communication, and the end time instant thereof. The operation administration server inquiries the telephone administration server so as to acquire the transmission source telephone number, the destination telephone number, the starting time instant of the telephone communication and the end time instant thereof, which may be used in the charging operation.

Furthermore, in this embodiment, the above-mentioned IP encapsulation and reverse-capsulation by the network node apparatus can be replaced to the simple encapsulation which forms an internal packet by adding a simple header to an external IP packet and the simple reverse-capsulation which removes the simple header from the internal packet, respectively.

11. 11th Embodiment in which Telephone Transfer is Carried Out from Public Telephone Network <<Preparation>>

Referring now to FIG. 198, an 11-th embodiment of the present invention will be described. A telephone set 520 owns a telephone number "03-5414-8510", and is connected via a telephone line 517 to an exchanger 513. A communication line 524-1 is used to connect an exchanger 514-1 to a gateway 521-1. An interface is an "NNI" containing a common signal line and a telephone communication line. A signalling unit defined by the common line signal system is transmitted on the common signal line. A signal station code "#1234" which is discriminatable on the side of the public switched telephone network and a gateway logic name "GW5211" to be public are applied to the gateway 521-1. The subscriber exchangers 513 and 511 in advance store pairs of the gateway logic name "GW5211" and the signal station code "#1234". A communication line 524-2 is used to connect an exchanger 514-2 to a gateway 521-2, and an interface is a UNI. A telephone number "03-1111-2222" is applied to a terminal on the side of the gateway 521-2 of the communication line.

<<Preparation of NNI Line Call Reception Transfer>>

An owner of the telephone set 520 separates the telephone set 520 from the telephone line 517, and connects the telephone set to a communication line 528 connected to a media router 527 as a telephone set 530. A telephone number of the telephone set 530 is "03-5414-8510". A user 532 of the telephone set 520 notifies to an acceptance 533 of the public switched telephone network, such a fact that the telephone set 520 is positionally switched to the position of the telephone set 530 (Step H01 of FIG. 199). The acceptance 533 notifies a changed content via the communication line 534 to the exchanger 513 (Step H02). The exchanger 513 converts the gateway logic name #GW5211# into the signal station code "#1234" by using the stored information and causes a transfer processing unit 516 thereof to store thereinto a set of the telephone number "03-5414-8510" and the signal station code "#1234" of the transfer destination gateway 521-1 (Step H03).

<<NNI Line Call Reception Transfer>>

When a telephone call is issued from the telephone set 510 having the telephone number "0047-325-3897" to the destination telephone number "03-5414-8510" (Step H05), the exchanger 511 accepts this telephone call (Step H06). Next, the exchanger 511 executes such a procedure that a telephone call is issued from the exchanger 511 via the communication line 512 to another exchanger 513 so as to call the telephone set 520 (Step H08). The exchanger 513 finds out both the telephone number "03-5414-8510" and the signal station code "#1234" of the transfer destination gateway 521-1, which are previously stored in the transfer processing unit 516 (Step H09), and then notifies the acquired signal station code "#1234" to the exchanger 511 (Step H10). The exchanger 511 produces a signalling unit containing the destination telephone number "03-5414-8510" of the transfer destination at a message portion thereof, and transmits the signalling unit to a destination of the signal station code "#1234" as the address of the received gateway. Then, the signalling unit is reached via the exchanger 514-1 (Step H11) and the communication line 524-1 to the gateway 521-1 (Step H12). Thereafter, this signalling unit is transmitted via a router 525-1, a telephone administration server 525 (Step H15), a connection control line 524-5, a router 525-2, a connection control line 524-4, and a network node apparatus 523-2 (Step H16), and furthermore, a communication line 526, and then is reached to a media router 527 (Step H17). In the case that the media router 527 transmits a notification of a telephone call acceptance with respect to the telephone connection request along a direction opposite to the above-explained direction, the notification of the telephone call acceptance is reached via a network node apparatus 523-2 (Step H21) and further a telephone administration server 525 (Step H22) to the gateway 521-1 (Step H23). The telephone call acceptance is notified via the exchanger 514-1 (Step H25) to the exchanger 511 (Step H26).

Next, when the media router 527 calls the telephone set 530 having the telephone number "03-5414-8510" via the communication line 528 (Step H28), the notification of the calling operation is sent to the telephone set 510 along a direction opposite to the above-explained direction, namely via the media router 527, the network node apparatus 523-2, the connection control line 524-4, the telephone administration server 525, the gateway 521-1, the exchanger 514-1, and the exchanger 511 to the call-issuing telephone set 510 (Steps H30 to H37). When the user of the telephone set 530 takes up the handset (off hook), the telephone set 530 notifies a response notification to the media router 527 (Step H40). Subsequently, similar to the above-explained operation, the response notification is notified via the media router 527, the network node apparatus 523-2, the connection control line 524-4, the telephone administration server 525, the gateway 521-1, the exchanger 514-1, the exchanger 511 to the telephone set 510 (Steps H41 to H47).

The above-explained connection control data which is transmitted/received as the above Steps H11, H12, H15 so as to connect the telephone call will be referred to as an "IAM message"; and the connection control data used among the Steps H23, H25, H26 will be called as an ACM message; and the connection control data used among the Steps H33, H35, H36 will be called as a CPG message; and furthermore, the connection control data used among the Steps H43, H45, H46 will be called as an ANM message. In the telephone call connection phase, the above-explained message (IAM, ACM, CPG, ANM) do not pass through the network node apparatus 523-1. In other words, it is so featured that the above-explained messages are directly transmitted/received between the gateway 521-1 and the telephone administration server 525.

As previously explained, the communication connection procedure between the telephone set 510 and the telephone set 530 can be completed, so that the voice (speech) communication can be established between the telephone set 510 and the telephone set 530. It should be noted that the voice transmitted from the telephone set 510 is reached via the exchanger 511, the exchanger 514-1, and the communication line 524-1 to the gateway 521-1. In this gateway 521-1, the analog voice is converted into digitalized voice. The digitalized voice is reached to the network node apparatus 523-1, the communication line 524-3, the router 525-2, the communication line 524-6 for the voice communication, the network node apparatus 523-1 and the media router 527. The media router 527 converts the reached digital voice into an analog voice signal which is delivered to the telephone set 530. Also, the speech transmitted from the telephone set 530 is transferred via a communication path along a reverse direction with respect to the above-explained communication path to the telephone set 510.

When a telephone communication is ended, a telephone call release is sent from the telephone set 510 to the exchanger 511 (Step H50), and is then notified via the exchanger 514-1 (Step H51) to the gateway 521-1 (Step H53). The notification of the call release completion is sent out from the gateway 521-1 to the exchanger 511 (Steps H54 and H55).

Next, the gateway 521-1 sends out the telephone call release which is acquired in the above-explained procedure via the IP transfer network 522 to the telephone set 530 (Steps H61 to H64). The notification of the call release completion is returned from the media router 527 to the gateway 521-1 (Step H65 to H67). The reason why the call release can be done along the reverse direction, namely from the telephone set 530 to the public switched telephone network 515 is already explained in other embodiments. The connection control data for the telephone call release defined at the Steps H51, H53, H61 will be referred to as an "REL message", whereas the connection control data defined at the Steps H67, H57, H55 will be referred to as an "RLC" message.

While the process operations defined from the Steps H01 to H03 are not carried out, the owner 532 of the telephone set 520 notifies such a notice via the communication line 517 to the exchanger 513, and thereafter may switch the telephone set 520 to the position(the IP transfer network of which entrance is the gateway "GW5211") of the telephone set 530 (Step H01X of FIG. 199). The notice implies that the telephone set 520 having the telephone number of "03-5414-8510" is switched to the position of the telephone set 530. Next, the exchanger 513 converts the gateway logic name "GW5211" into the signal station code "#1234" by using the stored information and may employ such a method that the set of the telephone number "03-5414-8510" and the signal station code "#1234" of the transfer destination gateway 521-1 is saved in the transfer processing unit 516 (Step H03X).

With execution of the above-explained process operation, the description of the telephone call reception transfer operation via the NNI line is accomplished. Next, a description will be made of a telephone call reception transfer operation based upon UNI.

<<Preparation of UNI Line Telephone Call Reception Transfer>>

Referring now to FIG. 198 and FIG. 200, the UNI line telephone call reception transfer is described. An owner of the telephone set 520 separates the telephone set 520 from the telephone line 517, and connects the telephone set to a communication line 528 as a telephone set 530. A telephone number of the telephone set 530 is "03-5414-8510". The user 532 of the telephone set 520 notifies to the acceptance 533 of the public switched telephone network, such a fact that the telephone set 520 is positionally switched to the position of the telephone set 530 (Step H01). The acceptance 533 notifies a changed content via the communication line 534 to the exchanger 513 (Step H02). The exchanger 513 causes a transfer processing unit 516 thereof to store thereinto a set of the telephone number "03-5414-8510" and a telephone number "03-1111-2222" which is applied to the termination unit on the side of the transfer destination gateway 521-2 of the communication 524-2 (Step H03-2).

<<UNI Line Telephone Call Reception Transfer>>

In this case, there is such a different point that while a exchanger 514-2 is employed instead of the exchanger 514-1, a gateway 521-2 may be employed instead of the gateway 521-1. Due to this reason, the control procedure of the terminal-to-terminal communication control between the exchanger 514-2 and the gateway 521-2 is realized by executing new process operations defined from a Step H12-2 and a Step H13-2, as will be explained.

When a telephone call is issued from the telephone set 510 having the telephone number "047-325-3897" to the destination telephone number "03-5414-8510" (Step H05-2), the exchanger 511 receives the telephone call (Step H06-2). Next, the exchanger 511 issues a telephone call to the telephone set 520 via the communication line 512 to the exchanger 513 (Step H08-2). The exchanger 513 finds out both the telephone number "03-5414-8510" previously stored in the transfer processing unit 516 and the telephone number "03-1111-2222" applied to the termination unit of the input line 524-2 of the transfer destination gateway 521-2 (Step H03-2), and then notifies the acquired telephone number "03-1111-2222" to the exchanger 511 (Step H10-2). The exchanger 511 produces a final unit containing the above-explained transfer destination telephone number "03-5414-8510", and then, transmits the signalling unit, while the received telephone number "03-1111-2222" of the input line of the gateway 521-2. Then, the signalling unit is reached to the exchanger 514-2 (Step H11-2). When a telephone connection request (SETUP) contained in the signalling unit is transmitted via the communication line 524-2 to the gateway 521-2 (Step H12-2), the gateway 521-2 notifies to the exchanger 514-2, such a fact that the telephone call connection request of the Step H12-2 is accepted (Step H12-3). Furthermore, the notification is reached via the telephone administration saver 525 (Step H15-2), the router 525-2, the connection control line 524-4, the network node apparatus 523-2 (Step H16-2), and the communication line 526 to the media router 527 (Step H17-2).

When the media router 527 transmits a notification of a telephone call acceptance with respect to the telephone connection request along a direction opposite to the above-described direction, the notification of the telephone call reception is reached via the network node apparatus 523-2 (Step H21-2), the network node apparatus 523-1 (Step H23-2) to the gateway 521-2 (Step H24-2). The gateway 521-2 sends the telephone call acceptance via the exchanger 514-2 (Step H25-2) to the exchanger 511 (Step H26-2).

Next, when the media router 527 calls the telephone set 530 having the telephone number "03-5414-8510" via the communication line 528 (Step H28-2), the notification of the calling operation is sent to the telephone set 510 along a direction opposite to the above-explained direction, namely via the media router 527 (Step H30-2), the network node apparatus 523-2 (Step H31-2), the telephone administration server 525 (Step H32-2), the network node apparatus (Step H33-2) the gateway 521-2 (Step H34-2), the exchanger 514-2 (Step H35-2), and the exchanger 511 (Step H36-2) to the call-issuing telephone set 510 (Step H37-2).

When the user of the telephone set 530 takes up the handset (off hook), the telephone set 530 notifies a response notification to the media router 527 (Step H40-2). Subsequently, similar to the above-explained operation, the response notification is notified via the media router 527, the network node apparatus 523-2, the telephone administration server 525, the network node apparatus 523-1, the gateway 521-2, the exchangers and 514-2 and 511 to the telephone set 510 (Steps H41-1 to H47-2). In the telephone call connection phase, the message is transmitted/received via the network node apparatus 523-1 for the connection phase established between the gateway 521-2 and the telephone administration server 525.

As previously explained, the communication connection procedure can be completed between the telephone set 510 and the telephone set 530, so that the voice communication can be established between the telephone set 510 and the telephone set 530.

<<Communication Phase and Release Phase>>

Both a telephone communication phase and a release phase are similar to those of the above-explained case as to the NNI line call reception transfer operation, but own the following different point that while the exchanger 514-2 is employed instead of the exchanger 514-1, the gateway 521-2 is used instead of the gateway 521-1 (Steps H50-2 to H53-2, H54-2 to H55-2, H60-2 to H63-2, H65-2 to H68-2).

<<Another Embodiment of Call Reception Transfer Via UNI>>

A description is made with reference to FIG. 198 and FIG. 201. The owner of the telephone set 520 disconnects the telephone set 520 from the telephone line 517, and connects the telephone set to the communication line connected to the media router 527 as the telephone set 530. The preparation is similar to the above-explained preparation for the UNI line call reception transfer of the above embodiment.

<<UNI Line Call Reception Transfer>>

In this embodiment, the UNI line call reception transfer operation is featured by that both the exchanger 511 and the exchanger 514-2 transmit/receive a connection controlling message via a exchanger 513, which is explained as follows:

When a telephone call is issued form the telephone set 510 having the telephone number "047-325-3897" to the destination telephone number "03-5414-8510" (Step H05-3), the exchanger 511 accepts the telephone call (Step H06-3). Next, the exchanger 511 executes such a procedure that a telephone call is issued from the exchanger 511 via the communication line 512 to another exchanger 513 so as to call the telephone set 520 (Step H08-3). The exchanger 513 finds out both the telephone number "03-5414-8510" which is previously stored in the transfer processing unit 516, and also the telephone number "03-1111-2222" which is applied to the termination unit of the input line 524-2 of the transfer destination gateway 521-2 (Step H09-3). Subsequently, the exchanger 511 produces a signalling unit containing the destination telephone number "03-5414-8510" of the transfer destination, and transmits the signalling unit, while the telephone number "03-1111-2222" of the input line of the gateway 521-2 is used as the destination. The signalling unit is reached to the exchanger 514-2 (Step H11-3). When the telephone connection request(SETUP) contained in the signalling unit is sent via the communication line 524-2 to the gateway 521-2 (Step H12-3), the gateway 521-2 notifies the acceptance of the telephone call connection request of the previous Steps H12-3 to the exchanger 514-2 (Step H13-3). Furthermore, the signalling unit is transmitted via the network node apparatus 523-1 (Step H14-3), a router 525-2, a telephone administration server 525 (Step H15-3), a connection control line 524-4, the router 525-2, and a network node apparatus 523-2 (Step H16-3), and furthermore, a communication line 526, and then is reached to a media router 527 (Step H17-3).

In the case that the media router 527 transmits a notification of a telephone call acceptance with respect to the telephone connection request along a direction opposite to the above-explained direction, the notification of the telephone call acceptance is reached via the network node apparatus 523-2 (Step H21-3) and a telephone administration server 525 (Step H22-3), and the network node apparatus 523-1 (Step H23-3) to, the gateway 521-2 (Step H24-3). The gateway 521-2 notifies the telephone call acceptance via the exchanger 514-2 (Step H25-3) and the exchanger 513 (Step H26-3) to the exchanger 511 (Step H27-3).

Next, when the media router 527 calls the telephone set 530 having the telephone number "03-5414-8510" via the communication line 528 (Step H28-3), the notification of the calling operation is sent to the telephone set 510 along a direction opposite to the above-explained direction, namely via the media router 527 (Step H30-3), the network node apparatus 523-2 (Step H31-3), the telephone administration server 525 (Step H32-3), the network node apparatus 523-1 (Step H33-3), the gateway 521-2 (Step H34-3), the exchanger 514-2 (Step H35-3) and the exchanger 513 (Step H36-3), and also the exchanger 511 to the call-issuing telephone set 510 (Step H38-3). When the user of the telephone set 530 takes up the handset(off hook), the telephone set 530 notifies a response notification to the media router 527 (Step H40-3). Subsequently, similar to the above-explained operation, this response notification is notified via the media router 527, the network node apparatus 523-2 the telephone administration server 525, the network node apparatus 523-1, the gateway 521-1, the exchanger 514-2, the exchanger 513, the exchanger 511 to the telephone set 510 (Steps H41-3 to H48-3).

While the above-explained process operations are carried out, the communication connection procedure between the telephone set 510 and the telephone set 530 is completed.

<<Communication Phase and Release Phase>>

Both a communication phase and a release phase are similar to those of the above-explained UNI line call reception transfer operation, but owns a different point that the exchanger 511 and the exchanger 514-2 transmit/receive the connection calling message via the exchanger 513.

Based upon the above-explained principle idea, the analog telephone set 510 connected to the public switched telephone network 515 can establish the terminal-to-terminal communication with respect to the analog telephone set 530 which is connected to the media router 527 having the telephone number "03-5414-8510" used in the public switched telephone network via the IP transfer network 522. As previously explained in another embodiment, the media router may be installed inside the LAN. Due to this reason, while the telephone set having the telephone number "03-5414-8510" employed in the public switched telephone network is connected to the media router inside the LAN, the terminal-to-terminal communication can be established from the analog telephone set 510 connected to the public switched telephone network 515 via the IP transfer network 522 to the analog telephone set having the telephone number "03-5414-8510" provided inside the LAN.

12. 12th Embodiment in which Telephone Transfer Operation is Performed from Public Telephone Network <<Preparation>>

In FIG. 202, reference numeral 540 shows an IP transfer network, reference numerals 541 to 545 show network node apparatus, reference numerals 546-1 to 546-5 represent relay apparatus(router), reference numerals 550 and 554 indicate "gateway containing line information", and reference numerals 515, 552, 553 show gateways. These network node apparatus, relay apparatus, and gateways are directly connected via communication lines having each IP packet transfer functions to each other, or are indirectly connected via the relay apparatus to each other. Reference numerals 555 to 556 indicate public switched telephone networks (PSTN), reference numerals 557 to 566 are exchangers, reference numerals 570 to 573 are telephone sets, reference numerals 597 and 598 show telephone sets, reference numerals 576 to 578 show communication lines having network/network interface (NNI), reference numerals 580 to 581 indicate communication lines having user network interfaces (UNI), and reference numeral 583 represents a communication line having an IP packet transfer function. Reference numerals 584 and 585 indicate IP transfer network input line tables, and reference numerals 586 to 590 show IP transfer network output line tables. Reference numeral 591 shows a media router. Reference numerals 593 to 594 indicate telephone number servers which are connected via a communication line to either the router 546-1 or the router 546-3.

The signal station code to discriminate from public switched telephone network side and the IP address to discriminate from IP transfer network side are respectively applied to the gateways 550 and 554 to be connected with the NNI communication line This embodiment is such an example that a communication enterprise identification code "00XY" is applied to the gateway 550 containing the line information, and a communication enterprise identification code "00UV" is applied to the gateway 554 containing the line information. A signal station code "#2222" is applied to the gateway 551, and a telephone number "03-4444-4000" is applied to an inlet of the communication line 508 of the gateway 552. The telephone number servers 593 to 594 owns such a function that when a telephone number is indicated, an IP address of a gateway having the telephone number, or an IP address of a media router(MR) having the telephone number is responded. The IP transfer network output line tables 586 to 590 contain IP address information corresponding to all of the telephone numbers owned by the gateways and the media routers. A telephone number of the telephone set 570 is "03-1111-2222", a telephone number of the telephone set 571 is "06-3333-4444", and a telephone number of the telephone set 572 is "092-555-6666". A telephone number of the telephone set 597 is "07-3333-4444", and a telephone number of the telephone set 598 is "093-555-6666". These telephone sets are connected via the communication lines to the exchanger of either the public switched telephone network 555 or 556. The telephone set 573 owns a telephone number of "045-777-8888", and is connected to the media router 591 via the communication line.

FIG. 203 represents a content(example) of the IP transfer network input line table 584, and also shows the following fact. That is, in the case of a record on a first row, a segment of a gateway is "NNI", and also a signal station code of the gateway is "#2222". The gateway is used to connect a communication line to such a telephone set that a range of a destination telephone number is defined from "06-0000-0000" to "06-999-9999". In this case, the gateway becomes 551. In the case of a fifth row, a similar condition is set. Also, in the case of a record on a second row, a segment of a gateway is "UNI". The gateway is used to connect a communication line to such a telephone set that a range of a destination telephone number is defined from "092-0000-0000" to "092-9999-9999". The telephone numbers connected to the gateway are present within a range defined from "03-4444-4000" to "03-4444-4099". In this case, the gateway becomes 552. Both a record on a third row and a record on a fourth row are similar conditions. A content of the IP transfer network input line table 585 contains a similar content to that of the IP transfer network input line table 584.

FIG. 204 shows a content(example) of the IP transfer network output line table 586. In the case of a record on a first row, the table 586 shows such a fact that either a gateway (GW) or a media router (MR) is connected to an IP transfer network, and an IP address of the gateway, or the media router is "10.240.240.1" to "10.240.240.255". The gateway, or the media router is employed so as to connect a communication line to a telephone set whose destination telephone number range is defined from "06-0000-0000" to "06-9999-9999". A record on a second row is a similar content. Contents of the IP transfer network output line tables 587 to 590 contain same sorts of information owned by the IP transfer network output line table 586.

<<No. 1-Communication Connection Control Between Telephone Sets>>

FIG. 202 shows an example in which a telephone connection is made from the telephone set 570 having a telephone number of "03-1111-2222" as a transmission source to the telephone set 571 having a telephone number of "06-3333-4444" as a destination. In FIG. 205, reference numeral 590-1 shows a telephone connection made inside the public switched telephone network 555, reference numeral 590-2 indicates a telephone connection made inside the IP transfer network 540, and reference numeral 590-3 represents a telephone connection made inside the public switched telephone network 556. Referring now to FIG. 205 and FIG. 206, the telephone connections will be described.

When the telephone set 570 dials "00XY-06-3333-4444" to make a telephone call (Step J01 of FIG. 205), the exchanger 557 confirms the telephone call (Step J02). While the exchanger 557 employs the communication enterprise identification code "00XY" contained in the dialed information, the exchanger 557 finds out such a exchanger 558 which is connected to the gateway 550 containing the line information to which "00XY" is applied. Then, the exchanger 557 transmits to the exchanger 558, both the transmission source telephone numbers "03-1111-2222" and "00XY-06-3333-4444", which are acquired during the dialing operation (Step J03). Then, the exchanger 558 transmits both the transmission source telephone number "03-1111-2222" and the destination telephone number "06-3333-4444" to the gateway 550 containing the line information (Step J04). Referring to the IP transfer network input line table 584 within the gateway 550 containing the line information, the gateway 550 containing the line information owns the NNI interface, while the telephone number of the destination telephone set is used as a parameter, namely access information to such a gateway for connecting a communication line to the telephone set whose destination telephone set is "06-3333-4444". Also, the gateway 550 knows such a fact that a signal station code of a gateway functioning as a signal station is "#2222", and returns to the exchanger 558 (Step J05). Next, the exchanger 558 seeks a exchanger which is connected to such a gateway whose signal station code is "#2222", namely finds out the exchanger 559 in this case, and transfers to the exchanger 559, such information containing the signal station code "#2222" functioning as the access information to the gateway and acquired in the above procedure, the transmission source telephone number "03-1111-2222", and the destination telephone number "06-3333-4444" (Step J06).

The exchanger 559 transfers the transmission source telephone number "03-1111-2222", the destination telephone number "06-3333-4444" to the gateway 551 whose signal station code is "#2222" via the NNI communication line 557 (Step J07). The gateway 551 produces an IP packet containing both the transmission source telephone number "03-1111-2222" and the destination telephone number "06-3333-4444", which are acquired in the above-described procedure. A transmission source IP address of the IP packet is equal to an IP address applied to the gateway 551 (namely, gateway 551 knows own IP address), and a destination IP address of the IP packet is equal to an IP address of a communication counter party to which a communication line is connected, namely, the IP address "10.2.40.240.1" of the gateway 554 in this case. While the telephone number of the destination telephone set is employed as a parameter from the IP transfer network output line table 586 (FIG. 204) provided inside the gateway 551, one of the IP addresses "10.240.240.1" corresponding to the destination telephone number "06-3333-4444". Instead of the above-explained finding procedure that the gateway 551 finds out the IP address of the gateway 554, the gateway 551 may transmit an "inquiry IP packet" to the telephone number server 593, and thereafter may receive a response from the telephone number server 593 to employ the response(optional procedure). The inquiry IP packet is to inquire an IP address of a gateway used to be connected to the telephone set having the destination telephone number "06-3333-4444".

Among the above-explained functions of the exchangers, at the Step "J04" and the Step "J05", a message of a common circuit signal system/transaction function unit of a telephone switching network may be employed.

The IP packet produced in the above-described manner is sent out from the gateway 551 via the router 546-1 and the telephone administration server 549-1 (Step J08), via the router 546-1, the router 546-5 and the telephone administration server 549-5 (Step J09), via the router 546-5, and the gateway 554 (Step J10), and also via the NNI communication line 578 to the exchanger 562 (Step J11). The above-described IP packet contains the transmission source telephone number "03-1111-2222" and the destination telephone number "06-3333-4444".

Subsequently, a call setting request which contains the transmission source telephone number "03-1111-2222" and the destination telephone number "06-3333-4444" is transferred to the exchanger 561 (Step J12). The exchanger 561 which receives the call setting request returns a confirmation notification of the call setting request to the exchanger 557 (Step J14 to Step J20). Next, when the exchanger 561 calls the telephone set 571 (Step J13) and the telephone set 571 returns a calling operation to the exchanger 561 (Step J22), the exchanger 561 notifies the calling operation of the destination telephone set 571 to the transmission source telephone set 570 (Step J23 to Step J30). When the telephone set 571 is taken up (off hook), such an IP packet indicative of a telephone communication commencement is notified to the transmission source telephone set 570 (Step J32 to Step J40), so that the telephone communication is commenced.

As previously described, the procedure of the terminal-to-terminal communication connection control established between the telephone set 570 and the telephone set 571 is accomplished, so that the telephone communication can be carried out between the telephone set 570 and the telephone set 571.

When the telephone communication is ended, a telephone call release notification is transmitted to the exchanger 557 (Step J42 of FIG. 206), and then, a call release completion notification is returned from the exchanger 557 to the telephone set 570 (Step J43). Subsequently, releasing of the communication connection is performed in such a manner that the call release notification and the call release completion notification are sequentially transmitted/received among the exchanger 557, the exchanger 559, the gateway 551, the telephone administration server 549-1, the telephone administration server 549-5, the gateway 554, the exchanger 562, the exchanger 561 and the telephone set 571 (Steps J44 to J59).

The control data which are transmitted/received by the exchangers and the telephone administration server at the steps correspond to the connection control messages of the common line signals. For instance, the Steps J09, J17, J26, J36, J50 and J51 correspond to the IAM message, the ACM message, the CPG message, the ANM message, the REL message and the RLC message.

The above-explained "No. 1-Communication Connection Control between Telephone Sets" will now be summarized as follows: That is, this control method corresponds to such a communication control method between two telephone sets, in which while the IP transfer network is used as the relay network, the IP transfer network is connected to the public switched telephone network. The transmission source telephone set issues the telephone call by employing the transmission source telephone number, the communication enterprise identification code, and the destination telephone number. In the IP transfer network-sided gateway specified by the communication enterprise code, the transmission source telephone set acquires the signal station code of the input gateway used to be connected to the IP transfer network with reference to "input line table provided inside IP transfer network". In the input gateway, while using the destination telephone number as the parameter, the transmission source telephone set acquires the IP address of the output gateway used to connect the communication line from the IP transfer network to the public switched telephone network with reference to "output line table provided outside IP transfer network" within this input gateway. Then, the transmission source telephone set transfers the IP packet containing the transmission source telephone number and the destination telephone number to the output gateway toward the acquired IP address. IN the output gateway, the telephone call is issued to the public switched telephone network based upon both the transmission source telephone number and the destination telephone number contained in the received IP packet, and is transferred via the exchanger to the destination telephone set.

As the another control method, "output line information provided inside IP transfer network" is inquired to the telephone number server, and then, the telephone number server responds. The "input line information provided inside IP transfer network" corresponds to the signal station code of the gateway having the NNI communication line outside the IP transfer network. The "output line information provided outside. IP transfer network" corresponds to the IP address to the gateway having the NNI communication line outside the IP transfer network.

<<No. 2-Communication Connection Control Between Telephone Sets>>

Referring now to FIG. 207 and FIG. 208, a communication connection control No. 2 will be described.

This is such an example that a telephone connection is made from the transmission source telephone set 570 having the telephone number of "03-1111-2222" to the destination telephone set 572 having the telephone number of "092-555-666". When the telephone set 570 dials "00XY-092-555-6666" to request a telephone connection (Step K01 of FIG. 207), the exchanger 557 sends a response (Step K02). While the exchanger 557 employs the communication enterprise identification code "00XY" contained in the dialed information, the exchanger 557 finds out such a exchanger 558 which is connected to the gateway 550 containing the line information to which "00XY" is applied. Then, the exchanger 557 transmits to the exchanger 558, both the transmission source telephone numbers "03-1111-2222" and "00XY-092-555-6666", which are acquired during the dialing operation (Step K03).

Then, the exchanger 558 transmits both the transmission source telephone number 03-1111-2222" and the destination telephone number "092-555-6666" to the gateway 550 containing the line information (Step K04). Referring to the IP transfer network input line table 584 within the gateway 550 containing the line information, the gateway 550 containing the line information finds out one telephone number "03-4444-4000" as access information, and then notifies the found telephone number to the exchanger 558 (Step K05). This access information is used for the gateway for connecting the communication line to such a telephone set whose destination telephone number is "092-555-6666". Next, the exchanger 558 seeks such an exchanger connected to the gateway telephone number "03-4444-4000", namely, finds out the exchanger 560 in this case. Then, the exchanger 558 transfers to the exchanger 560, such information containing the telephone number "03-444-4000" functioning as the access information to the gateway and acquired in the above procedure, the transmission source telephone number "03-1111-2222", and the destination telephone number "092-555-6660". The exchanger 560 transfers both the transmission source telephone number "03-1111-2222" and the destination telephone number "092-555-6666" via the UNI communication line 580 to the gateway 552 to which the telephone number "03-4444-4000" is applied (Step K07). The gateway 552 reports to the exchanger 560, such a fact that these two telephone numbers are received (Step K08).

Upon receipt of the above-explained information, the gateway 552 retrieves the IP transfer network output line table 587 of FIG. 204, and also acquires an IP address of a gateway functioning as a communication counter party used to connect a communication line, namely the IP address "10.240.241.1" of the gateway 553 in this case, while the destination telephone number "092-555-6666" is used as a parameter. The gateway 552 produces an IP packet containing both the transmission source telephone number "03-1111-2222" and the destination telephone number "092-555-6666", which are acquired in the above-described procedure. A transmission source IP address of the produced IP packet is equal to an IP address applied to the gateway 552 (namely, gateway 552 knows own IP address), and a destination IP address of the IP packet is equal to the acquired IP address "10.240.240.1" of the gateway 553 in this case.

It should be noted that in the above-explained procedure in which the gateway 552 finds out the IP address of the gateway 553, the gateway 552 may send an "inquiry IP packet" to the telephone number server 594 (Step KK1 of FIG. 207), and the inquiry IP packet inquires the value of the IP address of the gateway 553 by indicating the destination telephone number "092-555-6666". Then, the gateway 552 may receive a response from the telephone number server 594 (Step KK2 of FIG. 207). Alternatively, while the content of the telephone number server 594 is previously transferred to the internal unit of the gateway 552, the gateway 552 may use the transferred content as the IP transfer network output line table(note that the Steps KK1 and KK2 are optional steps).

Next, the IP packet which is formed and then is sent out from the gateway 552 is reached via the network node apparatus 543, the router 546-2 and the telephone management server 549-2 (Step K09), via the router 546-3, the router 546-4 and the telephone administration server 549-4 (Step K10), and via the network node apparatus 545 to the gateway 553 (Step K11). Next, the gateway 553 notifies such information via the UNI communication line 581 to the exchanger 563 (Step K12). The information contains the transmission source telephone number "03-1111-2222" and the destination telephone number "092-555-6666". The exchanger 563 returns such a fact that these two telephone numbers are received to the gateway 553 (Step K13).

The exchanger 563 transfers a call setting request which contains the transmission source telephone number "03-111-2222" and the destination telephone number "092-555-666" to the exchanger 564 (Step K14). The exchanger 564 returns such a fact that the above-explained call setting request is received to the exchanger 557 (Step K16 to Step K22). Next, the exchanger 564 calls the telephone set 572 (Step K15), and the telephone set 572 notifies the calling operation to the exchanger 564 (Step K24). The exchanger 564 notifies the calling operation of the destination telephone set 572 to the transmission source telephone set 570 (Step K25 to Step K32). When the telephone set 572 is taken up(off hook) (Step K33), such a notification indicative of a telephone communication commencement is notified to the transmission source telephone set 570 (Step K35 to Step K42), so that the telephone communication is commenced.

As previously described, the procedure of the terminal-to-terminal communication connection control established between the telephone set 570 and the telephone set 572 is accomplished, so that the telephone communication can be carried out between the telephone set 570 and the telephone set 572.

When the telephone communication is ended, a telephone call release notification is transmitted from the telephone set 570 to the exchanger 557 (Step K44 of FIG. 208), and then, a call release completion notification is returned from the exchanger 557 to the telephone set 570 (Step K45). Since the call release is notified and the call release completion is notified, the connection between the telephone set 570 and the exchanger 557 is released. Subsequently, releasing of the communication connection is performed in such a manner that the call release notification and the call release completion notification are sequentially transmitted/received among the exchanger 557, the exchanger 560, the gateway 552, the telephone administration server 549-2, the telephone administration server 549-4, the gateway 553, the exchanger 563, the exchanger 564 and the telephone set 572 (Steps K46 to K61).

The above-explained "No. 2-Communication Connection Control between Telephone Sets" will now be summarized. That is, this control method is such a terminal-to-terminal communication connection control method in which the telephone communication is made from one telephone set connected to the public switched telephone network via the IP transfer network to another telephone set connected to the public switched telephone network. The second connection control method is similar to the above-explained fist connection control method. A major different point is given as follows. The "input line information provided inside IP transfer network" corresponds to the telephone number of the gateway having the UNI communication line outside the IP transfer network. The "output line information provided outside IP transfer network" corresponds to the IP address to the gateway having the UNI communication line outside the IP transfer network.

<<No. 3-Communication Connection Control Between Telephone Sets>>

This is such an example that a telephone connection is made from the transmission source telephone set 570 having the telephone number of "03-1111-2222" to the destination telephone set 598 having the telephone number of "093-555-666".

In this example, when the telephone set 570 dials "00XY-093-555-6666" so as to request a telephone connection and also the exchanger 558 issues a request to the gateway 550 containing the line information, the IP transfer network input line table 584 is employed in the gateway 550. The exchanger 558 acquires a signal station code "#2222" as the access information to the gateway used to connect the communication line to the telephone set whose destination telephone number is "093-555-6666". In this case, the exchanger 559 is connected to the gateway 551 via the NNI communication line 577.

Next, the gateway 551 inquires either the IP transfer network output line table 586 or the telephone number server 593, which is provided inside the gateway 551 so as to acquire the IP address of the gateway 553 used to connect the communication line to such a telephone set whose destination telephone number is "093-555-6666", and then forms an IP packet containing both the transmission source telephone number "03-1111-2222" and the destination telephone number "093-55-6666". This formed IP packet is sent out from the gateway 551, and then is reached via the router 546-1, the telephone management server 549-1, the router 546-1, the router 546-5, the telephone management server 549-5, the router 546-5, and the network node apparatus 545 to the gateway 553.

Subsequently, terminal-to-terminal connection information is reached via the exchanger 563 and the exchanger 566 to the telephone set 598, so that the terminal-to-terminal communication connection control between the telephone set 570 and the telephone set 598 is completed. The terminal-to-terminal connection information contains both the transmission source telephone number "03-1111-2222" and the destination telephone number "093-555-6666", which are acquired from the IP packet.

As previously described, this third connection control method is similar to the above-explained first connection control method. A major different point is given as follows. The "input line information provided inside IP transfer network" corresponds to the signal station code of the gateway having the NNI communication line outside the IP transfer network. The "output line information provided outside IP transfer network" corresponds to the IP address to the gateway having the UNI communication line outside the IP transfer network.

<<No. 4-Communication Connection Control Between Telephone Sets>>

This is such an example that a telephone connection is made from the transmission source telephone set 570 having the telephone number of "03-1111-2222" to the destination telephone set 597 having the telephone number of "07-3333-444".

In this example, when the telephone set 570 dials "00XY-07-3333-4444" so as to request a telephone connection and also the exchanger 558 issues a request to the gateway 550 containing the line information, the IP transfer network input line table 584 is employed in the gateway 550. The exchanger 558 acquires the telephone number "03-4444-4000" as the access information to the gateway used to connect the communication line to the telephone set whose destination telephone number is "07-3333-4444". Next, the gateway 552 inquires either the IP transfer network output line table 587 or the telephone number server 594, which is provided inside the gateway 552; so as to acquire the IP address of the gateway 554 used to connect the communication line to such a telephone set whose destination telephone number is “07-3333-4444”, and then forms an IP packet containing both the transmission source telephone number “03-1111-2222” and the destination telephone number “07-3333-4444”. This formed IP packet is sent out from the gateway 552, and then is reached via the network node apparatus 543, the router 546-2, the telephone administration server 549-2, the router 546-2, the router 546-1, the router 546-5, the telephone administration server 549-5 and the router 546-5 to the gateway 554.

Subsequently, terminal-to-terminal connection information is reached via the exchanger 562 and the exchanger 565 to the telephone set 597, so that the terminal-to-terminal communication connection control between the telephone set 570 and the telephone set 597 is completed. The terminal-to-terminal connection information contains both the transmission source telephone number “03-1111-2222” and the destination telephone number “07-3333-4444”, which are acquired from the IP packet.

As previously described, this fourth connection control method is similar to the above explained first connection control method. A major different point is given as follows. The “input line information provided inside IP transfer network” corresponds to the telephone number of the gateway having the UNI communication line outside the IP transfer network. The “output line information provided outside IP transfer network” corresponds to the IP address to the gateway having the NNI communication line outside the IP transfer network.

<<No. 5-Communication Connection Control Between Telephone Sets>>

This is such an example that a telephone connection is made from a transmission source telephone set 570 having a telephone number of “03-1111-2222” to a telephone set 573 (note that telephone number of the telephone is “045-777-8888”) connected to the media router 591.

When the telephone set 570 dials “00XY-045-777-8888” to request a telephone connection (Step L01 of FIG. 209), the exchanger 557 responds the telephone call (Step L02). While the exchanger 557 employs the communication enterprise identification code “00XY” contained in the dialed information, the exchanger 557 finds out such a exchanger 558 which is connected to the gateway 550 containing the line information to which “00XY” is applied. Then, the exchanger 557 transmits to the exchanger 558, both the transmission source telephone numbers “03-1111-2222” and “00XY-045-777-8888”, which are acquired during the dialing operation (Step L03).

The exchanger 558 transmits both the transmission source telephone number “03-1111-2222” and the destination telephone number “045-777-8888” to the gateway 550 containing the line information (Step L04). Referring to the IP transfer network input line table 584, the gateway 550 finds out one telephone number “03-4444-4000” as access information, and then notifies the found telephone number to the exchanger 558 (Step L05). The access information is used for the gateway for connecting the communication line to such a telephone set whose destination telephone number is “045-777-8888”. Next, the exchanger 558 seeks such an exchanger connected to the gateway telephone number “03-4444-4000”. Then, the exchanger 558 transfers to the exchanger 560, such information containing the telephone number “03-4444-4000” acquired in the above procedure, the transmission source telephone number “03-1111-2222”, and the destination telephone number “045-777-8888” (Step L06). The exchanger 560 transfers both the transmission source telephone number “03-1111-2222” and the destination telephone number “045-777-8888” via the communication line 580 to the gateway 552 to which the telephone number “03-4444-4000” is applied (Step L07). The gateway 552 returns such a fact that this gateway receives at least two telephone numbers to the exchanger 560 (Step L08).

Next, the gateway 552 produces an IP packet containing both the transmission source telephone number “03-1111-2222” and the destination telephone number “045-777-8888”, which are acquired by the above-explained communication control. A transmission source IP address of the IP packet is equal to an IP address applied to the gateway 552 (namely, gateway 552 knows own IP address), and a destination IP address of the IP packet is equal to an IP address of a communication counter party to which a communication line is connected, namely, the IP address “10.241.1.1” of the media router 591 in this case. The destination telephone number “045-777-8888” is found out as a parameter from the IP transfer network output line table 587.

The IP packet of telephone call connection request produced in the above-described manner is sent out from the gateway 552 via the network node apparatus 543, the router 546-2 and the telephone administration server 549-2, via the router 546-2, the router 546-3 and the telephone administration server 549-3 via the router 546-3, and the network node apparatus 544 to the media router (Steps L10 to L16). The media router 591 returns the reception of the telephone call connection request to the exchanger 557 (Step L20 to Step L25). Furthermore, the media router 591 calls the telephone sets 573 (Step L18). When the telephone set sends a response (Step L27), the media router 591 notifies the transmission source telephone set 570 that it is calling telephone set (Step L29 to Step L35). When the telephone set 573 is taken up(off hook) (Step L36), a response indicative of a telephone communication commencement is notified to the transmission source telephone set 570 (Step L38 to Step L44), so that the telephone communication is commenced.

As previously described, the procedure of the terminal-to-terminal communication connection control established between the telephone set 570 and the telephone set 573 is accomplished, so that the telephone communication can be carried out between the telephone set 570 and the telephone set 573.

When the telephone communication is ended, a telephone call release notification is transmitted from the telephone set 570 to the exchanger 557 (Step L45), and then, a call release completion notification is returned from the exchanger 557 to the telephone set 570 (Step L46). Both the notification of the call release and the notification of the call release completion are issued, so that the connection between the telephone set 570 and the exchanger 557 is released. Subsequently, releasing of the communication connection is performed in such a manner that the call release notification and the call release completion notification are sequentially transmitted/received among the exchanger 557, the exchanger 560, the gateway 552, the telephone administration server 549-3, the telephone administration server 549-3, the media router 591 and the telephone set 573 (Steps L47 to L60).

The above-described “No. 5-Communication Connection Control between Telephone Sets” is similar to the previously explained. “No. 1-Communication Connection Control between Telephone Sets”, and then, own the following major comparison point: That is, a telephone connection destination corresponds to such a telephone set connected to a media router.

<<NO. 6-Communication Connection Control Between Telephone Sets>.

Referring now to FIG. 210, this sixth communication connection control between telephone sets will be explained. Reference numeral 550-1 and 554-1 show gateways, reference numeral 540-1 indicates an IP transfer network, and reference numeral 1000 indicates an "input line information server". The same reference numerals shown in FIG. 202 will be employed as those for denoting the same, or similar apparatus, telephone sets, public switched telephone networks and other apparatus of this control method. This embodiment is featured by that instead of the gateway 550 containing the line information(shown in FIG. 202), the input line information server 1000 containing the IP transfer network input line table 584 is employed. Also, instead of the Steps J04 and J05 shown in FIG. 205, both a Step J04$x$ and a J05$x$ of FIG. 211 are employed.

A communication enterprise identification code "00XY" dicriminatable from the public switched telephone network 555 and the signal station code to discriminate from the public switched telephone network 555 are applied to the input line information server 1000. FIG. 211 shows an example in which a telephone connection is made from the telephone set570 having a telephone number of "03-1111-2222" as a transmission source to the telephone set 571 having a telephone number of "06-333-4444" as a destination, which will be explained as follows with reference to FIG. 211.

When the telephone set 570 dials "00XY-06-3333-4444" to make a telephone call (Step J01 of FIG. 211), the exchanger 557 confirms the telephone call (Step J02). While the exchanger 557 employs the communication enterprise identification code "00XY" contained in the dialed information, the exchanger 557 finds out such a exchanger 558 which is connected to the input line information server 1000 to which "00XY" is applied. Then, the exchanger 557 transmits to the exchanger 558, both the transmission source telephone numbers "03-1111-2222" and "00XY-06-3333-4444", which acquired during the dialing operation (Step J03). Then, the exchanger 558 transmits both the transmission source telephone number "03-1111-2222" and the destination telephone number "06-3333-4444" to the input line information server 1000 (Step J04$x$). Referring to the IP transfer network input line table 584 within the input line information server 1000, the gateway owns the NNI interface, while the telephone number of the destination telephone set is used as a parameter, namely access information to such a gateway for connecting a communication line to the telephone set whose destination telephone set is "06-3333-4444". Also the input line information server 1000 knows such a fact that a signal station code of a gateway functioning as a signal station is "#2222", and returns to the exchanger 558 (Step J05$x$).

Subsequently, since the process operations defined by the Steps J06 to J40 are carried out, the terminal-to-terminal communication connection control procedure between the telephone set 570 and the telephone set 571 is carried out, so that the telephone communication can be made between the telephone set 570 and the telephone set 571. Similarly, the telephone set 570 can execute the terminal-to-terminal communication connection control procedure with respect to the telephone sets 572, 597, 598 and 573.

<<One Embodiment of Network Node Apparatus>>

Referring now to FIG. 212, a description will be made of a network node apparatus employed in the above-described terminal-to-terminal communication connection control method.

Reference numeral 540-1 is an IP transfer network, reference numerals 543-1 to 545-1 represents network node apparatus, reference numerals 552-1 and 554-1 show gateways, and also reference numerals 547-1 and 548-1 indicate relay apparatus, which are connected is communication lines to each other. An IP address "a" is applied to the gateway 552-1, and an IP address "b" is applied to the gateway 554-1. Furthermore, an IP address "x" is applied to a joint point between the network node apparatus 543-1 and a communication line provided on the side of the gateway 552-1, and an IP address y" is applied to a joint point between the network node apparatus 545-1 and a communication line provided on the side of the gateway 554-1. Referring numeral 543-1 shows an address administration table for holding the four sets of IP addresses "a", "b", "x" and "y". Reference numeral 543-1T shows an address administration table for holding the four sets of IP addresses "a", "b", "y" and "x".

As to an IP packet PCK-1 which is transmitted from the gateway 552-1 to the gateway 554-1, a transmission source IP address thereof is "a", and a destination IP address thereof is "b". When the IP packet PCK-1 is reached to the network node apparatus 543-1, the address management tables 543-1T is considered. In this embodiment, since the three sets of front IP addresses "a", "b", "x" among the internal information "a", "b", "x", "y" are made coincident with the three IP addresses contained in the IP packet PCK-1, another IP packet "y" contained inside the address administration table 543-1 and an IP capsulation operation for applying an IP header is carried out, so that a new IP packet PCK-2 is formed. The IP packet PCK-2 is transmitted from the network node apparatus 543-1 to a communication line, and then, is reached via the routers 547-1 and 548-1 to the network node apparatus 545-1. In this network node apparatus 545-1, an inverse-capsulation operation is carried out so as to remove the IP header which has been applied by the above-explained IP capsulation operation. As a result, an IP packet PCK-3 is restored, and then is sent via the communication line to the gateway 554-1. The address administration table 545-1T is used so as to transmit the IP packet along a direction opposite to the above-explained direction.

Both the network node apparatus 543-1 and 545-1 own such a function capable of executing both as IP capsulation operation and an inverse-capsulation operation, and hold therein address administration tables for this purpose. The IP addresses of the gateways are featured to be registered/held in the address administration tables of the network node apparatus 543-1 and 545-1.

<<Another Embodiment of Network Node Apparatus>>

Referring now to FIG. 213, a description will be made of network node apparatus 543-2 and 545-2 employed in the above-described terminal-to-terminal communication connection control method, according to another embodiment.

Reference numeral 540-2 is an IP transfer network, reference numerals 543-2 and 545-2 represent network node apparatus, reference numerals 552-2 and 554-2 show gateways, and also reference numerals 547-2 and 548-2 indicate relay apparatus, which are connected via communication lines to each other. An IP address "a" is applied to the gateway 552-2, and an IP address "b" is applied to the gateway 554-2. Reference numeral 543-2T shows an address administration table for holding the above-described IP addresses "a", and reference numeral 545-2T shows an address administration table for holding the above-described IP addresses "b".

As to an IP packet PCK-11 which is transmitted from the gateway 552-2 to the gateway 554-2, a transmission source IP address thereof is "a", and a destination IP address thereof is "b". When the IP packet PCK-11 is reached to the network node apparatus 543-2, the address administration table 543-2T is considered. In this embodiment, since "a" of the internal information is made coincident with the transmission source IP address contained in the IP packet PCK-11, it can be understood that the IP packet PCK-11 is transferred into the IP transfer network 540. Next, the IP packet PCK-11 may be directly changed into an IP packet PCK-12. The IP packet PCK-12 is sent from the network node apparatus 543-2 to the communication line, and then is reached via the routers 547-2 and 548-2 to the network node apparatus 545-2. In this case, since the destination IP address "b" of the IP packet PCK-12 is recorded, in the address administration table 545-2T, the IP packet PCK-12 is directly sent as an IP packet PCK-13 via the communication line to the gateway 554-2. Both the network node apparatus 543-2 and 545-2 may confirm such a permission that the IP packet is accepted within the IP transfer network 540-2. Otherwise, both the network node apparatus 543-2 and 545-2 may confirm that the IP address "b" is present outside the IP transfer network 540-2. The IP addresses of the gateways are featured to be registered/held into the address administration tables employed in the network node apparatus 543-2 and 545-2.

The above-explained functions of the network node apparatus are summarized as follows: That is, in this embodiment, there are two different types of the network node apparatus. When the IP packet is accepted from the external unit of the IP transfer network into the internal unit of the IP transfer network, one network node apparatus executes the IP capsulation operation to newly apply the IP header to the received IP packet, and another network node apparatus does not execute the IP capsulation operation. The IP addresses of the gateways are registered/held in the address administration tables of the network node apparatus.

13. 13th Embodiment in which Control Line and Voice Line are Separated from Each Other to be Connected to Public Switched Telephone Network A description is made of a method for controlling a telephone-to-telephone communication connection, in which a communication signal is transmitted via an IP transfer network and a public switched telephone network(PSTN), while a control communication line is separated from a voice (speech) communication line.

In FIG. 214, reference numeral 1500 shows an IP transfer network, reference numeral 1501 represents a public switched telephone network, reference numeral 1502 shows a gateway equipped with a capsulation function, reference numeral 1503 represents a relay gateway, reference numerals 1508 and 1520 indicate telephone sets, reference numeral 1518 denotes a relay exchanger, reference numeral 1519 shows a subscriber exchanger, reference numeral 1505 represents a control communication line by the common line signal system, and reference numeral 1506 indicates a voice (speech) communication line. Also, reference numeral 1507 indicates a control IP communication line, and reference numeral 1509 shows a voice IP communication line. Also, reference numerals 1544 and 1547 show network node apparatus, reference numerals 1570 indicates a pilot telephone server, reference numeral 1571 shows a telephone administration server, reference numeral 1572 represents a telephone number server, reference numeral 1573 shows a table administration server, and reference numerals 1521, 1522, 1523, 1524 indicate routers. Further, reference numeral 1513 shows a relay control unit (STP), and reference numeral 1516 indicates a voice control unit.

A portion of internal resources (namely, apparatus and servers) of the IP transfer network shown in FIG. 214 may be made in correspondence with a portion of the internal resources of the IP transfer network shown in FIG. 145 or FIG. 187. That is, a telephone set 1508, a media router 1560, a network node apparatus 1544, a pilot telephone server 1570, a telephone administration server 1571, a telephone number server 1572, a table administration server 1573, a network node apparatus 1547 correspond to the telephone set 1208, the media router 1201, the network node apparatus 1244, the pilot telephone server 1270, the telephone administration server 1271, the telephone number server 1272, the table administration server 1273 and the network node apparatus 1247, respectively.

<<Function of Relay Control Unit>>

In the present invention, a point provided in the common line signal system is expressed by a signal station, and a point code is represented by a "signal station address". The relay control unit 1513 in the relay gateway 1503 is equal to a relay signal station (STP) of a common line signal system, as viewed form the public switched telephone network 1501, and a signal station address "PC-3" is applied to the relay signal station. The relay control unit 1513 manages a signal station address administration table 1527 (refer to FIG. 225). The relay control unit 1513 retrieves the signal station address administration table, and then can acquire a signal station address of a exchanger employed in the public telephone network 1501. The relay control unit 1513 determines a producing rule as same as the rule of the public switched telephone network 1501. The producing rule is to produce a line number "CIC-n" written in a signalling unit which is transmitted to an NNI communication line 1505, and is to produce a signal link selection "SLS-n".

The relay control unit 1513 is assigned an IP address "GW03" and converts various sorts of messages(namely, IAM, ACM, CPG, ANM, REL, RLC etc.) of telephone call controls stored in an IP packet transmitted from the control IP communication line 1507 into various sorts of messages (namely, IAM, ACM, CPG, ANM, REL, RLC etc.) stored in a signalling unit by the common signal line system, and then, transmits these converted messages to the control communication line 1505. Also, the relay control unit 1513 owns such a function having an opposite sense. That is, various sorts of telephone call control, which are stored in the signalling unit sent from the control communication line 1505 are converted into messages stored in the IP packet, and then, the converted message is transmitted to the control IP communication line 1507.

The IP address "GW03" and the signal station code "PC-3" assigned to the relay control unit 1513 are also IP address and signal station code assigned to the relay control unit 1503.

<<Function of Voice Control Unit>>

The voice control unit converts voice stored in an IP packet transmitted from the voice IP communication line 1509 into a voice packet, and then transmits the voice frame to the voice communication line 1506. The voice frame is adapted to such a format of a frame which can be transferred within the public switched telephone network 1501, for instance, primary group interface(PRI, 23B+D) of the ISDN. Also, the voice control unit 1516 owns a function opposite to the above-explained function. That is, the voice control unit 1516 converts a voice frame sent from the voice communication line 1506 of the public switched telephone network 1501 into an IP frame format, and then transmits the converted IP frame to the voice IP communication line 1509. The voice control unit has an IP address used to transmit/receive a voice IP frame. The IP address is employed so as to set a media path connection table.

<<Telephone Number Server>>

When a telephone number is inquired to the telephone number server 1572, this telephone number server 1572 responds an IP address which is used to communicate a telephone set having the inquired telephone number. In such a case that a telephone communication destination correspond to a relay gateway, the telephone number server 1572 responds a value of an IP address applied to the relay gateway. In such a case that a telephone communication destination corresponds to a gateway equipped with a capsulation function, the telephone number server 1572 responds to an IP address of a media router connected to a destination of the gateway.

<<Connection Phase>>

This is such an example that a telephone communication is made from the telephone set 1508 to the telephone set 1520. In this embodiment, an IP address "EA81" of the pilot telephone server 1570 is opened to the user of the IP transfer network 1500, and the media router 1560 holds the IP address "EA81". When the handset of the telephone set 1508 is taken up, a telephone call signal is transferred to the media router 1560 (Step N01 of FIG. 215), and the media router 1560 confirms telephone calling operation (Step N02). Next, the media router 1560 produces such an IP packet 1530 (refer to FIG. 216), and then transmits the IP packet 1530 to the network node apparatus 1544 (Step N03), where a transmission source IP address is an IP address "EA1" of the media router 1560, and a destination IP address is an external IP address "EA81" of the pilot telephone server 1570. The IP packet 1530 contains a telephone number "TN-1" of the telephone set 1508 functioning as a transmission source, a telephone number "TN-2" of the telephone set 1520 functioning as a destination, aUDP port number "5006", and additional information "Info-2", which are employed in order to allow the telephone set 1508 functioning as the transmission source to transmit the telephone voice. A payload portion of the IP packet 1530 is a UDP packet, both the transmission source and the destination port number of which are equal to "5060".

The network node apparatus 1544 inputs the external IP packet 1530, and applies the IP capsulation operation(as previously explained in other embodiments) so as to form an internal IP packet 1531 (refer to FIG. 217), and then transmits the IP packet 1531 to the pilot telephone server 1570 whose internal IP address is equal to "IA81" (Step N04). Upon receipt of the IP packet 1531, the pilot telephone server 1570 produces such an IP packet 1532-1 (refer to FIG. 218) in which the IP addresses "EA1, IA1, EA81, IA81" contained in the IP packet 1531 are included in a payload portion thereof. Then, the pilot telephone server 1570 sends the IP packet 1532-1 to the telephone administration server 1571 (Step N05). In this case, the pilot telephone server 1570 uses the previously held IP address "IA91" of the telephone administration server 1571.

<<Forming of CIC Administration Table>>

The telephone administration server 1571 receives the IP packet 1532-1 and writes the below mentioned items into a record of a CIC administration table managed by the telephone administration server 1571, namely, the IP address "IA91" of the telephone administration server 1571, the procedure segment "IAM", the transmission source telephone number "TN-", the destination telephone number "TN-2", both the external IP address "EA1" and the internal IP address "IA1" of the media router 1560, the voice communication port number "5006" provided in the IP packet 1532-1, both the external IP address "EA81" and the internal IP address "IA81" of the pilot telephone server 1570, the write time instant(year, months, day, hour, minute, second) "St-2" (see CIC administration table 1571-1 of FIG. 219).

Next, the telephone administration server 1571 indicates an IP packet 1532-2 (refer to FIG. 220) for inquiring the destination telephone number "TN-2" to the telephone number 1572 (Step N06). The telephone number server 1572 stores an IP address "GW03" into an IP packet 1532-3 (refer to FIG. 221) and responds this IP packet (Step N07). The IP address "GW03" is related to apparatus and the like which are connected to the telephone set 1520. It should be noted that the apparatus and the like which are connected to the telephone set 1520 constitute the relay control unit 1513 in the relay gateway 1503 in this example.

<<Administration of Line Number>>

The telephone administration server 1571 adds the IP address "GW03" of the relay control unit 1513 acquired from the telephone number server 1572 into the CIC administration table 1571-1 (refer to FIG. 219). Further, the telephone administration server 1571 determines a CIC number "CIC-2" based upon the rule determined by the telephone administration server 1571 with respect to a set of the IP address "IA91" of the telephone administration server 1571 and the IP address "GW03" of the relay control unit 1513, and then writes the CIC number "CIC-2" into the CIC administration table. The condition is indicated in a record of a CIC administration table 1571-2 (refer to FIG. 222).

Next, the telephone administration server 1571 produces an IP packet 1534 (refer to FIG. 223) (IAM packet) from the IP packet 1532-1 (refer to FIG. 218) with reference to the CIC administration table 1571-2 (refer to FIG. 222), and then transmits the IP packet 1534 to the relay control unit 1513 (Step N09). In this case, a destination IP address of the IP packet 1534 corresponds to the IP address "GW03" of the relay control unit 1513.

<<Operation of Relay Control Unit>>

Upon receipt of the IP packet 1534 (refer to FIG. 223) (Step N09), the relay control unit 1513 derives from the IP packet 1534, the transmission source IP address "IA91", the destination IP address "GW03", the line number "CIC-2", the procedure segment "IAM", the transmission source telephone number "TN-1", the destination telephone number "TN-2", both the external IP address "EA1" and the internal IP address "IA1" of the media router 1560, the voice communication port number "5006", both the external IP address "EA81" and the internal IP address "IA81" of the pilot telephone server 1570. The relay control unit 1513 writes/records the derived items as a record of a CIC administration table 1513-1 (refer to FIG. 224) managed by the relay control unit 1513 in combination with a time instant "St-3".

Further, the relay control unit 1513 retrieves a signal station address administration table 1527 (refer to FIG. 225), indicates the telephone number "TN-2" of the destination telephone 1520, and acquires a signal station address "PC-19" of the exchanger 1519 for managing the telephone set 1520. Furthermore, the relay control unit 1513 determines both a CIC number "CIC-3" and a signal link selection. "SLS-3" based upon such a rule which is previously defined with respect to the public switched telephone network 1501. The relay control unit 1513 writes the signal station address "PC-3" of the relay control unit 1513, the acquired "PC-19", the signal link selection "SLS-3", and the line number "CIC-3" as a new record of the address connection table 1525 in combination with a media path identifier "MP-7". As a result, this address connection table becomes a table 1525-1 (refer to FIG. 226).

Subsequently, the relay control unit 1513 produces a signalling unit 1535 which contains the signal station address "PC-3", the acquired "PC-19", the line number "CIC-3", the signal link selection "SLS-3", the message "IAM" required from the IP packet 1534, and the parameter "Para-2" (refer to FIG. 227), and then transmits this signalling unit 1535 to the control communication line 1505 (Step N10).

<<Cooperation Between Relay Control Unit and Voice Control Unit>>

The relay control unit 1513 notifies the media path identifier "MP-7", internal IP address "IA1" for encapsulation (Step 1513-1 in FIG. 228), the external IP address EA1 of the media router 1560, and the voice communication port number "5006" via the information line 1515 to the voice control unit 1516. The voice control unit 1516 writes the notified information as a record of the media path connection table 1528, and then reports the completion of the notified information writing operation (Step 1516-1). The media path identifier is used to discriminate voice communication path for telephone call. A record of a media path connection table 1528-1 (refer to FIG. 231) indicates such information before the writing operation, and a media path connection table 1528-2 (refer to FIG. 232) indicates a written result. It should be noted that the voice control unit 1516 determines a logic communication line used to transmit voice data from the voice control unit 1516 to the voice communication line 1506, and writes a logic communication line identifier "CH1" (namely, transmission channel indicated by Channel-S) thereof as a record of the media path connection table 1528-2.

<<Operation of Switching Network and ACM Message>>

The exchanger 1518 receives the signalling unit 1535 via the control communication line 1505 (Step N10), and thereafter transfers the signalling unit 1535 to the exchanger 1519 (Step N11). The exchanger 1519 receives the signalling unit 1535, and confirms as to whether or not the destination telephone "TN-2" contained in the signalling unit 1535 can be received. If the telephone call can be received, then the exchanger 1519 notifies a telephone reception notification to the telephone set 1520 (Step N12). Furthermore, the telephone set 1520 produces such a signalling unit 1538-1 (refer to FIG. 235) for notifying the reception of the signalling unit 1535 and returns the signalling unit 1538-1. The signalling unit is reached via the exchanger 1518 (Step N13) to the relay control unit 1513 (Step N14). The relay control unit 1513 acquires address information used to produce an IP packet based upon label information of the received signalling unit 1538-1, and then produces an IP packet 1551 (ACM message, refer to FIG. 236) and further sends the IP packet 1551 to the telephone administration server 1571 (Step N15).

The telephone administration server 1571 derives both the line number "CIC-2" and the procedure segment "ACM" from the received IP packet 1551, and investigates the CIC administration table 1571-2 (refer to FIG. 222) held by the telephone administration server 1571 so as to find out such a record indicative of the own IP address "IA91", the IP address "GW63" of the communication counter party, and the line number "CIC-2". Then, the telephone administration server 1571 rewrites a procedure segment column of the relevant record of the CIC administration table 1571-2 into the above-explained procedure segment "ACM". Next, the telephone administration server 1571 produces an IP packet which indicates that the ACM message is received, and notifies the IP packet to the media router 1560 (Steps N17, N18, N19).

<<Media Path Connection Table>>

After the process operation of the Step N10 has been completed, the relay control unit 1513 adds the media path identifier "MP-7" to the voice control unit 1516. Then, when the relay control unit 1513 requests both an IP address and a port number (Step 1513-2 in FIG. 228), the voice control unit 1516 answers the internal IP address "IA1" for capsulation, the transmission source IP address "EA3" of the IP packet and the port number "5008" of the UDP packet to the relay control unit 1513 (Step 1516-2), which are formed and sent to the voice communication line 1509 employed in the IP transfer network 1500 by the voice control unit. It should also be noted that the voice control unit 1516 secures a logic voice communication line for receiving voice data from the exchanger 1518, and determines an identifier "CH-2" (reception channel indicated by Channel-R) to record this identifier in the record of the media path connection table 1528-3 (refer to FIG. 233).

The relay control unit 1513 receives the internal IP address of the voice control unit 1516, the transmission source IP address "EA3" and the port number "5008" of the UDP packet provided in the speech control unit from the voice control unit 1516, and writes this internal IP address into the CIC management table 1513-1 (refer to FIG. 224). The resultant content is indicated in the CIC administration table 1513-2 (refer to FIG. 234). In this table, the address of the telephone proxy server is not contained. The voice control unit 1516 previously holds one, or more internal IP address of the vice control unit 1516, while one of these internal IP addresses is used as the above-explained internal IP address "IA3".

<<Transmission of CPG Message>>

When the telephone set 1520 reports the telephone calling operation to the exchanger 1519 (Step N20), the exchanger 1519 forms a signalling unit (CPG message) for notifying the telephone calling operation and transmits the signalling unit via the exchanger 1518 (Step N21) to the relay control unit 1513 (Step N22). The relay control unit 1513 acquires address information used to an IP packet based upon the label information of the received signalling unit with reference to the address connection table 1525-1 (refer to FIG. 226), and produces a CPG message (FIG. 237) having an IP packet format. The IP packet is sent to the telephone administration server 1571 (Step N23). The telephone administration server 1571 notifies the notification of the telephone calling operation via the media router 1560 to the telephone set 1508 (Steps N25 to N28). While the CPG message is formed, the relay control unit 1513 acquires the transmission source external IP address "EA3", the internal IP address "IA3", and the port number "5008" of the UDP packet within the voice control unit 1516 from the CIC administration table 1513-2 (refer to FIG. 234), and then writes these acquired data into a CPG message 1552. The telephone administration server 1571 derives the external IP address "EA3", the internal IP address "IA3", and the port number "5008" from the received CPG packet 1552, and may write the derived data into the administration table 1571-2 (refer to FIG. 222).

<<Transmission of ANM Message>>

Next, when the user of the telephone set 1520 responds to the telephone calling operation (Step N30), the exchanger 1519 forms a signalling unit (ANM message) for notifying the telephone responding operation and transmits the signalling unit via the exchanger 1518 (Step N31) to the relay control unit 1513 (Step N32). The relay control unit 1513 produces an ANM message 1553 having an IP packet format (refer to FIG. 238) based upon the label information of the received signalling unit with reference to the address connection table 1525-1 (refer to FIG. 226). The IP packet 1553 is sent to the telephone administration server 1571 (Step N33). Then, the telephone administration server 1571 notifies the notification of the telephone response via the media router 1560 to the telephone set 1508 (Steps N35 to N38). In other words, an IP packet 1554 (FIG. 240) is sent from the telephone administration server 1571 to the pilot telephone server 1570 (Step N35), and IP packet 1555 (FIG. 241) is sent from the pilot telephone server 1570 to the network node apparatus 1544 (Step N36), and an IP packet 1556 (FIG. 242) is sent from the network node apparatus 1544 to the media router 1560 (Step N37).

When the relay control unit 1513 produces the ANM message, the relay control unit 1513 acquires the transmission source external IP address "EA3", the internal IP address "IA3" of the voice control unit 1516, and the port number "5008" of the UDP packet from the CIC administration table 1513-2 (refer to FIG. 234), and then writes these acquired data into an ANM message 1553. The telephone administration server 1571 derives the external IP address "EA3", the internal IP address "IA3", and the port number "5008" from the received response packet 1553, and may write the derived data into the administration table 1571-2 (refer to FIG. 222).

<<Write Timing into CIC Management Table 1571>>

The timing at which the telephone administration server 1571 derives the external IP address "EA3", the internal IP address "IA3", and the port number "5008" and then writes the derived addresses into the CIC administration table 1571-2 is carried out only at one of the process operations defined at the step N23 where the CPG message is received and the step N33 where the ANM message is received.

<<Setting of IP Communication Record by Relay Control Unit>>

The relay control unit derives the IP addresses "EA3", "EA1", "IA3", "IA1" from the internal record of the CIC administration table 1513-3 (refer to FIG. 239) at the Step N33, and then transmits the derived IP addresses to the table administration server 1576 (Step N41). The table administration server 1576 sets the received IP addresses as IP communication records "EA3, EA1, IA3, IA1" of the address administration table provided in the network node apparatus 1547 (Step N42). It should be understood that both the record format of the address administration table and the address setting method to the record have already been explained in other embodiments.

<<Setting of IP Communication Record by Telephone Administration Server>>

Similarly, the telephone administration server 1571 derives the IP addresses "EA1", "EA3", "IA1", "IA3" from the internal record of the CIC administration table 1513-3, and then transmits the derived IP addresses to the table administration server 1573 (Step N43). The table administration server 1573 sets the received IP addresses as IP communication records "EA1, EA3, IA1, IA3" of the address administration table provided in the network node apparatus 1544 (Step N44).

<<Communication Phase>>

A telephone communication established between the user of the telephone set 1508 and the telephone set 1520 corresponds to steps similar to those explained in other embodiments. In this telephone communication, both an IP communication record indicated in the address administration table (namely, records of "EA1, EA3, IA1, IA3") of the network node apparatus 1544, and an IP communication record indicated in an address administration table(namely, records of "EA3, EA1, IA3, IA1") of the network node apparatus 1547 are employed.

The voice(speech) signal of the telephone set 1508 is digitalized, and the digitalized voice data is described on the payload of the IP packet 1561 (refer to FIG. 243). In this case, both the destination address and the UDP port number, which are acquired in the above-explained connection phase are employed. In other words, the transmission source address corresponds to the IP address "EA1" of the media router 1560, the destination address corresponds to the IP address "EA3" of the voice control unit 1516 connected to the destination telephone set 1520, "5006" is employed as the UDP port number used in the voice transmission by the media router, and also "5008" is employed as the UDP port number used in the voice transmission by the voice control unit 1516. The analog voice is sent from the telephone set 1508, and the analog-voice is digitalized to become a voice IP packet 1561 (refer to FIG. 243) in the media router 1560, and then the voice IP packet 1561 is sent to the network node apparatus 1544. In this network node apparatus 1544, the digital voice data is capsulated to become an IP packet 1562 (refer to FIG. 244) by using the IP communication records "EA1, EA3, IA1, IA3", and then, the IP packet 1562 is reached via the voice IP communication line, and the router 1524 to the network node apparatus 1547. The network node apparatus 1547 inverse-capsulates the internal IP packet 1562 by using the above-described IP communication records "EA3, EA1, IA3, IA1" to produce an IP packet 1563 (refer to FIG. 245). The IP packet 1563 into which the digitalized voice is stored is reached to the voice control unit 1516. The voice control unit derives the transmission source IP address "EA1", the transmission source port number "5006", the destination IP address "EA3", and the destination port number "5008", which are contained in the IP packet 1563, and also refers to the media path connection table 1528-3 (FIG. 233). While using a media path record equal to the transmission source IP address "EA1", the transmission source port number "5006", the destination IP address "EA3", and the destination port number "5008", the digitalized voice contained in the IP packet 1563 is converted into a speech (voice) frame 1564 (FIG. 246) having a format transferred to the voice communication line 1506. The speech frame 1564 is reached via the exchanger 1518 to the exchanger 1519, so that voice is outputted from the telephone set 1520. The voice stored in the speech frame sent from the telephone set 1520 is transferred along a direction opposite to the above-explained direction to be reached to the telephone set 1508.

<<Release Phase>>

When the user of the telephone set 1508 notifies the end of the telephone communication (Step N50 of FIG. 215), the notification is notified from the media router 1560 to the telephone administration server 1571 (Steps N51 to N53). The telephone administration server 1571 returns the release completion to the media router 1560 (Steps N64 to N66). Also, the telephone administration server 1571 sends an IP packet 1565 (FIG. 247) for notifying the telephone call release to the relay control unit 1513 (Step N55). The relay control unit 1513 returns an IP packet 1566 (FIG. 248) for notifying the release completion to the telephone administration server 1571 (Step N62). The relay control unit 1513 sends a telephone call release notification to the relay exchanger 1518 (Step N56), and then, the relay exchanger 1518 returns the release completion to the relay control unit 1513 (Step N61). The relay control unit 1518 sends the telephone call release notification to the relay exchanger 1519 (Step N57), and then, the relay exchanger 1519 returns the release completion to the relay exchanger 1518 (Step N60).

The exchanger 1519 sends a telephone call cut-off signal to the telephone set 1520 (Step N58).

<<Deletion of Media Path Record>>

At the Step N55, the relay control unit 1513 instructs the voice control unit 1516 to delete the record of the media path of the media path connection table 1528-3 (Step 1513-3 of FIG. 230). The voice control unit 1516 reports the record deletion of this media path (Step 1516-3). The record may be used in operation/record(optional process).

<<Deletion of IP Communication Record and CIC Management Table Record>>

After the Step N55, the telephone administration server 1571 transmits the line number "CIC-2" written in the release IP packet 1565 to the table administration server 1573 (Step N73) so as to delete the IP communication records "EA1, EA3, IA1, IA3" corresponding to the line number "CIC-2" provided in the network node apparatus 1544 (Step N74). Furthermore, the telephone administration server 1571 deletes the record of the telephone set of the CIC administration table 1571-2 (refer to FIG. 222) managed by the telephone administration server 1571. It should be noted that the telephone administration server 1571 may employ the record in the operation/record of the telephone call(optional process).

The relay control unit 1513 transmits the line number "CIC-2" written in the release IP packet 1566 to the table administration server 1576 (Step N71) so as to delete the IP communication records "EA3, EA1, IA3, IA1" provided in the network node apparatus 1547 (Step N72). Furthermore, the relay control unit 1513 deletes the record of the telephone set of the CIC administration table 1513-3 (refer to FIG. 239) managed by the relay control unit 1513. It should be noted that the relay control unit 1513 may employ this record in the operation/record (optical process).

Next, the operations of the 13-th embodiment will now be summarized.

While the control IP communication line and the voice IP communication line of the telephone are separated from each other between the termination gateway equipped with the capsulation function and the relay gateway, the telephone communication can be established between the telephone set 1 and the telephone set 2 via the termination gateway equipped with the capsulation function, the relay gateway, the NNI interface communication line, and the public switched telephone network. Both the telephone administration server in the termination gateway equipped with the capsulation function and the relay control unit in the relay gateway own the individual CIC administration tables, and manage the line numbers by using these individual CIC administration tables. The relay control unit provided in the relay gateway converts the IP packet and the signalling unit by using the address connection table which contains the address information of the IP packet and the label information of the signalling unit.

The relay control unit retrieves the signal station address administration table, indicates the telephone number of the destination telephone set, and acquires the signal station address of the exchanger for managing this telephone set. Also, the relay control unit determines the line number and the signal link selection based upon the rule previously determined by the public switched telephone network.

While using the media path connection table contained in the voice control unit within the relay gateway, the voice control unit converts the IP packet which stores the digital voice, and the voice signal which is transferred into the voice communication line of the NNI communication line. While using the address connection table containing both the address information of the IP packet and the label information of the signalling unit, the voice control unit executes the conversion between the IP packet and the signalling unit. The voice control unit owns the IP address used to transmit/receive the voice IP packet, and then provides the IP address so as to set the media path connection table.

While using the media path connection table, the voice control unit converts the IP packet which stores the digital voice, and the voice signal which is transferred into the voice communication line of the NNI communication line. The voice control unit secures the logic voice communication line which is used in the reception, or the transmission from the public switched telephone network, and determines the identifier thereof.

The termination gateway equipped with the capsulation function contains the relay control unit and the network node apparatus. The network node apparatus owns the IP capsulation function and the inverse-capsulation function. The relay control unit contains the telephone administration server, the telephone number server, the pilot telephone server and the table administration server. The relay control unit transfers the telephone call control packet to the relay control unit among the IP packets which are entered from the media router into the network node apparatus, and branches the voice IP packet to the voice IP communication line. As a consequence, the telephone sets 1508 and 1520 can establish the telephone communication with each other via the IP transfer network 1500 and the public switched telephone network 1501.

14. 14th Embodiment in which IP Transfer is Employed as Relay Network

In FIG. 249, reference numeral 1400 shows an IP transfer network, reference numerals 1401 and 1402 represent relay gateways, reference numeral 1403 shows a gateway equipped with a capsulation function, reference numerals 1405 to 1407 represent public switched telephone networks(PSTN), reference numerals 1408 to 1411 show subscriber exchangers, reference numerals 1412 and 1413 denote relay exchangers, reference numerals 1415 and 1416 represent control communication lines by the common line signal system, and reference numerals 1417 and 1418 indicate voice(speech) communication lines. Also, a set of the control communication line 1415 and the voice communication line 1417 are an NNI communication line between the exchanger 1412 and the relay gateway 1401, whereas a set of the control communication line 1416 and the voice communication line 1418 is an NNI communication line between the exchanger 1413 and the relay gateway 1402. Reference numerals 1438 and 1439 show address connection tables. Reference numerals 1441 and 1442 indicate gateway address administration server ("DNS-1" in FIG. 273) and reference numerals 1443 and 1444 indicate signal station address administration server ("DNS-2" in FIG. 274). Also reference numerals 1429 and 1430 show media path connection tables. In the present invention, a point provided in the common line signal system is expressed by a signal station, and a point code is represented by a "signal station address".

The IP address of the relay gateway 1401 is "GW05". The relay control unit 1423 holds the IP address "GW05". Similarly, the IP address of the relay gateway 1402 is "GW06", and the relay control unit 1424 holds the IP address "GW06".

<<Communication Between Telephone Sets 1420 and 1421>>

In the beginning, a description is made of a terminal to-terminal communication connection control method by which the telephone set 1420 is communicated with the telephone set 1421 via the public switched telephone network 1405, the IP transfer network 1400, and the public switched telephone network 1406.

<<Connection Phase>>

When the handset of the telephone set 1420 is taken up, a telephone call signal is transferred to the exchanger 1408 (Step HA01 of FIG. 250), and the exchanger 1408 confirms telephone calling operation (Step HA02). The exchanger 1408 notifies a telephone call setting request to the relay exchanger 1412 (Step H03). Then, the relay exchanger 1412 accepts the telephone call setting request to produce a signalling unit 1451 of the common line signal system, and then transfers the signalling unit 1451 via the control communication line 1415 to the relay control unit 1423 employed in the relay gateway 1401 (Step HA04). A destination signal station code of the signalling unit 1451 is "DPC-1", a transmission source signal station code thereof is "OPC-1", a signal link selection thereof is "SLS-1", a line number thereof is "CIC-1", a message thereof is "IAM", and a parameter is "Para-1". The content of the parameter "Para-1" contains both a telephone number "TN-1" of the telephone set 1420 and a telephone number "TN-2" of the telephone set 1421. A message "MSG-1" contained in the signalling unit 1451 shown in FIG. 249 implies "IAM".

<<Operation of Relay Control Unit 1423>>

The relay control unit 1423 receives the signalling unit 1451 (Step HA04). FIG. 273 represents such a procedure that the relay control unit 1423 converts the signalling unit 1451 into an IP packet 1542. The relay control unit 1423 receives the signalling unit 1451 (Step S1461-2 of FIG. 273) so as to derive signal station labels "DPC-1, OPC-1, SLS-1, CIC-1" (Step S1461-3) contained in the signalling unit 1451. The relay control unit 1423 checks as to whether or not a signal station label is present in the address connection table 1438 (Step S1461-4), namely such a record containing a set of the destination signal station code (DPC), the transmission source signal station code (OPC), the signal link selection (SLS) and the line number (CIC). In this case, since there is no record coincident with each other in the address connection table 1438-1 (refer to FIG. 261), the signal station label is additionally written at the record of the address connection table 1438 (Step S1461-5) and the relay control unit 1423 derives the telephone number "TN-2" of the telephone number 1421 within the parameter "Para-1", and inquiries the gateway address administration server 1441 to obtain an answer of an IP address of a gateway which manages the above-explained telephone number "TN-2" (Step S1461-6). In this case, the relay control unit 1423 may acquire an IP address "D-ad-x" (namely, "GW06") of the relay gateway 1402. In this case, both the gateway address administration server 1441 and 1442 receive input information of all of 10-digits of a telephone number, or upper-graded 6 digits thereof(namely, both local area number and telephone office number), and provide output information of an IP address of a gateway which manages the telephone number.

It should also be noted that the gateway address administration servers 1441 and 1442 may provide the above information by the known way of domain name server (DNS) replacing the telephone number by a domain name. Furthermore, in the case that a total number of telephone numbers to be inquired is small, the gateway address administration server may be replaced by the IP address administration table 1441-1 (refer to FIG. 251). In this case, the IP address administration table 1441-1 corresponds to such a table list representative of a correspondence relationship between telephone numbers and IP addresses of the relevant relay gateways. When a telephone number is designated, an IP address of the corresponding relay gateway may be obtained. It should also be noted that the IP address administration table has the same purpose as that of the IP transfer network output line table as explained in other embodiments, namely, the IP address administration table may be used so as to retrieve the correspondence relationship between the telephone number and the IP address.

The relay control unit 1423 holds the IP address "S-ad-x" (namely, "GW05") of the relay gateway 1401, and produces an IP packet 1452. The destination IP address of the IP packet 1452 is "D-ad-x", the transmission source IP address thereof is "S-ad-x", the line number thereof is "CIC-x", and the message thereof is "IAM". The parameter "Para-x2 contains the telephone number "TN-1" of the telephone set 1420 and the telephone number "TN-2" of the telephone set 1421. The above-explained message and parameter are acquired from the signalling unit 1451 (refer to FIG. 253). The relay control unit 1423 determines the line number "CIC-x" for every set of "S-ad-x" and "D-ad-x" based upon a predetermined rule, and employs the determined line number (Step S1461-7 of FIG. 273). For instance, while a value of a line number which is produced just before is saved in an internal memory, the relay control unit 1423 adds the values of the line numbers one by one, and then produces a desirable value of the line number by employing the below-mentioned formula:

$$CIC\text{-}x=CIC\text{-}x+1 \bmod 65536 \qquad (8)$$

At a time instant before the relay control unit 1423 receives the signalling unit 1451, the address connection table 1438 of the relay control unit 1423 becomes empty, and the empty condition is indicated as an address connection table 1438-1 (refer to FIG. 261). When the relay control unit 1423 produces an IP packet 1452, while the label information "DPC-1, OPC-1, SLS-1, CIC-1" contained in the signalling unit 1451 is combined with the label information "S-ad-x, D-ad-x, CIC-x" contained in the IP packet 1452, the relay control unit 1423 further determines a media path identifier "MP-8", and then writes the media path identifier "MP-8" in the address connection table (Step S1461-8 of FIG. 273). The media path identifier is used to request a voice communication path with respect to the voice control unit 1427. The condition is indicated in an address connection table 1438-2 (refer to FIG. 262).

Among the signal station address items("DPC-1, OPC-1") contained in the record of the address connection table 1438-2, the address item "DPC-1" located on the left side corresponds to the signal station address of the relay connection gateway 1401 which holds the address connection table 1438-2. Similarly, among the IP address items("S-ad-x, D-ad-x") contained in the address connection table 1438-2, the address item "S-ad-x" located on the left side corresponds to the IP address of the relay connection gateway 1401 which holds the address connection table 1438-2. A right end of the record is the media path identifier "MP-8".

<<Cooperation Between Relay Control Unit and Voice Control Unit>>

Referring now to FIG. 249, a cooperation between the relay control unit and the voice control unit will be described. The relay control unit 1423 indicates the media path identifier "MP-8" via the information line 1429-1 to the voice control unit 1427 (Step 1423-1 of FIG. 268). The voice control unit 1427 secures an internal IP address "IA5", an external IP address "EA5" and a voice communication port number "5010" of an internal module of the voice control unit 1429 used for the voice communication, and notifies to the relay control unit 1423 via the information line 1429-1 (Step 1427-1). Furthermore, the voice control unit 1427 determines a logic communication line identifier "CH-1" used to identify a logic communication line for transmitting a voice frame to the voice communication line 1417, a logic communication line identifier "CH-2" for identifying a logic communication line used to receive a voice frame from the voice communication line 1417, and writes the logic communication line identifiers "CH-1" and "CH-2" into the media path connection table 1429. The written result is indicated in a media path connection table 1429-1 (refer to FIG. 265).

In the case that the logic communication line 1417 corresponds to a primary group interface line of an ISDN communication line, the logic communication line identifier is constituted by a number of an ISDN communication apparatus and also a number for indicating a specific B-channel(namely, logic transfer line of user information).

The relay control unit 1423 writes into the CIC administration table, the IP address "GW05" of the relay gateway 1401; the CIC number "CIC-2" which has been acquired in the above-explained manner, or has been produced; the telephone number "TN-1" and "TN-2", the IP addresses "EA5" and "IA5", and the port number "5010" contained in the signalling unit 1451. The written result is shown as in the CIC administration table 1423-1 (refer to FIG. 257). It should also be noted that since the procedure step is located after the Step H04, the procedure step is selected to be "IAM".

<<Transfer within IP Transfer Network>>

The relay control unit 1423 transmits the produced (Step S1461-9) IP packet 1452 to the internal unit of the IP transfer network 1400 (Step S1461-10), and the IP packet 1452 is reached via the control communication line 1431-1, the router 1431, and the control communication line 1431-2 to the relay control unit 1424 contained in the relay gateway 1402 (Step HA05).

<<Setting of CIC Management Table and Address Connection Table by Relay Control Unit 1424>>

The relay control unit 1424 receives the IP packet 1452 (Step S1462-2 of FIG. 274). The relay control unit 1424 derives an IP address, a message, a line number, and a parameter from the IP packet 1452 (Step S1462-3). In this case, the destination IP address of the IP packet 1452 is "D-ad-x", the transmission source IP address thereof is "S-ad-x", the line number thereof is "CIC-x", and the message thereof is "IAM" and also the parameter is "Para-x". The parameter "Para-x" contains both the telephone number "TN-1" of the telephone set 1420 and the telephone number "TN-2" of the telephone set 1421. The relay control unit 1424 checks as to whether or not a set of the corresponding IP addresses "S-ad-x" and "D-ad-x" and the line number is present in the address connection table 1439-1 (refer to FIG. 263) (Step S1462-4). In this case, since there is no such a set, the relay control unit 1424 derives the IP addresses "S-ad-x" and "D-ad-x", and also the line number address "CIC-x" so as to write these derived addresses into the address connection table 1439-1 (Step S1462-5). The relay control unit 1424 indicates the telephone number "TN-2" of the destination telephone set to the signal station address administration server 1444, and acquires the signal station address "DPC-2" of the exchanger 1409 which manages the telephone set 1421 having the telephone number "TN-2" (Step S1462-6), and then write the acquired signal station address "DPC-2" into the address connection table 1439-1 of FIG. 263 (Step S1462-7). As a result, this address connection table becomes 1439-2 (refer to FIG. 264). A right end of the record corresponds to a media path identifier "MP-9".

The relay control unit 1424 determines a line number "CIC-2" and a signal link selection "SLS-2" based upon a predetermined rule with respect to the public switched telephone network 1406, and produces such a signalling unit 1453 containing the message "IAM" and a parameter "Para-2" (Step S1462-8), and then sends the signalling unit 1453 to the control communication line 1416 (Step S1462-9).

<<Cooperation Between Relay Control Unit and Voice Control Unit>>

Referring now to FIG. 249, a cooperation between the relay control unit and the voice control unit will be described. The relay control unit 1424 indicates the following items via the information line 1430-1 to the voice control unit 1428, namely, the media path identifier "MP-9", the internal IP address "IA5" and the external IP address "EA5" of the module provided in the voice control unit 1427, which have been acquired, and the port number "5010" which is employed by the voice control unit 14328 to transmit the voice. Then, the voice control unit 1428 responds to the voice control unit 1428, the internal IP address "IA5" and the external IP address "EA6" of the module inside the voice control unit 1428 and the port number "5012" which is used by the voice control unit 1428 to send the voice. In this procedure, the voice control unit 1428 writes two pairs of the IP addresses and the port numbers(namely, internal IP address "IA5", external IP address "EA5" and port number "5010"; internal IP address "IA6", external IP address "EA6" and port number "5012") into the media path connection table 1430. Furthermore, the voice control unit 1428 determines a logic communication line identifier "CH-3" used to identify a logic communication line for transmitting a voice frame to the voice communication line 1418, a logic communication line identifier "CH-4" for identifying a logic communication line used to receive a voice frame from the voice communication line 1418, and writes the logic communication line identifiers "CH-3" and "CH-4" into the media path connection table 1430. The written result is indicated in a media path connection table 1430-1 (refer to FIG. 266).

The media path connection table 1430-1 owns the following implication: When such an IP packet(payload is UDP) which contains the transmission IP address "EA5", the transmission source port number "5010", the destination IP address "EA6", and the destination port number "5012" and also the IP capsulated packet of which the transmission source IP address is "IA5" and the destination IP address is "IA6", are received the digitalized voice contained in this UDP payload is transmitted to the logic communication line identifier "CH-3" of the logic communication line 1418. Also, when the digitalized voice is received from the logic communication line identifier "CH-4", the digitalized voice is stored into such an IP packet(payload is UDP) is received which contains the transmission IP address "EA6", the transmission source port number "5012", the destination IP address "EA5", and the destination port number "5010", and then, the IP packet is converted into the IP capsulated packet of which the transmission source IP address is "IA5" and the destination IP address is "IA6", transmitted to the IP transfer network 1400.

<<Operation of Public Switched Telephone Network 1406>>

The signalling unit 1453 is reached to the relay exchanger 1413 (Step HA06), the signalling unit 1453 is transferred into the public switched telephone network 1406, and then is reached to the exchanger 1409 (Step HA07). The exchanger 1409 checks as to whether or not the telephone set 1421 having the telephone number "TN-2" is allowed to receive a telephone call. When the call reception is allowed, the exchanger 1409 notifies a telephone call setting request(call reception notification) to the telephone set 1421 (Step HA08).

Next, the exchanger 1409 produces the signalling unit 1454 shown in FIG. 254. In the signalling unit 1454, the destination signal station address is "DPC-3"; the transmission source signal station address is "OPC-3"; the signal link selection is "SLS-3"; and the line number is "CIC-3." In this case, the value of "OPC-3" is the value of "DPC-2"; the value of "DPC-3" is the value of "OPC-2"; the value of "SLS-3" is the value of "SLS-2"; and the value of "CIC-3" is the value of "CIC-2". In other words, the signal station address corresponds to such a value that the address of the transmission source signal station is replaced by the address of the destination signal station at the previous step, and there are no changes in the values of the signal link selection and the line number. The exchanger 1409 transfers the signalling unit 1454 into the public switched telephone network 1406, and this signalling unit 1454 passes through the exchanger 1413 (Step HA11), and then is reached via the control communication line 1416 to the relay control unit 1424 of the relay gateway 1402 (Step HA12).

The relay control unit 1424 receives the signalling unit 1454 (Step S1461-2 of FIG. 273) so as to derive a signal station label contained in the signalling unit 1454 (Step S1461-3), and checks as to whether or not the address connection table 1439 contains the same record content as the derived signal station labels "DPC-3, OPC-3, SLS-3, CIC-3". In this case, since there is the coincident record in the address connection table 1439-2, the relay control unit 1424 produces an IP packet 1455 shown in FIG. 255 (Step S1461-9 of FIG. 273), and transmits the IP packet 1455 to the IP transfer network 1400 (Step S1461-10). In the IP packet 1455, the transmission IP address is "S-ad-u"; the destination IP address is "D-ad-u"; and the line number is "CIC-u". In this case, the value of the IP address "S-ad-u" is the value of the IP address "D-ad-u"; the value of the IP address "D-ad-u" is the value of the IP address "S-ad-x"; and the value of the IP address "CIC-u" is the value of the IP address "CIC-x". In other words, the address of the relay station gateway corresponds to such a value that the transmission source of the IP address of the IP packet 1452 is replaced by the destination thereof, and there is no change in the line numbers. The IP packet 1455 is reached via the control communication line 1431-2, the router 1431, and the control communication line 1431-1 to the relay control unit 1423 (Step HA13 of FIG. 250). The relay control unit 1423 receives the IP packet 1455 (Step S1462-2 of FIG. 274) so as to derive the IP addresses "S-ad-u" and "D-ad-u", and the line number "CIC-u" from the IP packet 1455. Then, in the address connection table 1438, the label information "S-ad-u" is made coincident with "D-ad-x"; the label information "D-ad-u" is made coincident with "S-ad-x"; and the line number "CIC-u" is made coincident with "CIC-x". As a result, the relay control unit 1423 produces a signalling unit 1456 shown in FIG. 256(Step S1462-8 of FIG. 274). Next, the signalling unit 1456 is sent to the control communication line 1415 (Step S1462-9), and is reached to the relay exchanger 1412 (Step HA14). The signalling unit 1456 is transferred into the public switched telephone network 1405 and then is reached to the exchanger 1408 (Step HA15).

On the other hand, the telephone set 1421 returns a signalling unit indicative of the telephone calling operation to the exchanger 1409 in response to the call reception notification of the Step HA08 (Step HA20). The exchanger 1409 notifies a signalling unit (CPG message) indicative of the telephone calling operation to the exchanger 1413 (Step HA21). The exchanger 1413 transmits the signalling unit via the control communication line 1416 to the relay control unit 1424 of the relay gateway 1402 (Step HA22), and produces such an IP packet for notifying the telephone calling operation in accordance with such a procedure similar to that shown in FIG. 273 with reference to the address connection table 1439-2 thereof. The produced IP packet is reached via the control communication line 1431-2, the router 1431, and the control communication line 1431-1 to the relay control unit 1423 (Step HA23).

The relay control unit 1423 receives the IP packet to produce such a signalling unit for notifying the telephone calling operation, and then sends the signalling unit to the control communication line 1415 (Step S1462-9). The signalling unit is reached via the relay exchanger 1412 (Step HA24) to the exchanger 1408 (Step HA25). The exchanger 1408 notifies such a fact that the telephone unit 1421 is being called to the telephone set 1420 (Step HA26).

Next, when the user of the telephone set 1421 responds to the telephone call (Step HA30), a signalling-unit for notifying a response is subsequently transmitted from the exchanger 1409, and then is reached via the exchanger 1413 (Step HA31) to the relay control unit 1424 (Step HA32). The relay control unit 1424 produces an IP packet(ANM) for notifying a response with reference to the connection address table 1439, and this IP packet is reached via the control communication line 1431-2, the router 1431, the control communication line 1431-1 to the relay control unit 1423 (Step HA33). The relay control unit 1423 produces a signalling unit for notifying a response with reference to the connection address table 1438, and the signalling unit is reached via the control communication line 1415 and the exchanger 1412 (Step HA34) to the exchanger 1408 (Step HA35). The exchanger 1408 sends a response signal to the telephone set 1420 (Step HA36).

<<Completion of Address Connection Table>>

Referring now to FIG. 249, a description will be made of a completion of an address connection table. In the case that the relay control unit 1423 indicates the media path identifier "MP-8", the acquired external IP address "EA6" of the module in the voice control unit 1428, and the port number "5012" which is used to send the voice by the voice control unit 1428 to the voice control unit 1427, the voice control unit 1427 writes both the IP address "EA6" and the port number "5012" into the media path connection table 1429-1 (FIG. 265) so as to accomplish a media path connection table 1429-2 (refer to FIG. 267), and notifies to the relay control unit 1423 (Syep 1427-2).

In the connection phase, the line number "CIC-1" set by the public switched telephone network 1405 for setting the telephone lines of the telephone sets 1420/1421 may be made in correspondence with the line number "CIC-x" set by the IP transfer network 1400 in the address connection table 1438, whereas the line number "CIC-x" set by the IP transfer network 1400 may be made in correspondence with the line number "CIC-2" set by the public switched telephone network 1406 in the address connection table 1439. These two correspondence relationships are made constant from the beginning of the telephone communications of the telephone sets 1420 and 1421 until the end of the telephone communications.

<<Communication Phase>>

While the above-described procedure is carried out, the telephone communication can be established between the telephone set 1420 and the telephone set 1421, so that the voice communication is performed (Step HA38). The voice sent from the telephone set 1420 is separated into the call connection control signal and the voice signal in the exchanger 1408, and thereafter are supplied to the exchanger 1412. These signals are transmitted via the voice communication line 1417, the voice control unit 1427 employed in the relay gateway 1401, via the voice communication line 1433-1, the router 1433, the voice communication line 1433-2, and the voice control unit 1428 provided in the relay gateway 1402, and further via the voice communication line 1418, the exchanger 1423, and the exchanger 1409 to the telephone set 1421. The voice signals are transferred from the telephone set 1421 to the telephone set 1420 along a direction opposite to the above-explained direction. This embodiment is featured by that the communication lines used to the voice signal and the telephone connection control can be separated from each other between the exchanger 1408 and the exchanger 1409.

<<Release Phase>>

When the user puts on the handset, the communication release condition is notified from the telephone set 1420 to the exchanger 1408 (Step HA40 of FIG. 250), and the exchanger 1408 notifies the release message (REL) to the exchanger 1412 (Step HA41). When the exchanger 1412 receives the release message, the exchanger 1412 immediately returns the release completion message (RLC) to the exchanger 1408 (Step HA55), and notifies the release message (REL) to the relay control unit 1423 (Step HA42). The relay control unit 1423 returns the release completion message (RLC) to the exchanger 1412 (Step HA54). The relay control unit 1423 notifies the release message (REL) to the relay control unit 1424 (Step HA43), and the relay control unit 1424 returns the release completion message (RLC) to the relay control unit 1423 (Step HA53). The relay control unit 1424 notifies the release message (REL) to the exchanger 1473 (Step HA44). The exchanger 1413 returns the release completion message (RLC) to the relay control unit 1424 (Step HA52). The exchanger 1413 notifies the release message (REL) to the exchanger 1409 (Step HA45). The exchanger 1409 returns the release completion message (RLC) to the exchanger 1413 (Step HA51). The exchanger 1409 notifies the release notification to the telephone set 1421 (Step HA46).

When the relay control unit 1423 judges at the Step HA42 (Step S1463-2 of FIG. 275) that the signalling unit corresponds to the release message (REL) (Steps S1463-3, S1463-4, S1463-5), the relay control unit 1423 deletes the relevant record of the address connection table (Step S1463-6). As a result, the record of the address connection table 1438-2 (refer to FIG. 262) becomes empty as indicated in the address connection table 1438-1 (refer to FIG. 261). Similarly, when the relay control unit 1424 judges at the Step HA43 (Step S1464-2 of FIG. 276) that the message contained in the signalling unit corresponds to the release message (REL) (Steps S1464-3, S1464-4, S1464-5), the relay control unit 1424 deletes the relevant record of the address connection table (Step S1464-6). As a result, the record of the address connection table 1439-2 (refer to FIG. 264) becomes empty as indicated in the address connection table 1439-1 (refer to FIG. 263).

<<Deletion of Media Path Record>>

At the Step HA43, the relay control unit 1423 instructs the voice control unit 1429 to delete the record of the relevant media path "MP-8" of the media path connection table 1429-2 (refer to FIG. 267), and the voice control unit 1427 reports the deletion of the record of the media path connection table(refer to FIG. 271) (Step 1427-3). Also, at the Step N53, the relay control unit 1424 instructs the voice control unit 1428 to delete the record of the relevant media path "MP-9" of the media path connection table 1430-1 (refer to FIG. 266), and the voice control unit 1428 reports the deletion of the record of the media path connection table (Step 1428-2). It should be understood that the record may be employed in the operation/recording operation.

<<Communication Between Telephone Set 1420 and Telephone Set 1422>>

The terminal-to-terminal communication connection control method has been described in other embodiments, in which the telephone call is made from the telephone set 1422 via the media router 1404, the termination gateway equipped with the capsulation function 1403, the relay gateway 1402, and the public switched telephone network 1406 to the telephone set 1421. In other words, such a terminal-to-terminal communication control method in which the telephone communication is established among the telephone set 1-media router-IP transfer network side-public switched telephone network-telephone set 2 has already been explained in other embodiments. Another terminal-to-terminal communication connection method in which a telephone communication is established among the telephone set 2-public switched telephone network-IP transfer network-media router-telephone set 1 operable in an opposite sense may be readily accomplished by way of a similar procedure to the above-explained procedure. As apparent from the foregoing description, such a terminal-to-terminal communication connection control method may be easily realized in which a telephone call is made from the telephone set 1420 via the public switched telephone network 1405, the relay gateway 1401, the termination gateway 1403 equipped with the capsulation function, and the media router 1404 to the telephone set 1422. Furthermore, such a terminal-to-terminal communication connection control method may be easily realized in which a telephone call is made from the telephone set 1420 via the public switched telephone network 1405, the relay gateway 1401, the termination gateway 1403 equipped with the capsulation function, and the media router 1404, the UNI communication line 1419, and the public switched telephone network 1407 to the telephone set 1423.

The operations of the 14th embodiment will now be summarized. In the terminal-to-terminal communication control between two telephone sets, the information goes through the telephone set 1, the public switched telephone network 1, NNI interface communication line 1, the relay gateways 1 and 2 belonging the IP transfer network, the NNI interface communication line 2, the public switched telephone network 1 and the telephone set 2 consecutively.

15. 15th Embodiment in which Voice Line is not IP-Capsulated

This 15-th embodiment is featured by that a network node apparatus employed in other embodiments is replaced by a so-called "non-IP-capsulation type termination apparatus", a termination gateway of other embodiments is substituted by a so-termed "non-capsulation type termination apparatus", and further, a relay gateway of other embodiments is replaced by a so-called "non-capsulation type relay gateway". Also, in this 15-th embodiment, while a voice(speech) IP packet is not IP-capsulated, both a table administration server and a telephone proxy server are omitted.

In FIG. 277, reference numeral 1600 shows an IP transfer network, reference numeral 1601 indicates a public switched telephone network, reference numeral 1602 represents a non-capsulation type termination gateway, reference numeral 1603 denotes a termination apparatus, reference numeral 1604 is a termination gateway control unit (SEP), and reference numeral 1605 shows a non-capsulation type relay gateway. Reference numeral 1606 represents a relay control unit (STP), reference numeral 1607 shows a voice control unit, reference numeral 1608 indicates a relay exchanger, reference numeral 1609 represents a subscriber exchanger, reference numeral 1610 denotes a telephone set having a telephone number "TN-1", and reference numeral 1611 indicates a telephone set having a telephone number "TN-2". Also, reference numerals 1612 and 1613 show control IP communication lines, reference numerals 1614 and 1615 represent voice IP communication lines, reference numeral 1616 shows a control communication line of a common line signal system, reference numeral 1617 denotes a voice communication line, reference numeral 1620 shows an address administration table, reference numeral 1671 denotes a telephone administration server, and also reference numeral 1672 represents a telephone number server. The non-capsulation type relay gateway 1605 corresponds to such a relay gateway capable of mutually communicating with the non-capsulation type termination gateway 1602. An IP address by which the apparatus and the like such as the media router 1660 and telephone sets, provided outside the IP transfer network 1600 can be used is referred to as an "external IP address", whereas an IP address exclusively used in the IP network, by which the apparatus provided outside the IP transfer network 1600 cannot be used is called as an "internal IP address". The telephone administration server 1671 owns both an external IP address "EA91" and an internal IP address "IA91", and may improve information security performance while the external IP address "EA91" and the internal IP address "IA91." are separately used.

<<Connection Phase>>

This is such an example that a telephone communication is made from the telephone set 1610 to the telephone set 1611. When the handset of the telephone set 1610 is taken up, a telephone call signal is transferred to the media router 1660 (Step B01 of FIG. 278), and the media router 1660 confirms telephone calling operation (Step B02). Next, the media router 1660 produces such an IP packet 1630 (refer to FIG. 279), and then, transmits the IP packet 1630 to the termination apparatus 1603 (Step B03), which contains a transmission source IP address "EA1", a destination IP address "EA91", a telephone number "TN-1" of the telephone set 1610, a telephone number "TN-2" of the telephone set 1611, a voice transmission port number "5006" and additional information "Info-2". In this case, the IP address "EA1" corresponds to an IP address of the media router 1660, the IP address "EA91" corresponds to an external IP address of the telephone administration server 1671, a payload portion of the IP packet 1630 is a UDP packet, and both a transmission source port number and a destination port number are equal to "5060".

<<Packet Filter by Termination Apparatus>>

Upon receipt of the IP packet 1630, the termination apparatus 1603 checks as to whether or not all of the transmission source IP address "EA1", the transmission source port number "5060", the destination IP address "EA91", and the destination port number "5060", which are contained in the IP packet 1630, are registered as a record contained in the address administration table 1620. In this case, since all of these items are registered as a record indicated on a first row of an address administration table 1620-1 (refer to FIG. 280), the termination apparatus 1603 converts the destination IP address "EA91" contained in the IP packet 1630 into the internal IP address "IA91" of the telephone administration server 1671 (namely, NAT function). Next, in response to an instruction of an output interface "IF1612" located at a right end of the relevant record provided in the address administration table 1620, the termination apparatus 1603 sends out an IP packet 1631 to the control IP communication line 1612 (Step B04). It should be noted that when both the IP address and the port number contained in the received IP packet 1630 are not registered into the address administration table 1620, the IP packet 1630 is discarded. As explained above, the filtering process operation of the IP packet is carried out by this termination apparatus 1603.

<<Forming of CIC Administration Table>>

The telephone administration server 1671 receives the IP packet 1631 and writes the below-mentioned items into a record of a CIC administration table held by the telephone administration server 1631, namely, the internal IP address "IA91" of the telephone administration server 1671, the procedure segment "IAM", the transmission source telephone number "TN-1", the destination telephone number "TN-2", the external IP address "EA1", the voice transmission port number "5006" and a write time instant(year, month, day, hour, minute, second) "ST6" as a CIC administration table 1671-1 (refer to FIG. 281).

Next, the telephone administration server 1671 indicates an IP packet 1632-1 (refer to FIG. 282) for inquiring the destination telephone number "TN-2" to the telephone number server 1672 (Step B06). The telephone number server 1672 stores an IP address "GW03" into an IP packet 1632-2 (refer to FIG. 283) and responds this IP packet 1632-2 (Step B07). In this case, the above-described IP address "GW03" constitutes an IP address of the relay gateway 1605.

<<Administration of Line Number>>

The telephone administration server 1671 determines a CIC number "CIC-2" based upon the CIC number forming rule determined with respect to a set of the IP address "IA91" of the telephone administration server 1671 and the IP address "GWO3" of the relay gateway 1605, and then writes the CIC number "CIC-2" into the CIC administration table together with the IP address "GW03". The condition is indicated in a record of a CIC administration table 1671-2 (refer to FIG. 284). Next, the telephone administration server 1671 produces an IP packet 1634 (refer to FIG. 285) (IAM packet) with reference to the CIC administration table 1671-2 and the IP packet 1631, and then transmits the IP packet 1634 to the relay gateway 1605 (Step B09).

<<Operation of Relay Control Unit>>

Upon receipt of the IP packet 1634 (refer to FIG. 285) (Step B09), the relay control unit 1606 derives from the IP packet 1634, the transmission source IP address "IA91", the destination IP address "GW03", the line number "CIC-2", the procedure segment "IAM", the transmission source telephone number "TN-1", the destination telephone number "TN-2", the external IP address "EA1", and the voice transmission port number "5006". The relay control unit 1606 writes/records the derived items as a record of a CIC administration table 1605-1 (refer to FIG. 286) held by the relay gateway 1605 in combination with a time instant "St-7".

Further, the relay control unit 1606 retrieves a signal station address administration table 1627 (refer to FIG. 287) indicates the telephone number "TN-2", and acquires a signal station address "PC-09" of the exchanger 1609 for managing the telephone set 1611. Furthermore, the relay control unit 1606 determines both a CIC number "CIC-3" and a signal link selection "SLS-3" based upon such a rule which is previously defined with respect to the public switched telephone network 1601. The relay control unit 1606 writes the signal station address "PC-3" of the relay gateway 1605, the acquired "PC-09", the signal link selection "SLS-3", and the line number "CIC-3", the IP address "GW03", the IP address "IA91", and the line number "CIC-2" as a new record of the address connection table 1625 in combination with a media path identifier "MP-7". As a result, this address connection table becomes a table 1625-1 (refer to FIG. 288).

Subsequently, the relay control unit 1606 produces a signalling unit 1635 (refer to FIG. 289) which contains the signal station addresses "PC-09" and "PC-3", the line number "CIC-3", the signal link selection "SLS-3", the message "IAM", the telephone numbers "TN-1" and "TN-2" and then transmits the signalling unit 1635 to the control communication line 1616 (Step B10).

<<Cooperation Between Relay Control Unit and Control Unit>>

The relay control unit 1606 notifies the media path identifier "MP-7", the external IP address "EA1", and the voice transmission port number "5006" via the information line 1629 to the voice control unit 1607. The voice control unit 1607 writes the notified information as a record of the media path connection table 1628. Furthermore, the voice control unit 1607 determines a logic communication line used to transmit voice data from the voice control unit 1607 to the voice communication line 1617, and writes a logic communication line identifier "CH-1" thereof as a record of the media path connection table 1628. The above-explained result is indicated in the media path connection table 1628-1 (refer to FIG. 290).

<<Operation of Switching Network and ACM Message>>

The exchanger 1608 receives the signalling unit 1635 via the control communication line 1616 (Step B10), and thereafter transfers the signalling unit 1635 to the exchanger 1609 (Step B11). The exchanger 1609 receives the signalling unit 1635, and confirms as to whether or not the destination telephone number "TN-2" contained in the signalling unit 1635 can be received. If the telephone call can be received, then the exchanger 1609 notifies a telephone reception notification to the telephone set 1611 (Step B12). Furthermore, the telephone set 1635 produces such a signalling unit 1635-1 (refer to FIG. 292) for notifying the reception of the signalling unit 1635 and returns the signalling unit 1635-1. The signalling unit is reached via the exchanger 1608 (Step B13) to the relay gateway 1605 (Step B14). The relay control unit 1606 acquires address information used to produce an IP packet based upon label information of the received signalling unit 1635-1, and then produces an IP packet 1651 (ACM message, refer to FIG. 293) and further sends this IP packet 1651 to the telephone administration server 1671 (Step B15). The telephone administration server 1671 derives both the line number "CIC-2" and the procedure step "ACM" from the received IP packet 1651, and investigates the CIC administration table 1671-2 (refer to FIG. 284) held by the telephone administration server 1671 so as to find out such a record indicative of the own IP address "IA91", the IP address "GW03" of the communication counter party and the line number "CIC-2". Then, the telephone administration server 1671 rewrites a procedure step column of the relevant record of the CIC administration table 1671-2 into the above-explained procedure step "ACM".

Next, the telephone administration server 1671 produces an IP packet which indicates that the ACM message is received, and notifies this IP packet to the media router 1660 (Steps B18, B19).

<<Media Path Connection Table>>

While a process operation is carried out in parallel to the above-explained Step B10, or after the process operation of the Step B10 has been completed, the relay control unit 1606 indicates the media path identifier "MP-7" to the voice control unit 1607. At the same time, when the relay control unit 1606 requests both an IP address and a port number. As a result, the voice control unit 1607 answers both the transmission source IP address "EA7" of the IP packet and the port number "5008" of the UDP packet to the relay control-unit 1606, which are sent to the voice IP communication line 1615. It should also be noted that the voice control unit 1607 secures a logic voice communication line for receiving voice data from the exchanger 1608, and determines an identifier "CH-2" to record the identifier in the record of the media path connection table 1628-2 (refer to FIG. 291). The media path connection table 1628-2 is arranged in such a manner that a left side of a record of the media path connection table constitutes both the IP address "EA7" and the port number "5008" of the voice control unit 1607, and a right side thereof constitutes the IP address "EA1" and the port number "5006" of the communication counter party. The relay control unit 1606 receives both the IP address "EA7" and the port number "5008", and then writes the received items into the CIC administration table 1605-1 (refer to FIG. 286). The resultant data is indicated in a CIC administration table 1605-2 (refer to FIG. 296).

<<Transmission of CPG Message>>

When the telephone set 1611 reports the telephone calling operation to the exchanger 1609 (Step B20), the exchanger 1609 forms a signalling unit (CPG message) for notifying the telephone calling operation and transmits the signalling unit via the exchanger 1608 (Step B21) to the relay control unit 1606 (Step B22). The relay control unit 1606 acquires address information used to produce an IP packet based upon the label information of the received signalling unit with reference to the address connection table 1625-1 (refer to FIG. 288), and produces a CPG message 1652 (FIG. 294) having an IP packet format. The IP packet is sent to the telephone administration server 1671 (Step B23). The telephone administration server 1671 notifies the notification of the telephone calling operation via the media router 1660 to the telephone set 1610 (Steps B26 to B28). While the CPG message is formed, the relay control unit 1606 acquires the external IP address "EA7", and the port number "5008" from the CIC administration table 1605-2 (refer to FIG. 296), and then writes these acquired data into a CPG message 1652. The telephone administration server 1671 derives the external IP address "EA7", and the port number "5008" from the received CPG packet 1652, and may write the derived data into the administration table 1671-2 (refer to FIG. 284).

<<Transmission of ANM Message>>

Next, when the user of the telephone set 1611 responds to the telephone calling operation (Step B30), the exchanger 1609 forms a signalling unit (ANM message) for notifying the telephone responding operation and transmits this signalling unit via the exchanger 1608 (Step B31) to the relay control unit 1605 (Step B32). The relay control unit 1606 produces an ANM message 1653 having an IP packet format (refer to FIG. 295) based upon the label information of the received signalling unit with reference to the address connection table 1625-1 (refer to FIG. 288). The IP packet 1653 is sent to the telephone administration server 1671 (Step B33). Then, the telephone administration server 1671 notifies the notification of the telephone response via the media router 1660 to the telephone set 1610 (Steps B36 to B38). In other words, an IP packet 1656 (refer to FIG. 299) is sent from the telephone administration server 1671 via the termination apparatus 1603 (Step B36) to the media router 1660 (Step B37).

When the relay control unit 1606 produces the ANM message, the relay control unit 1606 acquires the external IP address "EA7", and the port number "5008" from the CIC administration table 1605-2 (refer to FIG. 296), and then writes these acquired data into an ANM message 1653. The telephone administration server 1671 derives the external IP address "EA7", and the port number "5008" from the received response packet 1653, and may write the derived data into the administration table 1671-2 (refer to FIG. 284).

<<Write Timing into CIC Administration Table>>

The timing at which the telephone administration server 1671 derives the external IP address "EA7", and the port number "5008" and then writes the derived addresses into the CIC administration table 1671-2, and produces aCIC administration table 1671-3 (refer to FIG. 297) is carried out only at one of the process operations defined at the Step B23 where the CPG message is received and the Step B33 where the ANM message is received.

<<Written into Address Management Table>>

The telephone administration server 1671 derives from the CIC administration table 1671-3 (FIG. 297), the following items, i.e., the external IP address "EA1" of the media router 1660 connected to the transmission source telephone set 1610, the port number "5006" which is used by the media router 1660 so as to transmit the voice, the external IP address "EA7" contained in the voice control unit 1607, and the port number "5008" which is employed by the voice control unit 1607 so as to transmit the voice data. Then, this telephone administration server 1671 writes the derived items into an address administration table 1620 of the termination apparatus 1603 in combination with a voice sending interface "IF1614" (Step B39). The resultant data is indicated on records "EA1, 5006, EA7, 5008, IF1614" of a third row of an address administration table 1620-2 (refer to FIG. 298).

<<Communication Phase>>

A telephone communication established between the user of the telephone set 1610 and the telephone set 1611 corresponds to steps similar to those explained in other embodiments. The analog voice(speech) signal of the telephone set 1610 is digitalized, and the digitalized voice data is described on the payload of the IP packet 1661 (refer to FIG. 300). In this case, the transmission source address of the IP packet 1661 corresponds to the IP address "EA1" of the media router 1660, the destination address corresponds to the acquired IP address "EA7" of the voice control unit 1607, the voice transmission port number of the media router corresponds to "5006", and the UDP port number employed by the voice control unit 1607 so as to transmit the voice data corresponds to "5008".

Since both the IP address and the port number contained in the IP packet 1661 are involved in the record "EA1, 5006, EA7, 5008, IF1614" of the third row of the address administration table 1620-2, the IP packet 1661 is sent out as an IP packet 1662 (FIG. 277) to the voice IP communication line 1614 by way of the designation of the output line interface "IF1614", and thereafter is reached via the router 1624 and the voice IP communication line 1615 to the voice control unit 1607 of the relay gateway 1606.

The voice control unit 1607 derives both the IP address and the port numbers "EA1, 5006, EA7, 5008" from the received IP packet 1662, and then retrieves such a record that both an IP address and a port number thereof are made coincident with the derived IP address/port number within the media path connection table 1628-2 (FIG. 291). In this case, since a set of an IP address and a port number contained in a record of a first row of the media pass connection table 1628-2 is made coincident with the derived IP address/port number, the IP packet 1662 is regarded as the formal IP packet and therefore is received. When there is no coincident set, the above-explained IP packet is discarded. Next, the digitalized voice contained in the IP packet 1662 is converted into: a speech (voice) frame 1664 (refer to FIG. 301) having a format transferred to the voice communication line 1617. The speech frame 1664 is reached via the exchanger 1608 to the exchanger 1609, so that voice is outputted from the telephone set 1611. The voice stored in the speech frame sent from the telephone set 1611 is transferred along a direction opposite to the above-explained direction to be reached to the telephone set 1610.

<<Release Phase>>

When the user of the telephone set 1610 notifies the release of the telephone communication (Step B50 of FIG. 278), this notification is notified from the media router 1660 to the telephone administration server 1671 (Steps B51 to B53). The telephone administration server 1671 returns the call release completion to the media router 1660 (steps B64 to B66). Also, the telephone administration server 1671 sends an IP packet 1665 (refer to FIG. 302) for notifying the telephone call release to the relay control unit 1606 (Step B55). The relay control unit 1606 returns an IP packet 1666 (FIG. 303) for notifying the release completion to the telephone administration server 1671 (Step B62). The relay control unit 1606 sends a telephone call release notification to the relay exchanger 1608 (Step B56), and then, the relay exchanger 1608 returns the release completion to the relay control unit 1606 (Step B61). The relay control unit 1608 sends the telephone call release notification to the relay exchanger 1609 (Step B57), and then, the relay exchanger 1609 returns the release completion to the relay exchanger 1608 (Step B60). The exchanger 1609 sends a telephone call cut-off signal to the telephone set 1611 (Step B58).

<<Deletion of Media Path Record>>

At the Step B55, the relay control unit 1606 instructs the voice control unit 1607 to delete the record of the media path of the media path connection table 1628-2 (refer to FIG. 291) in accordance with this media path connection table 1628-2, and also instructs to delete the relevant record of the CIC administration table 1605-2 (refer to FIG. 296). Furthermore, the relay control unit 1606 deletes the relevant record of the address connection table 1625-1 (FIG. 288) which is set in the above-explained telephone communication connection control.

<<Deletion of Address Administration Table and CIC Administration Record>>

The telephone administration server 1671 instructs the termination apparatus 1603 to delete the relevant record of the CIC administration table 1671-3 (refer to FIG. 297), which is set in the telephone communication connection control, and also to delete the relevant record of the address administration table 1620-2 (FIG. 298) managed by the termination apparatus 1603 (Step B69).

<<One Variation in Termination Apparatus>>

The termination apparatus 1603 may not execute the function(NAT function) capable of changing an address of a received IP packet. In this alternative case, the external IP address "EA91" of the telephone administration server is made coincident with the internal IP address "IA91".

<<Another Variation in Termination Apparatus>>

Alternatively, an IP address may not be contained in the address administration table 1620 provided in the termination apparatus 1603, and the changed address administration table 1620 is indicated as an address administration table 1620-3 (FIG. 304). In this alternative case, while no IP address is registered, the port number "5060" is employed in the terminal-to-terminal connection control of the telephone sets, and the port numbers from "5004" to "5048" are employed in the telephone voice communication, and IP packets of other port numbers are discarded. As previously explained, it is prohibited to transmit/receive IP packets other than the telephone.

Since the 15th embodiment is operated in the above-explained manner, both the telephone sets 1610 and 1611 can establish the telephone communications via both the IP transfer network 1600 and the public switched telephone network 1601. The relay gateway contains both the relay control unit and the voice control unit, whereas the relay control unit contains both the address connection table and the signal station address. The voice control unit contains the media path connection table. The voice control unit determines the logic communication channel provided in the voice communication line, and writes the channel identifier "CH-j" into the media path connection table. While the non-capsulation type termination gateway and the non-capsulation type relay gateway are employed, the IP packet filtering operation is carried out by which only such an IP packet may pass that the set of the IP address and the port number is registered based upon the address administration table of the termination apparatus employed in the non-capsulation termination gateway. Alternatively, the IP packet filtering operation may be carried out by which only such an IP packet may pass that the port number is registered based on the address packet. Also, the telephone communication may be carried out between the telephone set connected to the public switched network and the telephone set connected to the IP transfer network.

16, 16th Embodiment in which Control Line and Voice Line are Separated from Each Other, and are Connected to Public Switched Telephone Network In FIG. 305, reference numerals 1700 and 1701 show IP transfer networks, reference numeral 1702 represents a public switched telephone network(PSTN), reference numerals 1703 and 1704 show gateways equipped with a capsulation function, reference numeral 1705 represents a relay gateway connected to a control line 1738 of a common line signal system, reference numerals 1706 and 1707 show relay gateways connected to an IP communication line, reference numerals 1710, 1713 and 1718 are relay control units, reference numerals 1714 and 1715 show network node apparatus, and reference numerals 1716 and 1717 indicate voice (speech) control unit. Also, reference numerals 1720 and 1721 indicate telephone sets, reference numeral 1725 to reference numeral 1729 represent control communication lines, and reference numerals 1731 to 1736 indicate voice(speech) communication lines. Also, reference numerals 1725 to 1736 indicate IP communication lines, and reference numeral 1738 denotes a control communication line of a common line signal system, and reference numeral 1739 shows a voice communication line. The network node apparatuses 1714 and 1715 own IP capsulation functions which have been described in other embodiments. The IP transfer networks 1700 and 1701 are individual IP transfer networks operated by different communication companies. However, an IP packet may be transferred from one IP transfer network to the other IP transfer network via any one of the communication lines 1727 and 1734.

As previously explained in other embodiments, the relay control unit 1710 employed in the termination gateway 1703 equipped with the capsulation function contains a telephone administration server, a telephone proxy server, a telephone number server, and a table administration server. Similarly, the relay control unit 1713 includes a telephone administration server, a pilot telephone server, a telephone administration server and a table administration server.

<<Connection Phase>>

This is such a case that a telephone communication is made from a telephone set 1720 to another telephone set 1721. In FIG. 306, reference numeral 1700-1 shows a range of the IP transfer network 1700, and reference numeral 1701-1 represents a range of the IP transfer network 1701. When the handset of the telephone set 1720 is taken up, a telephone call signal is transferred to the media router 1722 (Step E01). The media router 1722 confirms the telephone call operation (Step E02). Next, the media router 1722 produces an IP packet for requesting a telephone call connection containing the telephone number "TN-1" of the telephone set 1720 which constitutes the transmission source, and the telephone number "TN-2" of the telephone set 1721 which constitutes the destination, and then transmits the IP packet to the network node apparatus 1714. While the network node apparatus 1714 enters the IP packet, the network node apparatus 1714 produces an internal IP packet by applying the IP capsulation operation as previously explained in other embodiment, and transmits the IP packet to the termination gateway equipped with the capsulation functions 1710 (Step E03).

The relay control unit 1710 produces an IP packet 1750 for requesting a telephone call connection, and then sends the IP packet to the connection IP communication line 1725. As a result, the IP packet 1750 is reached via the control IP communication line 1726 to the relay control unit 1711 (Step E05). The IP packet 1750 contains a transmission source IP address "S-ad-4", a destination IP address "D-ad-4", a line number "CIC-4", a message "IAM", and a parameter "Para-4". The above-described parameter contains both the telephone numbers "TN-1" and "TN-2". The destination IP address "D-ad-4" corresponds to an IP address of the relay control unit 1713. The IP packet 1750 is directly reached via the control communication line 1728 to the relay control unit 1713 employed in the relay gateway 1704 (Step E07).

It should be noted that both the relay control units 1711 and 1712 may records the IP address "S-ad-4" and "D-ad-4", the line number "CIC-4", the message "IAM", the telephone numbers "TN-1" and "TN-2" from the IP packet 1750 as a CIC administration table 1711-1 (FIG. 307) as explained in other embodiments. Also, the relay control unit 1712 holds such a telephone number server as explained in other embodiments. The relay control unit 1712 may retrieve a new destination IP address within the IP transfer network 1701 of the IP packet 1750 based on the destination telephone number "TN-2" and may use this new IP address as a destination IP address of the IP packet 1750. The IP packet 1751 sent out from the relay control unit 1712 is identical to the IP packet 1750, or the above-explained packet to which the new IP address is set.

The IP packet 1751 is reached via the control communication lines 1728 and 1729 to the relay control unit 1713 of the termination gateway equipped with the packet function 1704 (Step E07). As previously explained in other embodiments, the relay control unit 1713 is arranged by a telephone administration server, a telephone proxy server, a telephone number server, and a table administration server. The telephone administration server employed in the relay control unit 1713 sends such an IP packet for notifying a telephone calling request to a media router based upon the IP packet 1751, and the media router 1723 receives the IP packet(Step E08).

The media router 1723 notifies a telephone call setting request to the telephone set 1721 (Step E09), and returns such an IP packet for notifying that the step E08 is received (Step E11). The relay control unit 1713 produces an ACM packet and returns this ACM packet (Step E12), and the ACM packet is reached via the relay control units 1712, 1711 and 1710 to the media router 1722 (Steps E13, E14 and E15). When the telephone set 1721 notifies a telephone calling notification to the media router (Step E20), the telephone calling notification is notified via the media router 1723, the relay control units 1713, 1712, 1711, 1710, and the media router 1722 to the telephone set 1720 (Steps E21 to E26). When the telephone set 1721 responds, a telephone calling operation of the telephone set 1721 to the telephone set 1720 is notified via the media router 1723, the relay control units 1713, 1712, 1711, 1710, and the media router 1722, so that the telephone communication can be established.

The voice communication is carried out between the telephone set 1720 and the telephone set 1721 (Step E38). The voice sent from the telephone set 1720 is digitalized in the media router 1722 to be stored into the IP packet, and the IP packet is reached via the network node apparatus 1714, the communication lines 1731, 1732, 1733, the voice control unit 1716, the communication line 1734, the voice control unit 1717, the communication lines 1735, 1736, and the network node apparatus 1715 to the media router 1723. In this media router 1723, the digitalized voice is converted into the analog voice which is reached to the telephone 1721. The IP-capsulation operation and the inverse-capsulation operation of the IP packet in the network node apparatus 1714 and 1715 are explained in other embodiments. When the telephone set 1720 issues the release request (Step E40), as previously explained, a series of telephone call release operations and telephone call release completion are performed, so that the telephone communication is completed (Steps E41 to E45, Steps E51 to E55).

<<Connection of Various Sort of Networks>>

FIG. 291 is a diagram for representing a connection between public switched networks and IP transfer networks by including other embodiments.

In FIG. 308, reference numerals 1760 and 1761 represent public switched telephone networks(PSTN), reference numerals 1762 and 1763 represent IP transfer networks, reference numerals 1764 and 1765 show subscriber exchangers (LS), reference numerals 1766 and 1767 show relay exchanger, reference numerals 1768 and 1771 show termination gateways equipped with a capsulation function, reference numerals 1772 and 1773 represent relay gateways, reference numerals 1776 to 1779 denote media routers and reference numerals 1780 to 1785 indicate telephone sets. Each of the exchangers contains a relay control unit and a voice control unit. Each of the termination gateways equipped with the capsulation function and each of the relay gateways contain a relay control unit and a voice control unit. The exchanger is connected to the gateway by a control communication line and a voice control line. The network node apparatus are installed among the control lines between the relay gateway 1772 and the termination gateways equipped with the capsulation functions 1768 and 1769. The network node apparatus are installed among the control lines between the relay gateways 1773 and the termination gateways equipped with the capsulation functions 1770 and 1771. Since the construction has been explained in other embodiments, this construction is omitted in FIG. 308.

As previously explained, for instance, the telephone sets 1782 and 1785 can establish the telephone communications through the media router 1776, the termination gateway equipped with the capsulation function 1768, the relay gateways 1772 and 1773, the termination gateway equipped the capsulation function 1771, and the media router 1779 under control of the terminal-to-terminal communication control.

Also, the telephone set 1780 and the telephone set 1785 can establish the telephone communication via the exchangers 1764 and 1766, the relay gateways 1772 and 1773, the termination gateway equipped with the capsulation function 1771, and the media router 1779 under control of the terminal-to-terminal communication control. Furthermore, the telephone set 1780 and the telephone set 1781 can establish the telephone communication via the exchangers 1764 and 1766, the relay gateways 1772 and 1773, and the exchangers 1767 and 1765 under control of the terminal-to-terminal communication control. It should be understood that the case is advantageous for such a condition that the switching set 1766 is geographically separated far from the switching set 1767.

<<Example with Employment of Non-Capsulation Type Termination Gateway>>

This example is similar to the above-explained connections of the various sorts of networks. As shown in FIG. 309, termination gateways equipped non-capsulation function 1768*x* to 1771*x* are newly employed without using the termination gateways equipped with the capsulation function 1768 to 1771. Also, while the relay gateways 1772 and 1773 are not used, non-capsulation type relay gateways 1772*x* and 1773*x* are newly used which can be mutually communicated with the termination gateways equipped with the non-capsulation function.

As previously described, the telephone communications can be established between the telephone sets 1782 and 1785, between the telephone sets 1780 and 1785, and between the telephone sets 1780 and 1781 under control of terminal-to-terminal communication connection controls. As explained in the above operation, the telephone communication can be carried out between the two telephone sets from the telephone set 1 via the media router 1, both the termination gateway equipped with the capsulation function and the relay gateway belonging to the IP transfer network 1, via another relay gateway and another termination gateway equipped with the capsulation function belonging to the IP transfer network 2, and the media router 2 to the telephone set 2. Furthermore, the telephone communication can be carried out between the two telephone sets from the telephone set 1 via the media router 1, both the termination gateway equipped with the non-capsulation function and the relay gateway equipped with the non-capsulation function belonging to the IP transfer network 1, via another relay gateway and another termination gateway equipped with the capsulation function belonging to the IP transfer network 2, and the media router 2 to the telephone set 2.

17. 17th Embodiment Conducting Multicast Communication

The following description is made with reference to the FIGS. 310 to 312. Network node apparatuses 1801 to 1805 and routers 1807 to 1809 are provided within an IP transfer network 1800. The network node apparatuses and the routers are interconnected by IP communication lines directly or indirectly via a network node apparatus or a router. Terminals 1810-1 to 1810-19 having an IP packet transmission/reception function are connected via an IP communication line to a network node apparatus. Reference numerals 1811-1 to 1815-1 indicate address administration tables of the network node apparatuses, and reference numerals 1817-1 to 1819-1 indicate route tables of the routers.

Reference numeral 1868 (in FIG. 311) shows major locations of servers for implementing the terminal-to-terminal communication connection control function in multicast communication. Reference numeral 1857 indicates a multicast administration server. Reference numerals 1855 and 1856 are user service servers. Reference numerals 1853 and 1854 are receptionists. Reference numeral 1851 is a multicast service provider. Reference numeral 1852 is a multicast service purchaser. Reference numeral 1850 is a router. Reference numeral 1859 is a tree construction server. Reference numeral 1858 is a network resource administration server for the IP transfer network 1800. Reference numerals 1861 to 1863 are table administration servers. Reference numerals 1841 to 1845 are overflow communication lines to which IP packets out of schedule are outputted. Each of the servers and routers within the IP transfer network 1800 has IP communication means which is provided with an IP address and thereby can exchange information with each other by transmitting and receiving an IP packet. Here, in the present embodiment, each server and router can be provided with a plurality of multicast IP addresses in addition to the proper IP address.

The terminal 1810-2 serves also as a transmission terminal for transmitting the multicast data in a multicast service. The multicast service includes what is called multimedia data such as digitized voice, fax data, still images and moving images.

<<Communication Record>>

Each line of the address administration table is called a communication record or an IP communication record. The second line "I01, E01, E26, I26, G03, F02" in the address administration table 1811-1 is called a communication record between an external address "E01" and an external address "E26," or a communication record defining an IP communication route between the terminal 1810-2 having an external address "E01" and the terminal 1810-16 having an external address "E26". When the content of a communication record is "a, b, c, d, e, f," the first item is "a," and the second item is "b," and so on. When an item is an address, it is expressed as, for example, the third address item is "c".

The first item of a communication record is called a transmission source internal IP address provided to a transmission source logical terminal(a logical connection point between an external IP communication line and a network node apparatus). The second item is called a transmission source external IP address. The third item is called a destination external IP address. The fourth item is called a destination internal IP address provided to a transmission source logical terminal. The fifth item is called an output destination specification of the internal IP packet. The sixth item is called an output destination specification of the external IP packet.

<<IP Transfer Between Two Terminals>>

The terminal 1810-2 (in FIG. 310) is provided with an external IP address "E01". The terminal end of the communication line 1822 on the network node apparatus 1801 side is provided with an internal IP address "I01". The terminal 1810-16 (in FIG. 312) is provided with an external IP address "E26". The terminal end of the communication line 1826-6 on the network node apparatus 1804 side is provided with an internal IP address "I26". The values in the address administration tables 1811-1 to 1815-1 of the network node apparatuses are shown in a state that the initial values have been set by a method similar to that described in the other embodiments. The following description is made for the case of IP packet transfer.

The terminal 1810-2 sends out an external IP packet 1829-1 having a-transmission source external IP address "E01" and a destination external IP address "E26" onto the communication line 1822. The network node apparatus 1801 then receives the external IP packet 1829-1. Next, the network node apparatus 1801 confirms that the record "I01, E01, E26, I26, G03, F02" in the second line of the address management table 1811-1 contains above-mentioned three acquired IP addresses, that is, an internal IP address "I01" provided to the terminal end of the communication line 1810-2, a transmission source external IP address "E01" within the received external IP packet 1829-1, and a destination external IP address "E26", then forms an internal IP packet using "I01, I26" included in the record, and then sends it out as an internal IP packet 1829-2 onto the communication line 1823-2 specified by "G03" included in the record. In the above-mentioned procedure of capsulation, since the internal packet output specification "G03" (the fifth item) of the communication record "I01, E01, E26, I26, G03, F02" in question is other than "0", an internal IP packet is formed by IP encapsulation thereby to be output. However, in case that the internal packet output specification is "0", the IP packet in question is not encapsulated and is transferred to the overflow communication line 1841 of the network node apparatus.

The router 1809 receives the internal IP packet 1829-2, and then sends out an internal IP packet 1829-3 obtained by copying the internal IP packet 1829-2, onto the communication line 1824-2 specified by the output interface "G21" specified by the route table 1819-1. The network node apparatus 1804 receives the internal IP packet 1829-3, then confirms that the record "I26, E26, E01, I01, G36, F16" in the third line of the address administration table 1814-1 contains three IP addresses "I26, E01, I01" within the internal IP packet 1829-3, then restores an external IP packet by decapsulation in which the IP header of the internal IP packet 1829-3 is eliminated, and then sends it out as an external IP packet 1829-4 onto the communication line 1826-6 specified by the output interface "F16" included in the record in question. The terminal 1810-16 receives the external IP packet 1829-4.

<<Kinds of Terminal>>

The terminals 1810-1 to 1810-19 are data terminals having a data transmission/reception function, telephones having a digitized voice transmission/reception function, voice transmission terminals capable of transmitting digitized voice (that is, transmitters for cable voice broadcast), voice reception terminals capable of receiving digitized voice (that is, receivers for cable voice broadcast), voice/image transmission/reception terminals or TV conferencing terminals having a digitized voice/image transmission/reception function, voice/image transmission terminals capable of transmitting digitized voice and motion pictures(that is, transmitters for cable voice/image broadcast), and voice/image reception terminals capable of receiving digitized voice and motion pictures(that is, cable TV receivers). Further, the terminals may be a combination of a media router and one of a data terminal, a telephone and a voice/image apparatus connected to the media router. The data transmitted from or received by each above-mentioned terminal is stored in the payload section of an IP packet, the multicast technology described below is applicable to each above-mentioned terminal.

<<Preparation for Implementation of Multicast Communication>>

The method of terminal-to-terminal communication connection control between a transmission terminal and a reception terminal is described below for the case that the terminal 1810-2 serves as a multicast transmission terminal and that each of the terminals 1810-11, 1810-13, 1810-14, 1810-17, 1810-18 serves as a multicast reception terminal.

FIG. 313 shows the cost of a communication line interconnecting a network node apparatus and a router within the IP transfer network 1800 in a whole number for each communication line. In the figure, the communication cost between the network node apparatus 1801 and the router 1807 is "1". The communication cost between the network node apparatus 1801 and the router 1809 is "2". The communication cost between the network node apparatus 1802 and the router 1807 is "2". The communication cost between the network node apparatus 1802 and the router 1809 is "1". The communication cost between the router 1807 and the router 1808 is "1". The communication cost between the router 1807 and the router 1809 is "3". The communication cost between the router 1808 and the router 1809 is "3". The communication cost between the router 1808 and the network node apparatus 1803 is "1". The communication-cost between the router 1808 and the network node apparatus 1804 is "4". The communication cost between the router 1809 and the network node apparatus 1804 is "1". The communication cost between the router 1809 and the network node apparatus 1805 is "1".

Routers and communication lines other than those shown in FIG. 313 are further included within the IP transfer network 1800. However, only routers and communication lines relevant to the communication cost calculation are shown in the figure. Further, the cost of a communication line may be assigned separately for the transmission direction and the reception direction such that, for example, the communication cost of a transmission line is "2" and that the communication cost of a reception line is "3." However, in the present embodiment, the same communication cost is assigned to both of the transmission line and the reception line.

The network resource server 1858 (in FIG. 311) retains an internal data base of the function and the like of various resources such as routers, servers, communication lines within the IP transfer network 1800. FIG. 314 is a cost table 1869 retained by the network resource server 1858 for showing the communication cost of the communication lines between the network node apparatuses and routers. The symbol "N1801" in the cost table 1869 indicates the network node apparatus 1801, and the "R1807" indicates the router 1807.

The cost table 1869 is a list displaying the communication cost shown in FIG. 313. For example, the "1" in the seventh column of the second line of the cost table 1869 indicates that the communication cost from the network node apparatus 1801 to the router 1807 is "1". The "2" in the ninth column of the second line of the cost table 1869 indicates that the communication cost from the network node apparatus 1801 to the router 1809 is "2". The "2" in the seventh column of the third line of the cost table 1869 indicates that the communication cost from the network node apparatus 1802 to the router 1807 is "2". The "1" in the ninth column of the third line of the cost table 1869 indicates that the communication cost from the network node apparatus 1802 to the router 1809 is "1" and so on.

The procedure of multicast communication is described below with reference to FIGS. 315 to 317. The transmitter 1851 (in FIG. 311) of multicast data and the like applies to the receptionist 1853 for connecting to the network node apparatus 1801 using the terminal 1810-2 as a transmission terminal of the multicast data and the like (Step MS1 in FIG. 300). The receptionist 1853 inputs the transmission terminal information 1870 (FIG. 315) together with the transmission identification information and the charge payment method, to the user service server 1855 (Step MS2). Here, the transmission terminal information 1870 includes the information that the terminal 1810-2 for multicast transmission is connected to the network node apparatus 1801. Further, the symbol "N1801" in the transmission terminal information 1870 indicates the network node apparatus 1801, and the "T1810-2" indicates the terminal 1810-2. The user service server 1855 transmits the transmission terminal information 1870 together with the acquired transmission Identification information and transmission charge payment method, to the multicast administration server 1857 (Step MS3). The multicast administration server 1857 retains the received information described above in the data base thereof (Step MS4).

Described below is the case that the users of the terminals 1810-11, 1810-13, 1810-14, 1810-17, 1810-18 receive the multicast data and the like. The user 1852 applies to the receptionist 1854 for the reception of the multicast data and the like (Step MS11). The receptionist 1854 inputs the reception terminal information 1871 together with the user identification information and the reception charge payment method, to the user service server 1856 (Step MS12). Here, the reception terminal information 1871 (FIG. 316) includes the information that the terminals 1810-11, 1810-13 for multicast data reception are connected to the network node apparatus 1803, that the terminal 1810-14 is connected to the network node apparatus 1804, and that the terminals 1810-17, 1810-18 are connected to the network node apparatus 1805. Further, the symbol "N1803" in the reception terminal information 1871 indicates the network node apparatus 1803, and the "T1810-11" indicates the terminal 1810-11 and so on.

The user service server 1856 transmits the reception terminal information 1871 together with the acquired reception identification information and charge payment method, to the multicast administration server 1857 (Step MS13). The multicast administration server 1857 retains the received information described above in the data base thereof (Step MS14).

On receiving both the Step MS4 and the Step MS14, the multicast administration server 1857 provides a multicast identification information ID-k to the set of the transmission terminal information 1870 and the reception terminal information 1871, and then sends the information to the tree construction server 1859 (FIG. 311) (Step MS18). The tree construction server 1859 requests the resource management server 1858 for the cost table 1869 (Step MS19) thereby to obtain the cost table 1869 (Step MS20). The tree construction server 1859 determines the multicast tree structure(FIG. 318) defined by the multicast identification information ID-k using the multicast tree structure calculation module 1859-1 (FIG. 311), that is, determines the communication route of IP packet transfer by the multicast technique, and forms the address administration table additional information(FIGS. 319 to 322) for the network node apparatuses and the route table additional information(FIGS. 323 to 325) for the routers, thereby retaining them within the tree construction server 1859 (Step MS21).

<<Construction of Multicast Tree Structure by Tree Construction Server>>

The tree construction server 1859 then requests the table administration server 1861 to add the address administration table additional information 1811-2 and the route table additional information 1817-2 to the address administration table 1811-1 and the route table 1817-1, respectively (Step MS22). The table administration server 1861 reports the setting for the above-mentioned request (Step MS25). The tree construction server 1859 requests the table administration server 1862 to add the address administration table additional information 1813-2, the address administration table additional information 1814-2, and the route table additional information 1818-2 to the address administration table 1813-1, the address administration table 1814-1, and the route table 1818-1, respectively (Step MS23). The table administration server 1862 reports the setting for the above-mentioned request (Step MS26). The tree construction server 1859 requests the table administration server 1863 to add the address administration table additional information 1815-2 and the route table additional information 1819-2 to the address administration table 1815-1 and the route table 1819-1, respectively (Step MS24).

The table administration server 1863 reports the setting for the above-mentioned request (Step MS27). Here, each table administration server is connected to a router near a network node apparatus. The meaning of the address administration table additional information and route table additional information is described later in the description of the flow of IP packet transfer. On confirmation of the completion of the Steps MS25 to MS27, the tree construction server 1859 reports the completion of the tree construction requested in the Step MS18 to the multicast administration server 1857 (Step MS28). By the above-mentioned procedure, the former half of the terminal-to-terminal communication connection control for multicast communication, that is, the construction of multicast tree structure, has completed.

<<Multicast Tree Structure>>

The meaning of the multicast tree structure shown in FIG. 318 is as follows. An external IP packet sent out by the terminal 1810-2 reaches the network node apparatus 1801, and then becomes an internal IP packet. The internal IP packet is bifurcated into two directions toward the router 1807 and the router 1809. The internal IP packet having reached the router 1807 goes through the router 1807 and the router 1808, and then reaches the network node apparatus 1803. The other internal IP packet reaches the router 1809. The router 1809 sends out the internal IP packet into two directions toward the network node apparatus 1804 and the network node apparatus 1805. The network node apparatus 1803 decapsulates the received internal IP packet thereby to restore an external IP packet, and then sends out the restored external IP packet to the terminal 1810-11 and the terminal 1810-13. The network node apparatus 1804 decapsulates the received internal IP packet thereby to restore an external IP packet, and then sends out the restored external IP packet to the terminal 1810-14. The network node apparatus 1805 decapsulates the received internal IP packet thereby to restore an external IP packet, and then sends out the restored external IP packet to the terminal 1810-117 and the terminal 1810-18. As such, in multicast communication, an IP packet is transferred through a communication route looking like a tree. Thus, the shape of the communication route is called a multicast tree structure.

<<Construction of Tree Structure by Multicast Technique>>

In the Steps MS22 to MS24, the communication from the tree construction server 1859 to the table administration servers 1861 to 1863 is carried out by TCP communication(connection communication) having a high communication reliability. However, the plurality of table administration servers are connected to a large number of routers within the IP transfer network for the above-TCP connection, and hence share the work of the initial setting and the record rewriting of the address administration tables of the network node apparatuses and the route tables of the routers. The present embodiment involves merely three routers 1807 to 1809. However, another embodiment can involve a large number of routers, for example, a hundred thousand routers, and a large number of table administration servers within an IP transfer network.

In such a case, it is not advantageous that the address administration table additional information and the route table additional information are transferred from the tree construction server to the large number of table administration servers, because of a large communication traffic. Accordingly, the record of route table for the transfer of address administration table additional information and route table additional information from the tree construction server to the hundred thousand routers can be set also into each router at the time of construction of the IP transfer network. Here, it is configured so that the IP packet is transferred in a multicast tree structure for the overall communication record of each router. By virtue of this, it is avoided that the communication traffic becomes too large in the transfer of address administration table additional information and route table additional information from the tree construction server to the large number of routers.

Furthermore, in order to transfer the address administration and the router table additional information from the tree construction server to the large number of table administration servers, a well-known address can also be used.

<<Address Management Table>>

The following description is made with reference to FIGS. 326 to 328. The first line of the address administration table 1811 includes the address administration table additional information 1811-2. The first line of the address administration table 1813 includes the address administration table additional information 1813-2. The first line of the address administration table 1814 includes the address administration table additional information 1815-2. The first line of the address administration table 1815 includes the address administration table additional information 1815-2.

The terminal end of the communication line 1822 (in FIG. 326) on the network node apparatus 1801 side is provided with an internal IP address "I01". The terminal end of the communication line 1826-1 (in FIG. 328) on the network node apparatus 1803 side is provided with internal IP addresses "I20" and "IM2". The terminal end of the communication line 1826-2 on the network node apparatus 1803 side is provided with internal IP addresses "I22" and "IM2". The terminal end of the communication line 1826-3 on the network node apparatus 1804 side is provided with internal IP addresses "I24" and "IM2". The terminal end of the communication line 1826-4 on the network node apparatus 1805 side is provided with internal IP addresses "I27" and "IM2". The terminal end of the communication line 1826-5 on the network node apparatus 1805 side is provided with internal IP addresses "I28" and "IM2". Here, the internal IP address "IM2" is an example of an address used for multicast.

<<Method of Representation of Address Administration Table>>

A comment is made below on the order of description of the items within a record of the address administration tables 1811 to 1815 in the present embodiment. In the description of the prior art in the present specification, the items within a record is expressed in the order of "E1, E2, I1, I2". However, in the present embodiment, the order of items is changed into "I1, E1, I2, E2". The difference is merely in representation and not essential.

An IP packet 1830 sent out from the terminal 1810-2 having an IP address "E01" reaches the network node apparatus 1801 via the communication line 1822. The destination address "M2" of the IP packet 1830 is a multicast external IP address, for example, "224.1.2.3" in a specific number. Here, the "224" indicates a multicast address according to IETF definition. An example of a specific number of the multicast internal IP address "IM2" is "225.1.2.3".

<<Route Table of Router>>

The following description is made with reference to FIG. 327. The figure shows route tables 1817 to 1819 indicating the communication lines to which the received IP packets are to be transferred. The second line of the route table 1817 includes the route table additional information 1817-2, the second line of the route table 1818 includes the route table additional information 1818-2, and the second line of the route table 1819 includes the route table additional information 1819-2.

For example, in case of the record in the second line of the route table 1817, an IP packet having a destination IP address "IM2" is transferred to the communication line 1824-1 specified by the logical communication line name G12. In case of the record in the second line of the route table 1818, an IP packet having a destination IP address "IM2" is transferred to the communication line 1825 specified by the logical communication line name G27. Further, since the record in the second line of the route table 1819 has the items "IM2" and "G21, G22", an IP packet having a destination IP address "IM2" is transferred to the communications line 1824-2 specified by the logical communication line name G21 as well as to the communication line 1824-3 specified by the logical communication line name G22.

<<Transfer of IP Packet>>

Next, described below is the series of steps of IP packet transfer starting from the transmission of the external IP packet 1830. Reference numeral 1800-1 (in FIG. 329) indicates the transmission and reception of an IP packet within the IP transfer network 1800. The terminal 1810-2 transmits an external IP packet 1830 to the communication line 1822 (Step D1 in FIG. 329). On receiving the external IP packet 1830, the network node apparatus 1801 confirms the internal IP address "I01" provided to the terminal end(logical terminal) of the communication line 1822 to which the external IP packet 1830 is inputted and the destination external IP address "M2" of the IP packet 1830, then searches the content of the address administration table 1811 thereby to find a record having the transmission source internal IP address "I01" and the destination external IP address "M2" (first IP packet acceptance test), and then checks whether the searched record includes the transmission source external IP address "E01" of the IP packet 1830 or not(second IP packet acceptance test).

In this example, a record including "I01, E01, M2, IM2, G02, G03, 0" is found in the first line of the address administration table 1811. By using the IP addresses "I01" and "IM2" in the record, an internal packet of the transmission source IP address "I01" and the destination internal IP address "IM2" are formed(encapsulation of IP packet). It is then sent out as an internal IP packet 1831-1 to the communication line 1823-1 corresponding to the logical communication line name G02 (Step D2), and sent out as an internal IP packet 1831-2 to the communication line 1823-2 corresponding to theological communication line name G03 (Step D3). In the procedure, when the destination external IP address "M2" of the external IP packet 1830 is not included in the address administration table 1811, the external IP packet 1830 is abandoned(first IP packet acceptance test). The above-mentioned check whether the detected record includes the transmission source IP address "EON" of the IP packet 1830 or not may be omitted. In this case, the above-mentioned second IP packet acceptance test is not carried out.

The internal IP packet 1831-1 transferred via the communication line 1823-1 reaches the router 1807. Since the destination IP address of the internal IP packet 1831-1 is "IM2", according to the "IM2, G12" of the second line of the route table 1817, it is sent out as an internal IP packet 1831-3 to the communication line 1824-1 for the logical communication line name G12 (Step D4). Here, the IP packet 1831-1 is copied to be the IP packet 1831-3. The internal IP packet 1831-3 reaches the router 1808. Since the destination IP address of the internal IP packet 1831-3 is "IM2", according to the "IM2, G27" of the second line of the route table 1818, it is sent out as an internal IP packet 1831-4 to the communication line 1825 for the logical communication line name G27 (Step D5). Here, the IP packet 1831-3 is copied to be the IP packet 1831-4. On the other hand, the internal IP packet 1831-2 transferred via the communication line 1823-2 reaches router 1809. Since the destination IP address of the internal IP packet 1831-2 is "IM2", according to the "IM2, G21, G22" of the second line of the route table 1819, it is sent out as an internal IP packet 1831-5 to the communication line 1824-2 for the logical communication line name G21 (Step D7), and further sent out as an internal IP packet 1831-6 to the communication line 1824-3 for the logical communication line name G22 (Step D8). Here, the IP packet 1831-2 is copied to be the IP packet 1831-5 and the IP packet 1831-6. Further, the route tables 1817 to 1819 of the routers and the route tables of the network node apparatuses may have address masks which are known to the public. However, they are omitted in this example.

The internal IP packet 1831-4 reaches the network node apparatus 1803 via the communication line 1825. The left four items "IM2, M2, E01, I01" of the record "IM2, M2, E01, I01, 0, F10, F12" in the first line of the address administration table 1813 coincide with the four addresses "I01, IM2, E01, M2" in the internal IP packet 1831-4. Accordingly, the internal IP packet 1831-4 undergoes encapsulation in which the IP header is eliminated as described in the other embodiments, whereby the external IP packet 1830 is restored. The restored IP packet is sent out to the communication lines specified by the output interfaces F10 and F12. That is, it is sent out as an external IP packet 1832-1 to the communication line 1826-1 specified by the output interface F10 (Step D11), and further sent out as an external IP packet 1832-2 to the communication line 1826-2 specified by the output interface F12 (Step D13). The IP packet 1832-1 reaches the terminal 1810-11, and the IP packet 1832-2 reaches the terminal 1810-13.

Similarly, the internal IP packet 1831-5 reaches the network node apparatus 1804 via the communication line 1824-2. The left four items "IM2, M2, E01, I01" of the record "IM2, M2, E01, I01, 0, F14" in the first line of the address administration table 1814 coincide with the four addresses "I01, IM2, E01, M2" in the internal IP packet 1831-5. Accordingly, the internal IP packet 1831-5 undergoes encapsulation in which the IP header is eliminated as described in the other embodiments, whereby the external IP packet 1830 is restored. The restored IP packet is sent out to the communication lines specified by the output interface F14. That is, it is sent out as an external IP packet 1832-3 to the communication line 1826-3 specified by the output interface F14 (Step D14). The IP packet 1832-3 reaches the terminal 1810-14.

The internal IP packet 1831-6 reaches the network node apparatus 1805 via the communication line 1824-3. The left four items "IM2, M2, E01, I01" of the record "IM2, M2, E01, I01, 0, F17, F18" in the first line of the address administration table 1815 coincide with the four addresses "I01, IM2, E01, M2" in the internal IP packet 1831-6. Accordingly, the internal IP packet 1831-6 undergoes encapsulation in which the IP header is eliminated as described in the other embodiments, whereby the external IP packet 1830 is restored. The restored IP packet is sent out to the communication lines specified by the output interfaces F17 and F18. That is, it is sent out as an external IP packet 1832-4 to the communication line 1826-4 specified by the output interface F17 (Step D17), and further sent out as an external IP packet 1832-5 to the communication line 1826-5 specified by the output interface F18 (Step D18). The IP packet 1832-4 reaches the terminal 1810-17, and the IP packet 1832-5 reaches the terminal 1810-18.

<<Prevention of Implosion of ACK Packets and NACK Packets>>

Considered below is the case that in order to report the reception of an external IP packet 1832-1 to the transmitter terminal 1810-2, the terminal 1810-11 forms an external IP packet 1833 having the transmission source external IP address "M2" and the destination external IP address "E01" thereby to send it out to the communication line 1826-1 (Step D21 in FIG. 29). On receiving the external IP packet 1833, the network node apparatus 1803 confirms that the transmission source external IP address "M2" in the received external IP packet is a multicast address, and then transfers the received external IP packet intact to the packet overflow communication line 1843. The external IP packet transferred to the packet overflow communication line 1843 is abandoned. Similarly, when the network node apparatus 1804 receives an external IP packet from the terminal 1810-14 (Step D22) or when the network node apparatus 1805 receives an external IP packet from the terminal 1810-17 (Step D23), the received external IP packet is transferred intact to the communication line 1844 or 1845. The external IP packet transferred to the packet overflow communication line 1844 or 1845 is abandoned.

As such, the sending-out of IP packets of individual terminal report from all the terminals receiving the multicast data to the multicast data transmitter terminal is suppressed. Accordingly, the implosion of ACK packets within the IP transfer network is prevented.

Next, described below is the specific method that the network node apparatus 1803 transfers the received external IP packet 1833 to the overflow communication line 1843. The network node apparatus 1803 confirms the internal IP address "IM2" provided to the terminal end(logical terminal) of the communication line 1826-1 to which the IP packet 1833 is inputted and the destination external IP address "E01" of the IP packet 1833, then searches the communication records within the address administration table 1813 thereby to find a communication record having the transmission source internal IP address "IM2" followed by the destination external IP address "E01", and then checks whether the searched record includes the transmission source external IP address "M2" of the IP packet 1833 or not. In this case, all of the first to the third address items of the communication record "IM2, M2, E01, I01, 0, F10, F12" in the first line of the address administration table 1813 agree. Accordingly, the record is selected. Further, since the fifth item(internal packet output specification) of the communication record is "0", the IP packet 1833 is not encapsulated, and is then transferred to the overflow communication line 1843.

In the case that the terminals 1810-13, 1810-14, 1810-17, 1810-18 transmit an external IP packet having an transmission source IP address "M2" and a destination IP address "E01" to the network node apparatuses, the IP packet is transferred to the overflow communication line of each network node apparatus by a procedure similar to the above-mentioned case. As described above, even when the reception terminal 1810-1 sends out an ACK packet for confirmation of the reception of the multicast IP packet to the transmitter terminal 1810-2, the ACK packet can not pass through the network node apparatus 1803. Accordingly, the occurrence of congestion in the IP transfer network due to ACK packet implosion is prevented. The use of IP packets on the packet overflow communication lines is described later.

Even in case that the network node apparatus 1803 receives an NACK packet instead of the ACK packet from the terminal 1810-11, the NACK packet is abandoned by a similar principle. Accordingly, the NACK packet implosion is prevented. With regard to the timing of transmission of an NACK packet by the terminals 1810-11 to 1810-19, for example, the time of the IP packet transfer by multicast technique is previously determined, and then, when no IP packet is distributed at the scheduled time, an NACK packet is transmitted.

<<Implementation of Cable Broadcast>>

In case that the terminal 1810-2 is a voice transmission terminal capable of transmitting a digitized voice and that the terminals 1810-11, 1810-13, 1810-14, 1810-17, 1810-18 are digitized voice reception terminals, the transmission of the IP packet 1830 is a cable voice broadcast. Further, in case that the terminal 1810-2 is a voice/moving image transmission terminal capable of transmitting a digitized voice/moving image and that the terminals 1810-11, 1810-13, 1810-14, 1810-17, 1810-18 are digitized voice/moving image reception terminals, the transmission of the IP packet 1830 is a cable TV broadcast.

<<Correction of Multicast Tree Structure>>

The multicast tree structure can be corrected in case of an increase or decrease of the multicast data reception terminals. The receptionist 1854 (FIG. 313) previously obtains and retains the correspondence between the contents of multicast service and the multicast identification information ID-k (k=1, 2, . . . ), from the multicast administration server 1857.

A use 1852 applies to the receptionist 1854 for the reception of multicast service data using the terminal 1810-15 connected to the network node apparatus 1804 (Step MS31 in FIG. 330). The receptionist 1854 acquires the receiver identification information, the charge payment method, and the terminal relevant information(that is, the fact that the network node apparatus 1804 and the terminal 1810-15 are used) from the user 1852, and then identifies the multicast identification information ID-k from the content of multicast service obtained from the user 1852. The receptionist 1854 then inputs these information to the user service server 1856 (Step MS32).

The user service server 1856 transmits the acquired receiver identification information, charge payment method, terminal relevant information, and multicast identification information ID-k to the multicast administration server 1857 (Step MS33). The multicast administration server 1857 retains the reception terminal information in the data base thereof (Step MS34).

The multicast administration server 1857 sends the multicast identification information ID-k and terminal relevant information (the use of the network node apparatus 1804 and the terminal 1810-15) to the tree construction server 1859 (Step MS35). The tree construction server 1859 request the network resource administration server 1858 for the cost table (Step MS36) thereby to obtain the cost table (Step MS37).

Using the multicast tree structure calculation module 1859-1, the tree construction server 1859 calculates the multicast tree structure involving the above-mentioned multicast identification information ID-k and terminal relevant information, and generates the address administration table additional information for the network node apparatuses and the route table change information for the routers (Step MS38), thereby retaining them within the tree construction server 1859. The tree construction server 1859 then requests the table administration server 1862 to add the address administration table change information into the address administration table 1814 of the network node apparatus 1804 (Step MS40). The table administration server 1862 then reports the setting for the above-mentioned request (Step MS41). The tree construction server 1859 reports the completion of change of the multicast tree structure to the multicast administration server 1857 (Step MS42). The multicast administration server 1857 reports the completion of processing of the application by the user 1852 in the Step MS31, through the user service server 1856 (Step MS43), through the receptionist 1854 (Step MS44), to the user 1852 (Step MS45).

The address administration table 1814 is assumed to be set by the table administration server 1862. The above-mentioned address administration table change information specifies so that the sixth item "F14" in the first line of the address management table 1814 is changed into "(F14, F15)" and that the terminal 1810-15 connected to the logical communication line "F15" is to be added as an reception terminal. As a result the first record of the address administration table 1814 is changed into "IM2, M2, E01, I01, 0, (F14, F15)".

In case that the multicast data reception by the terminal 1810-11 is to be canceled, the user 1852 applies to the receptionist for the cancellation of the multicast data reception by the terminal 1810-11. As a result, it is specified that the logical communication line "F10" connected to the terminal 1810-11 is to be deleted from the sixth item "(F10, F12)" of the first line "IM2, M2, E01, I01, 0, (F10, F12)" of the address administration table 1813 (in FIG. 311). As a result, the first line of the address administration table 1813 is changed into "IM2, M2, E01, I01, 0, F12".

The above-mentioned embodiment is for a case that the route table of the router 1807 and the like is not changed. However, depending on the content of the other correction request of the multicast tree structure, the route table change information can be generated for the route tables of the routers 1807 to 1809, or alternatively the communication record change information can be generated for the address administration tables of the other network node apparatuses 1801 and 1802. In this case, similarly to the initial setting of the tree structure, the route tables of the routers and the address administration tables of the network node apparatuses are changed by requesting to the other table administration servers 1861 and 1863.

<<Release of Multicast Tree Structure>>

Described below is the procedure of releasing the multicast tree structure for terminating the multicast service. The receptionist 1853 (FIG. 311) previously obtains and retains the correspondence between the contents of multicast service and the multicast identification information ID-k(k=1, 2, . . . ), from the multicast administration server 1857.

The transmitter 1851 of multicast data and the like applies to the receptionist 1853 for releasing the multicast tree structure having formed by the above-mentioned procedure (Step MS60 in FIG. 330). The receptionist 1853 inputs the release of the multicast tree structure to the user service server 1855 depending on the transmission identification information and the multicast identification information ID-k (Step MS61). The user service server 1855 transmits the release of the multicast tree structure together with the transmission identification information to the multicast administration, server 1857 (Step MS62). The multicast administration server 1857 records the termination of the multicast service into the data base thereof depending on the received transmission identification information and multicast tree structure release information(including the multicast identification information ID-k) (Step MS 63). The multicast administration server 1857 then instructs the tree construction server 1859 to release the multicast tree structure identified by the multicast identification information ID-k (Step MS64).

Depending on the multicast identification information ID-k, the tree construction server 1859 instructs the table administration servers 1861 to 1863 to delete the address administration table additional information 1811-2, 1813-2, 1814-2, 1815-2 (FIGS. 319 to 322) from the address administration tables 1811, 1813, 1814, 1815 of the network node apparatuses and to delete the route table additional information 1817-2, 1818-2, 1819-2 (FIGS. 323 to 325) from the route tables 1817, 1818, 1819 of the routers (Steps MS66 to MS68) and then receives the report (Steps MS70 to MS72). The tree construction server 1859 reports completion using cost table 1869 to the network resource administration server 1858 (Step MS73), and then receives the check report (Step MS74). The tree construction server 1859 reports the completion of the release procedure of the multicast tree structure to the multicast administration server 1857 (Step MS77). Further, the multicast administration server 1857 reports the completion of the release procedure of the multicast tree structure, through the user service server 1855 (Step MS78), through the data transmission receptionist 1853 (Step MS79), to the data transmitter 1851 (Step MS80). Here, the Steps MS78 to MS80 are optional and may be omitted. By the above-mentioned procedure, the latter half of the terminal-to-terminal communication connection control by multicast technique, that is, the release of multicast tree structure, has completed.

<<Use of Overflow Communication Line>>

The usage of the overflow communication lines 1843 to 1845 is described below. Reference numerals 1801 to 1805 (in FIG. 331) indicate network node apparatuses. Reference numeral 1810-2 indicates a terminal for transmitting the multicast data. Reference numerals 1810-11 to 1810-13 indicateterminals for receiving the multicast data. Reference numerals 1880 to 1882 indicate overflow communication line servers connected to output lines 1843 to 1845. The IP packet 1833 (in FIG. 328) sent out from the terminal 1810-11, that is, the IP packet 1833 having an transmission source. IP address "M2" and a destination IP address "E01," is transferred to the overflow communication line 1843 according to the value "0" of the fifth item of the record "IM2, M2, E01, I01, 0, (F10, F12)" in the first line of the address administration table 1813. When the internal packet output specification(the fifth item) in the record is "0", the IP packet is transferred to the overflow communication line. On the contrary, when the internal packet output specification is not "0", the IP packet is not transferred to the overflow communication line.

The following description is made with reference to FIG. 332. An IP packet 1833 sent out from the terminal 1810-11 and having a transmission source external IP address "M2" reaches the network node apparatus 1803 (Step MC1). The IP packet 1833 then reaches the overflow communication line server 1880 via the overflow communication line 1843 (Step MC2). When an IP packet having a transmission source external IP address "M2" is sent out from the terminal 1810-12, the IP packet in question reaches the network node apparatus 1803 (Step MC3). The IP packet then reaches the overflow communication line server 1880 via the overflow communication line 1843 (Step MC4). When an IP packet having a transmission source external IP address "M2" is sent out from the terminal 1810-13, the IP packet in question reaches the network node apparatus 1803 (Step MC5). The IP packet then reaches the overflow communication line server 1880 via the overflow communication line 1843 (Step MC6).

In these cases, the overflow communication line server 1880 receives a plurality of IP packets the transmission source external IP address of which is "M2", that is, a multicast IP address. When the terminals 1810-11 to 1810-13 transmit an IP packet, the transmitter terminal address is described in the payload portion of the IP packet. That is, according to the rule, the terminal 1810-11 sets the transmitter terminal address "E20", the terminal 1810-12 sets the transmitter terminal address "E21", and the terminal 1810-13 sets the transmitter terminal address "E22". Thus, the overflow communication line servers 1880 to 1882 can identify the external IP address of each transmitter terminal using the IP address of each transmitter terminal. As such, when the terminals 1810-11 to 1810-13 transmit an ACK packet or NACK packet, the transmitter terminal is identifiable.

The overflow communication line server 1880 can collect the information of the tree terminals obtained by the above-mentioned method, and can notify it, through the network node apparatus 1803 (Step MD1), through the IP transfer network 1800, through the network node apparatus 1801 (Step MD2), to the transmission terminal 1810-2 of the multicast data (Step MD3). Here, in order to permit the IP packet transfer between the overflow communication line server 1880 and the terminal 1810-2 for the purpose of the Steps MD1 to MD3, the records for IP encapsulation and decapsulation are set both in the address administration table 1811 in the network node apparatus 1801 and in the address administration table 1813 in the network node apparatus 1803.

As a result, the multicast data transmission terminal 1810-2 can recognize whether the terminals 1810-11 to 1810-13 have received the multicast data or not (distribution confirmation function). At that time, the increase is suppressed in the amount of communication in the IP transfer network due to the increase of ACK packets and NACK packets.

The overflow communication line server 1880 can transmit an IP packet to the terminals 1810-11 to 1810-13 using an multicast address "M2" (Steps ME1 to ME4). Alternatively, the overflow communication line server 1880 can set a record including an encapsulation address into the address administration table 1813, and then transmit an IP packet to the terminal 1810-12 using an IP address "E21" (Steps MF1 to MF4).

The following description is made with reference to FIG. 333. The overflow communication line server 1880 can exchange information with the multicast transmission terminal 1810-2 by transmitting and receiving an IP packet (Steps MG1 to MG3). The overflow communication line server 1881 can exchange information with the multicast transmission terminal 1810-2 by transmitting and receiving an IP packet (Steps MH1 to MH3). The overflow communication line server 1882 can exchange information with the multicast transmission terminal 1810-2 by transmitting and receiving an IP packet (Steps MI1 to MI3). As such, the overflow communication line server transmits and receives an IP packet to and from each multicast data reception terminal connected to the network node apparatus, and accordingly the multicast data transmission terminal 1810-2 does not need to transmit and receive an IP packet to and from all multicast data reception terminals, whereby the load of the multicast data transmission terminal 1810-2 is reduced. Further, for example, when the terminal 1810-11 requests the resending multicast data, the transmission terminal 1810-2 transmits IP packets using the above mentioned multicast tree structure. Thereby, high reliability of transmission can be achieved.

<<Alternative Embodiments of Address Administration Table>>

The address administration table 1811 (in FIG. 326) can be implemented in the form of the address administration table 1811-5 (in FIG. 334). In this embodiment, the record of the address administration table 1811-5 is formed by eliminating the second item(that is, the transmission source external IP address) of the record of the address administration table 1811. For example, the second item "E01" of the record "I01, E01, E26, I26, G03, F02" in the third line of the address administration table 1811 is eliminated thereby to become the record "I01, E26, I26, G03, F02" in the third line of the address administration table 1811-5. The IP encapsulation function of the network node apparatus in the case that the second item is eliminated is described also in the present embodiment.

Further, the address management table 1811 (in FIG. 326) can be implemented in the form of the address management table 1811-6 (in FIG. 325). In this case, an address mask technique is used in the IP encapsulation by the network node apparatus.

When an external IP packet having a destination external IP address "E26" and a transmission source external IP address "E01" is inputted from the communication line 1822 the internal IP address of the terminal end of which is "I01", the records in the first line and the third line of the address administration table 1811-6 are in question. With regard to the record in the first line, it is checked whether the result of the "and" operation between a destination-use external IP mask "M-t2" and the destination external IP address "E26" in the external IP packet coincides with the destination external IP address "E2*x*" in the record of the first line or not(equation (9) given below). No coincidence occurs in this case. With regard to the record in the third line, it is checked whether the result of the "and" operation between a destination-use external IP mask "M-t26" and the destination external IP address "E26" in the external IP packet coincides with the destination external IP address "E26*x*" in the record of the third line or not (equation (10) given below). Coincidence occurs in this case.

The transmission source IP address also is compared using the equation (11) given below, similarly to the above-mentioned cases.

If ("M-t2" and "E26"="M2x") (9)

If ("M-t26" and "E26"="M26x") (10)

If ("M-h01" and "E01"="E01x") (11)

According to the result of above-mentioned comparison, the record of the third line is selected. Encapsulation is carried out using the internal records "I01" and "I26" of the record of the third line, thereby forming an internal IP packet.

The address administration table 1811 (in FIG. 326) can be separated and represented into the table 1811-7 and the table 181-8 shown in FIGS. 336 and 337, and can then be implemented in the form of such tables on the memory. That is, the record "IO1, E01, M2, IM2, (G02, G03), 0" in the first line of the address administration table 1811 is separated into the record "I01, E01, M2, IM2, MT-1, 0" in the first line of the address administration table 1811-7 and the record "MT-1, G02, G03" in the first line of the address administration table 1811-8. In other words, the multicast branching point is described in the table 1811-8.

<<Summary>>

The information of a multicast service provider and the information of a multicast service purchaser are accepted via a user service server thereby to be used in the setting of the multicast tree structure. A tree construction server inquires to a resource administration server for the connection information and the communication line cost of the communication lines between the network node apparatuses and the routers, thereby acquiring them. The tree construction server further notifies, to a plurality of table administration servers, the address additional information to the address administration tables in the network node apparatuses and the additional information to the route table servers in the routers, thereby setting the multicast tree structure.

A multicast communication record may be set in the route table of each router, whereby using the multicast communication record, a tree construction server can transfer the address administration table additional information and the route table additional information for setting the tree structure for multicast service, to a table administration server.

The transmission terminal 1810-2 can resent the multicast data, thereby high reliability multicast can be achieved. Further, a voice transmission terminal transmits digitized voice, and a plurality of digitized voice reception terminals receive the digitized voice. Furthermore, a voice/motion picture transmission terminal transmits digitized voice/moving image, and a plurality of digitized voice/moving image reception terminals receive the digitized voice/moving image.

When the internal packet output specification of an address administration table is "0", the IP packet is transferred to an overflow communication line. On the contrary, when the packet overflow parameter is not "0" the IP packet is not transferred to the overflow communication line. Here, the determination value "0" of the internal packet output specification may be replaced by another fixed value. Further, when an IP packet including a multicast IP address as the transmission source address is detected, the IP packet is abandoned, whereby the IP packet concentration to the transmission source can be avoided.

As a first address registration test, a destination multicast address is previously registered in the address administration table of a network node apparatus. When the destination multicast address in the header of an external IP packet input to the network node apparatus is not one registered in the address administration table, the network node apparatus abandons the IP packet, thereby preventing the mixing-in of an unregistered IP packet into the IP transfer network. Similarly, as a second address registration test, a transmission source multicast address is previously registered in the address administration table of the network node apparatus. When the transmission source multicast address in the header of an external IP packet inputted to the network node apparatus is not one registered in the address administration table, the network node apparatus abandons the IP packet, thereby preventing the mixing-in of an unregistered IP packet into the IP transfer network.

The registration of a multicast address into the address administration table of a network node apparatus on the receiver side is not permitted, whereby an ACK packet for IP packet reception confirmation from a multicast IP packet receiver to the multicast IP packet transmitter can not pass through the network node apparatus. Accordingly, the occurrence of congestion in the IP transfer network due to ACK packet implosion and NACK packet implosion is prevented.

The registration of the IP address of a router as a destination address is unpermitted, whereby the intrusion of a harmful IP packet for rewriting a multicast table and the like sent from the outside of the IP transfer network into a router within the IP transfer network is prevented. Alternatively, the registration of the IP address of an operation administration server for multicast within the IP transfer network is unpermitted, whereby the access from the outside of the IP transfer network to the operation management server within the IP transfer network is prevented. Accordingly, the informational security is improved. As a second address registration test, the transmission sources for IP packets including multicast data are restricted, whereby the occurrence of an illegal action by an illegal person is suppressed. Further, in case of the occurrence of an illegal action, the transmission source of the IP packet is easily identified, and hence the informational security of the IP transfer network is improved.

18. 18th Embodiment Conducting Multicast Communication

The following description is made with reference to the FIGS. 338 to 341. Network node apparatuses 1901 to 1905 and routers 1907-1 to 1907-4 are provided within an IP transfer network 1900. The network node apparatuses and the routers are interconnected by IP communication lines directly or indirectly via a network node apparatus or a router. Terminals 1910-2 to 1910-70 having an IP packet transmission/reception function are connected via an IP communication line to a network node apparatus. Reference numerals 1911 to 1915 indicate address administration tables of the network node apparatuses. Reference numerals 1911-3, 1911-4, 1911-5, 1912-3, 1912-4, 1912-5 indicate multicast service proxy servers. Reference numerals 1913-3, 1913-4, 1913-5 indicate overflow communication line servers. Reference numerals 1941 to 1945 indicate overflow communication lines. In the present embodiment, each server and router has a plurality of multicast IP addresses in addition to the proper IP address, and can exchange information with each other by exchanging IP packets.

<<Transmission Terminal and Transmission Administration Server>>

The terminals 1910-02 and 1910-05 serve also as a transmission terminal for transmitting multicast data in a multicast service. The terminals 1910-06 and 1910-08 serve also as a transmission administration server for the multicast service. Each transmission administration server comprises a data base and a information processing mechanism, thereby exchanging the information with the multicast service proxy servers and sharing a part of the information processing of the multicast data transmission terminals.

<<Output Destination Specification of Communication Record>>

The fifth item of a communication record of an address administration table is called the output destination specification of an internal IP packet. When the value of the item is not "0", it indicates a specified state. When the value is "0", it indicates an unspecified state. Similarly, the sixth item of the communication record of the address administration table is called the output destination specification of an external IP packet. When the value of the item is not "0", it indicates a specified state. When the value is "0", it indicates an unspecified state. For example, in the communication record "IM2, M2, E02, I02, 0, (F11 to F30, F91)" in the first line of the address administration table 1913, the output destination specification of the internal IP packet is "0", that is, unspecified. The output destination specification of the external IP packet is "F11 to F30, F91", that is, the logical communication lines F11 to F30 and F91. Here, the logical communication lines F11 to F30 are communication lines 1960-11 to 1960-30, and the logical communication line F91 is a communication line 1960-91.

<<Overflow Communication Line>>

The overflow communication line server collects IP packets, such as ACK packets and NACK packets, which are replied from an reception terminal to a transmission terminal, via an overflow communication line, and then transfers them to separate multicast service proxy servers depending on the multicast address.

<<Transfer of Multicast IP Packet, 1>>

An external IP packet 1930 having a transmission source external IP address "E02" and a destination external IP address "M2" is sent out from the terminal 1910-02 (in FIG. 338) (Step Q1 in FIG. 342), and then reaches the network node apparatus 1901. The communication record "I02, E02, M2, IM2, . . . , 0" of the first line of the address administration table 1911 is used, whereby internal IP packets 1931-1 and 1931-2 are formed. The internal IP packet 1931-1 reaches the router 1907-1 (Step Q2), and then becomes to an internal IP packet 1931-3 thereby to reach the network node apparatus 1903 (Step Q3). On the other hand, the internal IP packet 1931-2 reaches the router 1907-2 (Step Q4). In the router 1907-2, the internal IP packet 1931-2 is copied thereby to be bifurcated into two. The internal IP packet 1931-4 reaches the network node apparatus 1904 (Step Q5), and the internal IP packet 1931-5 reaches the network node apparatus 1905 (Step Q6).

On receiving the internal IP packet 1931-3, using the communication record "IM2, M2, E02, I02, 0, F11 to F30, F91" in the first line of the address administration table 1913, the network node apparatus 1903 decapsulates the internal IP packet 1931-3 thereby to restore an external IP packet(having the same content of the external IP packet 1930), and then sends out the restored external IP packet to the terminals 1910-11 to 1910-30 and the multicast service proxy server 1911-3 (Steps Q7, Q7*x*). Here, the terminals 1910-11 to 1910-30 are provided with a multicast address "M2" in addition to the external IP addresses "E11" to "E30". Further, the multicast service proxy server 1911-3 is provided with a multicast address "M2" as well as an external IP addresses "E91". The feature of the present embodiment is that the multicast service proxy server 1911-3 receives the multicast service data (Step Q7*x*) at almost the same time as that of the terminals 1910-11 to 1910-30.

On receiving the internal IP packet 1931-4, using the communication record "IM2, M2, E02, I02, 0, (F31 to F50, F93)" in the first line of the address administration table 1914, the network node apparatus 1904 decapsulates the internal IP packet 1931-4 thereby to restore an external IP packet, and then sends out the restored external IP packet to the terminals 1910-31 to 1910-50 and the multicast service proxy server 1911-4 (Steps Q8 and Q8*x*). Here, the terminals 1910-31 to 1910-50 are provided with a multicast address "M2" in addition to the external IP addresses "E31" to "E50". Further, the multicast service proxy server 1911-4 is provided with a multicast address "M2" as well as an external IP addresses "E93".

On receiving the internal IP packet 1931-5, using the communication record "IM2, M2, E02, I02, 0, (F51 to F70, F95)" in the first line of the address administration table 1915, the network node apparatus 1905 decapsulates the internal IP packet 1931-5 thereby to restore an external IP packet, and then sends out the restored external IP packet to the terminals 1910-51 to 1910-70 and the multicast service proxy server 1911-5 (Steps Q9, Q9*x*). Here, the terminals 1910-51 to 1910-70 are provided with a multicast address "M2" in addition to the external IP addresses "E51" to "E70". Further, the multicast service proxy server 1911-5 is provided with a multicast address "M2" as well as an external IP addresses "E95".

<<Send-Out of IP Packet by Reception Terminal, 1>>

In some cases, the terminals 1910-11 to 1910-70 send out various IP packets, such as an ACK packet for notifying a normal reception to the transmission terminal, an NACK packet for notifying a reception failure to the transmission terminal, and an IP packet for replying a question, to the transmitter terminal 1910-02 having an external IP address "E02". The procedure for this is described below. In this example, the transmission source address is a multicast IP address "M2", and the destination address is "E02".

The terminals 1910-11 to 1910-30 form an IP packet to be sent to the terminal 1910-02 (Step Q10) thereby to send it out to the network node apparatus (Step Q11). On receiving the external IP packet, the network node apparatus 1903 transfers the external IP packet intact to the packet overflow output line 1943 (Step Q12), because the internal IP packet output destination specification in the communication record "IM2, M2, E02, I02, 0, (F11 to F130, F91)" in the first line of the address administration table 1913 corresponding to the input external IP packet is unspecified, that is, the fifth item of the record is "0".

<<Function of Overflow Communication Line Server, 1>>

The overflow communication line server 1913-3 receives an external IP packet 1946-1 (FIG. 345) from the overflow communication line 1943 (Step MPS1 in FIG. 344), then confirms that the transmission source IP address of the external IP packet 1946-1 is "M2" (Step MPS2), and then forms an IP packet 1946-2 to be sent to the multicast service proxy server 1911-3 for processing the multicast service specified by the multicast address "M2", thereby sending out the IP packet (Step MPS3). Here, the transmission source IP address of the IP packet 1946-2 is the IP address "E90" of the overflow communication line server 1913-3, and the destination IP address is the IP address "E91" of the multicast service proxy server 1911-3. The IP packet 1946-2 is sent out from the overflow communication line server 1913-3 (Step Q13 in FIG. 342), through the network node apparatus 1903, and reaches the multicast service proxy server 1911-3 (Step Q14). At that time, the communication record "I90, E90, E91, I91, . . . , F90" in the twelfth line and the communication record "I91, E91, E90, I90, . . . , F91" in the tenth line of the address administration table 1913 are used.

In this case, the multicast service proxy server 1911-3 is requested for the re-transmission of the multicast data, because the received IP packet is an NACK packet. The multicast service proxy server 1911-3 has previously received the multicast data classified by the IP address "M2" in the Step Q7*x*, and hence can use the multicast data for the re-transmission request. The multicast service proxy server 1911-3 re-transmits the multicast data requested for re-transmission to the network node apparatus 1903 (Step Q15). The multicast data reaches the terminals 1910-11 to 1910-30 (Step Q16). At that time, the communication record "I91, E91, M2, IM2, . . . , F91" in the third line and the communication record "IM2, M2, E91, I91, 0, F11 to F30" in the second line of the address administration table 1913 are used.

<<Function of Multicast Service Proxy Server, 1>>

The multicast service proxy server 1911-3 checks the content of the received IP packet 1946-2 thereby to form an IP packet containing: the information in which ACK packets indicating the reception confirmation are concentrated and listed; the information in which NACK packets indicating the reception failure notified from the terminals are concentrated and listed; the concentrated information such as individual terminal information; and the like; and then sends it to the transmitter terminal 1910-2, or alternatively, receives an IP packet replied from the transmitter terminal 1910-2 (Steps Q41 to Q44 in FIG. 342). Here, the IP addresses of the IP packet are the external IP address "E91" of the multicast service proxy server 1911-3 and the external IP address "E02" of the transmitter terminal 1910-2. Further, the communication record "I91, E91, E02, I02, . . . , F91" in the seventh line of the address administration table 1913 and the communication record "I02, E02, E91, I91, . . . , F02" in the second line of the address administration table 1911 are used.

<<Send-Out of IP Packet by Reception Terminal, 2>>

The terminals 1910-31 to 1910-50 receive the multicast data in the Step Q8. The terminals 1910-31 to 1910-50 form an IP packet used for a reception confirmation and the like (Step Q20 in FIG. 342) thereby to send it to the network node apparatus 1904 (Step Q21).

On receiving the external IP packet, the network node apparatus transfers the external IP packet intact without IP encapsulation to the packet overflow output line 1944 (Step Q22), because the internal IP packet output destination specification in the communication record "IM2, M2, E02, I02, 0, (F31 to F50, F93)" in the first line of the address administration table 1914 corresponding to the input external IP packet is unspecified, that is, the fifth item of the record is "0".

<<Overflow Communication Line Server, 2>>

The overflow communication line server 1913-4 receives the external IP packet from the overflow communication line 1944, then confirms that the transmission source IP address of the external IP packet is "M2", and then forms an IP packet to be sent to the multicast service proxy server 1911-4 for processing the multicast service specified by the multicast address "M2", thereby sending out the IP packet via the communication line 1914-1 to the multicast service proxy server 1911-4 (Step Q24 in FIG. 342). In this case, the feature is that the overflow communication line server 1913-4 and the multicast service proxy server 1911-4 are interconnected by the communication line 1914-1.

<<Function of Multicast Service Proxy Server, 2>>

The multicast service proxy server 1911-4 has previously received the multicast data in the Step Q8*x*. The multicast service proxy server 1911-4 re-transmits the multicast data requested for re-transmission to the network node apparatus 1904 (Step Q25). The multicast data reaches the terminals 1910-31 to 1910-50 (Step Q26). At that time, the communication record "I93, E93, M2, IM2, . . . , F93" in the third line and the communication record "IM2, M2, E93, I93, 0, F31 to F50" in the second line of the address administration table 1914 are used.

The multicast service proxy server 1911-4 checks the content of the received IP packet thereby to form an IP packet containing: the concentrated ACK packet information; the concentrated NACK packet information; the concentrated individual terminal information; and the like; and then sends it to the transmitter terminal 1910-2, or alternatively, receives an IP packet replied from the transmitter terminal 1910-2 (Steps Q45 to Q48 in FIG. 342). Here, the communication record "I93, E93, E02, I02, . . . , F93" in the seventh line of the address management table 1914 and the communication record "I02, E02, E93, I93, . . . , F02" in the third line of the address administration table 1911 are used.

<<Send-Out of IP Packet by Reception Terminal, 3>>

The terminals 1910-51 to 1910-70 receive the multicast data in the Step Q9. The terminals 1910-51 to 1910-70 form an IP packet used for a reception confirmation and the like (Step Q30 in FIG. 342) thereby to send it to the network node apparatus 1905 (Step Q31). The network node apparatus 1905 transfers the external IP packet to the packet overflow output line 1945 (Step Q32). The overflow communication line server 1913-5 receives the external IP packet from the overflow communication line 1945, and then sends out the IP packet via the communication line 1915-1 to the multicast service proxy server 1911-5 (Step 034 in FIG. 342).

The multicast service proxy server 1911-5 has previously received the multicast data in the Step 09*x*. The multicast service proxy server 1911-5 re-transmits the multicast data requested for re-transmission to the network node apparatus 1905 (Step Q35). The multicast data reaches the terminals 1910-51 to 1910-70 (Step Q36).

The multicast service proxy server 1911-5 checks the content of the received IP packet thereby to form an IP packet containing the concentrated ACK packet information and the like, and then sends it to the transmitter terminal 1910-2, or alternatively, receives an IP packet replied from the transmitter terminal 1910-2 (steps Q49 to Q52 in FIG. 342). Further, the multicast service proxy server 1911-5 can exchange information directly with the terminal 1910-70 by transmitting and receiving an IP packet (Steps Q38, Q39). Here, the communication record "I95, E95, E70, I70, . . . , F95" in the ninth line and the communication record "I70, E70, E95, I95, . . . , F70" in the tenth line of the address administration table 1915 are used. In this case, the feature is that the multicast service proxy server 1911-5 provides a service for communicating directly with the terminal 1910-70.

<<Packet Transfer of Multicast IP Address "M5">>

An external IP packet-1932 having a transmission source external IP address "E05" and a destination external IP address "M5" is sent out from the terminal 1910-05 (in FIG. 339), and then undergoes IP encapsulation via the network node apparatus 1902, thereby becoming internal IP packets 1933-1 and 1933-2. Each packet reaches the network node apparatus 1903 or 1905 via the router 1907-3 or 1907-4. Each internal IP packet is then decapsulated and sent to the terminals 1910-21 to 1910-30, 1910-41 to 1910-50, and 1910-61 to 1910-70. This procedure is shown in FIG. 343. A first major difference from FIG. 342 is that the terminal 1910-05 serves as the transmission terminal instead of the terminal 1910-02 and that the routers 1907-3 and 1907-4 are used instead of the routers 1907-1 and 1907-2. The route through which the IP packet is transferred is changed as shown in FIG. 343 (Steps R1 to R9, R7*x*, R8*x*, R9*x*).

As described above, the plurality of reception terminals connected to a network node apparatus are provided with a proper external IP address as well as one or more multicast IP addresses defined for each multicast service, whereby one or more multicast services can be used.

<<Transmission Administration Server>>

A second major point is that the multicast service proxy servers 1912-3 to 1912-5 can transmit the concentrated ACK information IP packet, the concentrated NACK information IP packet, and the concentrated individual terminal information IP packet to the transmission administration server 1910-08, and can receive the data sent out from the transmission administration server 1910-08 (Steps R41 to R44, R45 to R48 and R49 to R52 in FIG. 343). The transmission administration server 1910-08 and the transmission terminal 1910-05 also exchange information with each other by transmitting and receiving an IP packet (Step R55 in FIG. 343). In the transmission/reception of an IP packet between the multicast service proxy server 1912-3 (IP address "E92") and the transmission administration server 1910-08 (IP address "E08"), the communication record "I08, E08, E92, I92, . . . , F08" in the fifth line of the address administration table 1912 and the communication record "I92, E92, E08, I08, . . . , F92" in the eighth line of the address administration table 1913 are used. In the transmission/reception of an IP packet between the multicast service proxy server 1912-4 (IP address "E94") and the transmission administration server 1910-08, the communication record "I08, E08, E94, I94, . . . , F08" in the sixth line of the address administration table 1912 and the communication record "I94, E94, E08, I08, . . . , F94" in the eighth line of the address administration table 1914 are used.

In the transmission/reception of an IP packet between the multicast service proxy server 1912-5 (IP address "E96") and the transmission administration server 1910-08, the communication record "I08, E08, E96, I96, . . . , F08" in the seventh line of the address administration table 1912 and the communication record "I96, E96, E08, I08, . . . , F96" in the eighth line of the address administration table 1915 are used. In the transmission/reception of an IP packet between the transmission administration server 1910-08 (IP address "E08") and the transmission terminal 1910-05 (IP address "E05") and, the communication record "I08, E08, E05, I05, . . . , F08" in the eighth line and the communication record "I05, E05, E08, I08, . . . , F05" in the ninth line of the address administration table 1912 are used.

<<Overflow Communication Line Server and Multicast Service Proxy Server>>

The function of the overflow communication line server and the multicast service proxy server is the same as that of the above-mentioned case of multicast IP address "M2". On receiving an IP packet from the overflow communication line 1943 (Step MPS1 in FIG. 344, Steps R10 to R12 in FIG. 343), the overflow communication line server 1913-3 checks whether the multicast IP address of the IP packet is "M2," "M5," or the like (Step MPS2) and then transfers it to the multicast service proxy server 1911-3 or the multicast service proxy server 1912-3 depending on the situation (Step MPS3, Steps R13, R14 in FIG. 343).

<<Initial Setting and Cancellation of Multicast IP Address>>.

The administrator of the IP transfer network 1900 has the authority to rewrite the communication record of the address administration tables 1911 to 1915 of the network node apparatuses. For Example, a communication record "I07, E07, M7, IM7, . . . , 0" used by the terminal 1910-7 for multicast service transmission is added to the address administration table 1911 in the network node apparatus 1901. Here, "M7" is a multicast IP address. The route information of the multicast address "M7" is added to the route tables in the routers 1907-1 to 1907-4. A communication record "IM7, M7, E07, I07, 0, F11 to F20, F91-1" used by the terminals 1910-11 to 1910-20 for multicast service reception can be added to the address administration table 1913 in the network node apparatus 1903. Here, "M7" is the same multicast IP address as the above-mentioned "M7". The F11 to F20 indicate the output line interfaces connected to the terminals 1910-11 to 1910-20. The F91-1 indicates an output line interface connected to a multicast service proxy server newly installed. The administrator of the IP transfer network 1900 installs the above-mentioned multicast IP address "M7" in the terminals 1910-11 to 1911-20.

Similarly, a communication record "IM7, M7, E07, I07, 0, F31 to F40, F93-1" used by the terminals 1910-31 to 1910-40 for multicast service reception is added to the address administration table 1914 in the network node apparatus 1904. Further, a communication record "IM7, M7, E07, I07, 0, F51 to F60, F95-1" used by the terminals 1910-51 to 1910-60 for multicast service reception can be added to the address administration table 1915 in the network node apparatus 1905. By virtue of the above-mentioned procedure, the terminals 1910-11 to 1910-20, the terminals 1910-31 to 1910-40, and the terminals 1910-51 to 1910-60 can receive the new multicast service. The terminals 1910-21 to 1910-30 can cancel the reception of the multicast IP service identified by the IP address "M5" by erasing a communication record "IM5, M5, E92, I92, 0, (F21 to F29)" in the fifth line of the address administration table 1913.

<<Network Node Apparatus to which Transmission Administration Server is Connected>>

In the above-mentioned embodiment, the transmission terminal 1910-05 and the transmission administration server 1910-08 are connected to the common network node apparatus 1902. However, it is possible that the terminal 1910-07 (IP address "ED7") connected to the network node apparatus 1901 is set to be a new transmission administration server, that the terminal 1910-08 (IP address "E08") is no longer used as a transmission administration server, that the transmission terminal 1910-05 is connected to the network node apparatus 1902, and that the transmission administration server 1910-07 is connected to the network node apparatus 1901. That is, the transmission terminal 1910-05 and the transmission administration server 1910-08 can be connected to separate network node apparatuses.

In this case, the communication record "I92, E92, E08, I08, . . . , F92" in the eighth line of the address administration table 1913 is changed into "I92, E92, E07, I07, . . . , F92". The communication record "I94, E94, E08, I08, . . . , F94" in the eighth line of the address administration table 1914 is changed into "I94, E94, E07, I07, . . . , F94". And, the communication record "I96, E96, E08, I08, . . . , F96" in the eighth line of the address administration table 1915 is changed into "I96, E96, E07, I07, . . . , F96".

Further, a communication record "I07, E07, E05, I05, . . . , F07" used between the transmission administration server 1910-07 and the transmission terminal 1910-05 and communication records "I07, E07, E92, I92, . . . , F07," "I07, E07, E94, I94, . . . , F07", and "I07, E07, E96, I96, . . . , F07" used between the transmission administration server 1910-07 and the multicast service proxy servers 1912-3 to 1912-5 are added in the address administration table 1911. Furthermore, a communication record "I05, E05, E07, I07, . . . , F05" within the address administration table 1912 used between the transmission terminal 1910-05 and the transmission administration server 1910-07 is added in the address administration table 1912. Further, the communication record "I08, E08, E05, I05, . . . , F08" used between the terminal 1910-08 and the transmission terminal 1910-05 and the communication records "I08, E08, E92, I92, . . . , F08" and the like used the multicast service proxy servers 1912-3 to 1912-5 are eliminated.

<<Integration of Transmission Terminal and Transmission Administration Server>>

Further, it is possible that the transmission terminal 1910-02 and the transmission administration server 1910-06 are provided with a common IP, and that the function of the transmission administration server 1910-06 is integrated into the function of the transmission terminal 1910-02. In that case, the function of the transmission administration server 1910-06 and the function of the transmission terminal 1910-02 are distinguished with each other by TCP port numbers and UDP port numbers.

<<Variation of Overflow Communication Line>>

The overflow communication line server 1913-5 shown in FIG. 341 is means for classifying the multicast IP address of an IP packet received from the overflow communication line 1945 thereby to send it to the communication line 1915-1 or 1915-2. Described below is a method in which an overflow IP packet classification function section is provided as a variation of that means.

Reference numeral 1905-1 (FIG. 346) indicates a network node apparatus. Reference numeral 1915-1 indicates an address administration table. Reference numeral 1925-1 indicates an external line interface section. Reference numeral 1911-5X indicates a multicast service proxy server having the same function as that of the server 1911-5 (FIG. 341) and identified by the multicast IP address "M2". Reference numeral 1912-5X indicates a multicast service proxy server having the same function as that of the server 1912-5 (FIG. 341) and identified by the multicast IP address "M5". Reference numeral 1913-5X indicates an overflow IP packet classification function section having a function similar to that of the overflow communication line server 1913-5.

When the overflow IP packet classification function section 1913-5*x* receives an external IP packet the transmission source of which is a multicast IP address and when the overflow parameter of the communication record is specified, as "0", the overflow IP packet classification function section determines the transmission source multicast IP address thereby to transfer the IP packet to the corresponding multicast service proxy server via the communication line 1915-1X or 1915-2X.

<<Implementation of Cable Broadcast and Media Distribution Communication System>>

The multicast data includes what is called multimedia data such as digitized voice, fax data, still images and moving images.

In case that the terminal 1910-02 is a voice transmission terminal capable of transmitting a digitized voice and that the terminals 1910-11 to 1910-70 are digitized voice reception terminals, the transmission of the IP packet 1930 is the transmission of a cable voice broadcast. Thus, a cable voice broadcast communication system is implemented using IP transfer. Further, in case that the terminal 1910-02 is a voice/moving image transmission terminal capable of transmitting a digitized voice/motion picture and that the terminals 1910-11 to 1910-70 are digitized voice/moving image reception terminals, the transmission of the IP packet 1930 is the transmission of a cable TV broadcast. Thus, a cable TV broadcast communication system is implemented using IP transfer. In a similar way, a cable fax communication system for transmitting and receiving a digitized still image is implemented using IP transfer.

The above-mentioned digitized voice reception terminals and voice/moving image reception terminals can transmit an IP packet containing the individual reception terminal information, such as a comment on the received multicast data(that is, the contents of the broadcast), to the transmission terminal 1910-02. The multicast service proxy server can receive the IP packets from the plurality of reception terminals, and can send an IP packet containing the concentrated information in which the information contained in the above-mentioned IP packets has been edited into a list or a short message, to the transmission terminal and the transmission administration server. The transmission terminal and the transmission administration server can further replies an IP packet containing the comment on the result of the received IP packet containing the concentrated information, to the multicast service proxy server. As a result, a cable broadcast communication system is implemented in which the information can be exchanged between the multicast data transmitter and the multicast data receivers. As described above, the multicast service proxy server arbitrates the information exchange between the multicast data transmitter and the multicast data receivers. When the transmission media is a book, a news paper, a music or a video, the above-mentioned cable broadcast communication system can implement a book distribution communication system, a news paper distribution communication system, a music distribution communication system or a video distribution communication system as a multicast service. Here, the video indicates the information composed of voice and moving image which is digitized and stored on a video tape, a CD, or a DVD.

<<Summary>>

A terminal connected to a network node apparatus via an IP communication line can be provided with, in addition to the proper external IP address, one or more multicast IP addresses defined for each multicast service. A plurality of transmission terminals are possible. The multicast data transmitted by each multicast data transmission terminal is transferred through the IP transfer network, and then reaches a plurality of terminals. As such, each terminal can receive one or more multicast services. Each reception terminal can install a new multicast IP address for each multicast service and cancel it at any time by requesting to the IP transfer network operator. One of more multicast service proxy servers can be connected to a network node apparatus.

The multicast service proxy server can transmit an IP packet which contains the concentrated ACK packet information, the concentrated NACK packet information, and the concentrated individual terminal information received from one or more terminals connected to the network node apparatus to which the multicast service proxy server is connected, to the transmission terminal or the transmission administration server operating the multicast service.

The multicast service can be a high quality service by virtue of the improvement request such as a reception confirmation notification(ACK packet) and a reception failure notification(NACK packet). The communication company can suppress the increase in communication traffic in the IP transfer network by suppressing the ACK packets, NACK packets and individual receiver reports. Further, the distribution of multicast data not having a contract with the communication company is prevented, and the charging to the multicast service users is carried out easily.

The multicast service proxy server can exchange information by transmitting and receiving an IP packet with the transmission terminal and the transmission administration server which are connected to the multicast service proxy server and operate the multicast service. The multicast service proxy server receives and retains the multicast data transmitted from the transmitter terminal. The multicast service proxy server can then send out the retained multicast data to the terminals connected to the network node apparatus to which the multicast service proxy server is connected, using the multicast function of the network node apparatus.

The multicast service proxy server can exchange information by transmitting and receiving an IP packet with a specific terminal the communication record of which is set in the network node apparatus. IP encapsulation is carried out when the internal IP packet output destination specification in the communication record for specifying the method of IP encapsulation and IP decapsulation is specified, whereas IP encapsulation is not carried out when the internal IP packet output destination specification is unspecified. The external IP packet in question is then outputted to the external IP packet overflow communication line. The overflow communication line server receives a non-IP-encapsulated external IP packet via the external IP packet overflow communication line, and then transfers the information included in the external IP packet through the network node apparatus to the multicast service proxy server.

The overflow communication line server receives a non-IP-encapsulated external IP packet via the external IP packet overflow communication line, and then transfers the information included in the external IP packet to the multicast service proxy server via the communication line interconnecting the overflow communication line server and the multicast service proxy server. The overflow IP packet classification function section connected to the external IP packet overflow communication line is included. IP decapsulation is carried out when the external IP packet output destination specification in the communication record is specified, whereas IP decapsulation is not carried out when the external IP packet output destination specification is unspecified. The internal IP packet in question is then outputted to the internal IP packet overflow communication line.

19. 19Th Embodiment Conducting Multicast Communication

Network node apparatuses have the feature of not carrying out IP encapsulation. The following description is made with reference to the FIGS. 347 to 350. Network node apparatuses 2001 to 2005 and routers 2007 to 2009 are provided within an IP transfer network 2000. The network node apparatuses and the routers are interconnected by IP communication lines directly or indirectly via a network node apparatus or a router. Reference numerals 2011 to 2015 indicate address administration tables of the network node apparatuses, and each table registers the IP addresses of the terminals connected to each network node apparatus via a communication line. Reference numerals 2016 to 2020 indicate route tables of the network node apparatuses. Reference numerals 2021 to 2023 indicate route tables of the routers. Terminals 2025 to 2039 have an IP packet transmission/reception function, and are connected to each network node apparatus via an IP communication line. Reference numerals 2045 to 2049 indicate overflow communication lines to which an unscheduled IP packet is outputted. Reference numeral 2050 indicates a multicast service proxy server. The terminal 2026 serves also as the transmission terminal for transmitting the multicast data in a multicast service. The multicast data includes what is called multimedia data such as digitized voice, fax data, static images and moving images. The terminal 2027 serves also as the transmission administration server for the multicast service.

<<Transfer of IP Packet>>

Next, described below is the series of steps of IP packet transfer starting from the transmission of an external IP packet 2040 by the transmission terminal 2026. The terminal 2026 transmits the external IP packet 2040 having an transmission source external IP address "E02" and a destination IP address "M2" to the communication line 2051 (Step DD1 in FIG. 350). The network node apparatus 2001 checks whether the transmission source IP address "E02" of the received external IP packet 2040 is registered in the address administration table 2011 or not(IP packet acceptance test). In this case, the set of the logical communication line name "F02" and the IP address "E02" of the communication line 2051 is registered as "F02, E02" in the record in the second line of the address administration table 2011, and hence the IP packet 2040 is accepted. In case that the IP address is not registered, the received IP packet is transferred intact to the packet overflow communication line 2045, and then abandoned.

Next, with regard to the record "Msk-m2, M2, (G02, G03)" in the first line of the route table 2016, it is checked whether the result of the "and" operation between the first item "Msk-m2" of the record and the destination IP address "M2" of the IP packet 2040 coincides with the second item "M2" of the record or not(the following equation (12)). Coincidence occurs in this case. Here, the value of address mask "Msk-m2" is "255.255.255.255" in this case.

$$\text{If ("Msk-m2" and "M2"="M2")} \tag{12}$$

Next, with regard to the third item G02 and G03 of the record, an IP packet 2041 is sent out to the communication line 2053 having the logical communication line name "G02" (Step DD2), while an IP packet 2042 is sent out to the communication line 2054 having the logical communication line name "G03" (Step DD3). The IP packets 2041 and 2042 are generated by copying the IP packet 2040. In the above-mentioned procedure, when the destination IP address "M2" of the IP packet 2040 is not included in the route table 2016, the IP packet 2040 is abandoned (registration test of multicast address).

The IP packet 2041 reaches the router 2007, and is then sent out as an IP packet 2043 to the communication line 2055 having a logical communication line name G12 according to the record "M2, G12" in the second line of the route table 2021 (Step DD4). The IP packet 2043 reaches the router 2008, and is then sent out as an IP packet 2034 to the communication line 2058 having a logical communication line name G27 according to the record "M2. G27" in the second line of the route table 2022 (Step DD5). On the other hand, the IP packet 2042 sent out to the communication line 2054 reaches router 2009, and is then sent out as an IP packet 2035 to the communication line 2056 having a logical communication line name "G21" (Step DD6) and as an IP packet 2036 to the communication line 2057 for the logical communication line name "G22" (Step DD7), according to the "M2, G21, G22" of the second line of the route table 2023. The IP packets 2035 and 2036 are generated by copying the IP packet 2042. Here, the route tables 2021 to 2023 of the routers may have address masks similar to those of the route table 2016 of the network node apparatus. However, they are known to the public and hence omitted.

The IP packet 2034 reaches the network node apparatus 2003 via the communication line 2058. With regard to the record "Msk-m2, M2, (F10, F12, F22)" in the first line of the route table 2018, it is checked whether the result of the "and" operation between the first item "Msk-m2" of the record and the destination IP address "M2" of the IP packet 2034 coincides with the second item "M2" of the record or not(the following equation (13)). Coincidence occurs in this case. Here, the value of address mask "Msk-m2" is "255.255.255.255" in this case.

$$\text{If ("Msk-m2") and "M2"="M2")} \tag{13}$$

Next, with regard to the third item F10, F12, F22 of the record, an IP packet 2038 is sent out to the communication line 2060 having a logical communication line name "F10" (Step DD11). An IP packet 2039 is sent out to the communication line 2061 having a logical communication line name "F12" (Step DD13). An IP packet is sent out to the communication line 2059 having a logical communication line name "F22" (Step DD9). The terminals 2031, 2033 receive the multicast data via the communication lines 2060, 2061, respectively. The multicast service proxy server 2050 retains the multicast data received via the communication line 2059 in an internal data base.

The network node apparatus 2004 receives the IP packet 2035, and then sends out an IP packet 2040 copied from the IP packet 2035 using the record "Msk-m2, M2, F13" in the first line of the route table 2019 in a procedure similar to that of the above-mentioned network node apparatus 2003, to the communication line 2062 having a logical communication line name "F13" (Step DD14).

The network node apparatus 2005 receives the IP packet 2036, and then sends out IP packets 2041, 2042 copied from the IP packet 2035 using the record "Msk-m2, M2, (F16, F17)" in the first line of the route table 2020 in a procedure similar to that of the above-mentioned network node apparatus 2003, to the communication lines 2063, 2064, respectively (Steps DD17, DD18).

<<Prevention of Implosion of ACK Packets and NACK Packets>>

In order to report the information relevant to the reception of the IP packet 2038, such as an ACK packet for reception report, an NACK packet for reception failure report, and an individual terminal report, to the transmission terminal 2026, the terminal 2031 forms an IP packet 2044 having the transmission source external IP address "M2" and the destination external IP address "E02" thereby to send it out to the communication line 2060 (Step DD21 in FIG. 350). Similarly, in order to report the reception of the IP packet 2039 to the transmission terminal 2026, the terminal 2033 sends out an IP packet having the transmission source external IP address "M2" and the destination external IP address "E02" to the communication line 2061 (Step DD22).

On receiving the IP packets sent out by the terminals 2031, 2033 for the report to the transmission terminal 2026, the network node apparatus 2003 checks whether the transmission source external IP address "M2" of the IP packets is registered in the address administration table 2013 or not. Since it is not registered in this case, the received IP packets are transferred intact to the packet overflow communication line 2059 (Step DD26).

As such, the sending-out of IP packets of individual terminal report from all the terminals receiving the multicast data to the multicast data transmission terminal is suppressed. Accordingly, the implosion of ACK packets and NACK packets within the IP transfer network is prevented.

<<Data Transmission by Multicast Service Proxy Server>>

The multicast service proxy server 2050 has received the multicast data transmitted by the terminal 2026 in the Step DD9, and retains it in the internal data base. When the terminal 2031 or 2033 requests the re-transmission of the multicast data in the step DD21 or DD22, the multicast service proxy-server 2050 can re-transmit the retained multicast data through the network node apparatus 2003 (Step DD27) to the terminal 2031 (Step DD28) or to the terminal 2033 (Step DD29). At that time, the first line "Msk-m2, M2, (F10, F12, F22) of the route table 2018 within the network node apparatus 2003 is used for the transmission of this multicast data.

<<Data Transmission to and Reception from Transmission Terminal>>

The multicast service proxy server 2050 sends the formed IP packet containing the concentrated information to the transmission terminal 2026, or alternatively, receives an IP packet replied from the transmission terminal 2026 (Steps DD41 to DD45 in FIG. 350). Here, the IP addresses of the IP packet are the IP address "E22" of the multicast service proxy server 2050 and the IP address "E02" of the transmission terminal 2026. Used here are the communication record "F22, E22" in the fourth line of the address administration table 2013, the communication record "Msk22, E22, F22" in the fifth line of the route table 2018, the communication record "F02, E02" in the second line of the address administration table 2011, and the communication record "Msk02, E02, F02" in the third line of the route table 2016. As such, the multicast service proxy server can exchange information by transmitting and receiving an IP packet with the transmission terminal 2026 which is connected to the multicast service proxy server and operates the multicast service.

<<Data Transmission to and Reception from Transmission Administration Server>>

The multicast service proxy server 2050 sends the formed IP packet containing the concentrated information (the concentrated ACK packet information, the concentrated NACK packet information, and the concentrated individual terminal information) to the transmission administration server 2027, or alternatively, can receive an IP packet replied from the transmission administration server 2027 (Steps DD46 to DD50 in FIG. 350). Here, the IP addresses of the IP packet are the IP address "E22" of the multicast service proxy server 2050 and the IP address "E03" of the transmission administration server 2027. Used here are the communication record "F22, E22" in the fourth line of the address administration table 2013, the communication record "Msk22, E22, F22" in the fifth line of the route table 2018, the communication record "F03, E03" in the third line of the address administration table 2011, and the communication record "Msk03, E03, F03" in the fourth line of the route table 2016. As such, the multicast service proxy server can exchange information by transmitting and receiving an IP packet with the transmission administration server which is connected to the multicast service proxy server and operates the multicast service.

<<Exchange of Information Between Transmission Terminal and Transmission Administration Server>>

The transmission terminal and the transmission administration server can exchange information with each other by exchanging an IP packet in order to operate the multicast service (Step DD51 in FIG. 350). Further, it is possible that the transmission terminal 2026 and the transmission administration server 2027 are provided with a common IP address, and that the function of the transmission administration server 2027 is integrated into the function of the transmission terminal 2026. In that case, the function of the transmission administration server 2027 and the function of the transmission terminal 2026 are distinguished with each other by TCP port numbers and UDP port numbers.

<<Network Node Apparatus to which Transmission Administration Server is Connected>>

In the above-mentioned embodiment, the transmission terminal 2026 and the transmission administration server 2027 are connected to the common network node apparatus 2001. However, it is possible that the terminal 2028 (IP address "E04") connected to the network node apparatus 2002 is set to be a new transmission administration server, and that the transmission administration server 2027 is no longer used as the transmission administration server. That is, the transmission terminal and the transmission administration server can be connected to separate network node apparatuses. In this case, in the multicast service proxy server 2050 and the transmission terminal 2026 which transmit and receive an IP packet to and from the transmission administration server 2028, the IP address "E04" is used for the transmission administration server in the transmission/reception of the IP packet.

<<Variation of Network Node Apparatus>>

The network node apparatus 2001 (in FIG. 347) can be implemented by separating it into an address administration module 2090 and a router 2091 shown in FIG. 351. Here, the address administration module 2090 and the router 2091 can exchange information with each other via a line 2092. The address administration table 2011$x$ in the address administration module 2090 contains the same information of the address administration table 2011 in the network node apparatus 2001, and the route table 2016$x$ in the router 2091 contains the same information of the route table 2016 in the network node apparatus 2001. The address administration module 2090 is implemented by a server implemented by a personal computer, or by a hardware module.

<<Transfer of IP Packet Using Address Administration Module>>

Described below is the IP packet transfer within the IP transfer network 2000 with reference to FIG. 351. The terminal 2026 transmits an external IP packet 2040 having an transmission source external IP address "E02" and a destination IP address "M2" to the communication line 2051. The router 2091 receives the external IP packet 2040 via the communication line 2051, and then sends the received external IP packet 2040 through the line 2092 to the address administration module 2090. The address administration module 2090 checks whether the transmission source IP address "E02" of the received external IP packet 2040 is registered in the address administration table 2011$x$ or not. In this case, the address administration module confirms that the set of the logical communication line name "F02" and the IP address "E02" of the communication line 2051 is registered as "F02, E02" in the record in the second line of the address administration table 2011$x$, and then notifies the confirmation result to the router 2091. In response to the report from the address administration module 2090, the router 2091 accepts the IP packet 2040. In case that the IP packet is not registered, the received IP packet is transferred intact to the packet overflow communication line 2045, and then abandoned.

Next, with regard to the record "Msk-m2, M2, (G02, G03)" in the first line of the route table 2016$x$, the router 2091 checks whether the result of the "and" operation between the first item "Msk-m2" of the record and the destination IP address "M2" of the IP packet 2040 coincides with the second item "M2" of the record or not(the following equation (14)). Coincidence occurs in this case. Here, the value of address mask "Msk-m2" is 255.255.255.255 in this case.

If ("Msk-m2") and "M2"="M2") (14)

Next, with regard to the third item G02 and G03 of the record, an IP packet 2041 is sent out to the communication line 2053 having the logical communication line name "G02", while an IP packet 2042 is sent out to the communication line 2054 having the logical communication line name "G03".

The network node apparatus 2003 (FIG. 349) can be replaced by the combination of an address administration module and a router having a function similar to the above-mentioned one. Here, the replaced address administration module comprises a address administration table containing the same information of the address administration table 2013, and the replaced router comprises the same information of the route table 2018. By a similar principle, the network node apparatuses 2004 and 2005 can be replaced by the combinations of an address administration module and a router having a function similar to the above-mentioned one. They comprise the same information of the address administration tables and the route tables in the network node apparatuses 2004 and 2005.

<<Implementation of Cable Broadcast and Media Distribution Communication System>>

In case that the terminal 2026 is a voice transmission terminal capable of transmitting a digitized voice and that the terminals 2031 to 2039 are digitized voice reception terminals, the transmission of the IP packet 2040 is the transmission of a cable voice broadcast. Thus, a cable voice broadcast communication system is implemented using IP transfer. Further, in case that the terminal 2060 is a voice/moving image transmission terminal capable of transmitting a digitized voice/moving image picture and that the terminals 2031 to 2039 are digitized voice/moving image reception terminals, the transmission of the IP packet 2040 is the transmission of a cable TV broadcast. Thus, a cable TV broadcast communication system is implemented using IP transfer. In a similar way, a cable fax communication system for transmitting and receiving a digitized still image is implemented using IP transfer. The above-mentioned digitized voice reception terminals and voice/moving image reception terminals can transmit an IP packet containing the individual reception terminal information, such as a comment on the received multicast data(that is, the contents of the broadcast), to the transmission terminal 2026. The multicast service proxy server can receive the IP packets from the plurality of reception terminals, and can send an IP packet containing the concentrated information in which the information contained in the above-mentioned IP packets has been edited into a list or a short message, to the transmission terminal and the transmission administration server. The transmission terminal and the transmission administration server can further replies an IP packet containing the comment on the result of the received IP packet containing the concentrated information, to the multicast service proxy server. As a result, a cable broadcast communication system is implemented in which the information can be exchanged between the multicast data transmitter and the multicast data receivers. As described above, the multicast service proxy server arbitrates the information exchange between the multicast data transmitter and the multicast data receivers. When the transmission media is a book, a news paper, a music, or a video, the above-mentioned cable broadcast communication system can implement a book distribution communication system, a news paper distribution communication system, a music distribution communication system, or a video distribution communication system as a multicast service. Here, the video indicates the information composed of voice and moving images which is digitized and stored on a video tape, a CD, or a DVD.

<<Summary>>

Each terminal is connected through a communication line to a router to which an address administration module is connected. The transmission source IP address is registered in the address administration table of the address administration module. When the transmission source IP address in the header of an IP packet being input to the router is registered in the address administration table in the address administration module, the IP packet is transferred. When it is not registered, the IP packet is transferred to the overflow communication line of the router, whereby the mixing-in of an unscheduled IP packet into the IP transfer network is prevented. Further, when the destination multicast IP address in the header of an IP packet being inputted to the router is not registered in the route table of the router, the IP packet is transferred to the overflow communication line of the router, whereby the mixing-in of an unscheduled IP packet into the IP transfer network is prevented.

When the IP address of a terminal is registered in the address administration table of a network node apparatus, the IP packet is transmitted. When it is not registered, the IP packet is transferred to the overflow communication line. The IP packet is either abandoned or sent to the multicast service proxy server. The registration of a multicast address into the address administration table of a network node apparatus is not permitted, whereby an ACK packet for IP packet reception confirmation from a multicast IP packet receiver to the multicast IP packet transmitter, an NACK packet for reception failure notification, and an individual report packet can not pass through the network node apparatus. Further, in case that a destination multicast address is registered in the route table of a network node apparatus, when the destination multicast IP address in the header of an IP packet being inputted to the network node apparatus is registered in the route table, the IP packet is transferred. When it is not registered in the route table, the IP packet is abandoned by the network node apparatus, whereby the mixing-in of an unscheduled IP packet into the IP transfer network is prevented.

The multicast service proxy server receives the multicast data transmitted by the transmission terminal, and retains it in the inside. The multicast service proxy server can then send out the retained multicast data to a terminal connected to the network node apparatus to which the multicast service proxy server is connected, using the multicast function of the network node apparatus.

The multicast service proxy server can transmit an IP packet which contains the concentrated ACK packet information, the concentrated NACK packet information, and the concentrated individual terminal information received from one or more terminals connected to the network node apparatus to which the multicast service proxy server-is connected, to the transmission terminal or the transmission administration server operating the multicast service.

The multicast service proxy server can exchange information by transmitting and receiving an IP packet with the transmission terminal and the transmission administration server which are connected to the multicast service proxy server and operate the multicast service. Further, the multicast service proxy server uses the information contained in an IP packet received via the IP packet overflow communication line.

A cable voice broadcast communication system, a cable TV broadcast communication system, or a cable fax communication system by IP transfer can be implemented by using a voice transmission terminal, a voice/moving image transmission terminal, or a still image transmission terminal capable of transmitting a digitized voice, a voice/moving image, or a still image. The cable broadcast reception terminals can transmit an IP packet containing the individual reception terminal information to the transmission terminal. As a result, a cable broadcast communication system is implemented in which the information can be exchanged between the multicast data transmitter and the multicast data receivers. The multicast service proxy server arbitrates the information exchange between the multicast data transmitter and the multicast data receivers.

The multicast service can be a high quality service by virtue of the improvement request such as a reception confirmation notification(ACK packet) and a reception failure notification(NACK packet). The communication company can suppress the increase in communication traffic in the IP transfer network by suppressing the ACK packets, NACK packets, and individual receiver reports. Further, the distribution of multicast data not having a contract with the communication company is prevented, and the charging to the multicast service users is carried out easily.

20. 20th Embodiment Conducting Multicast Communication

The following description is made with reference to the FIG. 352. An IP transfer network 2100 comprises: the administration region 2101 of a communication company X; the administration region 2102 of a communication company Y; network node apparatuses 2103 to 2114; routers 2115-1 to 2115-11; and a router 2116. The network node apparatuses and the routers are interconnected by IP communication lines directly or indirectly via a network node apparatus or a router. Terminals 2117 to 2133 having an IP packet transmission/reception function are connected to each network node apparatus via an IP communication line. Reference numerals 2140 to 2143 indicate multicast P service proxy servers. Reference numerals 2144 to 2147 indicate multicast Q service proxy servers. Reference numerals 2048 to 2051 indicate overflow communication servers. The communication company X and the communication company Y manage the router 2116 in cooperation. All of the network node apparatuses 2103 to 2114 are apparatuses having an IP encapsulation/IP decapsulation function, or alternatively, all of them are apparatuses not having an IP encapsulation/IP decapsulation function. The internal configuration of each network node apparatus is described in another embodiment.

<<Transmission Terminal and Transmission Work Server of Communication Company>>

The electronic news paper distribution service by a news paper publishing company "A" is designated to a multicast P service, whereas the news distribution service by a broadcast station B is designated to a multicast Q service. The terminal 2117 is a multicast data transmission terminal managed by the communication company X. The terminal 2118 is a transmission work server managed by the communication company X. The terminal 2120 is a multicast data transmission terminal managed by the communication company Y. The terminal 2122 is a transmission work server managed by the communication company Y. The terminal 2123 is a terminal managed by the news paper publishing company "A", and is a multicast P service terminal for transmitting the electronic news paper published by the news paper publishing company "A" to the transmission work server 2118 of the communication company X and the transmission work server 2122 of the communication company Y and for conducting the work communication on the electronic news paper distribution. The terminal 2119 is a terminal managed by the broadcast station B, and is a multicast Q service terminal for transmitting the(voice/moving image) TV news distribution service provided by the broadcast station B to the transmission administration server 2118 of the communication company X and the transmission work server 2122 of the communication company Y and for conducting the working/notifying communication on the electronic news paper.

The transmission work server 2118 represents the communication company X, and processes the administrative work on the transmission of the multicast data, such as the distribution of the electronic news paper published by the news paper publishing company "A", the TV news distribution service by the broadcast station B, and the electronic stock price announcement service by a securities company C. Similarly, the transmission work server 2122 represents the communication company Y, and processes the administrative work on the transmission of the multicast data.

<<Transfer of Multicast IP Packet>>

The electronic news paper is stored as the digital information in a large number of IP packets, and each packet is called an electronic news paper IP packet. The news paper publishing company "A" transmits the electronic news paper IP packet from the terminal 2123 of the news paper publishing company "A" to the transmission work server 2118 of the communication company X (Step 2160 in FIG. 353). The electronic news paper IP packet goes through the network node apparatus 2111, through the routers 2115-10, 2115-7, 2115-6, 2116', 2115-5, 2115-3, 2115-1, through the network node apparatus 2103, and then reaches the transmission work server 2118. The transmission of the electronic news paper IP packet from the terminal 2123 to the transmission work server 2118 can be carried out by any one of UDP communication technique(connection-less communication) and TCP communication technique(connection communication).

The transmission work server 2118 retains the received electronic news paper IP packet in the internal data base (Step 2161). The transmission work server 2118 then transmits the received and retained electronic news paper IP packet to the transmission terminal 2117 (Step 2162). The transmission terminal 2117 retains the received electronic news paper IP packet. The transmission of the electronic news paper IP packet from the transmission work server 2118 to the terminal 2117 can be carried out by any one of UDP communication technique and TCP communication technique.

The transmission terminal 2117 transmits the retained electronic news paper IP packet to the network node apparatus 2103 (Step 2163). Here, the destination address is a multicast address "Mx". The transmitted electronic news paper-IP packet is, at the same time, transferred within the multicast-dedicated IP transfer network 2152 thereby to reach the network node apparatuses 2106 to 2108 (Step 2171 to 2174), to reach the electronic news paper IP packet reception terminals 2124 to 2128 (Step 2175 to 2177), and at the same time, to reach the multicast P service proxy servers 2140 to 2141 (Step 2178). The terminals 2124 to 2125 transmit an ACK packet notifying the normal reception of the electronic news paper IP packet or an NACK packet notifying the failure of the IP packet (Step 2181). The ACK or NACK packet is transferred to the multicast P service proxy server 2140 in charge of the electronic news paper distribution service (Step 2183). Similarly, the terminals 2126 to 2127 transmit an ACK packet or an NACK packet notifying the situation of reception of the IP packet (Step 2182). The ACK or NACK packet is transferred to the multicast P service proxy server 2141 (Step 2184). The transmission of an ACK packet or an NACK packet from the terminal 2128 is in a similar manner.

The multicast P service proxy servers 2140 to 2141 re-transmits the electronic news paper IP packet as the multicast data to the terminals 2124 to 2127 (Steps 2185, 2186).

The multicast P service proxy servers 2140 to 2141 form an IP packet for reporting the situation of reception of the electronic news paper IP packet, and then sends it out to the network node apparatuses 2106 to 2107 (Step 2187). The IP packet goes through the IP transfer network 2152 (Step 2188), through the network node apparatus 2103, and then reaches the transmission work server 2118 (Step 2189).

The transmission work server 2118 managed by the communication company X can calculate the usage charge of the IP transfer network 2101 managed by the communication company X depending on the information relevant to the electronic news paper IP packet distribution in the Steps 2162 and 2189. The transmission work server 2118 uses the information contained in the content of the received IP packet thereby to form an IP packet containing the report item to the news paper publishing company "A", and then transmits the formed IP packet to the terminal 2123 of the news paper publishing company "A" (Step 2190). Here, the IP packet goes through the network node apparatus 2103 and the routers 2115-1, 2115-3, 2115-5, 2116, 2115-6, 2115-7, 2115-10, 2111, and then reaches the terminal 2123. The news paper publishing company "A" receives the IP packet, and then confirms the situation of distribution of the electronic news paper IP packet having requested to the communication company X.

On completion of the Step 2160, the news paper publishing company "A" transmits the electronic news paper IP packet from the terminal 2123 of the news paper publishing company "A" to the transmission work server 2122 of the communication company Y (Step 2164 in FIG. 353). Here, the electronic news paper IP packet goes through the network node apparatus 2111, through the router 2115-10, through the network node apparatus 2110, and then reaches to the transmission work server 2122. The transmission work server 2122 retains the received electronic news paper IP packet in the internal data base (Step 2165).

The transmission work server 2122 receives an authentication that the transmission work server 2122 is an authorized transmission work server qualified for transmitting the electronic news paper IP packet, from the transmission terminal 2120 (Step 2260). The transmission work server 2122 then transmits the received and retained electronic news paper IP packet to the transmission terminal 2120 (Step 2166). The transmission terminal 2120 retains the received electronic news paper IP packet. Further, in the Step 2164, the terminal 2123 of the news paper publishing company "A" can receive an authentication that the terminal itself is correctly the terminal 2123 of the news paper publishing company "A", from the transmission work server 2122 of the communication company Y.

The transmission terminal 2120 transmits the retained electronic news paper IP packet to the network node apparatus 2109 (Step 2167). Here, the destination address is a multicast address "My". The transmitted electronic news paper IP packet is, at the same time, transferred within the multicast-dedicated IP transfer network 2153 thereby to reach the network node apparatuses 2112 to 2114 (Step 2191 to 2194), to reach the electronic news paper IP packet reception terminals 2129 to 2133 (Step 2195 to 2197), and at the same time, to reach the multicast P service proxy servers 2142 to 2143 (Step 2198). The terminals 2129 to 2133 transmit an ACK packet or an NACK packet notifying the situation of reception of the IP packet (Steps 2201, 2202). The ACK or NACK packet is transferred to the multicast-P service proxy server 2142 or 2143 in charge of the electronic news paper distribution service (Steps 2203 or 2204).

The multicast P service proxy servers 2142 to 2143 re-transmits the electronic news paper IP packet as the multicast data to the terminals 2129 to 2133 (Steps 2205, 2206). The multicast P service proxy servers 2142 to 2143 form an IP packet for reporting the situation of reception of the electronic news paper IP packet, and then sends it out to the network node apparatuses 2112 to 2113 (Step 2207). The IP packet goes through the IP transfer network 2153 (Step 2208), through the network node apparatus 2109, and then reaches the transmission work server 2122 (Step 2209).

The transmission work server 2122 managed by the communication company Y calculates the usage charge of the IP transfer network 2102 managed by the communication company Y. The transmission work server 2122 uses the information contained in the content of the received IP packet thereby to form an IP packet containing the report item to the news paper publishing company "A", and then transmits the formed IP packet to the terminal 2123 of the news paper publishing company "A" (Step 2210). Here, the IP packet goes through the network node apparatus 2110, through the router 2115-10, through the network node apparatus 2111, and then reaches the terminal 2123. The news paper publishing company "A" receives the IP packet, and then confirms the situation of distribution of the electronic news paper IP packet having requested to the communication company X. The multicast Q service can be implemented by a similar method.

<<Procedure of Authentication>>

As a procedure of authentication in the Step 2260, there are various techniques known to the public. An example is described below with reference to FIG. 354. The transmission work server 2122 and the transmission terminal 2120 retain a common function y=f(a, b) and a secret authentication key "K" in the inside. The transmission work server 2122 transmits the information "ID2122" for identifying the transmission work server 2122 to the transmission terminal 2120 (step 2160-1). The transmission terminal 2120 receives the information "ID2122" for identifying the transmission work server 2122, then generates a random number "R", then calculates and retains C1=f(K, R), and then transmits the random number "R" to the transmission work server 2122 (Step 2160-2). The transmission work server 2122 uses the received random number "R", the authentication key "K," and the function "f" thereby to calculate C2=f(K, R), and then transmits the "C2" to the transmission terminal 2120 (Step 2160-3). The transmission terminal checks whether the generated and retained "C1" coincides with the received "C2" or not. When the coincidence occurs, it has been confirmed that the transmission work server 2122 has the authorized authentication key "K" and hence the transmission work server 2122 is the authorized transmission work server.

<<Variation>>

The following description is made with reference to the FIG. 355. An IP transfer network 2100-1 comprises: the administration region 2101-1 of a communication company X; the administration region 2102-1 of a communication company Y; network node apparatuses 2104-1, 2105-1, 2107-1 to 2114-1; routers 2230, 2232; address administration modules 2231, 2233; routers 2115-1 to 2115-11; and a router 2116. All of the network node apparatuses 2104-1, 2105-1, 2107-1 to 2114-1 are apparatuses not having an IP encapsulation/IP decapsulation function. The internal configuration of each network node apparatus is the same as that described in another embodiment. The router 2230 and the address administration module 2231 are interconnected and integrated through a line thereby to serve as the network node apparatus. Similarly, the router 2232 and the address administration module 2233 are interconnected and integrated through a line thereby to serve as the network node apparatus. As such, a multicast service can be implemented similarly to the multicast service described with reference to FIGS. 352 and 353.

The terminal 2123 of the news paper publishing company "A" providing the multicast service transmits an electronic news paper IP packet to the transmission work servers 2118 and 2122. The transmission work servers 2118 and 2122 can distribute the received electronic news paper IP packet through the IP transfer networks 2101-1 and 2102-1 to the reception terminals 2124 to 2133, by multicast technique. The result of the distribution is reported to the transmission work servers 2118 and 2122, whereby the charging on the reception terminals 2124 to 2133 is carried out.

Here, the IP transfer networks 2152 and 2153 are unnecessary to be multicast-dedicated IP transfer networks. Thus, the multicast service can be implemented in the IP transfer networks being shared with the IP transfer for IP telephone, data transfer, or voice/image transfer described in another embodiment.

<<Setting of Address Administration Table and Route Table>>

With regard to the address administration tables of the network node apparatuses and the route tables of the routers in the administration region 2101-1 of the communication company X and the administration region 2102-1 of the communication company Y the setting of separate address administration tables and separate route tables for each multicast service is necessary(setting of multicast tree structure). For this purpose, a method described in another embodiment is applicable. Further, techniques, described in another embodiment, of the change of the multicast tree structure due to the increase or decrease in the number of multicast service users and of the release of the multicast tree structure due to the multicast service cancellation are also applicable in the present embodiment.

<<Summary>>

By virtue of the above-mentioned method, a plurality of multicast services are implemented using the IP transfer network interconnecting the IP transfer networks of a plurality of communication companies. The multicast service provider can request to the communication company for the vicarious execution of the charging work. Multicast data is transmitted to the transmission work server managed by the communication company X and the transmission work server managed by the communication company Y. The transmission work server managed by the communication company X distributes the multicast data through the transmission terminal of the communication company X to a plurality of terminals connected to the IP transfer network managed by the communication company X. Similarly, the transmission work server managed by the communication company Y distributes the multicast data through the transmission terminal of the communication company Y to a plurality of terminals connected to the IP transfer network managed by the communication company Y. The result of distribution within the IP transfer network managed by the communication company X or the communication company Y is collected via the multicast service proxy server by the transmission work server of the communication company X or the communication company Y.

The terminal-to-terminal communication connection control for the terminal-to-terminal(inter-terminal) communications with employment of the IP transfer network can be realized by way of connecting such multimedia terminals for apparatus as IP terminals including personal computers with IP communication functions, IP telephone sets, IP voice/ image apparatus to more than one of a network node apparatus within an integrated IP transfer network, a gateway and a media router. In this case, while the media router is installed outside the integrated IP transfer network, and the host name made of the multimedia terminal identifying telephone number is used through the integrated IP transfer network, the natural communications can be carried out, for example, the information can be exchanged among the multimedia terminals.

While the telephone set having the telephone number for the public switched telephone network is connected to the media router within the LAN, the terminal-to-terminal communication can be established from the telephone set connected to the public switched telephone network via the integrated IP transfer network to the telephone set contained in the LAN. Also, while a single multimedia terminal constitutes the transmission source, electronic data and voice/image data such as electronic books may employed for IP data multicast networks and IP base TV broadcasting networks for transmitting to multimedia terminals which constitute a plurality of reception ends.

What is claimed is:

1. A communication system with employment of an internet protocol (IP) transfer network, wherein:

said IP transfer network includes a plurality of network node apparatus, a plurality of connection servers, and a domain name server;

a first terminal T1 outside of said IP transfer network is connected to a first network node apparatus N1 by a first logical terminal LP1 via a first communications line L1, and a second terminal T2 outside of said IP transfer network is connected to a second network node apparatus N2 by a second logical terminal LP2 via a second communications line L2;

said first network node apparatus N1 sets, in its first apparatus control table H1, a first communication record R81 including a discrimination information to discriminate said first logical terminal LP1, and said second network node apparatus N2 sets, in its second apparatus control table H2, a second communication record R82 including a discrimination information to discriminate said second logical terminal LP2;

for a request to connect to said second terminal T2, said first terminal T1 sends a first-type external IP packet 1 including a connection request and a telephone number TN2 of said second terminal T2 and a destination address of which is an address of a first connection server S1;

said first-type external IP packet 1 inputs to said first network node apparatus N1 from said first logical terminal LP1, and said first network node apparatus N1 inspects whether said first communication record R81 including a logical terminal discrimination information LX to discriminate said first logical terminal LP1 and a destination IP address EA81 contained in said first-type external IP packet 1 exists in said first network node apparatus N1 or not;

in a case that said first communication record R81 is found out by said inspection, said first network node apparatus N1 encapsulates said first-type external IP packet 1 with reference to said first communication record R81 and forms a first-type internal packet 1, and said first network node apparatus N1 sends said first-type internal packet 1 to said first connection server S1;

said first connection server S1 presents said telephone number TN2 to a domain name server DS1 and obtains an external IP address EA2 of said second terminal T2, a second internal address IA2 given for discriminating said second logical terminal LP2 and an internal address 2 of a second connection server S2 which controls a connection of said second terminal T2, and said first connection server S1 sends an initial address message including said connection request to said second connection server S2;

in response to said second connection server S2 sending out a second-type internal packet 2 including a receipt notification formed according to said connection request, said second-type internal packet 2 is converted into a second-type external IP packet 2 according to a rule of said second communication record R82 in said second network node apparatus N2 and is sent to said second terminal T2;

a third-type external IP packet 3 including a call-on notification to notify a response preparation start is sent out from said second terminal T2, said third-type external IP packet 3 is converted into a third-type internal packet 3 according to a rule of said second communication record R82 at said second network node apparatus N2 and then is received at said second connection server S2, and said second connection server S2 forms a call progress message including said call-on notification and sends it to said first connection server S1;

in response to said first connection server S1 sending out a fourth-type internal packet 4 including said call-on notification, said fourth-type internal packet 4 is converted into a fourth-type external IP packet 4 and then is received at said first terminal T1;

in response to a fifth-type external IP packet 5 including a response notification to notify a response is sent out from said second terminal 12, said fifth-type external IP packet 5 is converted into a fifth-type internal packet 5 at said second network node apparatus N2 and then is received at said second connection server S2;

said second connection server S2 forms a response message including said response notification and sends it to said first connection server S1;

in response to said first connection server S1 sending out a sixth-type internal packet 6 including said response notification and an external IP address EA2 of said second terminal T2, a sixth-type external IP packet 6 including said response notification and said external IP address EA2 is received at said first terminal T1;

said first connection server S1 instructs to set a first communication record R1 including a second internal address IA2 for discriminating said second logical terminal LP2 to said first network node apparatus N1, said second connection server S2 instructs to set a second communication record R2 including a first internal address IA1 for discriminating said first logical terminal LP1 to said second network node apparatus N2, and said communication records R1 and R2 defines a communication path P12 where an internal packet can be transferred between said network node apparatuses N1 and N2;

in response to said first terminal T1 sending a seventh-type external IP packet 7 that a destination address is said external IP address EA2 of said second terminal T2, said seventh-type external IP packet 7 inputs to said first network node apparatus N1 from said first logical terminal LP1;

said first network node apparatus N1 inspects whether said first communication record R1 including a logical terminal discrimination information LX to discriminate said first logical terminal LP1 and a destination IP address EA2 contained in said seventh-type external IP packet 7 exists in said first network node apparatus N1 or not;

in a case that said first communication record R1 is found out by said inspection, said first network node apparatus N1 converts said seventh-type external IP packet 7 into a seventh-type internal packet 7 that a destination address is said second internal address IA2 with reference to said first communication record R1;

said seventh-type internal packet 7 is transferred in said communication path P12, and said seventh-type external IP packet 7 restored at said second network node apparatus N2 is sent to said second terminal T2;

in response to said first terminal T1 sending an eighth-type external IP packet 8 including a communication cut-off request and a destination address of which is an address of said first connection server S1, an eighth-type internal packet 8 including said communication cut-off request is received at said first connection server S1; and said first connection server S1 sends a release message (REL) including said communication cut-off request to said second connection server S2, said second connection server S2 sends a release complete message (RLC) to said first connection servers S1, and said first and second connection servers S1 and S2 are instructed to erase said first and second communication records R1 and R2.

2. A communication system with employment of an IP transfer network according to claim 1, wherein after receipt of said second-type external IP packet 2 including said receipt notification, said second terminal T2 does not send said third-type external IP packet 3 including said call-on notification.

3. A communication system with employment of an IP transfer network, wherein:

said IP transfer network includes a plurality of network node apparatus, a plurality of connection servers, and a domain name server;

a first terminal T1 outside of said IP transfer network is connected to a first network node apparatus N1 by a first logical terminal LP1 via a first communications line L1, and a second terminal T2 outside of said IP transfer network is connected to a second network node apparatus N2 by a second logical terminal LP2 via a second communications line L2;

said first network node apparatus N1 sets, in its first apparatus control table H1, a first communication record R81 including a discrimination information to discriminate said first logical terminal LP1, and said second network node apparatus N2 sets, in its second apparatus control table H2, a second communication record R82 including a discrimination information to discriminate said second logical terminal LP2;

for a request to connect to said second terminal T2, said first terminal T1 sends a first-type external IP packet 1 including a connection request and a host name HN2 of said second terminal T2 and a destination address of which is an address of a first connection server S1;

said first-type external IP packet 1 inputs to said first network node apparatus N1 from said first logical terminal LP1, and said first network node apparatus N1 inspects whether said first communication record R81 including a logical terminal discrimination information LX to discriminate said first logical terminal LP1 and a destination IP address EA81 contained in said first-type external IP packet 1 exists in said first network node apparatus N1 or not;

in a case that said first communication record R81 is found out by said inspection, said first network node apparatus N1 encapsulates said first-type external IP packet 1 with reference to said first communication record R81 and forms a first-type internal packet 1, and said first network node apparatus N1 sends said first-type internal packet 1 to said first connection server S1;

said first connection server S1 presents said host name HN2 to a domain name server DS1 and obtains an external IP address EA2 of said second terminal T2, a second internal address IA2 given for discriminating said second logical terminal LP2 and an internal address 2 of a second connection server S2 which controls a connection of said second terminal T2, and said first connection server S1 sends an initial address message including said connection request to said second connection server S2;

in response to said second connection server S2 sending out a second-type internal packet 2 including a receipt notification formed according to said connection request, said second-type internal packet 2 is converted into a second-type external IP packet 2 according to a rule of said second communication record R82 in said second network node apparatus N2 and is sent to said second terminal T2;

a third-type external IP packet 3 including a call-on notification to notify a response preparation start is sent out from said second terminal T2, said third-type external IP packet 3 is converted into a third-type internal packet 3 according to a rule of said second communication record R82 at said second network node apparatus N2 and then is received at said second connection server S2, and said second connection server S2 forms a call progress message including said call-on notification and sends it to said first connection server S1;

in response to said first connection server S1 sending out a fourth-type internal packet 4 including said call-on notification, said fourth-type internal packet 4 is converted into a fourth-type external IP packet 4 and then is received at said first terminal T1;

in response to a fifth-type external IP packet 5 including a response notification to notify a response is sent out from said second terminal T2, said fifth-type external IP packet 5 is converted into a fifth-type internal packet 5 at said second network node apparatus N2 and then is received at said second connection server S2;

said second connection server S2 forms a response message including said response notification and sends it to said first connection server S1;

in response to said first connection server S1 sending out a sixth-type internal packet 6 including said response notification and an external IP address EA2 of said second terminal T2, a sixth-type external IP packet 6 including said response notification and said external IP address EA2 is received at said first terminal T1;

said first connection server S1 instructs to set a first communication record R1 including a second internal address IA2 for discriminating said second logical terminal LP2 to said first network node apparatus N1, said second connection server S2 instructs to set a second communication record R2 including a first internal address IA1 for discriminating said first logical terminal LP1 to said second network node apparatus N2, and said communication records R1 and R2 defines a communication path P12 where an internal packet can be transferred between said network node apparatuses N1 and N2;

in response to said first terminal T1 sending a seventh-type external IP packet 7 that a destination address is said external IP address EA2 of said second terminal T2, said seventh-type external IP packet 7 inputs to said first network node apparatus N1 from said first logical terminal LP1;

said first network node apparatus N1 inspects whether said first communication record R1 including a logical terminal discrimination information LX to discriminate said first logical terminal LP1 and a destination IP address EA2 contained in said seventh-type external IP packet 7 exists in said first network node apparatus N1 or not;

in a case that said first communication record R1 is found out by said inspection, said first network node apparatus N1 converts said seventh-type external IP packet 7 into a seventh-type internal packet 7 that a destination address is said second internal address IA2 with reference to said first communication record R1;

said seventh-type internal packet 7 is transferred in said communication path P12, and said seventh-type external IP packet 7 restored at said second network node apparatus N2 is sent to said second terminal T2;

in response to said first terminal T1 sending an eighth-type external IP packet 8 including a communication cut-off request and a destination address of which is an address of said first connection server S1, an eighth-type internal packet 8 including said communication cut-off request is received at said first connection server S1; and said first connection server S1 sends a release message (REL) including said communication cut-off request to said second connection server S2, said second connection server S2 sends a release complete message (RLC) to said first connection servers S1, and said first and second connection servers S1 and S2 are instructed to erase said first and second communication records R1 and R2.

4. A communication system with employment of an IP transfer network, wherein:

said IP transfer network includes plural network node apparatus and plural connection servers;

a first terminal T1 outside of said IP transfer network is connected to a first network node apparatus N1 by a first logical terminal LP1 via a first communications line L1, and a second terminal T2 outside of said IP transfer network is connected to a second network node apparatus N2 by a second logical terminal LP2 via a second communications line L2;

said first terminal T1 sends a connection request and a telephone number TN2 of said second terminal T2 to said first network node apparatus N1, said first network node apparatus N1 sends said connection request and said telephone number TN2 to a first connection server S1, said first connection server S1 sends an initial address message including said connection request to a second connection server S2, and said second connection server S2 a receipt notification formed according to said connection request to said second terminal T2;

a call-on notification to notify a response preparation start is sent to said second connection server S2 from said second terminal T2, said second connection server S2 forms a call progress message including said call-on notification and sends it to said first connection server S1, and said first connection server S1 sends said call-on notification to said first terminal T1;

said first terminal T1 sends a response notification to said second connection server S2, said second connection server S2 sends said response notification to said first connection server S1, and said first connection server S1 sends said call-on notification to said first terminal T1;

said first connection server S1 instructs to set a first communication record R1 including a second internal address IA2 for discriminating said second logical terminal LP2 to said first network node apparatus N1, said second connection server S2 instructs to set a second communication record R2 including a first internal address IA1 for discriminating said first logical terminal LP1 to said second network node apparanis N2, and said first and second communication records R1 and R2 defines a communication path P12 where an internal packet can be transferred between said first and second network node apparatuses N1 and N2;

in response to said first terminal T1 sending a second-type external IP packet 2 that a destination address is said a external IP address EA2 of said second terminal T2 to said first network node apparatus N1, said first network node apparatus N1 inspects whether said first communication record R1 including a logical terminal discrimination information LX to discriminate said first logical terminal LP1 and a destination IP address EA2 contained in said second-type external IP packet 2 exists in said first network node apparatus N1 or not;

in a case that said first communication record R1 is found out by said inspection, said second-type external IP packet 2 is converted into a second-type internal packet 2 that a destination address is said second internal address IA2 and said second-type internal packet 2 is transferred in said communication path P12 and said second-type external IP packet 2 restored at said second network node apparatus N2 is sent to said second terminal T2; and in response to said first terminal T1 sending a communication cut-off request to said first connection server S1, said first and second connection servers S1 and S2 receive and send a release message (REL) or a release complete message (RLC) including said communication cut-off request and instruct to erase said communication records R1 and R2, thereby deleting said communication path P12.

5. A communication system with employment of an IP transfer network according to claim 4, wherein after receipt of said receipt notification, said second terminal T2 does not send said call-on notification.

6. A communication system with employment of an IP transfer network, wherein:

said IP transfer network includes plural network node apparatus and plural connection servers;

a first terminal T1 outside of said IP transfer network is connected to a first network node apparatus N1 by a first logical terminal LP1 via a first communications line L1, and a second terminal T2 outside of said IP transfer network is connected to a second network node apparatus N2 by a second logical terminal LP2 via asecond communications line L2;

said first terminal T1 sends a connection request and a host name HN2 of said second terminal T2 to said first network node apparatus N1, said first network node apparatus N1 sends said connection request and said host name HN2 to a first connection server S1, said first connection server S1 sends an initial address message including said connection request to a second connection server S2, and said second connection server S2 a receipt notification formed according to said connection request to said second terminal T2;

a call-on notification to notify a response preparation start is sent to said second connection server S2 from said second terminal T2, said second connection server S2 forms a call progress message including said call-on notification and sends it to said first connection server S1, and said first connection server S1 sends said call-on notification to said first terminal T1;

said first terminal T1 sends a response notification to said second connection server S2, said second connection server S2 sends said response notification to said first connection server S1, and said first connection server S1 sends said call-on notification to said first terminal T1;

said first connection server S1 instructs to set a first communication record R1 including a second internal address IA2 for discriminating said second logical terminal LP2 to said first network node apparatus N1, said second connection server S2 instructs to set a second communication record R2 including a first internal address IA1 for discriminating said first logical terminal LP1 to said second network node apparatus N2, and said first and second communication records R1 and R2 defines a communication path P12 where an internal packet can be transferred between said first and second network node apparatuses N1 and N2;

in response to said first terminal T1 sending a second-type external IP packet 2 that a destination address is a external IP address EA2 of said second terminal T2 to said first network node apparatus N1, said first network node apparatus N1 inspects whether said first communication record R1 including a logical terminal discrimination information LX to discriminate said first logical terminal LP1 and a destination IP address EA2 contained in said second-type external IP packet 2 exists in said first network node apparatus N1 or not;

in a case that said first communication record R1 is found out by said inspection, said second-type external IP packet 2 is converted into a second-type internal packet 2 that a destination address is said second internal address IA2 and said second-type internal packet 2 is transferred in said communication path PI2, and said second-type external IP packet 2 restored at said second network node apparatus N2 is sent to said second terminal T2; and in response to said first terminal T1 sending a communication cut-off request to said first connection server S1, said first and second connection servers S1 and S2 receive and send a release message (REL) or a release complete message (RLC) including said communication cut-off request and instruct to erase said communication records R1 and R2, thereby deleting said communication path P12.

* * * * *